US012591351B2

(12) United States Patent
Boucher et al.

(10) Patent No.: US 12,591,351 B2
(45) Date of Patent: Mar. 31, 2026

(54) UNIFIED DOCUMENT SURFACE WITH TRIGGER BASED NOTIFICATIONS OF ACTION LINKS

(71) Applicant: GRAMMARLY, INC., San Francisco, CA (US)

(72) Inventors: Melissa Ming-Sak Boucher, Los Altos Hills, CA (US); Jeremy Edward Britton, Santa Cruz, CA (US); Luke Bayes, St. Petersburg, FL (US); Monica F. Caso, Burlingame, CA (US); Alexander W. Deneui, Emerald Hills, CA (US); Christopher Leland Eck, Sammamish, WA (US); Nigel Robin Ellis, Redmond, WA (US); Filipe P. Fortes, Sarasota, FL (US); David Lilja Greenspan, Aptos, CA (US); Brett Robert Hobbs, Santa Monica, CA (US); Matthew B. Hudson, San Carlos, CA (US); Timothy Andrew James, Seattle, WA (US); Kenneth Francis Mendes, Sunnyvale, CA (US); Shishir S. Mehrotra, Los Altos, CA (US); Trevor Michael O'Brien, San Francisco, CA (US); Lane Patrick Shackleton, San Francisco, CA (US); Rhed Shi, San Jose, CA (US); Hariharan Sivaramakrishnan, Sunnyvale, CA (US); Jason Peter Stowe, Newcastle, WA (US); Jason Andrew Tamulonis, Seattle, WA (US); Himanshu Vasishth, Sunnyvale, CA (US); Ramesh Krishna Vyaghrapuri, Kenmore, WA (US); David Richard Wright, Redwood City, CA (US); Irvin Zhan, New Hyde Park, NY (US); Roger Mathieu Zurawicki, San Francisco, CA (US)

(73) Assignee: Superhuman Platform Inc.

( * ) Notice: Subject to any disclaimer, the term of this patent is extended or adjusted under 35 U.S.C. 154(b) by 479 days.

(21) Appl. No.: 17/129,271

(22) Filed: Dec. 21, 2020

(65) Prior Publication Data

US 2021/0286481 A1 Sep. 16, 2021

Related U.S. Application Data

(63) Continuation of application No. 16/597,278, filed on Oct. 9, 2019, now Pat. No. 10,908,784, which is a
(Continued)

(51) Int. Cl.
*G06F 40/18* (2020.01)
*G06F 3/041* (2006.01)
(Continued)

(52) U.S. Cl.
CPC ............ *G06F 3/0482* (2013.01); *G06F 3/041* (2013.01); *G06F 3/04847* (2013.01);
(Continued)

(58) Field of Classification Search
CPC ........ G06F 40/166; G06F 40/18; G06F 16/93; G06Q 10/101
See application file for complete search history.

(56) References Cited

U.S. PATENT DOCUMENTS 3,510,645 A 5/1970 Siegel
3,635,251 A 1/1972 Gaines
(Continued)

FOREIGN PATENT DOCUMENTS

WO 2017189933 A1 11/2017
WO 2022182796 A1 9/2022

OTHER PUBLICATIONS

"Getting Started with Excel 2010", Author/Publisher: University of Michigan Library Instructional Technology, Date: Aug. 3, 2011, Aug. 3, 2011, pp. 1-17.
(Continued)

*Primary Examiner* — Benjamin Smith
(74) *Attorney, Agent, or Firm* — Van Hoven PC; Jordan Becker

(57) ABSTRACT

The present disclosure describes methods and systems for interpreting a first user input comprising a text flow entry, interpreting a second user input comprising one of an in-line
(Continued)

data access entry and a table-based calculation entry, positioning a text entry value on a unified document surface in response to the first user input, creating at least one data structure in response to the one of the in-line data access entry and the table-based calculation entry, and positioning the data structure on the unified document surface.

19 Claims, 114 Drawing Sheets

Related U.S. Application Data continuation of application No. 15/499,888, filed on Apr. 28, 2017, now Pat. No. 10,489,018, which is a continuation of application No. 15/499,887, filed on Apr. 27, 2017, now Pat. No. 10,466,868.

(60) Provisional application No. 62/328,469, filed on Apr. 27, 2016, provisional application No. 62/485,908, filed on Apr. 15, 2017.

(51) Int. Cl.

| | |
|---|---|
| *G06F 3/0482* | (2013.01) |
| *G06F 3/04847* | (2022.01) |
| *G06F 3/0485* | (2022.01) |
| *G06F 3/0486* | (2013.01) |
| *G06F 16/22* | (2019.01) |
| *G06F 16/93* | (2019.01) |
| *G06F 40/106* | (2020.01) |
| *G06F 40/14* | (2020.01) |
| *G06F 40/166* | (2020.01) |
| *G06F 40/177* | (2020.01) |
| *G06F 40/197* | (2020.01) |
| *G06F 40/205* | (2020.01) |
| *G06Q 10/101* | (2023.01) |
| *G06F 3/04842* | (2022.01) |
| *G06F 7/544* | (2006.01) |
| *G06F 11/34* | (2006.01) |
| *G06F 16/23* | (2019.01) |
| *G06F 16/26* | (2019.01) |
| *G06F 40/10* | (2020.01) |
| *G06F 40/103* | (2020.01) |
| *G06T 11/20* | (2006.01) |

(52) U.S. Cl.
CPC .......... *G06F 3/0485* (2013.01); *G06F 3/0486* (2013.01); *G06F 16/2228* (2019.01); *G06F 16/2282* (2019.01); *G06F 40/106* (2020.01); *G06F 40/14* (2020.01); *G06F 40/166* (2020.01); *G06F 40/177* (2020.01); *G06F 40/18* (2020.01); *G06F 40/197* (2020.01); *G06F 40/205* (2020.01); *G06Q 10/101* (2013.01); *G06F 3/04842* (2013.01); *G06F 7/544* (2013.01); *G06F 11/3438* (2013.01); *G06F 11/3476* (2013.01); *G06F 16/235* (2019.01); *G06F 16/2358* (2019.01); *G06F 16/26* (2019.01); *G06F 16/93* (2019.01); *G06F 40/10* (2020.01); *G06F 40/103* (2020.01); *G06F 2203/04806* (2013.01); *G06T 11/206* (2013.01); *G06T 2200/24* (2013.01)

(56) References Cited

U.S. PATENT DOCUMENTS

| | | | |
|---|---|---|---|
| 5,581,760 A | | 12/1996 | Atkinson et al. |
| 5,745,910 A | | 4/1998 | Piersol et al. |
| 5,974,413 A | | 10/1999 | Beauregard et al. |
| 7,117,435 B1 | | 10/2006 | Kotler et al. |
| 7,155,667 B1 | | 12/2006 | Kotler et al. |
| 7,350,141 B2 | | 3/2008 | Kotler et al. |
| 7,412,645 B2 | | 8/2008 | Kotler et al. |
| 7,424,668 B2 | | 9/2008 | Despain |
| 7,506,242 B2 | | 3/2009 | Kotler et al. |
| 7,506,243 B2 | | 3/2009 | Kotler et al. |
| 7,523,390 B2 | | 4/2009 | Kotler et al. |
| 7,568,151 B2 | * | 7/2009 | Bargeron .............. G06F 40/166 |
| | | | 715/230 |
| 7,617,229 B2 | | 11/2009 | Bishop et al. |
| 7,769,810 B1 | | 8/2010 | Kaufman |
| 7,805,674 B2 | | 9/2010 | Chen et al. |
| 7,877,680 B2 | | 1/2011 | Arun et al. |
| 7,882,565 B2 | | 2/2011 | Collins et al. |
| 7,962,853 B2 | * | 6/2011 | Bedi ..................... G06F 40/186 |
| | | | 709/227 |
| 8,037,038 B2 | | 10/2011 | Cragun et al. |
| 8,099,392 B2 | * | 1/2012 | Paterson ............ G06F 11/1458 |
| | | | 715/229 |
| 8,176,321 B1 | | 5/2012 | Perry et al. |
| 8,200,962 B1 | | 6/2012 | Boodman et al. |
| 8,250,459 B2 | | 8/2012 | Ho et al. |
| 8,307,119 B2 | * | 11/2012 | Rochelle ................... G06F 8/34 |
| | | | 709/248 |
| 8,341,189 B2 | | 12/2012 | Campbell et al. |
| 8,429,521 B2 | | 4/2013 | Lloyd et al. |
| 8,434,134 B2 | | 4/2013 | Khosrowshahi et al. |
| 8,448,066 B2 | | 5/2013 | Hasuike |
| 8,453,112 B1 | | 5/2013 | Flynn et al. |
| 8,510,645 B2 | | 8/2013 | Beach et al. |
| 8,510,646 B1 | * | 8/2013 | Young ................... G06F 40/169 |
| | | | 715/275 |
| 8,612,380 B2 | | 12/2013 | Kleppner et al. |
| 8,635,251 B1 | | 1/2014 | Chan |
| 8,640,022 B2 | * | 1/2014 | Waldman .............. G06F 16/958 |
| | | | 715/210 |
| 8,682,973 B2 | * | 3/2014 | Kikin-Gil ............. H04L 67/131 |
| | | | 709/204 |
| 8,694,988 B2 | | 4/2014 | Goldman |
| 8,738,706 B1 | | 5/2014 | Grieve et al. |
| 8,745,515 B2 | | 6/2014 | Makela |
| 8,984,390 B2 | * | 3/2015 | Aymeloglu ........... G06F 40/166 |
| | | | 715/207 |
| 8,984,414 B2 | | 3/2015 | Stevens |
| 9,015,572 B2 | | 4/2015 | Lanza et al. |
| 9,026,897 B2 | | 5/2015 | Zarras |
| 9,037,959 B2 | | 5/2015 | Rapp et al. |
| 9,176,933 B2 | * | 11/2015 | Kotler ................. G06F 16/4393 |
| 9,189,480 B2 | | 11/2015 | Thiruvidan et al. |
| 9,201,854 B1 | | 12/2015 | Kloiber et al. |
| 9,256,341 B2 | | 2/2016 | Megiddo et al. |
| 9,285,977 B1 | | 3/2016 | Greenberg et al. |
| 9,286,271 B2 | * | 3/2016 | Khosrowshahi ........ G06F 21/10 |
| 9,292,482 B1 | | 3/2016 | Thiesen et al. |
| 9,310,981 B2 | | 4/2016 | Lynch et al. |
| 9,348,499 B2 | * | 5/2016 | Aymeloglu ........... G06F 3/0482 |
| 9,372,843 B2 | | 6/2016 | Numata |
| 9,424,333 B1 | | 8/2016 | Bisignani et al. |
| 9,436,927 B2 | * | 9/2016 | Saliba ................... G06Q 10/10 |
| 9,544,158 B2 | | 1/2017 | Kotler et al. |
| 9,558,171 B2 | | 1/2017 | Christoph et al. |
| 9,614,933 B2 | | 4/2017 | Jwalanna |
| 9,619,454 B2 | | 4/2017 | Wang et al. |
| 9,639,511 B2 | | 5/2017 | Hariharan et al. |
| 9,652,446 B2 | | 5/2017 | Creason et al. |
| 9,690,785 B1 | * | 6/2017 | Vagell ................... G06F 16/93 |
| 9,727,543 B2 | | 8/2017 | Kloiber et al. |
| 9,734,139 B2 | | 8/2017 | Reeves et al. |
| 9,747,270 B2 | | 8/2017 | Campbell et al. |
| 9,785,637 B2 | | 10/2017 | Ayyar et al. |
| 9,805,011 B2 | | 10/2017 | Fulton et al. |
| 9,805,134 B2 | | 10/2017 | Goldstein et al. |
| 9,864,736 B2 | | 1/2018 | Mihara |
| 9,898,520 B2 | * | 2/2018 | Hawa ................. H04L 67/1095 |
| 9,910,837 B2 | * | 3/2018 | Kumarasamy Mani .................... |
| | | | G06F 40/197 |

(56)                  References Cited

U.S. PATENT DOCUMENTS

| | | | |
|---|---|---|---|
| 9,928,241 B2 | 3/2018 | Frei et al. | |
| 9,933,931 B2 | 4/2018 | Svinth et al. | |
| 9,972,000 B2 | 5/2018 | Brown | |
| 10,031,905 B2 | 7/2018 | Fu et al. | |
| 10,033,774 B2* | 7/2018 | Kotler | H04L 67/54 |
| 10,051,020 B2* | 8/2018 | Keslin | G06F 40/166 |
| 10,088,990 B2 | 10/2018 | Lynch et al. | |
| 10,102,184 B1 | 10/2018 | Adamson | |
| 10,114,531 B2* | 10/2018 | Kotler | G06F 16/4393 |
| 10,133,716 B2* | 11/2018 | Konnola | G06Q 10/101 |
| 10,216,714 B2 | 2/2019 | Kraisler et al. | |
| 10,229,178 B2 | 3/2019 | Pasupathy et al. | |
| 10,249,068 B2 | 4/2019 | Brunn et al. | |
| 10,275,510 B2 | 4/2019 | Hawa et al. | |
| 10,296,575 B2 | 5/2019 | Theodore et al. | |
| 10,303,564 B1 | 5/2019 | Gupta et al. | |
| 10,366,114 B2* | 7/2019 | Bendig | G06F 16/252 |
| 10,394,942 B1* | 8/2019 | Young | G06F 40/169 |
| 10,462,004 B2* | 10/2019 | Hsiao | H04L 41/22 |
| 10,466,867 B2 | 11/2019 | Boucher et al. | |
| 10,466,868 B2 | 11/2019 | Boucher et al. | |
| 10,489,018 B2 | 11/2019 | Boucher et al. | |
| 10,491,658 B2* | 11/2019 | Hurwitz | H04L 67/06 |
| 10,503,822 B1* | 12/2019 | Spencer | G06F 40/197 |
| 10,521,135 B2 | 12/2019 | Kusters et al. | |
| 10,528,932 B2 | 1/2020 | Brown | |
| 10,540,419 B2 | 1/2020 | Goldstein et al. | |
| 10,552,234 B2* | 2/2020 | Chandra | G06Q 10/06 |
| 10,552,439 B2 | 2/2020 | Jiang et al. | |
| 10,565,298 B1 | 2/2020 | Bisignani et al. | |
| 10,599,526 B2 | 3/2020 | Milvaney et al. | |
| 10,614,263 B2 | 4/2020 | Mei | |
| 10,650,086 B1 | 5/2020 | Knudson et al. | |
| 10,719,485 B2 | 7/2020 | Bell et al. | |
| 10,732,825 B2 | 8/2020 | Campbell et al. | |
| 10,740,535 B2 | 8/2020 | Talati | |
| 10,747,952 B2* | 8/2020 | Aymeloglu | G06F 3/0484 |
| 10,769,365 B2 | 9/2020 | Fern et al. | |
| 10,877,633 B2 | 12/2020 | Boucher et al. | |
| 10,891,020 B2 | 1/2021 | Hart et al. | |
| 10,908,784 B2 | 2/2021 | Boucher et al. | |
| 10,915,700 B2 | 2/2021 | Theodore et al. | |
| 10,983,670 B2 | 4/2021 | Boucher et al. | |
| 11,010,064 B2 | 5/2021 | Kusters et al. | |
| 11,106,332 B2 | 8/2021 | Boucher et al. | |
| 11,115,486 B2 | 9/2021 | Jimenez Salgado et al. | |
| 11,188,353 B2 | 11/2021 | Byard et al. | |
| 11,281,732 B2 | 3/2022 | Rao | |
| 11,314,779 B1 | 4/2022 | Jain | |
| 11,349,848 B2 | 5/2022 | Reyna Fernandez | |
| 11,392,556 B1 | 7/2022 | Mann et al. | |
| 11,423,357 B2 | 8/2022 | Didrickson et al. | |
| 11,435,874 B2 | 9/2022 | Boucher et al. | |
| 11,514,037 B2 | 11/2022 | Kent et al. | |
| 11,514,129 B1 | 11/2022 | Pillsbury et al. | |
| 11,681,760 B2 | 6/2023 | Ben-Ishay et al. | |
| 11,726,635 B2 | 8/2023 | Boucher et al. | |
| 11,727,194 B2* | 8/2023 | Villaron | G06F 16/3331 |
| | | | 715/202 |
| 11,775,136 B2 | 10/2023 | Boucher et al. | |
| 11,836,817 B2 | 12/2023 | Hunn et al. | |
| 11,868,706 B1 | 1/2024 | Lu et al. | |
| 12,106,039 B2 | 10/2024 | Deneui et al. | |
| 12,288,024 B2 | 4/2025 | DeNeui et al. | |
| 2001/0016857 A1 | 8/2001 | Sorihashi | |
| 2002/0015064 A1 | 2/2002 | Robotham et al. | |
| 2003/0014421 A1 | 1/2003 | Jung | |
| 2003/0014442 A1 | 1/2003 | Shiigi et al. | |
| 2003/0225937 A1 | 12/2003 | Reiss et al. | |
| 2003/0226136 A1 | 12/2003 | Calahan | |
| 2004/0108943 A1 | 6/2004 | Aoyama | |
| 2004/0111675 A1 | 6/2004 | Mori et al. | |
| 2004/0148576 A1 | 7/2004 | Matveyenko et al. | |
| 2004/0210822 A1* | 10/2004 | Kotler | G06F 40/103 |
| | | | 715/227 |

| | | | |
|---|---|---|---|
| 2005/0034060 A1 | 2/2005 | Kotler et al. | |
| 2005/0044486 A1 | 2/2005 | Kotler et al. | |
| 2005/0044496 A1* | 2/2005 | Kotler | G06F 40/103 |
| | | | 715/267 |
| 2005/0044497 A1* | 2/2005 | Kotler | G06F 40/103 |
| | | | 715/267 |
| 2005/0049843 A1 | 3/2005 | Hewitt et al. | |
| 2005/0050088 A1* | 3/2005 | Kotler | G06F 40/177 |
| | | | 707/999.102 |
| 2005/0055626 A1 | 3/2005 | Kotler et al. | |
| 2005/0066265 A1 | 3/2005 | Kotler et al. | |
| 2005/0102308 A1 | 5/2005 | Sykes et al. | |
| 2005/0125377 A1 | 6/2005 | Kotler et al. | |
| 2005/0262194 A1 | 11/2005 | Mamou et al. | |
| 2006/0015804 A1 | 1/2006 | Barton et al. | |
| 2006/0036448 A1 | 2/2006 | Haynie et al. | |
| 2006/0069696 A1 | 3/2006 | Becker et al. | |
| 2006/0101321 A1* | 5/2006 | Friedrichowitz | G06Q 10/10 |
| | | | 715/255 |
| 2006/0101328 A1* | 5/2006 | Albornoz | G06Q 10/10 |
| | | | 715/764 |
| 2006/0117253 A1 | 6/2006 | Polash | |
| 2006/0129885 A1 | 6/2006 | Bozak et al. | |
| 2006/0235944 A1 | 10/2006 | Haslam | |
| 2006/0271574 A1 | 11/2006 | Villaron et al. | |
| 2006/0288267 A1 | 12/2006 | Despain | |
| 2007/0011211 A1 | 1/2007 | Reeves et al. | |
| 2007/0016850 A1 | 1/2007 | Chen et al. | |
| 2007/0028159 A1 | 2/2007 | Ying et al. | |
| 2007/0056045 A1 | 3/2007 | Collins et al. | |
| 2007/0219956 A1 | 9/2007 | Milton | |
| 2007/0220415 A1 | 9/2007 | Cheng et al. | |
| 2007/0233811 A1* | 10/2007 | Rochelle | G06F 40/103 |
| | | | 709/219 |
| 2007/0271502 A1* | 11/2007 | Bedi | G06F 40/186 |
| | | | 715/255 |
| 2007/0277109 A1 | 11/2007 | Chen et al. | |
| 2008/0046809 A1 | 2/2008 | Oshima et al. | |
| 2008/0148166 A1 | 6/2008 | Brunswig et al. | |
| 2008/0222510 A1 | 9/2008 | Nguyen et al. | |
| 2008/0229207 A1 | 9/2008 | Kataoka | |
| 2008/0235569 A1 | 9/2008 | Arun et al. | |
| 2008/0256113 A1* | 10/2008 | Rasmussen | G06F 40/123 |
| | | | 707/999.102 |
| 2008/0256114 A1* | 10/2008 | Rasmussen | G06F 40/123 |
| | | | 707/999.102 |
| 2008/0275910 A1 | 11/2008 | Molina-Moreno et al. | |
| 2008/0307000 A1* | 12/2008 | Paterson | G06F 11/1448 |
| 2009/0043851 A1* | 2/2009 | Weir | G06Q 10/107 |
| | | | 709/206 |
| 2009/0064030 A1 | 3/2009 | Grandhi | |
| 2009/0083614 A1 | 3/2009 | Wedekind | |
| 2009/0106310 A1 | 4/2009 | Lanza et al. | |
| 2009/0106642 A1* | 4/2009 | Albornoz | G06F 40/169 |
| | | | 715/230 |
| 2009/0119302 A1 | 5/2009 | Palmer et al. | |
| 2009/0192845 A1 | 7/2009 | Gudipaty et al. | |
| 2009/0235181 A1* | 9/2009 | Saliba | G06F 40/197 |
| | | | 715/753 |
| 2009/0259662 A1 | 10/2009 | Cragun et al. | |
| 2009/0319880 A1 | 12/2009 | Collie et al. | |
| 2010/0070531 A1* | 3/2010 | Aymeloglu | G06F 40/279 |
| | | | 707/E17.044 |
| 2010/0070842 A1* | 3/2010 | Aymeloglu | G06F 40/197 |
| | | | 715/255 |
| 2010/0070844 A1* | 3/2010 | Aymeloglu | G06F 40/279 |
| | | | 715/810 |
| 2010/0083079 A1 | 4/2010 | Rapp et al. | |
| 2010/0180233 A1 | 7/2010 | Kruzeniski et al. | |
| 2010/0235728 A1 | 9/2010 | Hasuike | |
| 2010/0250609 A1 | 9/2010 | Campbell et al. | |
| 2010/0257451 A1 | 10/2010 | Halevi et al. | |
| 2010/0318982 A1 | 12/2010 | Lumley et al. | |
| 2010/0325166 A1 | 12/2010 | Rubin et al. | |
| 2010/0332973 A1 | 12/2010 | Kloiber et al. | |
| 2011/0004820 A1 | 1/2011 | Kloiber et al. | |
| 2011/0066704 A1 | 3/2011 | Nakamura | |
| 2011/0093770 A1 | 4/2011 | Kamimura | |

(56) References Cited

U.S. PATENT DOCUMENTS

| | | | |
|---|---|---|---|
| 2011/0099187 A1 | 4/2011 | Hansen | |
| 2011/0202555 A1 | 8/2011 | Cordover et al. | |
| 2011/0246549 A1 | 10/2011 | Katzenberger et al. | |
| 2011/0276868 A1 | 11/2011 | Hoke et al. | |
| 2011/0289397 A1 | 11/2011 | Eastmond et al. | |
| 2011/0296507 A1 | 12/2011 | Khosrowshahi et al. | |
| 2012/0151317 A1 | 6/2012 | Ho et al. | |
| 2012/0151378 A1 | 6/2012 | Parish et al. | |
| 2012/0180002 A1 | 7/2012 | Campbell et al. | |
| 2012/0204250 A1 | 8/2012 | Anderson et al. | |
| 2012/0290926 A1 | 11/2012 | Kapadia et al. | |
| 2012/0317112 A1 | 12/2012 | Naito | |
| 2012/0330995 A1* | 12/2012 | Muenkel | G06F 40/18 |
| | | | 715/219 |
| 2013/0007648 A1 | 1/2013 | Gamon et al. | |
| 2013/0014000 A1 | 1/2013 | Popov et al. | |
| 2013/0050756 A1 | 2/2013 | Hosotsubo et al. | |
| 2013/0066869 A1 | 3/2013 | Kusaka et al. | |
| 2013/0091205 A1* | 4/2013 | Kotler | H04L 67/54 |
| | | | 709/204 |
| 2013/0091440 A1 | 4/2013 | Kotler et al. | |
| 2013/0097484 A1 | 4/2013 | Nakamura | |
| 2013/0097490 A1* | 4/2013 | Kotler | G06F 40/10 |
| | | | 715/255 |
| 2013/0103741 A1 | 4/2013 | Palop et al. | |
| 2013/0124700 A1 | 5/2013 | Miller et al. | |
| 2013/0125143 A1 | 5/2013 | Kikuchi et al. | |
| 2013/0145244 A1 | 6/2013 | Rothschiller et al. | |
| 2013/0151938 A1* | 6/2013 | Waldman | G06F 16/958 |
| | | | 715/210 |
| 2013/0151942 A1 | 6/2013 | Ouliankine et al. | |
| 2013/0179480 A1 | 7/2013 | Agarwal et al. | |
| 2013/0179764 A1 | 7/2013 | Battagin et al. | |
| 2013/0185252 A1* | 7/2013 | Palmucci | G06F 16/93 |
| | | | 707/608 |
| 2013/0198647 A1 | 8/2013 | Claux et al. | |
| 2013/0198733 A1 | 8/2013 | Farrell et al. | |
| 2013/0218845 A1* | 8/2013 | Kleppner | G06F 40/166 |
| | | | 707/687 |
| 2013/0232424 A1 | 9/2013 | Nakagoe et al. | |
| 2013/0263156 A1 | 10/2013 | Nakagawa et al. | |
| 2013/0268830 A1* | 10/2013 | Khosrowshahi | G06F 40/134 |
| | | | 715/205 |
| 2013/0290470 A1 | 10/2013 | Caradonna et al. | |
| 2014/0019852 A1 | 1/2014 | Numata | |
| 2014/0033232 A1 | 1/2014 | Walter et al. | |
| 2014/0075004 A1 | 3/2014 | Van Dusen et al. | |
| 2014/0075301 A1 | 3/2014 | Mihara | |
| 2014/0075408 A1 | 3/2014 | Korat | |
| 2014/0082470 A1 | 3/2014 | Trebas et al. | |
| 2014/0101122 A1 | 4/2014 | Oren | |
| 2014/0109012 A1* | 4/2014 | Choudhary | G06F 3/04817 |
| | | | 715/838 |
| 2014/0136943 A1 | 5/2014 | Palmer et al. | |
| 2014/0207867 A1* | 7/2014 | Kotler | H04L 65/4015 |
| | | | 709/204 |
| 2014/0214399 A1 | 7/2014 | Gulwani et al. | |
| 2014/0279876 A1 | 9/2014 | Prasanna et al. | |
| 2014/0279920 A1 | 9/2014 | Madhavarapu et al. | |
| 2014/0289601 A1 | 9/2014 | Wang et al. | |
| 2014/0331124 A1 | 11/2014 | Downs et al. | |
| 2014/0365555 A1 | 12/2014 | Jwalanna | |
| 2015/0019946 A1 | 1/2015 | Zarras | |
| 2015/0039387 A1 | 2/2015 | Akahoshi et al. | |
| 2015/0081727 A1 | 3/2015 | Zarras | |
| 2015/0113377 A1 | 4/2015 | Fu et al. | |
| 2015/0120656 A1 | 4/2015 | Ramnarayanan et al. | |
| 2015/0177919 A1 | 6/2015 | Lee et al. | |
| 2015/0193492 A1* | 7/2015 | Gunaratne | G06F 40/166 |
| | | | 709/205 |
| 2015/0193734 A1 | 7/2015 | Karve et al. | |
| 2015/0199316 A1 | 7/2015 | Cairns et al. | |
| 2015/0205770 A1 | 7/2015 | Shershevsky et al. | |
| 2015/0227533 A1 | 8/2015 | Goldstein et al. | |
| 2015/0234795 A1* | 8/2015 | Villaron | G06F 40/166 |
| | | | 715/202 |
| 2015/0269146 A1 | 9/2015 | Ayyar et al. | |
| 2015/0278330 A1* | 10/2015 | Hawa | G06F 16/275 |
| | | | 709/203 |
| 2015/0288747 A1 | 10/2015 | Olenick et al. | |
| 2015/0324437 A1 | 11/2015 | Jiang et al. | |
| 2015/0341212 A1* | 11/2015 | Hsiao | H04L 67/12 |
| | | | 715/735 |
| 2015/0370911 A1 | 12/2015 | Hanawa et al. | |
| 2015/0378742 A1 | 12/2015 | Harrington | |
| 2016/0054898 A1* | 2/2016 | Kotler | G06F 3/04842 |
| | | | 715/209 |
| 2016/0055139 A1 | 2/2016 | Creason et al. | |
| 2016/0063840 A1* | 3/2016 | Kumarasamy Mani | |
| | | | G06Q 10/10 |
| | | | 340/540 |
| 2016/0077694 A1* | 3/2016 | Christoph | G06F 16/9577 |
| | | | 715/227 |
| 2016/0092418 A1 | 3/2016 | Kraisler et al. | |
| 2016/0092422 A1 | 3/2016 | Maglieri et al. | |
| 2016/0147722 A1 | 5/2016 | Hariharan et al. | |
| 2016/0148180 A1 | 5/2016 | Brown | |
| 2016/0210181 A1 | 7/2016 | Kikuchi et al. | |
| 2016/0246458 A1 | 8/2016 | Hart et al. | |
| 2016/0320945 A1 | 11/2016 | Brunn et al. | |
| 2016/0357787 A1 | 12/2016 | Kolata et al. | |
| 2016/0378326 A1 | 12/2016 | Svinth et al. | |
| 2016/0378734 A1 | 12/2016 | Mullins et al. | |
| 2016/0381099 A1* | 12/2016 | Keslin | G06Q 10/101 |
| | | | 709/205 |
| 2017/0052931 A1 | 2/2017 | Yount et al. | |
| 2017/0054736 A1 | 2/2017 | Krishnamurthy | |
| 2017/0060945 A1 | 3/2017 | Bastide et al. | |
| 2017/0061360 A1 | 3/2017 | Rucker et al. | |
| 2017/0124055 A1 | 5/2017 | Radakovitz et al. | |
| 2017/0124167 A1 | 5/2017 | Pasupathy et al. | |
| 2017/0139893 A1 | 5/2017 | Rucker et al. | |
| 2017/0139927 A1* | 5/2017 | Bendig | G06F 16/176 |
| 2017/0140047 A1* | 5/2017 | Bendig | G06F 16/252 |
| 2017/0168878 A1* | 6/2017 | Chandra | G06Q 10/103 |
| 2017/0185574 A1 | 6/2017 | Fern et al. | |
| 2017/0185592 A1* | 6/2017 | Frei | H04N 21/84 |
| 2017/0192945 A1 | 7/2017 | Fulton et al. | |
| 2017/0199789 A1 | 7/2017 | Milvaney et al. | |
| 2017/0200122 A1 | 7/2017 | Edson et al. | |
| 2017/0220543 A1 | 8/2017 | Canton et al. | |
| 2017/0220546 A1* | 8/2017 | Codrington | G06F 16/2282 |
| 2017/0287090 A1 | 10/2017 | Hunn et al. | |
| 2017/0300222 A1 | 10/2017 | Campbell et al. | |
| 2017/0315683 A1 | 11/2017 | Boucher et al. | |
| 2017/0315967 A1 | 11/2017 | Boucher et al. | |
| 2017/0315968 A1 | 11/2017 | Boucher et al. | |
| 2017/0315978 A1 | 11/2017 | Boucher et al. | |
| 2017/0315979 A1 | 11/2017 | Boucher et al. | |
| 2017/0337194 A1* | 11/2017 | Gilchrist | G06F 40/106 |
| 2017/0344227 A1 | 11/2017 | Stoicov et al. | |
| 2017/0357646 A1 | 12/2017 | Ayyar et al. | |
| 2017/0358051 A1 | 12/2017 | Heynen et al. | |
| 2018/0025013 A1 | 1/2018 | Goldstein et al. | |
| 2018/0025084 A1* | 1/2018 | Conlan | G06F 16/24578 |
| | | | 707/734 |
| 2018/0129642 A1 | 5/2018 | Rucker et al. | |
| 2018/0144039 A1 | 5/2018 | Hawa et al. | |
| 2018/0165254 A1 | 6/2018 | Talati | |
| 2018/0174255 A1 | 6/2018 | Hunn et al. | |
| 2018/0181552 A1* | 6/2018 | Konnola | G06F 16/93 |
| 2018/0191805 A1* | 7/2018 | Hurwitz | H04L 67/06 |
| 2018/0197162 A1 | 7/2018 | Brown | |
| 2018/0232165 A1 | 8/2018 | Kusters et al. | |
| 2018/0232308 A1 | 8/2018 | Kusters et al. | |
| 2018/0260377 A1 | 9/2018 | Theodore et al. | |
| 2018/0260378 A1 | 9/2018 | Theodore et al. | |
| 2018/0276189 A1 | 9/2018 | Bache et al. | |
| 2018/0276269 A1 | 9/2018 | Rasscevskis et al. | |
| 2018/0288192 A1 | 10/2018 | Kent et al. | |
| 2018/0321889 A1 | 11/2018 | Harris et al. | |
| 2018/0349333 A1 | 12/2018 | Mei | |

(56) References Cited

U.S. PATENT DOCUMENTS

| | | |
|---|---|---|
| 2018/0375788 A1 | 12/2018 | Ionita et al. |
| 2019/0102386 A1 | 4/2019 | Bell et al. |
| 2019/0188278 A1 | 6/2019 | Liszka et al. |
| 2019/0363929 A1 | 11/2019 | Andreoli et al. |
| 2019/0392006 A1 | 12/2019 | Horowitz et al. |
| 2020/0019414 A1 | 1/2020 | Byard et al. |
| 2020/0042143 A1 | 2/2020 | Boucher et al. |
| 2020/0053176 A1 | 2/2020 | Jimenez Salgado et al. |
| 2020/0073518 A1 | 3/2020 | Boucher et al. |
| 2020/0081586 A1 | 3/2020 | Boucher et al. |
| 2020/0228534 A1 | 7/2020 | Chen et al. |
| 2020/0250316 A1 | 8/2020 | Rickerd et al. |
| 2020/0265040 A1 | 8/2020 | Jung et al. |
| 2020/0334034 A1 | 10/2020 | Bestfleisch |
| 2021/0103437 A1 | 4/2021 | Kim et al. |
| 2021/0149656 A1 | 5/2021 | Tung et al. |
| 2021/0263658 A1 | 8/2021 | Kusters et al. |
| 2021/0286479 A1 | 9/2021 | Boucher et al. |
| 2021/0294599 A1 | 9/2021 | Fitzpatrick |
| 2021/0311595 A1 | 10/2021 | Boucher et al. |
| 2021/0400093 A1 | 12/2021 | Ashkenazi et al. |
| 2021/0409416 A1 | 12/2021 | Reyna Fernandez |
| 2022/0036311 A1 | 2/2022 | Didrickson et al. |
| 2022/0222625 A1* | 7/2022 | Haramati ............ G06F 21/6218 |
| 2022/0247784 A1 | 8/2022 | Satish et al. |
| 2022/0253404 A1 | 8/2022 | Wang et al. |
| 2022/0269805 A1 | 8/2022 | Moschella |
| 2022/0269851 A1 | 8/2022 | Deneui et al. |
| 2023/0274080 A1 | 8/2023 | Deneui et al. |
| 2023/0297768 A1 | 9/2023 | Deneui et al. |
| 2023/0342003 A1 | 10/2023 | Boucher et al. |
| 2023/0342166 A1 | 10/2023 | Deneui et al. |
| 2024/0053865 A1 | 2/2024 | Boucher et al. |

OTHER PUBLICATIONS

"Overview of Excel Tables", Microsoft, https://support.office.com/en-us/article/overview-of-excel-tables-7ab0bb7d-3a9e-4b56-a3c9-6c94334e492c, accessed May 25, 2018, 6 pages.
"Structured References", Author/Publisher: Microsoft Excel, Date: 2010-2018, 2010-2018, pp. 1-4.
17790487.7 , "European Application Serial No. 17790487.7, Extended European Search Report mailed Nov. 29, 2019", 11 pages.
Anonymous , "Minimize date entry errors by using a calendar drop down list", Retrieved from the Internet: URL: https://www.sageintelligence.com/tipsand-tricks/excel-tips-tricks/2013/10/minimize-date-entry-errorusingcalendar-drop-ist/ [retrieved on Nov. 20, 2019], Oct. 17, 2013, 6 pages.
Frandsen, Torben Lage, "Microsoft Office Excel", Author: Torben Lage Frandsen, Date: 2010, http://web.mef.hr/web/images/pdf/ms_o_exc.pdf. (Year: 2010), 2010, pp. 1-135.
PCT/US2017/029983 , "Application Serial No. PCT/US2017/029983, International Search Report and the Written Opinion mailed Sep. 6, 2017", 17 pages.
PCT/US2017/029983 , "International Application Serial No. PCT/US2017/029983, International Preliminary Report on Patentability and Written Opinion mailed Nov. 8, 2018", Coda Project, Inc., 10 Pages.
Wyatt, Allen , "Modifying Default Year for Dates", Retrieved from the Internet: URL:https://web.archive.org/web/20151217124547/https://excel.tips.net/T003360_Modifying_Default_Year_for_Dates. html [retrieved on Nov. 20, 2019], May 26, 2015, 5 pages.
Wyatt, Allen , "Setting a Default Date Format", Retrieved from the Inlemet: URL:https://excelribbon.tips.net TO11575_Setting_a_Default_Date_Format.html [retrieved on Nov. 20, 2019], Oct. 24, 2015, 4 pages.
U.S. Appl. No. 16/953,664, filed Nov. 20, 2020, Pending, Melissa Ming-Sak Boucher.
Anonymous , "Excel 2010: Filtering Data", XP093044661, Retrieved from the Internet: URL:https://edu.gcfglobal.org/en/excel2010/filtering-data/1/[retrieved on May 5, 2023], Sep. 15, 2010, 10 pages.

Fuller, David A., et al., "The design of an object-oriented collaborative spreadsheet with version control and history management", SAC '93: Proceedings of the 1993 ACM/SIGAPP symposium on Applied computing: states of the art and practice, 1993, pp. 416-423.
Microsoft Support , "Set rounding precision", https://support.microsoft.com/en-us/office/Set-rounding-precision-e5d707e3-07a8-4df2-810c-218c531eb06a, 2021, 3 pages.
Oppenheimer, Diego , "Microsoft Support Understanding Floating Point Precision, aka "Why does Excel Give Me Seemingly Wrong Answers?"", https://www.microsoft.com/en-us/microsoft-365/blog/2008/04/10/ understanding-floating-point-precision-aka-why-does-excel-give-me seemingly-wrong-answers/, 2021, 7 pages.
O'reilly, Dennis , "Your options for placing Excel data in Word", XP055834888, Retrieved from the Internet: URL: https://www.cnet.com/tech/services-and-software/your-optionsfor-placing-excel-data-in-word/ [retrieved on Aug. 25, 2021], Feb. 14, 2008, 7 pages.
PCT/US2022/017576 , "International Application Serial No. PCT/US2022/017576, International Preliminary Report on Patentability mailed Sep. 7, 2023", Coda Project, Inc., 13 pages.
PCT/US2022/017576 , "International Application Serial No. PCT/US2022/017576, International Search Report and Written Opinion mailed Aug. 2, 2022", Coda Project, Inc., 20 pages.
PCT/US2022/017576 , "International Application Serial No. PCT/US2022/017576, Invitation to Pay Additional Fees and, Where Applicable, Protest Fee mailed Jun. 3, 2022", Coda Project, Inc., 2 pages.
U.S. Appl. No. 18/212,914, filed Jun. 22, 2023, Pending, Melissa Ming-Sak Boucher et al.
videostudio.com , et al., "User Guide, Basic Editing, Extension Marketplace, Version control", https://web.archive.org/web/20200902093330/https://code.visualstudio.com/docs/editor, extracted Dec. 1, 2023, Sep. 2, 2020, 41 pages.
www.keepproductive.com , et al., "Coda in 45 minutes", https://www.youtube.com/watch?v=1ysOKRKnqkE, Aug. 13, 2019, 19 pages.
"European Application Serial No. 22760357.8, Extended European Search Report mailed Nov. 14, 2024", Coda Project, Inc., 12 pages.
"European Application Serial No. 24172839.3, Extended European Search Report mailed Oct. 22, 2024", Coda Project, Inc., 10 pages.
Anonymous, "Changing the File Path to a Data Connection in Excel", Retrieved from the Internet: URL:https://busfin.colostate.edu/Forms/Fss/Excel -Changing_the_File_Path_to_a_Data_Connection.pdf, May 8, 2015, 4 pages.
Advisory Action for U.S. Appl. No. 15/499,892, dated Jan. 21, 2020, 3 Pages.
Advisory Action for U.S. Appl. No. 18/212,914, mailed Oct. 9, 2025, 4 pages.
Final Office Action for U.S. Appl. No. 15/499,882, mailed Jan. 6, 2022, 26 Pages.
Final Office Action for U.S. Appl. No. 15/499,882, mailed Aug. 14, 2020, 16 Pages.
Final Office Action for U.S. Appl. No. 15/499,888, mailed Oct. 2, 2018, 72 Pages.
Final Office Action for U.S. Appl. No. 15/499,892, mailed Jul. 25, 2019, 25 Pages.
Final Office Action for U.S. Appl. No. 17/202,924, mailed Sep. 27, 2022, 19 Pages.
Final Office Action for U.S. Appl. No. 17/679,006, mailed Dec. 7, 2023, 17 Pages.
Final Office Action for U.S. Appl. No. 18/212,914, mailed Jul. 24, 2025, 25 Pages.
Final Office Action for U.S. Appl. No. 18/216,045, mailed Oct. 3, 2025, 29 Pages.
Non-Final Office Action for U.S. Appl. No. 15/499,875, mailed Aug. 31, 2018, 37 Pages.
Non-Final Office Action for U.S. Appl. No. 15/499,882, mailed Apr. 2, 2021, 18 Pages.
Non-Final Office Action for U.S. Appl. No. 15/499,882, mailed Jan. 2, 2020, 16 Pages.
Non-Final Office Action for U.S. Appl. No. 15/499,882, mailed Sep. 15, 2022, 26 Pages.

(56)     References Cited

OTHER PUBLICATIONS

Non-Final Office Action for U.S. Appl. No. 15/499,887, mailed Sep. 27, 2018, 110 Pages.
Non-Final Office Action for U.S. Appl. No. 15/499,888, mailed Feb. 27, 2018, 56 Pages.
Non-Final Office Action for U.S. Appl. No. 15/499,892, mailed Oct. 15, 2018, 22 Pages.
Non-Final Office Action for U.S. Appl. No. 15/499,892, mailed Apr. 27, 2020, 29 Pages.
Non-Final Office Action for U.S. Appl. No. 16/570,779, mailed Aug. 19, 2020, 39 Pages.
Non-Final Office Action for U.S. Appl. No. 17/202,924, mailed Dec. 22, 2021, 17 Pages.
Non-Final Office Action for U.S. Appl. No. 17/679,006, mailed Jun. 6, 2023, 12 Pages.
Non-Final Office Action for U.S. Appl. No. 18/195, 109, mailed Jul. 18, 2024, 30 Pages.
Non-Final Office Action for U.S. Appl. No. 18/195,125, mailed Jul. 29, 2024, 20 Pages.
Non-Final Office Action for U.S. Appl. No. 18/212,914, mailed Sep. 30, 2024, 19 Pages.
Non-Final Office Action for U.S. Appl. No. 18/216,045, mailed Feb. 21, 2025, 26 Pages.
Non-Final Office Action for U.S. Appl. No. 18/216,069, mailed Oct. 1, 2025, 21 Pages.
Notice of Allowance for U.S. Appl. No. 15/499,875, mailed Jun. 12, 2019, 8 Pages.
Notice of Allowance for U.S. Appl. No. 15/499,882, mailed Jun. 6, 2023, 2 Pages.
Notice of Allowance for U.S. Appl. No. 15/499,882, mailed Jun. 16, 2023, 2 Pages.
Notice of Allowance for U.S. Appl. No. 15/499,882, mailed May 25, 2023, 25 Pages.
Notice of Allowance for U.S. Appl. No. 15/499,887, mailed Jun. 13, 2019, 12 Pages.
Notice of Allowance for U.S. Appl. No. 15/499,888, mailed Jul. 12, 2019, 13 Pages.
Notice of Allowance for U.S. Appl. No. 15/499,892, mailed Dec. 16, 2020, 25 Pages.
Notice of Allowance for U.S. Appl. No. 16/568,000, mailed Aug. 20, 2020, 09 Pages.
Notice of Allowance for U.S. Appl. No. 16/570,779, mailed Apr. 22, 2021, 9 Pages.
Notice of Allowance for U.S. Appl. No. 16/597,278, mailed Sep. 21, 2020, 11 Pages.
Notice of Allowance for U.S. Appl. No. 16/953,664, mailed Apr. 19, 2022, 12 Pages.
Notice of Allowance for U.S. Appl. No. 17/202,924, mailed Mar. 23, 2023, 9 Pages.
Notice of Allowance for U.S. Appl. No. 17/679,006, mailed May 30, 2024, 7 Pages.
Notice of Allowance for U.S. Appl. No. 18/195, 109, mailed Dec. 20, 2024, 8 Pages.
Notice of Allowance for U.S. Appl. No. 18/195, 125, mailed Feb. 27, 2025, 9 Pages.
Restriction Requirement for U.S. Appl. No. 15/499,882, mailed Jun. 14, 2019, 07 Pages.
Restriction Requirement for U.S. Appl. No. 18/216,069, mailed Mar. 11, 2025, 10 Pages.

* cited by examiner

200

600

700

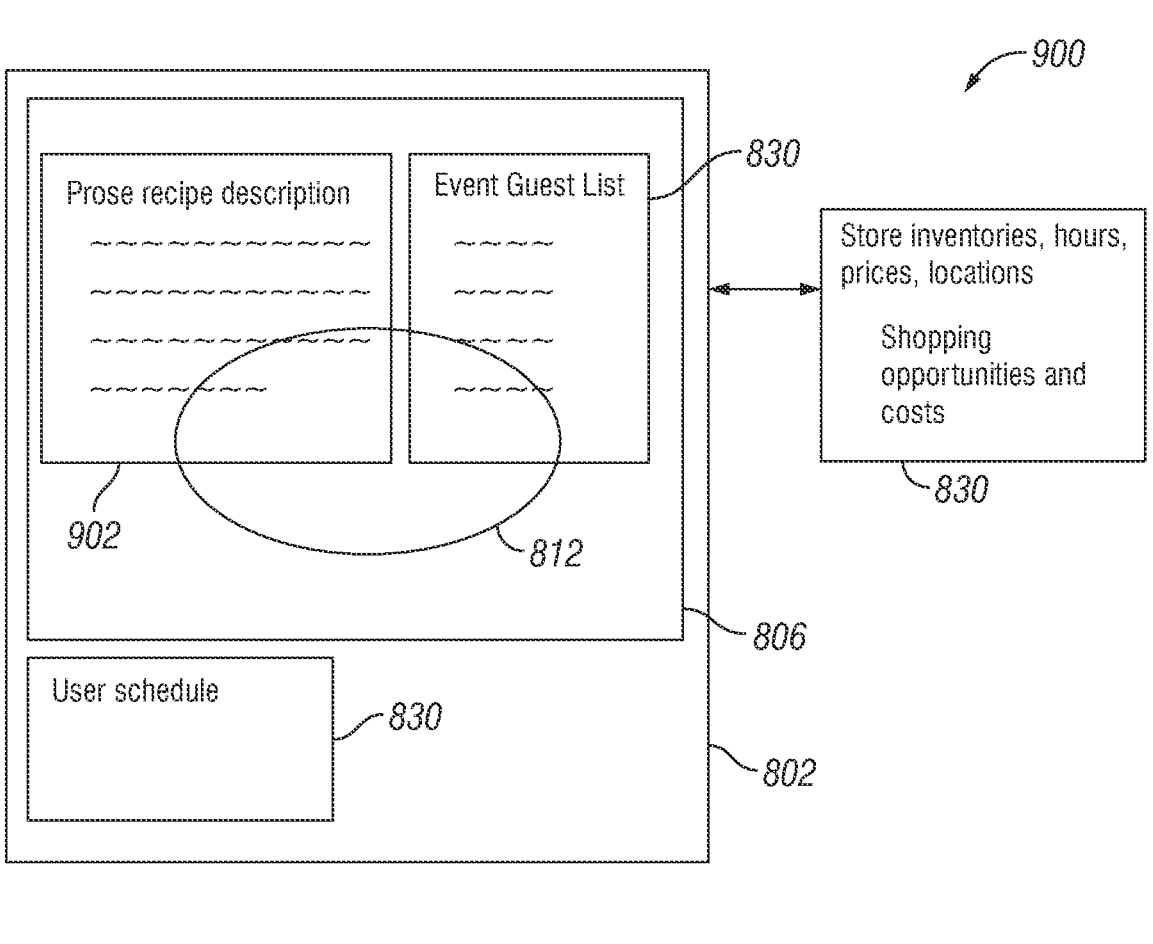
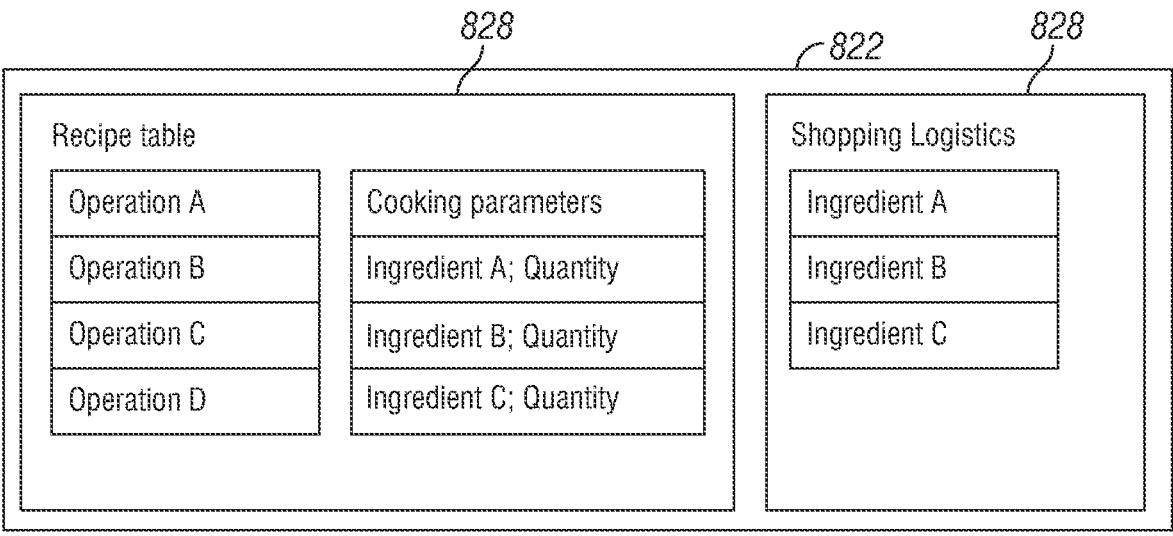
FIG. 9

1000

1700

1800

2618

2702

| Col1 | Col2 | Col3 | Col4 | Col5 |
|------|------|------|------|------|
| A | K | U | 5 | 15 |
| B | L | V | 6 | 16 |
| C | M | W | 7 | 17 |
| D | N | X | 8 | 18 |
| E | O | Y | 9 | 19 |
| F | P | Z | 10 | 20 |
| G | Q | 1 | 11 | 21 |

2706

2704

| Col1 | Col2 | Col3 | Col4 | Col5 |
|------|------|------|------|------|
| A | K | U | 5 | 15 |
| B | L | V | 6 | 16 |
| C | M | W | 7 | 17 |
| D | N | X | 8 | 18 |
| E | O | Y | 9 | 19 |
| F | P | Z | 10 | 20 |
| G | Q | 1 | 11 | 21 |

| Col1 | Col2 | Col3 | Col4 | Col5 |
|------|------|------|------|------|
| A | K | U | 5 | 15 |
| B | L | V | 6 | 16 |
| C | M | W | 7 | 17 |
| D | N | X | 8 | 18 |
| E | O | Y | 9 | 19 |
| F | P | Z | 10 | 20 |
| G | Q | 1 | 11 | 21 |

_2706_     _2704_

| Col1 | Col2 | Col5 |
|------|------|------|
| A | K | 15 |
| B | L | 16 |
| C | M | 17 |
| D | N | 18 |
| E | O | 19 |
| F | P | 20 |
| G | Q | 21 |

| Col1 | Col2 | Col3 | Col4 | Col5 |
|------|------|------|------|------|
| A | K | U | 5 | 15 |
| B | L | V | 6 | 16 |
| C | M | W | 7 | 17 |
| D | N | X | 8 | 26 |
| E | O | Y | 9 | 19 |
| F | P | Z | 10 | 20 |
| G | Q | 1 | 11 | 21 |

2806

2706     2704

| Col1 | Col2 | Col5 |
|------|------|------|
| A | K | 15 |
| B | L | 16 |
| C | M | 17 |
| D | N | 26 |
| E | O | 19 |
| F | P | 20 |
| G | Q | 21 |

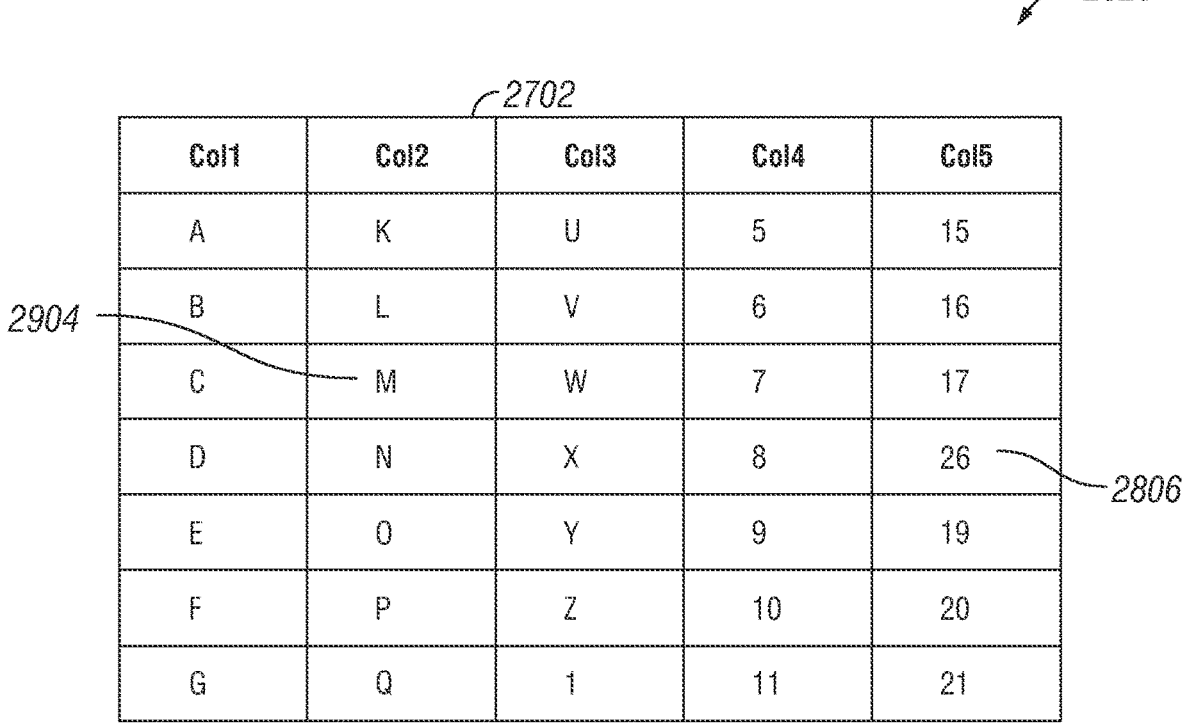
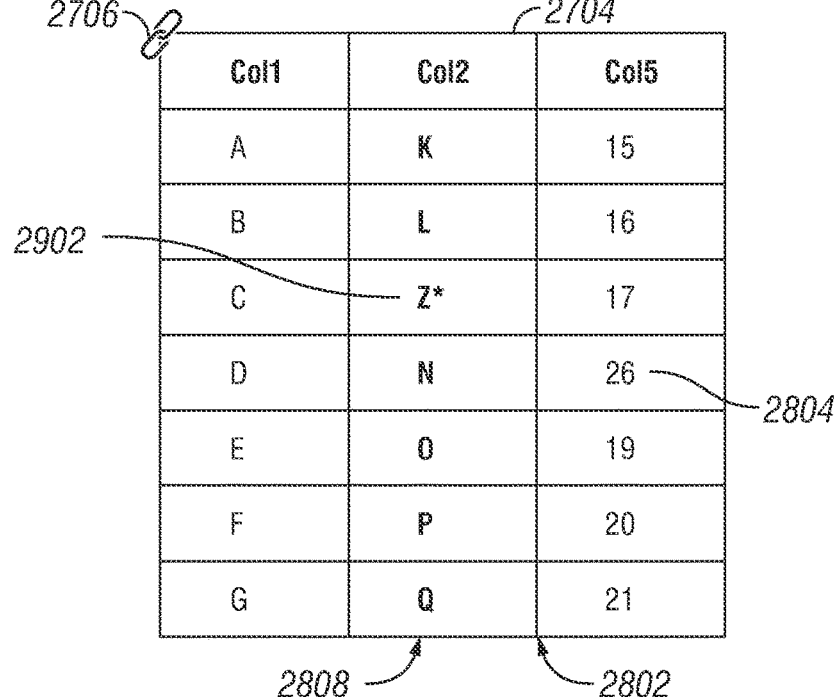
FIG. 30

3500

3900

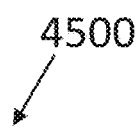
4500
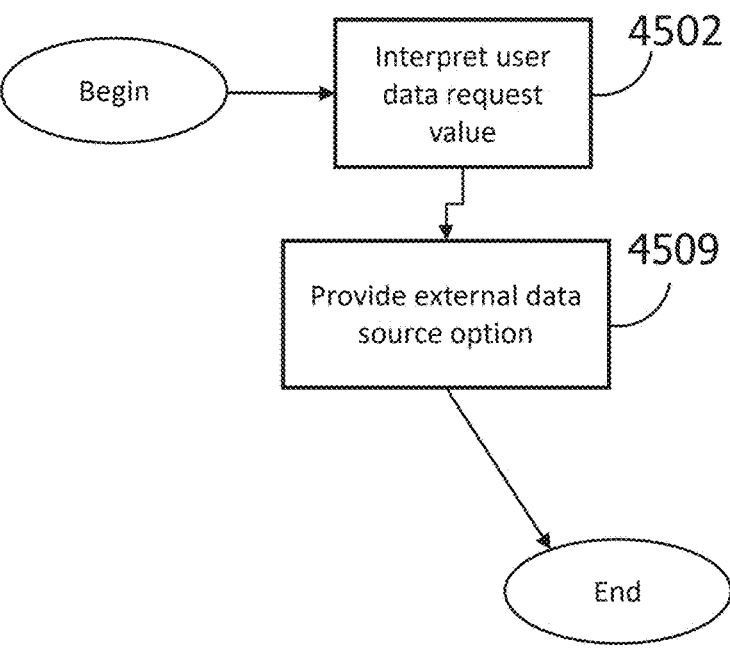
FIG. 45

5004

5000

Sheet1 = thisSheet

| Student | Quiz1 | Quiz2 | Test1 | Quiz3 |
|---------|-------|-------|-------|-------|
|         |       |       |       |       |
|         |       |       |       |       |
|         |       |       |       |       |
|         |       |       |       |       |

5002

5006

5008

ThisRow.Quiz2 + thisSheet.PreviousGrade

5202

Filter          *f*

Orders

| Road Runner | | | |
|---|---|---|---|
| Item: | Qty | Price | Total |
| Bird Seed | 5 | 10 | 50 |

| Wile E. Coyote | | | |
|---|---|---|---|
| Item: | Qty | Price | Total |
| Artifical Rock | 2 | 15 | 30 |
| Cement | 2 | 40 | 80 |
| Elephant Bulle. | 2 | 35 | 70 |
| Giant Rubber B. | 5 | 15 | 75 |
| Railroad ties | 4 | 20 | 80 |
| Anvil | 3 | 25 | 75 |
| X-Rays | 1 | 20 | 20 |
| Atom Re-arran. | 1 | 55 | 55 |
| Straight 8 Car | 1 | 75 | 75 |
| Hen Grenade | 1 | 10 | 10 |

5204

| Delivered | |
|---|---|
| In progress | Bird Seed  3  10  30 |
| New Order | Bird Seed  4  10  40 |

5302

5400

5500

5600

5602

Begin

Interpret a user
entry value

5604

Determine at least
one candidate entry

5610

Provide candidate entry(ies)
to the user

5612

Provide a preview of one or
more candidate entries

5606

Provide an autocompleted entry in
response to a user selection from the
candidate entry(ies)

End

5900

Begin

Interpret a user external data
reference value, display
location selection value
5902

Access external
data source
5904

Access external data
source configuration
value
5906

5910
Perform a display
enrichment operation

5912
Provide an enriched
display value

5914
Interpret user data
edit operation

5916
Update external
data source

End

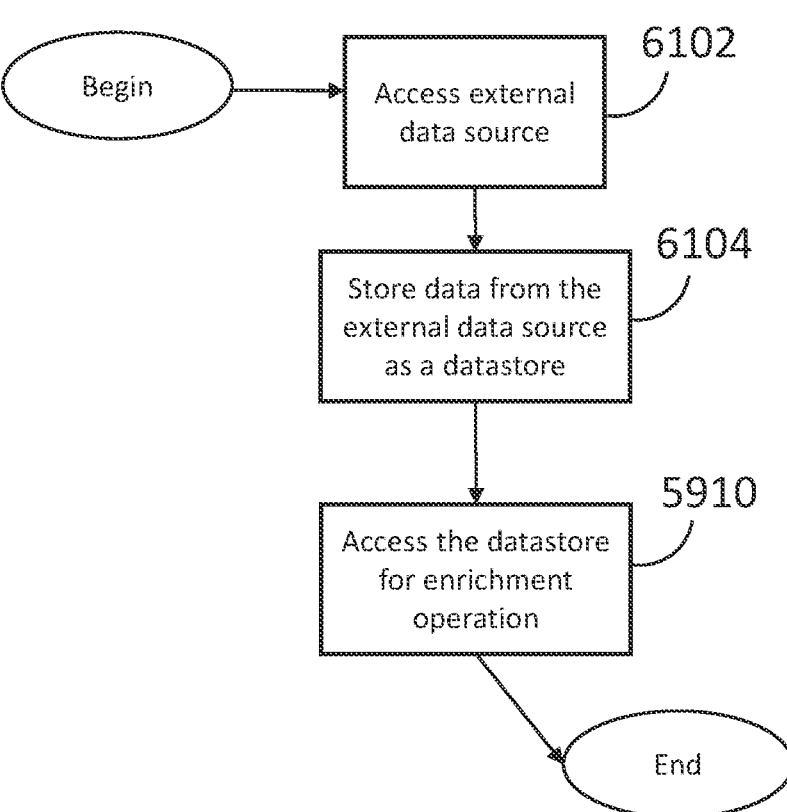
FIG. 61

| Value | Invalidated value |
|---|---|
| Data Value A | Formula A; Data Value B; Formula B; Data Value C; Data value D |
| Formula A | Data Value B; Formula B; Data Value C; Data Value D |
| Data Value B | Formula B; Data Value C; Data Value D |
| Formula B | Data Value C |
| Data Value C | Null |
| Data Value D | Null |

_6606_

| Value | Invalidated Value |
| --- | --- |
| Data Value A | Formula A; Data value D |
| Formula A | Data Value B |
| Data Value B | Formula B; Data value D |
| Formula B | Data Value C |
| Data Value C | Null |
| Data Value D | Null |

_6606_

| Value | Invalidated Value |
| --- | --- |
| Data Value A | Formula A |
| Formula A | Data Value B |
| Data Value B | Formula B; Data value D |
| Formula B | Data Value C |
| Data Value C | Null |
| Data Value D | Null |

Formulas

7002

| □T Type | T Name | T Arguments | T Description |
|---|---|---|---|
| ⌄Date | NOW | NOW() | Returns the current date and time as a date value |
| | TODAY | TODAY() | Returns the current date and time as a date value (rounded to midnight) |
| ⌄info | ISTEXT | ISTEXT(value) | Checks whether a value is text |
| | ISNUMBER | ISNUMBER(value) | Checks whether a value is a number |
| | ISNONTEXT | ISNONTEXT(value) | Checks whether a value is non-textual |
| | ISLOGICAL | ISLOGICAL(value) | Checks whether a value is 'TRUE' or 'FALSE' |
| | ISBLANK | ISBLANK(value) | Checks whether the referenced cell is empty |
| ⌄Logical | TRUE | TRUE() | Returns the logical value 'TRUE' |
| | AND | AND(logical_expression1, logical_expressi... | Returns true if all of the provided arguments are logically true, and false if any of the provided arguments are logically false |
| | OR | OR(logical_expression1, logical_expressi... | Returns true if any of the provided arguments are logically true, and false if all of the provided arguments are logically false |
| | NOT | NOT(logical_expression) | Returns the opposite of a logical value - 'NOT(TRUE)' returns 'FALSE'; 'NOT(FALSE)' returns 'TRUE' |
| | IF | IF(logical_expression, value_if_true, valu... | Returns one value if a logical expression is 'TRUE' and another if it is 'FALSE' |
| | FALSE | FALSE() | Returns the logical value 'FALSE' |
| ⌄Math | SUM | SUM(value1, value2) | Returns the sum of a series of numbers and/or cells |
| | SIGN | SIGN(value) | Given an input number, returns '-1' if it is negative, '1' if positive, and '0' if it is zero |
| | ROUNDUP | ROUNDUP(value,places) | Rounds a number to a certain number of decimal places, always rounding up to the next valid increment |
| | ROUNDDOWN | ROUNDDOWN(value, places) | Rounds a number to a certain number of decimal places, always rounding down to the next valid increment |
| | ROUND | ROUND(value,places) | Rounds a number to a certain number of decimal places according to standard rules |
| | RANDBETWEEN | RANDBETWEEN(low, high) | Returns a uniformly random integer between two values, inclusive |
| | RAND | RAND() | Returns a random number between 0 inclusive and 1 exclusive |
| | PRODUCT | PRODUCT(factor1, factor2) | Returns the result of multiplying a series of numbers together |
| | ODD | ODD(value) | Rounds a number up to the nearest odd integer |
| | ISODD | ISODD(value) | Checks whether the provided value is odd |
| | ISEVEN | ISEVEN(value) | Checks whether the provided value is even |
| | INT | INT(value) | Rounds a number down to the nearest integer that is less than or equal to it |
| | EVEN | EVEN(value) | Rounds a number upto the nearest even integer |
| | COUNTUNIQUE | COUNTUNIQUE(value1, value2) | Counts the number of unique values in a list of specified values and ranges |
| | COUNTBLANK | COUNTBLANK(range) | Returns the number of empty cells in a given range |
| | ABS | ABS(value) | Returns the absolute value of a number |

Formulas

*— 7002*

| ☐ T Type | T Name | T Arguments | T Description |
|---|---|---|---|
| ∨ Math | SQRTPI | SQRTPI(value) | Returns the positive square root of the product of Pi and given positive number |
| | SQRT | SQRT(value) | Returns the positive square root of a positive number |
| | QUOTIENT | QUOTIENT(dividend, divisor) | Returns one number divided by another |
| | MROUND | MROUND(value, factor) | Returns one number to the nearest integer multiple of another |
| | MOD | MOD(divident, divisor) | Returns the result of the modulo operator, the remainder after a division operation |
| | LOG10 | LOG10(value) | Returns the logarithm of a number, base 10 |
| | LOG | LOG(value, base) | Returns the logarithm of a number given a base |
| | FLOOR | FLOOR(value, factor) | Rounds a number down to the nearest integer multiple of specified significance |
| | CEILING | CEILING(value, factor) | Rounds a number up to the nearest integer multiple of specified significance |
| ∨ Operator | CONCAT | CONCAT(value1, value2) | Returns the concatenation of two values. Equivalent to the '&' operator |
| ∨ Parser | TO_TEXT | TO_TEXT(value) | Converts a provided numeric value to a text value |
| ∨ Statistical | MODE | MODE(value1, value2) | Returns the most commonly occurring value in a dataset |
| | MIN | MIN(value1, value2) | Returns the minimum value in a numeric dataset |
| | MEDIAN | MEDIAN(value1, value2) | Returns the median value in a numeric dataset |
| | MAX | MAX(value1, value2) | Returns the maximum value in a numeric dataset |
| | COUNTA | COUNTA(value1, value2) | Returns the a count of the number of values in a dataset |
| | COUNT | COUNT(value1, value2) | Returns the a count of the number of numeric values in a dataset |
| | AVERAGE | AVERAGE(value1, value2) | Returns the numerical average value in a dataset ignoring text |
| | RANK | RANK(value, data, is_ascending) | Returns the rank of a specified value in a dataset |
| | QUARTILE | QUARTILE(data, quartile_number) | Returns a value nearest to a specified quartile of a dataset |
| | PERCENTRANK | PERCENTRANK(data, value, [significant_d... | Returns the percentage rank (percentile) of a specified value in a dataset |
| | PERCENTILE | PERCENTILE(data, percentile) | Returns the value at a given percentile of a dataset |

Formulas

| ☐T Type | T Name | T Arguments | T Description |
|---------|--------|-------------|---------------|
| ⌄Text | UPPER | UPPER(text) | Converts a specified string to uppercase |
| | TRIM | TRIM(text) | Removes leading and trailing spaces in a specified string |
| | SUBSTITUTE | SUBSTITUTE (text_to_search_for,... | Replaces existing text with new text in a string |
| | SPLIT | SPLIT(text, delimiter, split_by_each) | Divides text around a specified character or string, and puts each fragment into a separate cell in the row |
| | RIGHT | RIGHT(string, number_of_characters) | Returns a substring from the end of a specified string |
| | REGEXREPLACE | REGEXREPLACE(text, regular_expression,... | Replaces part of a text string with a different textstring using regular expressions |
| | REGEXMATCH | REGEXMATCH(text, regular_expression) | Whether a piece of text matches a regular expression |
| | REGEXEXTRAC... | REGEXEXTRACT(text, regular_expression) | Extracts matching substrings according to a regular expression |
| | MID | MID(string, starting_at, extract_length) | Returns a segment of a string |
| | LOWER | LOWER(text) | Converts a specified string to lowercase |
| | LEN | LEN(text) | Returns the length of a string |
| | LEFT | LEFT(string, number_of_characters) | Returns a substring from the beginning of a specified string |
| | JOIN | JOIN(delimiter, value_or_array1, value_or... | Concatenates the elements of one or more one-dimensional arrays using a specified delimiter |
| | FIND | FIND(search_for, text_to_search, starting... | Returns the position at which a string is first found within text |
| | CHAR | CHAR(table_number) | Convert a number into a character according to the current Unicode table |
| | CONCATENATE | CONCATENATE(string1, string2) | Appends strings to one another |
| | REPT | REPT(text_to_repeat, number_of_repetit... | Returns specified text repeated a number of times |
| | REPLACE | REPLACE(text, position, length, new_text) | Replaces part of a text string with a different text string |
| ⌄Misc | FILTER | FILTER(logical_expression) | Returns a table with the rows that match the logical expression |
| | MODIFIED | MODIFIED(object) | Returns a date for the last time the data for the provided object was updated |
| | CREATED | CREATED(object) | Returns a date for the time the provided object was created |
| | _CURRENTUS... | _CURRENTUSEREMAIL() | Returns a string with the email address for the current logged-in user viewing the doc |

| Value | Type | Parent | Operation |
|-------|------|--------|-----------|
| Pgph4 | Paragraph | Canvas1 | Insert "Four score and seven..." |
| Pgph4 | Paragraph | Canvas1 | Insert Heading1 "Speech quotes" |
| Pgph4 | Paragraph | Canvas1 | Format Heading1 Bold |
| Table1 | Table | Section2 | Insert Column2 |
| Table1 | Table | Section2 | Edit Column2 Title "Employee #" |
| Table1 | Cell | Section2 | Append Row2, Insert "12345" in Column2 |
| Canvas1 | Properties | Document | Change Canvas1.AuthorizedUsers to Read only for User6 |

≈ [Trusted Tester] . AsOf (Date(2015,03,30)

7006

≈ [Trusted Tester] . AsOf (Date(2015,03,30)) .Filter(Status=

7006

≈ Trusted Tester] . AsOf (Date(2015,03,30)) .Filter(Status= "Active").CountA( )

8000

7006

≈ Testers
// Return table from earlier date
.ASOF (DATE(2015,03,30))
// Count all rows that are active
.Filter(Status = "Active")
.COUNTA(....)

7004

Class

Current Company

CHAR

COUNT

COUNTA
count the number of values in a dataset

CONCAT

CREATED

COUNTIF

8100

7006

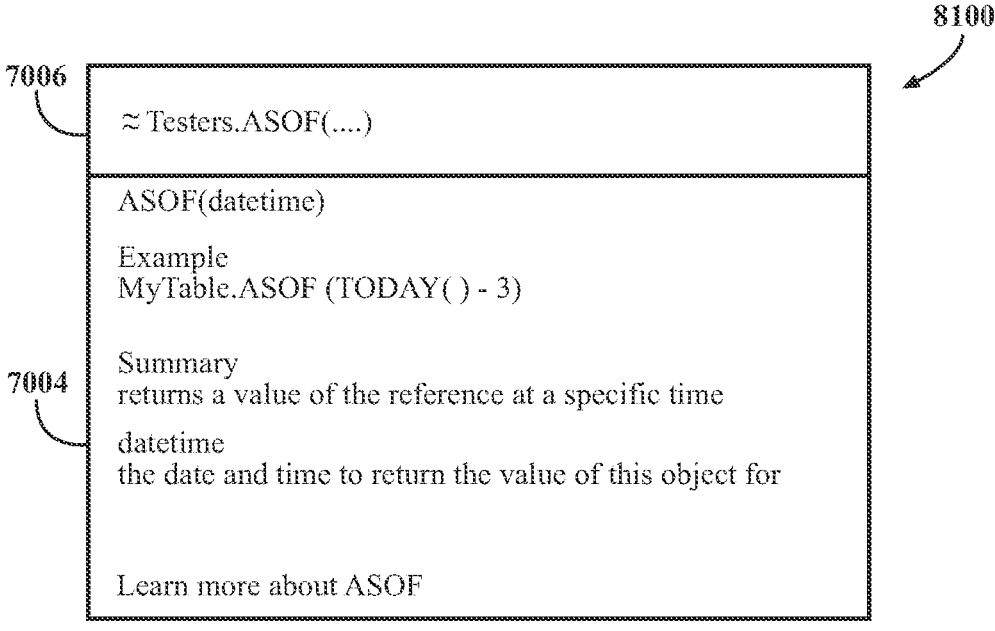

≈ Testers.ASOF(....)

ASOF(datetime)

Example
MyTable.ASOF (TODAY( ) - 3)

Summary
returns a value of the reference at a specific time datetime
the date and time to return the value of this object for Learn more about ASOF

7004

7006

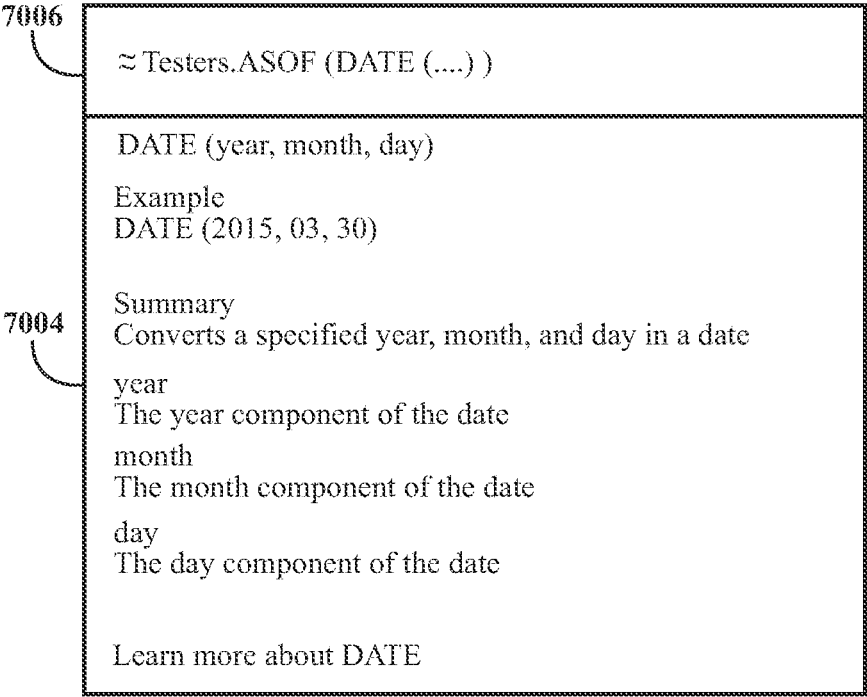

≈ Testers.ASOF (DATE (....) )

DATE (year, month, day)

Example
DATE (2015, 03, 30)

Summary
Converts a specified year, month, and day in a date year
The year component of the date month
The month component of the date day
The day component of the date Learn more about DATE

Figure 90:
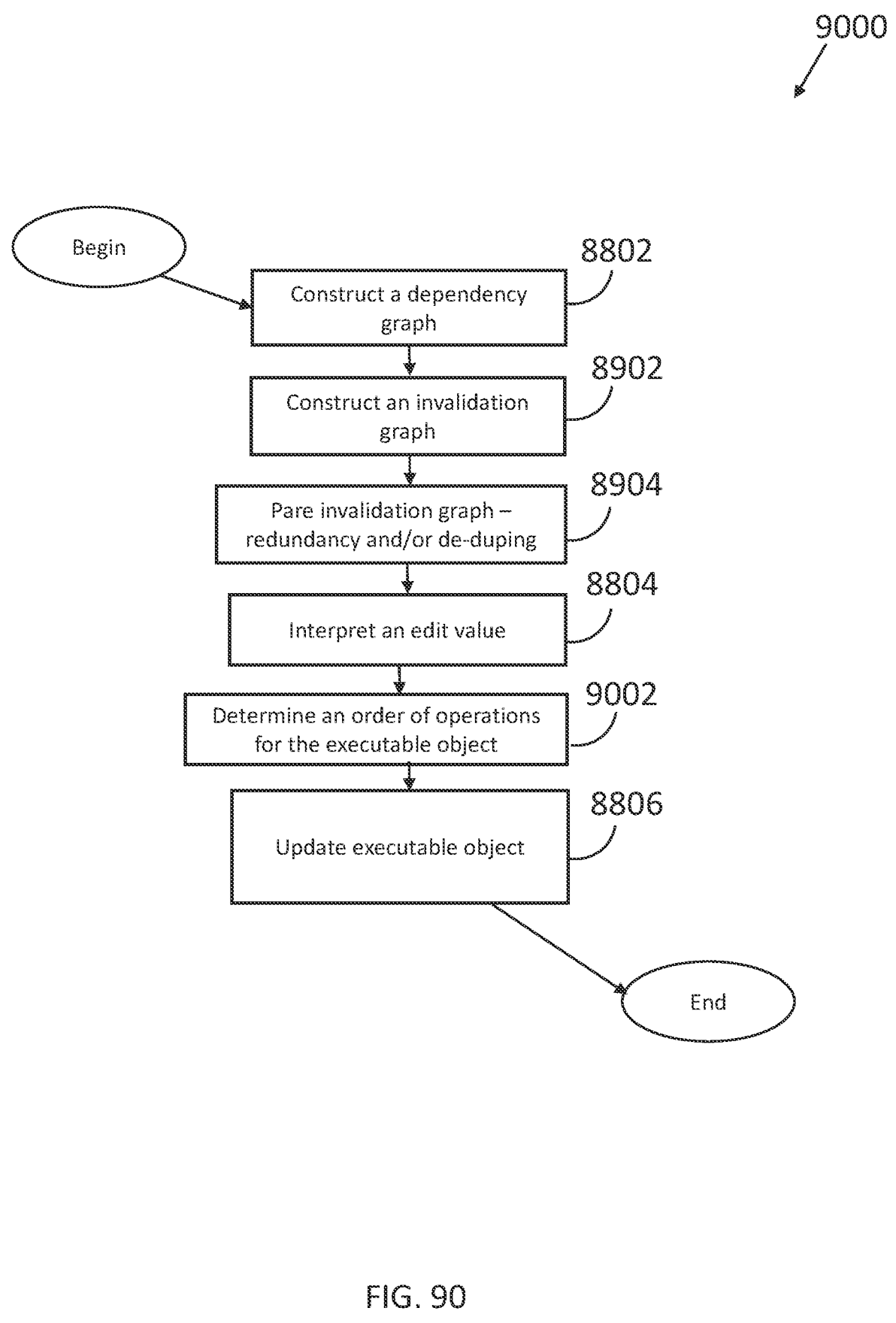

Begin

Construct a dependency
graph                                                 8802

Construct an invalidation
graph                                                 8902

Pare invalidation graph –
redundancy and/or de-duping                           8904

Interpret an edit value                               8804

Determine an order of operations
for the executable object                             9002

Update executable object                              8806

End

Begin

Analyze instructions of the executable object    9102

Determine queries in the document    9104

Determine data values in the document    9106

Update executable object with a resource reduced executable object    9108

Update executable object    8806

End

9400

9500

9600

| Reference Model | Notation | Behavior on Copy/Paste/Drag |
|---|---|---|
| Absolute | C ∈Exact unique column name<br>R ∈ Exact unique row name<br>(Or relevant column/Row Ids)<br><br>Table["January"]. "Shoes" | Exact OR Geo-shift then absolute |
| Non-Geometric | C & R resolve to exact unique C, R<br>(formula breaks otherwise, or suggests options)<br><br>Table["January".previous]. "Shoes"<br><br>Table[Month(thisCell.Column Name).Previous]."Shoes" | Exact when formula reference OR Geo-shift then absolute |
| Geometric w/ Masks | C & R shown as absolute references until not unique<br><br>Table["January"]. "Shoes"→ Table[B]. "Shoes" (if 2 columns named "January") | Geo shift |
| Geometric | Numbered reference (e.g. ID)<br><br>Table[B].3<br>Table[B].(currRow-1) | Geo shift |

FIG. 100

| Employees | | |
|---|---|---|
| ID | Name | Boss |
| 1 | Alex | Bob |
| 2 | Bob | - |
| 3 | Steve | Bob |
| 4 | John | Steve |
| 5 | Alex | Bob |

| Tasks | | | | | |
|---|---|---|---|---|---|
| Task | Alex | Bob | Steve | John | Alex |
| Get documents | × | | | | |
| Do work | | × | | | |
| Find this thing | | | | × | |

FIG. 104

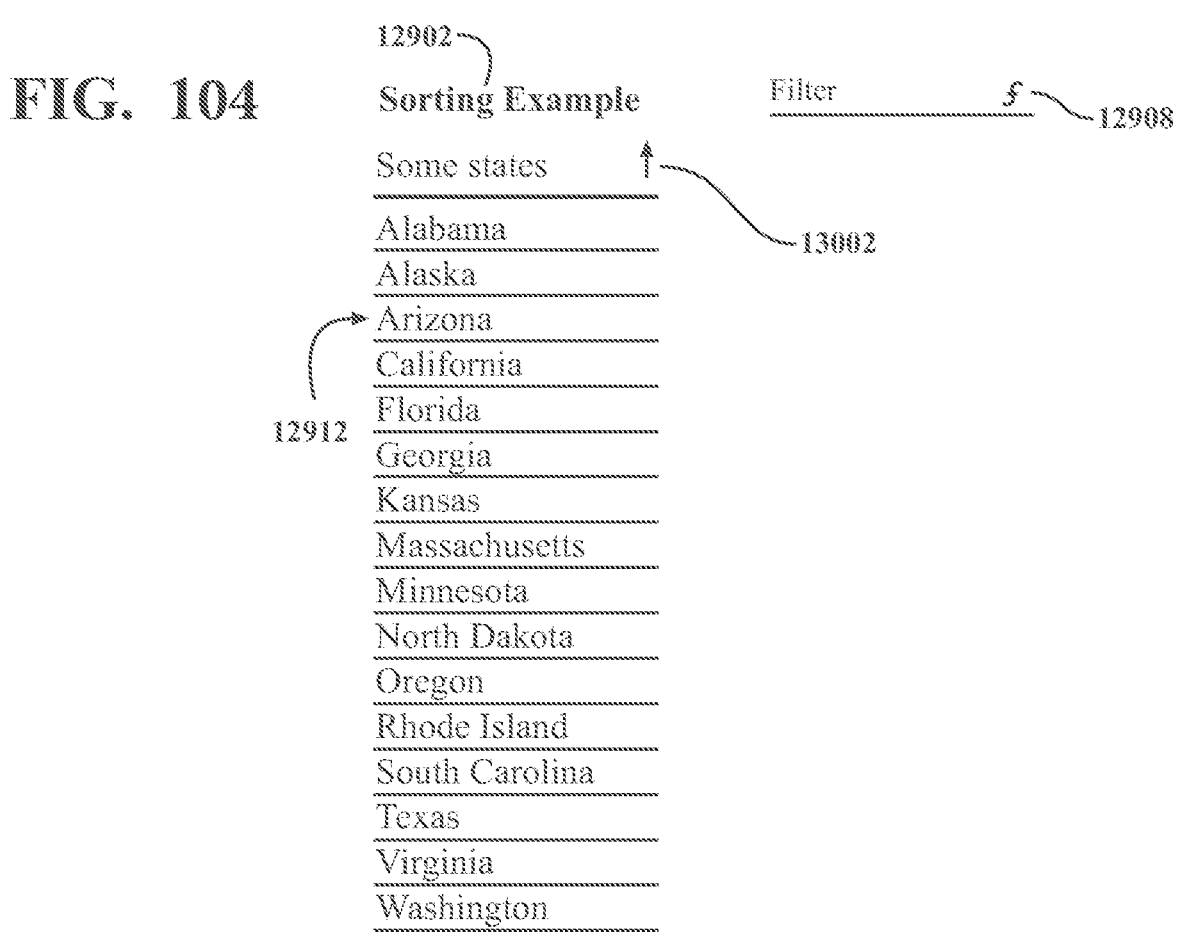

12902

Sorting Example        Filter       $f$   12908

Some states   ↑   13002

Alabama
Alaska
Arizona
California
Florida
Georgia
Kansas
Massachusetts
Minnesota
North Dakota
Oregon
Rhode Island
South Carolina
Texas
Virginia
Washington

2014 MLB Leaderboard

12908

League = "American" & Division = "East" $f$

| Team | League | Division | Wins | Losses |
|------|--------|----------|------|--------|
| Baltimore Orioles | American | East | 96 | 66 |
| Boston Red Sox | American | East | 71 | 91 |
| Toronto Blue Jays | American | East | 83 | 79 |
| New York Yankees | American | East | 84 | 78 |
| Tampa Bay Rays | American | East | 77 | 85 |

| Calculations | | | Filter | $f$ |
| A | B | C | | |
| --- | --- | --- | --- | --- |
| 1 | 2 | 3 | | |
| 3 | 4 | 7 | | |
| 5 | 6 | 11 | | |
| 7 | 8 | 15 | | |
| 9 | 10 | 19 | | |
| 10 | 12 | 23 | | |
| 13 | 14 | 27 | | |
| 15 | 16 | 31 | | |
| 17 | 18 | 35 | | |
| 19 | 20 | 39 | | |

FIG. 115
Table 1 ▾
| Coluum 1 | Coluum 2 | Coluum 3 |
|---|---|---|
| # | # | # |
| # | # | # |
| # | # | # |
| #Englewood | # | # |
| # | # | # |
| # | # | # |
| # | # | # |
| # | # | # |
| # | # | # |
| # | # | # |
@Englewood
FIG. 116
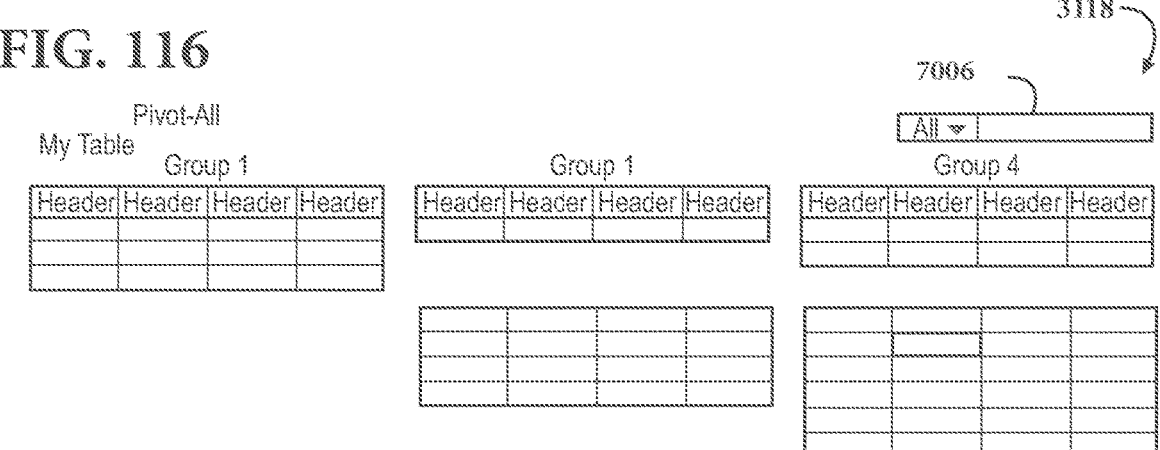
Pivot-All
My Table
FIG. 117
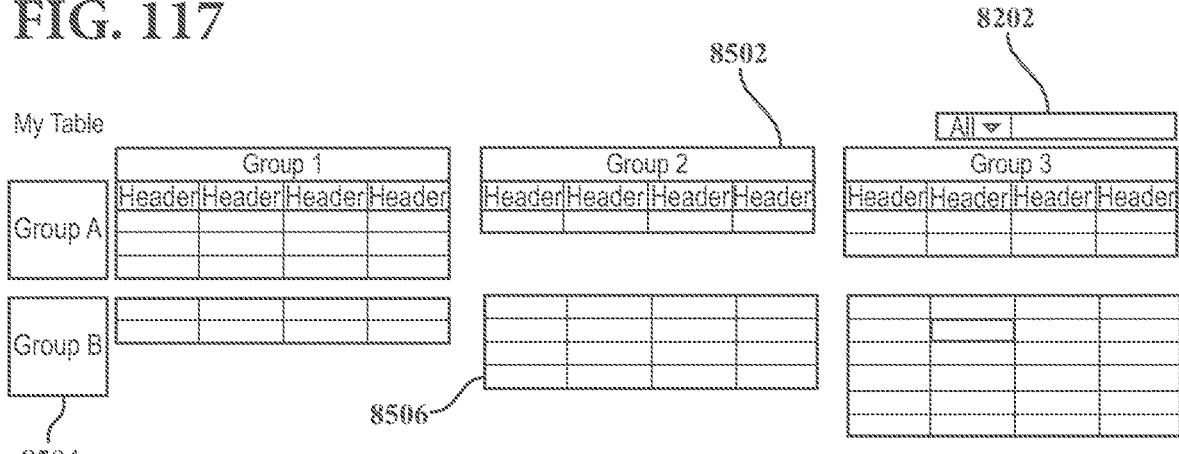
My Table

6308

11800

11900

12300

12100

7010　　　7008

7006

≈ [Trusted Tester] . AsOf (Date(2015,03,30)

7006

≈ [Trusted Tester] . AsOf (Date(2015,03,30)) .Filter(Status=

7006

≈ Trusted Tester] . AsOf (Date(2015,03,30)) .Filter(Status= "Active").CountA( )

12200

7006

≈ Testers
// Return table from earlier date
.ASOF (DATE(2016,03,30))
// Count all rows that are active
.Filter(Status = "Active")
.COUNTA(....)

7004

Class

Current Company

CHAR

COUNT

COUNTA
count the number of values in a ??????

CONCAT

CREATED

COUNTIF

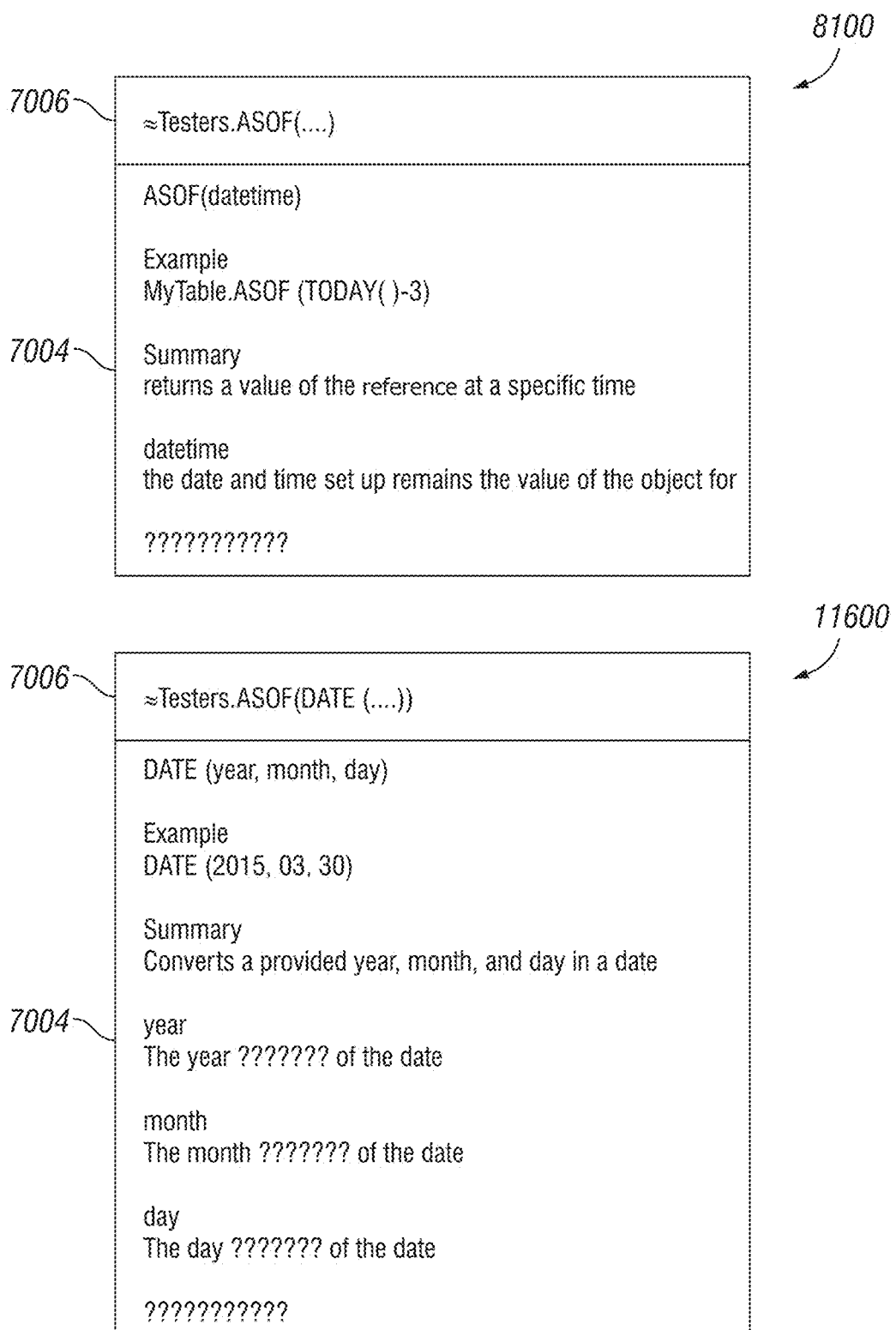

*8100*

7006

≈Testers.ASOF(....)

ASOF(datetime)

Example
MyTable.ASOF (TODAY( )-3)

7004

Summary
returns a value of the reference at a specific time datetime
the date and time set up remains the value of the object for

??????????

*11600*

7006

≈Testers.ASOF(DATE (....))

DATE (year, month, day)

Example
DATE (2015, 03, 30)

Summary
Converts a provided year, month, and day in a date

7004 year
The year ??????? of the date month
The month ??????? of the date day
The day ??????? of the date

| Bug ID | Priority | Title | Milestone |
|---|---|---|---|

Amisha

| Bug ID | Priority | Title | Milestone |
|---|---|---|---|
| ~~~~~~ | P0 | ~~~~~~~~~~~~~~ | M1 |
| ~~~~~~ | P1 | ~~~~~~~~~~~~~~ | M2 |

Carol

| Bug ID | Priority | Title | Milestone |
|---|---|---|---|
| ~~~~~~ | P3 | ~~~~~~~~~~~~~~ | M3 |
| ~~~~~~ | P2 | ~~~~~~~~~~~~~~ | M2 |
| ~~~~~~ | P1 | ~~~~~~~~~~~~~~ | M2 |

John

| Bug ID | Priority | Title | Milestone |
|---|---|---|---|
| ~~~~~~ | P1 | ~~~~~~~~~~~~~~ | M1 |
| ~~~~~~ | P0 | ~~~~~~~~~~~~~~ | M1 |

| | M1 | M2 | M3 |
|---|---|---|---|
| Amisha | ~~ ~~ ~~ ~~~~ ~~ | ~~ ~~ ~~ ~~~~ ~~ | |
| Carol | | ~~ ~~ ~~ ~~~ ~~ ~~~ ~~ ~~ ~~~ ~~ | ~~ ~~ ~~ ~~~ ~~ |
| John | ~~ ~~ ~~ ~~~~ ~~ ~~ ~~ ~~ ~~~~ ~~ ~~ | | |

9700

Table

Name: _____

Fields:

Name    Formula

1. ~~~~~  ~~~~(~~) ✕

2. ~~~~~  ~~~~(~~) ✕

✚

Item/Detail:

Show/hide: ☐

Content: ~~~~~

Width: ~

Fields:

Name    Formula

1. ~~~~~  ~~~~(~~)

2. ~~~~~  ~~~~(~~)

— Comments Only
— Activity Only
— Both

ACLs: ?

| Delete | Duplicate |

14004                14002

9700

3118

| Bugs | | | |
|---|---|---|---|
| Assigned To | Title | Priority | Effort |
| Alex | View cursors of current collaborators | 1 | 3 |
| Alex | Item detail shows deleted columns | 2 | 1 |
| Himanshu | Filter formulas with loop variable references | 3 | 1 |
| Fil | Deal with long column header names | 1 | 2 |
| Fil | Formula builder histogram filters out empty | 2 | 2 |
| Alex | Operator (for fuzzy equality e.g. case ins | 3 | 5 |
| | | 3 | 5 |
| | | *average (Bugs.Priority) | *SUM 17 (Bugs.Priority) |

Figure 135:
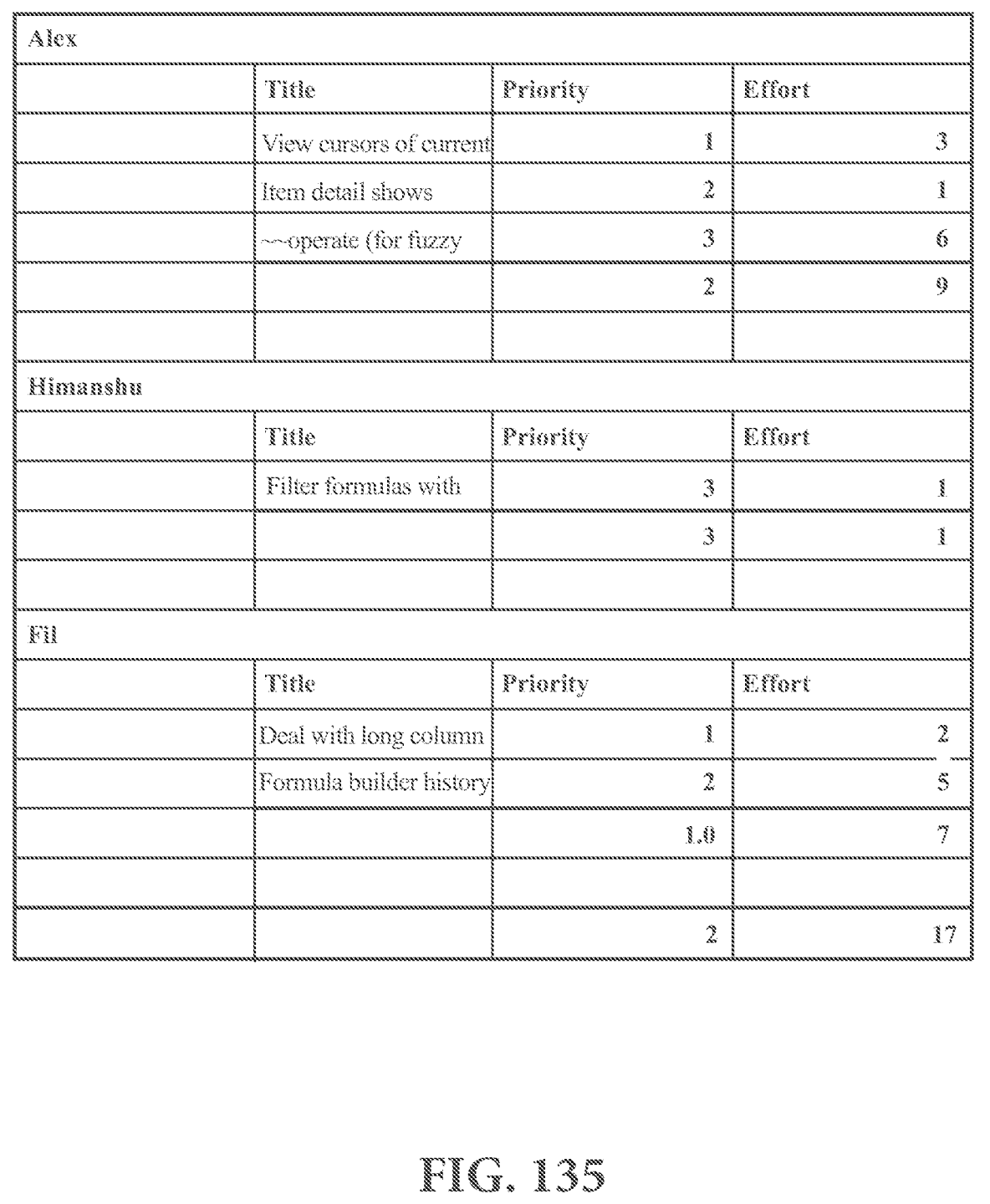

| Alex | | | |
|---|---|---|---|
| | Title | Priority | Effort |
| | View cursors of current | 1 | 3 |
| | Item detail shows | 2 | 1 |
| | ~~operate (for fuzzy | 3 | 6 |
| | | 2 | 9 |
| | | | |
| Himanshu | | | |
| | Title | Priority | Effort |
| | Filter formulas with | 3 | 1 |
| | | 3 | 1 |
| | | | |
| Fil | | | |
| | Title | Priority | Effort |
| | Deal with long column | 1 | 2 |
| | Formula builder history | 2 | 5 |
| | | 1.0 | 7 |
| | | | |
| | | 2 | 17 |

Figures 136, 137:
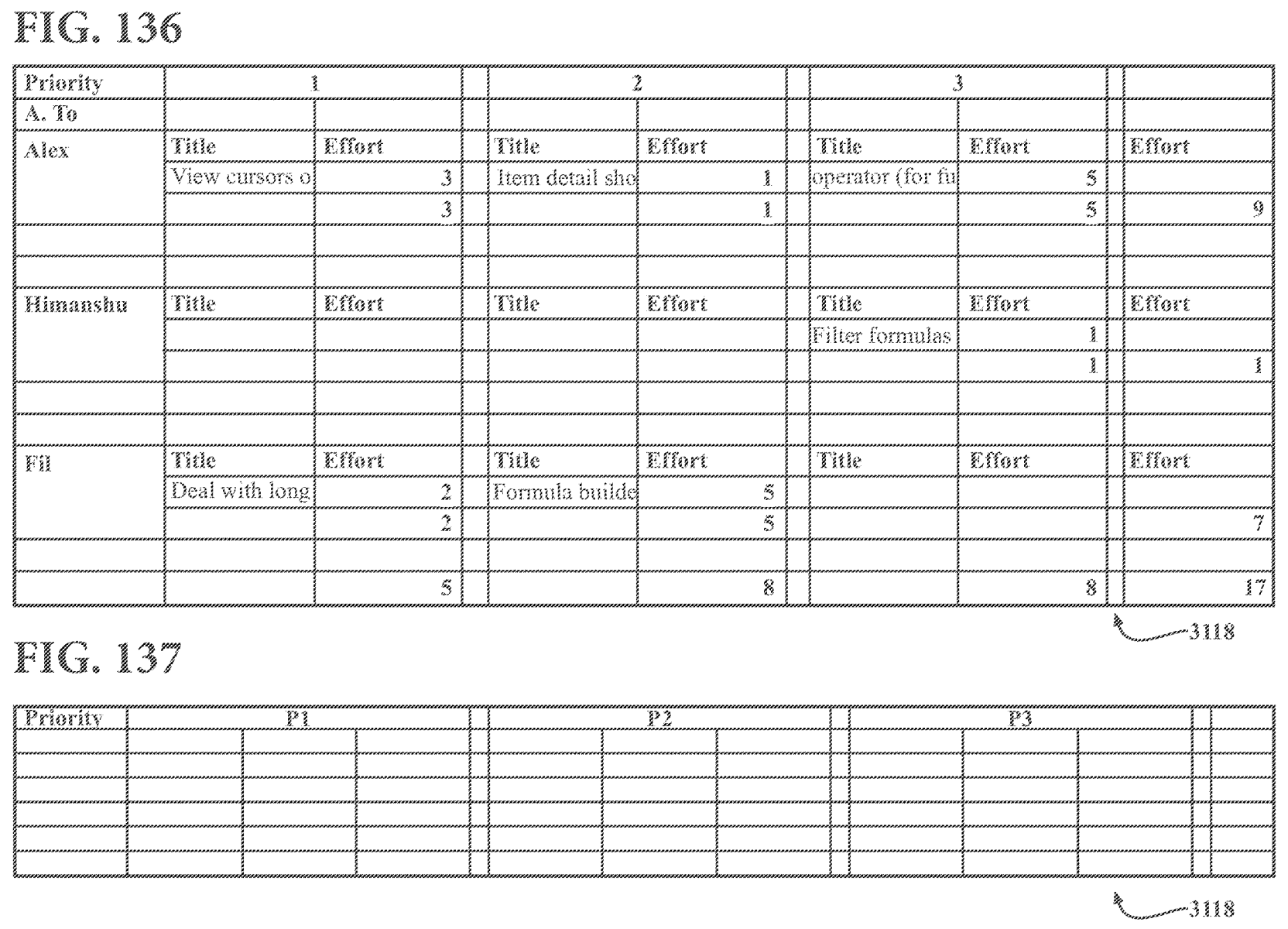

| Priority A. To | 1 | | 2 | | 3 | | |
|---|---|---|---|---|---|---|---|
| | Title | Effort | Title | Effort | Title | Effort | |
| Alex | View cursors o | 3 | Item detail sho | 1 | operator (for fu | 5 | |
| | | 3 | | 1 | | 5 | 9 |
| Himanshu | Title | Effort | Title | Effort | Title | Effort | |
| | | | | 5 | Filter formulas | 1 | |
| | | | | 5 | | 1 | 1 |
| Fil | Title | Effort | Title | Effort | Title | Effort | |
| | Deal with long | 2 | Formula builde | 5 | | 8 | 7 |
| | | 2 | | 5 | | 8 | |
| | | 5 | | 8 | | 17 | 17 |

| Priority | P1 | P2 | P3 | |
|---|---|---|---|---|
| | | | | |

3118

UNIFIED DOCUMENT SURFACE WITH TRIGGER BASED NOTIFICATIONS OF ACTION LINKS

CROSS-REFERENCE TO RELATED APPLICATIONS

This application is a continuation of U.S. patent application Ser. No. 16/597,278, filed Oct. 9, 2019, and entitled "UNIFIED DOCUMENT SURFACE".

U.S. patent application Ser. No. 16/597,278 is a continuation of U.S. patent application Ser. No. 15/499,888, filed Apr. 28, 2017, entitled "UNIFIED DOCUMENT SUR-FACE", and now issued on Nov. 26, 2019 as U.S. Pat. No. 10,489,018.

U.S. patent application Ser. No. 15/499,888, filed Apr. 28, 2017 is a continuation of U.S. patent application Ser. No. 15/499,887, filed Apr. 27, 2017, entitled "OPERATIONS LOG", and now issued on Nov. 5, 2019 as U.S. Pat. No. 10,466,868.

U.S. patent application Ser. No. 15/499,887 claims the benefit of priority to U.S. Provisional Patent application No. 62/328,469, filed Apr. 27, 2016, and entitled "UNIFIED COLLABORATIVE DIGITAL PLATFORM".

U.S. patent application Ser. No. 15/499,887 also claims the benefit of priority to U.S. Provisional Patent application No. 62/485,908, filed Apr. 15, 2017, and entitled "UNIFIED COLLABORATIVE DIGITAL PLATFORM".

The content of each of the foregoing applications is hereby incorporated by reference in its entirety for all purposes.

BACKGROUND

Field of the Invention

This disclosure relates to, without limitation, operating a unified document workspace, including a collaborative workspace.

SUMMARY

An embodiment of the present disclosure includes a system, comprising a first computing device communicatively coupled to a second computing device; the first computing device comprising a document server structured to communicate a data value to the second computing device, the data value comprising at least a portion of a document; the second computing device comprising: a unified document surface application circuit structured to interpret a first user input comprising a text flow entry, and to interpret a second user input comprising one of an in-line data access entry and a table-based calculation entry; a text flow processing circuit structured to position a text entry value on a unified document surface in response to the first user input; and an enhanced data processing circuit structured to create at least one data structure in response to the one of the in-line data access entry and the table-based calculation entry, and to position the data structure on the unified document surface.

The unified document surface application circuit may be further structured to interpret a document location corresponding to the first user input, wherein the text flow processing circuit is further structured to position the text entry value on the unified document surface in response to the document location.

The unified document surface application circuit may be further structured to interpret a second document location corresponding to the second user input, wherein the enhanced data processing circuit is further structured to position the data structure on the unified document surface in response to the second document location.

The data structure may comprise at least one object selected from the list of objects consisting of: a table, a canvas, a sheet, a line, a range, a file, an image, a graph, a chart, media content, video content, audio content, and a formula parameter.

The document location and the second document location may be within a same section of the unified document surface.

The same section may comprise at least one section selected from the sections consisting of: a canvas, a sheet, a grid, and an object.

The document location and the second document location may be included within the other of the document location and the second document location.

The document location may comprise a constrained portion of the unified document surface application circuit.

The second document location may comprise an unconstrained portion of the unified document surface application circuit.

The unified document surface application circuit may be further structured to interpret a user view value, and to provide a document view in response to the user view value.

The user view value may comprise at least one user selection selected from: a tab selection, a slide selection, and a tiled window.

The user view value may comprise at least one value selected from the values consisting of: a user designation, a user authorization, a user device parameter, a filter value, a sorting value, a priority value, a document role value, a text view, a data view, a metadata view, a formula view, and a predetermined view selection.

The unified document surface application circuit may be further structured to interpret a user device parameter, and to provide a document view in response to the user device parameter.

The unified document surface application circuit may be further structured to configure the document view in response to at least one of: a user device screen size, a user device input type, a user device resource parameter, or a user device communication value.

An embodiment of the present disclosure includes a method, comprising interpreting a first user input comprising a text flow entry; interpreting a second user input comprising one of an in-line data access entry and a table-based calculation entry; positioning a text entry value on a unified document surface in response to the first user input; creating at least one data structure in response to the one of the in-line data access entry and the table-based calculation entry; and positioning the data structure on the unified document surface.

An embodiment of the present disclosure may further comprise interpreting a document location corresponding to the first user input, and positioning the text entry value on the unified document surface in response to the document location.

An embodiment of the present disclosure may further comprise interpreting a second document location corresponding to the second user input, and positioning the data structure on the unified document surface in response to the second document location.

The document location and the second document location may be within a same section of the unified document surface.

The same section may comprise at least one section selected from the sections consisting of: a canvas, a sheet, a grid, and an object, and may further comprise including one of the document location and the second document location within the other of the document location and the second document location.

The document location may comprise a constrained portion of the unified document surface application circuit.

The second document location may comprise an unconstrained portion of the unified document surface application circuit.

An embodiment of the present disclosure may further comprise interpreting a user view value, and providing a document view in response to the user view value.

The user view value may comprise at least one user selection selected from: a tab selection, a slide selection, and a tiled window.

The user view value may comprise at least one value selected from the values consisting of: a user designation, a user authorization, a user device parameter, a filter value, a sorting value, a priority value, a document role value, a text view, a data view, a metadata view, a formula view, and a predetermined view selection.

An embodiment of the present disclosure may further comprise interpreting a user device parameter, and providing a document view in response to the user device parameter.

An embodiment of the present disclosure may further comprise configuring the document view in response to at least one of: a user device screen size, a user device input type, a user device resource parameter, or a user device communication value.

An embodiment of the present disclosure includes a method, comprising interpreting a user input indicating a table reference value; accessing a unified document surface comprising at least two tables; and resolving a referenced table of the at least two tables in response to the table reference value.

The at least two tables may each comprise a reference name value consistent with the table reference value, and wherein the resolving may comprise: determining a first user related position in the unified document surface, and finding a closest hierarchically related one of the at least two tables in response to the first user related position.

The table reference value may comprise a character sequence, and wherein a first portion of each of the reference name values of each of the at least two tables are consistent with the character sequence.

An embodiment of the present disclosure may further comprise providing a user with an option list in response to the table reference value, wherein the option list comprises at least one of the at least two tables, and wherein the resolving is in response to a selection of the user from the option list.

An embodiment of the present disclosure may further comprise providing the user with a preview of at least one member of the option list.

The preview may comprise at least one value selected from the values consisting of: an image corresponding to at least a portion of the at least one member; a title of the at least one member; a column heading from the at least one member; at least one data value from the at least one member; and a result value corresponding to the at least one member.

The preview may comprise a result value corresponding to the at least one member, wherein the result value comprises a result of a current operation of the user that would be returned if the previewed member of the option list is selected.

An embodiment of the present disclosure may further comprise appending an additional user input to the character sequence, and updating the resolving in response to the additional user input.

The appending additional user input may comprise at least one of an addition to the character sequence or a deletion from the character sequence, and wherein at least two of the at least two tables may comprise an identical local reference name, and/or wherein at least two of the at least two tables may comprise a shared plurality of introductory characters of a local reference name.

An embodiment of the present disclosure includes an apparatus, comprising a client computing device structured to receive a data element from a document server, the data element comprising at least a portion of a document; the client computing device further comprising: a user display circuit structured to determine a document view in response to the data element, and to provide the document view to a user; a reference management circuit structured to interpret a user reference selection, and to determine a reference return value in response to the user reference selection; and wherein the user display circuit provides a reference return display to the user in response to the reference return value.

The user reference selection may comprise at least one selection value selected from the selection values consisting of: a selection by the user indicating that a reference look-up operation is requested; a selection by the user indicating that a reference look-up operation is instructed; a selection by the user indicating that a reference look-up operation is contextually indicated; a user tool button selection; a specified character entry by the user; a specified character sequence entry by the user; and a utility action entered by the user.

The user reference selection may comprise one of a specified character entry by the user or a specified character sequence entry by the user, wherein the reference management circuit is further structured to interpret a precursor character, and to determine that the user reference selection is intended for display in response to the precursor character.

The reference management circuit may be further structured to update the user reference selection.

The reference management circuit may be further structured to update the user reference selection in response to at least one event selected from the events consisting of: a periodic time expiration; a user request to update the user reference selection; a change in the user reference selection; and a contextual indication corresponding to at least one of the user or the client computing device.

The reference management circuit may be further structured to determine the reference return value in response to at least one of: responsive information within the document, responsive information within the data element, or responsive information within a source data.

The reference return value may comprise at least one of metadata, a tag, or a value determined in a semantic match.

The reference return value may comprise at least one value selected from the values consisting of: an object name value; a result value from at least one of an object or a formula;

a significant word return; and a data value.

The reference return value may comprise a significant word return, and wherein the reference management circuit is further structured to determine the significant word return in response to at least one of: a unique sequence of characters; a frequency of occurrence of a word; a word comprising a term of art; or a word comprising an entity reference.

The reference return value may comprise ancillary information based upon the responsive information.

The reference management circuit may be further structured to perform a scope change comprising at least one of broadening a view of the user reference selection or narrowing a view of the user reference selection; wherein the scope change is based upon an amount of the responsive information.

The reference management circuit may be further structured to determine the responsive information in response to rules from at least one of: a template document, provided by an administrator, or provided by the user.

The reference management circuit may be further structured to prioritize the responsive information in response to rules from at least one of: a template document, provided by an administrator, or provided by the user.

The user display circuit may be further structured to provide the reference return display comprising a plurality of responsive information elements in response to the reference return value.

The user display circuit may be further structured to provide the reference return display further comprising an indication of additional potentially responsive information.

The user reference selection may comprise at least one of a website, a uniform resource locator (URL), a network location, or a document name, and wherein the at least one of the website, the URL, the network location, or the document name comprises data that is not included in the scope of the document server, wherein the scope of the document server comprises at least one of the document, the data element, or the source data.

An embodiment of the present disclosure includes a method, comprising interpreting a user selection comprising at least one data value; interpreting a second user selection comprising an extract value; creating a data view in response to the user selection; and displaying at least a portion of the data view in response to the extract value.

The interpreting the user selection may comprise at least one operation selected from the operations consisting of: receiving a user-entered keyword; determining at least one data value selected by a user; determining a tag value selected by a user; and determining a selected range value in response to the user selection.

The at least one data value may comprise at least one data value selected from the values consisting of: a table column; a table row; a style tag; an arbitrary tag; a linked data value; a data reference value; and a data record.

The at least one data value may comprise an inferred data value, and wherein interpreting the user selection further comprises determining the inferred data value in response to at least one operation selected from the operations consisting of: determining the inferred data value in response to a document type value; determining the inferred data value in response to a document location value; determining the inferred data value in response to a predefined data association value, and determining the predefined data association value in response to at least one of a template data association value or a user selected data association value; determining the inferred data value in response to a prior user operation; prompting a user with a plurality of data association values, and determining the inferred data value in response to one of a user selected data association value and a default data association value; and determining the inferred data value in response to a priority value associated with each of a plurality of related data values.

The interpreting the second user selection may further comprise at least one operation selected from the operations consisting of: determining a document extract location value; and determining an extracted data type value.

The creating a data view in response to the user selection may comprise at least one operation selected from the operations consisting of: creating a table of extracted data; creating a formatted display of extracted data; creating a structured data view of extracted data; creating an aggregated data view of extracted data; and creating a list of extracted data.

The data view may comprise a card.

The extracted data may comprise at least one of: data corresponding to the user selection; linked data determined in response to the user selection; and referenced data determined in response to the user selection.

The extracted data may comprise a portion of at least one of the data corresponding to the user selection, the linked data, or the referenced data, and wherein the creating a data view further comprises determining the portion in response to an extraction context parameter.

An embodiment of the present disclosure may further comprise determining the extraction context parameter by performing at least one operation selected from the operations consisting of: interpreting a user interaction history with a document; interpreting a user context selection;

determining the extraction context parameter in response to a document type value; determining the extraction context parameter in response to a document location value; determining the extraction context parameter in response to a prior user operation; determining the extraction context parameter in response to at least one of a template data association value or a user selected data association value; prompting a user with a plurality of extraction context parameter values, and determining the extraction context parameter in response to one of a user selected extraction context parameter value and a default extraction context parameter value; and determining the extraction context parameter value in response to the second user selection.

An embodiment of the present disclosure may further comprise interpreting a user data change input value, the user data change input value comprising a change to the displayed portion of the data view, and in response to the user data change input value, updating a source data comprising the at least one data value.

The created data view may comprise a card.

The created data view may comprise a structured data view.

The source data may comprise unstructured data.

An embodiment of the present disclosure includes a system, comprising: a document server structured to communicate at least a portion of a document to a client computing device; the client computing device comprising: a user interaction circuit structured to interpret a user selection comprising at least one data value, the document comprising the at least one data value, and further structured to interpret a second user selection comprising an extract value; an extracted data generation circuit structured to create a data view in response to the user selection; a user display circuit structured to display at least a portion of the data view in response to the extract value.

The user interaction circuit may be further structured to interpret the user selection by performing at least one operation selected from the operations consisting of: receiving a user-entered keyword; determining at least one data value selected by a user; determining a tag value selected by a user; and determining a selected range value in response to the user selection.

The at least one data value may comprise at least one data value selected from the values consisting of: a table column; a table row; a style tag; an arbitrary tag; a linked data value; a data reference value; and a data record.

The user interaction circuit may be further structured to provide the at least one data value as an inferred data value.

The user interaction circuit may be further structured to determine the inferred data value by performing at least one operation selected from the operations consisting of: determining the inferred data value in response to a document type value; determining the inferred data value in response to a document location value; determining the inferred data value in response to a predefined data association value, and determining the predefined data association value in response to at least one of a template data association value or a user selected data association value; determining the inferred data value in response to a prior user operation; prompting a user with a plurality of data association values, and determining the inferred data value in response to one of a user selected data association value and a default data association value; and determining the inferred data value in response to a priority value associated with each of a plurality of related data values.

The extracted data generation circuit may be further structured to interpret the second user selection by performing at least one operation selected from the operations consisting of: determining a document extract location value; and determining an extracted data type value.

The extracted data generation circuit may be further structured to creating a data view in response to the user selection by performing at least one operation selected from the operations consisting of: creating a table of extracted data; creating a formatted display of extracted data; creating a structured data view of extracted data; creating an aggregated data view of extracted data; and creating a list of extracted data.

The data view may further comprise a card.

The extracted data may comprise at least one of: data corresponding to the user selection; linked data determined in response to the user selection; and referenced data determined in response to the user selection.

The extracted data may comprise a portion of at least one of the data corresponding to the user selection, the linked data, or the referenced data, and wherein the creating a data view further comprises determining the portion in response to an extraction context parameter.

The extracted data generation circuit may be further structured to determine the extraction context parameter by performing at least one operation selected from the operations consisting of: interpreting a user interaction history with a document;

interpreting a user context selection; determining the extraction context parameter in response to a document type value; determining the extraction context parameter in response to a document location value; determining the extraction context parameter in response to a prior user operation; determining the extraction context parameter in response to at least one of a template data association value or a user selected data association value; prompting a user with a plurality of extraction context parameter values, and determining the extraction context parameter in response to one of a user selected extraction context parameter value and a default extraction context parameter value; and determining the extraction context parameter value in response to the second user selection.

The user interaction circuit may be further structured to interpret a user data change input value, the user data change input value comprising a change to the displayed portion of the data view, and in response to the user data change input value, updating a source data comprising the at least one data value.

The created data view may comprise a card.

The created data view may comprise a structured data view.

The source data may comprise unstructured data.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device structured to: create a first document view in response to the first operation log, the document view comprising content generated using at least a portion of the first operation log; provide the first document view to a display device;

to receive a user document change input value, and to create a local operation log in response to the first operation log and the user document change input value, the local operation log comprising at least one sequential operation defining operations to create a second document;

to update the first document view in response to the user document change input value; and to communicate a change value for the first operation log to the first computing device in response to the first operation log and the local operation log.

The first computing device may be further communicatively coupled to a third computing device, wherein the document server is further structured to communicate the first operation log to the third computing device, and wherein the third computing device is structured to: create a second document view in response to the first operation log, the second document view comprising content generated using at least a portion of the first operation log; to receive a second user document change input value, and to create a second local operation log in response to the first operation log and the second user document change input value; and to communicate a second change value for the first operation log to the first computing device in response to the first operation log and the second local operation log.

An embodiment of the present disclosure may further comprise an arbitration circuit structured to construct a second operation log in response to the first operation log, the change value, and the second change value.

An embodiment of the present disclosure may further comprise local operation log may comprise a first record of operations which, if implemented on a document, would provide a document having edits consistent with the user document change input value, and wherein the second local operation log comprises a second record of operations which, if implemented on a document, would provide a document having edits consistent with the second user document change input value.

The arbitration circuit may be further structured to apply non-conflicting operations of the local operation log and the second local operation log, and to resolve conflicting operations of the local operation log and the second local operation log.

The arbitration circuit may be further structured to resolve the conflicting operations of the local operation log and the second local operation log by performing at least one operation selected from the operations consisting of: applying individual operations in a priority selected according to a time stamp corresponding to each operation; applying operations in a priority selected according to a time stamp of the local operation log and second local operation log; applying operations in a priority selected according to an associated priority of at least one of the second computing device, the third computing device, and a user associated with one of the second and third computing devices; and applying operations in a priority selected according to a time of communication of the operations to the first computing device.

The arbitration circuit may be further structured to resolve the conflicting operations of the local operation log and the second local operation log by performing at least one operation selected from the operations consisting of: applying individual operations in a priority selected according to a type of at least one of the conflicting operations; applying individual operations in a priority selected according to a relationship between: at least one of the second computing device, the third computing device, and a user associated with one of the second and third computing devices; and a reference region of a document that would be affected by at least one of the conflicting operations; applying individual operations in a priority selected in response to a performance characteristic of at least one of the second and third computing devices;

applying individual operations in a priority selected in response to an indicated importance value corresponding to at least one of the conflicting operations; applying individual operations in a priority selected in response to a conflict management difficulty value; applying individual operations in a priority selected in response to at least one of: a number of operations represented in at least one of the local operation log and the second local operation log; a document editing time corresponding to at least one of the second computing device and the third computing device; one of a change amount and a change rate of a reference region of a document that would be affected by at least one of the conflicting operations; a number of computing devices that have at least one characteristic selected from the characteristics consisting of: are currently accessing a reference region of a document that would be affected by at least one of the conflicting operations; have recently accessed a reference region of a document that would be affected by at least one of the conflicting operations; are currently editing a reference region of a document that would be affected by at least one of the conflicting operations; and have recently edited a reference region of a document that would be affected by at least one of the conflicting operations.

The arbitration circuit may be at least partially included on at least one of the first computing device, the second computing device, and the third computing device.

The arbitration circuit may be included on the second computing device, wherein the first computing device communicates the second change value to the second computing device.

The arbitration circuit may be further structured to update the change value in response to the second local operating log, and to communicate the updated change value to the first computing device.

The first computing device may be further structured to determine a snapshot, the snapshot comprising at least one sequential operation defining at least one second sequential operation, wherein the at least one second sequential operation, if executed, results in an equivalent document to the first document.

The first computing device may provide the snapshot as the first operation log.

The snapshot may comprise at least one of: the second sequential operation comprising fewer processor operations than the first sequential operation; the second sequential operation comprising fewer logical operations than the first sequential operation; the second sequential operation comprising a simplified description of operations than the first sequential operation; and the second sequential operation comprising lumped operations relative to the first sequential operation.

The first computing device may determine the snapshot in response to at least one event selected from the events consisting of: receiving the communicated change value from the second computing device, wherein the determining the snapshot further comprises updating the snapshot to reflect operations from the communicated change value; a lapse of a predetermined time period; a lapse of a predetermined time period since a last communication of the change value; a request from the second computing device; an initial operation to open a document; an operation to close a document; a determination that a predetermined efficiency threshold is exceeded by determining the snapshot; an operation to save a document; an operation to save a document as a new document; a request to access a document related to the first operation log from another computing device; a change value exceeding a predetermined amount of change; a change value directed to a predetermined categorical change; a loss of communication with the second computing device; a reestablishment of communication with the second computing device; an operation to print at least a portion of a document related to the first operation log; an operation to publish at least a portion of a document related to the first operation log; and a determination that determining and communicating the snapshot will not interfere with an operation of the second computing device on a document related to the first operation log.

An embodiment of the present disclosure may further comprise an arbitration circuit structured to construct a second operation log in response to the first operation log, the change value, and the second change value; and wherein the first computing device is further structured to determine the snapshot by determining a provisional snapshot, and in response to determining that the provisional snapshot is compatible with the second operation log, over-write the snapshot as the provisional snapshot.

An embodiment of the present disclosure includes a method, comprising: receiving a first operation log from a first computing device, the first operation log comprising at least one first sequential operation defining operations to create a first document; creating a first document view in response to the first operation log, the document view comprising content generated using at least a portion of the first operation log; providing the first document view to a display device; receiving a user document change input value, and creating a local operation log in response to the first operation log and the user document change input value, the local operation log comprising at least one sequential operation defining operations to create a second document; updating the first document view in response to the user document change input value; and communicating a change value for the first operation log to the first computing device in response to the first operation log and the local operation log.

An embodiment of the present disclosure may further comprise receiving a second change value from the first computing device, the second change value comprising at least one sequential operation to add to the first operation log, and defining operations to create a third document; and creating a second local operation log in response to the first operation log and the second change value.

The creating the local operation log may comprise creating a first record of operations which, if implemented on a document, would provide a document having edits consistent with the user document change input value; and wherein creating the second local operation log comprises creating a second record of operations which, if implemented on a document, would provide a document having edits consistent with the second user document change input value.

An embodiment of the present disclosure may further comprise applying non-conflicting operations of the local operation log and the second local operation log, and resolving conflicting operations of the local operation log and the second local operation log.

The resolving the conflicting operations of the local operation log and the second local operation log may comprise performing at least one operation selected from the operations consisting of: applying individual operations in a priority selected according to a time stamp corresponding to each operation; applying operations in a priority selected according to a time stamp of the local operation log and second local operation log; applying operations in a priority selected according to an associated priority of at least one of a second computing device receiving the user document change input value and a third computing device providing the second change value; applying operations in a priority selected according to an associated priority of at least one of a user associated with a second computing device receiving the user document change input value or a user associated with a third computing device providing the second change value; and applying operations in a priority selected according to a time of communication of the operations to the first computing device.

The resolving the conflicting operations of the local operation log and the second local operation log may comprise performing at least one operation selected from the operations consisting of:

applying individual operations in a priority selected according to a type of at least one of the conflicting operations; applying individual operations in a priority selected according to a relationship between: at least one of the second computing device, the third computing device, and a user associated with one of the second and third computing devices; and a reference region of a document that would be affected by at least one of the conflicting operations; applying individual operations in a priority selected in response to a performance characteristic of at least one of the second and third computing devices;

applying individual operations in a priority selected in response to an indicated importance value corresponding to at least one of the conflicting operations; applying individual operations in a priority selected in response to a conflict management difficulty value; applying individual operations in a priority selected in response to at least one of: a number of operations represented in at least one of the local operation log and the second local operation log; a document editing time corresponding to at least one of the second computing device and the third computing device; one of a change amount and a change rate of a reference region of a document that would be affected by at least one of the conflicting operations; a number of computing devices that have at least one characteristic selected from the characteristics consisting of: are currently accessing a reference region of a document that would be affected by at least one of the conflicting operations; have recently accessed a reference region of a document that would be affected by at least one of the conflicting operations; are currently editing a reference region of a document that would be affected by at least one of the conflicting operations; and have recently edited a reference region of a document that would be affected by at least one of the conflicting operations.

The resolving the conflict may be at least partially performed on at least one of the first computing device, the second computing device, and the third computing device.

The resolving the conflict may be performed on the second computing device, wherein the first computing device communicates the second change value to the second computing device.

The second computing device may update the change value in response to the second local operating log, and communicates the updated change value to the first computing device.

An embodiment of the present disclosure may further comprise determining a snapshot, the snapshot comprising at least one sequential operation defining at least one second sequential operation, wherein the at least one second sequential operation, if executed, results in an equivalent document to the first document.

An embodiment of the present disclosure may further comprise providing the snapshot as the first operation log.

The snapshot may comprises at least one of: determining the second sequential operation comprising fewer processor operations than the first sequential operation; determining the second sequential operation comprising fewer logical operations than the first sequential operation; determining the second sequential operation comprising a simplified description of operations than the first sequential operation; and determining the second sequential operation comprising lumped operations relative to the first sequential operation.

An embodiment of the present disclosure may further comprise determining the snapshot in response to at least one event selected from the events consisting of: the first computing device receiving the communicated change value, wherein the determining the snapshot further comprises updating the snapshot to reflect operations from the communicated change value; a lapse of a predetermined time period; a lapse of a predetermined time period since a last communication of the change value; a request from a second computing device; an initial operation to open a document; an operation to close a document; a determination that a predetermined efficiency threshold is exceeded by determining the snapshot; an operation to save a document; an operation to save a document as a new document; a request to access a document related to the first operation log from another computing device; a change value exceeding a predetermined amount of change; a change value directed to a predetermined categorical change; a loss of communication between the first computing device and a second computing device; a reestablishment of communication between the first computing device and a second computing device; an operation to print at least a portion of a document related to the first operation log; an operation to publish at least a portion of a document related to the first operation log; and a determination that determining and communicating the snapshot will not interfere with an operation of a second computing device on a document related to the first operation log.

An embodiment of the present disclosure includes a method, comprising: communicating a first operation log from a first computing device to a second computing device and a third computing device, the first operation log comprising at least one first sequential operation defining operations to create a first document; receiving a change value for the first operation log from the second computing device, the change value comprising at least one sequential operation defining operations to create a second document including changes relative to the first operation log; receiving a second change value for the first operation log from the third computing device, the second change value comprising at least one sequential operation defining operations to create a third document including changes relative to the first operation log; communicating the second change value to the second computing device; and receiving an updated change value from the second computing device, the updated change value comprising a conflicts resolving change value between the change value and the second change value.

An embodiment of the present disclosure may further comprise communicating the updated change value to the third computing device.

An embodiment of the present disclosure may further comprise determining a snapshot, the snapshot comprising at least one sequential operation defining at least one second sequential operation, wherein the at least one second sequential operation, if executed, results in an equivalent document to the first document.

An embodiment of the present disclosure may further comprise providing the snapshot as the first operation log, and wherein determining the snapshot may comprise at least one of: determining the second sequential operation comprising fewer processor operations than the first sequential operation; determining the second sequential operation comprising fewer logical operations than the first sequential operation; determining the second sequential operation comprising a simplified description of operations than the first sequential operation; and determining the second sequential operation comprising lumped operations relative to the first sequential operation.

An embodiment of the present disclosure may further comprise determining the snapshot in response to at least one event selected from the events consisting of: the first computing device receiving the communicated change value, wherein the determining the snapshot further comprises updating the snapshot to reflect operations from the communicated change value; a lapse of a predetermined time period; a lapse of a predetermined time period since a last communication of the change value; a request from a second computing device; an initial operation to open a document; an operation to close a document; a determination that a predetermined efficiency threshold is exceeded by determining the snapshot; an operation to save a document; an operation to save a document as a new document; a request to access a document related to the first operation log from another computing device; a change value exceeding a predetermined amount of change; a change value directed to a predetermined categorical change; a loss of communication between the first computing device and a second computing device; a reestablishment of communication between the first computing device and a second computing device; an operation to print at least a portion of a document related to the first operation log; an operation to publish at least a portion of a document related to the first operation log; and a determination that determining and communicating the snapshot will not interfere with an operation of a second computing device on a document related to the first operation log.

An embodiment of the present disclosure may further comprise determining the snapshot by determining a provisional snapshot, and in response to determining that the provisional snapshot is compatible with the updated change value, over-writing the snapshot as the provisional snapshot.

An embodiment of the present disclosure includes a system, comprising: a document server comprising a document, wherein the document server is in communication with a client computing device, and wherein the document server communicates a data element comprising at least a portion of the document to the client computing device; the client computing device comprising: a user display circuit structured to provide a first view to the user in response to the data element; a data management circuit structured to interpret a user table selection value, and to determine at least one of a table data update or a table configuration update in response to the user table selection value; and wherein the user display circuit is further structured to update a second view in response to the at least one of the table data update or the table configuration update.

The data element may comprise a first table having source information and a second table having linked information to the source information, and wherein the user table selection value comprises at least one value selected from the values consisting of: a rule for operating the first table and the second table in response to user inputs; a data change on at least one of the first table or the second table; and a configuration change on at least one of the first table or the second table.

The data element may comprise a first table having source information and a second table having linked information to the source information, wherein the user table selection value comprises a data change to the second table, and wherein the data management circuit is further structured to update a corresponding data value on the first table in response to the data change The user table selection value may further comprise a formatting change to the second table, and wherein the data management circuit does not update a format of the first table.

The data element may comprise a first table having source information and a second table having linked information to the source information, wherein the user table selection value comprises a first data change to a first column of the second table and a second data change to a second column of the second table, and wherein the data management circuit is further structured to update a first corresponding data value on the first table in response to the first data change, and does not update a second corresponding data value on the first table in response to the second data change.

The user display circuit may be further structured to, in response to the second data change, perform an operation selected from the operations consisting of: notify the user that the second data change was not updated on the first table; change a formatting of a data value on the second table corresponding to the second data change; and prompt the user whether to update the second corresponding data value on the first table.

The data element may comprise a first table having source information and a second table having linked information to the source information, wherein the user table selection value comprises a deletion of a column on the second table, and wherein the data management circuit does not delete a corresponding column on the first table.

The data element may comprise a first table having source information and a second table having linked information to the source information, and wherein the user table selection value comprises at least one value selected from the values consisting of: a format change, a deletion, a sorting operation, and a filtering operation.

The data element may comprise a first table having source information and a second table having linked information to the source information, and wherein the user table selection value comprises a first user table selection value corresponding to a first user, wherein the data management circuit is further structured to interpret a second user table selection value corresponding to a second user, and to determine at least one of a second table data update or a second table configuration update in response to the second user table selection value, and wherein the user display circuit is further structured to provide a third view to the second user in response to at least one of the second table data update or the second table configuration update.

The document server may be further structured to update at least one of the document or the data element in response to a source data change.

The source data change may comprise a change of data at least partially included on one of: a website; a database external to the document server; or a cloud server external to the document server.

The user interaction circuit may be further structured to provide an alert to the user in response to the update.

The user interaction circuit may be further structured to provide an alert to the user in response to at least one of: a change in the document; a change in a selected object in the document; an access of the document by a second user; an access of an object of the document by a second user; or an unlocking event of an object of the document by a second user.

The data element may comprise source data external to the document.

The source information may be at least partially external to the document, and wherein at least one of the first table and the second table may comprise information external to the document.

An embodiment of the present disclosure includes a system, comprising: a document server structured to communicate at least a portion of a document to a client computing device; the client computing device comprising: a user interaction circuit structured to interpret a user selection comprising at least one data value, wherein the document comprises the at least one data value, and wherein the at least one data value comprises at least one of a reference or a link to an external source data; a data management circuit structured to create a data view in response to the user selection; and a user display circuit structured to display at least a portion of the data view in response to the user selection.

The user interaction circuit may be further structured to interpret a user data entry, wherein the data management circuit is further structured to provide an external source data option in response to the user data entry, and wherein the user display circuit is further structured to update at least a portion of the data view in response to the external source data option The external source data may comprise read-only data.

The user interaction circuit may be further structured to interpret a user data entry comprising an edit of at least one data value, and wherein the data management circuit is further structured to update the external source data in response to the user data entry.

The data management circuit may be further structured to query the external source data and to provide an update of the data view in response to the query, and wherein the user display circuit is further structured to update the display in response to the updated data view.

The data management circuit may be further structured to perform the query operation in response to at least one of: an update time expiration; a notification from an external device hosting the external source; a change in a second data value having a dependency on the external source data; a change in an object having a dependency on the external source data; a creation of a second data value having a dependency on the external source data; and a creation of an object having a dependency on the external source data; and a request to provide a continuous update of the at least one data value.

The user selection may comprise a data source identifier.

The data source identifier may comprise at least one data source identifier selected from the list consisting of: a uniform resource locator; a network location; a file name; an external source application programming interface reference; and an external source access reference.

The user interaction circuit may be further structured to interpret a user data request value, and wherein the data management circuit may be further structured to provide an external source data option in response to the user data request value, where the external source data option may comprise the data source identifier.

The user data request value may consist of at least one of a content based request or a subject matter based request.

An embodiment of the present disclosure includes a method, comprising:

interpreting a user selection comprising at least one data value comprising at least a portion of a document, and wherein the at least one data value comprises at least one of a reference or a link to an external source data; creating a data view in response to the user selection; and displaying at least a portion of the data view in response to the user selection.

An embodiment of the present disclosure may further comprise interpreting a user data entry, providing an external source data option in response to the user data entry, updating at least a portion of the data view in response to the external source data option.

The external source data may comprise read-only data.

An embodiment of the present disclosure may further comprise interpreting a user data entry may comprise an edit of the at least one data value, and updating the external source data in response to the user data entry.

An embodiment of the present disclosure may further comprise performing the querying in response to a data update of the external source.

An embodiment of the present disclosure may further comprise querying the external source data, providing an update of the data view in response to the query, and updating the display in response to the updated data view.

An embodiment of the present disclosure may further comprise performing the querying in response to an update time expiration.

An embodiment of the present disclosure may further comprise performing the querying in response to a notification from an external device hosting the external source.

An embodiment of the present disclosure may further comprise performing the querying in response to one of a change in a second data value or a creation of a second data value, the second data value having a dependency on the external source data.

An embodiment of the present disclosure may further comprise performing the querying in response to one of a change in an object or a creation of an object, the object having a dependency on the external source data.

An embodiment of the present disclosure may further comprise breaking the at least one of the link or reference after the operation to create the data view.

The user selection may comprise a data source identifier.

The data source identifier may comprise at least one data source identifier selected from the list consisting of: a uniform resource locator; a network location; a file name; an external source application programming interface reference; and an external source access reference.

An embodiment of the present disclosure may further comprise interpreting a user data request value, and providing an external source data option in response to the user data request value, where the external source data option comprises the data source identifier.

The user data request value may consist of at least one of a content based request or a subject matter based request.

An embodiment of the present disclosure includes a method, comprising: accessing a data element; providing a first view in response to the data element, the first view comprising at least a portion of the data element; determining a visualization element (VE) in response to the data element, and further in response to at least one of: a user visualization selection or a user context value; and providing a second view in response to the VE and the data element.

The user visualization selection may comprise at least one value determined according to at least one operation selected from the operations consisting of: interpreting a user selection value comprising a primary table and a secondary table; interpreting a user selection value comprising at least one value selected from the values consisting of: a row selection, a column selection, and a data value selection; determining a plurality of discrete options in response to the user context value, and interpreting a user selection value comprising at least one of the discrete options; determining a plurality of discrete options in response to at least one parameter selected from the parameters consisting of: a document type value, a document location value, a prior user operation, a template data association value, and a user selected data association value; and interpreting a user selection value comprising at least one of the discrete options; determining at least one continuous option in response to the user context value, and interpreting a user selection value comprising the at least one continuous option; and determining at least one continuous option in response to at least one parameter selected from the parameters consisting of: a document type value, a document location value, a prior user operation, a template data association value, and a user selected data association value; and interpreting a user selection value comprising the at least one continuous option.

An embodiment of the present disclosure may further comprise determining the user visualization selection in response to a user control input.

The user control input may comprise a user selection value from a plurality of discrete options.

An embodiment of the present disclosure may further comprise determining at least one profile value in response to the user control input, wherein the profile value comprises at least one profile value selected from the profile values consisting of: a sorting profile, a data hierarchy profile, a filtering profile, an aggregating profile, and a formatting profile; and determining the VE further in response to the profile value.

An embodiment of the present disclosure may further comprise determining the plurality of discrete options in response to at least one parameter selected from the parameters consisting of: a time value, a selected range of time values, a data field value, a selected range of data field values, a data reference value, and a selected range of values corresponding to the data reference value.

The user control input may comprise a user selection value from at least one continuous option.

An embodiment of the present disclosure may further comprise determining at least one profile value in response to the at least one continuous option, wherein the profile value comprises at least one profile value selected from the profile values consisting of: a sorting profile, a data hierarchy profile, a filtering profile, an aggregating profile, and a formatting profile; and determining the VE further in response to the profile value.

The at least one continuous option may comprise a time display, and wherein the user control input comprises at least one of a time value or a selected range of time values.

The at least one continuous option may comprise a data field display, and wherein the user control input comprises at least one of a selected data field value corresponding to the data field display or a selected range of data field values corresponding to the data field display.

The at least one continuous option may comprise a data reference value, and wherein the user control input comprises at least one of a selected data reference value or a selected range of values corresponding to the selected data reference value.

The VE may comprise at least one VE selected from the VEs consisting of: a graph, a chart, a structured data view, a display of text, a table, a table row, a table column, a table heading, a format option for any of the preceding, and a format option for at least a portion of any of the preceding.

An embodiment of the present disclosure may further comprise determining the VE in response to a user entered formula.

An embodiment of the present disclosure may further comprise determining at least one profile value in response to the user entered formula, wherein the profile value comprises at least one profile value selected from the profile values consisting of: a sorting profile, a data hierarchy profile, a filtering profile, an aggregating profile, and a formatting profile; and determining the VE further in response to the profile value.

The VE may comprise a format option for at least a portion of a display of text.

An embodiment of the present disclosure may further comprise determining the VE in response to a user entered formula.

An embodiment of the present disclosure may further comprise interpolating between a plurality of format options for at least a portion of the display of text.

The VE may comprise at least one of a graph or a chart, the method further comprising adjusting the second view in response to a user change input.

An embodiment of the present disclosure may further comprise updating the data element in response to the user change input.

The user change input may comprise a user interaction with a graphical element of the one of the graph or the chart.

The VE may comprise one of an output table and a structured data view, the method further comprising adjusting the second view in response to a user change input.

An embodiment of the present disclosure may further comprise updating the data element in response to the user change input.

An embodiment of the present disclosure may further comprise determining the user change input in response to a drag-and-drop operation.

The adjusting may comprise at least one operation selected from the operations consisting of: re-sorting at least a portion of the second view, changing a hierarchy of at least a portion of the second view, filtering at least a portion of the second view, aggregating data comprising at least a portion of the second view, inheriting a format from a portion of the data element and applying the inherited format to at least a portion of the second view, inheriting a format from an object selected in the drag-and-drop operation and applying the inherited format to at least a portion of the second view.

The adjusting may comprise inheriting a visualization parameter from an object selected in the drag-and-drop operation and applying the inherited visualization parameter to at least a portion of the second view.

The object may comprise at least one object selected from the objects consisting of: a data value, a graph, a chart, a table, a table row, and a table column.

The visualization parameter may comprise at least one parameter selected from the parameters consisting of: a sorting description, a filtering description, a formatting description, an aggregation description, and a display value description.

An embodiment of the present disclosure includes a system, comprising: a document server structured to communicate at least a portion of a document to a client computing device, the document comprising a data element; the client computing device, comprising: a user display circuit structured to provide a first view in response to the data element, the first view comprising at least a portion of the data element; a visualization tool (VT) circuit structured to determine a visualization element (VE) in response to the data element, and further in response to at least one of: a user visualization selection or a user context value; and wherein the user display circuit is further structured to provide a second view in response to the VE and the data element.

The VT circuit may be further structured to interpret a user selection value comprising a primary table and a secondary table, and to determine the VE further in response to the user selection value.

The VT circuit may be further structured to: interpret a user selection value comprising at least one value selected from the values consisting of: a row selection, a column selection, and a data value selection; and determine the VE further in response to the user selection value.

The VT circuit may be further structured to: determine a plurality of discrete options in response to the user context value; interpret a user selection value comprising at least one of the discrete options; and determine the VE further in response to the user selection value.

The VT circuit may be further structured to: determine a plurality of discrete options in response to at least one parameter selected from the parameters consisting of: a document type value, a document location value, a prior user operation, a template data association value, and a user selected data association value; interpreting a user selection value comprising at least one of the discrete options; and determine the VE further in response to the user selection value.

The VT circuit may be further structured to: determine at least one continuous option in response to the user context value; interpret a user selection value comprising at least one of the discrete options; and determine the VE further in response to the user selection value.

The VT circuit may be further structured to: determine at least one continuous option in response to at least one parameter selected from the parameters consisting of: a document type value, a document location value, a prior user operation, a template data association value, and a user selected data association value; interpret a user selection value comprising at least one of the continuous options; and determine the VE further in response to the user selection value.

The VT circuit may be further structured to determine the user visualization selection in response to a user control input.

The user control input may comprise a user selection value from a plurality of discrete options.

The VT circuit is further structured to: determine at least one profile value in response to the user control input, wherein the profile value comprises at least one profile value selected from the profile values consisting of: a sorting profile, a data hierarchy profile, a filtering profile, an aggregating profile, and a formatting profile; and determine the VE further in response to the profile value.

The VT circuit may be further structured to determine the plurality of discrete options in response to at least one parameter selected from the parameters consisting of: a time value, a selected range of time values, a data field value, a selected range of data field values, a data reference value, and a selected range of values corresponding to the data reference value.

The user control input may comprise a user selection value from at least one continuous option.

The VT circuit may be further structured to: determine at least one profile value in response to the user control input, wherein the profile value comprises at least one profile value selected from the profile values consisting of: a sorting profile, a data hierarchy profile, a filtering profile, an aggregating profile, and a formatting profile; and determine the VE further in response to the profile value.

The at least one continuous option may comprise a time display, and wherein the user control input comprises at least one of a time value or a selected range of time values.

The at least one continuous option may comprise a data field display, and wherein the user control input comprises at least one of a selected data field value corresponding to the data field display or a selected range of data field values corresponding to the data field display.

The at least one continuous option may comprise a data reference value, and wherein the user control input comprises at least one of a selected data reference value or a selected range of values corresponding to the selected data reference value.

The VE may comprise at least one VE selected from the VEs consisting of: a graph, a chart, a structured data view, a display of text, a table, a table row, a table column, a table heading, a format option for any of the preceding, and a format option for at least a portion of any of the preceding.

The VT circuit may be further structured to determine the VE in response to a user entered formula.

The VT circuit may be further structured to: determine at least one profile value in response to the user entered formula, wherein the profile value comprises at least one profile value selected from the profile values consisting of: a sorting profile, a data hierarchy profile, a filtering profile, an aggregating profile, and a formatting profile; and determine the VE further in response to the profile value.

The VE may comprise a format option for at least a portion of a display of text.

The VT circuit may be further structured to determine the VE in response to a user entered formula.

The VT circuit may be further structured to interpolate between a plurality of format options for at least a portion of the display of text.

The VE may comprise at least one of a graph or a chart, and wherein the VT circuit is further structured to adjust the second view in response to a user change input.

The VT circuit may be further structured to update the data element in response to the user change input.

The user change input may comprise a user interaction with a graphical element of the one of the graph or the chart.

The VE may comprise one of an output table and a structured data view, and wherein the VT circuit is further structured to adjust the second view in response to a user change input.

The client computing device may further comprise a data management circuit structured to update the data element in response to the user change input.

The VT circuit may be further structured to determine the user change input in response to a drag-and-drop operation.

The VT circuit may be further structured to adjust the second view by re-sorting at least a portion of the second view.

The VT circuit may be further structured to adjust the second view by changing a hierarchy of at least a portion of the second view.

The VT circuit may be further structured to adjust the second view by filtering at least a portion of the second view.

The VT circuit may be further structured to adjust the second view by aggregating data comprising at least a portion of the second view.

The VT circuit may be further structured to adjust the second view by inheriting a format from a portion of the data element and applying the inherited format to at least a portion of the second view.

The VT circuit may be further structured to adjust the second view by inheriting a format from an object selected in the drag-and-drop operation and applying the inherited format to at least a portion of the second view.

The VT circuit may be further structured to adjust the second view by inheriting a visualization parameter from an object selected in the drag-and-drop operation and applying the inherited visualization parameter to at least a portion of the second view.

The object may comprise at least one object selected from the objects consisting of: a data value, a graph, a chart, a table, a table row, and a table column.

The visualization parameter may comprise at least one parameter selected from the parameters consisting of: a sorting description, a filtering description, a formatting description, an aggregation description, and a display value description.

An embodiment of the present disclosure includes a method, comprising: interpreting a user notification profile value comprising a notification trigger value and a notification response value; interpreting a data value comprising at least a portion of a document; determining whether an event trigger has occurred in response to the notification trigger value and the data value; and providing a notification to a user in response to the event trigger and the notification response value.

The notification trigger value may comprise a keyword, and wherein the determining whether the event trigger has occurred comprises determining whether another user has performed one of: entering, editing, or deleting the keyword in the document.

The notification trigger value may comprise an update value for at least one parameter in the data value, and wherein the determining whether the event trigger has occurred comprises determining whether the update value indicates the at least one parameter has been updated.

The notification trigger value may comprise a status value for at least one parameter in the data value, and wherein the determining whether the event trigger has occurred comprises at least one operation selected from the operations consisting of: determining the status value has changed; determining the status value has updated; determining the status value is equal to a predetermined value; determining the status value has exceeded a predetermined threshold; and determining the status value has fallen below a predetermined threshold.

The notification trigger value may comprise at least one value selected from the values consisting of: a predetermined time period; a predetermined external event occurrence; a predetermined specific user accessing the document; a predetermined user role accessing the document; a predetermined document object edit value; and a predetermined document section edit value.

The notification trigger value may comprise a process state value.

The process state value may comprise at least one value selected from the values consisting of: a recruiting process state value; a project milestone value; a task occurrence value; a task progression value; an order occurrence value; an order validity value; a design change request value; and a problem report value.

The notification trigger value may comprise a status value for at least one parameter in a location selected from: the data value, the document, and a source data.

The determining whether the event trigger has occurred may comprise at least one operation selected from the operations consisting of: determining the status value has changed; determining the status value has updated; determining the status value is equal to a predetermined value; determining the status value has exceeded a predetermined threshold; and determining the status value has fallen below a predetermined threshold.

The notification response value may comprise a notification type value and a notification location value.

The notification type value may comprise at least one value selected from the values consisting of: an e-mail definition; a message definition; a document edit definition; and an application message definition.

The notification location value may comprise at least one value selected from the values consisting of: an e-mail address; a messaging address; a document edit location; a document object identifier; a document section identifier; an application username; an identifier associated with the user; and an identifier associated with a predetermined entity.

The providing the notification response to the user may comprise sending an alert that is sent to a mobile device of the user.

The notification response value may comprise a notification type value and a notification location value, and wherein the notification type value comprises the alert, and wherein the notification location value comprises a communication channel to the mobile device of the user.

The alert may activate a graphical user interface of the mobile device to cause the alert to display on the mobile device and to enable connection with the graphical user interface when the mobile is activated.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a user notification rules circuit structured to interpret a user notification profile value comprising a notification trigger value and a notification response value; a data management circuit structured to interpret the data value; a user notification circuit structured to determine whether an event trigger has occurred in response to the notification trigger value and the data value; and a user interaction circuit structured to provide a notification to a user in response to the event trigger and the notification response value.

The notification trigger value may comprise a keyword, and wherein the user notification circuit is further structured to determine whether the event trigger has occurred by determining whether another user has performed one of: entering, editing, or deleting the keyword in the document.

The notification trigger value may comprise an update value for at least one parameter in the data value, and wherein the user notification circuit is further structured to determine whether the event trigger has occurred by determining whether the update value indicates the at least one parameter has been updated.

The notification trigger value may comprise a status value for at least one parameter in the data value, and wherein the user notification circuit is further structured to determine whether the event trigger has occurred by performing at least one operation selected from the operations consisting of: determining the status value has changed; determining the status value has updated; determining the status value is equal to a predetermined value; determining the status value has exceeded a predetermined threshold; and determining the status value has fallen below a predetermined threshold.

The notification trigger value may comprise at least one value selected from the values consisting of: a predetermined time period; a predetermined external event occurrence; a predetermined specific user accessing the document; a predetermined user role accessing the document; a predetermined document object edit value; and a predetermined document section edit value.

The notification trigger value may comprise a process state value.

The process state value may comprise at least one value selected from the values consisting of: a recruiting process state value; a project milestone value; a task occurrence value; a task progression value; an order occurrence value; an order validity value; a design change request value; and a problem report value.

The notification trigger value may comprise a status value for at least one parameter in a location selected from: the data value, the document, and a source data.

The user notification circuit may be further structured to determine whether the event trigger has occurred by performing at least one operation selected from the operations consisting of: determining the status value has changed; determining the status value has updated; determining the status value is equal to a predetermined value; determining the status value has exceeded a predetermined threshold; and determining the status value has fallen below a predetermined threshold.

The notification response value may comprise a notification type value and a notification location value.

The notification type value may comprise at least one value selected from the values consisting of: an e-mail definition; a message definition; a document edit definition; and an application message definition.

The notification location value may comprise at least one value selected from the values consisting of: an e-mail address; a messaging address; a document edit location; a document object identifier; a document section identifier; an application username; an identifier associated with the user; and an identifier associated with a predetermined entity.

The user interaction circuit may be structured to provide the notification as an alert that is sent to a mobile device of the user.

The notification response value may comprise a notification type value and a notification location value, and wherein the notification type value comprises the alert, and wherein the notification location value comprises a communication channel to the mobile device of the user.

The alert may activate a graphical user interface of the mobile device to cause the alert to display on the mobile device and to enable connection with the graphical user interface when the mobile is activated.

An embodiment of the present disclosure includes a method, comprising: interpreting a user notification profile value comprising a notification trigger value and a notification response value, wherein the notification response value comprises an action link definition and a notification location value; interpreting a data value comprising at least a portion of a document; determining whether an event trigger has occurred in response to the notification trigger value and the data value; and providing a notification to a user in response to the event trigger and the notification response value.

An embodiment of the present disclosure may further comprise, in response to a user selection of the action link, performing at least one operation selected from the operations consisting of: scheduling a calendar entry for the user; requesting a calendar entry for an entity other than the user; calling an entity determined in response to the action link definition; ordering one of a product or a service in response to the action link definition; and assigning a task to an entity in response to the action link definition.

An embodiment of the present disclosure may further comprise interpreting a user action request value, and in response to the user action request value, updating the action link definition.

An embodiment of the present disclosure may further comprise interpreting a user location value, and determining the action link definition in response to the user location value.

An embodiment of the present disclosure may further comprise, in response to a user selection of the action link, performing at least one operation selected from the operations consisting of: scheduling a calendar entry for the user; requesting a calendar entry for an entity other than the user; calling an entity determined in response to the action link definition; ordering one of a product or a service in response to the action link definition; and assigning a task to an entity in response to the action link definition.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a user notification rules circuit structured to interpret a user notification profile value comprising a notification trigger value and a notification response value, wherein the notification response value comprises an action link definition and a notification location value; a data management circuit structured to interpret the data value; a user notification circuit structured to determine whether an event trigger has occurred in response to the notification trigger value and the data value; and a user interaction circuit structured to provide a notification to a user in response to the event trigger and the notification response value.

The user interaction circuit may be further structured, in response to a user selection of the action link, to perform at least one operation selected from the operations consisting of: scheduling a calendar entry for the user; requesting a calendar entry for an entity other than the user; calling an entity determined in response to the action link definition; ordering one of a product or a service in response to the action link definition; and assigning a task to an entity in response to the action link definition.

An embodiment of the present disclosure may further comprise interpreting a user action request value, and in response to the user action request value, updating the action link definition.

An embodiment of the present disclosure may further comprise interpreting a user location value, and determining the action link definition in response to the user location value.

An embodiment of the present disclosure may further comprise in response to a user selection of the action link, performing at least one operation selected from the operations consisting of: scheduling a calendar entry for the user; requesting a calendar entry for an entity other than the user; calling an entity determined in response to the action link definition; ordering one of a product or a service in response to the action link definition; and assigning a task to an entity in response to the action link definition.

An embodiment of the present disclosure includes a system, comprising: a first computing device at least intermittently communicatively coupled to a second computing device; the first computing device comprising a document server, the document server further comprising a client resource circuit structured to determine a client resource value, and the document server structured to communicate a data value to the second computing device in response to the client resource value, the data value comprising at least a portion of a document; the second computing device comprising: a user display circuit structured to determine a document view in response to the data value, and to provide the document view to a user; a unified document surface application circuit structured to interpret a first user input comprising an edit to the data value; and a document synchronization circuit structured to communicate the first user input to the first computing device.

The client resource value may comprise at least one value selected from the values consisting of: a user device screen size, a user device input type, a user device resource parameter, and a user device communication value.

The client resource circuit may be further structured to configure document calculation operations to limit calculations performed on the second computing device.

The client resource circuit may be further structured to configure document calculation operations to limit calculations performed on the second computing device in response to a target response time of the second client computing device.

The client resource circuit may be further structured to adjust at least one document object in response to the user device screen size.

The user display circuit may be further structured to determine the client resource value, and wherein the user display circuit adjusts the document view in response to the client resource value.

The user display circuit may be further structured to adjust a menu display in response to the client resource value.

The document synchronization circuit may be further structured to allow optimistic updates of the data value in response to at least one of: a slow communication between the document server and the second computing device or a loss of communication between the document server and the second computing device.

The client resource circuit may be further structured to perform one of increasing or decreasing an amount of flat data in the data value in response to the client resource value.

An embodiment of the present disclosure includes a method, comprising: determining a client resource value; communicating a data value from a document server to a second computing device, where the data value comprises at least a portion of a document in response to the client resource value; determining a document view in response to the data value; providing the document view to a user; interpreting a first user input comprising an edit to the data value; and communicating the first user input to the document server from the second computing device.

The client resource value may comprise at least one value selected from the values consisting of: a user device screen size, a user device input type, a user device resource parameter, and a user device communication value.

An embodiment of the present disclosure may further comprise configuring document calculation operations to limit calculations performed on the second computing device.

An embodiment of the present disclosure may further comprise configuring document calculation operations to limit calculations performed on the second computing device in response to a target response time of the second client computing device.

An embodiment of the present disclosure may further comprise adjusting at least one document object in response to the user device screen size.

An embodiment of the present disclosure may further comprise determining the client resource value, and further adjusting the document view in response to the client resource value.

An embodiment of the present disclosure may further comprise adjusting a menu display in response to the client resource value.

An embodiment of the present disclosure may further comprise allowing optimistic updates of the data value in response to at least one of: a slow communication between the document server and the second computing device or a loss of communication between the document server and the second computing device.

An embodiment of the present disclosure may further comprise performing one of increasing or decreasing an amount of flat data in the data value in response to the client resource value.

An embodiment of the present disclosure includes a method, comprising: interpreting a user external data reference value and a display location selection value; accessing an external data source in response to the user external data reference value; performing a display enrichment operation in response to the external data source and the display location selection value; and providing an enriched display value in response to the display location selection value and the display enrichment operation.

The user external data reference value may comprise at least one value selected from the values consisting of: a uniform resource locator; a website name; a database identifier; a document identifier; a data reference value; a data link value; a path identifier; a filename identifier; a file transfer protocol identifier; and a user reference selection.

The display location selection value may comprise at least one location value selected from the location values comprising: a table cell value; a table column value; an object identifier value; and a document location value.

The performing the display enrichment operation may comprise performing a data transform operation on at least one data value from the external data source.

The performing the display enrichment operation may further comprise: determining a plurality of candidate data transform operations; providing the plurality of candidate data transform operations to a user; interpreting a user selection of the plurality of candidate data transform operations; and wherein the performing the display enrichment operation is in response to the user selection of the plurality of candidate data transform operations.

An embodiment of the present disclosure may further comprise providing a preview of at least one of the plurality of candidate data transform operations to the user.

The determining a plurality of candidate data transform operations may be in response to at least one of: the user external data reference value; the display location selection value; a previous user selection of the plurality of candidate data transform operations; a predetermined list of candidate data transform operations; a data type of accessed data from the external data source; an external data transform operation provided by the external data source; and a context value.

An embodiment of the present disclosure may further comprise accessing the external data source, and storing data from the external data source in a datastore, and wherein the performing a display enrichment operation in response to the external data source comprises accessing the datastore.

An embodiment of the present disclosure may further comprise updating the enriched display value in response to a change in the external data source.

An embodiment of the present disclosure may further comprise determining that an external data source is not presently available, and delaying the performing the display enrichment operation until the external data source is available.

An embodiment of the present disclosure may further comprise interpreting a user data edit operation comprising an edit to the enriched display value, and updating the external data source in response to the user data edit operation.

An embodiment of the present disclosure may further comprise storing an external data source configuration value, the external data source configuration value comprising access information corresponding to the external data source, and wherein the accessing the external data source comprises accessing the external data source configuration value. The external data source configuration value may comprise a system table.

An embodiment of the present disclosure includes a system, comprising: a document server structured to communicate at least a portion of a document to a client computing device; the client computing device comprising: a user interaction circuit structured to interpret a user external data reference value and a display location selection value; an external data access circuit structured to access an external data source in response to the user external data reference value; a data enrichment circuit structured to performing a display enrichment operation in response to the external data source and the display location selection value; and a user display circuit structured to provide an enriched display value in response to the display location selection value and the display enrichment operation.

The user external data reference value may comprise at least one value selected from the values consisting of: a uniform resource locator; a website name; a database identifier; a document identifier; a data reference value; a data link value; and a user reference selection.

The display location selection value may comprise at least one location value selected from the location values comprising: a table cell value; a table column value; an object identifier value; and a document location value, and including wherein data enrichment circuit is further structured to perform the display enrichment operation by performing a data transform operation on at least one data value from the external data source, and/or the data enrichment circuit is further structured to perform the display enrichment operation by: determining a plurality of candidate data transform operations; providing the plurality of candidate data transform operations to a user; interpreting a user selection of the plurality of candidate data transform operations; and further performing the display enrichment operation in response to the user selection of the plurality of candidate data transform operations.

The user display circuit may be further structured to provide preview of at least one of the plurality of candidate data transform operations to the user.

The data enrichment circuit may be further structured to determine the plurality of candidate data transform operations in response to at least one of: the user external data reference value; the display location selection value; a previous user selection of the plurality of candidate data transform operations; a predetermined list of candidate data transform operations; a data type of accessed data from the external data source; an external data transform operation provided by the external data source; and a context value.

The external data access circuit may be further structured to access the external data source, to store data from the external data source in a datastore, and wherein the data enrichment circuit is further structured to perform the display enrichment operation in response to the external data source by accessing the datastore.

The user display circuit may be further structured to update the enriched display value in response to a change in the external data source.

The external data access circuit may be further structured to determine that an external data source is not presently available, and wherein the data enrichment circuit is further structured to delay the performing the display enrichment operation until the external data source is available.

The user interaction circuit may be further structured to interpret a user data edit operation comprising an edit to the enriched display value, and wherein the external data access circuit is further structured to update the external data source in response to the user data edit operation.

The external data access circuit may be further structured to store an external data source configuration value, the external data source configuration value comprising access information corresponding to the external data source, and to access the external data source further by accessing the external data source configuration value.

The external data source configuration value may comprise a system table.

An embodiment of the present disclosure includes a method, comprising: interpreting a table grouping input value associated with a table, wherein the table comprises a plurality of categories and a plurality of associated data sets corresponding to the plurality of categories; determining an aggregation value in response to the table grouping input value, wherein the aggregation value corresponds to at least one of the plurality of categories; and in response to the aggregation value, providing an aggregated table view.

The interpreting the table grouping input value may comprise: providing an aggregation user interface element to a user; interpreting a user selection value in response to the aggregation user interface element; and determining an aggregation profile in response to the user selection value; and wherein the determining the aggregation value is further in response to the aggregation profile.

The aggregation profile may comprise at least one of the categories for aggregation.

The aggregation profile may comprise an aggregation scheme for the plurality of associated data sets.

The aggregation scheme may comprise at least one scheme selected from the schemes consisting of: qualitative aggregation of associated data sets according to at least one of the categories; quantitative aggregation of associated data sets according to at least one of the categories; and binned aggregation of associated data sets according to at least one of the categories.

The aggregation scheme may comprise a nested aggregation of associated data sets according to at least two of the categories.

The aggregation scheme may comprise at least one scheme selected from the schemes consisting of: an associated data set count according to at least one of the categories; a sum of associated data sets according to at least one of the categories; an average of associated data sets according to at least one of the categories; an applied function of associated data sets according to at least one of the categories; an applied formatting of associated data sets according to at least one of the categories; and combinations of any two or more of the foregoing.

An embodiment of the present disclosure may further comprise storing at least one of the aggregation scheme or the aggregation profile on an operation log.

An embodiment of the present disclosure may further comprise determining an aggregation formula to provide the aggregation value, and storing the aggregation formula on an operation log.

An embodiment of the present disclosure may further comprise storing the aggregation value on the operation log.

The aggregation user interface element may comprise at least one element selected from the elements consisting of: a dedicated aggregation input element; a table supercell; a table category heading; a toolbar interface element; a menu interface element; and a context triggered element.

The table input grouping value may comprise at least one value selected from the values consisting of: a user selection of a dedicated aggregation input element; a user drag operation to a table supercell; a user drag operation of a table supercell; a user drag operation including an element of a first table and an element of a second table; a user menu interface element selection; and a user selection of a context triggered element.

The interpreting a table grouping input value may comprise interpreting a user drag operation including at least two data values, and wherein the determining the aggregation value comprises preserving original values for the at least two data values.

An embodiment of the present disclosure may further comprise interpreting a user data edit value corresponding to one of the plurality of associated data sets viewable in the aggregated table view, and updating at least one data value on the table in response to the user data edit value.

An embodiment of the present disclosure may further comprise determining change operations of the user in response to the user data edit value, and storing the determined change operations on an operation log.

An embodiment of the present disclosure may further comprise updating the operation log, wherein the updating comprises determining a reduced set of operations from the change operations, and replacing the change operations with the reduced set of operations.

An embodiment of the present disclosure includes a system, comprising: a user interaction circuit structured to interpret a table grouping input value associated with at least one table, the table comprising a plurality of categories and a plurality of associated data sets corresponding to the plurality of categories; a table aggregation circuit structured to determine an aggregation value in response to the table grouping input value, wherein the aggregation value corresponds to at least one of the plurality of categories; and wherein the user interaction circuit is further structured to provide an aggregated table view in response to the aggregation value.

The user interaction circuit may be further structured to interpret the table grouping input value by performing at least one operation selected from the operations consisting of: providing an aggregation user interface element to a user; interpreting a user selection value in response to the aggregation user interface element; and determining an aggregation profile in response to the user selection value; and wherein the table aggregation circuit is further structured to determine the aggregation value further in response to the aggregation profile.

The aggregation profile may comprise at least one of the categories for aggregation.

The aggregation profile may comprise an aggregation scheme for the plurality of associated data sets.

The aggregation scheme may comprise at least one scheme selected from the schemes consisting of: qualitative aggregation of associated data sets according to at least one of the categories; quantitative aggregation of associated data sets according to at least one of the categories; and binned aggregation of associated data sets according to at least one of the categories.

The aggregation scheme may comprise a nested aggregation of associated data sets according to at least two of the categories.

The aggregation scheme may comprise at least one scheme selected from the schemes consisting of: an associated data set count according to at least one of the categories; a sum of associated data sets according to at least one of the categories; an average of associated data sets according to at least one of the categories; an applied function of associated data sets according to at least one of the categories; an applied formatting of associated data sets according to at least one of the categories; and combinations of any two or more of the foregoing.

The aggregation user interface element may comprise at least one element selected from the elements consisting of: a dedicated aggregation input element; a table supercell; a table category heading; a toolbar interface element; a menu interface element; and a context triggered element.

The table input grouping value may comprise at least one value selected from the values consisting of: a user selection of a dedicated aggregation input element; a user drag operation to a table supercell; a user drag operation of a table supercell; a user drag operation including an element of a first table and an element of a second table; a user menu interface element selection; and a user selection of a context triggered element.

The user interaction circuit may be further structured to interpret a table grouping input value by interpreting a user drag operation including at least two data values, and wherein the table aggregation circuit is further structured to determine the aggregation value by preserving original values for the at least two data values.

The user interaction circuit may be further structured to interpret a user data edit value corresponding to one of the plurality of associated data sets viewable in the aggregated table view, and to update at least one data value on the table in response to the user data edit value.

An embodiment of the present disclosure includes a system, comprising: a computing device, comprising: a unified document application circuit structured to interpret a user table input value, the user table input value comprising a plurality of table data values; a table management circuit structured to determine a table organization value in response to the table data values, wherein the table organization value comprises at least one value selected from the values consisting of: a column naming scheme; a sorting scheme; a filtering scheme; an aggregation scheme; and a formatting scheme; and a user display circuit structured to provide a table view in response to the table organization value.

The unified document application circuit may be further structured to interpret a user formula value, wherein the user formula value does not include a row reference, wherein the table management circuit is further structured to update the table organization value in response to the user formula value, and wherein the user display circuit is further structured to update the table view in response to the table organization value.

The table management circuit may be further structured to update the table organization value by applying the user formula value to an entire column of the table.

The table management circuit may be further structured to select the entire column of the table in response to an operation selected from: a drag-and-drop operation of the user formula value to the column; a user formula entry tool selection, wherein the formula entry tool comprises a graphical user interface associated with the column; and a formula value referencing the column.

The table management circuit may be further structured to select the entire column of the table in response to a formula value referencing the column, wherein the table is posi-tioned on a canvas, and wherein the formula value is positioned on the canvas separate from the table.

The table management circuit may be further structured to disambiguate between two columns having an identical display name.

The table organization value may comprise the sorting scheme, wherein the unified document application circuit is further structured to interpret a further user table input value, and wherein the table management circuit is further structured to update the sorting scheme in response to the further user table input value.

The table management circuit may be further structured to update the sorting scheme by performing an operation selected from the operations consisting of: continuously updating the sorting scheme as the user provides the further user table input value; updating the sorting scheme in response to the user selecting a different row of the table; and updating the sorting scheme in response to the user completing a data value entry on the table.

The table organization value may comprise the filtering scheme, wherein the unified document application circuit is further structured to interpret a further user table input value, and wherein the table management circuit is further structured to update the filtering scheme in response to the further user table input value.

The table management circuit may be further structured to update the filtering scheme by performing an operation selected from the operations consisting of: continuously updating the filtering scheme as the user provides the further user table input value; updating the filtering scheme in response to the user selecting a different row of the table; and updating the filtering scheme in response to the user completing a data value entry on the table.

The table organization value may comprise the aggrega-tion scheme, wherein the unified document application circuit is further structured to interpret a further user table input value comprising a dragging operation to add columns, and wherein the table management circuit is further structured to update the aggregation scheme in response to the dragging operation.

The table management circuit may be further structured to name the added columns.

The table management circuit may be further structured to provide a primary key associated to at least one of the added columns.

The column name and the primary key for the at least one added column may be stored in an operation log.

The column name may comprise a mask for user display.

The computing device may utilize the primary key for operating calculations on the added column.

An embodiment of the present disclosure includes a method, comprising: interpreting a user table input value, the user table input value comprising a plurality of table data values; determining a table organization value in response to the table data values, wherein the table organization value comprises at least one value selected from the values con-sisting of: a column naming scheme; a sorting scheme; a filtering scheme; an aggregation scheme; and a formatting scheme; and providing a table view in response to the table organization value. An embodiment of the present disclosure may further comprise interpreting a user formula value, where the user formula value does not include a row reference, updating the table organization value in response to the user formula value, and updating the table view in response to the table organization value.

An embodiment of the present disclosure may further comprise updating the table organization value by applying the user formula value to an entire column of the table.

An embodiment of the present disclosure may further comprise selecting the entire column of the table in response to an operation selected from: a drag-and-drop operation of the user formula value to the column; a user formula entry tool selection, wherein the formula entry tool comprises a graphical user interface associated with the column; and a formula value referencing the column.

An embodiment of the present disclosure may further comprise selecting the entire column of the table in response to a formula value referencing the column, wherein the table is positioned on a canvas, and wherein the formula value is positioned on the canvas separate from the table.

An embodiment of the present disclosure may further comprise disambiguating between two columns having an identical display name.

The table organization value may comprise the sorting scheme, the method further comprising interpreting a further user table input value, and updating the sorting scheme in response to the further user table input value.

An embodiment of the present disclosure may further comprise updating the sorting scheme by performing an operation selected from the operations consisting of: continuously updating the sorting scheme as the user provides the further user table input value; updating the sorting scheme in response to the user selecting a different row of the table; and updating the sorting scheme in response to the user completing a data value entry on the table.

The table organization value may comprise the filtering scheme, the method further comprising interpreting a further user table input value, and updating the filtering scheme in response to the further user table input value.

An embodiment of the present disclosure may further comprise updating the filtering scheme by performing an operation selected from the operations consisting of: continuously updating the filtering scheme as the user provides the further user table input value; updating the filtering scheme in response to the user selecting a different row of the table; and updating the filtering scheme in response to the user completing a data value entry on the table.

The table organization value may comprise the aggregation scheme, the method further comprising interpreting a further user table input value comprising a dragging operation to add columns, and updating the aggregation scheme in response to the dragging operation.

An embodiment of the present disclosure may further comprise naming the added columns.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising:

a user interaction circuit structured to interpret a user reference entry; a reference management circuit structured to determine a reference return value in response to the user reference entry; and a user display circuit structured to determine a document view in response to the reference return value, and to provide the document view to a user.

The user reference entry may comprise at least one value selected from the values consisting of: a formula entry value, a reference request value, and a keyword request value.

The reference return value may comprise at least one value selected from the values consisting of: a table column name value; an object primary key value; an object name value; a mask value comprising an object name value for display and a primary key value; a scope selection value; and a list of any one or more of the foregoing.

The user reference entry may comprise a reference to a source data comprising an external source, and wherein the reference management circuit is further structured to update a reference parameter in response to a change in the external source.

The reference management circuit may be further structured to determine a reference ambiguity condition, and wherein the reference return value comprises a disambiguation value.

The reference return value may further comprise a plurality of disambiguation values, and wherein the user display circuit is further structured to determine the document view further in response to the plurality of disambiguation values.

The reference return value may comprise at least one value selected from the values consisting of: an object name, an object method, and a dereferencing option value.

An embodiment of the present disclosure includes a method, comprising: interpreting a user reference entry; determining a reference return value in response to the user reference entry;

determining a document view in response to the reference return value; and providing the document view to a user.

The user reference entry may comprise at least one value selected from the values consisting of: a formula entry value, a reference request value, and a keyword request value.

The reference return value may comprise at least one value selected from the values consisting of: a table column name value; an object primary key value; an object name value; a mask value comprising an object name value for display and a primary key value; a scope selection value; and a list of any one or more of the foregoing.

The user reference entry may comprise a reference to a source data comprising an external source, and the method further comprising updating a reference parameter in response to a change in the external source.

An embodiment of the present disclosure may further comprise determining a reference ambiguity condition, and wherein the reference return value comprises a disambiguation value.

The reference return value may further comprise a plurality of disambiguation values, the method further comprising determining the document view further in response to the plurality of disambiguation values.

The reference return value may comprise at least one value selected from the values consisting of: an object name, an object method, and a dereferencing option value.

An embodiment of the present disclosure includes a system, comprising: a first computing device communicatively coupled to a second computing device; the first computing device comprising a document server structured to communicate a data value to the second computing device, the data value comprising at least a portion of a document and further comprising a first table object and a second embedded table object; wherein each of the first table object and a second embedded table object comprise a corresponding table specific name, and wherein each of the first table object and the second embedded table object comprise a corresponding parent object name, wherein a first parent object name corresponding to the first table object comprises a distinct name from a second parent object name corresponding to the second embedded table object; and wherein the data value further comprises a table referencing value directed to the second embedded table object, wherein the table referencing value comprises a portion of a formula comprising a corresponding parent object name that is distinct from the first parent object name, and wherein a parent hierarchy for the table referencing value comprises the first parent object name.

The second embedded table object may comprise a table linked to the first table object.

The formula further may comprise a corresponding parent object name that is the second parent object name.

An embodiment of the present disclosure includes a system, comprising: a first computing device communicatively coupled to a second computing device; the first computing device comprising a document server structured to communicate a data value to the second computing device, the data value comprising at least a portion of a document and further comprising a first table object; wherein the first table object comprises at least one column and a plurality of row values corresponding to each of the at least one column, and wherein at least one of the plurality of row values comprises a second table object embedded in the first table object.

The at least one of the plurality of row values each may include one of the second table objects embedded in the first table object.

The data value may further comprise a formula, wherein the formula comprises a reference value to a column of each of the second table objects.

An embodiment of the present disclosure may further comprise a unified document application circuit structured to perform a column-wise operation on each of the second table objects in response to the formula, including wherein the at least one the plurality of row values each comprise an aggregation value.

An embodiment of the present disclosure includes a method, comprising: providing a first table object comprising a table specific name corresponding to the first table object and a first parent object name corresponding to the first table object; providing a second embedded table object comprising a table specific name corresponding to the second table object and a second parent object name corresponding to the second table object; wherein the first parent object name is distinct from the second parent object name; and processing a formula including a table referencing value directed to the second embedded table object, wherein the table referencing value comprises a corresponding parent object name that is distinct from the first parent object name, and relating a parent hierarchy for the table referencing value to the first parent object name.

The second embedded table object may comprise a table linked to the first table object.

The corresponding parent object name may be the second parent object name.

An embodiment of the present disclosure includes a method, comprising: providing a first table object, the first table object comprising at least one column and a plurality of row values corresponding to the at least one column; and providing at least one of the plurality of row values as a second table object embedded in the first table object.

An embodiment of the present disclosure may further comprise providing each of the plurality of row values as a second table object embedded in the first table object.

An embodiment of the present disclosure may further comprise processing a formula, wherein the formula comprises a reference value to a column of each of the second table objects.

An embodiment of the present disclosure may further comprise performing a column-wise operation on each of the second table objects in response to the formula, and wherein each of the at least one of the plurality of row values may comprise an aggregation value.

An embodiment of the present disclosure includes a system, comprising: a communication layer structured to provide access between a computing device and an external network; the computing device, comprising: an access interface circuit structured to expose a plurality of application programming interface (API) objects to the communication layer; wherein the plurality of API objects comprises a first API object configured to: interpret a table input value, the table input value comprising a plurality of table data values; determine a table organization value in response to the table data values, wherein the table organization value comprises at least one value selected from the values consisting of: a column naming scheme; a sorting scheme; a filtering scheme; an aggregation scheme; and a formatting scheme; determine a table view in response to the table organization value; and wherein the access interface circuit is further structured to receive the table input value over the communication layer, and to provide the table view to the communication layer.

The first API object may be further configured to: interpret a formula value, wherein the formula value does not include a row reference, to update the table organization value in response to the formula value, and to update the table view in response to the table organization value.

The first API object may be further configured to update the table organization value by applying the formula value to an entire column of the table data values.

The first API object may be further configured to: interpret a table grouping input value associated with the table data values, wherein the table data values comprise a plurality of categories and a plurality of associated data sets corresponding to the plurality of categories; determine an aggregation value in response to the table grouping input value, wherein the aggregation value corresponds to at least one of the plurality of categories; to update the table view in response to the aggregation value; and wherein the access interface circuit is further structured to receive the table grouping input value over the communication layer.

The first API object may be further configured to: determine an aggregation scheme, wherein the aggregation scheme comprises at least one scheme selected from the schemes consisting of: qualitative aggregation of associated data sets according to at least one of the categories; quantitative aggregation of associated data sets according to at least one of the categories; and binned aggregation of associated data sets according to at least one of the categories; and determine the aggregation value in response to the aggregation scheme.

The table input grouping value may comprise at least one value selected from the values consisting of: a selection of a dedicated aggregation input element; a drag operation to a table supercell; a drag operation of a table supercell; a drag operation including an element of a first table and an element of a second table; a menu interface element selection; and a selection of a context triggered element.

The plurality of API objects may further comprise a second API object configured to: interpret a data selection comprising at least one data value, wherein the data selection comprises at least one of a reference or a link to an external source data; create a data view in response to the data selection; and wherein the access interface circuit is further structured to receive the data selection over the communication layer, and to provide the data view to the communication layer.

The second API object may be further configured to: interpret a data entry; to provide an external source data option in response to the data entry; update at least a portion of the data view in response to the external source data option; and wherein the access interface circuit is further structured to receive the data entry over the communication layer.

The second API object may be further configured to: interpret a data entry comprising an edit of the at least one data value; and to update the external source data in response to the data entry.

The second API object may be further configured to query the external source data and to provide an update of the data view in response to the query.

The second API object may be further configured to perform the query operation in response to at least one of: an update time expiration; a notification from an external device hosting the external source; a change in a second data value having a dependency on the external source data; a change in an object having a dependency on the external source data; a creation of a second data value having a dependency on the external source data; and a creation of an object having a dependency on the external source data; and a request to provide a continuous update of the at least one data value.

The plurality of API objects may further comprise a third API object configured to: interpret a reference selection; determine a reference return value in response to the reference selection; determine a reference return display in response to the reference return value; and wherein the access interface circuit is further structured to receive the reference selection over the communication layer, and to provide the reference return display to the communication layer.

The third API object may be further configured to: determine the reference return value in response to at least one of: responsive information within a document, or responsive information within an external source data.

The source data may comprise a source data selected from the sources consisting of: a website, a database external to the document, a cloud storage location, a second identified document, and a network location.

An embodiment of the present disclosure includes a method, comprising: interpreting a user entry value comprising at least one character; in response to the user entry value, determining at least one candidate entry; and providing an autocompleted entry in response to a user selection of the at least one candidate entry.

An embodiment of the present disclosure may further comprise determining a list of candidate entries, and providing a plurality of candidate entries to the user in response to the list of candidate entries.

An embodiment of the present disclosure may further comprise providing a preview of at least one of the plurality of candidate entries to the user.

The preview may comprise at least one preview selected from the previews consisting of: contextual information related to the candidate entry; offset column data for a table related to the candidate entry; a related table column heading to the candidate entry; a related table name for the candidate entry; a related object name to the candidate entry; a related object heading to the candidate entry; and a related object value to the candidate entry.

The preview may comprise at least one preview selected from the previews consisting of: a result set for at least one of the candidate entries if the at least one candidate entry is selected; a result of a formula resulting from the candidate entry if selected; at least one row resulting from a sorting operation if the candidate entry is selected; at least one row resulting from a filtering operation if the candidate entry is selected; and a depiction of a resulting object if the candidate entry is selected.

An embodiment of the present disclosure includes a system, comprising: a first computing device at least intermittently communicatively coupled to a second computing device; the first computing device comprising a document server, the document server further comprising a client resource circuit structured to determine a client resource value, and the document server structured to communicate a data value to the second computing device in response to the client resource value, the data value comprising at least a portion of a document; the second computing device comprising: a unified document application circuit structured to interpret a user entry value comprising at least one character; a user display circuit structured to determine at least one candidate entry in response to the user entry value; and wherein the unified document surface application circuit is further structured to provide an autocompleted entry in response to a user selection of the at least one candidate entry.

The user display circuit may be further structured to determine a list of candidate entries, and to provide a plurality of candidate entries to the user in response to the list of candidate entries.

The user display circuit may be further structured to provide a preview of at least one of the plurality of candidate entries to the user.

The preview may comprise at least one preview selected from the previews consisting of: contextual information related to the candidate entry; offset column data for a table related to the candidate entry; a related table column heading to the candidate entry; a related table name for the candidate entry; a related object name to the candidate entry; a related object heading to the candidate entry; and a related object value to the candidate entry.

The preview may comprise at least one preview selected from the previews consisting of: a result set for at least one of the candidate entries if the at least one candidate entry is selected; a result of a formula resulting from the candidate entry if selected; at least one row resulting from a sorting operation if the candidate entry is selected; at least one row resulting from a filtering operation if the candidate entry is selected; and a depiction of a resulting object if the candidate entry is selected.

The preview may comprise at least one preview selected from the previews consisting of: help text; an impact of the user entry value; an impact of a candidate entry; a result of the user entry value; a result of a candidate entry; write-through results of the user entry value; and write-through results of a candidate entry.

An embodiment of the present disclosure includes a system, comprising: a document server communicatively coupled to at least one client computing device; a document comprising an operation log, wherein the operation log comprises at least one first sequential operation defining operations to create data values of the document; a formula engine, wherein the formula engine determines a calculation definition in response to at least one formula of the document; and a document object model, wherein the document object model comprises an object definition corresponding to each of a plurality of objects in the document; wherein the document is at least partially positioned on at least one of the document server and a first client computing device of the at least one client computing device.

A first version of the document may be positioned on the document server, and a second version of the document is positioned on the first client computing device, and wherein the first client computing device comprises an arbitration circuit structured to synchronize the first version of the document and the second version of the document, thereby creating an updated document.

An embodiment of the present disclosure may further comprise a second client computing device of the at least one client computing device, wherein a third version of the document is positioned on the second client computing device, and wherein the arbitration circuit is further structured to synchronize the first version of the document, the second version of the document, and the third version of the document, thereby creating the updated document.

The document may further comprise at least one of a snapshot or a document definition table, and wherein the at least one of the snapshot or the document definition table, combined with the at least one first sequential operation, provide a definition of data values of the document.

An embodiment of the present disclosure includes a method, comprising: providing a document comprising an operation log, wherein the operation log comprises at least one first sequential operation, and constructing the document in response to the operation log; determining a calculation definition in response to at least one formula of the document; providing an object definition corresponding to each of a plurality of objects in the document; synchronizing a first version of the document on a first client computing device with a second version of the document on a second computing device.

The synchronizing may comprise creating an updated document.

An embodiment of the present disclosure may further comprise a third version of the document on a third second client computing device, and synchronizing the first version of the document, the second version of the document, and the third version of the document.

The synchronizing may comprise creating an updated document.

An embodiment of the present disclosure may further comprise providing at least one of a snapshot or a document definition table, wherein the at least one of the snapshot or the document definition table, combined with the at least one first sequential operation, provide a definition of data values of the document.

The document further comprises the snapshot, the method further comprising updating the snapshot, wherein the updating comprising defining at least one second sequential operation, wherein the at least one second sequential operation, if executed, results in a consolidated document equivalent to the document before the updating the snapshot.

The updated snapshot may comprise at least one of: the second sequential operation comprising fewer processor operations than the first sequential operation; the second sequential operation comprising fewer logical operations than the first sequential operation; the second sequential operation comprising a simplified description of operations than the first sequential operation; and the second sequential operation comprising lumped operations relative to the first sequential operation.

An embodiment of the present disclosure may further comprise performing one of clearing the operation log and reducing the operation log in response to the updated snapshot.

The document may further comprise the document definition table, and the method comprising updating the document definition table, wherein the updating comprises defining an updated document definition table having at least a portion of the first sequential operation applied thereto.

An embodiment of the present disclosure may further comprise performing at least one of clearing the operation log and reducing the operation log in response to the updated document definition table.

An embodiment of the present disclosure may further comprise interpreting at least one environment variable, and least selectively providing a document view including the at least one environment variable.

The at least one environment variable may comprise at least one value selected from the values consisting of: a user location value; an offset user document access indicator; a user focus value; and a system time value.

An embodiment of the present disclosure may further comprise exposing the at least one environment variable to a formula editor.

An embodiment of the present disclosure may further comprise interpreting an external data source request, and providing an access to an external data source in response to the external data source request.

An embodiment of the present disclosure may further comprise storing an authorization token corresponding to the external data source in the document, wherein the authorization token comprises at least one access value selected from the access values comprising: an access type; an access scope; an access duration; and an access reauthorization time value.

An embodiment of the present disclosure may further comprise providing an access to a second user in response to the authorization token and the access scope.

An embodiment of the present disclosure may further comprise interpreting a user comment value, and providing a document view comprising the user comment value.

An embodiment of the present disclosure may further comprise interpreting a user review value, and providing a table view of at least one user comment value in response to the user review value.

The document may further comprise the snapshot, and wherein the document server further comprises a document consolidation circuit structured to update the snapshot, the updated snapshot comprising at least one sequential operation defining at least one second sequential operation, wherein the at least one second sequential operation, if executed, results in a consolidated document equivalent to the document before the updating the snapshot.

The updated snapshot may comprise at least one of: the second sequential operation comprising fewer processor operations than the first sequential operation; the second sequential operation comprising fewer logical operations than the first sequential operation; the second sequential operation comprising a simplified description of operations than the first sequential operation; and the second sequential operation comprising lumped operations relative to the first sequential operation.

The document consolidation circuit may perform at least one of clearing the operation log and reducing the operation log in response to the updated snapshot.

The document may further comprise the document definition table, and wherein the document server further comprises a document consolidation circuit structured to update the document definition table, the updated document definition table comprising the document definition table having at least a portion of the first sequential operation applied thereto.

The document consolidation circuit may perform at least one of clearing the operation log and reducing the operation log in response to the updated document definition table.

The document object model may comprise a hierarchical object structure, and wherein objects of the document are associated consistent with the document object model.

The hierarchical object structure may comprise, in descending order, a document object, a canvas object, a section object, and a table object.

The hierarchical object structure may further comprise at least one object selected from the objects consisting of: a range object, a text object, a line object, a span object, and a tag object.

The hierarchical object structure may further comprise a scope definition corresponding to each of the objects of the document, and wherein the scope definition comprises at least one scope value consisting of the scope values consisting of: a data scope value; a referencing scope value; a formula scope value; a scope depiction value; and a scope configurability value.

The formula engine may further comprise an environment definition circuit structured to interpret at least one environment variable, and wherein the first client computing device further comprises a unified document surface application circuit structured to at least selectively provide a document view including the at least one environment variable.

The at least one environment variable may comprise at least one value selected from the values consisting of: a user location value; an offset user document access indicator; a user focus value; and a system time value.

The unified document surface application circuit may further comprise a formula assistant circuit structured to expose the at least one environment variable to a formula editor.

The unified document surface application circuit may further comprise an authorization circuit structured to interpret an external data source request, and to provide an access to an external data source in response to the external data source request.

The authorization circuit may be further structured to store an authorization token corresponding to the external data source in the document, wherein the authorization token comprises at least one access value selected from the access values comprising: an access type; an access scope; an access duration; and an access reauthorization time value.

The authorization circuit may be further structured to provide an access to a second user in response to the authorization token and the access scope.

The unified document surface application circuit may be further structured to interpret a user comment value, and to provide a document view comprising the user comment value.

The unified document surface application circuit may be further structured to interpret a user review value, and to provide a table view of at least one user comment value in response to the user review value.

The document object model may further comprise a comment object type, and wherein the unified document surface application circuit is further structured to associate the user comment value with the comment object type.

An embodiment of the present disclosure includes a system, comprising: a document server communicatively coupled to at least one client computing device; a document comprising an operation log, wherein the operation log comprises at least one first sequential operation defining operations to create data values of the document; a formula engine, wherein the formula engine determines a calculation definition in response to at least one formula of the document, and wherein the formula engine is structured to generate an executable object in response to the calculation definition; and wherein the document further comprises the executable object, and wherein the document is at least partially positioned on at least one of the document server and a first client computing device of the at least one client computing device.

The formula engine may be further structured to delete the executable object in response to a close operation of the document on the client computing device.

The formula engine may be further structured to generate the executable object in response to an open operation of the document on the first client computing device.

The formula engine may be further structured to cache the executable object in response to a close operation of the document on the first client computing device.

The formula engine may be further structured access the cached executable object in response to an open operation of the document on the first client computing device.

The formula engine may be further structured to verify the cached executable object.

An embodiment of the present disclosure may further comprise a second client computing device, wherein the document is further positioned on at least one of the document server, the first client computing device, or a second client computing device of the at least one client computing device; and wherein the first client computing device includes a first executable object stored thereupon, and wherein the second client computing device includes a second executable object stored thereupon.

The executable object may comprise instructions which, upon execution, cause at least one of the document server and the first client computing device to perform operations in response to the calculation definition, the executable object further comprising at least one object selected from the objects consisting of: an executable instruction object; a script object; a javascript object; and a Perl object.

An embodiment of the present disclosure may further comprise at least one workflow server in communication with the document server, and wherein the executable object further comprises instructions which, upon execution, cause at least one of the document server and the first client computing device to perform operations to provide a result value in response to the calculation definition.

The first client computing device may further comprise a unified document surface application circuit structured to provide a document view in response to the data values of the document and the result value of the executable object.

The document may further comprise a document object model, wherein the document object model comprises an object definition corresponding to each of a plurality of objects in the document; and wherein the executable object is further structured to reference the document object model.

The formula engine may be further structured to construct a dependency graph of the document in response to the executable object, the document model, and the data values of the document.

The first client computing device may further comprise a unified document surface application circuit structured to interpret a user edit value, and wherein the formula engine is further structured to update the executable object in response to the user edit value and the dependency graph.

The dependency graph may comprise a virtual conceptualization of dependency relationships between: elements of the data values of the document; elements of the calculation definition; and combinations thereof.

The formula engine may be further structured to construct an invalidation graph in response to the dependency graph, the data values of the document, and the calculation definition.

The first client computing device may further comprise a unified document surface application circuit structured to interpret a user edit value, and wherein the formula engine is further structured to update the executable object in response to the user edit value and the invalidation graph.

The formula engine may be further structured to pare a redundant aspect of the invalidation graph.

The first client computing device may further comprise a unified document surface application circuit structured to interpret a user edit value, and wherein the formula engine is further structured to update the executable object in response to the user edit value and the pared invalidation graph.

The executable object may comprise a resource utilization value; wherein the formula engine is further structured to analyze instructions of the executable object, and to update the executable object with a resource reduced executable object; wherein the resource reduced executable object comprises instructions which, upon execution, cause at least one of the document server and the first client computing device to perform operations to provide the result value; and wherein the resource reduced executable object comprises a reduced execution resource value comprising a lower resource utilization value than the resource utilization value.

The lower resource utilization value may comprise at least one of: a reduced number of processor operations; a reduced communication utilization; a reduced memory usage; and a reduced external communication value.

The reduced executable object may further comprise at least one indexing operation for at least one table object of the document.

The reduced executable object may further comprise at least one sort order operation of a plurality of sort operations for at least one table object of the document.

The reduced executable object may further comprise at least one filter order operation of a plurality of filter operations for at least one table object of the document.

The reduced executable object may further comprise a re-ordering of at least one operation of the executable object.

The formula engine may be further structured to analyze instructions of the executable object, and to update the executable object with a resource reduced executable object in response to a plurality of queries in the document.

The formula engine may be further structured to analyze instructions of the executable object, and to update the executable object with a resource reduced executable object in response to the data values in the document corresponding to the plurality of queries.

The document server may be further structured to divide operations of the executable object between at least two of:

the document server, the first client computing device, and at least one of the workflow servers.

The document server may be further structured to divide operations in response to at least one of: a first client computing device resource parameter; contextual information; a current workload of the first client computing device; a current workload of the document server; and a current workload of the at least one workflow server.

The divided operations of the executable object may further comprise a query execution operation.

The first client computing device may further comprise a unified document surface application circuit structured to provide a document view in response to the query execution operation.

The at least one data value of the document may include a run-time object, wherein the run-time object comprises a state value.

The state value may comprise a value selected from: a default value; a contextually determined value; and a user selected value.

An embodiment of the present disclosure may further comprise a unified document surface application circuit structured to store the state value separate from the document in response to a close operation of the document.

An embodiment of the present disclosure may further comprise the unified document surface application circuit further structured to update the state value with the stored state value in response to an open operation of the document.

The stored state value may comprise a user specific value.

The run-time object may comprise a control.

The control may further comprise at least one control selected from the controls consisting of: a switch control; a multi-state switch control; a multi-picker control; an option list picker control; a dropdown picker control; a numeric slider control; a date slider control; a time slider control; a map picker control; a text box control; a validated text box control; a structured text box control; a card layout control; a drawing shape control; a media visual control; a table renderer control; a chart control; and a shape set control.

An embodiment of the present disclosure includes a method, comprising: interpreting a formula of a document; determining a calculation definition in response to the formula of the document; and generating an executable object in response to the calculation definition.

An embodiment of the present disclosure may further comprise deleting the executable object in response to a close operation of the document on a first client computing device.

An embodiment of the present disclosure may further comprise generating the executable object further in response to an open operation of the document on the first client computing device.

An embodiment of the present disclosure may further comprise caching the executable object in response to a close operation of the document on the first client computing device.

An embodiment of the present disclosure may further comprise accessing the cached executable object in response to an open operation of the document on the first client computing device.

The cached executable object may selectively utilize the cached executable object in response to the verifying.

The executable object may comprise a first executable object stored on the first client computing device, the method further comprising generating a second executable object in response to the calculation definition, wherein the second executable object is stored on second client computing device.

An embodiment of the present disclosure may further comprise operating the first executable object to determine a first result value, and providing a first document view in response to the first executable object; and operating the second executable object and providing a second document view in response to the second executable object.

The operating the first executable object may comprise selectively dividing operations of the first executable object between at least two of: the first client computing device; a document server in communication with the first client computing device and at least one workflow server; and the at least one workflow server.

An embodiment of the present disclosure may further comprise constructing a dependency graph of the document in response to the executable object, a document model, and at least one data value of the document.

An embodiment of the present disclosure may further comprise interpreting a user edit value, and updating the executable object in response to the user edit value and the dependency graph.

An embodiment of the present disclosure may further comprise constructing an invalidation graph in response to the dependency graph, the at least one data value of the document, and the calculation definition.

An embodiment of the present disclosure may further comprise interpreting a user edit value, and updating the executable object in response to the user edit value and the invalidation graph.

An embodiment of the present disclosure may further comprise paring a redundant aspect of the invalidation graph.

The updating the executable object may comprise at least one of re-generating the executable object or operating at least a portion of the executable object to determine a first result value.

An embodiment of the present disclosure may further comprise determining an order of operations of the executable object in response to the invalidation graph.

An embodiment of the present disclosure may further comprise interpreting a user edit value, and updating the executable object in response to the user edit value and the order of operations of the invalidation graph.

An embodiment of the present disclosure may further comprise analyzing instructions of the executable object, and updating the executable object with a resource reduced executable object, wherein the resource reduced executable object comprises instructions which, upon execution, cause at least one of the document server and the first client computing device to perform operations to provide the result value.

The lower resource utilization value may comprise at least one of: a reduced number of processor operations; a reduced communication utilization; a reduced memory usage; and a reduced external communication value.

The executable object with the resource reduced executable object may be in response to a plurality of queries in the document.

An embodiment of the present disclosure may further comprise analyzing instructions of the executable object, and updating the executable object with the resource reduced executable object in response to the data values in the document corresponding to the plurality of queries.

The selectively dividing operations of the first executable object may comprise dividing operations in response to at least one of: a first client computing device resource parameter; contextual information; a current workload of the first client computing device; a current workload of the document server; and a current workload of the at least one workflow server.

The divided operations of the executable object may further comprise a query execution operation.

An embodiment of the present disclosure may further comprise providing a document view in response to the query execution operation.

The at least one data value of the document may include a run-time object, wherein the run-time object comprises a state value.

The state value may comprise a value selected from: a default value; a contextually determined value; and a user selected value.

An embodiment of the present disclosure may further comprise storing the state value separate from the document in response to a close operation of the document.

An embodiment of the present disclosure may further comprise updating the state value with the stored state value in response to an open operation of the document.

The stored state value may comprise a user specific value.

The run-time object may comprise a control.

The control further may comprise at least one control selected from the controls consisting of: a switch control; a multi-state switch control; a multi-picker control; an option list picker control; a dropdown picker control; a numeric slider control; a date slider control; a time slider control; a map picker control; a text box control; a validated text box control; a structured text box control; a card layout control; a drawing shape control; a media visual control; a table renderer control; a chart control; and a shape set control.

An embodiment of the present disclosure includes a system, comprising: a document server communicatively coupled to at least one client computing device; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and a first client computing device of the at least one client computing device; wherein the at least one client computing device comprises a unified document surface application circuit structured to interpret a user formula value and to update the data values of the document in response to the user formula value; and a formula engine, wherein the formula engine is structured to determine a calculation definition in response to the user formula value and the document object model.

The unified document surface application circuit may be further structured to validate the user formula value in response to a formula library.

The formula engine may be further structured to generate an executable object in response to the calculation definition, wherein the executable object comprises instructions which, upon execution, cause at least one of the document server and the first client computing device to perform operations in response to the calculation definition, and wherein the instructions comprise a column-wise operation in response to the formula value comprising a table column reference.

The formula may comprise a query operation comprising at least one query criterion and at least one data object.

The at least one query criterion may comprise a time value corresponding to the at least one data object, and wherein the formula engine is further structured to determine the calculation definition utilizing a state of the at least one data object determined in response to the time value.

The unified document surface application circuit may be further structured to validate the user formula value by performing at least one operation selected from: correcting a user syntax; correcting a user formula name; correcting a user formula reference; and prompting a user for a correction of any of the foregoing.

The unified document surface application circuit may be further structured to provide a formula context display, the formula context display comprising at least one formula name, and further comprising at least one of an argument representation and a description value corresponding to each of the at least one formula name.

The unified document surface application circuit may be further structured to provide the formula context display as a table object.

The unified document surface application circuit may be further structured to determine the at least one formula name in response to at least one of: a character sequence entered by the user, or contextual information.

The unified document surface application circuit may be further structured to provide a formula context display, the formula context display comprising at least one reference value.

The at least one reference value may comprise at least one reference value selected from the reference values consisting of: an object name for one of the objects in the document; an object reference for one of the objects in the document; a tag for an object in the document; a range reference for a range in the document; and an external data source reference.

The user formula value may comprise a reference value selected from the reference values consisting of: an object name for one of the objects in the document; an object reference for one of the objects in the document; a tag for an object in the document; a range reference for a range in the document; and an external data source reference.

The formula engine may be further structured to generate an executable object in response to the calculation definition, wherein the executable object comprises instructions which, upon execution, cause at least one of the document server and the first client computing device to perform operations in response to the calculation definition.

The executable object may comprise instructions to perform an operation to dereference the reference value.

The operation to dereference the reference value may comprise the unified document application circuit providing a dereferenced value as a mask value.

The unified document application circuit may be further structured to preserve the reference value.

The unified document application circuit may be further structured to preserve the reference value in a location selected from the locations consisting of: in an offset table column from corresponding ones of the dereferenced values; in at least one hidden table cell; in a system table; in at least one selectively viewable table cell; in a formula entry location; and on a document object including the dereferenced value.

An embodiment of the present disclosure includes a method, comprising: interpreting an operation log, wherein the operation log comprises at least one first sequential operation defining operations to create data values of a document; interpreting a user formula value and to update the data values of the document in response to the user formula value; and determining a calculation definition in response to the user formula value and a document object model.

An embodiment of the present disclosure may further comprise interpreting a formula library, and validating the user formula value in response to the formula library.

An embodiment of the present disclosure may further comprise generating an executable object in response to the calculation definition, wherein the executable object comprises instructions which, upon execution, cause at least one of a document server and a first client computing device to perform operations in response to the calculation definition, and wherein the instructions comprise a column-wise operation in response to the formula value comprising a table column reference.

The formula may comprise a query operation comprising at least one query criterion and at least one data object.

The at least one query criterion may comprise a time value corresponding to the at least one data object, the method further comprising updating the calculation definition utilizing a state of the at least one data object determined in response to the time value.

An embodiment of the present disclosure may further comprise validating the user formula value by performing at least one operation selected from: correcting a user syntax; correcting a user formula name; correcting a user formula reference; and prompting a user for a correction of any of the foregoing.

An embodiment of the present disclosure may further comprise providing a formula context display, the formula context display comprising at least one formula name, and further comprising at least one of an argument representation and a description value corresponding to each of the at least one formula name.

An embodiment of the present disclosure may further comprise providing the formula context display as a table object.

An embodiment of the present disclosure may further comprise determining the at least one formula name in response to at least one of: a character sequence entered by the user, or contextual information.

An embodiment of the present disclosure may further comprise providing a formula context display, the formula context display comprising at least one reference value.

The at least one reference value may comprise at least one reference value selected from the reference values consisting of: an object name for one of the objects in the document; an object reference for one of the objects in the document; a tag for an object in the document; a range reference for a range in the document; and an external data source reference.

The user formula value may comprise a reference value selected from the reference values consisting of: an object name for one of the objects in the document; an object reference for one of the objects in the document; a tag for an object in the document; a range reference for a range in the document; and an external data source reference.

An embodiment of the present disclosure may further comprise generating an executable object in response to the calculation definition, wherein the executable object comprises instructions which, upon execution, cause at least one of a document server and a first client computing device to perform operations in response to the calculation definition.

An embodiment of the present disclosure may further comprise performing an operation to dereference the reference value.

The operation to dereference the reference value may comprise providing a dereferenced value as a mask value.

An embodiment of the present disclosure may further comprise preserving the reference value.

An embodiment of the present disclosure may further comprise preserving the reference value in a location selected from the locations consisting of: in an offset table column from corresponding ones of the dereferenced values; in at least one hidden table cell; in a system table; in at least one selectively viewable table cell; in a formula entry location; and on a document object including the dereferenced value.

An embodiment of the present disclosure includes a system, comprising: a document server communicatively coupled to at least one client computing device; a document comprising: an operation log, wherein the operation log comprises at least one first sequential operation defining operations to create data values of the document; a formula engine, wherein the formula engine determines a calculation definition in response to at least one formula of the document, and wherein the formula engine is structured to generate an executable object in response to the calculation definition, and wherein the executable object comprises instructions which, upon execution, cause at least one of the document server and the first client computing device to perform operations in response to the calculation definition; wherein the document is positioned on at least one of the document server and a first client computing device of the at least one client computing device, and wherein the formula engine is further structured to interpret a user focus location, and to direct execution of the executable object in response to the user focus location.

The user focus location may comprise at least one location value selected from the location values consisting of: a document section currently focused by a user; a document object currently focused by a user; a document canvas currently focused by a user; and a portion of the document currently visible to a user.

A document uniform surface application circuit may be further structured to predict a second user focus location, and wherein the formula engine is further structured to direct execution of the executable object in response to the second user focus location.

A document uniform surface application circuit may be further structured to predict the second user focus location in response to at least one of: a state value; a previous operation sequence of a user accessing the document; a previous operation sequence of a user; a relationship value between the user focus location and a data value within the document that is not within the user focus location; and a processing time to hydrate a data value within the document that is not within the user focus location.

A document uniform surface application circuit may be further structured to predict the second user focus location in response to at least one of: a document type value; a data type value of a data value within the document that is within the user focus location; and a data type value of a data value within the document that is not within the user focus location.

A document uniform surface application circuit may be further structured to predict the second user focus location in response to at least one of a user device type or a user device resource description.

An embodiment of the present disclosure may further comprise at least one workflow server in communication with the document server, and wherein the executable object further comprises instructions which, upon execution, cause at least one of the document server and the first client computing device to perform operations to provide a result value in response to the calculation definition.

The document server may be further structured to divide operations of the executable object between at least two of: the document server, the first client computing device, and at least one of the workflow servers.

The data value of the document may comprise an external data source reference.

The external data source reference may comprise a first external data source reference, wherein the data value of the document further comprises a second external data source reference, and wherein the formula engine is further structured to direct execution of the executable object in response to a first priority corresponding to the first external data source reference and a second priority corresponding to the second external data reference.

An embodiment of the present disclosure includes a method, comprising: interpreting an operation log, wherein the operation log comprises at least one first sequential operation defining operations to create data values of a document; determining a calculation definition in response to at least one formula of the document, and generating an executable object in response to the calculation definition, and wherein the executable object comprises instructions which, upon execution, cause at least one of the document server and the first client computing device to perform operations in response to the calculation definition; interpreting a user focus location, and directing execution of the executable object in response to the user focus location.

The user focus location may comprise at least one location value selected from the location values consisting of: a document section currently focused by a user; a document object currently focused by a user; a document canvas currently focused by a user; and a portion of the document currently visible to a user.

An embodiment of the present disclosure may further comprise predicting a second user focus location, and wherein the directing execution of the executable object is further in response to the second user focus location.

An embodiment of the present disclosure may further comprise predicting the second user focus location in response to at least one of: a state value; a previous operation sequence of a user accessing the document; a previous operation sequence of a user; a relationship value between the user focus location and a data value within the document that is not within the user focus location; and a processing time to hydrate a data value within the document that is not within the user focus location.

An embodiment of the present disclosure may further comprise predicting the second user focus location in response to at least one of: a document type value; a data type value of a data value within the document that is within the user focus location; and a data type value of a data value within the document that is not within the user focus location.

An embodiment of the present disclosure may further comprise predicting the second user focus location in response to at least one of a user device type or a user device resource description.

An embodiment of the present disclosure may further comprise dividing operations of the executable object between at least two of: the document server, the first client computing device, and at least one of workflow server.

The data value of the document may comprise an external data source reference.

The external data source reference may comprise a first external data source reference, wherein the data value of the document further comprises a second external data source reference, the method further comprising directing execution of the executable object in response to a first priority corresponding to the first external data source reference and a second priority corresponding to the second external data reference.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a unified document surface application circuit structured to interpret a first user input comprising a text flow entry, and to interpret a second user input comprising one of an in-line data access entry and a table-based calculation entry; an enhanced data processing circuit structured to create at least one data structure in response to the one of the in-line data access entry and the table-based calculation entry; a user display circuit structured to determine a document view in response to the data value, the first user input, and the data structure, and to provide the document view to a user; a reference management circuit structured to interpret a user reference selection, and to determine a reference return value in response to the user reference selection; and wherein the user display circuit provides a reference return display to the user in response to the reference return value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising:

a unified document surface application circuit structured to interpret a first user input comprising a text flow entry, and to interpret a second user input comprising one of an in-line data access entry and a table-based calculation entry; an enhanced data processing circuit structured to create at least one data structure in response to the one of the in-line data access entry and the table-based calculation entry, and to position the data structure on the unified document surface;

a user interaction circuit structured to interpret a user selection, the user selection comprising at least a portion of the data value, and further structured to interpret a second user selection comprising an extract value; an extracted data generation circuit structured to create a data view in response to the user selection; and a user display circuit structured to display at least a portion of the data view in response to the first user input, the second user input, and the extract value.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device comprising: a unified document surface application circuit structured to interpret a first user input comprising a text flow entry, and to interpret a second user input comprising one of an in-line data access entry and a table-based calculation entry; a text flow processing circuit structured to create a local operation log by appending a text entry value to the first operation log in response to the first user input;

an enhanced data processing circuit structured to create at least one data structure in response to the one of the in-line data access entry and the table-based calculation entry, and to append the at least one data structure to the local operation log; wherein the unified document surface application circuit is further structured to communicate a change value for the first operation log to the first computing device in response to the first operation log and the local operation log.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a unified document surface application circuit structured to interpret a first user input comprising a text flow entry, and to interpret a second user input comprising one of an in-line data access entry and a table-based calculation entry; a text flow processing circuit structured to determine a text entry value in response to the first user input; an enhanced data processing circuit structured to create at least one data structure in response to the one of the in-line data access entry and the table-based calculation entry; a user display circuit structured to provide a first view to the user in response to the data value, the text entry value, and the at least one data structure; a data management circuit structured to interpret a user table selection value, and to determine at least one of a table data update or a table configuration update in response to the user table selection value; and wherein the user display circuit is further structured to update a second view in response to the at least one of the table data update or the table configuration update.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a unified document surface application circuit structured to interpret a first user input comprising a text flow entry, and to interpret a second user input comprising one of an in-line data access entry and a table-based calculation entry; a text flow processing circuit structured to determine a text entry value in response to the first user input; an enhanced data processing circuit structured to create at least one data structure in response to the one of the in-line data access entry and the table-based calculation entry; a user interaction circuit structured to interpret a user selection comprising at least a portion of the data value, and wherein the user selection comprises at least one of a reference or a link to an external source data; a data management circuit structured to create a data view in response to the user selection, the text entry value, and the data structure; and a user display circuit structured to display at least a portion of the data view in response to the user selection.

An embodiment of the present disclosure includes a system, comprising: a first computing device communicatively coupled to a second computing device; the first computing device comprising a document server structured to communicate an operation log to a second computing device, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and the second computing device; the second computing device comprising:

a unified document surface application circuit structured to interpret a first user input comprising a text flow entry, and to interpret a second user input comprising one of an in-line data access entry and a table-based calculation entry; a text flow processing circuit structured to position a text entry value on a unified document surface in response to the first user input; an enhanced data processing circuit structured to create at least one data structure in response to the one of the in-line data access entry and the table-based calculation entry, and to position the data structure on the unified document surface; wherein the unified document surface application circuit is further structured to interpret a user formula value and to update the data values of the document in response to the user formula value; and a formula engine, wherein the formula engine is structured to determine a calculation definition in response to the user formula value and the document object model.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising:

a unified document surface application circuit structured to interpret a first user input comprising a text flow entry, and to interpret a second user input comprising one of an in-line data access entry and a table-based calculation entry; a text flow processing circuit to determine a text entry value on a unified document surface in response to the first user input; an enhanced data processing circuit structured to create at least one data structure in response to the one of the in-line data access entry and the table-based calculation entry; a user display circuit structured to provide a first view in response to the data value, the text entry value, and the at least one data structure; a visualization tool (VT) circuit structured to determine a visualization element (VE) in response to the data value, and further in response to at least one of: a user visualization selection or a user context value; and wherein the user display circuit is further structured to provide a second view in response to the VE, the data value, the text entry value, and the at least one data structure.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising:

a unified document surface application circuit structured to interpret a first user input comprising a text flow entry, and to interpret a second user input comprising one of an in-line data access entry and a table-based calculation entry; a text flow processing circuit structured to position a text entry value on a unified document surface in response to the first user input;

an enhanced data processing circuit structured to create at least one data structure in response to the one of the in-line data access entry and the table-based calculation entry, and to position the data structure on the unified document surface; a user notification rules circuit structured to interpret a user notification profile value comprising a notification trigger value and a notification response value; a user notification circuit structured to determine whether an event trigger has occurred in response to the notification trigger value and the data value; and a user interaction circuit structured to provide a notification to a user in response to the event trigger and the notification response value.

An embodiment of the present disclosure includes a system, comprising: a first computing device communicatively coupled to a second computing device; the first computing device comprising a document server at least intermittently communicatively coupled to a second computing device, and structured to communicate a data value to the second computing device, the data value comprising at least a portion of a document; the second computing device comprising:

a unified document surface application circuit structured to interpret a first user input comprising a text flow entry, and to interpret a second user input comprising one of an in-line data access entry and a table-based calculation entry; a text flow processing circuit structured to position a text entry value on a unified document surface in response to the first user input; an enhanced data processing circuit structured to create at least one data structure in response to the one of the in-line data access entry and the table-based calculation entry, and to position the data structure on the unified document surface; a user display circuit structured to determine a document view in response to text flow entry and the at least one data structure, and to provide the document view to a user; and a document synchronization circuit structured to communicate the text entry value and the at least one data structure to the first computing device.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a unified document surface application circuit structured to interpret a first user input comprising a text flow entry, to interpret a second user input comprising one of an in-line data access entry and a table-based calculation entry, to interpret a user external data reference value, and to interpret a display location selection value; a text flow processing circuit structured to position a text entry value on a unified document surface in response to the first user input; an enhanced data processing circuit structured to create at least one data structure in response to the one of the in-line data access entry and the table-based calculation entry, and to position the data structure on the unified document surface; an external data access circuit structured to access an external data source in response to the user external data reference value; a data enrichment circuit structured to perform a display enrichment operation in response to the external data source and the display location selection value; and a user display circuit structured to position an enriched display value on the unified document surface in response to the display location selection value and the display enrichment operation.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a unified document surface application circuit structured to interpret a first user input comprising a text flow entry, and to interpret a second user input comprising one of an in-line data access entry and a table-based calculation entry; a text flow processing circuit structured to position a text entry value on a unified document surface in response to the first user input; and an enhanced data processing circuit structured to create at least one data structure in response to the one of the in-line data access entry and the table-based calculation entry, and to position the data structure on the unified document surface; a user interaction circuit structured to interpret a table grouping input value associated with the at least one data structure, the at least one data structure comprising a plurality of categories and a plurality of associated data sets corresponding to the plurality of categories; a table aggregation circuit structured to determine an aggregation value in response to the table grouping input value, wherein the aggregation value corresponds to at least one of the plurality of categories; and wherein the user interaction circuit is further structured to provide an aggregated table view in response to the aggregation value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a unified document surface application circuit structured to interpret a first user input comprising a text flow entry, and to interpret a second user input comprising one of an in-line data access entry and a table-based calculation entry; a text flow processing circuit structured to position a text entry value on a unified document surface in response to the first user input; an enhanced data processing circuit structured to create at least one data structure in response to the one of the in-line data access entry and the table-based calculation entry, and to position the data structure on the unified document surface; wherein the unified document application circuit is further structured to interpret a user table input value, the user table input value comprising a plurality of table data values of the at least one data structure; a table management circuit structured to determine a table organization value in response to the table data values, wherein the table organization value comprises at least one value selected from the values consisting of: a column naming scheme; a sorting scheme; a filtering scheme; an aggregation scheme; and a formatting scheme; and a user display circuit structured to provide a table view in response to the table organization value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a unified document surface application circuit structured to interpret a first user input comprising a text flow entry, and to interpret a second user input comprising one of an in-line data access entry and a table-based calculation entry; a text flow processing circuit structured to position a text entry value on a unified document surface in response to the first user input; an enhanced data processing circuit structured to create at least one data structure in response to the one of the in-line data access entry and the table-based calculation entry, and to position the data structure on the unified document surface; a user interaction circuit structured to interpret a user reference entry; a reference management circuit structured to determine a reference return value in response to the user reference entry; and a user display circuit structured to determine a document view in response to the reference return value, and to provide the document view to a user.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising:

a unified document surface application circuit structured to interpret a first user input comprising a text flow entry, and to interpret a second user input comprising one of an in-line data access entry and a table-based calculation entry a text flow processing circuit structured to position a text entry value on a unified document surface in response to the first user input an enhanced data processing circuit structured to create at least one data structure in response to the one of the in-line data access entry and the table-based calculation entry, and to position the data structure on the unified document surface, wherein the data value further comprises a first table object and a second embedded table object; wherein each of the first table object and a second embedded table object comprise a corresponding table specific name, and wherein each of the first table object and the second embedded table object comprise a corresponding parent object name, wherein a first parent object name corresponding to the first table object comprises a distinct name from a second parent object name corresponding to the second embedded table object; and wherein the data value further comprises a table referencing value directed to the second embedded table object, wherein the table referencing value comprises a portion of a formula comprising a corresponding parent object name that is distinct from the first parent object name, and wherein a parent hierarchy for the table referencing value comprises the first parent object name.

An embodiment of the present disclosure includes a system, comprising: a first computing device communicatively coupled to a second computing device; the first computing device comprising a document server structured to communicate an operation log, wherein the operation log comprises at least one first sequential operation defining operations to create data values of a document to the second computing device; the second computing device comprising: a unified document surface application circuit structured to interpret a first user input comprising a text flow entry, and to interpret a second user input comprising one of an in-line data access entry and a table-based calculation entry; a text flow processing circuit structured to position a text entry value on a unified document surface in response to the first user input; and an enhanced data processing circuit structured to create at least one data structure in response to the one of the in-line data access entry and the table-based calculation entry, and to position the data structure on the unified document surface; a formula engine, wherein the formula engine determines a calculation definition in response to at least one formula of the document, and wherein the formula engine is structured to generate an executable object in response to the calculation definition, and wherein the executable object comprises instructions which, upon execution, cause at least one of the document server and the second computing device to perform operations in response to the calculation definition; wherein the document is positioned on at least one of the document server and a first client computing device of the at least one client computing device, and wherein the formula engine is further structured to interpret a user focus location, and to direct execution of the executable object in response to the user focus location.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a unified document surface application circuit structured to interpret a first user input comprising a text flow entry, and to interpret a second user input comprising one of an in-line data access entry and a table-based calculation entry; a text flow processing circuit structured to position a text entry value on a unified document surface in response to the first user input; an enhanced data processing circuit structured to create at least one data structure in response to the one of the in-line data access entry and the table-based calculation entry, and to position the data structure on the unified document surface; a user notification rules circuit structured to interpret a user notification profile value comprising a notification trigger value and a notification response value, wherein the notification response value comprises an action link definition and a notification location value; a user notification circuit structured to determine whether an event trigger has occurred in response to the notification trigger value and the data value; and a user interaction circuit structured to provide a notification to a user in response to the event trigger and the notification response value.

An embodiment of the present disclosure includes a system, comprising: a first computing device communicatively coupled to a second computing device; the first computing device comprising a document server comprising a client resource circuit structured to determine a client resource value, and wherein the document server is structured to communicate a data value to the second computing device in response to the client resource value, the data value comprising at least a portion of a document; the second computing device comprising: a unified document surface application circuit structured to interpret a first user input comprising a text flow entry, and to interpret a second user input comprising one of an in-line data access entry and a table-based calculation entry; a text flow processing circuit structured to position a text entry value on a unified document surface in response to the first user input; an enhanced data processing circuit structured to create at least one data structure in response to the one of the in-line data access entry and the table-based calculation entry, and to position the data structure on the unified document surface; a user display circuit structured to determine at least one candidate entry in response to at least one of the text entry value or the at least one data structure; and wherein the unified document surface application circuit is further structured to provide an autocompleted entry in response to a user selection of the at least one candidate entry.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising:

a unified document surface application circuit structured to interpret a first user input comprising a text flow entry, and to interpret a second user input comprising one of an in-line data access entry and a table-based calculation entry; a text flow processing circuit structured to position a text entry value on a unified document surface in response to the first user input;

an enhanced data processing circuit structured to create at least one data structure in response to the one of the in-line data access entry and the table-based calculation entry, and to position the data structure on the unified document surface; and wherein the unified document surface application circuit is further structured to update a metadata value corresponding to at least one of the text flow entry and the data structure, wherein the metadata value comprises at least one value selected from the values consisting of: a timestamp value, a tag value, and a user identifier value.

An embodiment of the present disclosure includes a system, comprising: a first computing device communicatively coupled to a second computing device; the first computing device comprising a document server structured to communicate a data value to the second computing device, the data value comprising at least a portion of a document, and wherein the data value further comprises at least one of: a database reference value, a database authorization token, and a local copy of at least a portion of data on the database; the second computing device comprising:

a unified document surface application circuit structured to interpret a first user input comprising a text flow entry, and to interpret a second user input comprising one of an in-line data access entry and a table-based calculation entry a text flow processing circuit structured to position a text entry value on a unified document surface in response to the first user input; and an enhanced data processing circuit structured to create at least one data structure in response to the one of the in-line data access entry and the table-based calculation entry, and to position the data structure on the unified document surface.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a unified document surface application circuit structured to interpret a user location value, to interpret a first user input comprising a text flow entry, and to interpret a second user input comprising one of an in-line data access entry and a table-based calculation entry; a text flow processing circuit structured to position a text entry value on a unified document surface in response to the first user input and the user location value; and an enhanced data processing circuit structured to create at least one data structure in response to the one of the in-line data access entry and the table-based calculation entry, and further in response to the user location value, and to position the data structure on the unified document surface.

An embodiment of the present disclosure includes a system, comprising: a first computing device communicatively coupled to a second computing device; the first computing device comprising a document server comprising a client resource circuit structured to determine a client resource value, and wherein the document server is structured to communicate a data value to the second computing device in response to the client resource value, the data value comprising at least a portion of a document; the second computing device comprising: a unified document surface application circuit structured to interpret a first user input comprising a text flow entry, and to interpret a second user input comprising one of an in-line data access entry and a table-based calculation entry; a text flow processing circuit structured to position a text entry value on a unified document surface in response to the first user input; and an enhanced data processing circuit structured to create at least one data structure in response to the one of the in-line data access entry and the table-based calculation entry, and to position the data structure on the unified document surface.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a unified document surface application circuit structured to interpret a first user input comprising a text flow entry, and to interpret a second user input comprising at least one of: an in-line data access entry, a table-based calculation entry, and a data object entry; wherein the data object entry comprises at least one data object selected from the data objects consisting of a graph, a chart, an image, a video file, an audio file, a media file, video content, audio content, and media content; a text flow processing circuit structured to position a text entry value on a unified document surface in response to the first user input; and an enhanced data processing circuit structured to create at least one data structure in response to second user input, and to position the data structure on the unified document surface.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device comprising; a user display circuit structured to determine a document view in response to the operation log, and to provide the document view to a user; a reference management circuit structured to interpret a user reference selection, and to determine a reference return value in response to the user reference selection;

a unified document surface application circuit structured to create a local operation log in response to the first operation log and the reference return value, the local operation log comprising at least one sequential operation defining operations to create a second document, and to communicate a change value to the first computing device in response to the first operation log and the local operation log; and wherein the user display circuit is further structured to update the first document view in response to the reference return value.

An embodiment of the present disclosure includes a system, comprising: a document server comprising a document, wherein the document server is in communication with a client computing device, and wherein the document server communicates a data element comprising at least a portion of the document to the client computing device; the client computing device comprising: a user display circuit structured to provide a first view to the user in response to the data element; a data management circuit structured to interpret a user table selection value, and to determine at least one of a table data update or a table configuration update in response to the user table selection value; a reference management circuit structured to interpret a user reference selection, and to determine a reference return value in response to the user reference selection; and wherein the user display circuit further provides a reference return display to the user in response to the reference return value, and is further structured to update a second view in response to the reference return display and the at least one of the table data update or the table configuration update.

An embodiment of the present disclosure includes a system, comprising: a document server communicatively coupled to at least one client computing device; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and a first client computing device of the at least one client computing device; wherein the at least one client computing device comprises: a user display circuit structured to determine a document view in response to the user formula value, and to provide the document view to a user; a reference management circuit structured to interpret a user reference selection comprising a user formula value, and to determine a reference return value in response to the user reference selection; a unified document surface application circuit structured to update the data values of the document in response to the user reference selection; and wherein the user display circuit provides a reference return display to the user in response to the reference return value; and a formula engine, wherein the formula engine is structured to determine a calculation definition in response to the user formula value and the document object model.

An embodiment of the present disclosure includes a system, comprising: a computing device, comprising: a unified document application circuit structured to interpret a user table input value, the user table input value comprising a plurality of table data values; a reference management circuit structured to interpret a user reference selection, and to determine a reference return value in response to the user reference selection; and a table management circuit structured to determine a table organization value in response to the table data values, wherein the table organization value comprises at least one value selected from the values consisting of: a column naming scheme; a sorting scheme; a filtering scheme; an aggregation scheme; and a formatting scheme; and a user display circuit structured to provide a table view in response to the table organization value and the reference return value, and to provide the document view to a user.

An embodiment of the present disclosure includes a system, comprising: a first computing device communicatively coupled to a second computing device; the first computing device comprising a document server structured to communicate a data value to the second computing device, the data value comprising at least a portion of a document and further comprising a first table object and a second embedded table object; wherein each of the first table object and a second embedded table object comprise a corresponding table specific name, and wherein each of the first table object and the second embedded table object comprise a corresponding parent object name, wherein a first parent object name corresponding to the first table object comprises a distinct name from a second parent object name corresponding to the second embedded table object; a reference management circuit structured to interpret a user reference selection comprising a table referencing value, and to determine a reference return value in response to the user reference selection; wherein the table referencing value is directed to the second embedded table object, wherein the table referencing value comprises a portion of a formula comprising a corresponding parent object name that is distinct from the first parent object name, and wherein a parent hierarchy for the table referencing value comprises the first parent object name; and a user display circuit structured to provide a reference return display to the user in response to the reference return value, and to provide the document view to a user.

An embodiment of the present disclosure includes a system, comprising: a first computing device at least intermittently communicatively coupled to a second computing device; the first computing device comprising a document server, the document server further comprising a client resource circuit structured to determine a client resource value, and the document server structured to communicate a data value to the second computing device in response to the client resource value, the data value comprising at least a portion of a document; the second computing device comprising: a unified document application circuit structured to interpret a user entry value comprising a user reference selection; a reference management circuit structured to determine at least one reference return value in response to the user reference selection and the data value; a user display circuit structured to determine at least one candidate entry in response to the at least one reference return value; and wherein the unified document surface application circuit is further structured to provide an autocompleted entry in response to a user selection of the at least one candidate entry.

An embodiment of the present disclosure includes an apparatus, comprising: a client computing device structured to receive a data element from a document server, the data element comprising at least a portion of a document; the client computing device further comprising: a user display circuit structured to determine a document view in response to the data element, and to provide the document view to a user; a reference management circuit structured to interpret a user reference selection, and to determine a reference return value in response to the user reference selection and a metadata value, wherein the metadata value comprises at least one value selected from the values consisting of: a timestamp value, a tag value, and a user identifier value; and wherein the user display circuit provides a reference return display to the user in response to the reference return value.

An embodiment of the present disclosure includes an apparatus, comprising: a client computing device structured to receive a data element from a document server, the data element comprising at least a portion of a document; the client computing device further comprising: a user display circuit structured to determine a document view in response to the data element, and to provide the document view to a user; a reference management circuit structured to interpret a user reference selection, wherein the user reference selection comprises a reference directed to at least one of: a database; a website; a network location; a second document distinct from the document; data positioned on a cloud server; a portion of any of the foregoing; a local copy of any of the foregoing; and combinations of any of the foregoing; and wherein the reference management circuit is further structured to determine a reference return value in response to the user reference selection; and wherein the user display circuit provides a reference return display to the user in response to the reference return value.

An embodiment of the present disclosure includes an apparatus, comprising: a client computing device structured to receive a data element from a document server, the data element comprising at least a portion of a document; the client computing device further comprising: a user display circuit structured to determine a document view in response to the data element, and to provide the document view to a user; a reference management circuit structured to interpret a user reference selection, and to determine a reference return value in response to the user reference selection; and wherein the user display circuit provides a reference return display to the user in response to the reference return value.

The reference management circuit may be further structured to interpret a user location value, and to determine the reference return value further in response to the user location value.

The user display circuit may be further structured to interpret a user location value, and to provide the reference return display further in response to the reference return value.

The user reference selection may further comprise a user location value.

An embodiment of the present disclosure includes an apparatus, comprising: a client computing device structured to receive a data element from the document server, the data element comprising at least a portion of a document; the client computing device further comprising:

a user display circuit structured to determine a document view in response to the data element, and to provide the document view to a user; a reference management circuit structured to interpret a user reference selection, and to determine a reference return value in response to the user reference selection; and wherein the user display circuit provides a reference return display to the user in response to the reference return value.

A client resource circuit may be structured to determine a client resource value, and wherein the reference management circuit is further structured to interpret the reference return value further in response to the client resource value.

A client resource circuit may be structured to determine a client resource value, and wherein the user display circuit is further structured to provide the reference return display further in response to the client resource value.

A document server may comprise a client resource circuit structured to determine a client resource value, and wherein the user reference selection further comprises a user location value.

An embodiment of the present disclosure includes a system, comprising: a document server structured to communicate at least a portion of a document to a client computing device; the client computing device comprising: a user interaction circuit structured to interpret a user selection comprising at least one data value, the document comprising the at least one data value, and further structured to interpret a second user selection comprising an extract value; an extracted data generation circuit structured to create a data view in response to the user selection; an application configuration circuit structured to interpret at least one of: a user noun selection, a user verb selection, or a user context selection; the application configuration circuit further structured to determine an application configuration value in response to the data view, and further in response to the at least one of: the user noun selection, the user verb selection, or the user context selection; and an application publication circuit structured to publish an application in response to the application configuration value.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device comprising: a unified document surface application circuit structured to: create a first document view in response to the first operation log, the document view comprising content generated using at least a portion of the first operation log; provide the first document view to a display device; receive a user document change input value; create a local operation log in response to the first operation log and the user document change input value, the local operation log comprising at least one sequential operation defining operations to create a second document; and update the first document view in response to the user document change input value; communicate a change value for the first operation log to the first computing device in response to the first operation log and the local operation log; an application configuration circuit structured to interpret at least one of: a user noun selection, a user verb selection, or a user context selection; the application configuration circuit further structured to determine an application configuration value in response to the user document change input value, and further in response to the at least one of: the user noun selection, the user verb selection, or the user context selection; and an application publication circuit structured to publish an application in response to the application configuration value.

An embodiment of the present disclosure includes a system, comprising: a document server structured to communicate at least a portion of a document to a client computing device; the client computing device comprising: a user interaction circuit structured to interpret a user selection comprising at least one data value, wherein the document comprises the at least one data value, and wherein the at least one data value comprises at least one of a reference or a link to an external source data; a data management circuit structured to create a data view in response to the user selection; a user display circuit structured to display at least a portion of the data view in response to the user selection; an application configuration circuit structured to interpret at least one of: a user noun selection, a user verb selection, or a user context selection; the application configuration circuit further structured to determine an application configuration value in response to the user selection, and further in response to the at least one of: the user noun selection, the user verb selection, or the user context selection; and an application publication circuit structured to publish an application in response to the application configuration value.

An embodiment of the present disclosure includes a system, comprising: a document server communicatively coupled to at least one client computing device; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and a first client computing device of the at least one client computing device; wherein the at least one client computing device comprises: a unified document surface application circuit structured to interpret a user formula value and to update the data values of the document in response to the user formula value; an application configuration circuit structured to interpret at least one of: a user noun selection, a user verb selection, or a user context selection; the application configuration circuit further structured to determine an application configuration value in response to the user formula value, and further in response to the at least one of: the user noun selection, the user verb selection, or the user context selection; and an application publication circuit structured to publish an application in response to the application configuration value; and a formula engine, wherein the formula engine is structured to determine a calculation definition in response to the user formula value and the document object model.

An embodiment of the present disclosure includes a system, comprising: a document server structured to communicate at least a portion of a document to a client computing device, the document comprising a data element; the client computing device, comprising: a user display circuit structured to provide a first view in response to the data element, the first view comprising at least a portion of the data element; a visualization tool (VT) circuit structured to determine a visualization element (VE) in response to the data element, and further in response to at least one of: a user visualization selection or a user context value; wherein the user display circuit is further structured to provide a second view in response to the VE and the data element; an application configuration circuit structured to interpret at least one of: a user noun selection, a user verb selection, or a user context selection; the application configuration circuit further structured to determine an application configuration value in response to the VE, and further in response to the at least one of: the user noun selection, the user verb selection, or the user context selection; and an application publication circuit structured to publish an application in response to the application configuration value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a user interaction circuit structured to interpret a user reference entry; a reference management circuit structured to determine a reference return value in response to the user reference entry;
  a user display circuit structured to determine a document view in response to the reference return value, and to provide the document view to a user; an application configuration circuit structured to interpret at least one of: a user noun selection, a user verb selection, or a user context selection; the application configuration circuit further structured to determine an application configuration value in response to the reference return value, and further in response to the at least one of: the user noun selection, the user verb selection, or the user context selection; and an application publication circuit structured to publish an application in response to the application configuration value.

An embodiment of the present disclosure includes a system, comprising: a document server communicatively coupled to at least one client computing device; a document comprising; an operation log, wherein the operation log comprises at least one first sequential operation defining operations to create data values of the document; a formula engine, wherein the formula engine determines a calculation definition in response to at least one formula of the document, and wherein the formula engine is structured to generate an executable object in response to the calculation definition, and wherein the executable object comprises instructions which, upon execution, cause at least one of the document server and the first client computing device to perform operations in response to the calculation definition; wherein the document is positioned on at least one of the document server and a first client computing device of the at least one client computing device, and wherein the formula engine is further structured to interpret a user focus location, and to direct execution of the executable object in response to the user focus location; and wherein the first client computing device comprises: an application configuration circuit structured to interpret at least one of: a user noun selection, a user verb selection, or a user context selection; the application configuration circuit further structured to determine an application configuration value in response to at least one of the calculation definition and the user focus location, and further in response to the at least one of: the user noun selection, the user verb selection, or the user context selection; and an application publication circuit structured to publish an application in response to the application configuration value.

An embodiment of the present disclosure includes an apparatus, comprising: an application configuration circuit structured to: interpret at least one of: a user noun selection, a user verb selection, or a user context selection; interpret a source data value from at least one of: a database; a website; a network location; a second document distinct from the document; data positioned on a cloud server; a portion of any of the foregoing; a local copy of any of the foregoing; and combinations of any of the foregoing; and determine an application configuration value in response to the source data value, and further in response to the at least one of: the user noun selection, the user verb selection, or the user context selection; and an application publication circuit structured to publish an application in response to the application configuration value.

An embodiment of the present disclosure includes an apparatus, comprising: an application configuration circuit structured to: interpret at least one of: a user noun selection, a user verb selection, or a user context selection; determine a target device resource value; and determine an application configuration value in response to a source data value, the at least one of: the user noun selection, the user verb selection, or the user context selection, and the target device resource value; and an application publication circuit structured to publish an application in response to the application configuration value.

The user noun selection may further comprise at least a portion of the source data value, and wherein the application configuration circuit is further structured to include the at least a portion of the source data value in response to the target device resource value.

The application configuration value may comprise instructions to include the at least a portion of the source data value as at least one of: linked data, referenced data, or incorporated data.

The application configuration circuit may be further structured to determine the instructions to include the at least a portion of the source data value in response to the target device resource value.

An embodiment of the present disclosure includes an apparatus, comprising: a visualization tool (VT) circuit structured to determine a visualization element (VE) in response to a data value comprising at least a portion of a document, and further in response to at least one of: a user visualization selection or a user context value; and an application configuration circuit structured to interpret at least one of: a user noun selection, a user verb selection, or a user context selection; the application configuration circuit further structured to determine an application configuration value in response to the VE, and further in response to the at least one of: the user noun selection, the user verb selection, or the user context selection; and an application publication circuit structured to publish an application in response to the application configuration value.

An embodiment of the present disclosure includes an apparatus, comprising: an application configuration circuit structured to interpret at least one of: a user noun selection, a user verb selection, or a user context selection; the application configuration circuit further structured interpret a source data value and a compression scheme; the application configuration circuit further structured to determine an application configuration value in response to the source data value, the compression scheme, and the at least one of: the user noun selection, the user verb selection, or the user context selection; an application publication circuit structured to publish an application in response to the application configuration value.

The application configuration circuit may be further structured to determine the application configuration value in response to the source data value and the compression scheme by performing at least one operation from: compressing at least a portion of the source data value included in the application or configuring the application to utilize compressed communications during operation of the application.

The compression scheme may comprise at least one of a lossy compression algorithm and a lossless compression algorithm.

An embodiment of the present disclosure includes an apparatus, comprising: an application configuration circuit structured to interpret at least one of: a user noun selection, a user verb selection, or a user context selection; the application configuration circuit further structured to determine an application configuration value in response to a source data value, and further in response to the at least one of: the user noun selection, the user verb selection, or the user context selection; the application configuration circuit further structured to determine the application configuration value such that the application is responsive to a target user location value; and an application publication circuit structured to publish an application in response to the application configuration value.

An embodiment of the present disclosure includes an apparatus, comprising: an application configuration circuit structured to interpret at least one of: a user noun selection, a user verb selection, or a user context selection; the application configuration circuit further structured to determine an application configuration value in response to a source data value, and further in response to the at least one of: the user noun selection, the user verb selection, or the user context selection; the application configuration circuit further structured to determine the application configuration value such that the application is responsive to a target user device resource value; and an application publication circuit structured to publish an application in response to the application configuration value.

An embodiment of the present disclosure includes an apparatus, comprising: an application configuration circuit structured to interpret at least one of: a user noun selection, a user verb selection, or a user context selection; the application configuration circuit further structured to determine an application configuration value in response to a source data value, and further in response to the at least one of: the user noun selection, the user verb selection, or the user context selection; wherein the source data value comprises at least one data object selected from the data objects consisting of a graph, a chart, an image, a video file, an audio file, a media file, video content, audio content, and media content; and an application publication circuit structured to publish an application in response to the application configuration value.

An embodiment of the present disclosure includes a system, comprising: a first computing device communicatively coupled to a second computing device; the first computing device comprising a document server structured to communicate a document comprising a first operation log to the second computing device, the first operation log comprising at least one first sequential operation defining operations to create a first document; the second computing device comprising: a unified document surface application circuit structured to: create a first document view in response to the first operation log, the document view comprising content generated using at least a portion of the first operation log; to receive a user document change input value, and to create a local operation log in response to the first operation log and the user document change input value, the local operation log comprising at least one sequential operation defining operations to create a second document; to update the first document view in response to the user document change input value; and to communicate a change value for the first operation log to the first computing device in response to the first operation log and the local operation log; a user display circuit structured to provide at least a portion of the first document view to a display device; a user interaction circuit structured to interpret a user selection comprising at least one data value, the document comprising the at least one data value, and further structured to interpret a second user selection comprising an extract value; an extracted data generation circuit structured update the first data view in response to the second user selection; and the user display circuit further structured to provide at least a portion of the updated first data view to the display device.

An embodiment of the present disclosure includes a system, comprising: a document server comprising a document, wherein the document server is in communication with a client computing device, and wherein the document server communicates a data element comprising at least a portion of the document to the client computing device; the client computing device comprising: a user display circuit structured to provide a first view to the user in response to the data element; a data management circuit structured to interpret a user table selection value, and to determine at least one of a table data update or a table configuration update in response to the user table selection value; and wherein the user display circuit is further structured to update a second view in response to the at least one of the table data update or the table configuration update a user interaction circuit structured to interpret a user selection comprising at least a portion of the second view, and further structured to interpret a second user selection comprising an extract value; an extracted data generation circuit structured to create an extract data view in response to the user selection; and wherein the user display circuit structured is further structured to display at least a portion of the extract data view in response to the extract value.

An embodiment of the present disclosure includes a system, comprising: a document server structured to communicate at least a portion of a document to a client computing device; the client computing device comprising: a user interaction circuit structured to: interpret a user selection comprising at least one data value, wherein the document comprises the at least one data value, and wherein the at least one data value comprises at least one of a reference or a link to an external source data; and interpret a second user selection comprising an extract value; an extracted data generation circuit structured to create a data view in response to the user selection and the second user selection; and a user display circuit structured to display at least a portion of the data view in response to the extract value.

An embodiment of the present disclosure includes a system, comprising: a document server communicatively coupled to at least one client computing device; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and a first client computing device of the at least one client computing device; wherein the at least one client computing device comprises: a unified document surface application circuit structured to interpret a user formula value and to update the data values of the document in response to the user formula value; a user interaction circuit structured to: interpret a user selection comprising at least one of the user formula value and the updated data values of the document; and interpret a second user selection comprising an extract value; an extracted data generation circuit structured to create an extracted data view in response to the user selection; a user display circuit structured to display at least a portion of the data view in response to the extract value; and a formula engine, wherein the formula engine is structured to determine a calculation definition in response to the user formula value and the document object model.

An embodiment of the present disclosure includes a system, comprising: a document server structured to communicate at least a portion of a document to a client computing device, the document comprising a data element; the client computing device, comprising: a user display circuit structured to provide a first view in response to the data element, the first view comprising at least a portion of the data element; a visualization tool (VT) circuit structured to determine a visualization element (VE) in response to the data element, and further in response to at least one of: a user visualization selection or a user context value; a user interaction circuit structured to: interpret a user selection comprising at least one aspect of the VE; and interpret a second user selection comprising an extract value; an extracted data generation circuit structured to create an extracted data view in response to the user selection; and a user display circuit structured to display at least a portion of the extracted data view in response to the extract value.

An embodiment of the present disclosure includes a system, comprising: a document server structured to communicate at least a portion of a document to a client computing device; the client computing device comprising: a user interaction circuit structured to: interpret a user external data reference value; interpret a display location selection value; interpret a user selection comprising at least one data value, the document comprising the at least one data value; and interpret a second user selection comprising an extract value; an external data access circuit structured to access an external data source in response to the user external data reference value; a data enrichment circuit structured to perform a display enrichment operation in response to the external data source and the display location selection value, and to determine an enriched display value in response to the display location selection value and the display enrichment operation; an extracted data generation circuit structured to create a data view in response to the user selection and the enriched display value; and a user display circuit structured to display at least a portion of the data view in response to the extract value.

An embodiment of the present disclosure includes a system, comprising: a user interaction circuit structured to interpret a table grouping input value associated with at least one table, the table comprising a plurality of categories and a plurality of associated data sets corresponding to the plurality of categories; a table aggregation circuit structured to determine an aggregation value in response to the table grouping input value, wherein the aggregation value corresponds to at least one of the plurality of categories; the user interaction circuit further structured to interpret a user selection comprising at least a portion of the aggregation value, and to interpret a second user selection comprising an extract value; an extracted data generation circuit structured to create an aggregated table view in response to the aggregation value and the user selection; and a user display circuit structured to display at least a portion of the aggregated table view in response to the extract value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a user interaction circuit structured to interpret: a user reference entry; a user selection comprising at least one data value, the document comprising the at least one data value; and a second user selection comprising an extract value; a reference management circuit structured to determine a reference return value in response to the user reference entry; an extracted data generation circuit structured to create a data view in response to the reference return value and the user selection; and a user display circuit structured to display at least a portion of the data view in response to the extract value.

An embodiment of the present disclosure includes a system, comprising: a first computing device communicatively coupled to a second computing device; the first computing device comprising a document server structured to communicate a data value to the second computing device, the data value comprising at least a portion of a document and further comprising a first table object and a second embedded table object; wherein each of the first table object and a second embedded table object comprise a corresponding table specific name, and wherein each of the first table object and the second embedded table object comprise a corresponding parent object name, wherein a first parent object name corresponding to the first table object comprises a distinct name from a second parent object name corresponding to the second embedded table object; and wherein the data value further comprises a table referencing value directed to the second embedded table object, wherein the table referencing value comprises a portion of a formula comprising a corresponding parent object name that is distinct from the first parent object name, and wherein a parent hierarchy for the table referencing value comprises the first parent object name; wherein the second computing device comprises: a user interaction circuit structured to interpret: a user selection comprising at least one data value, the data value comprising at least a portion of at least one of: the first table object, the second table object, and the formula; and a second user selection comprising an extract value; an extracted data generation circuit structured to create a data view in response to the user selection; and a user display circuit structured to display at least a portion of the data view in response to the extract value.

An embodiment of the present disclosure includes a system, comprising: a document server communicatively coupled to at least one client computing device; a document comprising: an operation log, wherein the operation log comprises at least one first sequential operation defining operations to create data values of the document; a formula engine, wherein the formula engine determines a calculation definition in response to at least one formula of the document, and wherein the formula engine is structured to generate an executable object in response to the calculation definition, and wherein the executable object comprises instructions which, upon execution, cause at least one of the document server and the first client computing device to perform operations in response to the calculation definition; wherein the document is positioned on at least one of the document server and a first client computing device of the at least one client computing device, and wherein the formula engine is further structured to interpret a user focus location, and to direct execution of the executable object in response to the user focus location; and wherein the at least one client computing device comprises: a user interaction circuit structured to interpret a user selection comprising at least one of the data values of the document, and further structured to interpret a second user selection comprising an extract value; an extracted data generation circuit structured to create a data view in response to the user selection; and a user display circuit structured to display at least a portion of the data view in response to the extract value.

An embodiment of the present disclosure includes a system, comprising: a document server structured to communicate at least a portion of a document to a client computing device; the client computing device comprising: a user interaction circuit structured to interpret a user selection comprising at least one data value, the document comprising the at least one data value, and further structured to interpret a second user selection comprising an extract value; an extracted data generation circuit structured to create a data view in response to the user selection and a metadata value, wherein the metadata value comprises at least one value selected from the values consisting of: a timestamp value, a tag value, and a user identifier value; and a user display circuit structured to display at least a portion of the data view in response to the extract value.

An embodiment of the present disclosure includes a system, comprising: a document server structured to communicate at least a portion of a document to a client computing device; the client computing device comprising: a user interaction circuit structured to interpret a user selection comprising at least one data value, the document comprising the at least one data value, and further structured to interpret a second user selection comprising an extract value, wherein the extract value comprises at least one value selected from the values consisting of: a report content value, a report location value, a report formatting value, and a report template; an extracted data generation circuit structured to create a data view in response to the user selection; a user display circuit structured to display at least a portion of the data view in response to the extract value.

An embodiment of the present disclosure includes a system, comprising: a document server structured to communicate at least a portion of a document to a client computing device; the client computing device comprising: a user interaction circuit structured to interpret: a user selection comprising at least one source data value, the at least one source data value comprising a data value selected from at least one of: a database; a website; a network location; a second document distinct from the document; data positioned on a cloud server; a portion of any of the foregoing; a local copy of any of the foregoing; and combinations of any of the foregoing; and a second user selection comprising an extract value; an extracted data generation circuit structured to create a data view in response to the user selection; and a user display circuit structured to display at least a portion of the data view in response to the extract value.

An embodiment of the present disclosure includes a system, comprising: a document server structured to communicate at least a portion of a document to a client computing device; the client computing device comprising: a user interaction circuit structured to interpret a user selection comprising at least one data value, the document comprising the at least one data value, and further structured to interpret a second user selection comprising an extract value; a visualization tool (VT) circuit structured to determine a visualization element (VE) in response to the user selection, and further in response to at least one of: a user visualization selection or a user context value; and an extracted data generation circuit structured to create a data view in response to the VE; a user display circuit structured to display at least a portion of the data view in response to the extract value.

An embodiment of the present disclosure includes a system, comprising: a document server structured to communicate at least a portion of a document to a client computing device; the client computing device comprising: a user interaction circuit structured to interpret: a user selection comprising at least one data value, the document comprising the at least one data value; a second user selection comprising an extract value; a client resource circuit structured to determine a target device resource value; an extracted data generation circuit structured to create a data view in response to the user selection and the target device resource value; and a user display circuit structured to display at least a portion of the data view in response to the extract value.

An embodiment of the present disclosure includes a system, comprising: a document server structured to communicate at least a portion of a document to a client computing device; the client computing device comprising: a user interaction circuit structured to interpret a user selection comprising at least one data value, the document comprising the at least one data value, and further structured to interpret a second user selection comprising an extract value; an extracted data generation circuit structured to create a data view in response to the user selection; a user display circuit structured to display at least a portion of the data view in response to the extract value; an wherein at least one of the user selection and data view comprise at least one data object selected from the data objects consisting of a graph, a chart, an image, a video file, an audio file, a media file, video content, audio content, and media content.

An embodiment of the present disclosure includes a system, comprising: a document server structured to communicate at least a portion of a document to a client computing device; the client computing device comprising: a user interaction circuit structured to interpret a user selection comprising at least one data value, the document comprising the at least one data value, and further structured to interpret a second user selection comprising an extract value; an extracted data generation circuit structured to create a data view in response to the user selection; a user notification rules circuit structured to interpret a user notification profile value comprising a notification trigger value and a notification response value, wherein the notification response value comprises an action link definition and a notification location value; a user notification circuit structured to determine whether an event trigger has occurred in response to the notification trigger value and the at least one data value; and a user interaction circuit structured to provide a notification to a user in response to the event trigger, the notification response value, and the data view.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device structured to: create a first document view in response to the first operation log, the document view comprising content generated using at least a portion of the first operation log; provide the first document view to a display device; receive a user document change input value comprising a user table selection value; determine at least one of a table data update or a table configuration update in response to the user table selection value; create a local operation log in response to the first operation log and the user document change input value, the local operation log comprising at least one sequential operation defining operations to create a second document; update the first document view in response to the user document change input value; and communicate a change value for the first operation log to the first computing device in response to the first operation log and the local operation log.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device structured to: create a first document view in response to the first operation log, the document view comprising content generated using at least a portion of the first operation log; provide the first document view to a display device;

to interpret a user selection comprising at least one data value, wherein the document comprises the at least one data value, and wherein the at least one data value comprises at least one of a reference or a link to an external source data, and to create a local operation log in response to the first operation log and the user selection, the local operation log comprising at least one sequential operation defining operations to create a second document; to update the first document view in response to the user selection; and to communicate a change value for the first operation log to the first computing device in response to the first operation log and the local operation log.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; a document object model, wherein the document object model comprises an object definition corresponding to each of a plurality of objects referenced in the first operation log; wherein the document is at least partially positioned on at least one of the document server and a second computing device; wherein the second computing device is structured to: create a first document view in response to the first operation log, the document view comprising content generated using at least a portion of the first operation log; provide the first document view to a display device; receive a user document change input value comprising a user formula value, and create a local operation log in response to the first operation log and the user document change input value, the local operation log comprising at least one sequential operation defining operations to create a second document; update the first document view in response to the user document change input value; and communicate a change value for the first operation log to the first computing device in response to the first operation log and the local operation log; and a formula engine, wherein the formula engine is structured to determine a calculation definition in response to the local operation log, the user formula value, and the document object model.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device structured to: create a first document view in response to the first operation log, the document view comprising content generated using at least a portion of the first operation log; provide the first document view to a display device; receive a user document change input value comprising at least one data value of the first document; determine a visualization element (VE) in response to the user document change input value, and further in response to at least one of: a user visualization selection or a user context value; create a local operation log in response to the first operation log and the user document change input value, the local operation log comprising at least one sequential operation defining operations to create a second document; update the first document view in response to the VE; and communicate a change value for the first operation log to the first computing device in response to the first operation log and the local operation log.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device structured to: create a first document view in response to the first operation log, the document view comprising content generated using at least a portion of the first operation log; provide the first document view to a display device; receive a user document change input value comprising a user notification profile value, the user notification profile value comprising a notification trigger value and a notification response value, and to create a local operation log in response to the first operation log and the user document change input value, the local operation log comprising at least one sequential operation defining operations to create a second document; determine whether an event trigger has occurred in response to the notification trigger value and at least one data value of the first document; provide a notification to a user in response to the event trigger and the notification response value; update the first document view in response to the user document change input value; and communicate a change value for the first operation log to the first computing device in response to the first operation log and the local operation log.

An embodiment of the present disclosure includes a system, comprising: a first computing device at least intermittently communicatively coupled to a second computing device; the first computing device comprising: a document server comprising a client resource circuit structured to determine a client resource value, and the document server structured to communicate a data value to the second computing device in response to the client resource value, the data value comprising at least a portion of a document; the document server further structured to communicate a first operation log to the second computing device, the first operation log comprising at least one first sequential operation defining operations to create a first document; the second computing device structured to: create a first document view in response to the first operation log and the data value, the document view comprising content generated using at least a portion of the first operation log; provide the first document view to a display device; receive a user document change input value, and to create a local operation log in response to the first operation log and the user document change input value, the local operation log comprising at least one sequential operation defining operations to create a second document; update the first document view in response to the user document change input value; and communicate a change value for the first operation log to the first computing device in response to the first operation log and the local operation log.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device structured to: create a first document view in response to the first operation log, the document view comprising content generated using at least a portion of the first operation log; provide the first document view to a display device; receive a user document change input value comprising a user external data reference value and a display location selection value; access an external data source in response to the user external data reference value; perform a display enrichment operation in response to the external data source and the display location selection value; create a local operation log in response to the first operation log and the display enrichment operation, the local operation log comprising at least one sequential operation defining operations to create a second document; update the first document view in response to the enriched display value; and communicate a change value for the first operation log to the first computing device in response to the first operation log and the local operation log.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device structured to: create a first document view in response to the first operation log, the document view comprising content generated using at least a portion of the first operation log; provide the first document view to a display device; receive a user document change input value comprising a table grouping input value associated with at least one table, the table comprising a plurality of categories and a plurality of associated data sets corresponding to the plurality of categories; determine an aggregation value in response to the table grouping input value, wherein the aggregation value corresponds to at least one of the plurality of categories; create a local operation log in response to the first operation log and the aggregation value, the local operation log comprising at least one sequential operation defining operations to create a second document; update the first document view in response to the aggregation value; and communicate a change value for the first operation log to the first computing device in response to the first operation log and the local operation log.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device structured to: create a first document view in response to the first operation log, the document view comprising content generated using at least a portion of the first operation log; provide the first document view to a display device; receive a user document change input value comprising a user table input value, the user table input value comprising a plurality of table data values; determine a table organization value in response to the table data values, wherein the table organization value comprises at least one value selected from the values consisting of: a column naming scheme; a sorting scheme; a filtering scheme; an aggregation scheme; and a formatting scheme; create a local operation log in response to the first operation log and the table organization value, the local operation log comprising at least one sequential operation defining operations to create a second document; update the first document view in response to the table organization value; and communicate a change value for the first operation log to the first computing device in response to the first operation log and the local operation log.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device structured to: create a first document view in response to the first operation log, the document view comprising content generated using at least a portion of the first operation log; provide the first document view to a display device; receive a user document change input value comprising a user reference entry; determine a reference return value in response to the user reference entry; create a local operation log in response to the first operation log and the user document change input value, the local operation log comprising at least one sequential operation defining operations to create a second document; update the first document view in response to the reference return value; and communicate a change value for the first operation log to the first computing device in response to the first operation log and the local operation log.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document having a first table object and a second embedded table object; wherein each of the first table object and a second embedded table object comprise a corresponding table specific name, and wherein each of the first table object and the second embedded table object comprise a corresponding parent object name, wherein a first parent object name corresponding to the first table object comprises a distinct name from a second parent object name corresponding to the second embedded table object; the second computing device structured to: create a first document view in response to the first operation log, the document view comprising content generated using at least a portion of the first operation log; provide the first document view to a display device; receive a table referencing value directed to the second embedded table object, wherein the table referencing value comprises a portion of a formula comprising a corresponding parent object name that is distinct from the first parent object name, and wherein a parent hierarchy for the table referencing value comprises the first parent object name; create a local operation log in response to the first operation log and the user document change input value, the local operation log comprising at least one sequential operation defining operations to create a second document; update the first document view in response to the table referencing value; and communicate a change value for the first operation log to the first computing device in response to the first operation log and the local operation log.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; a formula engine, wherein the formula engine determines a calculation definition in response to at least one formula of the first document, and wherein the formula engine is structured to generate an executable object in response to the calculation definition, and wherein the executable object comprises instructions which, upon execution, cause at least one of the document server and the second computing device to perform operations in response to the calculation definition; and wherein the document is positioned on at least one of the document server and the second client computing device, and wherein the formula engine is further structured to interpret a user focus location, and to direct execution of the executable object in response to the user focus location; the second computing device structured to: create a first document view in response to the first operation log, the document view comprising content generated using at least a portion of the first operation log and the executable object; provide the first document view to a display device; receive a user document change input value, and to create a local operation log in response to the first operation log and the user document change input value, the local operation log comprising at least one sequential operation defining operations to create a second document; communicate a change value for the first operation log to the first computing device in response to the first operation log and the local operation log; and wherein the formula engine is further structured to generate an updated executable object in response to the user document change input value, and to further direct execution of the updated executable object in response to the user focus location; and wherein the second computing device is further structured to update the first document view in response to the user document change input value and the updated executable object.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device structured to create a first document view in response to the first operation log, the document view comprising content generated using at least a portion of the first operation log; provide the first document view to a display device;

receive a user document change input value, and to create a local operation log in response to the first operation log and the user document change input value, the local operation log comprising at least one sequential operation defining operations to create a second document; determine a metadata value, wherein the metadata value comprises at least one value selected from the values consisting of: a timestamp value, a tag value, and a user identifier value; update the first document view in response to the user document change input value and the metadata value; and communicate a change value for the first operation log to the first computing device in response to the first operation log and the local operation log.

The second computing device may be further structured to update the local operation log in response to the metadata value, and to communicate the change value for the first operation log to the first computing device further in response to the first operation log and the updated local operation log.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document; the second computing device structured to: create a first document view in response to the first operation log, the document view comprising content generated using at least a portion of the first operation log; provide the first document view to a display device; to receive a user selection comprising at least one data value of the document, and at least one of a user visualization selection and a user context value; determine a visualization element (VE) in response to the user selection and the at least one of the user visualization selection and the user context value; create a local operation log in response to the first operation log and the VE, the local operation log comprising at least one sequential operation defining operations to create a second document; update the first document view in response to the VE; and communicate a change value for the first operation log to the first computing device in response to the first operation log and the local operation log.

An embodiment of the present disclosure includes a system, comprising: a first computing device communicatively coupled to a second computing device; the first computing device comprising a document server structured to communicate a first operation log to the second computing device, the first operation log comprising at least one first sequential operation defining operations to create a first document, and further comprising a data compression value; the second computing device structured to: create a first document view in response to the first operation log, the document view comprising content generated using at least a portion of the first operation log;

provide the first document view to a display device; to receive a user document change input value, and to create a local operation log in response to the first operation log and the user document change input value, the local operation log comprising at least one sequential operation defining operations to create a second document; update the first document view in response to the user document change input value; and communicate a change value for the first operation log to the first computing device in response to the first operation log and the local operation log.

The at least a portion of at least one of the operation log or the local operation log may be compressed in response to the compression value.

The document server may be further structured to compress at least a portion of the operation log in response to the compression value.

The document server may be further structured to compress a data value of the first document in response to the compression value.

The document server may further comprise at least one value selected from the values consisting of: an instruction to compress at least a portion of the operation log; an instruction to compress a data type; and a compression protocol.

An embodiment of the present disclosure includes a system, comprising: a first computing device communicatively coupled to a second computing device; the first computing device comprising a document server the document server further comprising a client resource circuit structured to determine a client resource value corresponding to the second computing device, the document server structured to communicate a first operation log to the second computing device in response to the client resource value, wherein the first operation log comprises at least one first sequential operation defining operations to create a first document; the second computing device structured to: create a first document view in response to the first operation log, the document view comprising content generated using at least a portion of the first operation log; provide the first document view to a display device; receive a user document change input value, and to create a local operation log in response to the first operation log and the user document change input value, the local operation log comprising at least one sequential operation defining operations to create a second document; update the first document view in response to the user document change input value; and communicate a change value for the first operation log to the first computing device in response to the first operation log and the local operation log.

An embodiment of the present disclosure includes a system, comprising: a document server comprising a document, wherein the document server is in communication with a client computing device, and wherein the document server communicates a data element comprising at least a portion of the document to the client computing device; the client computing device comprising: a user display circuit structured to provide a first view to a user in response to the data element; a data management circuit structured to: interpret a user selection comprising at least one data value, wherein the document comprises the at least one data value, and wherein the at least one data value comprises at least one of a reference or a link to an external source data; interpret a user table selection value; and determine at least one of a table data update or a table configuration update in response to the user table selection value and the user selection; and wherein the user display circuit is further structured to update a second view in response to the user selection and further in response to the at least one of the table data update or the table configuration update.

An embodiment of the present disclosure includes a system, comprising: a document server communicatively coupled to at least one client computing device; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and a first client computing device of the at least one client computing device; wherein the at least one client computing device comprises a unified document surface application circuit structured to: provide a first view to a user in response to the data values of the document; interpret a user formula value and a user table selection value; determine at least one of a table data update or a table configuration update in response to the user table selection value and the user formula value; and update a second view in response to the at least one of the table data update or the table configuration update; and a formula engine, wherein the formula engine is structured to determine a calculation definition in response to the user formula value, the document object model, and the at least one of the table data update or the table configuration update.

An embodiment of the present disclosure includes a system, comprising: a document server comprising a document, wherein the document server is in communication with a client computing device, and wherein the document server communicates a data element comprising at least a portion of the document to the client computing device; the client computing device comprising: a user display circuit structured to provide a first view to a user in response to the data element; a visualization tool (VT) circuit structured to determine a visualization element (VE) in response to the data element, and further in response to at least one of: a user visualization selection or a user context value; a data management circuit structured to interpret a user table selection value, and to determine at least one of a table data update or a table configuration update in response to the user table selection value; and wherein the user display circuit is further structured to update a second view in response to the VE and the at least one of the table data update or the table configuration update.

An embodiment of the present disclosure includes a system, comprising: a document server comprising a document, wherein the document server is in communication with a client computing device, and wherein the document server communicates a data element comprising at least a portion of the document to the client computing device; the client computing device comprising: a user display circuit structured to provide a first view to a user in response to the data element; a user interaction circuit structured to interpret a table grouping input value associated with at least one table, the table comprising a plurality of categories and a plurality of associated data sets corresponding to the plurality of categories; a table aggregation circuit structured to determine an aggregation value in response to the table grouping input value, wherein the aggregation value corresponds to at least one of the plurality of categories; wherein the user interaction circuit is further structured to provide an aggregated table view in response to the aggregation value; a data management circuit structured to interpret a user table selection value, and to determine at least one of a table data update or a table configuration update in response to the user table selection value and the aggregated table view; and wherein the user display circuit is further structured to update a second view in response to the at least one of the table data update or the table configuration update.

An embodiment of the present disclosure includes a system, comprising: a document server comprising a document, wherein the document server is in communication with a client computing device, and wherein the document server communicates a data element comprising at least a portion of the document to the client computing device; the client computing device comprising: a user display circuit structured to provide a first view to a user in response to the data element; a data management circuit structured to interpret a user table selection value and a user table input value, wherein the user table input value comprises a plurality of table data values; wherein the data management circuit is further structured to determine at least one of a table data update or a table configuration update in response to the user table selection value; a table management circuit structured to determine a table organization value in response to the user table selection value and the user table input value, wherein the table organization value comprises at least one value selected from the values consisting of: a column naming scheme; a sorting scheme; a filtering scheme; an aggregation scheme; and a formatting scheme; and wherein the user display circuit is further structured to update a second view in response to the table organization value and further in response to at least one of the table data update or the table configuration update.

An embodiment of the present disclosure includes a system, comprising: a document server comprising a document, wherein the document server is in communication with a client computing device, and wherein the document server communicates a data element comprising at least a portion of the document to the client computing device; the client computing device comprising: a user display circuit structured to provide a first view to a user in response to the data element; a data management circuit structured to interpret a user table selection value and a user reference entry, to determine a reference return value in response to the user reference entry, and to determine at least one of a table data update or a table configuration update in response to the user table selection value; and wherein the user display circuit is further structured to update a second view in response to the reference return value and further in response to at least one of the table data update or the table configuration update.

An embodiment of the present disclosure includes a system, comprising: a document server comprising a document, wherein the document server is in communication with a client computing device, and wherein the document server communicates a data element comprising at least a portion of a document and further comprising a first table object and a second embedded table object; wherein each of the first table object and a second embedded table object comprise a corresponding table specific name, and wherein each of the first table object and the second embedded table object comprise a corresponding parent object name, wherein a first parent object name corresponding to the first table object comprises a distinct name from a second parent object name corresponding to the second embedded table object; the client computing device comprising: a user display circuit structured to provide a first view to a user in response to the data element; a data management circuit structured to interpret a user table selection value, wherein the user table selection value comprises a portion of a formula comprising a corresponding parent object name that is distinct from the first parent object name, and wherein a parent hierarchy for the user table selection value comprises the first parent object name, wherein the data management circuit is further structured to determine at least one of a table data update or a table configuration update in response to the user table selection value; and wherein the user display circuit is further structured to update a second view in response to the at least one of the table data update or the table configuration update.

An embodiment of the present disclosure includes a system, comprising: a document server comprising a document, wherein the document server is in communication with a client computing device, and wherein the document server communicates a data element comprising at least a portion of the document to the client computing device; the client computing device comprising: a user display circuit structured to provide a first view to a user in response to the data element; a data management circuit structured to interpret a user table selection value comprising a formula of the document, and to determine at least one of a table data update or a table configuration update in response to the user table selection value; and wherein the user display circuit is further structured to update a second view in response to the at least one of the table data update or the table configuration update; a formula engine, wherein the formula engine determines a calculation definition in response to the formula of the document, and wherein the formula engine is structured to generate an executable object in response to the calculation definition, and wherein the executable object comprises instructions which, upon execution, cause at least one of the document server and the client computing device to perform operations in response to the calculation definition; and wherein the document is positioned on at least one of the document server and the client computing device, and wherein the formula engine is further structured to interpret a user focus location, and to direct execution of the executable object in response to the user focus location.

An embodiment of the present disclosure includes a system, comprising: a document server comprising a document, wherein the document server is in communication with a client computing device, and wherein the document server communicates a data element comprising at least a portion of the document to the client computing device; the client computing device comprising: a user display circuit structured to provide a first view to a user in response to the data element; a data management circuit structured to: interpret a user table selection value, the user table selection value comprising at least one source data value, wherein the at least one source data value comprises a data value selected from at least one of: a database; a website; a network location; a second document distinct from the document; data positioned on a cloud server; a portion of any of the foregoing; a local copy of any of the foregoing; and combinations of any of the foregoing; and determine at least one of a table data update or a table configuration update in response to the user table selection value; and wherein the user display circuit is further structured to update a second view in response to the at least one of the table data update or the table configuration update.

An embodiment of the present disclosure includes a system, comprising: a document server communicatively coupled to a client computing device; a document comprising an operation log, wherein the operation log comprises at least one first sequential operation defining operations to create data values of the document; a formula engine, wherein the formula engine determines a calculation definition in response to at least one formula of the document; and a document object model, wherein the document object model comprises an object definition corresponding to each of a plurality of objects in the document; wherein the document is at least partially positioned on at least one of the document server and the client computing device; the client computing device comprising: a user interaction circuit structured to interpret a user external data reference value and a display location selection value comprising at least one of the plurality of objects in the document; an external data access circuit structured to access an external data source in response to the user external data reference value; a data enrichment circuit structured to performing a display enrichment operation in response to the external data source and the display location selection value; and a user display circuit structured to provide an enriched display value in response to the display location selection value and the display enrichment operation.

An embodiment of the present disclosure includes a system, comprising: a document server communicatively coupled to a client computing device; a document comprising an operation log, wherein the operation log comprises at least one first sequential operation defining operations to create data values of the document; a formula engine, wherein the formula engine determines a calculation definition in response to at least one formula of the document; and a document object model, wherein the document object model comprises an object definition corresponding to each of a plurality of objects in the document; wherein the document is at least partially positioned on at least one of the document server and the client computing device; wherein the document object model further comprises a report object definition comprising at least one value selected from the values consisting of: a report content value, a report location value, a report formatting value, and a report template; and wherein the calculation definition further comprises operations to generate a report object in response to the report object definition.

An embodiment of the present disclosure includes a system, comprising: a document server at least intermittently communicatively coupled to a client computing device; a document comprising an operation log, wherein the operation log comprises at least one first sequential operation defining operations to create data values of the document; a formula engine, wherein the formula engine determines a calculation definition in response to at least one formula of the document, wherein the document server is further structured to interpret a user connection description, and wherein the formula engine is further structured to direct execution of the executable object in response to the user connection description; and a document object model, wherein the document object model comprises an object definition corresponding to each of a plurality of objects in the document; wherein the document is at least partially positioned on at least one of the document server and the client computing device of the at least one client computing device.

An embodiment of the present disclosure includes a system, comprising: a document server communicatively coupled to a client computing device; a document comprising an operation log, wherein the operation log comprises at least one first sequential operation defining operations to create data values of the document; a formula engine, wherein the formula engine determines a calculation definition in response to at least one formula of the document; a document object model, wherein the document object model comprises a visualization element (VE) object definition; wherein the document is at least partially positioned on at least one of the document server and the client computing device; wherein the client computing device comprises: a user interaction circuit structured to interpret a user selection comprising at least one data value, the document comprising the at least one data value of the document; a visualization tool (VT) circuit structured to determine a VE in response to the user selection, the VE object definition, and the at least one formula of the document; and wherein the user interaction circuit is further structured to create a data view in response to the VE.

The VT circuit may be further structured to determine the VE in response to at least one of: a user visualization selection or a user context value.

An embodiment of the present disclosure includes a system, comprising: a document server communicatively coupled to a client computing device and at least one external data source; a document comprising an operation log, wherein the operation log comprises at least one first sequential operation defining operations to create data values of the document; a formula engine, wherein the formula engine determines a calculation definition in response to at least one formula of the document, wherein the document server is further structured to interpret an access value corresponding to the external data source, and wherein the formula engine is further structured to direct execution of the executable object in response to the user focus location; a document object model, wherein the document object model comprises an object definition corresponding to each of a plurality of objects in the document; and wherein the document is at least partially positioned on at least one of the document server and the client computing device.

An embodiment of the present disclosure includes a system, comprising: a document server communicatively coupled to a client computing device; a document comprising an operation log, wherein the operation log comprises at least one first sequential operation defining operations to create data values of the document; a formula engine, wherein the formula engine determines a calculation definition in response to at least one formula of the document, wherein the client computing device is structured to interpret a user focus location, and wherein the formula engine is further structured to direct execution of the executable object in response to the user focus location; a document object model, wherein the document object model comprises an object definition corresponding to each of a plurality of objects in the document; and wherein the document is at least partially positioned on at least one of the document server and the client computing device.

An embodiment of the present disclosure includes a system, comprising: a document server communicatively coupled to at least one client computing device and at least one workflow server; a document comprising an operation log, wherein the operation log comprises at least one first sequential operation defining operations to create data values of the document; a formula engine, wherein the formula engine determines a calculation definition in response to at least one formula of the document, wherein the document server is further structured to interpret a workload profile corresponding to the at least one workflow server, and wherein the formula engine is further structured to direct execution of the executable object in response to the user focus location; a document object model, wherein the document object model comprises an object definition corresponding to each of a plurality of objects in the document; and wherein the document is at least partially positioned on at least one of the document server and the client computing device.

An embodiment of the present disclosure includes a system, comprising: a document server communicatively coupled to at a client computing device; a document comprising an operation log, wherein the operation log comprises at least one first sequential operation defining operations to create data values of the document; a formula engine, wherein the formula engine determines a calculation definition in response to at least one formula of the document, wherein the document server is further structured to interpret a user location value, and wherein the formula engine is further structured to direct execution of the executable object in response to the user location value; and a document object model, wherein the document object model comprises an object definition corresponding to each of a plurality of objects in the document; wherein the document is at least partially positioned on at least one of the document server and the client computing device of the at least one client computing device.

An embodiment of the present disclosure includes a system, comprising: a document server communicatively coupled to a client computing device, the document server comprising a client resource circuit structured to determine a client resource value; a document comprising an operation log, wherein the operation log comprises at least one first sequential operation defining operations to create data values of the document; a formula engine, wherein the formula engine determines a calculation definition in response to at least one formula of the document and further in response to the client resource value; a document object model, wherein the document object model comprises an object definition corresponding to each of a plurality of objects in the document; and wherein the document is at least partially positioned on at least one of the document server and the client computing device.

An embodiment of the present disclosure includes a system, comprising: a document server structured to communicate at least a portion of a document to a client computing device; a document object model, wherein the document object model comprises an object definition corresponding to each of a plurality of objects in the document; the client computing device comprising: a user interaction circuit structured to interpret a user selection comprising at least one data value, wherein the document comprises the at least one data value, and wherein the at least one data value comprises a formula comprising at least one of a reference or a link to an external source data; a data management circuit structured to create a data view in response to the user selection; and a user display circuit structured to display at least a portion of the data view in response to the user selection; and a formula engine, wherein the formula engine is structured to determine a calculation definition in response to the user formula value and the document object model.

An embodiment of the present disclosure includes a system, comprising: a document server structured to communicate at least a portion of a document to a client computing device; the client computing device comprising: a user interaction circuit structured to interpret a user selection comprising at least of a user visualization selection or a user context value, wherein the document comprises at least one data value, and wherein the at least one data value comprises at least one of a reference or a link to an external source data; a visualization tool (VT) circuit structured to determine a visualization element (VE) in response to the at least one data element, and further in response to the at least one of the user visualization selection or the user context value; a data management circuit structured to create a data view in response to the user selection; and a user display circuit structured to display at least a portion of the data view in response to the VE and the at least one data element.

An embodiment of the present disclosure includes a system, comprising: a document server structured to communicate at least a portion of a document to a client computing device; the client computing device comprising: a user interaction circuit structured to interpret a user selection comprising at least one data value and a table grouping input value associated with at least one table, wherein the document comprises the at least one data value, wherein the at least one data value comprises at least one of a reference or a link to an external source data, and wherein the table comprising a plurality of categories and a plurality of associated data sets corresponding to the plurality of categories; a table aggregation circuit structured to determine an aggregation value in response to the table grouping input value and the at least one data value, wherein the aggregation value corresponds to at least one of the plurality of categories; and a data management circuit structured to create a data view in response to the user selection; and a user display circuit structured to provide an aggregated table view in response to the aggregation value.

An embodiment of the present disclosure includes a system, comprising: a document server structured to communicate at least a portion of a document to a client computing device; the client computing device comprising: a user interaction circuit structured to interpret: a user selection comprising at least one data value comprising at least one of a reference or a link to an external source data, and wherein the document comprises the at least one data value, and wherein the at least one data value; and a user table input value, the user table input value comprising a plurality of table data values; a table management circuit structured to determine a table organization value in response to the at least one data value and the user selection, wherein the table organization value comprises at least one value selected from the values consisting of: a column naming scheme; a sorting scheme; a filtering scheme; an aggregation scheme; and a formatting scheme; and a user display circuit structured to provide a table view in response to the table organization value.

An embodiment of the present disclosure includes a system, comprising: a document server structured to communicate at least a portion of a document to a client computing device; the client computing device comprising: a user interaction circuit structured to interpret a user reference entry and a user selection, the user selection comprising at least one data value, wherein the document comprises the at least one data value, and wherein the at least one data value comprises at least one of a reference or a link to an external source data; a reference management circuit structured to determine a reference return value in response to the user reference entry; and a user display circuit structured to determine a document view in response to the reference return value and the user selection, and to provide the document view to a user.

An embodiment of the present disclosure includes a system, comprising: a first computing device communicatively coupled to a second computing device; the first computing device comprising a document server structured to communicate a data value to the second computing device, the data value comprising at least a portion of a document and further comprising a first table object and a second embedded table object; the second computing device comprising: a user interaction circuit structured to interpret a user selection comprising at least one data value, wherein the document comprises the at least one data value, and wherein the at least one data value comprises at least one of a reference or a link to an external source data; wherein at least one of the first table object and the second embedded table object comprise at least one of a reference or a link to the at least one data value; a data management circuit structured to create a data view in response to the user selection; and a user display circuit structured to display at least a portion of the data view in response to the user selection.

An embodiment of the present disclosure includes a system, comprising: a document server structured to communicate at least a portion of a document to a client computing device; the client computing device comprising: a user interaction circuit structured to interpret a user selection comprising at least one data value, wherein the document comprises the at least one data value, and wherein the at least one data value comprises at least one of a reference or a link to an external source data; a data management circuit structured to create a data view in response to the user selection; and a user display circuit structured to display at least a portion of the data view in response to the user selection; and a formula engine, wherein the formula engine determines a calculation definition in response to at least one formula of the document, and wherein the formula engine is structured to generate an executable object in response to the calculation definition, and wherein the executable object comprises instructions which, upon execution, cause at least one of the document server and the first client computing device to perform operations in response to the calculation definition; wherein the formula engine is further structured to interpret a user focus location, and to direct execution of the executable object in response to the user focus location.

An embodiment of the present disclosure includes a system, comprising: a document server structured to communicate at least a portion of a document to a client computing device; the client computing device comprising: a user interaction circuit structured to interpret a user selection comprising at least one data value, wherein the document comprises the at least one data value, and wherein the at least one data value comprises at least one of a reference or a link to an external source data; a data management circuit structured to create a data view in response to the user selection; and a user display circuit structured to display at least a portion of the data view in response to the user selection; and a formula engine, wherein the formula engine determines a calculation definition in response to at least one formula of the document, and wherein the formula engine is structured to generate an executable object in response to the calculation definition, and wherein the executable object comprises instructions which, upon execution, cause at least one of the document server and the first client computing device to perform operations in response to the calculation definition; wherein the formula engine is further structured to interpret an access value corresponding to the external source data, and to direct execution of the executable object in response to the access value.

An embodiment of the present disclosure includes a system, comprising: a document server structured to communicate at least a portion of a document to a client computing device; the client computing device comprising; a user interaction circuit structured to interpret a user selection comprising at least one data value, wherein the document comprises the at least one data value, and wherein the at least one data value comprises at least one of a reference or a link to an external source data; wherein the external source data comprises at least one data source selected from the data sources consisting of: a database; a website; a network location; a second document distinct from the document; data positioned on a cloud server; a portion of any of the foregoing; a local copy of any of the foregoing; and combinations of any of the foregoing; a data management circuit structured to create a data view in response to the user selection; and a user display circuit structured to display at least a portion of the data view in response to the user selection.

An embodiment of the present disclosure includes a system, comprising: a document server structured to communicate at least a portion of a document to a client computing device, wherein the document server is further structured to interpret a user connection description; the client computing device comprising: a user interaction circuit structured to interpret a user selection comprising at least one data value, wherein the document comprises the at least one data value, and wherein the at least one data value comprises at least one of a reference or a link to an external source data; a data management circuit structured to store at least a portion of the external source data in a datastore the user connection description, and to create a data view in response to at least one of the datastore and the user selection; and a user display circuit structured to display at least a portion of the data view in response to the user selection.

An embodiment of the present disclosure includes a system, comprising: a document server structured to communicate at least a portion of a document to a client computing device; the client computing device comprising:

a user interaction circuit structured to interpret a user selection comprising at least one data value, wherein the document comprises the at least one data value, and wherein the at least one data value comprises at least one of a reference or a link to an external source data; a visualization tool (VT) circuit structured to determine a visualization element (VE) in response to the at least one data value and further in response to at least one of: a user visualization selection or a user context value; a data management circuit structured to create a data view in response to the VE and the at least one data value; and a user display circuit structured to display at least a portion of the data view in response to the user selection.

An embodiment of the present disclosure includes a system, comprising: a document server structured to communicate at least a portion of a document to a client computing device; the client computing device comprising: a user interaction circuit structured to interpret a user selection comprising at least one data value, wherein the document comprises the at least one data value, and wherein the at least one data value comprises at least one of a reference or a link to an external source data; a data management circuit structured to perform a data cleansing operation in response to the user selection, and to create a data view in response to at least one of the data cleansing operation and the user selection; and a user display circuit structured to display at least a portion of the data view in response to the user selection.

The data management circuit may be further structured to store at least a portion of the external source data in a datastore in response to the data cleansing operation.

The data management circuit may be further structured to verify the datastore in response to the user selection, and to provide data from the datastore in response to the user selection and the verified datastore.

An embodiment of the present disclosure includes a system, comprising: a document server structured to communicate at least a portion of a document to a client computing device; the client computing device comprising: a user interaction circuit structured to interpret a user selection comprising at least one data value, wherein the document comprises the at least one data value, and wherein the at least one data value comprises at least one of a reference or a link to an external source data, wherein the user interaction circuit is further structured to interpret a user focus location; a data management circuit structured to perform a pre-fetch operation in response to the user selection and the user focus location, and to store at least a portion of the external source data in a datastore in response pre-fetch operation; and a user display circuit structured to display at least a portion of the document in response to the user focus location.

The data management circuit may be further structured to predict a second user focus location, and to perform the pre-fetch operation further in response to the second user focus location.

An embodiment of the present disclosure includes a system, comprising: a document server structured to communicate at least a portion of a document to a client computing device; the client computing device comprising: a user interaction circuit structured to interpret a user selection comprising at least one data value, wherein the document comprises the at least one data value, and wherein the at least one data value comprises at least one of a reference or a link to an external source data; wherein the external source data comprises at least one data object selected from the data objects consisting of a graph, a chart, an image, a video file, an audio file, a media file, video content, audio content, and media content; a data management circuit structured to create a data view in response to the user selection; and a user display circuit structured to display at least a portion of the data view in response to the user selection.

An embodiment of the present disclosure includes a system, comprising: a document server communicatively coupled to a computing device; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and the computing device; wherein the at least one client computing device comprises a formula engine, wherein the formula engine is structured to determine a calculation definition in response to the user formula value and the document object model; wherein the client computing device comprises; a unified document surface application circuit structured to interpret a user formula value and to update the data values of the document in response to the user formula value; a user display circuit structured to provide a first view in response to the updated data values of the document; a visualization tool (VT) circuit structured to determine a visualization element (VE) in response to the updated data values of the document, and further in response to at least one of: a user visualization selection or a user context value; and wherein the user display circuit is further structured to provide a second view in response to the VE and updated data values of the document.

An embodiment of the present disclosure includes a system, comprising: a document server communicatively coupled to a client computing device; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and the computing device; wherein the client computing device comprises a unified document surface application circuit structured to interpret a user formula value and to update the data values of the document in response to the user formula value; and a formula engine, wherein the formula engine is structured to determine a calculation definition in response to the user formula value and the document object model, and wherein the formula engine is further structured to interpret a user focus location, and to direct execution of the executable object in response to the user focus location.

An embodiment of the present disclosure includes a system, comprising: a document server communicatively coupled to a client computing device; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and the client computing device; wherein the client computing device comprises: a unified document surface application circuit structured to interpret a user formula value; and to update the data values of the document in response to the user formula value a user notification rules circuit structured to interpret a user notification profile value comprising a notification trigger value and a notification response value, wherein the notification response value comprises an action link definition and a notification location value; a user notification circuit structured to determine whether an event trigger has occurred in response to the notification trigger value and update the data values of the document; and a user interaction circuit structured to provide a notification to a user in response to the event trigger and the notification response value; and a formula engine, wherein the formula engine is structured to determine a calculation definition in response to the user formula value and the document object model;

An embodiment of the present disclosure includes a system, comprising: a document server communicatively coupled to a client computing device; a document comprising defining operations to create data values of the document; a document object model, wherein the document object model comprises an object definition corresponding to each of a plurality of objects in the document; wherein the document is at least partially positioned on at least one of the document server and the client computing device of the at least one client computing device; wherein the client computing device comprises a unified document surface application circuit structured to interpret a user formula value and to update the data values of the document in response to the user formula value and further in response to a metadata value, wherein the metadata value comprises at least one value selected from the values consisting of: a timestamp value, a tag value, and a user identifier value; and a formula engine, wherein the formula engine is structured to determine a calculation definition in response to the user formula value and the document object model.

An embodiment of the present disclosure includes a system, comprising: a document server communicatively coupled to a client computing device; a document comprising an operation log, wherein the operation log comprises at least one first sequential operation defining operations to create data values of the document, wherein the data values of the document comprise at least one of a link or a reference to at least one external source data, wherein the at least one external source data comprises at least one data source selected from the data sources consisting of: a database; a website; a network location; a second document distinct from the document; data positioned on a cloud server; a portion of any of the foregoing; a local copy of any of the foregoing; and combinations of any of the foregoing; a document object model, wherein the document object model comprises an object definition corresponding to each of a plurality of objects in the document; wherein the document is at least partially positioned on at least one of the document server and the client computing device; wherein the client computing device comprises a unified document surface application circuit structured to interpret a user formula value and to update the data values of the document in response to the user formula value; and a formula engine, wherein the formula engine is structured to determine a calculation definition in response to the user formula value and the document object model.

An embodiment of the present disclosure includes a system, comprising: a document server at least intermittently communicatively coupled to a client computing device; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and the computing device; wherein the client computing device comprises a unified document surface application circuit structured to interpret a user formula value and to update the data values of the document in response to the user formula value; and a formula engine, wherein the formula engine is structured to determine a calculation definition in response to the user formula value and the document object model, wherein the document server is further structured to interpret a user connection description, and wherein the formula engine is further structured to direct execution of the executable object in response to the user connection description.

An embodiment of the present disclosure includes a system, comprising: a document server communicatively coupled to a client computing device; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and the client computing device; wherein the client computing device comprises a unified document surface application circuit structured to interpret a user formula value and to update the data values of the document in response to the user formula value; the client computing device comprising: a user interaction circuit structured to interpret a user selection comprising at least one of the data values of the document; a visualization tool (VT) circuit structured to determine a visualization element (VE) in response to the at least one of the data values of the document and further in response to at least one of: a user visualization selection or a user context value; a data management circuit structured to create a data view in response to the VE and the at least one of the data values of the document; and a user display circuit structured to display at least a portion of the data view in response to the user selection; and a formula engine, wherein the formula engine is structured to determine a calculation definition in response to the user formula value and the document object model.

An embodiment of the present disclosure includes a system, comprising: a document server communicatively coupled to a client computing device; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server the client computing device; wherein the client computing device comprises a unified document surface application circuit structured to interpret a user formula value and to update the data values of the document in response to the user formula value; and a formula engine, wherein the formula engine is structured to: determine a calculation definition in response to the user formula value and the document object model; generate an executable object in response to the calculation definition, wherein the executable object comprises instructions which, upon execution, cause at least one of the document server and the first client computing device to perform operations in response to the calculation definition; interpret a compression value; and direct execution of the executable object in response to the compression value.

An embodiment of the present disclosure includes a system, comprising: a document server communicatively coupled to a client computing device; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and the computing device; wherein the client computing device comprises a unified document surface application circuit structured to interpret a user formula value and to update the data values of the document in response to the user formula value; and a formula engine, wherein the formula engine is structured to determine a calculation definition in response to the user formula value and the document object model, wherein the client computing device is further structured to interpret a user focus location, and wherein the formula engine is further structured to direct execution of the executable object in response to the user focus location.

An embodiment of the present disclosure includes a system, comprising: a document server communicatively coupled to a client computing device; a document comprising defining operations to create data values of the document; a document object model, wherein the document object model comprises an object definition corresponding to each of a plurality of objects in the document; wherein the document is at least partially positioned on at least one of the document server and the client computing device; wherein the at least one client computing device comprises a unified document surface application circuit structured to interpret a user formula value and to update the data values of the document in response to the user formula value; and a formula engine, wherein the formula engine is structured to determine a calculation definition
    in response to the user formula value and the document object model, wherein the document server is further structured to interpret a user location value, and wherein the formula engine is further structured to direct execution of the executable object in response to the user location value.

An embodiment of the present disclosure includes a system, comprising: a document server communicatively coupled to a client computing device, the document server comprising a client resource circuit structured to determine a client resource value; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and the client computing device; wherein the client computing device comprises a unified document surface application circuit structured to interpret a user formula value and to update the data values of the document in response to the user formula value; and a formula engine, wherein the formula engine is structured to determine a calculation definition in response to the user formula value, the document object model, and the client resource value.

An embodiment of the present disclosure includes a system, comprising: a document server communicatively coupled to a client computing device, the document server comprising a client resource circuit structured to determine a client resource value; a document comprising an operation log, wherein the operation log comprises at least one first sequential operation defining operations to create data values of the document; a document object model, wherein the document object model comprises an object definition corresponding to each of a plurality of objects in the document; wherein the document is at least partially positioned on at least one of the document server and the client computing device; wherein the client computing device comprises a unified document surface application circuit structured to interpret a user formula value and to update the data values of the document in response to the user formula value; and a formula engine, wherein the formula engine is structured to determine a calculation definition in response to the user formula value and the document object model, and wherein the formula engine is further structured to direct execution of the executable object in response to the client resource value.

An embodiment of the present disclosure includes a system, comprising: a document server structured to communicate at least a portion of a document to a client computing device; the client computing device comprising: a user interaction circuit structured to interpret a user external data reference value, a display location selection value, and a user selection comprising at least one data value, wherein the document comprises the at least one data value; an external data access circuit structured to access an external data source in response to the user external data reference value; a data enrichment circuit structured to performing a display enrichment operation in response to the external data source, the display location selection value, and the at least one data value; and a user display circuit structured to provide an enriched display value in response to the display location selection value and the display enrichment operation.

An embodiment of the present disclosure includes a system, comprising: a document server structured to communicate at least a portion of a document to a client computing device, the document comprising a data element; the client computing device, comprising: a user interaction circuit structured to interpret a user external data reference value and a display location selection value; an external data access circuit structured to access an external data source in response to the user external data reference value; a data enrichment circuit structured to performing a display enrichment operation in response to the external data source, the data element, and the display location selection value; a visualization tool (VT) circuit structured to determine a visualization element (VE) in response to the display enrichment operation, and further in response to at least one of: a user visualization selection or a user context value; and wherein the user display circuit is further structured to provide a view in response to the VE and the data element.

An embodiment of the present disclosure includes a system, comprising: a document server structured to communicate at least a portion of a document to a client computing device, the document comprising a data element; the client computing device, comprising: a user interaction circuit structured to interpret a table grouping input value associated with at least one table, the table comprising a plurality of categories and a plurality of associated data sets corresponding to the plurality of categories; a table aggregation circuit structured to determine an aggregation value in response to the table grouping input value, wherein the aggregation value corresponds to at least one of the plurality of categories; and a visualization tool (VT) circuit structured to determine a visualization element (VE) in response to the aggregation value, and further in response to at least one of: a user visualization selection or a user context value; and wherein the user display circuit is further structured to provide a second view in response to the VE and the data element.

An embodiment of the present disclosure includes a system, comprising: a document server structured to communicate at least a portion of a document to a client computing device, the document comprising a data element; the client computing device, comprising: a unified document application circuit structured to interpret a user table input value, the user table input value comprising a plurality of table data values; a table management circuit structured to determine a table organization value in response to the table data values, wherein the table organization value comprises at least one value selected from the values consisting of: a column naming scheme; a sorting scheme; a filtering scheme; an aggregation scheme; and a formatting scheme; a visualization tool (VT) circuit structured to determine a visualization element (VE) in response to the table organization value, and further in response to at least one of: a user visualization selection or a user context value; and wherein the user display circuit is further structured to provide a second view in response to the VE and the data element.

An embodiment of the present disclosure includes a system, comprising: a document server structured to communicate at least a portion of a document to a client computing device, the document comprising a data value, the data value comprising at least a portion of a document and further comprising a first table object and a second embedded table object; wherein each of the first table object and a second embedded table object comprise a corresponding table specific name, and wherein each of the first table object and the second embedded table object comprise a corresponding parent object name, wherein a first parent object name corresponding to the first table object comprises a distinct name from a second parent object name corresponding to the second embedded table object; and wherein the data value further comprises a table referencing value directed to the second embedded table object, wherein the table referencing value comprises a portion of a formula comprising a corresponding parent object name that is distinct from the first parent object name, and wherein a parent hierarchy for the table referencing value comprises the first parent object name; the client computing device, comprising: a unified document application circuit structured to interpret a user table input value, the user table input value comprising at least one of the first table object and the second embedded table object; a visualization tool (VT) circuit structured to determine a visualization element (VE) in response to the user table input value, and further in response to at least one of: a user visualization selection or a user context value; and wherein the user display circuit is further structured to provide a view in response to the VE and the data value.

An embodiment of the present disclosure includes a system, comprising: a document server structured to communicate at least a portion of a document to a client computing device, the document comprising a data element; the client computing device, comprising: a user display circuit structured to provide a first view in response to the data element, the first view comprising at least a portion of the data element; a visualization tool (VT) circuit structured to determine a visualization element (VE) in response to the data element, and further in response to at least one of: a user visualization selection or a user context value; and wherein the user display circuit is further structured to provide a second view in response to the VE and the data element; a formula engine, wherein the formula engine determines a calculation definition in response to at least one formula of the document, and wherein the formula engine is structured to generate an executable object in response to the calculation definition, and wherein the executable object comprises instructions which, upon execution, cause at least one of the document server and the client computing device to perform operations in response to the calculation definition; and wherein the document is positioned on at least one of the document server and the client computing device, and wherein the formula engine is further structured to interpret a user focus location, and to direct execution of the executable object in response to the user focus location.

An embodiment of the present disclosure includes a system, comprising: a document server structured to communicate at least a portion of a document to a client computing device, the document comprising a data element; the client computing device, comprising: a unified document surface application circuit structured to interpret a user report value, the user report value comprising at least one value selected from the values consisting of: a report content value, a report location value, a report formatting value, and a report template; a visualization tool (VT) circuit structured to determine a visualization element (VE) in response to the user report value and the data element, and further in response to at least one of: a user visualization selection or a user context value; and wherein the user display circuit is further structured to provide a second view in response to the VE and the data element.

An embodiment of the present disclosure includes a system, comprising: a document server structured to communicate at least a portion of a document to a client computing device, the document comprising a data element, the data element comprising at least one of a link or a reference to at least one external source data, wherein the at least on external source data comprises at least one data source selected from the data sources consisting of: a database; a website; a network location; a second document distinct from the document; data positioned on a cloud server; a portion of any of the foregoing; a local copy of any of the foregoing; and combinations of any of the foregoing; the client computing device, comprising: a user display circuit structured to provide a first view in response to the data element, the first view comprising at least a portion of the data element; a visualization tool (VT) circuit structured to determine a visualization element (VE) in response to the data element, and further in response to at least one of: a user visualization selection or a user context value; and wherein the user display circuit is further structured to provide a second view in response to the VE and the data element.

An embodiment of the present disclosure includes a system, comprising: a document server structured to communicate at least a portion of a document to a client computing device, the document comprising a data element; the client computing device, comprising: a user display circuit structured to provide a first view in response to the data element, the first view comprising at least a portion of the data element; a visualization tool (VT) circuit structured to determine a visualization element (VE) in response to the data element, and further in response to at least one of: a user visualization selection or a user context value; and wherein the user display circuit is further structured to provide a second view in response to the VE and the data element.

The VE further may comprise a control associated with the VE, wherein the control further comprises at least one control selected from the controls consisting of: a switch control; a multi-state switch control; a multi-picker control; an option list picker control; a dropdown picker control; a numeric slider control; a date slider control; a time slider control; a map picker control; a text box control; a validated text box control; a structured text box control; a card layout control; a drawing shape control; a media visual control; a table renderer control; a chart control; a numeric range slider control; date range picker control; and a shape set control.

The VT circuit may be further structured interpret a user control value, and to update the VE in response to the user control value.

An embodiment of the present disclosure includes a system, comprising: a document server structured to communicate at least a portion of a document to a client computing device, the document comprising a data element; the client computing device, comprising:

a unified document surface application circuit structured to interpret a user location value;

a user display circuit structured to provide a first view in response to the data element, the first view comprising at least a portion of the data element; a visualization tool (VT) circuit structured to determine a visualization element (VE) in response to the data element and further in response to the user location value; and wherein the user display circuit is further structured to provide a second view in response to the VE and the data element.

The VT circuit may be further structured to determine the VE further in response to one of a user visualization selection or a user context value.

An embodiment of the present disclosure includes a system, comprising: a document server structured to communicate at least a portion of a document to a client computing device, the document comprising a data element, and wherein the document server comprises a client resource circuit structured to determine a client resource value; the client computing device comprising: a user display circuit structured to provide a first view in response to the data element, the first view comprising at least a portion of the data element; a visualization tool (VT) circuit structured to determine a visualization element (VE) in response to the data element and the client resource value; an extracted data generation circuit structured to create a data view in response to the user selection and the target device resource value; and wherein the user display circuit is further structured to provide a second view in response to the VE and the data element.

The VT circuit may be further structured to determine the VE further in response to at least one of: a user visualization selection or a user context value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a user interaction circuit structured to interpret a user reference entry; a reference management circuit structured to determine a reference return value in response to the user reference entry; a user notification rules circuit structured to interpret a user notification profile value comprising a notification trigger value, the reference return value, and a notification response value; a data management circuit structured to interpret the data value; a user notification circuit structured to determine whether an event trigger has occurred in response to the notification trigger value and the data value; and a user interaction circuit structured to provide a notification to a user in response to the event trigger and the notification response value.

The data management circuit may be further structured to update the data value, and wherein the user notification circuit is further structured to determine whether the event trigger has occurred in response to the updated data value.

The updated data value may comprise a value corresponding to the reference return value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a user notification rules circuit structured to interpret a user notification profile value comprising a notification trigger value and a notification response value; a data management circuit structured to interpret the data value, wherein the data management circuit is further structured to perform a prefetch operation of the data value in response to the user notification profile; a user notification circuit structured to determine whether an event trigger has occurred in response to the notification trigger value and the data value; and a user interaction circuit structured to provide a notification to a user in response to the event trigger and the notification response value.

The pre-fetch operation may comprise at least one of accessing an external data source and calculating a result value.

An embodiment of the present disclosure may further comprise a uniform document surface application circuit structured to interpret a user location value, and wherein the pre-fetch operation is further in response to the user location value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising:

a user notification rules circuit structured to interpret a user notification profile value comprising a notification trigger value and a notification response value, wherein at least one of the user notification profile value and the notification trigger value comprise a visualization element (VE); a data management circuit structured to interpret the data value; a user notification circuit structured to determine whether an event trigger has occurred in response to the notification trigger value and the data value; and a user interaction circuit structured to provide a notification to a user in response to the event trigger and the notification response value.

The user notification rules circuit may be further structured to interpret at least one of the user notification profile value and the notification trigger value by interpreting a user control input.

The user notification rules circuit may be further structured to interpret the notification trigger value by interpreting a user control input comprising a map picker control input.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a uniform document surface application circuit structured to interpret a user location value; a user notification rules circuit structured to interpret a user notification profile value comprising a notification trigger value and a notification response value; a data management circuit structured to interpret the data value; a user notification circuit structured to determine whether an event trigger has occurred in response to the notification trigger value and the data value; and a user interaction circuit structured to provide a notification to a user in response to the event trigger, the notification response value, and the user location value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a uniform document surface application circuit structured to interpret a user location value; a user notification rules circuit structured to interpret a user notification profile value comprising a notification trigger value and a notification response value; a data management circuit structured to interpret the data value; a user notification circuit structured to determine whether an event trigger has occurred in response to the notification trigger value, the data value, and the user location value; and a user interaction circuit structured to provide a notification to a user in response to the event trigger and the notification response value.

An embodiment of the present disclosure includes a system, comprising: a first computing device at least intermittently communicatively coupled to a second computing device; the first computing device comprising a document server, the document server further comprising a client resource circuit structured to determine a client resource value, and the document server structured to communicate a data value to the second computing device in response to the client resource value, the data value comprising at least a portion of a document; the second computing device comprising: a user interaction circuit structured to interpret a user external data reference value and a display location selection value; an external data access circuit structured to access an external data source in response to the user external data reference value, wherein the external data access circuit is further structured to perform at least one of: pre-fetch external data in response to an active communication link between the first computing device and at least one of the document server and the external data source; and store external data from the external data source in a local datastore; a data enrichment circuit structured to perform a display enrichment operation in response to the external data source and the display location selection value; a user display circuit structured to provide an enriched display value in response to the display location selection value and the display enrichment operation; a user display circuit structured to determine a document view in response to the data value, and to provide the document view to a user; a unified document surface application circuit structured to interpret a first user input comprising an edit to the data value; and a document synchronization circuit structured to communicate the first user input to the first computing device.

An embodiment of the present disclosure includes a system, comprising: a first computing device at least intermittently communicatively coupled to a second computing device; the first computing device comprising a document server, the document server further comprising a client resource circuit structured to determine a client resource value, and the document server structured to communicate a data value to the second computing device in response to the client resource value, the data value comprising at least a portion of a document; the second computing device comprising: a user display circuit structured to determine a document view in response to the data value, and to provide the document view to a user; a unified document surface application circuit structured to interpret a first user input comprising an edit to the data value; and a document synchronization circuit structured to communicate the first user input to the first computing device, wherein the document synchronization circuit is further structured to determine that a communication link between the document server and the second computing device is restored, and to communicate the first user input to the first computing device in response to the restored communication link.

The unified document surface application circuit may be further structured to request a local storage operation, wherein the local storage operation further comprises at least one operation selected from: storing at least a portion of the document on a datastore of the second computing device; storing at least a portion of the document on a datastore of a user selected device; storing an external data source value on a datastore of the second computing device; and storing an external data source value on a datastore of a user selected device.

The unified document surface application circuit may be further structured to interpret a user-specific offline rule, and to apply the user-specific offline rule to the document.

An embodiment of the present disclosure may further comprise a user notification rules circuit structured to interpret a user notification profile value comprising a notification trigger value and a notification response value; a user notification circuit structured to determine whether an event trigger has occurred in response to the notification trigger value and the data value; and a user interaction circuit structured to provide a notification to a user in response to the event trigger, the notification response value, and a notification location value.

The notification location value may comprise a device identifier that identifies a device other than the second computing device.

An embodiment of the present disclosure includes a system, comprising: a first computing device at least intermittently communicatively coupled to a second computing device; the first computing device comprising a document server, the document server further comprising a client resource circuit structured to determine a client resource value and a compression scheme, and the document server structured to communicate a data value to the second computing device in response to the client resource value and the compression scheme, the data value comprising at least a portion of a document; the second computing device comprising: a user display circuit structured to determine a document view in response to the data value, and to provide the document view to a user; a unified document surface application circuit structured to interpret a first user input comprising an edit to the data value; and a document synchronization circuit structured to communicate the first user input to the first computing device.

The client resource circuit may be further structured to determine the compression scheme in response to the client resource value.

The compression scheme may comprise at least one compression definition value corresponding to each of a plurality of data type values.

An embodiment of the present disclosure includes a system, comprising: a first computing device at least intermittently communicatively coupled to a second computing device; the first computing device comprising a document server, the document server further comprising a client resource circuit structured to determine a client resource value and a user location value, and the document server structured to communicate a data value to the second computing device in response to the client resource value and the user location value, the data value comprising at least a portion of a document; the second computing device comprising: a user display circuit structured to determine a document view in response to the data value, and to provide the document view to a user; a unified document surface application circuit structured to interpret a first user input comprising an edit to the data value; and a document synchronization circuit structured to communicate the first user input to the first computing device.

The user display circuit may be further structured to determine the document view in response to the user location value.

The document synchronization circuit may be further structured to communicate the first user input to the first computing device in response to the user location value.

The unified document surface application circuit may be further structured to interpret a user-specific offline rule, and to selectively apply the user-specific offline rule to the document in response to the user location value.

An embodiment of the present disclosure includes a system, comprising: a first computing device at least intermittently communicatively coupled to a second computing device; the first computing device comprising a document server, the document server further comprising a client resource circuit structured to determine a client resource value, and the document server structured to communicate a data value to the second computing device in response to the client resource value, the data value comprising at least a portion of a document; the second computing device comprising: a user display circuit structured to determine a document view in response to the data value and the client resource value, and to provide the document view to a user; a unified document surface application circuit structured to interpret a first user input comprising an edit to the data value; and a document synchronization circuit structured to communicate the first user input to the first computing device.

The document synchronization circuit may be structured to communicate the first user input to the first computing device further in response to the client resource value.

An embodiment of the present disclosure includes a system, comprising: a first computing device at least intermittently communicatively coupled to a second computing device; the first computing device comprising a document server, the document server further comprising a client resource circuit structured to determine a client resource value, and the document server structured to communicate a data value to the second computing device in response to the client resource value, the data value comprising at least a portion of a document and further comprising at least one data type selected from the data types consisting of: a graph, a chart, an image, an audio file, a video file, a media file; audio content; video content; and media content; the second computing device comprising: a user display circuit structured to determine a document view in response to the data value and the data type of the data value, and to provide the document view to a user; a unified document surface application circuit structured to interpret a first user input comprising an edit to the data value; and a document synchronization circuit structured to communicate the first user input to the first computing device.

An embodiment of the present disclosure includes a system, comprising: a document server structured to communicate at least a portion of a document to a client computing device; the client computing device comprising: a user interaction circuit structured to interpret a user external data reference value, a display location selection value, and a table grouping input value associated with at least one table, the table comprising a plurality of categories and a plurality of associated data sets corresponding to the plurality of categories; an external data access circuit structured to access an external data source in response to the user external data reference value; a table aggregation circuit structured to determine an aggregation value in response to the table grouping input value, wherein the aggregation value corresponds to at least one of the plurality of categories; a data enrichment circuit structured to perform a display enrichment operation in response to the external data source, the display location selection value, and the aggregation value; and a user display circuit structured to provide an enriched display value in response to the display location selection value and the display enrichment operation.

An embodiment of the present disclosure includes a system, comprising: a document server structured to communicate at least a portion of a document to a client computing device; the client computing device comprising: a user interaction circuit structured to interpret a user external data reference value, a display location selection value, and a user table input value, the user table input value comprising a plurality of table data values; an external data access circuit structured to access an external data source in response to the user external data reference value; a table management circuit structured to determine a table organization value in response to the table data values, wherein the table organization value comprises at least one value selected from the values consisting of: a column naming scheme; a sorting scheme; a filtering scheme; an aggregation scheme; and a formatting scheme; a data enrichment circuit structured to perform a display enrichment operation in response to the external data source, the display location selection value, and the table organization value; and a user display circuit structured to provide an enriched display value in response to the display location selection value and the display enrichment operation.

An embodiment of the present disclosure includes a system, comprising: a document server structured to communicate a data value to a client computing device, the data value comprising at least a portion of a document and further comprising a first table object and a second embedded table object; wherein each of the first table object and a second embedded table object comprise a corresponding table specific name, and wherein each of the first table object and the second embedded table object comprise a corresponding parent object name, wherein a first parent object name corresponding to the first table object comprises a distinct name from a second parent object name corresponding to the second embedded table object; and wherein the data value further comprises a table referencing value directed to the second embedded table object, wherein the table referencing value comprises a portion of a formula comprising a corresponding parent object name that is distinct from the first parent object name, and wherein a parent hierarchy for the table referencing value comprises the first parent object name; the client computing device comprising: a user interaction circuit structured to interpret a user external data reference value and a display location selection value; an external data access circuit structured to access an external data source in response to the user external data reference value; a data enrichment circuit structured to perform a display enrichment operation in response to the external data source, the display location selection value, and the table referencing value; and a user display circuit structured to provide an enriched display value in response to the display location selection value and the display enrichment operation.

An embodiment of the present disclosure includes a system, comprising: a document server structured to communicate at least a portion of a document to a client computing device; the client computing device comprising: a user interaction circuit structured to interpret a user external data reference value and a display location selection value; an external data access circuit structured to access an external data source in response to the user external data reference value; a data enrichment circuit structured to perform a display enrichment operation in response to the external data source and the display location selection value; a user display circuit structured to provide an enriched display value in response to the display location selection value and the display enrichment operation; and a formula engine, wherein the formula engine determines a calculation definition in response to at the enriched display value, and wherein the formula engine is structured to generate an executable object in response to the calculation definition, and wherein the executable object comprises instructions which, upon execution, cause at least one of the document server and the first client computing device to determine the enriched display value.

The formula engine may be further structured to interpret a user focus location, and to direct execution of the executable object in response to the user focus location.

The formula engine may be further structured to predict a second user focus location, and to direct execution of the executable object to determine the enriched display value in response to a proximity between the predicted second user focus location and the display location selection value.

An embodiment of the present disclosure includes a system, comprising: a document server structured to communicate at least a portion of a document to a client computing device; the client computing device comprising: a user interaction circuit structured to interpret a user external data reference value and a display location selection value; an external data access circuit structured to access an external data source in response to the user external data reference value; a uniform document surface application circuit structured to determine a metadata value, wherein the metadata value comprises at least one value selected from the values consisting of: a timestamp value, a tag value, and a user identifier value; a data enrichment circuit structured to perform a display enrichment operation in response to the external data source, the display location selection value, and the metadata value; and a user display circuit structured to provide an enriched display value in response to the display location selection value and the display enrichment operation.

An embodiment of the present disclosure includes a system, comprising: a document server structured to communicate at least a portion of a document to a client computing device, wherein the document server is further structured to interpret a user connection description; the client computing device comprising: a user interaction circuit structured to interpret a user external data reference value and a display location selection value; an external data access circuit structured to access an external data source in response to the user external data reference value; a data enrichment circuit structured to perform a display enrichment operation in response to the external data source and the display location selection value, wherein the data enrichment circuit is further structured to delay performing the display enrichment operation in response to the user connection description indicating that a connection between the document server and the client computing device is not active; and a user display circuit structured to provide an enriched display value in response to the display location selection value and the display enrichment operation.

An embodiment of the present disclosure includes a system, comprising: a document server structured to communicate at least a portion of a document to a client computing device; the client computing device comprising; a user interaction circuit structured to interpret a user external data reference value and a display location selection value; an external data access circuit structured to access an external data source in response to the user external data reference value; a visualization tool (VT) circuit structured to determine a visualization element (VE) in response to the user external data reference value and a display location selection value, and further in response to at least one of: a user visualization selection or a user context value;

a data enrichment circuit structured to perform a display enrichment operation in response to the VE; and a user display circuit structured to provide an enriched display value in response to the display location selection value and the display enrichment operation.

The VT circuit may be further structured to determine a plurality of VEs, each VE corresponding to one of a plurality of rows in a column of a table, and wherein the data enrichment circuit is further structured to performing a display enrichment operation by determining display parameters within the plurality of rows corresponding to the plurality of VEs.

The user display circuit may be structured provide the enriched display value by depicting the corresponding VEs in the corresponding rows of the table, and further in response to a user position in the document.

The plurality of VEs may comprise at least one data object selected from the objects consisting of: a graph, a chart, an image, a video file, a media file, video content, and media content.

An embodiment of the present disclosure includes a system, comprising: a document server structured to communicate at least a portion of a document to a client computing device; the client computing device comprising: a user interaction circuit structured to interpret a user external data reference value and a display location selection value; an external data access circuit structured to access an external data source in response to the user external data reference value; a data enrichment circuit structured to perform a display enrichment operation in response to the external data source and the display location selection value;

and a user display circuit structured to provide an enriched display value in response to the display location selection value and the display enrichment operation; and wherein the document server is further structured to determine a calculation time of the enriched display value on the client computing device, and in response to the calculation time exceeding a threshold value, further perform one of pre-calculating the enriched display value and commanding a workflow server to pre-calculate the enriched display value.

The enriched display value may comprise a plurality of visualization elements (VEs), each VE corresponding to one of a plurality of rows in a column of a table.

An embodiment of the present disclosure includes a system, comprising: a document server structured to communicate at least a portion of a document to a client computing device; the client computing device comprising: a user interaction circuit structured to interpret a user external data reference value and a display location selection value; an external data access circuit structured to access an external data source in response to the user external data reference value; a data enrichment circuit structured to perform a display enrichment operation in response to the external data source and the display location selection value; and a user display circuit structured to provide an enriched display value in response to the display location selection value and the display enrichment operation; and wherein the document server is further structured to determine an external data access time of the external data source in response to the user external data reference value, and to perform a pre-fetch of external data from the external data source in response to the external data access time the exceeding a threshold value, and to perform a pre-fetch of external data from the external data source in response to the exceeding a threshold value.

An embodiment of the present disclosure includes a system, comprising: a document server structured to communicate at least a portion of a document to a client computing device; the client computing device comprising: a user interaction circuit structured to interpret a user external data reference value and a display location selection value; an external data access circuit structured to access an external data source in response to the user external data reference value, wherein the external data source comprises at least one data object selected from the objects consisting of: a graph, a chart, an image, a video file, an audio file, a media file, video content, audio content, and media content; a data enrichment circuit structured to perform a display enrichment operation in response to the external data source and the display location selection value; and a user display circuit structured to provide an enriched display value in response to the display location selection value and the display enrichment operation.

An embodiment of the present disclosure includes a system, comprising: a unified document application circuit structured to interpret a user table input value, the user table input value comprising a plurality of table data values for a table; a table management circuit structured to determine a table organization value in response to the table data values, wherein the table organization value comprises at least one value selected from the values consisting of: a column naming scheme; a sorting scheme; a filtering scheme; and a formatting scheme; a user interaction circuit structured to interpret a table grouping input value associated with the table; a table aggregation circuit structured to determine an aggregation value in response to the table grouping input value, wherein the aggregation value corresponds to at least one of a plurality of categories of the table data values; and wherein the user interaction circuit is further structured to provide an aggregated table view in response to the aggregation value.

An embodiment of the present disclosure includes a system, comprising: a user interaction circuit structured to interpret a user reference entry; a reference management circuit structured to determine a reference return value in response to the user reference entry; a user interaction circuit further structured to interpret a table grouping input value associated with at least one table, the table comprising a plurality of categories and a plurality of associated data sets corresponding to the plurality of categories; a table aggregation circuit structured to determine an aggregation value in response to the table grouping input value and the reference return value, wherein the aggregation value corresponds to at least one of the plurality of categories; and wherein the user interaction circuit is further structured to provide an aggregated table view in response to the aggregation value.

The table aggregation circuit performs an operation may be selected from the operations consisting of: filtering the table in response to the reference return value; sorting the table in response to the reference return value; determining the aggregation value in response one of the plurality of categories determined in response to the reference return value.

At least one of the plurality of categories of the table may comprise an external data source, and wherein the table aggregation circuit is further structured to perform one of updating the aggregation value and applying the aggregation value in response to a change in the external data source.

An embodiment of the present disclosure includes a system, comprising: a first computing device communicatively coupled to a second computing device; the first computing device comprising a document server structured to communicate a data value to the second computing device, the data value comprising at least a portion of a document and further comprising a first table object and a second embedded table object; wherein each of the first table object and a second embedded table object comprise a corresponding table specific name, and wherein each of the first table object and the second embedded table object comprise a corresponding parent object name, wherein a first parent object name corresponding to the first table object comprises a distinct name from a second parent object name corresponding to the second embedded table object; and wherein the second computing device comprises: a user interaction circuit structured to interpret a table grouping input value comprising at least a portion of a formula comprising a table reference value for the second embedded table object including the second parent object name that is distinct from the first parent object name, and wherein a parent hierarchy for the second parent object name comprises the first parent object name; a table aggregation circuit structured to determine an aggregation value in response to the table grouping input value, wherein the aggregation value corresponds to at least one of a plurality of categories of the at least one of the first table object and the second table object; and wherein the user interaction circuit is further structured to provide an aggregated table view in response to the aggregation value.

An embodiment of the present disclosure includes a system, comprising: a unified document application circuit structured to interpret a user entry value comprising at least one character; a user display circuit structured to determine at least one candidate entry in response to the user entry value; a user interaction circuit structured to interpret the at least one candidate entry as a table grouping input value associated with at least one table, the table comprising a plurality of categories and a plurality of associated data sets corresponding to the plurality of categories; wherein the unified document surface application circuit is further structured to provide an autocompleted entry for the table grouping input value in response to a user selection of the at least one candidate entry; a table aggregation circuit structured to determine an aggregation value in response to the table grouping input value, wherein the aggregation value corresponds to at least one of the plurality of categories; and wherein the user interaction circuit is further structured to provide an aggregated table view in response to the aggregation value.

The table grouping input value may comprise a parameter in a formula.

An embodiment of the present disclosure includes a system, comprising: a user interaction circuit structured to interpret a table grouping input value associated with at least one table, the table comprising a plurality of categories and a plurality of associated data sets corresponding to the plurality of categories; a table aggregation circuit structured to determine an aggregation value in response to the table grouping input value and a metadata value, wherein the metadata value comprises at least one value selected from the values consisting of: a timestamp value, a tag value, and a user identifier value, and wherein the aggregation value corresponds to at least one of the plurality of categories; and wherein the user interaction circuit is further structured to provide an aggregated table view in response to the aggregation value.

An embodiment of the present disclosure includes a system, comprising: a unified document application circuit structured to interpret a user entry value comprising at least one character and a metadata value, wherein the metadata value comprises at least one value selected from the values consisting of: a timestamp value, a tag value, and a user identifier value; a user display circuit structured to determine at least one candidate entry in response to the user entry value; a user interaction circuit structured to interpret the at least one candidate entry as a table grouping input value associated with at least one table, the table comprising a plurality of categories and a plurality of associated data sets corresponding to the plurality of categories; wherein the unified document surface application circuit is further structured to provide an autocompleted entry for the table grouping input value in response to a user selection of the at least one candidate entry; a table aggregation circuit structured to determine an aggregation value in response to the table grouping input value, wherein the aggregation value corresponds to at least one of the plurality of categories; and wherein the user interaction circuit is further structured to provide an aggregated table view in response to the aggregation value.

An embodiment of the present disclosure includes a system, comprising: a user interaction circuit structured to interpret a table grouping input value associated with at least one table, the table comprising a plurality of categories and a plurality of associated data sets corresponding to the plurality of categories; a unified document surface application circuit structured to determine a client resource value; a table aggregation circuit structured to determine an aggregation value in response to the table grouping input value and the client resource value, wherein the aggregation value corresponds to at least one of the plurality of categories; and wherein the user interaction circuit is further structured to provide an aggregated table view in response to the aggregation value.

An embodiment of the present disclosure includes a system, comprising: a user interaction circuit structured to interpret a table grouping input value associated with at least one table, the table comprising a plurality of categories and a plurality of associated data sets corresponding to the plurality of categories; a table aggregation circuit structured to determine an aggregation value in response to the table grouping input value, wherein the aggregation value corresponds to at least one of the plurality of categories; and wherein the user interaction circuit is further structured to provide an aggregated table view in response to the aggregation value, and wherein the aggregated table view further includes a plurality of rows of at least one column of an aggregated table including at least one data object positioned therein, the at least one data object selected from the objects consisting of: a graph, a chart, an image, a video file, an audio file, a media file, video content, audio content, and media content.

An embodiment of the present disclosure includes a system, comprising: a computing device, comprising: a unified document application circuit structured to interpret a user reference entry and a user table input value, the user table input value comprising a plurality of table data values for a table; a table management circuit structured to determine a table organization value in response to the table data values and the reference return value, wherein the table organization value comprises at least one value selected from the values consisting of: a column naming scheme; a sorting scheme; a filtering scheme; an aggregation scheme; and a formatting scheme; and a user display circuit structured to provide a table view in response to the table organization value.

The reference return value may comprise a parameter in a formula.

The reference return value may comprise an object in a document, and wherein the table management circuit is further structured to determine the table organization value by inheriting a property from the object in a document to the table.

An embodiment of the present disclosure includes a system, comprising: a first computing device communicatively coupled to a second computing device; the first computing device comprising a document server structured to communicate a data value to the second computing device, the data value comprising at least a portion of a document and further comprising a first table object and a second embedded table object; wherein each of the first table object and a second embedded table object comprise a corresponding table specific name, and wherein each of the first table object and the second embedded table object comprise a corresponding parent object name, wherein a first parent object name corresponding to the first table object comprises a distinct name from a second parent object name corresponding to the second embedded table object; and the second computing device comprising: a unified document application circuit structured to interpret a user table input value and a table referencing value, the user table input value comprising a plurality of table data values, and the table referencing value comprising the second parent object name, and wherein a parent hierarchy for the table referencing value comprises the first parent object name; a table management circuit structured to determine a table organization value in response to the table data values, wherein the table organization value comprises at least one value selected from the values consisting of: a column naming scheme; a sorting scheme; a filtering scheme; an aggregation scheme; and a formatting scheme; and a user display circuit structured to provide a table view in response to the table organization value.

The user table input values may comprise linked values of the first table object, wherein the table management circuit is further structured to determine the table organization value in response to at least one of: a drag operation or a copy operation of the first table object, thereby creating the second embedded table object having the linked values of the first table object.

The second embedded table object may be positioned on a same parent object as the first table object at a first time, wherein the second embedded table object is moved to a distinct parent object from the first table object at a second time, and wherein a referential formula associated with the second embedded table object continues to reference one of: the first table object or the parent object of the first table, after the movement to the distinct parent object.

An embodiment of the present disclosure includes a system, comprising: a computing device, comprising: a unified document application circuit structured to interpret a user entry value comprising at least one character; a user display circuit structured to determine at least one candidate entry in response to the user entry value; wherein the unified document surface application circuit is further structured to interpret a user table input value, the user table input value comprising one of: a user selection of the at least one candidate entry or a plurality of table data values entered by a user; a table management circuit structured to determine a table organization value in response to the user table input value, wherein the table organization value comprises at least one value selected from the values consisting of: a column naming scheme; a sorting scheme; a filtering scheme; an aggregation scheme; and a formatting scheme; and a user display circuit structured to provide a table view in response to the table organization value.

The unified document surface application circuit may be further structured to provide the user table input value as an autocompleted entry in response to the user selection of the at least one candidate entry.

An embodiment of the present disclosure includes a system, comprising: a computing device, comprising: a unified document application circuit structured to interpret a user table input value, the user table input value comprising a plurality of table data values; a table management circuit structured to determine a table organization value in response to the table data values and further in response to a metadata value, wherein the metadata value comprises at least one value selected from the values consisting of: a timestamp value, a tag value, and a user identifier value; and wherein the table organization value comprises at least one value selected from the values consisting of: a column naming scheme, a sorting scheme, a filtering scheme, an aggregation scheme, and a formatting scheme; and a user display circuit structured to provide a table view in response to the table organization value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a user interaction circuit structured to interpret a user reference entry; a reference management circuit structured to determine a reference return value in response to the user reference entry; a user display circuit structured to determine a document view in response to the reference return value, and to provide the document view to a user; and wherein the user reference entry comprises an external data source, and wherein the document server is further structured to determine an external data access time of the external data source in response to the reference return value, and to perform a pre-fetch of external data from the external data source in response to the external data access time exceeding a threshold value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a user interaction circuit structured to interpret a user reference entry; a reference management circuit structured to determine a reference return value in response to the user reference entry; a user display circuit structured to determine a document view in response to the reference return value, and to provide the document view to a user; and wherein the document server is further structured to determine a calculation time of the document view on the client computing device, and in response to the calculation time exceeding a threshold value, further perform one of pre-calculating the document view and commanding a workflow server to pre-calculate the document view.

An embodiment of the present disclosure includes a system, comprising: a first computing device communicatively coupled to a second computing device; the first computing device comprising a document server structured to communicate a data value to the second computing device, the data value comprising at least a portion of a document and further comprising a first table object and a second embedded table object; wherein each of the first table object and a second embedded table object comprise a corresponding table specific name, and wherein each of the first table object and the second embedded table object comprise a corresponding parent object name, wherein a first parent object name corresponding to the first table object comprises a distinct name from a second parent object name corresponding to the second embedded table object; and wherein the data value further comprises a table referencing value directed to the second embedded table object, wherein the table referencing value comprises a portion of a formula comprising a corresponding parent object name that is distinct from the first parent object name, and wherein a parent hierarchy for the table referencing value comprises the first parent object name; wherein the document comprises: an operation log, wherein the operation log comprises at least one first sequential operation defining operations to create data values of the document; a formula engine, wherein the formula engine determines a calculation definition in response to at least one formula of the document, and wherein the formula engine is structured to generate an executable object in response to the calculation definition, and wherein the executable object comprises instructions which, upon execution, cause at least one of the document server and the second computing device to perform operations in response to the calculation definition; and wherein the document is positioned on at least one of the document server and the second computing device, and wherein the formula engine is further structured to interpret a user focus location, and to direct execution of the executable object in response to the user focus location.

An embodiment of the present disclosure includes a system, comprising: a first computing device communicatively coupled to a second computing device; the first computing device comprising a document server structured to communicate a data value to the second computing device, the data value comprising at least a portion of a document and further comprising a first table object and a second embedded table object; wherein each of the first table object and a second embedded table object comprise a corresponding table specific name, and wherein each of the first table object and the second embedded table object comprise a corresponding parent object name, wherein a first parent object name corresponding to the first table object comprises a distinct name from a second parent object name corresponding to the second embedded table object; and wherein the data value further comprises a table referencing value directed to the second embedded table object, wherein the table referencing value comprises a portion of a formula comprising a corresponding parent object name that is distinct from the first parent object name, and wherein a parent hierarchy for the table referencing value comprises the first parent object name, and wherein the data value further comprises at least one data object selected from the data objects consisting of a graph, a chart, an image, a video file, an audio file, a media file, video content, audio content, and media content.

An embodiment of the present disclosure includes a system, comprising: a document server communicatively coupled to a client computing device; a document comprising an operation log, wherein the operation log comprises at least one first sequential operation defining operations to create data values of the document; wherein the client computing device comprises: a visualization tool (VT) circuit structured to determine a visualization element (VE) in response to at least one of the data values, and further in response to at least one of: a user visualization selection or a user context value; a data enrichment circuit structured to perform a display enrichment operation in response to the VE; and a user display circuit structured to provide an enriched display value in response to the display location selection value and the display enrichment operation; a formula engine, wherein the formula engine determines a calculation definition in response to at least one formula of the document, and wherein the formula engine is structured to generate an executable object in response to the calculation definition, and wherein the executable object comprises instructions which, upon execution, cause at least one of the document server and the client computing device to perform operations to calculate the enriched display value in response to the calculation definition; and wherein the document is positioned on at least one of the document server and the client computing device, and wherein the formula engine is further structured to interpret a user focus location, and to direct execution of the executable object in response to the user focus location.

An embodiment of the present disclosure includes a system, comprising: a document server communicatively coupled to a client computing device; a document comprising an operation log, wherein the operation log comprises at least one first sequential operation defining operations to create data values of the document; a formula engine, wherein the formula engine determines a calculation definition in response to at least one formula of the document, and wherein the formula engine is structured to generate an executable object in response to the calculation definition, and wherein the executable object comprises instructions which, upon execution, cause at least one of the document server and the client computing device to perform operations in response to the calculation definition; and wherein the document is positioned on at least one of the document server and the client computing device, and wherein the formula engine is further structured to interpret a user focus location in response to a user location value, and to direct execution of the executable object in response to the user focus location.

An embodiment of the present disclosure includes a system, comprising: a document server communicatively coupled to a client computing device; a document comprising an operation log, wherein the operation log comprises at least one first sequential operation defining operations to create data values of the document; a formula engine, wherein the formula engine determines a calculation definition in response to at least one formula of the document, and wherein the formula engine is structured to generate an executable object in response to the calculation definition, and wherein the executable object comprises instructions which, upon execution, cause at least one of the document server and the client computing device to perform operations in response to the calculation definition; and wherein the document is positioned on at least one of the document server and the client computing device, and wherein the formula engine is further structured to interpret a user focus location, and to direct execution of the executable object in response to the user focus location and further in response to a user location value.

An embodiment of the present disclosure includes a system, comprising: a document server communicatively coupled to a client computing device, the document server structured to interpret a client resource value corresponding to the client computing device; a document comprising an operation log, wherein the operation log comprises at least one first sequential operation defining operations to create data values of the document; a formula engine, wherein the formula engine determines a calculation definition in response to at least one formula of the document, and wherein the formula engine is structured to generate an executable object in response to the calculation definition, and wherein the executable object comprises instructions which, upon execution, cause at least one of the document server and the client computing device to perform operations in response to the calculation definition; wherein the document is positioned on at least one of the document server and the client computing device, and wherein the formula engine is further structured to direct execution of the executable object in response to the client resource value.

An embodiment of the present disclosure includes a system, comprising: a communication layer structured to provide access between a computing device and an external network; the computing device, comprising: an access interface circuit structured to expose a plurality of application programming interface (API) objects to the communication layer; wherein the plurality of API objects comprises a first API object configured to: interpret a table input value, the table input value comprising a plurality of table data values; determine a table organization value in response to the table data values, wherein the table organization value comprises at least one value selected from the values consisting of: a column naming scheme; a sorting scheme; a filtering scheme; an aggregation scheme; and a formatting scheme; determine a table view in response to the table organization value and a metadata value, wherein the metadata value comprises at least one value selected from the values consisting of: a timestamp value, a tag value, and a user identifier value; and wherein the access interface circuit is further structured to receive the table input value over the communication layer, and to provide the table view to the communication layer.

An embodiment of the present disclosure includes a system, comprising: a first computing device communicatively coupled to a second computing device; the first computing device comprising a document server structured to communicate a data value to the second computing device, the data value comprising at least a portion of a document, and wherein data value further comprises at least one data source selected from the data sources consisting of: a database; a website; a network location; a second document distinct from the document; data positioned on a cloud server; a portion of any of the foregoing; a local copy of any of the foregoing; and combinations of any of the foregoing; the second computing device comprising: a user notification rules circuit structured to interpret a user notification profile value comprising a notification trigger value and a notification response value, wherein the notification response value comprises an action link definition and a notification location value; a data management circuit structured to interpret the data value; a user notification circuit structured to determine whether an event trigger has occurred in response to the notification trigger value and the data value; and a user interaction circuit structured to provide a notification to a user in response to the event trigger and the notification response value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a user notification rules circuit structured to interpret a user notification profile value comprising a notification trigger value and a notification response value, wherein the notification response value comprises an action link definition and a notification location value; a unified document surface application circuit structured to determine a user notification availability in response to at least parameter selected from the parameters consisting of: the notification trigger value; the notification response value; and a user contextual information; wherein the unified document surface application circuit is further structured to adjust one of the notification trigger value and the notification response value in response to the user notification availability; a data management circuit structured to interpret the data value; a user notification circuit structured to determine whether an event trigger has occurred in response to the data value and further in response to one of the notification trigger value and the adjusted notification trigger value; and a user interaction circuit structured to provide a notification to a user in response to the event trigger and one of the notification response value and the adjusted notification response value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a uniform document surface application circuit structured to interpret a user location value; a user notification rules circuit structured to interpret a user notification profile value comprising a notification trigger value and a notification response value, wherein the notification response value comprises an action link definition and a plurality of notification location values, each of the notification location values corresponding to one of a plurality of user location values; a data management circuit structured to interpret the data value; a user notification circuit structured to determine whether an event trigger has occurred in response to the notification trigger value and the data value; and a user interaction circuit structured to provide a notification to a user in response to the event trigger and the notification response value.

An embodiment of the present disclosure includes a system, comprising: a first computing device communicatively coupled to a second computing device; the first computing device comprising a document server structured to communicate a data value to the second computing device, the data value comprising at least a portion of a document; the second computing device comprising: a user notification rules circuit structured to interpret a user notification profile value comprising a notification trigger value and a notification response value, wherein the notification response value comprises an action link definition and a notification location value; a unified document surface application circuit structured to determine a user current device value, and to adjust the notification response value in response to the user current device value; a data management circuit structured to interpret the data value; a user notification circuit structured to determine whether an event trigger has occurred in response to the notification trigger value and the data value; and a user interaction circuit structured to provide a notification to a user in response to the event trigger and the adjusted notification response value.

An embodiment of the present disclosure includes a system, comprising: a first computing device at least intermittently communicatively coupled to a second computing device; the first computing device comprising a document server, the document server further comprising a client resource circuit structured to determine a client resource value and a user location value, and the document server structured to communicate a data value to the second computing device in response to the client resource value and the user location value, the data value comprising at least a portion of a document; the second computing device comprising: a unified document application circuit structured to interpret a user entry value comprising at least one character; a user display circuit structured to determine at least one candidate entry in response to the user entry value; and wherein the unified document surface application circuit is further structured to provide an autocompleted entry in response to a user selection of the at least one candidate entry.

An embodiment of the present disclosure includes a system, comprising: a first computing device at least intermittently communicatively coupled to a second computing device; the first computing device comprising a document server, the document server further comprising a client resource circuit structured to determine a client resource value, and the document server structured to communicate a data value to the second computing device in response to the client resource value, the data value comprising at least a portion of a document; the second computing device comprising: a unified document application circuit structured to interpret a user location value and a user entry value comprising at least one character; a user display circuit structured to determine at least one candidate entry in response to the user entry value and the user location value; and wherein the unified document surface application circuit is further structured to provide an autocompleted entry in response to a user selection of the at least one candidate entry.

BRIEF DESCRIPTION OF THE FIGURES

FIG. 9 is a schematic illustration of a data depiction.

FIG. 27 is a schematic data illustration.

FIG. 28 is a schematic data illustration.

FIG. 29 is a schematic data illustration.

FIG. 30 is a schematic data illustration.

FIG. 45 is a schematic flow diagram of a procedure for providing an external data source option.

FIG. 61 is a schematic flow diagram of a procedure for performing an enrichment operation.

FIG. 71 is a schematic data illustration.

FIG. 72 is a schematic data illustration.

FIG. 73 is a schematic data illustration.

FIG. 74 is a schematic data illustration.

FIG. 81 is a schematic data illustration.

FIG. 90 is a schematic flow diagram of a procedure for working with data.

FIG. 100 is an example depiction of reference models for table values.

FIG. 104 is a schematic data illustration.

FIG. 105 is a schematic data illustration.

FIG. 115 is a schematic data illustration.

FIG. 116 is a schematic data illustration.

FIG. 117 is a schematic data illustration.

FIG. 120 is a schematic data illustration.

FIG. 121 is a schematic data illustration.

FIG. 122 is a schematic data illustration.

Figures 124, 125:
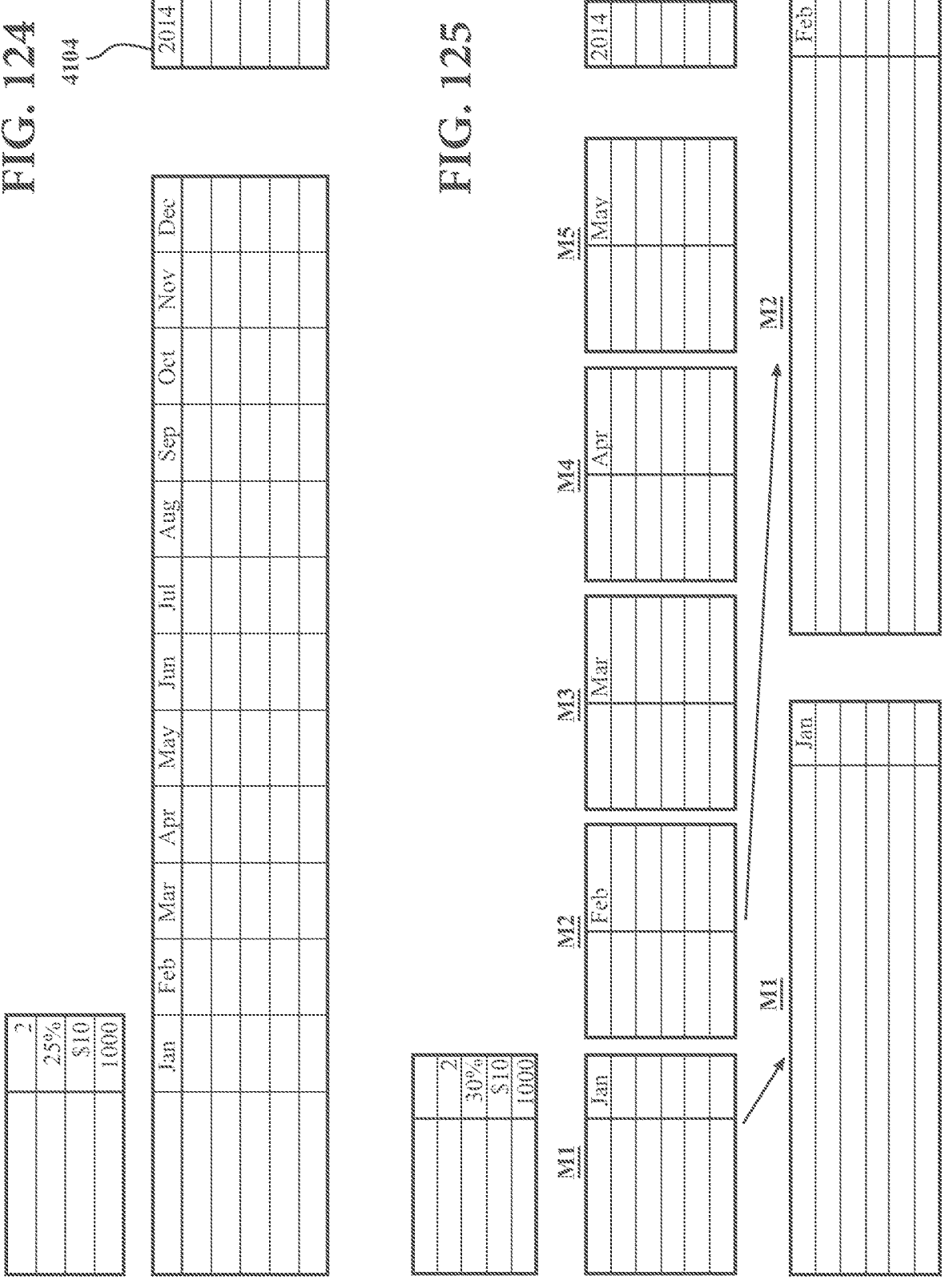
Figure 126:
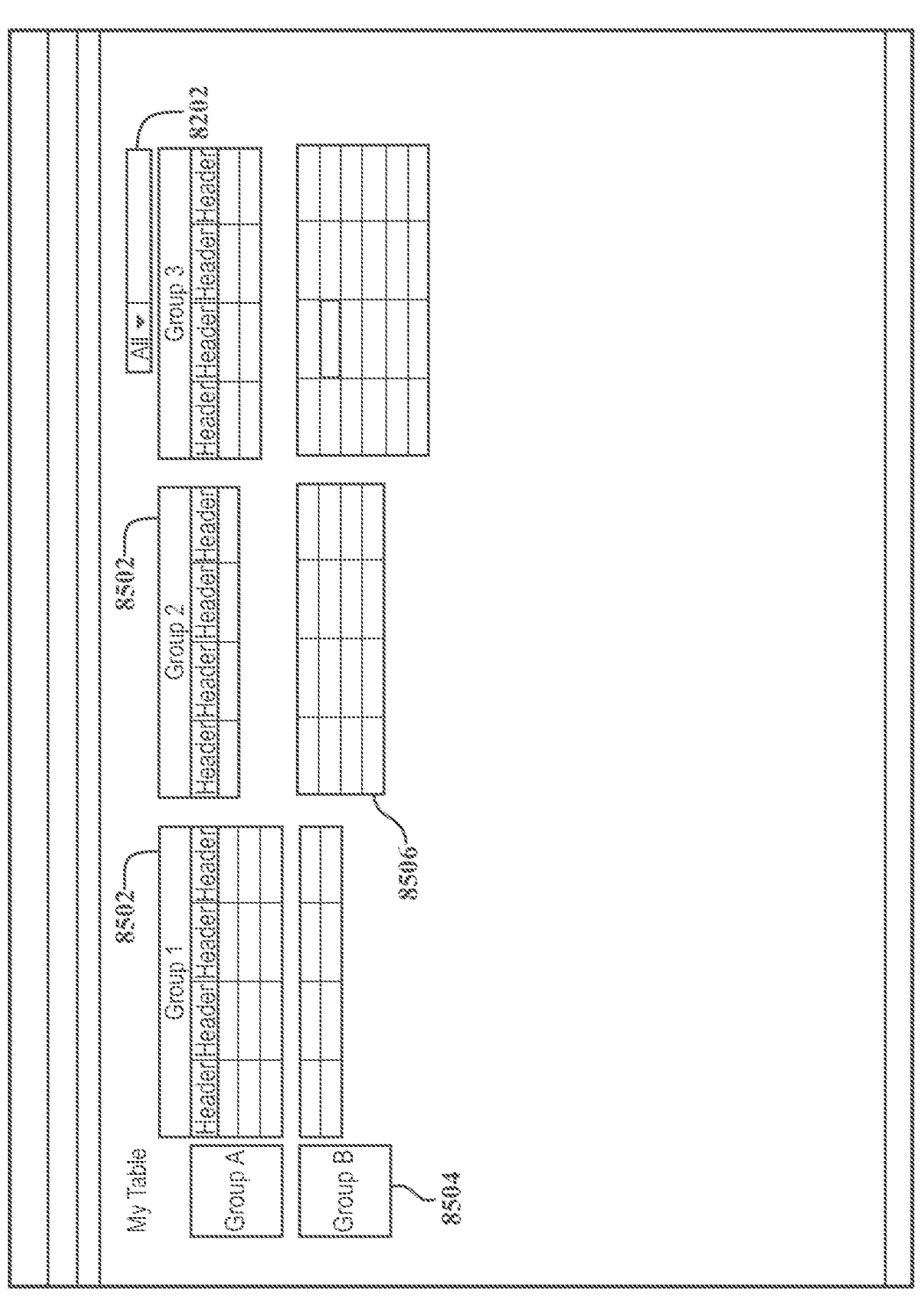
Figure 127:
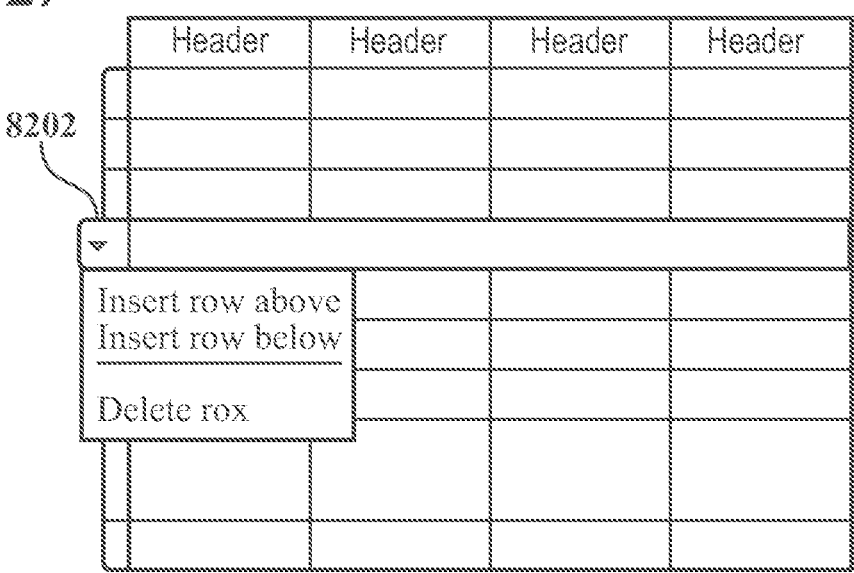
Figure 128:
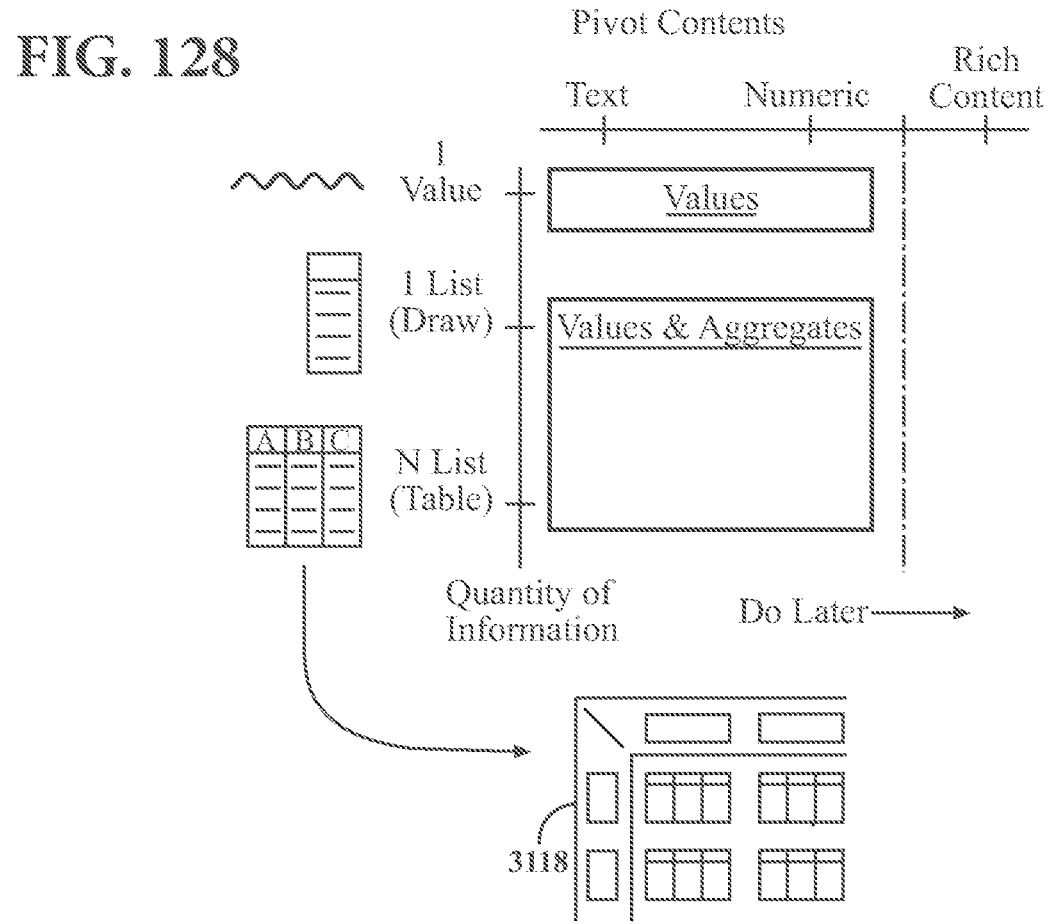
Figure 131:
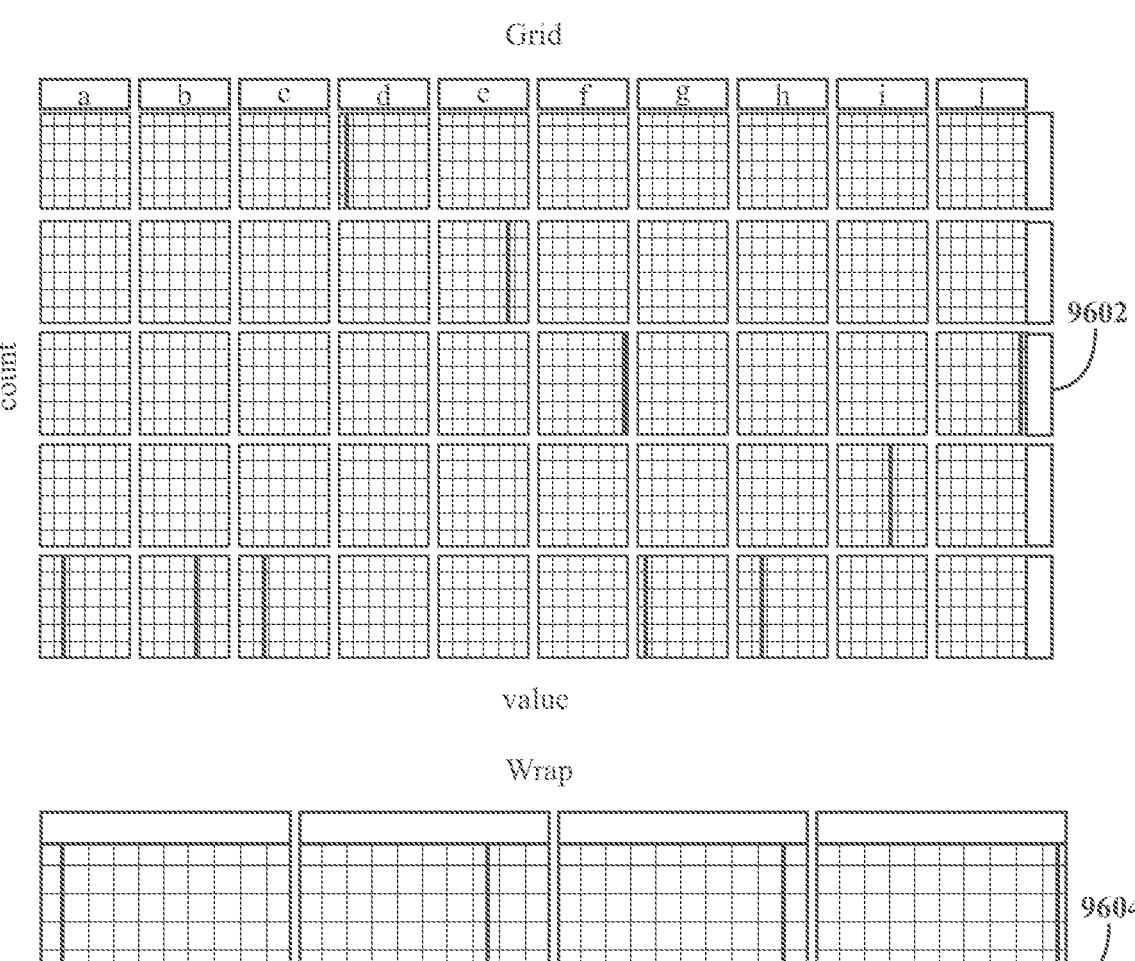
Figures 132, 140:
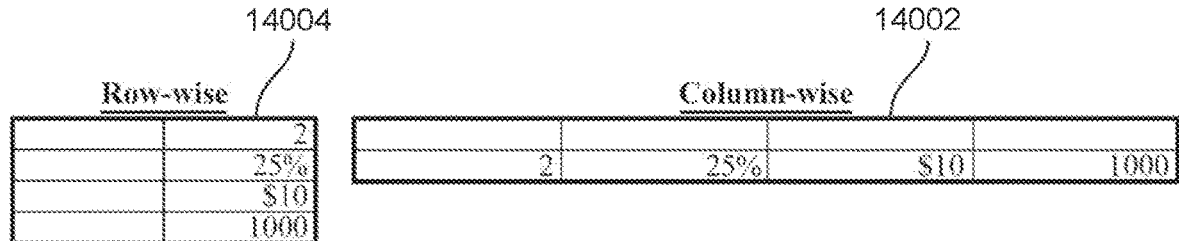
Figures 133, 134:
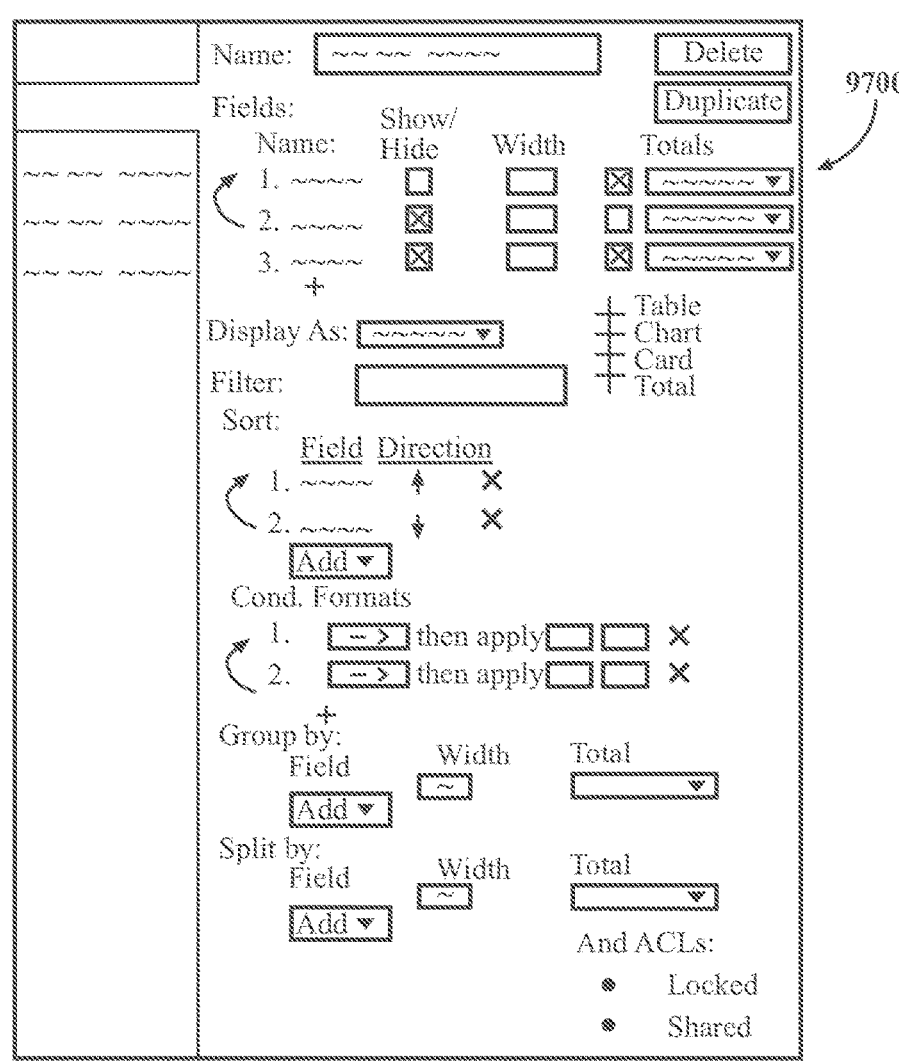
Figure 138:
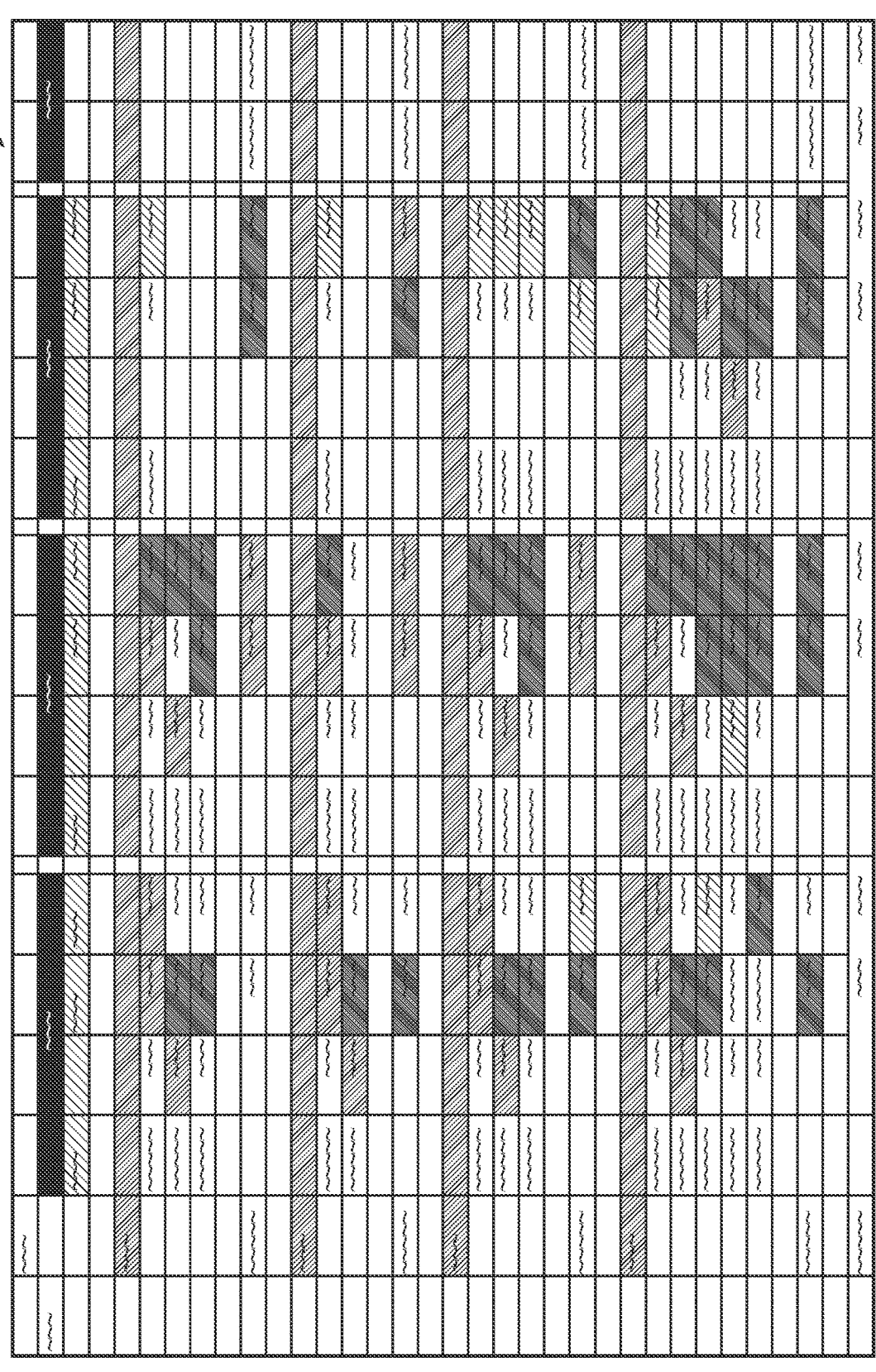
Figure 139:
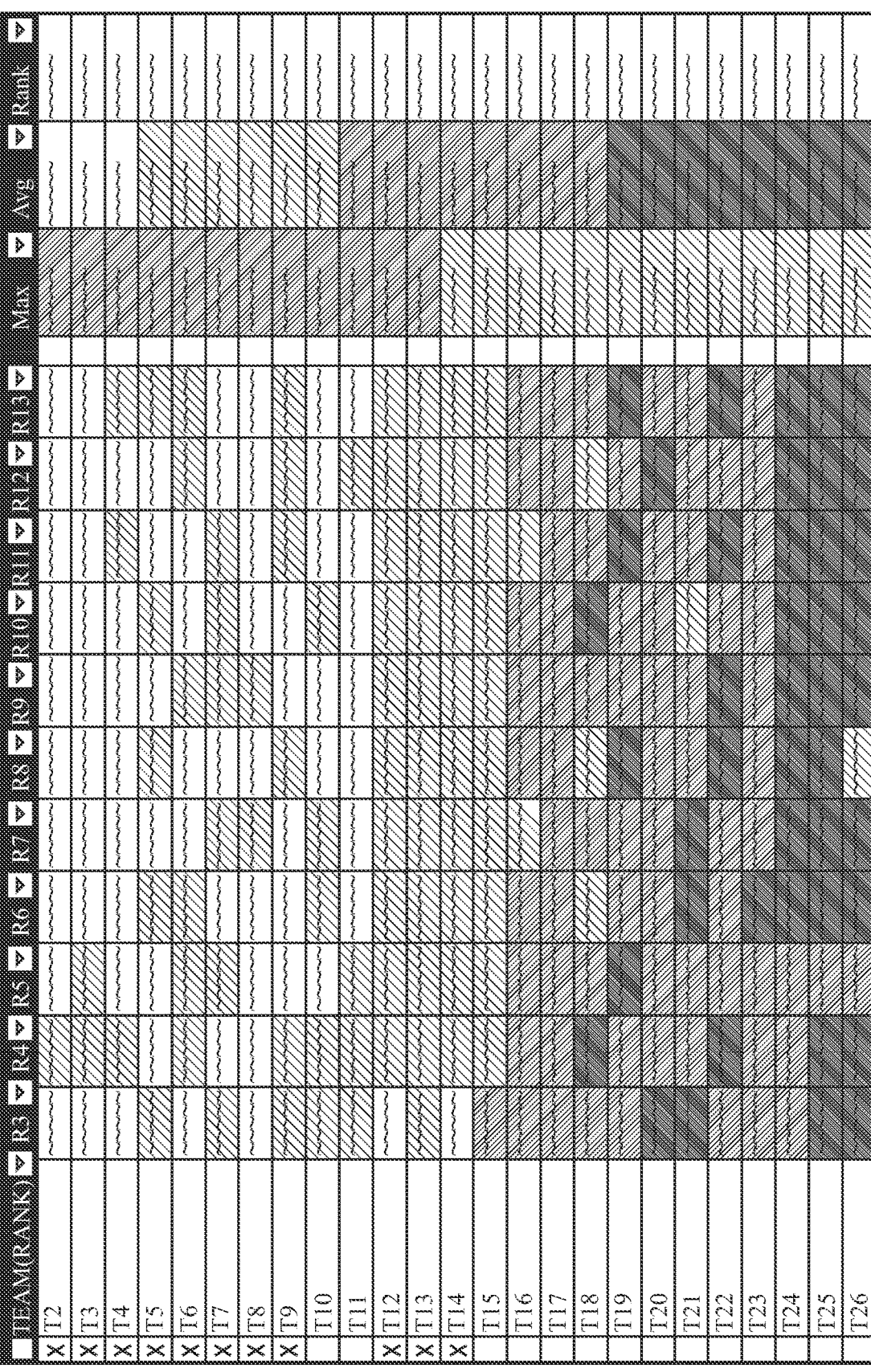

FIG. 123 is a schematic data illustration.
FIG. 124 is a schematic data illustration.
FIG. 125 is a schematic data illustration.
FIG. 126 is a schematic data illustration.
FIG. 127 is a schematic data illustration.
FIG. 128 is a schematic data illustration.
FIG. 129 is a schematic data illustration.
FIG. 130 is a schematic data illustration.
FIG. 131 is a schematic data illustration.
FIG. 132 is a schematic data illustration.
FIG. 133 is a schematic data illustration.
FIG. 134 is a schematic data illustration.
FIG. 135 is a schematic data illustration.
FIG. 136 is a schematic data illustration.
FIG. 137 is a schematic data illustration.
FIG. 138 is a schematic data illustration.
FIG. 139 is a schematic data illustration.
FIG. 140 is a schematic data illustration.

DETAILED DESCRIPTION

In certain embodiments, and without limitation to any other disclosure herein, document servers, computing devices, client computing devices, and/or workflow servers as utilized herein each include hardware, for example the document server 1102 included a computer, server, or group of computers and/or servers, with the client computing device 1104 on a separate computer, server, or group of computers and/or servers. Additionally or alternatively, one or more hardware devices may include aspects of more than one document server, computing device, client computing device, and/or workflow servers, for example as separately executable instructions stored on one or more devices, and/or as logically partitioned aspects of a set of executable instructions, with some aspects comprising a part of one of the first document server, computing device, client computing device, and/or workflow servers, and some aspects comprising a part of another of the computing devices.

Certain descriptions herein include an administrator, a document administrator, or similar terms. The term administrator, as used herein, should be understood broadly. An administrator is any entity having a specified role with respect to the document, the document server, the client device, and/or an organization associated with the document. Non-limiting examples of an administrator include a specified person, a specific login or login type, a person having a specified role (in association to the document server; a client device; a computer system associated with the document server, document, and/or client device; the document; a project associated with the document; and/or a workflow associated with the document), and/or an entity with any of the preceding characteristics. In certain embodiments, an administrator is a person creating the document, creating a new version of an existing document, a person in a position of authority, and/or a person specified to have the administrator role for a given project, period of time, project deliverable, or the like. In certain embodiments, a user may be an administrator for certain operations, document sections, or the like, and not an administrator for other operations, document sections, or the like. In certain embodiments, and administrator is a "super-user." The described examples of an administrator are non-limiting examples, and any operations or criteria to determine an administrator are contemplated herein.

Certain operations herein are described as being based upon and/or in response to a context, a contextual determination, a contextual indication, and/or determined or interpreted contextually. All of these and similar terms ("context parameters" in the present paragraph) should be understood broadly. Context parameters include, without limitation, a user, a user title, a user role, a user location, user permissions for the document, a time of day, an editing time for the user (e.g. time accessing the document, and/or time actively interacting with the document), whether the user created the document, whether the user is an administrator, the current operations being performed by the user (e.g. providing input, selecting a value, responding to a prompt, dragging a selected object, inserting an object, deleting an object, etc.), the time of day, a calendar date, relations of any of these to outside parameters (e.g. an end-of-month, end-of-year, outside of normal business hours, a change in regulatory jurisdiction due to location, or other determination), a data type being accessed by the user, an object type being accessed by the user, a time since the document has been synchronized or updated, a client device capability (e.g. memory, processor power, operating system, communication bandwidth, and/or currently available resources for any of these), an output type (e.g. screen size, color capability, printer type, available storage, and/or web page availability and configuration), a data source for one or more aspects of the document or document portion currently accessed by the user (e.g. size, age, and/or availability of linked or referenced data), a number and/or characteristics of users currently accessing the document, parameters from the document defined at creation or updated, rules for the document, default parameters for the document, a location within the document being accessed by the user, a total size of the document, a size of the document portion accessed by the user, and/or rules associated with the document (e.g. selected by the user and/or an administrator). As will be understood to one of skill in the art having the benefit of the disclosures herein, certain ones of the illustrative context parameters may be utilized for certain operations, and certain ones of the illustrative context parameters may not be applicable for certain operations. The illustrative context parameters are non-limiting, and further do not limit any descriptions herein utilizing context parameters.

A document view as described herein should be understood broadly. An example document view may be a portion of the document being accessed by the user. In certain embodiments, a document view includes information derived from, calculated from, and/or processed for viewing by the user, and accordingly a document view in certain embodiments is based upon, but is not a part of the document and/or the data element. A data element as described herein, when referencing a portion of the document (for example, a portion of the document communicated from a document server to a client computing device), should be understood broadly. A data element may be information derived from the document, a portion of the document, and/or all of the document. A data element may include data aspects that are not a part of the document, but that are associated with, linked by, and/or referenced by the document. For example, a data element may include aspects of source data that is not present within the document, but is passed from the document server to the client computing device.

The present disclosure includes a number of descriptions including a document. A document, as utilized herein, should be understood broadly. Without limitation to any other descriptions of a document herein, a document includes a reference-able collection of data structured for presentation, editing, reading, printing, sharing, and/or any other type of access, input, and/or output by a user. A document may be present in a single location (e.g. on a document server) and accessible by one or more users, either on a device including the document server, or on one or more separate devices in communication with the document server. Additionally or alternatively, the document may be distributed across multiple devices, for example with portions of the document stored in multiple places. An example document includes data which is referenced or linked, and in certain embodiments the document includes the references or links to the data, and in certain additional or alternate embodiments the document includes all or a portion of the referenced and/or linked data.

Additionally or alternatively, during certain operations, for example and without limitation when a user is working with a document locally and not in communication with the document server, portions of the document are present on the document server (e.g. the original document in the state before the user disconnected from the document server), and portions of the document are present on the user device. In certain embodiments, the document includes the local copy of all or a portion of the document on the user device, and additionally includes the original version of the document on the document server at the time the user disconnected from the document server. Additionally or alternatively, the document including the original version of the document on the document server is a first document, the local copy of all or a portion of the document on the user device is a second document, and upon re-synching the local copy of all or a portion of the document from the user device to the document server, a third document is created (e.g. having updates from the user with conflicts resolved in some manner, for example any manner described in the present disclosure).

The logical division of the document from the document server and the local copy of all or a portion of the document on the user device due to disconnection from the document server is described for convenience of illustration, however the logical division may be due to any reason, such as a delay in synchronization to preserve computing resources, to protect network bandwidth, to delay conflict resolution until the user completes selected edits, or for any other reason. Additionally, the example provides a single user accessing the document, however any number of users may be accessing the document or a portion of the document. In certain embodiments, it is explicitly contemplated that the document includes the representative data on the document server and/or portions or all of linked and referenced data, and that the local copies on user devices include separate documents which may be synchronized at some point in the future. In certain embodiments, it is explicitly contemplated that the document includes the resulting representative data on the document server and/or portions or all of linked and referenced data, including updates that would be applied if one or more of the user changes were applied (including all users, or one or more selected users), and as adjusted by conflict resolution techniques. Accordingly, the document may exist in certain embodiments as a digital object which can be accessed directly, such as by a computer, and in certain embodiments the document may exist as a logical construction, with digital elements comprising portions of the document, and implied elements that may or may not yet be reflected in the digital elements comprising portions of the document. In certain embodiments, "document" may indicate a digital object for some purposes, and a logical construction for other purposes. One of skill in the art, having the benefit of the disclosure herein and information ordinarily available for a contemplated embodiment, can readily determine what is contemplated by a document for a particular embodiment and/or purpose. Certain considerations for determining the constituency of a document include, without limitation, the purpose and user rights of access for the user to the document, the type of operations being performed on the document (such as, without limitation, initial provision of portions of the document to a user device; editing of portions of the document by the user; communications of document edits or updates to the document server; operations to resolve conflicts of edits or updates between users; the type of data in the document; the manner in which data is included in the document such as linking, referencing, accessing data sources, and/or permissions to accessed data sources; the primacy of devices and/or users in document permissions and operational priorities with regard to the document; the balancing of document calculations between user devices and/or the document server; and/or the type of operations being performed by the user on the document such as editing, updating, deleting, reading, printing, and/or publishing portions or all of the document).

In embodiments of the present disclosure, users may have a single, unified document surface in which text, images, and tables may be added. Users may type text using, for example, a plus button on the toolbar, or some other functionality. In certain embodiments, a user can insert text anywhere on the document surface, for example by selecting a location (e.g. with a mouse click, touch screen, insertion command), and/or may insert text via an object placed on the document surface, where the object is configured to accept text. Example and non-limiting objects configured to accept text include a text box, a document section, a table, a chart, a figure, a graph, and the like. In certain embodiments, the insertion of text may be appended/inserted to a previous object configured to accept text and/or created as a new object configured to accept text. In certain embodiments, the treatment of inserted text is in accordance with predetermined or selected responses. For example, a selected or predetermined a user selection value (e.g. the currently inserted text is part of the chart currently selected), a prompt to determine the intention of the user, default rules for the document (such as created by the user, in a template, and/or by a document administrator and/or creator), and/or contextual determinations (e.g. how a user has previously selected text insertion rules, a document section, and/or behavior of previous users working with the same type of data and/or the same document section) are utilized to determine the treatment of inserted text.

Users may also add types of objects (e.g., images, tables, linked tables, formulas, etc.) directly into the unified document surface. All previous examples for inserting text into the document described preceding apply, without limitation, to the addition or editing of any other type of object. In certain embodiments, the document includes the user accessible surface that is agnostic to the type of object inserted into or edited in the document. In embodiments, when creating a document, the unified document surface may provide users with a flexible document environment that does not limit their potential uses of that document in the future. For example, the unified document surface may allow a user to add any of the objects (e.g., text, images, tables) to the document. Users may be able to add customized visualizations (e.g., graphs, charts), data from external sources (e.g., through a set of APIs). A presentation layer of the unified document surface may allow utilizing the information within the document and creating a presentation based at least in part on the information stored in the unified document surface.

In embodiments of the present disclosure, the unified document surface, as described herein, may be used to create documents that are not single purpose surfaces, as in the traditional document that is created by previously known word processing applications, spreadsheet applications, or a presentation applications. As an example, currently when a user logs into Google Drive and chooses to create a Google Spreadsheet, that user is choosing a specific tool that can perform operations such as maintain rows of data, run calculations, and so forth. But within a traditional spread-sheet such as this, there is not a text flow surface. Therefore it is not possible to write non-grid based text within the flow of the document. Similarly, when a user creates a Google Doc, the user is choosing to create a text flow document where typing paragraph text is the primary use for the surface, but other functionalities, such as utilizing tables, external data and the like are limited or not available. For example, a user may be able to add very basic tables to organize text, but unable to add a rich table/grid to that Doc and run spreadsheet calculations inside the Google Doc. The creation of inter-linked tables and spreadsheet capabilities, for example, requires extensive user coding, and is of a similar scope to creating a for-purpose application with a developer level expertise required by the user to create even simple operational linking between text flows, spreadsheet capabilities, and database operations. The unified document surface of the present disclosure does not require that a user choose, upfront, a primary tool (e.g., spreadsheet, text surface, presentation surface) when creating a document, but rather, any document with the unified document surface may make use of any of these primary tools, and within the flow of a single application without highly developed coding and expertise. For example, a document with a unified document surface may start as a text flow surface with multiple sections, but may evolve, at the user's direction, into a document running calculations that are integrated across the document. Additionally, a first section of the document may include certain features, such as text flows, pictures, and data links, while a second section of the same document includes text flows, spreadsheet capable tables, and seamlessly links and interacts with the first section of the document. In certain embodiments, the user can readily access any document tools, including operations described herein that are not previously known even in dedicated applications, in any section of the document without regard to opening the correct document application type or providing for extensive customized user code to create a link.

In embodiments, a unified document surface may include a container model of functionalities, including but not lim-ited to a document having sections, or "sheets," that include, but are not limited to, a canvas, grid, and object. Sheets may be nested in that one sheet may contain a second sheet, which may contain a third sheet, and so forth. The terms "sheet" and "section" of a unified document surface may be used interchangeably throughout the present disclosure. An example document may include one or more canvases, and an example canvas may include one or more sheets. An object positioned on a sheet may be associated with the sheet, the canvas, and/or the document. An object positioned on another object may be associated with the object it is placed upon, with a sheet containing both objects, with a canvas, and/or with the document. In certain embodiments, the use of one or more than one of a canvas, sheet, grid, and/or object provided therein are utilized for clarity of description. Other logical groupings of objects are contem-plated herein, one or more layers of object hierarchy may not be present in a given document, and/or additional layers of object hierarchy may be present in a given document. In certain embodiments, object hierarchy is associated with data scope—for example at the canvas level, in certain embodiments, associated variables may be global to the canvas, where at the object level, associated variables may be local to the object and/or global to embedded objects within the object. Additionally or alternatively, data scope may be global throughout the document, for example where data in a first object positioned on a first sheet and a first canvas is accessible directly by another object positioned on a second sheet and a second canvas. In certain embodiments, data scope is configurable by a user selection, according to defaults, and/or according to documents rules which may be created in a document template, by the user, and/or by an administrator.

Figure 109:
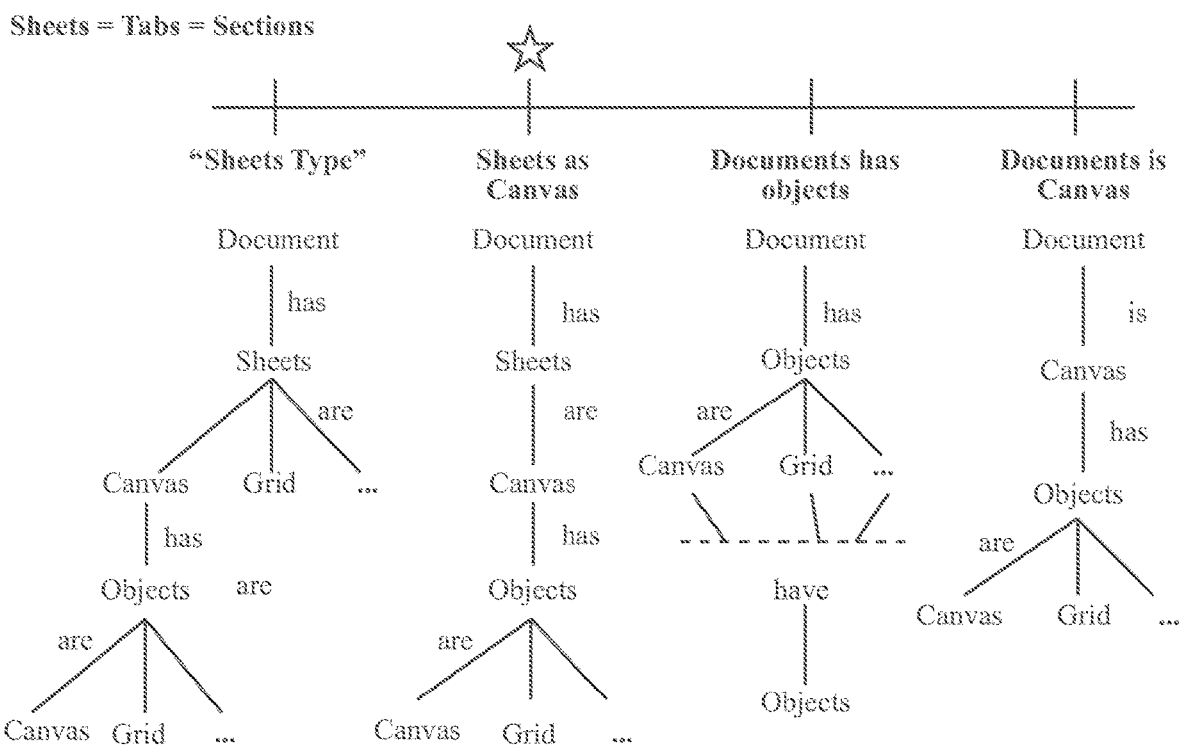
FIG. 109 is a schematic data illustration.

FIG. 109 depicts simplified examples of possible organi-zations of canvas, grid, and object within a unified document surface. The example hierarchies of FIG. 109 are non-limiting illustrations.

Figure 110:
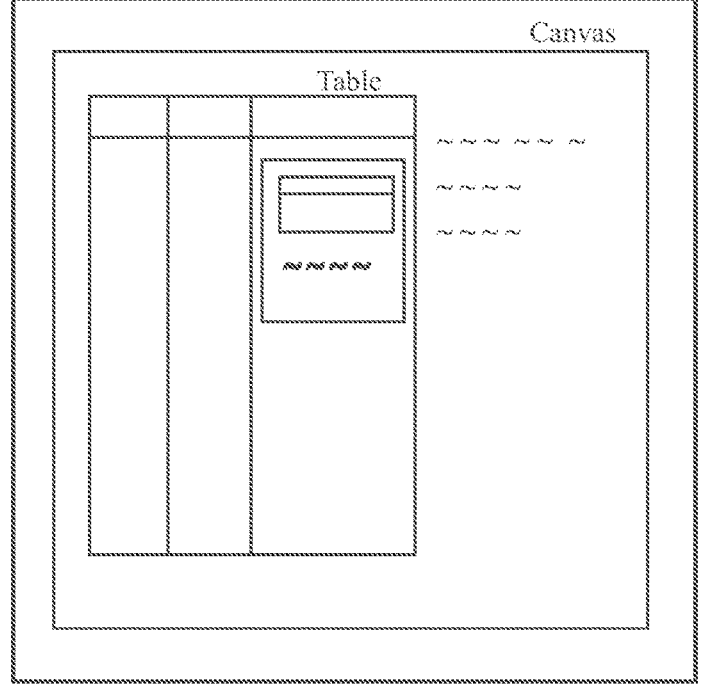
FIG. 110 is a schematic data illustration.

In an example, as presented in FIG. 110, a document having a unified document surface may include a canvas. Within a canvas a table may be presented. The canvas may provide functionality for a user to enter flow text or images, for example, and the tables allow the user to enter numeric data in a grid and perform calculations, all within the same document, without the user having to toggle between a separate applications, such as a word processing file and a spreadsheet file. Sections and objects of a document having a unified document surface may be named, and a section may inherit the name of an underlying named object for display and/or data access purposes, such as presenting the name in a tab for the user. Documents and objects may have as a default a naming convention that sequentially and/or contextually provides each document and object a generic name (e.g., Table1, Table2) until a user specifies a unique name.

Figure 111:
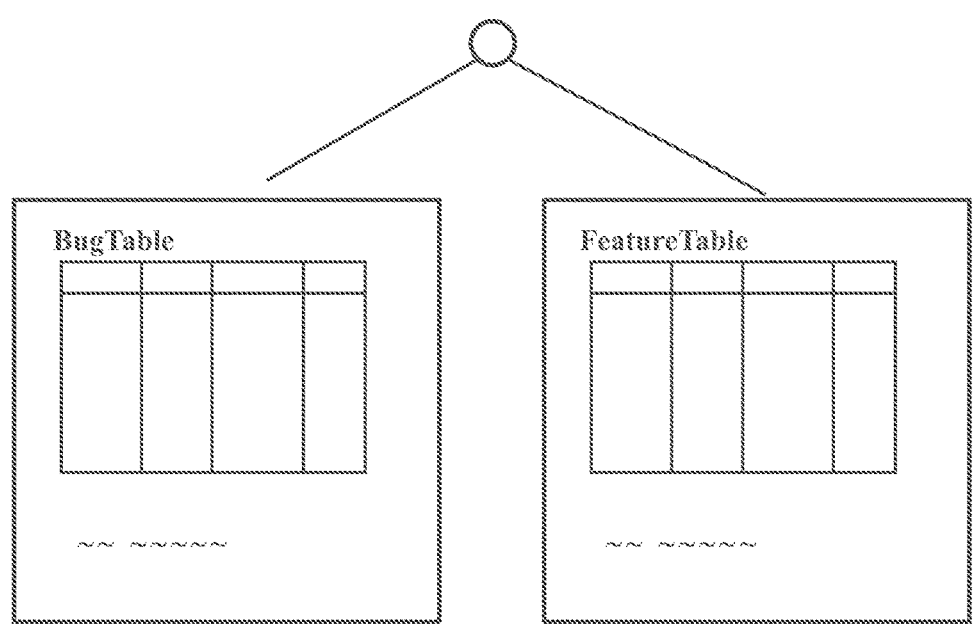
FIG. 111 is a schematic data illustration.

Referring to FIG. 111, in an example embodiment, a document having a unified document surface may include two tables. Each table may reside within its own unique canvas. Additionally or alternatively, each table (e.g., the "BugTable" and the "FeatureTable") may be a top level object of the document having a unique name. The unique name may in turn be used to make additional functionalities and operations name-unique to that particular object as well. For example, a formula on the BugTable may be "=Feature-Table. Effort. SUM ( )" and therefor resolve correctly using the appropriate table data. In another example, if each table included a column for "Effort" data, each may resolve to the uniquely named object: "BugTable.Effort" or "Feature-Table.Effort." In certain embodiments, an application oper-ating the document interface to the user, for example and without limitation a user interaction circuit 808 (see the portion of the description referencing FIG. 8) automatically resolves object names for the user where ambiguity may otherwise be present. For example, where BugTable includes a reference name Table1 and is present on a first canvas, and where FeatureTable also includes a reference name Table1 and is present on a second canvas (for example—permissible where the data references for BugTable and FeatureTable are locally scoped), an example user interaction circuit 808 utilizes the BugTable or Fea-tureTable, respectively, when the user is operating in a document section of the first canvas or second canvas and references Table1. Additionally or alternatively, the user interaction circuit 808 resolves to either the BugTable or FeatureTable, for example when the user is operating in a document section of a third canvas. In certain embodiments, the resolution includes an operation such as: taking a nearest one of the BugTable or FeatureTable (e.g. by document section number, by distance within the document such as text count, visible distance, etc.); taking a contextually indicated one of the BugTable or FeatureTable (e.g. a most-used table, a most recently accessed table, a table having data types that match a user intention, and/or a table flagged by the user in a recent resolution operation, etc.). In certain embodiments, the user interaction circuit 808 additionally or alternatively provides a user with a preview of the resolved table (e.g. allowing the user to confirm the correct insertion or access before completing an operation), and/or provides the user with a list of potential candidates (e.g. all tables within the document, a document section, contextually indicated sections, and/or contextual equivalents) matching the reference name (e.g. Table 1), thereby allowing the user to conveniently reference the correct information without having sophisticated knowledge of underlying data scope information, and/or having to ensure detailed management of data scoping and object naming. A preview includes a view of the table or object referenced, a result of the current operation if the referenced object is selected (e.g. the user is applying a SUM operation to a table column, and the preview includes one or more headers or value from the table, and/or the SUM result if the table is selected). Additionally or alternatively, the user interaction circuit 808 begins operations to preview and/or list candidate references in response to a partial name which may not uniquely identify candidate members—for example a user entry of "*Ta" may pull up references within the document having none, one, or more, characters preceding a "Ta" in the reference name, such as BugTable and/or FeatureTable. In another example, a user entry of "Fe" may pull up the FeatureTable and a separate FebruarySales chart (not shown) elsewhere in the document. It can be seen that the example operations provide for a convenient interaction for the user that includes an autocomplete function (e.g. where the user selects a candidate member, or makes an entry when only one candidate member remains), but also provides additional functionality to provide users with convenient information (e.g. a preview of the information, a location of the referenced information, a result of the current operation if the candidate member is selected, etc.) to ensure that the proper reference is selected. All operations described in the examples are illustrative, and are applicable to any type of object and operation in the document, without limitation.

Figure 99:
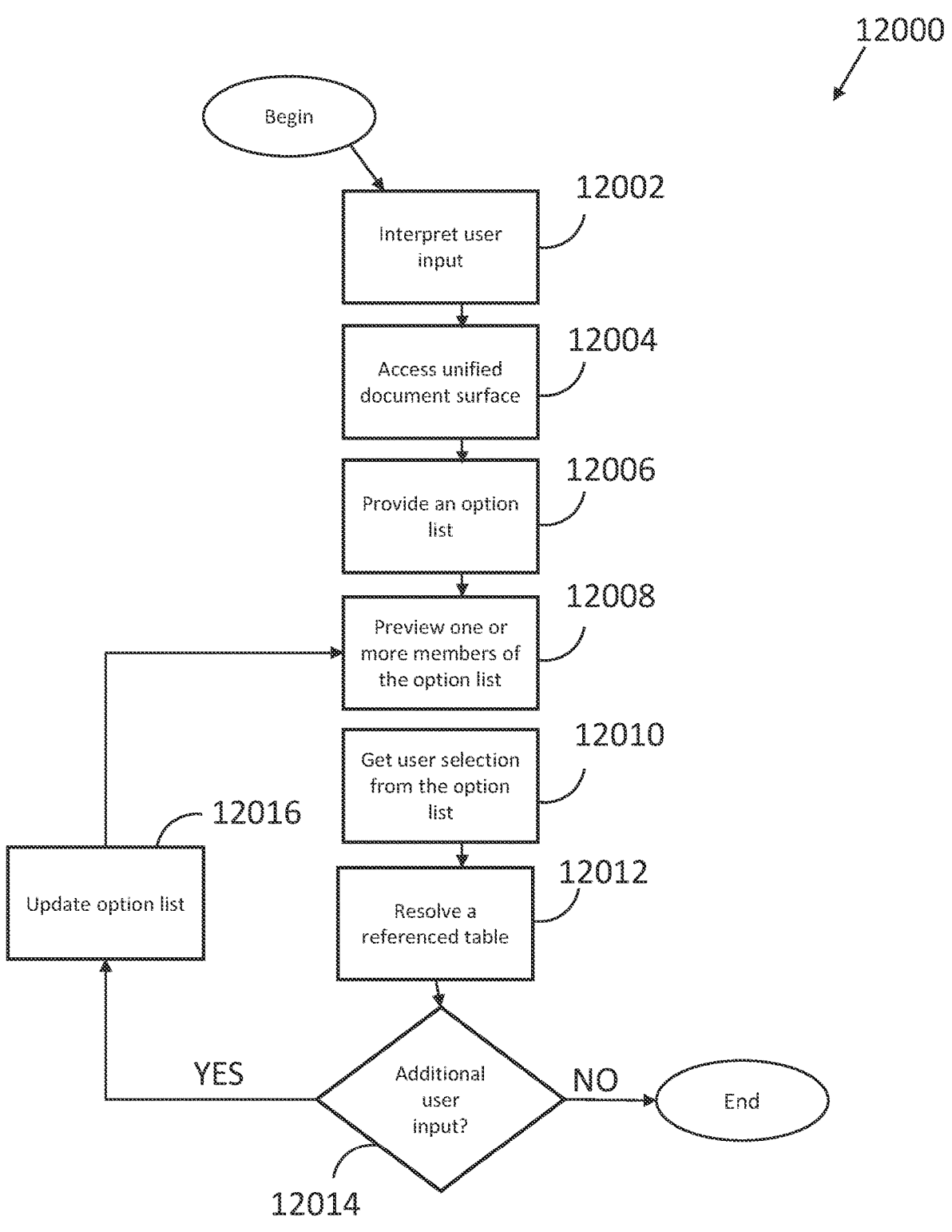
FIG. 99 is a schematic flow diagram of a procedure for working with data.

Referencing FIG. 99, an example procedure 12000 includes an operation 12002 to interpret a user input, for example a user input indicating a table reference value, and an operation 12004 to access a unified document surface having at least two tables. The example procedure 12000 further includes an operation 12012 to resolve a referenced table from the at least two tables in response to the table reference value, for example to determine an intended referenced table by a user and/or to assist the user in conveniently and correctly referencing a table. Operations in the procedure 12000 are described in the context of a user referencing a table, however operations may additionally or alternatively be directed to resolving a reference to any object, including objects of disparate types. For example, procedure 12000 may resolve a user input to determine a referenced one of a number of graphs, charts, table columns, or any other object or data element, and/or to resolve between two objects of different types such as between a table and a chart.

The example procedure 12000 includes an operation 12006 to provide the user with an option list in response to the user input (such as a table reference value). In the example using two or more tables, the option list includes at least one of the two or more tables, and the operation 12012 to resolve the referenced table is in response to a selection of the user from the option list. For example, where a user enters "An" as a user input, the procedure 12000 includes the operation 12002 to interpret the "An", the operation 12004 to access the unified document surface, and an operation 12006 to provide an option list of returns consistent with the "An" entry by the user. An example includes returning a table "Annual report" and a table "Annuity investment options", where such tables are present (e.g., in-line, linked, and/or referenced) within the unified document surface. An example includes returning a first one of two tables "Annual report", for example where one of the two tables is within a document section closely related to the user position in the document within the unified document surface hierarchy (e.g. within the same canvas, sheet, or the like). In certain embodiments, a table and/or other object is returned consistent with the user input. Additionally or alternatively, a user indicates the type of object desired, and the operation 12012 to resolve the reference is limited to objects consistent with the user indication.

The example procedure 12000 further includes an operation 12008 to provide the user with a preview of at least one member of the option list. For example, each member of the list may have a short preview positioned by the option list member, such as an image corresponding to at least a portion of the at least one member (e.g., a thumbnail, a top section, a first column, etc.); a title of the at least one member; a column heading from the at least one member; at least one data value from the at least one member; and/or a result value corresponding to the at least one member. In certain embodiments, only a small number of the option list members may have a preview (e.g., the top three, ones having a high relevance, a number selected according to available display space, and/or a selected number). In certain embodiments, only a focused member of the options list (e.g., a value the user moves a selector or mouse cursor over, a value the user has tabbed to, etc.). In certain embodiments, a first, shorter preview, is provided for one or more members of the options list, and a larger or more complete preview is provided for a small number of the option list members and/or for focused members of the options list. In certain embodiments, a preview may be a result value of the corresponding member, for example a result of a current operation of the user that would be returned if the previewed member of the option list is selected (e.g., a formula result where the user is referencing a table or object in a formula, where the formula result previewed is determined based on the previewed member of the option list).

An example procedure 12000 includes the user input as a character sequence—for example the first character or characters entered after the user begins the referencing, and the procedure 12000 further includes an operation 12014 to determine whether additional user input is provided. Where additional user input is provided (operation 12014 result YES), the procedure 12000 further includes an operation 12016 to update the option list, and returns to the operation 12008 to preview one or more members of the option list. Additionally or alternatively, for example where previews of the option list are not provided, the procedure 12000 returns to operation 12010 to await a user selection of the members of the option list in response to the operation 12016 to update the option list. In the manner described, it can be seen that the user can enter a character sequence, and the option list is updated as the user enters additional characters. In certain embodiments, the option list is not present, and/or the option list is not updated while the user is entering a character sequence. Additionally or alternatively, an option list, previews, and/or updates of the option list or previews can be provided responsive to user requests, specific user entries (e.g., a tab or carriage return), or the like. Additional user input may be, without limitation, an addition, a deletion, a replacement, and/or an insertion to the current user input and/or character sequence.

In certain embodiments, the at least two tables each have a reference name value consistent with the table reference value, and the operation 12012 to resolve the referenced table includes determining a first user related position in the unified document surface (e.g. a canvas, sheet, page, or other location), and finding a closest hierarchically related one of the at least two tables in response to the first user related position (e.g. within the same canvas, sheet, page, and/or in a closest related canvas, sheet, page, etc.).

The terminology "hierarchically related," as used herein, indicates that, moving through an object model of the unified document surface, an object is within the same scope as the user location within the document (e.g., moving vertically up through the unified document surface, a related object is located), and/or an object is horizontally related to the user location (e.g., if no consistent object is found in a vertical movement such as to the current canvas, a closest one of a number of canvasses having a consistent object is selected— where closest may be by object count, object name, object recency, etc.).

An object that is consistent with the user input, and/or with a character sequence of the user input, includes, without limitation: an object including the character sequence (e.g. within the object reference name, within a heading of the object, and/or within a data value of the object); an object having an element that begins with the character sequence; an object having an element that includes the character sequence as a significant element (e.g., a user input "yearly" could return objects having "year" in a reference name, heading, data value, or the like); an object having an element with any of the preceding based on alternatives for the user input or character sequence (e.g., to account for typographical errors; conceptual matches such as time, project names, locations, and common alternative references to concepts; and/or objects having an expanded match set according to the context of the reference entry by the user such as dates, deliverables, data types, concepts in the headings of the portion of the document the user is working in). The examples to describe an object being consistent with the user input are non-limiting, and in certain embodiments an exact match of the user input with the object element or portions thereof is utilized, and in certain embodiments a broader utilization of consistency is utilized. The determination of consistency between the object element and the user input may be selectable, based on rules, and/or expanded upon user request such as if the user is not finding the intended object under a more stringent consistency schema.

An example embodiment includes at least two tables or objects having an identical local reference name (e.g., "Table1"), where local reference name describes the specific reference name without regard to the hierarchical position of the object within the unified document surface object model. It can be seen that the procedure 12000 provides for resolution between objects having an identical local reference name, including either direct resolution and/or providing the user with an option list and context to resolve the reference conveniently and with confidence that the correct information is selected. It can be seen that the procedure 12000 provides for resolution between objects sharing a number of introductory characters in the local reference name (e.g., "Table1" and "Table12"), including either direct resolution and/or providing the user with an option list and context to resolve the reference, without requiring the user to enter the entire reference name completely and correctly.

Figure 112:
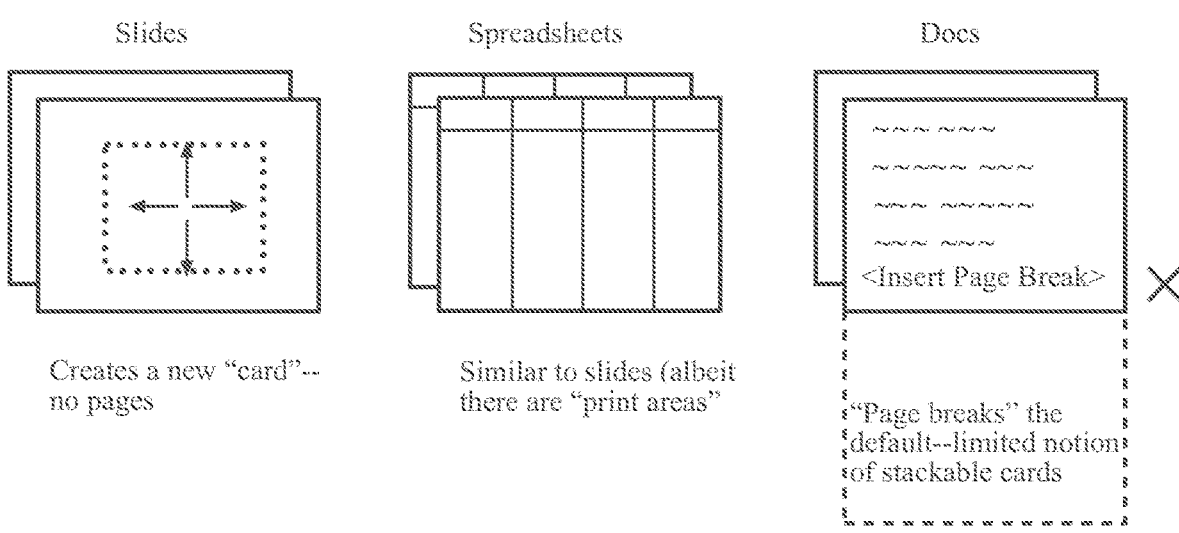
FIG. 112 is a schematic data illustration.

In embodiments, the unified document surface may allow pagination. Referring to FIG. 112, examples of pagination are provided for slides and spreadsheets. Pagination may be included, for example, to illustrate to the user segmented portions of the document for publishing, printing, and/or other output. In certain embodiments, pagination may be included for reference purposes (e.g. to provide an object reference for access through formulas or other linking mechanisms, or to identify document portions for communications that occur outside of the context of the document), for organizational purposes, and/or to apply conditional formatting to selected portions of the document. Pagination may be inserted by user selection, according to rules, and/or according to contextual assessments. In certain embodiments, pagination may be applied to only certain flows of the document (e.g. presentation pages, text, figures set on a page, etc.). In certain embodiments, pagination is unique within a given document scope (e.g. within a canvas and/or within a sheet). Additionally or alternatively, pagination is unique throughout the document (e.g. a document cannot contain two "page 17" member), and/or pagination is not unique at all (e.g. two alternative annual reports of pages 1-50 may be present in the same document, canvas, and/or sheet without any conflict). The use an implementation of pagination is illustrative and non-limiting. Any other type of document segmentation and/or organization (e.g. sections, stories, flows, breaks, etc.) is similarly contemplated herein, and similarly illustrative and non-limiting. Although the example FIG. 112 depicts a bounded canvas, additionally or alternatively a canvas may be unbounded, resizable, or the like.

Figure 113:
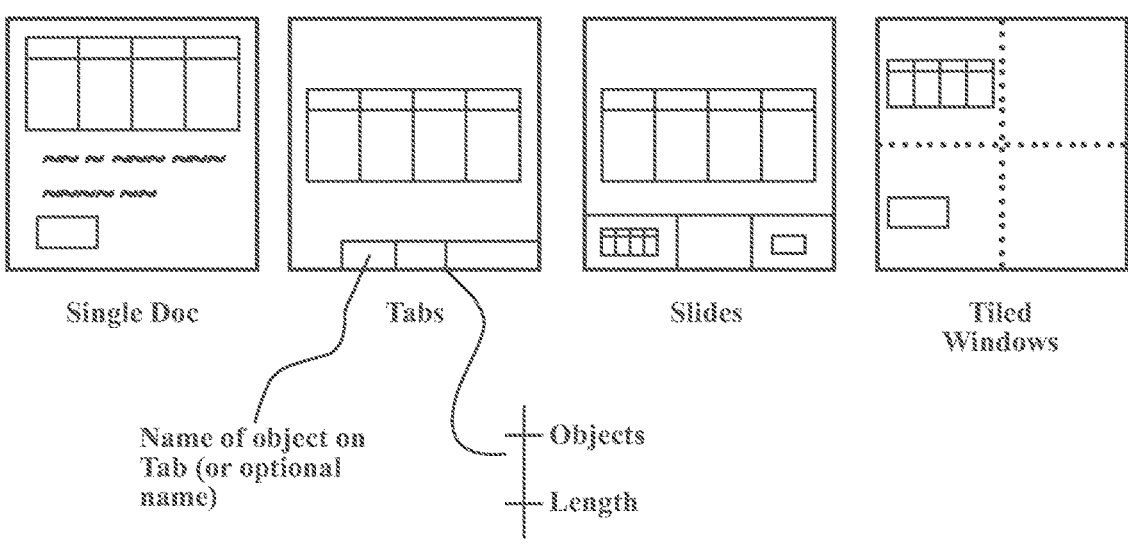
FIG. 113 is a schematic data illustration.

Referencing FIG. 113, an example depicts alternate views of a document portion, such as a table (having 4 columns and two rows, in the example), a text portion, and a figure (an empty box in the example of FIG. 113). An example user interaction circuit 808 allows a user to seamlessly transition between sections (e.g. sheets) within a document, where each object may, for example, have unique material such as slides. Objects may be organized and presented to a user within the document as tabs, slide sorters, tiled windows, or any other presentation format. The presentation to the user may be selectable, and/or may be based on document rules, contextual determinations, and/or the type of information currently being viewed by the user. The depiction of FIG. 113 showing separate types of content on separate sheets is for convenient illustration, although a given document may include separate types of content on the same sheet, and/or may not have a sheet organization at all.

In embodiments, the base surface of a document having a unified document surface may function like a word processing document, in a constrained model, where text flows upon user entry from top to bottom, and from left to right. In another example, the base surface of a document having a unified document surface may also function in a flexible, unconstrained manner, where the user may create objects or data in any section or position of the document, and the entire document surface is writeable (i.e., not limited to top-down, or left-right entry).

In an example, in the constrained model of the surface, the pages or slides may be set by the dimensions chosen by the user or a default setting. Each canvas within a surface may have a header and/or footer section or margin which can be set for elements across many common canvases. A document may provide the "grid". In the constrained model, the writing area may be fixed and writing in a location that departs from the top-down, left-right manner, may require special formatting or selections from the user. In the constrained model, the writing and/or object placement area may have an updateable surface size in response to user operations that would otherwise exceed the surface boundaries. In an example, an unconstrained surface may allow a user to write anywhere within the surface. Even in an unconstrained surface, the document may have a defined surface size, set by the user, defaults, contextually determined, or the like, and/or the document may have an infinite or updateable surface size in response to user operations that would otherwise exceed the surface boundaries. A "print area" of the surface may be defined by a user or by a default setting, and/or may be highlighted or selectively highlighted for convenience of the user. Headers and/or footers may be applied to each print area. Snap-to-grid features, alignment features, margins, and other user conveniences may exist in the unconstrained model or in the constrained model.

In embodiments, a unified document surface may support multiple surface types. For example, each surface type may be presented to a user in a selectable manner, such as a tab, a preview, an icon, or the like. A user may select a tab to go to a given surface type of interest. In an example, a document may include a base surface in which all other surfaces and surface types reside. In another example, each of a plurality of surface types within a document may be independent and not share a common base surface.

In embodiments, a unified document surface may be a collaborative environment in which multiple parties are actively accessing, editing, adding to and otherwise using the collaborative unified document surface. Thus, multiple users can readily see updates, work together on distinct or the same portions of the surface.

Figure 114:
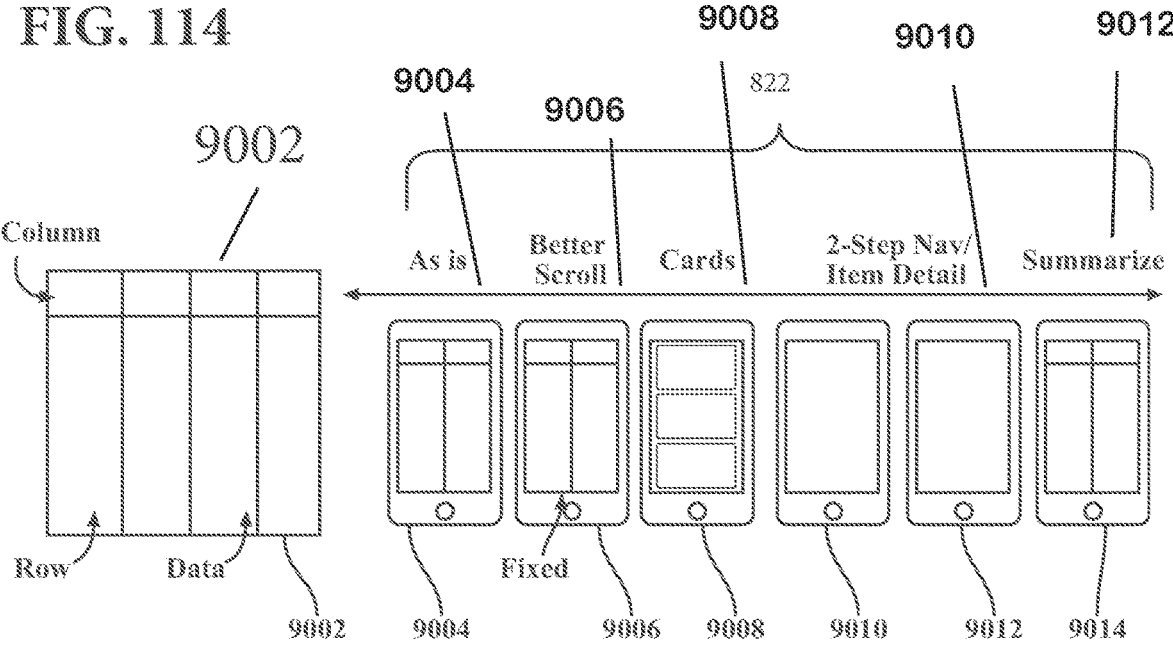
FIG. 114 is a schematic data illustration.

In certain embodiments, a document surface may exceed the viewable portion of a user output device (e.g. a display screen), at least at a scaling or zoom level that is convenient for the user. Referencing FIG. 114, certain navigation options may be provided, for example by the user interaction circuit 808, to provide for navigation of a surface on the user device. In the example, a surface 9002 is depicted left, and several data views 822 (reference the description referencing FIG. 8) are depicted right. An example, "As Is" 9004, depicts a portion of the surface directly on the device, which may be navigated by the user (e.g. by swiping the screen). Another example 9006 provides for improved scrolling, for example by fixing boundaries for scrolling (e.g. the header row is fixed and the user can swipe up and down the rows, and/or the column view is fixed so extraneous horizontal swipes do not shift columns), and/or the user can snap between columns—for example with a definitive swipe (e.g. a swipe having greater than a threshold horizontal movement amount) and/or by unlocking the columns for movement between columns. Another example 9008 provides structured data views of aspects of the surface (e.g. "cards"-reference the description referencing FIG. 9) may be placed in the data view 822 (reference the description referencing FIG. 8) for the user to provide summarized, important, and/or compacted information about the surface to the user. In certain embodiments, a "card" is associated with a row of the table, providing for a convenient view of the information configured for the user's device. In certain embodiments, the user can edit data on the "card", and the edited data is reflected in the table on the document surface. Another example 9010 allows the user to make a data selection from a "card", a bulleted list (e.g. of a column or row of the table-see the left image of "2-Step New/Item Detail"), or other structured data element, and the user interaction circuit 808 "zooms" to a detailed view 9012 or otherwise provides greater information about the row and/or column selected (see the right image of "2-Step New/Item Detail"). Additionally or alternatively, the user interaction circuit 808 can determine, by user selection, contextually, or otherwise, to provide the user with a summarized view 9014 (see the right-most image) such as aggregated data, a pivot table, or the like. The examples in FIG. 114 are depicted in the context of a surface having a table larger than the user display screen. Additionally or alternatively, any type of surface and object on the surface can provide the user with convenient viewing and/or editing options such as depicted in FIG. 114, whether the surface or object is larger than the display screen or not. Example and non-limiting objects include text flows (e.g. allowing the user to see paragraphs, select terms for details, etc.), and/or charts or graphs (e.g. allowing the user to zoom on chart elements, access related data, get text or numeric descriptions of chart elements).

An example system (e.g., system 800 described in the portion referencing FIG. 8, or any system described throughout the present disclosure) provides viewing and/or editing options to a client device in an API, where the client device accesses the API. The utilization of an API allows for support of multiple devices and device types by moving aspects of application operation into the API layer (e.g., to a document server and/or a second client device interfacing with the presently used client device by the user). Accordingly, the client device utilized by the user is responsible for fewer processing operations to support the application, such as view rendering logic. An example system includes an application API that serves responses based on the current view (e.g., the sort, filter, and/or other selections of the user accessing the document thereby limiting the content of the document that must be rendered to provide full, consistent document access to the user; and/or the specific portion of the document visible to the user), rather than making multiple data API calls per asset type (e.g., account information request; list of recent documents request, etc.). The movement of application content into an application API (or other similar organizations of processing content) is selectable, with certain types of operations provided on the API layer, and other types of operations left on the client device. Further, the movement of application content into an application API may be selectable, and/or configured according to a client device type and/or client device resource availability.

Figure 97:
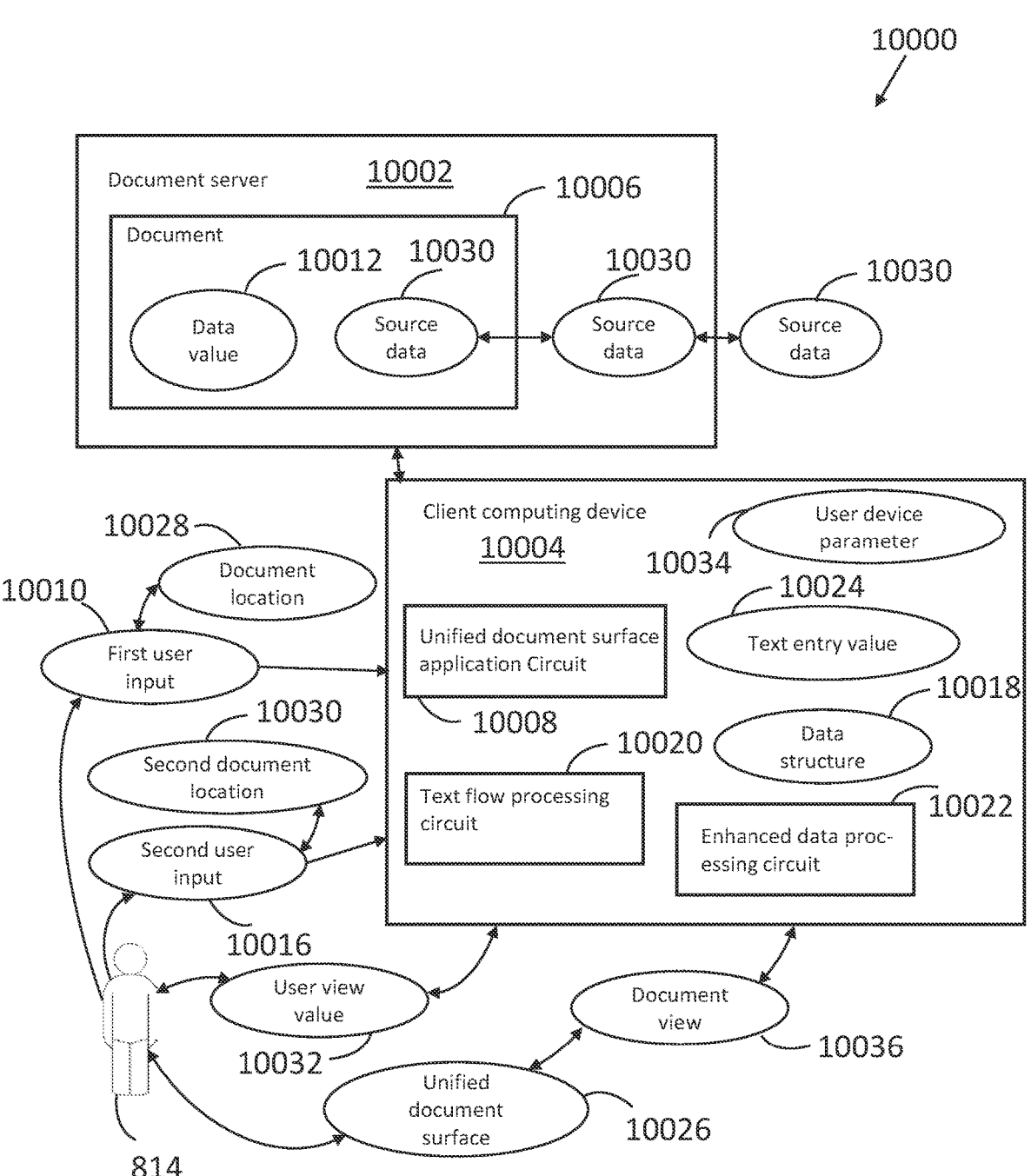
FIG. 97 is a schematic depiction of a system for accessing data.

Referencing FIG. 97, a system 10000 includes a first computing device 10002 communicatively coupled to a second computing device 10004, where the first computing device 10002 includes a document server that communicates a data value 10012 to the second computing device 10004, such as a client computer device 10004, where the data value 10012 includes at least a portion of a document 10006, and/or includes links, references, and/or imported data from one or more source data 10030 elements. The example second computing device 10004 includes a unified document surface application circuit 10008 that interprets a first user input 10010 including a text flow entry, and interprets a second user input 10016 including an in-line data access entry and/or a table-based calculation entry. The example client computing device 10004 includes a text flow processing circuit 10020 that positions a text entry value 10024 on a unified document surface 10026 in response to the first user input 10010, and an enhanced data processing circuit 10022 that creates at least one data structure 10018 in response to the one of the in-line data access entry and the table-based calculation entry, and positions the data structure 10018 on the unified document surface 10026. Accordingly, the system 10000 provides for a unified document surface 10026 that is not a single purpose surface, and that has access to a full range of spreadsheet, calculation, database, and other tools within a single application.

In certain embodiments, the unified document surface application circuit further interprets a document location 10028 corresponding to the first user input 10010, and the text flow processing circuit 10020 further positions the text entry value 10024 on the unified document surface 10026 in response to the document location 10028. Additionally or alternatively, the unified document surface application circuit further interprets a second document location 10030 corresponding to the second user input 10016, and the enhanced data processing circuit 10022 further positions the data structure 10018 on the unified document surface 10026 in response to the second document location 10030.

An example document location 10028 and second document location 10030 are within a same section of the unified document surface 10026. For example, the text entry value 10024 and data structure 10018 may be positioned on a same canvas, same page, same grid, same sheet, within a document object (e.g., a table, graph, visualization element, etc.), within a same document section, or the like, without the user 814 creating document breaks or sections to accommodate utilization of disparate object types within the unified document surface 10026. In certain embodiments, one of the document location 10028 and the second document location 10030 is included within the other of the document location 10028 and the second document location 10030—for example where the document locations 10028, 10030 include one object embedded within another object. An example system 10000 includes the document location 10028 being a constrained portion of the unified document surface 10026 (e.g. operating on the constrained model) and the second document location 10030 being an unconstrained portion of the unified document surface 10026.

An example unified document surface application circuit 10008 further interprets a user view value 10032, and provides a document view 10036 in response to the user view value 10032. An example user view value 10032 includes a tab selection, a slide selection, and/or a tiled window. Additionally or alternatively, a user view value 10032 includes a user designation, a user authorization, a user device parameter, a filter value, a sorting value, a priority value, a document role value, a text view, a data view, a metadata view, a formula view, and a predetermined view selection. Accordingly, the client unified document surface application circuit 10008 can configure the view of the unified document surface 10026 for the user in response to the user designation (e.g., a role, title, selection by the user, etc.) and/or authorization of the user (e.g. hiding certain portions of the unified document surface 10026 based on the user designation). Additionally or alternatively, the user can determine how to sort, filter, and/or prioritize displayed information on the unified document surface 10026. Additionally or alternatively, the user can determine to view document data, metadata (e.g., tags, styles, editing history, time stamps, object reference names, etc.), formulas as entered (e.g., as opposed to results), the user can set up a view of the unified document surface 10026 for later convenient access, and/or the user can select from a predetermined view or list of views (e.g., set up by an administrator, according to rules in a template, and/or default view selections).

An example unified document surface application circuit 10008 further interprets a user device parameter 10034, and provides a document view 10036 in response to the user device parameter 10034. Example and non-limiting user device parameters 10034 include a user device screen size, a user device input type, a user device resource parameter (e.g., memory of any type, processing capability, communication bandwidth, and/or availability of portions of these for operations with the unified document surface 10026), and/or a user device communication value (e.g., availability and/or capacity of a user device to communicate with the client computing device 10004, with the document server 10002, and/or between the client computing device 10004 and the document server 10002). Accordingly, the unified document surface application circuit 10008 can configure the document view 10036 tailored to the user 814 and the current hardware context of the user 814.

Figure 98:
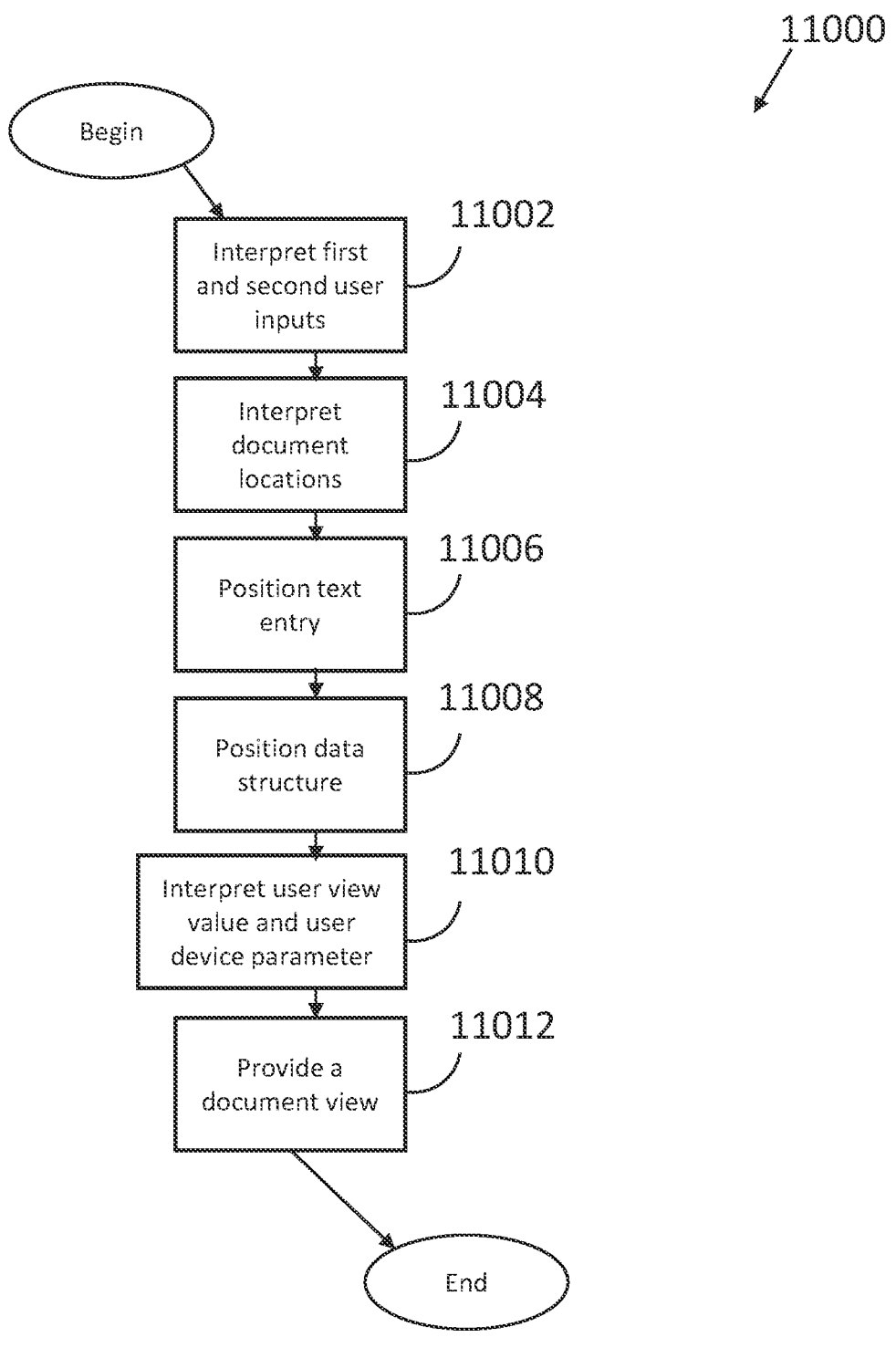
FIG. 98 is a schematic flow diagram of a procedure for working with data.

Referencing FIG. 98, a procedure 11000 includes an operation to interpret a first user input including a text flow entry, and/or to interpret a second user input including one of an in-line data access entry and a table-based calculation entry. The procedure 11000 further includes an operation 11006 to position a text entry value on a unified document surface in response to the first user input, and an operation 11008 to create a data structure in response to the one of the in-line data access entry and the table-based calculation entry, and to position the data structure on the unified document surface.

The example procedure 11000 further includes an operation 11004 to interpret a document location corresponding to the first user input, where the operation 11006 to position the text entry value on the unified document surface is in response to the document location. The example procedure 11000 further includes the operation 11004 to interpret a second document location corresponding to the second user input, where the operation 11008 to position the data structure on the unified document surface is in response to the second document location.

An example procedure 11000 further includes an operation 11010 to interpret a user view value, and an operation 11012 to provide a document view in response to the user view value. Additionally or alternatively, the operation 11012 includes an operation to interpret a user device parameter, and the operation 11012 includes providing a document view in response to the user device parameter. An example operation 11012 includes configuring the document view in response to at least one of: a user device screen size, a user device input type, a user device resource parameter, or a user device communication value.

Figure 24:
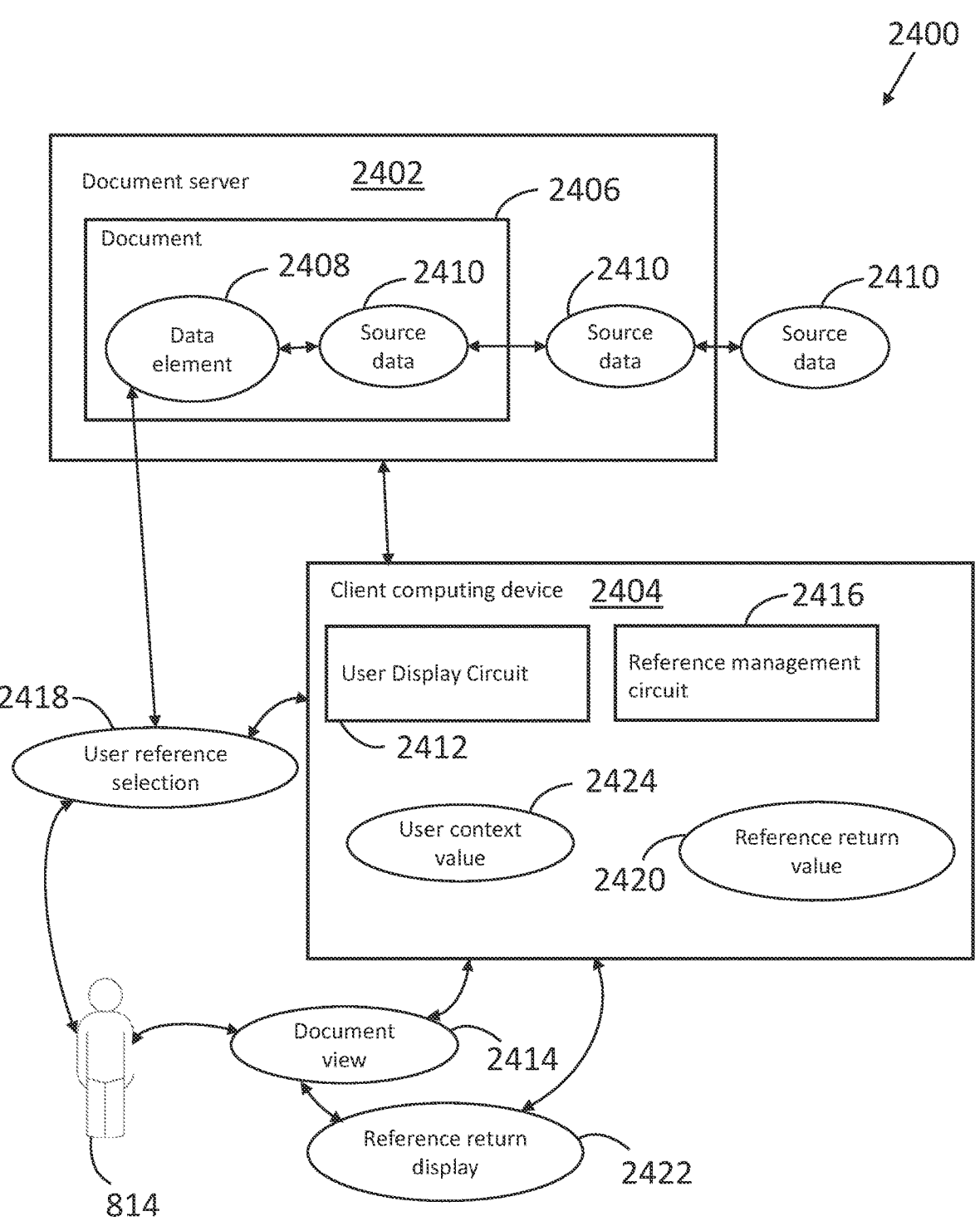
FIG. 24 is schematic depiction of a system for providing a reference return.

Referencing FIG. 24, a system 2400 is schematically depicted including a document server 2402 that communicates at least a portion of a document 2406 to a client computing device 2404. The document 2406 includes a data element 2408, which may include at least a portion of the document 2406, source data 2410 (e.g. data linked or referenced in the document 2406), and/or information derived from the document 2406 or source data 2410. Source data 2410 may be in any location—the example system 2400 includes source data 2410 within the document 2406, on the document server 2402 in a location separate from the document 2406, and/or outside the document server 2402 (e.g. with a third party provider, on a database, and/or a website). In certain embodiments, the data element 2408 is included within the document 2406 and does not include source data 2410. In certain embodiments, the data element 2408 includes the entire document 2406. The example system 2400, and other depictions throughout the present disclosure, provide for non-limiting illustrative examples of data and data flows (e.g. with arrows depicting certain directional flow). The data and data flows depicted are provided for certain example embodiments, but data flow may be in any direction, and data may be present anywhere within the described systems and examples. Where a particular system element utilizes data, the data is accessible to the system element, but may be located on a same device (e.g. the client computing device 2404) and/or communicated to the system element utilizing the data.

The example system 2400 further includes the client computing device 2404 having a user display circuit 2412 that provides a document view 2414 in response to the data element 2408, where the document view 2414 includes at least a portion of the data element 2408. For example, the document view 2414 may be the portion of the document 2406 being accessed by the user 814. In certain embodiments, the document view 2414 includes information derived from, calculated from, and/or processed for viewing by the user 814 (e.g. see the description referencing FIG. 9), and accordingly the document view 2414 in certain embodiments is based upon, but is not a part of the document 2406 and/or the data element 2408.

The example system 2400 further includes a reference management circuit 2416 that interprets a user reference selection 2418, and determines a reference return value 2420 in response to the user reference selection 2418. Example and non-limiting user reference selections 2418 include a selection by the user 814 indicating that a reference look-up operation is requested, instructed, and/or contextually indicated to complete a related request by the user 814. For example, the user 814 may select a tool button, enter a specified character and/or character sequence, and/or perform a separate operation having a reference look-up operation included as a portion thereof. An example user reference selection 2418 includes a user 814 selecting a tool bar button (e.g. "Reference . . . "), performing a utility action (e.g. selecting a value from a menu, performing a "right-click" operation, double-tapping or double-clicking, and/or any other selected sequence to provide a reference request and/or a menu of options including a reference request). An example user reference selection 2418 includes the user 814 entering a character and/or sequence of characters, in certain embodiments in a selected context, wherein the character and/or sequence of characters provides for a reference request and/or a menu of options including a reference request. For example, a user 814 may enter an appropriate context, which may include entering the character(s) in any text field in the document 2406, entering the character(s) in a formula field or other selected field in the document 2406, and/or opening or indicating initiation of the context such as with a tool bar button and/or utility operation. An example character that may be included in a user reference selection 2418 includes utilizing an "@" symbol, for example an entry of "@Annu . . . " as the user reference selection 2418 may be utilized by the reference management circuit 2416 to determine a reference return value 2420 in response to the character sequence "Annu." The use of the "@" character provides for a convenient character that is seldom used to start a common word, however, any character or sequence of characters may be utilized herein without limitation. In certain embodiments, the reference return value 2420 may accept a precursor character, for example and without limitation a single quote "'", where the presence of the precursor character indicates the user 814 intends the character or sequence of characters, ordinarily indicating a user reference selection 2418, to be utilized as depicted—for example "'@gmail.com" could indicate, in certain embodiments, that "@gmail.com" is intended for display, rather than activation of a reference look-up and consequent return of a reference return value 2420.

In certain embodiments, the reference management circuit 2416 continuously updates the reference return value 2420 in response to subsequent entries for the reference return value 2420, for example returning a first reference return value 2420 upon user 814 entry of "@A" and updating to a second reference return value 2420 as the user 814 continues with entry of "@An". In certain embodiments, the updating of the reference return value 2420 may be periodic (e.g. every 200 msec), upon request by the user 814, upon a determined ending to the entry of the user reference selection 2418 (e.g. entry of a space character " "), and/or dependent upon contextually indicated information (e.g. the capability of the client device 2404).

In certain embodiments, the reference management circuit 2416 determines the reference return value 2420 by determining information within the document 2406, the data element 2408, and/or within the source data 2410 that is responsive to the user reference selection 2418. Example and non-limiting responsive information includes: an object name value (e.g. a table, table column, table row, graph, chart, sheet, canvas, tag, metadata, and/or any element thereof); a result value (e.g. a summation, a total, and/or a sub-total) from an object (e.g. a chart value, a table value, etc.) or a formula; and/or a significant word return (e.g. a name, a verb, and/or an unusual word determined by any means such as a unique sequence of characters, a frequency of occurrence in a language, a document (including potentially the document 2406), a database, a table, etc.); a term of art; an entity reference (e.g. Wal-Mart, Google, Apple, etc.). Additionally or alternatively, the reference return value 2420 may include ancillary information, and/or options for ancillary information based upon the responsive information. For example, where a document 2406 includes a table having the name "John Smith" therein, an example reference management circuit 2416 responds to a user reference selection 2418 of "##John Sm" (where "##" in the example is an initiating character sequence for a user reference selection 2418) with a table entry for John Smith from the document 2406 (e.g. as a table reference value, a row display from the table, and/or a "card" displaying information about John Smith from the table), a selection of LinkedIn profiles estimated to be the John Smith from the table, a selection of Facebook profiles estimated to be the John Smith from the table, a portion of a text flow within the document 2406 having "John Smith" therein (e.g. a reference to the paragraph, sheet, page, etc.; a predetermined or selected number of words before and/or after; sentence including "John Smith" from the text flow; and/or a grammatically determined phrase including "John Smith" therein). The example is a non-limiting illustration.

In certain embodiments, the user display circuit 2412 determines, in response to the reference return value 2420, one or more of the responsive information elements to provide in a reference return display 2422 to the user 814, for example making them visible in the document view 2414, such as in a preview and/or a list. In certain embodiments, the reference management circuit 2416 selects responsive information most likely to be relevant to the user 814, returns only a most relevant aspect of the reference return value 2420, and/or provides an indication in the reference return value 2420 of the amount, sources, types, or other aspects of potentially responsive information that are available but not included in the reference return value 2420. For example, the reference management circuit 2416 may provide only the table information for John Smith, with an indication that LinkedIn has three (3) potentially relevant profiles, etc. The reference management circuit 2416, in certain embodiments, utilizes contextual information to determine the reference return value 2420 and/or to determine whether and how to display any indications of potential additional responsive information to the user 814. For example, if the user 814 is a human resources representative, the reference management circuit 2416 may prioritize certain responsive information (e.g. reviews, personnel information, profiles, etc.), where if the user 814 is an engineering manager, the reference management circuit 2416 may prioritize a different aspect of responsive information (e.g. projects associated with John Smith, performance data, etc.).

It can be seen that the reference management circuit 2416 can reach any data within the scope of the document 1106, the document element 1108, and/or the source data 2410, to determine where responsive information to the user reference selection 2418 is available. Additionally, the reference management circuit 2416 is not limited to the format or data type of the user reference selection 2418, and is further capable to provide the user 814 with information likely to be relevant, and to provide the user 814 with an easy selection from among disparate data types and sources to immediately reference any aspect of the document 1106, the document element 1108, and/or the source data 2410, without memorizing intricate referencing techniques or intensive coding. Additionally, in response to the reference return display 2422, the user 814 is able to select from a range of return options, such as an entire "card" inserted at the location in the document 2406, an element from the "card" (e.g. just an employee ID #), and similarly can select from any object (e.g. a table, chart, text flow, graph, etc.) either the entire object, a selection from the object, and/or a range of values from the object. Accordingly, a user 814 can conveniently reach all of the information in the system 2400, which could include third-party databases, the internet, company documents, etc., and only needs to remember generally related information to the information the user 814 is seeking. Further, in certain embodiments, the selected aspect of the reference return display 2422 can be brought in as linked information (e.g. it will be updated as the source information changes) and/or as flat data. The user 814 can leave the user reference selection 2418 in the document 1106, and/or copy in the information from the user reference selection 2418 and remove the reference.

While data, text, and other fields explicitly related to the user reference selection 2418 have been described, a user reference selection 2418 can also reach metadata, tags, semantic matches (e.g. "perro" can relate to "dog", and/or "sports" can relate to "football," "baseball," "basketball," etc.), for example with the reference management circuit 2416 utilizing contextual information to determine responsive information. In certain embodiments, the reference management circuit 2416 broadens the view of the user reference selection 2418 based upon the amount of information returned (e.g. a low number of relevant "hits") and/or narrows the view of the user reference selection 2418 (e.g. a high number of relevant "hits"). In certain embodiments, the reference management circuit 2416 determines offset hits from the user reference selection 2418, for example interpreting "teh village" as a request for "the village," "John Smith" to include "Jack Smith," and the like. In certain embodiments, past user 814 behaviors, such as favoring table returns or LinkedIn profiles when utilizing user reference selections 2418, are utilized to determine responsive information and/or prioritize a list order for the reference return display 2422. In certain embodiments, rules from a template document, provided by an administrator, and/or provide by the user 814, are utilized to determine responsive information and/or prioritize a list order for the reference return display 2422. An example user reference selection 2418 includes a website, URL, network location, and/or document name.

An example includes the user reference selection 2418 corresponding to a row in another table within the document 1106. One of the columns in a host table may be selected to show when users reference the row, referenced in the example as the "Display Name" and editable by the user. The default Display Name may be simply the first column in the table. In the canvas or text flow surface, as described herein, users may type '@' anywhere in the document surface (where "@" in the example is an initiating character sequence for a user reference selection 2418), choose a value from their tables which then may display the value they selected. From a user perspective, this allows the user to no longer have to copy and paste values around a document, and ensure they find all instances of the desired change. Continuing the example, a table may have a list of, for example, 100 tasks, and a user may be writing meeting notes in a document during a meeting. For tasks with a lot of detail and/or long titles, instead of copying the value from the table and pasting the long value into the meeting notes, the user may instead type '@' and select the appropriate task (e.g. "Refine metrics"). Continuing the example, after the meeting the user may edit the task table to refine the title of the task to be clearer. Now, because the @Refine Metrics inherits the value from the table, the user's meeting notes may be up to date, in real time, with the newly refined task titles. Additionally or alternatively, a user may set up a notification and/or project values from an reference and/or pointer—for example such that another value is updated automatically, the user gets a notification that the referenced value has changed, or the like. In this way, the user doesn't have to go back and copy the new title from the table and paste it into the meeting notes (and ensure all instances are updated). In another example, and as depicted in FIG. 115, the @[Englewood] reference, as described herein may be used to reference a specific row in a document, including but not limited to a row of text, a row of code, a row of a text entry within a table cell, or some other row reference within a document.

In embodiments, for tables within documents, the user reference selections 2418 may provide a tool to join data across tables. In an example, a user may have two tables, one called Presidential Families and another called Families. The Presidential Families table may contain the first names and birthdays of all presidential family members (Barrack, George, Bill, etc.). The Families table may contain the last names and addresses of Presidential Families. By typing '@Obama' into the row containing 'Barack' in the Presidential Families table, that particular @Obama reference will resolve to 'Obama' and contain a link to the Families table. The two tables may now be implicitly linked to each other. Continuing the example, if the user wants to add the addresses of each family to the Presidential Families table, the user may add a column formula that uses the @Obama the user previously created to point to another value in the Families table In another example, typing the name of an object like "@computer" may allow a user to select from a list of computer types and their corresponding details, images and links to, for example, make a purchase.

Figure 25:
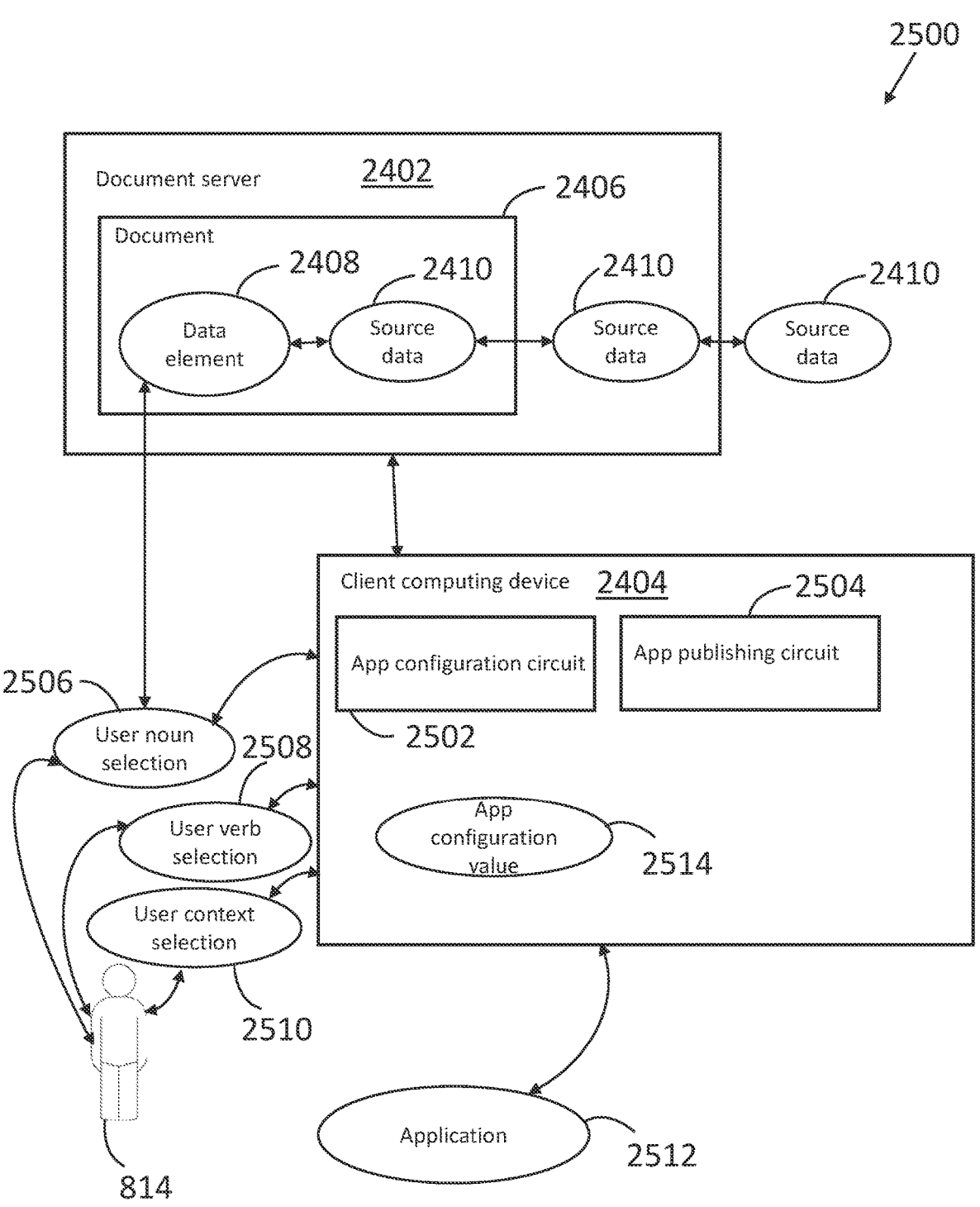
FIG. 25 is schematic depiction of a system for providing an application.

Referencing FIG. 25, a system 2500 includes an application configuration circuit 2502 that interprets a user noun selection 2506, a user verb selection 2508, and a user context selection 2510, and determines an application configuration value 2514 in response to the document 2406, data element 2408, and/or the source data 2410, and further in response to the user noun selection 2506, user verb selection 2508, and/or the user context selection 2510. The description of user 814 interactions with the application configuration circuit 2502 as the user noun selection 2506, user verb selection 2508, and/or the user context selection 2510 provides a convenient context for clarity of description. However, any user 814 inputs consistent with the description herein are contemplated herein, and user 814 interactions with the application configuration circuit 2502 and/or the client computing device 2404 are likewise contemplated herein.

The example user noun selection 2506 includes data from the data element 2408, the document 2406, and/or the source data 2410 for inclusion in, and/or referencing and/or linking with, an application 2512 published by the application publishing circuit 2504. In certain embodiments, included data from the user noun selection 2506 may be included as linked data, flat data (e.g. data physically stored as application data), referenced data, and/or values calculated from, determined from, and/or visualizations of (e.g. in accordance with any VE 1116—see the description referencing FIGS. 11-23) any such data. For example, a user 814 may direct that a prose description from the document 2406 is utilized in the user noun selection 2506, and such prose description may be utilized directly in the application 2512, a bulleted list from the prose description (e.g. as a VE 1116) may be utilized in the application 2512, and/or information determined in response to the prose description and/or a bulleted list may be utilized in the application 2512. For example, and without limitation, a prose description may include a repair sequence for a device (e.g. changing the alternator in a car), and the user 814 may indicate the prose description with the repair sequence in the user noun selection 2506. An example application configuration circuit 2502 includes determining a VE 1116 with a list of parts for the repair, and information included in the application 2512 includes a "card" with a list of parts and nearby stores (e.g. referenced in the source data 2410) based on the application user's location where the parts can be purchased. An example includes a "card" for each store, for example sorted by the lowest cost, least number of stops required to get all of the parts, or other selected criteria by the user 814 or the application user (not shown).

The example system 2500 further includes a user verb selection 2508. In the example, the user verb selection 2508 includes operations defined to be available to the application 2512 and/or the application user. For example, the user verb selection 2508 may define which databases from the document 2406, the data element 2408, and/or the source data 2410 should be utilized by the application 2512. Additionally or alternatively, the user verb selection 2508 defines access for the application user, such as read, write, and/or output access to data available to the application 2512. In certain embodiments, data in the application 2512 may be linked to the data element 2408, the document 2406, and/or the source data 2410, for example providing live updates (or selective updates) to data in the application 2512. Additionally or alternatively, the user verb selection 2508 may allow for updates to the data to be written back from the application 2512—for example allowing the application user to change certain data and send the updates back to the data element 2408, the document 2406, and/or the source data 2410. An example includes a field sales document 2406, wherein the application user enters sales data which is reflected in the document 2406 after entry by the application user. In certain embodiments, the user 814 provides the user noun selection 2506, and may further provide user context selection 2510 such as the target application user for the application 2512, and the application configuration circuit 2502 suggests appropriate values for the user verb selection 2508 in response to the user noun selection 2506 and/or the user context selection 2510. An example application configuration circuit 2502 provides a selection of values for the user verb selection 2508 in response to rules regarding the target application user, user verb selection 2508 values that have been utilized by previous users 814, and/or values from a table in the document 2406 or elsewhere in the system 2500 defining suggested user verb selections 2508 associated with various user context selections 2510 and/or data associated with the user noun selection 2506.

In certain embodiments, the user context selection 2510 includes information that is not within the document 2406, the data element 2608, and/or source data 2410, such as header information for the application, display screens, user agreements, and/or any other data that the user 814 wants to make available in the application but is not present within the document 2406, the data element 2608, and/or source data 2410. Additionally or alternatively, the user context selection 2510 can include information about the application 2512 or application user that the user 814 wants considered during the operations of the application 2512, such as but not limited to the location of the application user, the demographics of the application user, the jurisdiction where the application user is located, and the like. Additionally or alternatively, the user context selection 2510 can include information such as the target operating systems and/or devices for the application 2512 (e.g. Android, Apple OS, and/or Windows).

The example application configuration circuit 2502 determines an application configuration value 2514 in response to the document 2406, data element 2408, and/or the source data 2410, and further in response to the user noun selection 2506, user verb selection 2508, and/or the user context selection 2510. For example, the application configuration circuit 2502 determines what programmatic elements (e.g. SQL and/or javascript) need to be prepared to implement the application 2512, which data elements need to be included in the application data and/or available for access in real time, and further determines the response of the application 2512 to anomalies—for example the response of the application 2512 to linked data fields where communication from a device operating the application 2512 may not be available.

An example system 2500 includes an application publishing circuit 2504 that publishes the application 2512 in response to the application configuration value 2514. An example application publishing circuit 2504 prepares the application file for upload to the appropriate system (e.g. the Apple Store, to a proprietary server for in-house devices or applications as a specific service, etc.). The application configuration circuit 2502 prepares the application executing code, utilizing either pseudo-code operational descriptions generated by the application configuration circuit 2502 and/or incorporating actual code generated by the application configuration circuit 2502. The application configuration circuit 2502 prepares the application 2512 for operation with the target operating system(s), and uploads the application 2512 for later download and use by a device operating the application 2512.

It can be seen that the system 2500 provides for a highly configurable application 2512 leveraging the data, visualization, and referencing capabilities of various system disclosed herein working with a document 2406, a data element 2408, and/or source data 2410. The system 2500 provides for an application 2512 that can be easily configured to work with a document 2406, and/or to provide a useful function to an application user leveraging easy access to the document 2406, the data element 2408, and/or the source data 2410. The user 814 can configure the application 2512 to have live data available as the document 2406, data element 2408, and/or source data 2410 are updated, to require that updates require a new version of the application 2512, and/or combinations of these for varying data elements of the user noun selection 2506. The highly capable and flexible application 2512 from the system 2500 does not require that a user 814 have a sophisticated understanding of database interactions, and can readily work with a flexible document surface without regard to linking different document application types to develop data interaction capabilities. Additionally or alternatively, any controls, visualizations, continuous selections, and/or discrete selections (e.g. see the description referencing FIGS. 11-23) described herein are readily incorporated, and/or modified for inclusion, into an application 2512. In certain embodiments, a target application user may include the user 814, and/or other persons directly interacting with the document 2406 through a client computing device 2404, to readily create a thin client application to provide for remote, controlled, or easy access to the document 2406 and/or selected portions of the document 2406 for editing, reading, publishing, keeping updated on changes to the selected portions, and the like.

An example application 2512 includes a user verb selection 2508 that allows the application user to publish the document 2406 and/or portions thereof as a web page. In certain embodiments, the application 2512 allows the application user to create, request, or receive a permanent URL for the web page. In certain embodiments, a document 2406 and/or portions thereof are published directly to a web page without the use of an application 2512. In certain embodiments, the selected portions of the document 2406 are visible in the application 2512 and/or on the web page, without the editing or interacting features of systems in the present disclosure, and without seeing the construction elements of the document 2406 such as settings for controls, continuous selections, discrete selections, and/or object names or references. An example application 2512 includes an export of recipes from a document 2406, and new visitors can treat it as an application for navigating a recipe book and/or adding their own recipes. In certain embodiments, recipes added by application users are captured in the document 2406, which may be in a separate location from originally published recipes, or in any other location specified by the user 814, such as with the user verb selection 2508. Example and non-limiting embodiments include the document 2406 and/or selected portions thereof published as a document (e.g., as the application 2512) that is operable on a television, such as a smart television, a streaming device, such as Apple TV, a smart watch, and/or a tablet, with configurable access to the document 2406 and/or read-only access to the published portions of the document 2406.

In certain embodiments, the system 2500 provides capability to publish an application 2512 that provides an application user with access to the document 2406 and/or selected portions of the document 2406. The example published application 2512 is a self-contained version of the document, including any or all of the content and/or data in the document 2406. An example published application 2512 is operable "offline" (e.g., without communication access to the document server 2402, and/or with intermittent access to the document server 2402). An example published application 2512 is configured for selected performance on target devices for the application 2512, for example to limit resource utilization (e.g., memory usage, processor usage, and/or communication bandwidth) where target device resources are limited (e.g., a smart phone, tablet, smart device, and/or other "thin client" device). An example includes determining a target device resource value, such as: memory (such as RAM, storage, external storage, etc.), processing power (such processing speed, cores, available threading, etc.), and/or communication capability (such as bandwidth, speed, latency, availability, etc.). The determination of the target device resource value includes detecting resources on an actual device, entry of resource specifications by the user, data lookup of resource information for specified devices, a device type (e.g., a mobile phone and/or tablet), and/or utilizing a technical profile or requirements information to determine device resource levels to be supported by the application 2512.

Operations to determine the application configuration value 2514, and accordingly modulate resource utilization of the application 2512, include at least: inclusion of only a portion of data in the document 2406 and/or a portion of the document 2406; inclusion of flat for one or more data elements in the document 2406 (e.g., replacing referenced or linked data with flat data; replacing calculated values and/or formulas with result data having calculations pre-completed; reducing one or more configurable/selectable aspects of the document 2406 with fixed values and/or values having a limited selection set; adjusting an update rate of linked or referenced data; adjusting an update rate of calculated values and/or formulas; and/or adjusting a resolution of images, charts, graphs, and/or other visualization elements in the document 2406). The term "flat data" includes data stored in-line in the application 2512 and/or on device storage of the target application device, that is not linked (e.g. dependent upon a parent or source data set) or referenced (e.g. calculated at run-time, and/or looked up from another location in the document and/or source data). In certain embodiments, the application 2512 includes a self-contained format which is executable on a target operating system and/or which is executable in a target operating environment (e.g. an .exe file, an archive file instead of referenced or linked data, calculated values.

Figure 8:
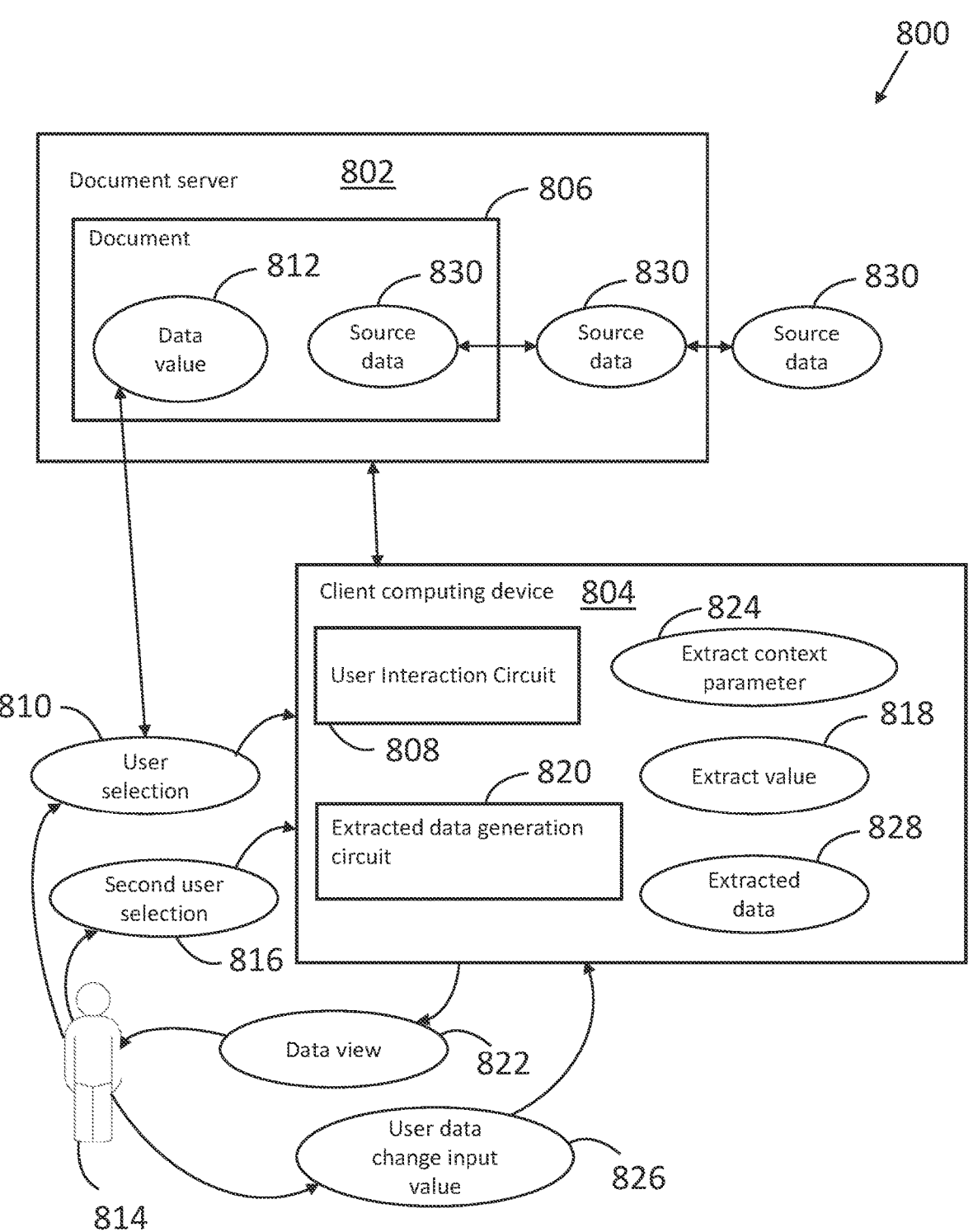
FIG. 8 is a schematic depiction of a system for providing a data view.

Referencing FIG. 8, an example system 800 includes a document server 802 communicatively coupled to a client computing device 804. Certain further aspects of the example document server 802 and/or the client computing device 804 are described following in the disclosure referencing FIG. 9.

An example system 800 includes the document server 802 that communicates at least a portion of a document 806 to the client computing device 804. A document 806, as used herein, references a collection of data related together for purposes of display, reading, editing, viewing, playback, printing, organizing, collaborating, and/or communicating with the related collection of data. In certain embodiments, a document may reference the data as displayed (e.g. a view of the collection of data related that is presentable to a user on a screen, printed page, and/or any other type of user-focused realization of the related collection of data or a portion thereof), as stored in non-transient memory, a collection of operations which, if executed, render a display consistent with the document, portions of a larger related collection of data present on a given device (e.g. a parent document on a server, where a portion of the parent document present on a client computing device is the "document") and/or other similar constructions or organizations of data and information. A document or portions thereof may be present in multiple locations.

The example system 800 includes a client computing device 804 having a number of circuits constructed to functionally perform operations of the client computing device 804. An example client computing device 804 includes a user interaction circuit 808 that interprets a user selection 810, where the user selection 810 includes at least one data value 812, where the document 806 includes the data value(s) 812. The client computing device 804 may include one or more computers, but the present disclosure contemplates the computing device as component or group of components that perform the functions of the client computing device 804. Example and non-limiting structures to perform operations of the client computing device 804, including structures of any associated circuits, include one or more user input devices (e.g. mouse, keyboard, touch screen, audio input) and/or communications received from one or more user input devices, storage and/or access to at least a portion of the document 806 (e.g. a displayed portion to the user 814, a stored aspect of the document 806 in a memory location and/or access to a stored aspect of the document 806 through a communication network), processors for executing instructions stored in a non-transient memory location, memory devices storing the document 806, portions of the document 806, and/or the instructions, a display device, a network infrastructure, a cloud storage and/or computing infrastructure, and/or communications to a display device where the display device is responsive to the communications and displays selected portions of the document 806, interface components (e.g. a graphical-user interface, menus, commands, and selections) which may be graphical or hardware-based.

In certain embodiments, a document server 802 may not be present, and/or the document server 802 or portions thereof may be present on a same hardware device as the client computing device 804 and/or portions of the client computing device 804. The user 814 may interact directly with the client computing device 804, and/or may be in communication with the client computing device 804.

Example and non-limiting user selections 810 include one or more of: a user-entered keyword, at least one data value selected by the user 814, a tag value selected by the user 814 (e.g. a style tag or an arbitrary tag), and/or determining a selected range value in response to the user selection 810. Certain non-limiting examples of user selections 810 are illustrated, but the user selection 810 should be understood broadly to include any operation by the user 814 to indicate source data 830, contextual information, information of interest, and/or any other type of information indicating a type of data the user 814 is selecting for extraction of related, re-organized, and/or structured data. An example user selection 810 includes the entry of a word—for example "quarterly", "cost", "available", "measure", any other type of information, including arbitrary character strings, and/or wild cards. An example user selection 810 includes a tag value selected and/or entered by the user 814—for example a value that indicates information with appropriate related headings, metadata, column titles, row titles, or other information indicated by a tag. In certain embodiments, a tag indicates portions of a document automatically tagged by the application as a document is prepared, such as paragraph types, tables, figures, graphs, referenced information, linked information, and/or data types. In certain embodiments, a tag indicates portions of a document tagged by a user 814, either manually, as part of user defined rules, and/or as part of a user defined template. An example user selection 810 of a user defined template. An example user selection 810 includes at least one data value selected by the user 814, such as a selected word or range of words, a heading, a specific data value (e.g. a name, word, number, or object), a selected range of data (e.g. a table, a column, row, and/or element of a figure such as a bar, pie slice, and/or data series). In certain embodiments, the user selects a value and the user interaction circuit 808 determines the user selection 810 based on the user selected value. For example, a user 814 may select only a portion of a value, or related value, and the user interaction circuit 808 determines a user selection 810 based on the portion or related value. In certain embodiments, the user selects a linked data value (e.g. underlying source data 830 is in a different document (on the document server 802, the client computing device 804, or elsewhere), a portion of the document not present on the client computing device 804, and/or externally sourced data such as from a website, database, and/or cloud storage). In certain embodiments, the user selects a data reference value, such as a value where the underlying source data 830 is present elsewhere (in the document or otherwise), and is not locally stored, or is only stored for responsiveness purposes but the source location is considered the originator of the data (at least for the purposes of the data reference value— the source location may be another reference). In certain embodiments, the user selects a data record, for example an entire file or set of data that is referenced only by title, identifier, and/or unique key.

In certain embodiments, the user interaction circuit 808 determines the user selection 810 from the user selected value using such operations as, without limitation: using an entire word where the user has selected only a portion of the word; selecting an entire table, row, or column where the user 814 has selected only a portion of the table, row, or column; selecting an entire document section (e.g. a paragraph, a tagged region, related tables, figures, or other data) where the user 814 has selected only a portion of the document section; selecting related data where the context indicates the related data is likely to be desired (e.g. the user 814 selects an aggregated data value and the user interaction circuit 808 selects additionally or alternatively the underlying data forming the aggregated value); selecting additional or alternative data according to rules specified by the user 814 (e.g. always take a whole table, take only the columns from cells selected, and/or always get referenced data as well); selecting additional or alternative data according to rules specified by a document template (e.g. a "quarterly reports" document template has one set of selection rules, a "personnel file" document template has a different set of rules, and a "recruit candidate" document template has another set of rules); selecting additional or alternative data according to device resources associated with the user 814 (e.g. user 814 has limited local memory, limited network access, and/or limited processing power, and making appropriate selection decisions to conserve the appropriate resources); selecting additional or alternative data according to rules defined by an administrator; selecting additional or alternative data according to rules defined by a document creator, and/or selecting additional or alternative data according to past operations by the user 814 (e.g. user 814 has always added certain types of data to an extract operation after selecting similar data previously, user 814 has been operating in a selected portion of the document indicating the type of information likely to be of interest to the user, and/or the user 814 has removed certain types of data from an extract operation after selecting similar data previously).

In certain embodiments, the user interaction circuit 808 provides the data value of the user selection 810 as an inferred data value. Example and non-limiting operations to provide the data value of the user selection 810 as an inferred value include: determining the inferred data value in response to: a document type value (e.g. report, draft, publication, personnel file, white paper); determining the inferred data value in response to a document location value (e.g. on the document server 802, on the client computing device 804, in a cloud storage (not shown), or over a mobile network); determining the inferred data value in response to a predefined data association value such as a template data association value or a user selected data association value; determining the inferred data value in response to a prior user operation; prompting a user with a number of data association values (an example implementing GUI may include such prompts as: "Did you mean to select: 1 [KEEP MY SELECTION]; 2 [TABLE A]; 3 [COLUMN B]; 4 [DOCUMENT SECTION C]; 5 [PARAGRAPH D]; 6 [STYLE TYPE E]; OR 7 [OTHER]), and determining the inferred data value according to the prompt response; and/or determining the inferred data value in response to a priority value associated with each of a number of related data values, for example the current context such as date, network responsiveness, user role or title, user history, etc., indicates that monthly revenue is higher priority than quarterly revenue when the aggregated annual revenue value is selected by the user 814 for extract operations.

The example client computing device 804 further includes the user interaction circuit 808 interpreting a second user selection 816 including an extract value 818. Example and non-limiting extract values 818 include a document extract location value (e.g. a position in the document 806 to place the extracted data 828 from extract operations), and/or an extracted data 828 type value (e.g. provide extracted data 828 as a table, figure, bulleted list, aggregated data (e.g. a pivot table), a formatted display of extracted data 828, and/or a list of extracted data 828. In certain embodiments, the user interaction circuit 808 determines the extract value 818 in response to the context of user operations (including at least any context descriptions provided throughout the present disclosure), in response to a user input (including a prompted user input), in response to rules (e.g. user entered, template based, document creator based, and/or administrator entered), in response to a type of the selected data from the user selection 810, and/or in response to historical operations of the user or other users on the document. In certain embodiments, the extract value 818 includes a location to place extracted data 828, a type of data display for the extracted data 828, a status of the extracted data 828 after extraction (e.g. linked data, referenced data, and/or flat data), and/or a formatting of the extracted data 828 for display. An example system 800 includes the user interaction circuit 808 utilizing or confirming (e.g. via a prompt to the user 814) that a current editing location within the document 806 (e.g. a cursor location) is the document extract location value, and/or otherwise allowing the user 814 to enter an extract location value via one or more second user selections 816, and determining the portions of the extract value 818 indicating the type of extracted data, and/or the formatting and display parameters of the extracted data, through any of the operations described herein, and/or through one or more prompts to the user 814, whereby the user 814 provides one or more second user selections 816 to facilitate a data extraction with the desired parameters.

In certain embodiments, the client computing device 804 includes an extracted data generation circuit 820 that creates a data view 822 in response to the user selection 810 and/or the extract value 818, for example pulling referenced or linked data, sorting through the user selection 810 for intended data (e.g. ignoring null values, calculating or updating values, indexing or sorting data, and/or pulling relevant data from an entire selection of data such as keywords, keywords with associated data, and/or specific data columns). In certain embodiments, extracted data 828 is pulled, at least in part, from source data 830. The example system 800 includes source data 830 positioned within the document 806 (e.g. within the document but not within the data value 812), positioned on the document server 802 but outside the document 806, and/or external to the document server 802—for example data provided by a third party access such as an API interfacing with an external data source (not shown), data stored on another client computing device (not shown), and/or data stored on a network and/or cloud server. In certain embodiments, all of the data in the extracted data 828 is within the data value 812. Any portion, all, or none of the extracted data 828 may be taken from source data 830, positioned anywhere with communication to the client computing device 804.

In certain embodiments, the data view 822 includes all of the data contemplated for the extracted data 828, and is positioned at the specified location. In certain embodiments, the data view 822 includes relevant portions of the extracted data 828 for display to the user 814, where other portions of the extracted data 828 are prepared in the data view 822 when accessed by the user 814, over time to limit resource consumption (e.g. over a slow network), and/or in display portions to enable limiting utilization of resources (e.g. memory). Example and non-limiting operations of the extracted data generation circuit 820 include creating a table of extracted data 828, creating a formatted display of extracted data 828, creating a structured data view of extracted data 828, creating an aggregated view of extracted data 828, and/or creating a list of extracted data 828. In certain embodiments, the source data 830 is unstructured data. Unstructured data, as used herein, should be understood broadly, and includes any data that is not structured according to the data view 822, that is not sorted, indexed, and/or aggregated, that is not structured for an intended purpose of the user 814, and/or that is structured for a different purpose than that of the user 814 or for the data view 822. It can be seen that a given element of data may be structured for one purpose, but unstructured for a different purpose. It can be further seen that a given element of data may be unstructured, and after operations of the extracted data generation circuit 820 the element of data may be structured (e.g. confirmed that it is configured for the intended purpose and/or according to the data view 822), even if no alteration (including formatting, presentation to a display, sort order, indexing, and/or aggregating) occurs to the data in the process of making the data structured.

Non-limiting examples of the extracted data generation circuit 820 creating a structured data view of extracted data 828 include: compiling relevant elements of a prose description into a structured view (e.g. pulling ingredients from a description for a recipe or shopping list), changing a data structure from data structured for one purpose to data structured for a different purpose (e.g. pulling resume information into a personnel file template; pulling web based information into a structured template; pulling information from an annual report into a table of relevant financial information; reconfiguring table columns into a desired format including re-ordering and/or removing columns; restructuring a bulleted list of information into a table based format; summarizing and/or aggregating granular data into selected categories; combinations of these; and/or reversals of these). In certain embodiments, extracted data 828 includes data that corresponds to the user selection 810, linked data that is determined (e.g. looked up, referenced, and/or imported) in response to the user selection 810, and/or referenced data that is determined in response to the user selection 810. In certain embodiments, the extracted data generation circuit 820 additionally and/or alternatively determines an extraction context parameter 824, and creates the data view 822 further in response to the extraction context parameter 824. Non-limiting examples of determining the extraction context parameter 824 include: interpreting a user interaction history with the document (e.g. the user has expressed interest in revenues, old records, personnel information, events occurring on Tuesdays, certain data types within the document, and/or certain sections of the document); interpreting a user context selection (e.g. the user has indicated financial reports are due, the user is using a limited resource device, the user has indicated an access time limit for the document, an access time limit for the document is apparent from the system 800 status, other users are accessing portions of the document, and/or a regulatory deadline of a specific type is approaching); determining the extraction context parameter in response to a document type value, a document location value, a prior user operation, a template data association value (e.g. the template indicates certain data types are associated), and/or a user selected data association value (e.g. the user indicates, potentially in response to a prompt, that certain data types are associated).

An example user interaction circuit 808 interprets a user data change input value 826. An example user data change input value 826 includes a change to the displayed portion of the data view (e.g. the user enters data, requests a search, and/or performs another interaction with the document). The example user interaction circuit 808 updates a source data 830 including the data value from the user selection 810 in response to the user data change input value 826. For example, the extracted data 828 may be linked or referenced data, where the source data 830 is located elsewhere in the document 806, on the document server 802, in a cloud or networked storage location, and/or includes external data such as a database and/or website. Previously known systems prevent linked, referenced, or other non-sourced data from updating the underlying source data 830. Previously known operations include blocking changes to linked data, breaking the link upon editing linked data, or providing a warning to a user that the linked data is not editable. In certain embodiments, the user interaction circuit 808 updates the source data 830 in response to an update of the linked data, and/or updates the source data 830 without breaking the link. In certain embodiments, the user interaction circuit 808 updates the source data 830 in response to a type of the data (e.g. blocking changes to certain data such as a personnel related data field), in response to an authorization level, title, and/or role of the user 814, in response to a location of the source data 830 (e.g. allowing updates within the document 806 but not externally), in response to a protected status of the source data 830 (which may be user-selectable or not, and may be local to the user 814 or global to the document 806), in response to a conflict resolution with other users of the document (e.g. reference operations of the system 100 disclosed referencing FIGS. 1-7), and/or according to any other data management principles implemented by the system 800.

In certain embodiments, multiple rules are present for determining the data value 812 from the user selection 810, for determining the extraction value 818, and/or for determining the extract context parameter 824. An example system 800 includes applying all mutually compatible rules, applying the rules in a manner where the greatest number of rules can be applied and excluding the least number of rules, applying the rules in a priority determined by the rule maker (e.g. title or role, current user v. a past user, and/or administrator status), and/or applying the rules in manner determined by the type of information (e.g. rules for human resources, personnel, legal, and/or inclusion of personally identifiable information or health information may get priority). Any other rule conflict management scheme understood in the art is contemplated herein.

Referencing FIG. 9, a schematic illustration 900 of an example data view 822 created in response to a user selection 810 is depicted. The illustration 900 includes a document 806 having a prose recipe description 902 (e.g. a paragraph form description of a recipe for making a food item) and an event guest list. The event guest list is depicted as source data 830 in the illustration 900—for example the event guest list may be present in one portion of the document 806, and the prose recipe description 902 present in another portion of the document 806. The illustration 900 depicts a data value 812—for example portions of the prose recipe description 902 and event guest list selected according to a user selection 810. In the example, the data value 812 is a partial selection of each of the prose recipe description 902 and the event guest list to illustrate certain aspects of the present disclosure, however the data value 812 may fully include one or more of the prose recipe description 902 and the event guest list, and/or the prose recipe description 902 and the event guest list may be indicated in a manner other than as illustrated. The illustration 900 further includes a user schedule, depicted as source data 830 that is present on the document server 802 but not within the document 806, although accessed source data 830 may be located anywhere that is operationally accessible to the client computing device 804 as described herein. The illustration 900 further depicts store information ("Store inventories, hours, prices, locations"), depicted as external source data 830 relative to the document server 802. In the illustration 900, the client computing device 804 (not shown), through operations such as those described with reference to the system 800, has created a data view 822 in response to the user selection 810 (realized as the data value 812). The client computing device 804 has further determined a recipe table (e.g. a list of cooking operations determined from the prose recipe description 902, and/or cooking parameters such as times, temperatures, and ingredients) and a shopping logistics (e.g. times to shop at which stores, and the ingredients list to be purchased). It will be recognized that the illustration 900 depicts the data view 822 showing structured data in a manner uniquely useful to the user 814. In the illustration 900, the system 800 brings together the user schedule, event information, and planned food items together with external data such as store inventories, hours, and locations, and presented the data for the user to obtain the items needed for the event, to prepare the food items, and to integrate shopping with the schedule of the user. In certain embodiments, the user 814 may have entered a selection— for example "plan an event"—that enabled the client computing device 804 to determine that selection of a portion of the prose recipe description 902 was intended to bring the entire prose recipe description 902 into consideration for generating the data view 822. In certain embodiments, the context of the extraction operations in the illustration 900 further enabled the client computing device 804 to reach out to the user schedule and/or store information, even where such data is not present in or explicitly referenced in the document 806. In certain embodiments, the client computing device 804 may output the data view 822 in a manner accessible to the user 814, and/or may add the data view 822 to the document 806. In certain embodiments, the client computing device 804 adds the data view 822 to the document 806, creates a separate document (not shown) that includes the data view 822, and/or provides the data view as a tooltip (e.g. the user 814 hovers over a document 806 portion in a given context, and the client computing device 804 generates a data view 822 for temporary display, and/or allows the user 814 to confirm and generate the data view 822 into a new document or incorporate the data view 822 into a currently existing document 806.

Operations such as performed by the system 800 and depicted in the illustration 900 allow for rapid and convenient generation of user-oriented data extraction. Example and non-limiting applications include generation of a business card or profile document that pulls information from a number of data sources into a convenient and selected data display template, that rapidly creates structured information from a user 814 based on source data 830 and/or document elements that are unstructured and/or not structured for the purpose desired by the user 814, and allows the user 814 to update source data 830 using the structured data in the data view 822 directly, without having to go to the source data 830. The user 814 is thereby able to consider data in a selected context, avoid the specific formatting and input nuances of the source data 830, and have rapidly usable output for a selected purpose.

Non-limiting examples of a data view 822 include a structured representation of data, selected data fields, template form titles (e.g. table row and/or column titles, field names, category titles, boilerplate information, company or entity names, copyright notices, confidentiality notices, and the like), and/or information developed from data in an aggregated, filtered, sorted, parsed, and/or other processed format. Example and non-limiting operations of an extracted data generation circuit 820 to provide a data view 822 include providing a pop-up separate view of the data view 822, a downloadable separate view of the data view 822, a tool tip data view 822 that appears in response to a user indication of a value of the document 806 (e.g. highlighting, selecting, or hovering a selection cursor on and/or over a name, word, term, date, data field), where the tool tip data view 822 includes a structured data view 822 such as a "card" having contextual information about the user indicated value. As used herein, a card includes, without limitation, a discrete display of data elements, which may be provided within a box or bounded shape, and/or which may be provided within a data view 822 having an area configured for display in response to a selected size and/or shape, and/or in response to a user screen size for the client computing device 804, and/or another device used by the user to access the data view 822 (e.g. a tablet, smart phone, laptop, desktop, and/or a smart device having access to the client computing device 804, the document server 802, and/or a publication area for the card such as a website and/or network location, and/or having an application 2512 published by the application publishing circuit 2504 (see, e.g. disclosure referencing FIG. 25). In certain embodiments, the card is configured to fit on the user screen. In certain embodiments, the card is configured to fit within a narrower dimension of the user screen (e.g. a mobile device in a "portrait" orientation). An example card includes thereupon one or more data fields and/or VE 1116, such as a table, graph, chart, and/or image. In certain embodiments, the parameters displayed include a data group structured to convey the theme of information for the card, including without limitation information about a person, an entity, a project or task, a recipe, one or more elements of a row on a table, one or more elements of a chart, and/or one or more elements of a graph. A card may include titles, logos, disclaimers, data source information, contact information, and/or any other selected information. The described examples for a card are non-limiting illustrative examples.

In certain embodiments, the extracted data generation circuit 820 accesses contextual information (e.g. location in the document 806 that user is working with; rules set by the user, a document template, and/or an administrator; a current time of day and/or calendar date; recent operations performed by the user; a user role, title, or user-indicated information about the user; the type of data within the user indicated value; and/or a section or section type of the document 806 within with the user is working). Example and non-limiting data views 822 may include live data (e.g. data updated in real-time and/or with a short refresh period), linked data (e.g. links or references to other data, which may be updated periodically, based on system performance, and/or upon user request), flat data (e.g. data copied into the data view 822 at generation time which is not linked to the originating data), and/or may include indications of the status of the data (age, refresh time, live, etc.). In certain embodiments, the data view 822 may be provided as an addition to the document 806—for example a first table column includes a data field (e.g. a name, job title, project name, project status, etc.) and a second table column is populated with the data view 822 including structured data relative to the first table column. Additionally or alternatively, the data view 822 including the structured representation of data may be volatile (e.g. it disappears when the user changes the focus), provided in a non-volatile manner separate from the document 806, generated into a new section of the document 806, and/or the user may receive a prompt to specify an action to be performed with the structured representation of data (e.g. copy to a clipboard, paste in an e-mail, save to a file, and/or place it in the document 806).

A number of procedures for performing certain operations to extract data from a document are described following. Operations are illustrative and non-limiting, and may be re-ordered, divided, and/or combined in any manner to perform similar functions, as will be understood to one of skill in the art having the benefit of the disclosures herein. In certain embodiments, one or more operations may be performed by components of a system such as the system 800.

Figure 10:
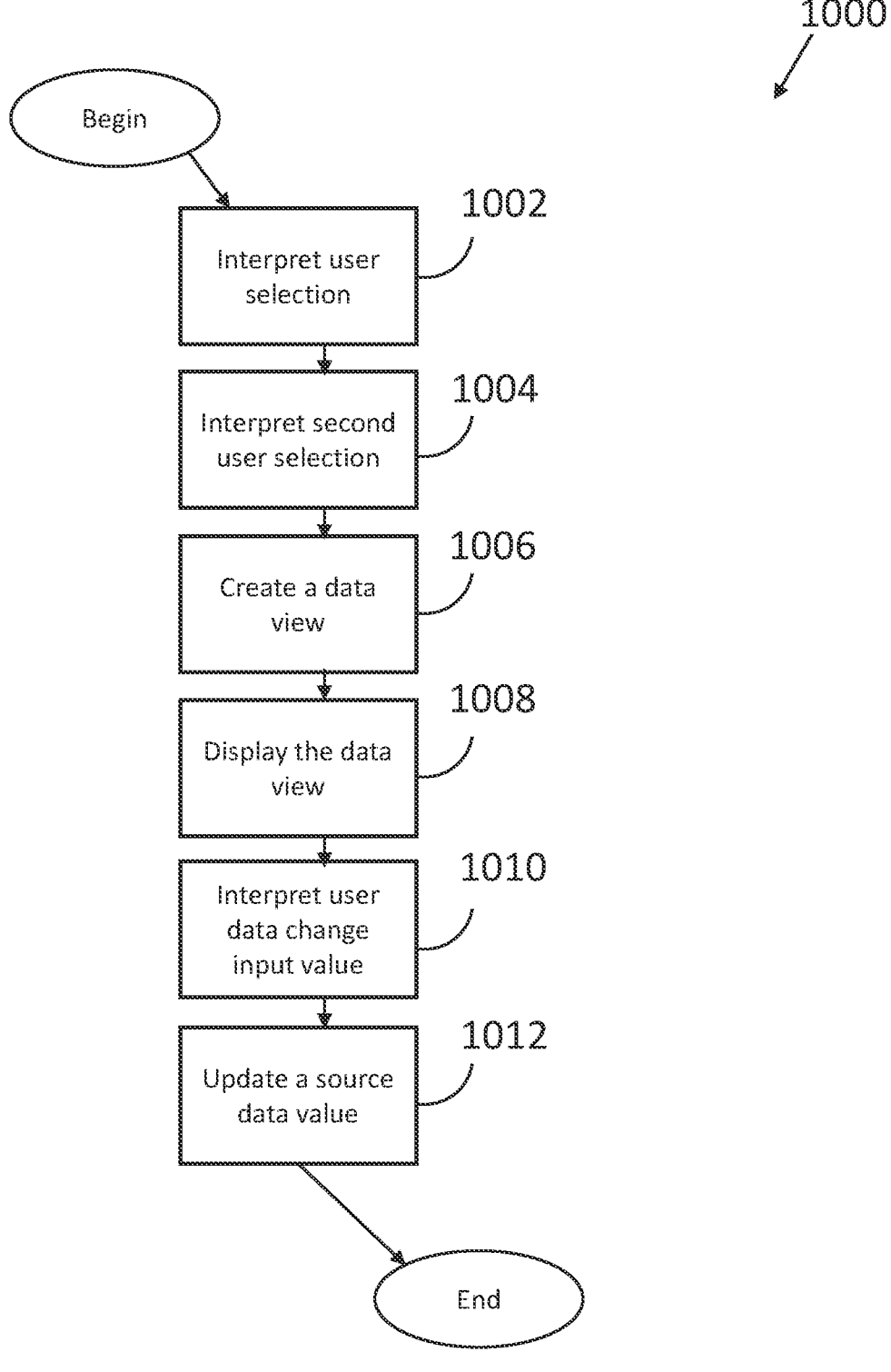
FIG. 10 is a schematic flow diagram of a procedure for updating a source data value.

Referencing FIG. 10, an example procedure 1000 includes an operation 1002 to interpret a user selection including at least one data value, an operation 1004 to interpret a second user selection including an extract value, and an operation 1006 to create a data view in response to the user selection. The example procedure 1000 further includes an operation 1008 to display at least a portion of the data view in response to the extract value. In certain embodiments the procedure 1000 includes performing the operation 1002 by receiving a user-entered keyword, determining a data value selected by the user, determining a tag value selected by the user, and/or determining a selected range value in response to the user selection. Example and non-limiting data values include a table column, a table row, a style tag, an arbitrary tag (e.g. an identifier for a data selection within the document, with or without an inherent meaning to the identifier), a linked data value, a data reference value, and/or a data record.

In certain embodiments, the data value includes an inferred data value, and the operation 1002 further includes determining the inferred data value. Example and non-limiting operations to determine the inferred data value include determining the inferred data value in response to a document type value, determining the inferred data value in response to a document location value, determining the inferred data value in response to a predefined data association value, determining the inferred data value in response to a prior user operation, determining the inferred data value in response to a user selected data association value and/or a default data association value, and/or determining the inferred data value in response to a priority value associated with each one of a number of related data values. An example operation 1002 further includes determining the inferred data value in response to a predefined association value, and determining the predefined association value in response to a template data association value and/or a user selected data association value. An example operation 1002 further includes prompting a user with a number of data association values, and determining the inferred data value in response to the user selected association value and/or a default data association value.

An example procedure 1000 further includes the operation 1004 further including determining a document extract location value and/or an extracted data type value. An example procedure 1000 further includes the operation 1006 including an operation such as: creating a table of extracted data, creating a formatted display of extracted data, creating a structured data view of extracted data, creating an aggregated data view of extracted data, and/or creating a list of extracted data. In certain further embodiments, the extracted data includes data corresponding to the user selection, linked data determined in response to the user selection, referenced data determined in response to the user selection, and/or portions thereof. In certain embodiments, the operation 1006 further includes creating the data view by determining the portion of the data corresponding to the user selection, linked data determined in response to the user selection, referenced data determined in response to the user selection further in response to an extraction context parameter. An example procedure 1000 further includes the operation 1006 further including determining the extraction context parameter by performing at least one operation such as: interpreting a user interaction history with a document, interpreting a user context selection, determining the extraction context parameter in response to a document type value, a document location value, and/or a prior user operation, and/or determining the extraction context parameter in response to a template data association value and/or a user selected data association value. An example procedure 1000 further includes the operation 1006 further including prompting a user with a number of extraction context parameter values, and determining the extraction context parameter in response to a user selected extraction context parameter value and/or a default extraction context parameter value. An example procedure 1000 further includes the operation 1006 further including determining the extraction context parameter value in response to the second user selection.

The example procedure 1000 further includes an operation 1010 to interpret a user data change input value, where the user data change input value includes a change to the displayed portion of the data view. The example procedure 1000 further includes an operation 1012 to update a source data including the data value, where the updating is in response to the user data change input value. An example procedure 1000 further includes the created data view being a structured data view, and/or the source data being unstructured data.

Figure 1:
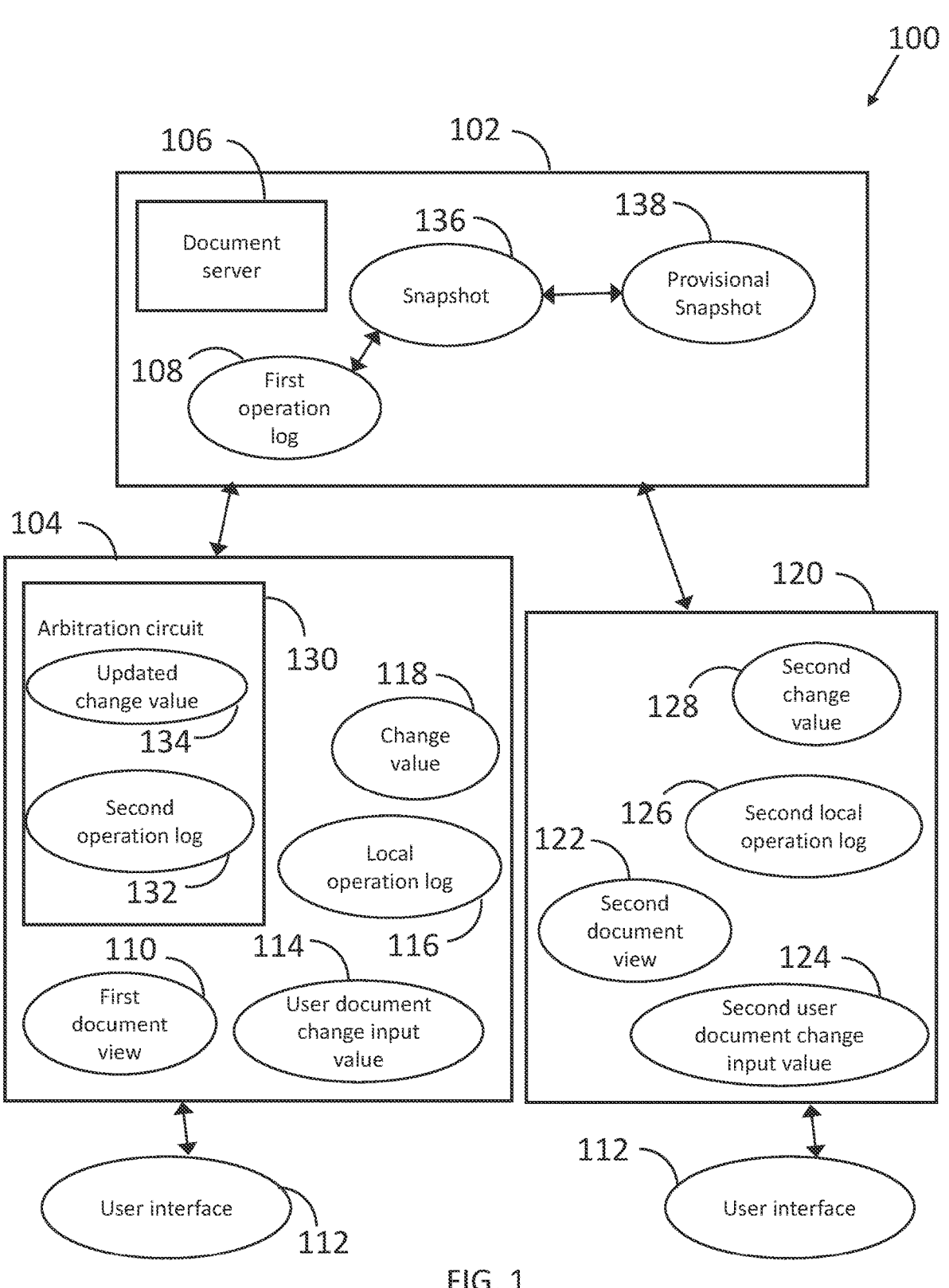
FIG. 1 is a schematic depiction of a system for working with an operation log.

Referencing FIG. 1, an example system 100 includes a first computing device 102 communicatively coupled to a second computing device 104.

The example system 100 includes the first computing device 102 including a document server 106 that communicates a first operation log 108 to the second computing device 104, where the first operation log 108 includes one or more sequential operations defining operations to create a first document. For example, and without limitation, the first operation log 108 includes instructions such as inserting text into a document, formatting one or more aspects of the document, adding breaks to the document, and referencing data external to the document or related to other portions of the document. The first operation log 108 includes sequential operations such that, if the sequential operations are executed, the first document would be created. In certain embodiments, the first computing device 102 communicates the first operation log 108 to the second computing device 104 by communicating a relevant or selected portion of the first operation log 108 to the second computing device 104. For example, the first computing device 102 may communicate only portions of the first operation log 108 that affect pages 1-10 of a document, where a user associated with the second computing device 104 has communicated that only pages 1-10 are requested. Any other operations to select portions of interest of a document, relevant subject matter within a document, or the like, and to thereby communicate relevant portions of the first operation log 108 are contemplated herein. In certain embodiments, the first operation log 108 is included as a portion of a more complete operation log (not shown). In certain embodiments, the first computing device 102 updates the first operation log 108 consistent with information from a more complete operation log upon access or request to relevant portions of a document, and the updated first operation log 108 is seamlessly incorporated with other operations herein as the "first operation log 108."

The example system 100 includes a second computing device 104 that performs operations to create a first document view 110 in response to the first operation log 108. For example, the second computing device 104 performs all or a portion of the operations in the first operation log 108, and creates a first document view 110 providing a representation of the result of the operations in the first operation log 108. The first document view 110 includes portions of a document for viewing (e.g. a page or section currently accessed by a user in communication with the second computing device 104), printing, editing, or similar operations by the user. An example second computing device 104 includes a user interface 112 to a user, allowing for display to the user (e.g. through output to a screen, by providing a text or alert, providing a report, providing stored data, and/or any other type of display to the user), and further allowing for input from the user (e.g. via network communication to a user device, keyboard and/or mouse input, voice input, biometric input, and/or camera input). The described examples of the user interface 112 are non-limiting, and any type of user interface 112 is contemplated herein.

The example second computing device 104 further performs operations to receive a user document change input value 114, and to create a local operation log 116 in response to the first operation log 108 and the user document change input value 114. For example, the second computing device 104 may append the first operation log 108 with operations created to reflect the user document change input value 114, such that the local operation log 116 reflects a document consistent with the edits made by, and displayed to, the user associated with the second computing device 104. An example local operation log 116 includes at least one sequential operation defining operations to create a second document, such as the document consistent with the edits made by, and displayed to, the user associated with the second computing device 104. In certain embodiments, the second computing device 104 updates the first document view 110 in response to the user document change input value 114, for example to display the document as edited by the user. An example second computing device 104 further communicates a change value 118 for the first operation log 108 to the first computing device 102 in response to the first operation log 108 and the local operation log 116—for example to communicate additional changes made by the user associated with the second computing device 104 after the receipt of the first operation log 108 from the first computing device 102. The timing for communicating the change value 118 to the first computing device 102 is selectable and/or determinable in real time, and the timing selected in certain embodiments depends upon the communication speed between the first and second computing devices 102, 104, the performance of the first and/or second computing devices 102, 104, the rate of change of the local operation log 116 by the user associated with the second computing device 104, a number of other users associated with separate computing devices that are simultaneously accessing and/or changing a document reflected by the first operation log 108, the availability of communication between the first and second computing devices 102, 104, and/or user preferences provided during the creation of a document reflected by the first operation log 108 and/or during an editing or accessing session of the document reflected by the first operation log 108.

In certain further embodiments, a system 100 includes the first computing device 102 further communicatively coupled to a third computing device 120, where the document server 106 further communicates the first operation log 108 to the third computing device 120. The example third computing device 120 creates a second document view 122 in response to the first operation log 108, where the second document view 122 includes content generated using at least a portion of the first operation log 108. The operation log 108 or portion thereof as provided to the third computing device 120 may differ from the operation log 108 or portion thereof as provided to the second computing device 104—for example a user associated with the third computing device 120 may be accessing a different portion of a document reflected by the first operation log 108. However, the first operation log 108 provided to the third computing device 120 is consistent with the first operation log 108 provided to the second computing device 104, at least before updates are provided to the first operation log 108 in response to user edits at various computing devices. The example third computing device 120 further receives a second user document change input value 124, and creates a second local operation log 126 in response to the first operation log 108 and the second user document change input value 124. The example second local operation log 126 includes at least one sequential operation defining operations to create a third document, such as the document consistent with the edits made by, and displayed to, the user associated with the third computing device 120. The example third computing device 120 further communicates a second change value 128 for the first operation log 108 to the first computing device 102 in response to the first operation log 108 and the second local operation log 126.

An example system 100 further includes an arbitration circuit 130 that constructs a second operation log 132 in response to the first operation log 108, the change value 118, and the second change value 128. The example system 100 includes the arbitration circuit 130 provided on the second computing device 104, although the arbitration circuit 130 may be provided on any device in the system 100, and/or may be distributed across more than one device. The provision of the arbitration circuit 130 on the second computing device 104 allows for conflict management for changes to the operation log 108 to be managed at the client level (e.g. where the second computing device 104 is a client device to the first computing device 102), allowing for more responsive conflict resolution for the user associated with the second computing device 104. In certain embodiments, for example with a thinner client, conflict resolution may be moved partially or completely up to the first computing device 102. Additionally or alternatively, more than one client device, and/or each client device (e.g. the second computing device 104 and the third computing device 120) may include an arbitration circuit 130 and/or portions of the arbitration circuit 130.

In certain embodiments, the local operation log 116 includes a first record of operations which, if implemented on a document, would provide a document having edits consistent with the user document change input value 114, and the second local operation log 126 includes a second record of operations which, if implemented on a document, would provide a document having edits consistent with the second user document change input value. In the example, the third computing device 120 communicates the second change value 128 to the first computing device 102, which makes the second change value 128 available to the arbitration circuit 130. In the example, the changes in the second local operation log 126 are made available to the arbitration circuit 130 via the communication of the second change value 128. In certain embodiments, the second local operation log 126 is communicated directly to the arbitration circuit 130.

An example arbitration circuit 130 applies non-conflicting operations of the local operation log 116 and the second local operation log 126, and further resolves conflicting operations of the local operation log 116 and the second local operation log 126 to construct the second operation log 132. In certain embodiments, the second operation log 132 is passed to the first computing device 102, allowing the first computing device 102 to update the operation log 108 to include operations from both of the second computing device 104 and the third computing device 120. In certain embodiments, a combined change value (not shown) is constructed and passed to the first computing device 102, and/or the second operation log 132 includes only changes relative to the operation log 108, to allow for a reduced set of information to be passed to the first computing device 102 and to update the operation log 108 to include operations from both of the second computing device 104 and the third computing device 120.

In certain embodiments, during editing and viewing of the document from users associated with the second computing device 104 and the third computing device 120, changes are allowed in an "optimistic" collaboration-allowing for responsive editing to the document under the assumption that conflicting operations will not be created, and/or that conflicting operations can be resolved. Periodically and/or episodically, conflicts which may be present are resolved according to the operations of one or more arbitration circuits 130.

An example arbitration circuit 130 resolves conflicting operations of the local operation log 116 and the second local operation log 126 utilizing one or more operations described herein. An example arbitration circuit 130 applies individual operations from the local operation log 116 and/or the second local operation log 126 by prioritizing operations according to a time stamp of each operation—for example a first wins or a last wins prioritization. An example arbitration circuit 130 applies individual operations from the local operation log 116 and/or the second local operation log 126 by prioritizing operations according to a time stamp of the operation log 116, 126—for example when the corresponding operation log 116, 126 was created, last saved, first lists an edit, and/or last lists an edit. In certain embodiments, the time stamp of the operation log 116, 126 provides an indication of when a user first accessed a document, first edited a document, last accessed a document, and/or last edited a document. Accordingly, the arbitration circuit 130 can apply a selected prioritization for operations in each operation log 116, 126 according to predetermined priority selections. An example arbitration circuit 130 prioritizes operations according to a priority associated with the second computing device 104, the third computing device 120, and/or a priority associated with a user of one of the computing devices 104, 120. For example, the arbitration circuit 130 may look at user login information, and determine whether a user has higher priority than another user, and assign higher priority to changes from the operation log 116, 126 provided by the computing device 104, 120 associated with the higher priority user. The prioritization of a user and/or a computing device 104, 120 may vary according to the section of the document wherein the user and/or computing device 104, 120 is viewing and/or editing—for example a user associated with a finance role may have a higher priority in one area of the document, and a user associated with an engineering role may have a higher priority in a second area of the document. An example arbitration circuit 130 resolves conflicting operations of the operation log 116 and the second local operation log 126 utilizing a time of communication of the operations to the first computing device 102—for example a "first come first serve" prioritization may assign the higher priority for conflicting edits to the first of the computing devices 104, 120 to provide one of the conflicting edits, where an alternative prioritization may assign the higher priority for conflicting edits to the last of the computing devices 104, 120 to provide one of the conflicting edits. One of skill in the art, having the benefit of the disclosure herein, will recognize that the type of document involved, the workflow of the group that may be working on the document, the hierarchy of the organization, the type of information in the document, and other considerations known to that person of skill in the art contemplating a particular embodiment of the arbitration circuit 130 will affect the type and implementation of the prioritization utilized.

An example arbitration circuit 130 further resolves conflicting operations of the local operation log 116 and the second local operation log 126 according to a type of the conflicting operations (e.g. operations of one type—such as deletions—may receive different prioritization rules than operations of a different type—such as adding a section). Additionally or alternatively, prioritization rules may be selected according to an aspect of the data, for example payroll data, personnel data, and/or flagged data, may receive distinct prioritization rules. An example arbitration circuit 130 applies individual operations in a priority selected according to which computing device 104, 120 and/or associated user with the computing device 104, 120 and also which region of a document would be affected by the conflicting operations. An example arbitration circuit 130 applies individual operations in a priority selected according to a performance characteristic for a computing device, for example providing a higher priority to a more responsive or more capable second or third computing device 104, 120, and/or providing a higher priority to a less responsive or capable second or third computing device 104, 120. An example arbitration circuit 130 applies individual operations in a priority selected in response to a conflict management difficulty value—for example if utilizing a change from the local operation log 116 results in a lower amount of conflict for a greater number of users than utilizing a change from the second local operation log 126, the change from the local operation log 116 may be deemed to be a lower conflict management difficulty value. Example and non-limiting considerations for determining a conflict management difficulty include a type of operations of the change (e.g. adding, deleting, inserting elements, linking data and/or calculations, etc.), a number of users affected by a change and/or a number of local operation logs 116, 126 in conflict with the change, and an amount of time to re-insert a change if the change is not applied by the system (e.g. the change is an otherwise lower priority conflict change and not applied-how long would it take a user to re-enter). In certain embodiments, an arbitration circuit 130 applies individual operations in a priority selected according to a number of operations represented in the corresponding operation log 116, 126, a document editing time corresponding to the operation log 116, 126 for the computing device 104, 120, and/or according to a change amount and/or a rate of change of a reference region of a document that would be affected by the conflicting operations. A change amount may be measured by a quantitative amount of the change (e.g. characters, keystrokes, and/or processor operations to effect the change) to the original operation log 108, an amount of document output change (e.g. a 3-keystroke insertion of a table adding 4 printed pages to the document may be a bigger change than a typed paragraph), and/or a relative amount of change compared to other operation logs 116, 126 present in the system 100. A rate of change amount may be measured according to edit time of the particular user and/or calendar time (e.g. the document section has been changing three times a day relative to another section changing once per week), according to any measure of change amount, and further may depend upon the document portion experiencing the change (e.g. an expected section to update annually may be deemed to be changing quickly if updated twice in a week).

An example arbitration circuit 130 additionally or alternatively resolves conflicting operations of the corresponding operation logs 116, 126 according to a number of computing devices that are currently accessing a reference region of a document that would be affected by at least one of the conflicting operations, a number of computing devices that have recently (e.g. within the last hour, last day, last week, last month, and/or last year depending on the context of the document and relevant data) accessed the reference region of a document affected, that are currently editing the reference region of the document affected, and/or that have recently edited the reference region of the document affected. In certain embodiments, resolving the conflict includes applying a higher priority one of the conflicting changes, and discarding a lower priority one of the conflicting changes. Additionally or alternatively, resolving the conflict can include applying both changes, for example with one set of changes marked relative to the conflict (e.g. shown, but in strikethrough), rejecting a lower priority one of the changes with a notification to the user that entered the rejected change, and/or creating a local copy of a document with the rejected change saved in the local copy. Depending upon the context of the document and the data involved, priority evaluation of conflicting changes can be applied in response to the criteria in either direction—for example many users of a given document section can indicate changes to that section get a higher priority (e.g. to keep the document updated as quickly as possible and ensure users are seeing a timely copy), or to get a lower priority (e.g. allowing users to make more responsive changes rather than requiring high overhead communications to keep all local operation logs 116, 126 in sync). In certain embodiments, the priority criteria can be selected or affected by a user selection—for example the user makes a selection to ensure that the changes they are about to make are prioritized (e.g. in preparation of a final version of a document before a significant even such as a presentation or regulatory filing), or to affect the prioritization criteria.

In certain embodiments, the arbitration circuit 130 updates the change value 118 to an updated change value 134 in response to the prioritization of conflicting operation logs 116, 126, and the updating of the second operation log 132, and communicates the updated change value 134 to the first computing device 102. In certain embodiments, the first computing device 102 determines a snapshot 136 in response to the updated change value 134. A snapshot 136 includes sequential operation(s) that define a second sequential operation or operations which, if executed, results in an equivalent document to the first document created by the operation log 108, and/or created by the second operation log 132 (e.g. reflecting conflict resolved changes to the operation log 108 by users associated with computing devices 104, 120 in the system 100). In certain embodiments, when a snapshot 136 reflects conflict resolved information and is an update to the operation log 108, the operation log 108 may be updated with (or replaced with) the snapshot 136. In certain embodiments, the updating of the operation log 108 may include version control with previous versions of the operation log 108 saved, and/or the operation log 108 simply replaced with the snapshot 136. In certain embodiments, the first computing device 102 provides the snapshot 136 and/or portions thereof as the operation log 108.

An example snapshot 136 includes: second sequential operations that have fewer process operations than the first sequential operations of the operation log 108 and/or second operation log 132; second sequential operations that have fewer logical operations than the first sequential operations of the operation log 108 and/or second operation log 132; second sequential operations having a simplified description of operations than the first sequential operations of the operation log 108 and/or second operation log 132; and/or second sequential operations having lumped operations relative to the first sequential operations of the operation log 108 and/or second operation log 132. In certain embodiments, the snapshot 136 includes object data having characteristics selected to create a document consistent with the operation log 108 and/or the second operation log 132. For example, an example snapshot 136 includes one or more tables, and/or additional or alternative objects, having characteristics such that the collection of one or more objects creates a document consistent with the operation log and/or the second operation log 132. In a further example, the snapshot 136 does not include operations, such as descriptions of operations from a user to create a document, but includes only objects and characteristics for those objects. In certain embodiments, the snapshot 136 includes objects and characteristics for those objects, plus second sequential operations, such that implantation of the objects plus the second sequential operations creates a document consistent with the operation log 108 and/or the second operation log 132. In certain embodiments, a resource utilization to create a document from the snapshot 136 is reduced relative to a resource utilization to create the document from the operation log 108 and/or second operation log 132, where the resource utilization includes a parameter such as: a total number of processing operations, a memory utilization (e.g. random-access memory utilization, although any type of memory is contemplated herein), and/or an intermediate memory utilization (e.g. a memory size required during execution of the operation log 108, second operation log 132, and/or snapshot 136; for example to create resultant arrays, query results, and the like during operations). Example and non-limiting object characteristics include object dimensioning, data related to the objects (stored within, linked to, referenced to, and/or calculated within), calculations and/or queries associated with the objects, object formatting, and/or object sequencing and position. In certain embodiments, the entire state of a document, reflective of the operation log 108 and/or the second operation log 132, can be stored in object descriptions with corresponding object characteristics. In certain embodiments, the entire state of a document alternatively or additionally includes one or more operations, such as the second sequential operations. In certain embodiments, one or more "undo" operations may be lost in creating the snapshot 136, for example as multiple operations having a specified sequence are lumped into a simplified description of equivalent operations with sequencing lost. In certain embodiments, "undo" operations as a whole, and/or as relating to specific computing devices 104, 120 and/or specific users associated with a computing device in the system 100 may be preserved. In certain embodiments, a user selection to preserve "undo" capability with relation to their operations may provide for preservation of their sequenced operations.

In certain embodiments, the first computing device 102 determines a snapshot 136 at selected times, such as but not limited to: upon receiving the communicated change value 118 from the second computing device 104, and where determining the snapshot 136 includes updating the snapshot 136 to reflect operations from the communicated change value 118; upon a lapse of a predetermined time period (calendar time, access time, and/or editing time); a lapse of a predetermined time period since a last communication of the change value 118; upon a request from the second computing device 104 to update the snapshot 136; upon an initial operation to open a document; upon an operation to close a document; upon a determination that a predetermined efficiency threshold is exceeded by determining the snapshot 136 (e.g. an estimated number of operations of the processor or number of operation commands can be reduced, upon certain types of operations that tend to yield high efficiency in a snapshot 136 such as repeated keys, filtering and/or sorting of data, etc.); upon an operation to save a document; upon an operation to save a document as a new document; upon a request to access a document related to the first operation log 108 from an additional computing device beyond the computing devices already accessing the document; upon a change value 118 exceeding a predetermined amount of change; upon a change value 118 directed to a predetermined categorical change (e.g. a change of from a selected list of change types occurs); upon a loss of communication with the second computing device 104; upon a reestablishment of communication with the second computing device 104; upon an operation to print at least a portion of a document related to the first operation log 108; upon an operation to publish at least a portion of a document related to the first operation log 108; and/or upon a determination that determining and communicating the snapshot 136 will not interfere with an operation of the second computing device 104 on a document related to the first operation log 108 (e.g. the second computing device 104 is idle and/or outside certain hours of operation).

An example first computing device 102 determines the snapshot 136 by determining a provisional snapshot 138, and determines whether the provisional snapshot 138 is compatible with the second operation log 132. In response to determining the provisional snapshot 138 is compatible with the second operation log 132, the example first computing device 102 over-writes the snapshot 136 with the provisional snapshot 138.

In certain embodiments, a snapshot 136 is created at an earlier point in an edited history of the document, for example with less than all of the operations in: the operation log 108, the second operation log 132, the local operation log 116, the second local operation log 126, the change value 118, the second change value 128, and/or the updated change value 134 applied. For example, a snapshot 136 event may occur indicating that a snapshot 136 is to be taken and/or is requested, where it is not desirable that all of the operations in the system 100 (e.g. the operations log 108 plus any operations reflected in the second operation log 132, local operation log 116, the second local operation log 126, the change value 118, the second change value 128, and/or the updated change value 134) be applied. In certain embodiments, a user may desire to walk back some edits made and not have those edits stored in the snapshot 136. Additionally or alternatively, the arbitration circuit 130 may determine that one or more edits are conflicting operations that cannot be resolved, or a user may indicate that a proposed or impending operation to resolve a conflict should not be applied. In certain embodiments, it may be desirable to restore the document to an earlier state, where a previous snapshot 136 having that earlier state is not available (e.g. some desired edits have been made since the last snapshot 136). In certain embodiments, the first computing device 102 determines operations within the operations log 108 consistent with the condition indicating that not all operations are to be applied, and creates a snapshot 136 in response to the partial operations log 108. In certain embodiments, the first computing device 102 determines one or more operations in the system 100 (e.g. the operations log 108, the second operation log 132, the second local operation log 126, the change value 118, the second change value 128, and/or the updated change value 134) that are consistent with the condition indicating that not all operations are to be applied (e.g. operations that do not apply undesired user edits), and creates the snapshot 136 in response to those consistent conditions, while discarding or otherwise preserving separately from the snapshot 136 those operations that are not consistent with the condition indicating that not all operations are to be applied. In certain embodiments, the operation log 108 may be "walked back" (e.g. returned to a previous state) utilizing the provisional snapshot 138, a user "undo" operation, and/or through operations of the arbitration circuit 130 resolving conflicting operations. Additionally or alternatively, the operation log 108 may be "walked back" via removal of certain operations in the creation of the snapshot 136 at an earlier point in the edited history of the document.

Referencing FIG. 74, an example first operation log 108 is depicted schematically. The example operation log 108 includes sufficient information to uniquely identify operations defining at least part of the document. The example operation log 108 describes an identifier for the object of the edits (e.g., the "Value" column, which may be a reference name or other object identifier), and/or a position within the object hierarchy of the document (e.g., the "Parent" column, which may be a reference name or other object identifier). In certain embodiments, the Value may be sufficient to uniquely identify objects, and a Parent value may not be necessary. In certain embodiments, multiple layers of hierarchy may be provided, sufficient to uniquely identify operations in the operation log 108. The example operation log 108 further includes a Type value, such as a type of object subject to the operation, and/or an Operation value describing the operation performed (e.g., an insertion, addition, deletion, etc.). The example Operation Log 108 includes operations such as insertions of text or values, formatting operations, addition or editing of columns and/or rows, and/or changes to object properties or metadata (e.g., a permissions change to a section of the document for a user). The illustrative organization of the operation log 108, including the organization of the operation log 108 as a table, is a non-limiting example, and any organization of operations that provides for an unambiguous operation location is contemplated herein. An example operation log 108 can document operations at any resolution desired or selected—for example a user entry of a text sequence may be stored as individual operations of each character, as an entire line of text, and/or with each word entry utilized as a separate entry on the operation log 108. The selection of the resolution affects utilization and resource consumption of the operation log 108, for example an "undo" operation that references the operation log 108 may operate to remove character-by-character if the operation log 108 stores character-wise operations. However, the storage of high resolution operations may consume greater resources in memory utilization (e.g., to store the individual operations in the operation log 108). Additionally or alternatively, an "undo" operation can be configured to undo only a selected portion of an operation from the operation log 108, for example by parsing an operation into an applied and unapplied portion (and further creating a separate operation on the operation log 108 reflecting the applied portion of the operation).

An example document may be constructed from the operation log 108, from the snapshot 136, and/or from the snapshot 136 updated by the operation log 108. An example snapshot 136 includes operations in an operation log 108 format, which may be a copy of the operation log 108 and/or a sequence of operations configured to provide for the same resulting output but consolidated for efficient operation, reduced memory usage, and/or to reduce the size of the operation log 108. An example system includes the operation log 108 having a higher resolution of operations (e.g., character-wise, word-wise, and/or sentence-wise) than operations in the snapshot 136 (e.g., word-wise, sentence-wise, and/or paragraph-wise).

In certain embodiments, certain data aspects related to the document may be stored outside the operation log 108 and/or the snapshot 136. In certain embodiments, certain data aspects are stored locally for a specific user and/or a specific client computing device. An example system includes one or more temporary and/or local values, such as a control object state (e.g., a slider bar value, a user preference, etc.), and the state of those objects may be deleted upon the user exiting the document, stored locally for the user and/or device in a manner inaccessible to other users of the document (e.g., outside the operation log 108 and/or snapshot 136), and/or stored in a manner accessible to other users of the document (e.g., within the operation log 108, snapshot 136, and/or other data structure accessible to users accessing the document) and/or as a part of the document. In certain embodiments, data aspects associated with the document that may be deleted or stored locally for a particular user and/or device may be termed local data, temporary data, cached data, and/or volatile data. The particular implementations for data aspects associated with the document described herein are non-limiting examples.

A number of procedures for performing certain operations to produce, communicate, and/or update an operation log 108, 116, 126, 132 are described following. Operations are illustrative and non-limiting, and may be re-ordered, divided, and/or combined in any manner to perform similar functions, as will be understood to one of skill in the art having the benefit of the disclosures herein. In certain embodiments, one or more operations may be performed by components of a system such as the system 100.

Figure 2:
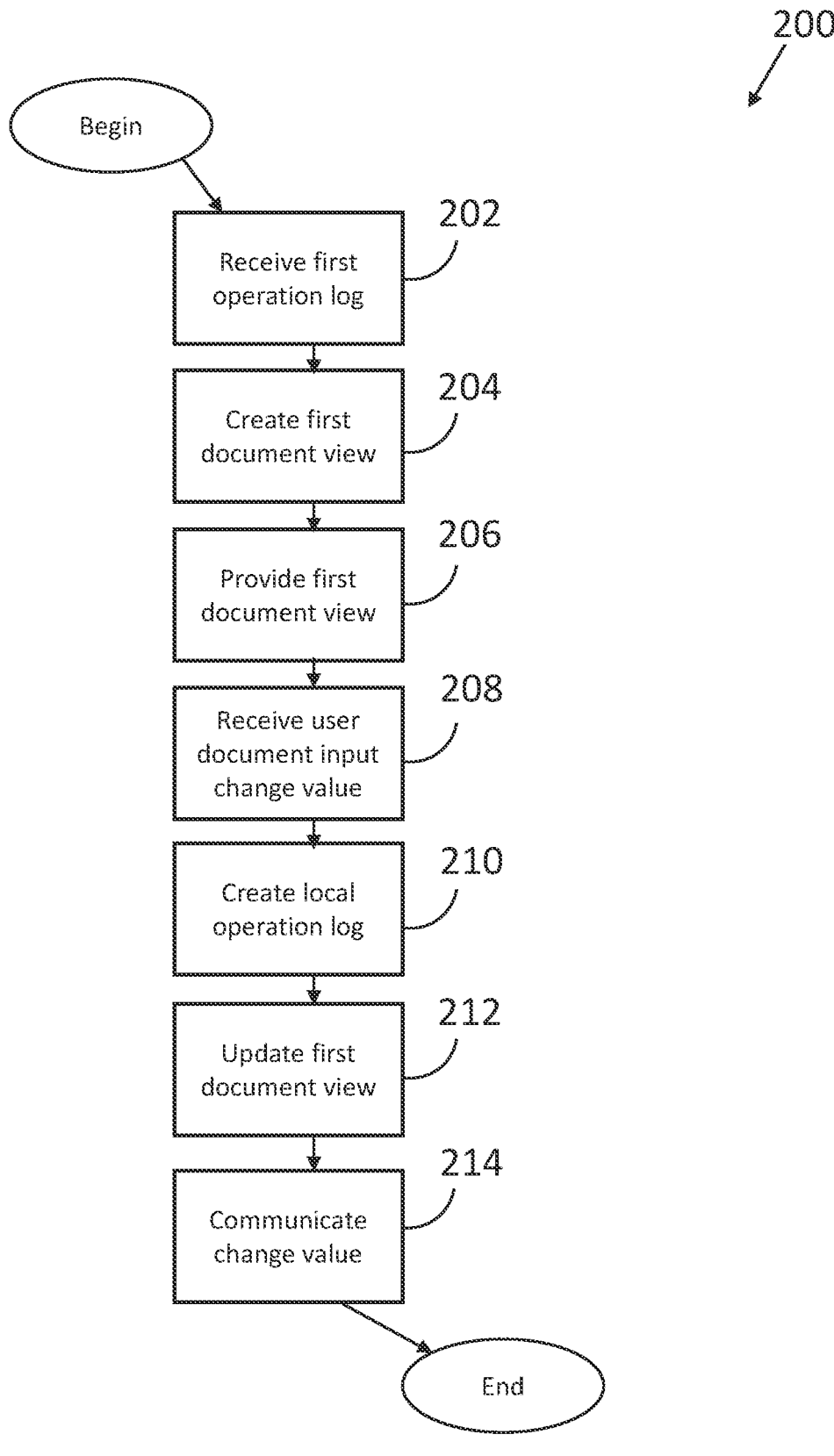
FIG. 2 is a schematic flow diagram of a procedure for communicating a change value.

Referencing FIG. 2, a schematically depicted example procedure 200 includes an operation 202 to receive a first operation log from a first computing device, where the first operation log includes at least one first sequential operation defining operations to create a first document, an operation 204 to create a first document view in response to the first operation log, where the document view includes content generated using at least a portion of the first operation log, and an operation 206 to provide the first document to a display device. The example procedure 200 further includes an operation 208 to receive a user document change input value, and an operation 210 to create a local operation log in response to the first operation log and the user document change input value, where the local operation log includes at least one sequential operation defining operations to create a second document. The example procedure 200 further includes an operation 212 to update the first document view in response to the user document change input value, and an operation 214 to communicate a change value for the first operation log to the first computing device in response to the first operation log and the local operation log.

Figure 3:
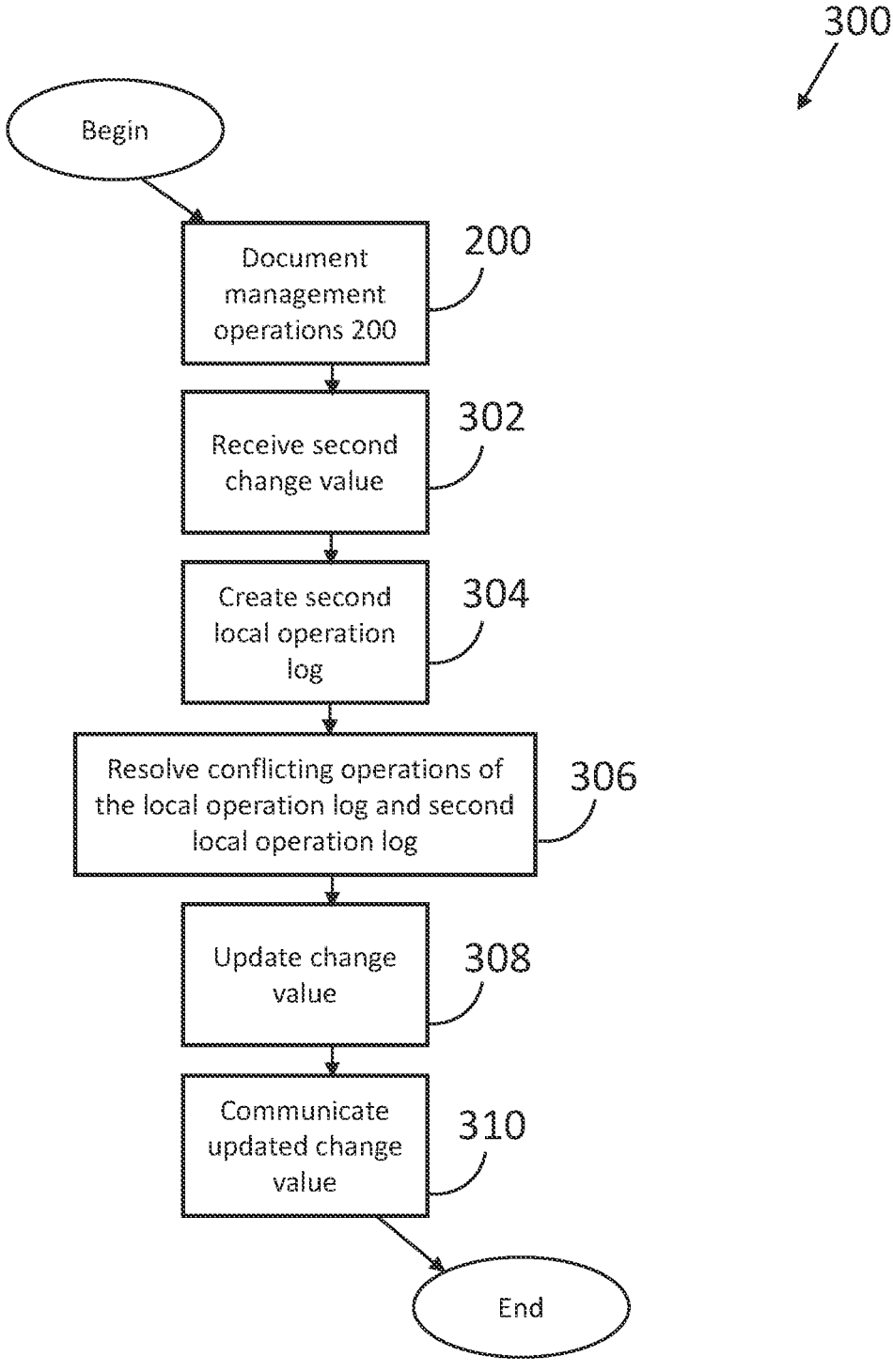
FIG. 3 is schematic flow diagram of a procedure for updating a change value.

Referencing FIG. 3, a schematically depicted example procedure 300 includes one or more operations of procedure 200. The example procedure 300 further includes an operation 302 to receive a second change value from the first computing device, where the second change value includes at least one sequential operation to add to the first operation log, and defines operations to create a third document, and an operation 304 to create a second local operation log in response to the first operation log and the second change value. An example operation 304 includes creating the local operation log by creating a first record of operations which, if implemented on a document, would provide a document having edits consistent with the user document change input value, and where creating the second local operation log includes creating a second record of operations which, if implemented on a document, would provide a document having edits consistent with the second user document change input value.

The example procedure 300 includes the operation 304 to create the second local operation log by applying non-conflicting operations of the local operation log and the second local operation log. The example procedure 300 further includes an operation 306 to resolve conflicting operations of the local operation log and the second local operation log, where the operation 304 to create the second local operation log includes the resolved conflicts from operation 306. Example and non-limiting operations 306 to resolve conflicting operations of the local operation log and the second local operation log include performing one or more operations such as: applying individual operations in a priority selected according to a time stamp corresponding to each operation; applying operations in a priority selected according to a time stamp of the local operation log and second local operation log; applying operations in a priority selected according to an associated priority of at least one of a second computing device receiving the user document change input value and a third computing device providing the second change value; applying operations in a priority selected according to an associated priority of at least one of a user associated with a second computing device receiving the user document change input value or a user associated with a third computing device providing the second change value; and/or applying operations in a priority selected according to a time of communication of the operations to the first computing device. Additional or alternative example and non-limiting operations 306 to resolve conflicting operations of the local operation log and the second local operation log include performing one or more operations such as: applying individual operations in a priority selected according to a type of at least one of the conflicting operations and/or applying individual operations in a priority selected according to a relationship such as: a priority relationship between at least one of a second computing device, a third computing device, and a user associated with one of the second and third computing devices; a priority selected according to a reference region of a document that would be affected by at least one of the conflicting operations; a priority selected in response to a performance characteristic of at least one of the second and third computing devices; a priority selected in response to an indicated importance value corresponding to at least one of the conflicting operations; and/or a priority selected in response to a conflict management difficulty value. Additional or alternative example and non-limiting operations 306 to resolve conflicting operations of the local operation log and the second local operation log include applying individual operations in a priority selected according to one or more of: a number of operations represented in at least one of the local operation log and the second local operation log; a document editing time corresponding to at least one of the second computing device and the third computing device; and/or one of a change amount and a change rate of a reference region of a document that would be affected by at least one of the conflicting operations. Additional or alternative example and non-limiting operations 306 to resolve conflicting operations of the local operation log and the second local operation log include applying individual operations in a priority selected according to computing devices having one or more characteristics such as: are currently accessing a reference region of a document that would be affected by at least one of the conflicting operations; have recently accessed a reference region of a document that would be affected by at least one of the conflicting operations; are currently editing a reference region of a document that would be affected by at least one of the conflicting operations; and/or have recently edited a reference region of a document that would be affected by at least one of the conflicting operations.

An example procedure 300 includes the operation 306 at least partially performed on a first computing device, a second computing device, and/or a third computing device. An example procedure 300 includes the operation 306 to resolve the conflict at least partially performed on the second computing device, where the first computing device communicates the second change value to the second computing device (e.g. through a third computing device and/or document server).

Figure 4:
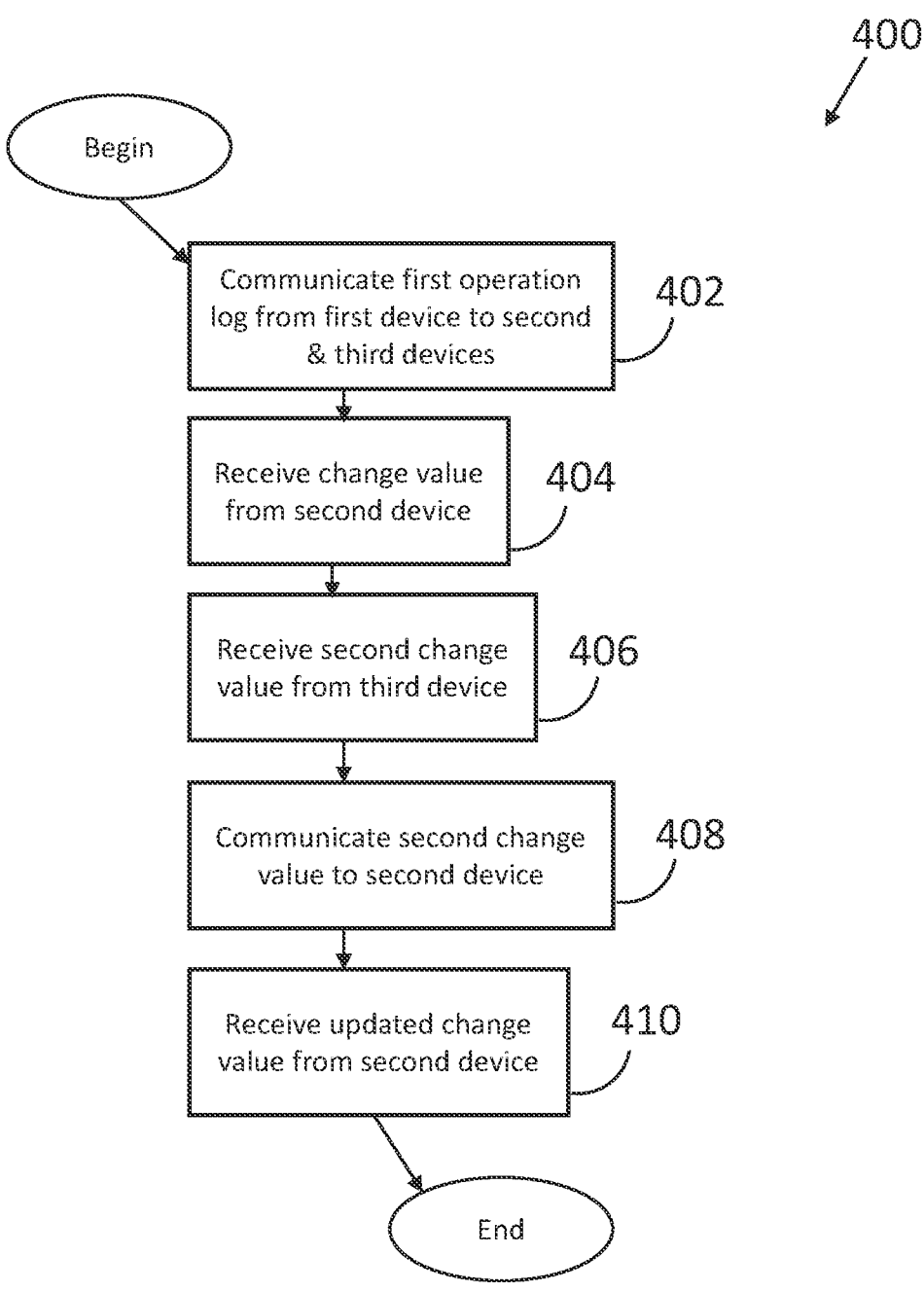
FIG. 4 is a schematic flow diagram of a procedure for receiving an updated change value.
Figure 5:
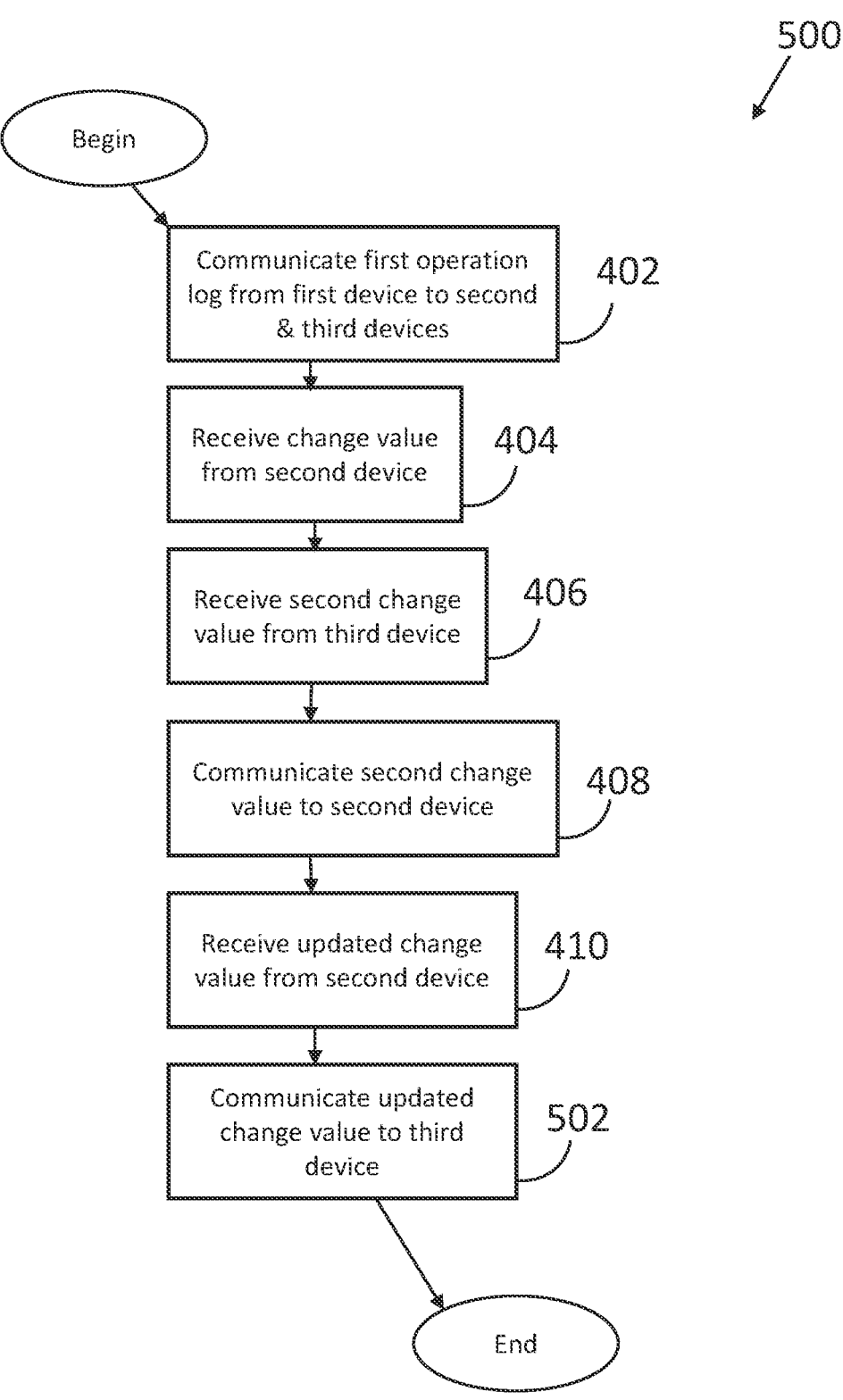
FIG. 5 is a schematic flow diagram of a procedure for communicating a change value.

Referencing FIG. 4, a schematically depicted example procedure 400 includes an operation 402 to communicate a first operation log, for example from a first computing device to a second computing device and a third computing device, where the first operation log includes at least one first sequential operation defining operations to create a first document. The example procedure 400 further includes an operation 404 to receive a change value for the first operation log from the second computing device, where the change value includes at least one sequential operation defining operations to create a second document including changes relative to the first operation log, and an operation 406 to receive a second change value for the first operation log from the third computing device, where the second change value includes at least one sequential operation defining operations to create a third document including changes relative to the first operation log. The example procedure 400 further includes an operation 408 to communicate the second change value to the second computing device, and an operation 410 to receive an updated change value from the second computing device, where the updated change value includes a conflicts resolving change value (e.g. a change value based upon resolved conflicts) between the change value and the second change value. Referencing FIG. 5, a schematically depicted example procedure 500 further includes an operation 502 to communicate the updated change value to the third computing device. For example, a first operation log is partially or completely passed from a document server to each of a client computing device and a second client computing device. A first user in communication with the client computing devices makes a number of changes to a displayed text (e.g. a local copy of the document 1106, from the perspective of the first user), and a second user in communication with the second client computing device makes a number of changes to a displayed text (e.g. a local copy of the document 1106, from the perspective of the second user. The client computing device determines a first change value in response to operations from the first user, and the second client computing device determines a second change value in response to operations from the second user. An example arbitration circuit, which may be incorporated wholly or partially within the client computing device, the second client computing device, the document server, and/or elsewhere, determines an updated change value from the first change value and the second change value—for example the updated change value reflects all non-conflicting operations of the user and second user, and/or reflects operations resolved according to any change conflict resolution principles described throughout the present disclosure. In certain embodiments, the arbitration circuit produces the updated change value locally (e.g. at one of the client computing device and/or second client computing device), and passes the updated change value to the document server and/or another one of the client computing devices. When the client devices have updated local operation logs from the updated change value, the client devices have synchronized the local views of the document 1106. In certain embodiments, the document server (which may additionally or alternatively be one of the client computing devices) receives the updated change value, passes it to client device(s) (e.g. each client device currently accessing the document 1106), and updates the common server operation log (e.g. operation log 108) in response to the client device(s) accepting the updated change value.

In certain embodiments, a procedure includes determining a snapshot, for example updating the operation log 108 with a confirmed updated change value. It can be seen that the updated snapshot creates a document 1106 equivalent to the document created by the operation log 108 with the confirmed updated change value applied, for example the document 1106 as initially provided to client device(s) and with edits from user(s) applied. The creation of a snapshot allows for management of document data and efficiency, for example by periodically grouping information and calculations into a more efficient form (e.g. less data, fewer processor operations, better sorting such as improved sort order, application of data compression, etc.) than an operation sequence as entered by a user. An example procedure further includes providing the snapshot as the operation log 108 (e.g. to a client computing device accessing the document 1106).

Example operations include determining a snapshot, where the snapshot includes at least one sequential operation defining at least one second sequential operation, wherein the at least one second sequential operation, if executed, results in an equivalent document to the first document (for example—operations of the operation log plus operations of the updated change value from operation 502). In certain embodiments, the procedure 500 includes providing the snapshot as the first operation log. Example operations to determine the snapshot include providing the snapshot in response to at least one event such as: the first computing device receiving the communicated change value, where the determining the snapshot further includes updating the snapshot to reflect operations from the communicated change value; a lapse of a predetermined time period; a lapse of a predetermined time period since a last communication of the change value; a request from a second computing device; an initial operation to open a document; an operation to close a document; a determination that a predetermined efficiency threshold is exceeded by determining the snapshot; an operation to save a document; an operation to save a document as a new document; a request to access a document related to the first operation log from another computing device; a change value exceeding a predetermined amount of change; a change value directed to a predetermined categorical change; a loss of communication between the first computing device and a second computing device; a reestablishment of communication between the first computing device and a second computing device; an operation to print at least a portion of a document related to the first operation log; an operation to publish at least a portion of a document related to the first operation log; and/or a determination that determining and communicating the snapshot will not interfere with an operation of a second computing device on a document related to the first operation log.

Figure 6:
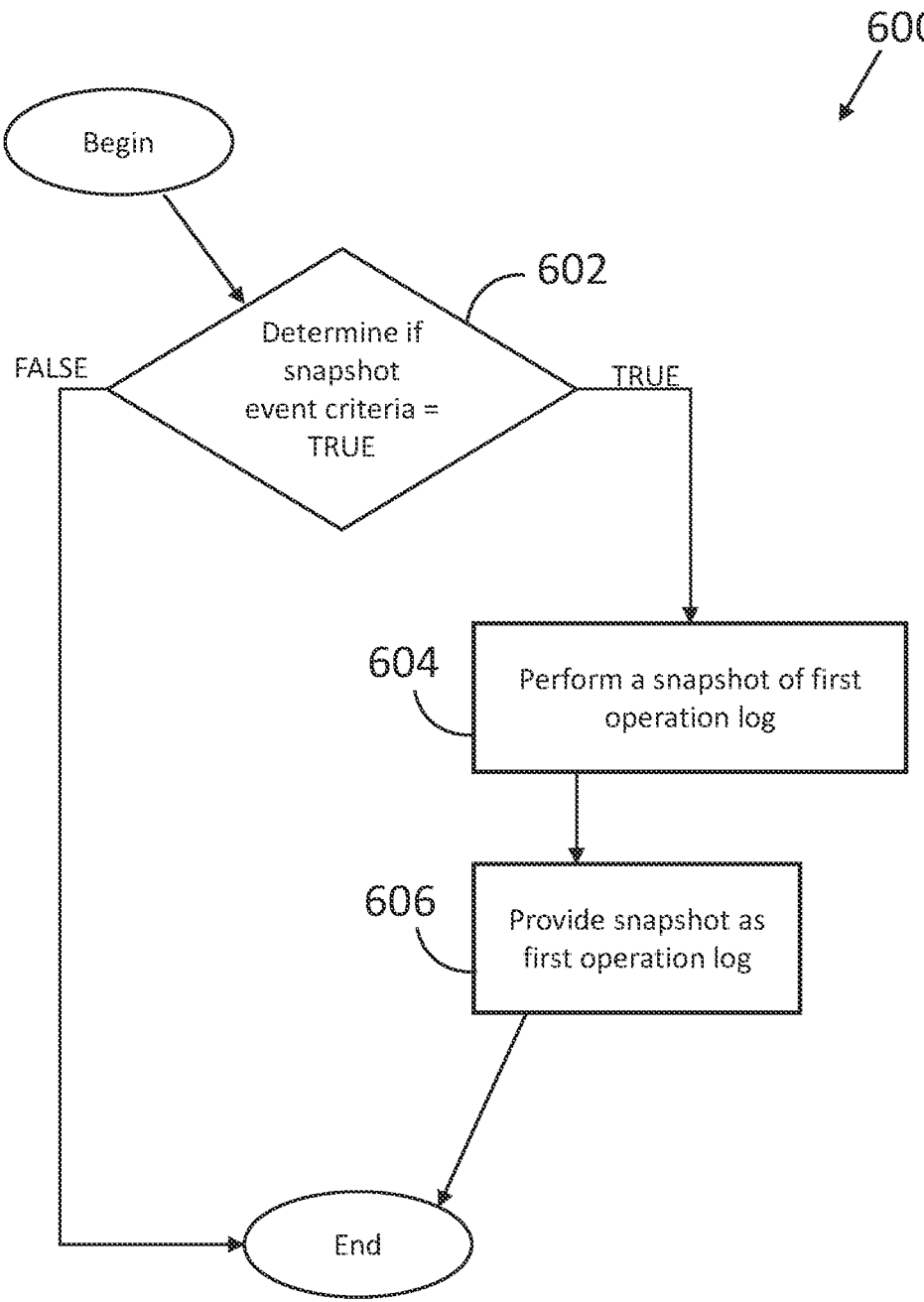
FIG. 6 is a schematic flow diagram of a procedure for providing a snapshot.

Referencing FIG. 6, a schematically depicted example procedure 600 includes an operation 602 to determine if a snapshot event criteria is true—for example whether the operating conditions of the system, local operation log(s), current updated change values, and/or an elapsed time has passed, such that determination of an updated snapshot is warranted. The example procedure 600 includes an operation 604 to perform or determine a snapshot of the operational log. Example and non-limiting operations to perform the snapshot include: determining a second sequential operation that includes fewer processor operations than the first sequential operation; determining a second sequential operation including fewer logical operations than the first sequential operation; determining the second sequential operation comprising a simplified description of operations than the first sequential operation; determining the second sequential operation comprising lumped operations relative to the first sequential operation; and/or appending or otherwise combining operations of the confirmed updated change value into the operation log. In the provided examples, the first sequential operation is the state of the document before the snapshot, for example the operational log or previous version of the snapshot, plus the confirmed updated change value, and the second sequential operation is the updated snapshot, or the updated operational log after combination with the confirmed updated change value. The example procedure 600 further includes an operation 606 to provide the snapshot as the operational log.

Example and non-limiting operations 604 to determine if a snapshot event has occurred include: the first computing device receiving the communicated change value, wherein the determining the snapshot further comprises updating the snapshot to reflect operations from the communicated change value; a lapse of a predetermined time period; a lapse of a predetermined time period since a last communication of the change value; a request from a second computing device; an initial operation to open a document; an operation to close a document; a determination that a predetermined efficiency threshold is exceeded (e.g. an estimated or modeled improvement of processor operations, memory utilization, document size, and/or number or type of logical operations) by determining the snapshot; an operation to save a document; an operation to save a document as a new document; a request to access a document related to the first operation log from another computing device; a change value exceeding a predetermined amount of change (e.g. a number of operations, an editing time value, and/or operations of a specified type present in the change value); a change value directed to a predetermined categorical change (e.g. inclusion of a sort, filter, data reference, and/or insertion of a table, graph, chart, etc.); a loss of communication between the first computing device and a second computing device; a reestablishment of communication between the first computing device and a second computing device; an operation to print at least a portion of a document related to the first operation log; an operation to publish at least a portion of a document related to the first operation log; and/or a determination that determining and communicating the snapshot will not interfere with an operation of a second computing device on a document related to the first operation log.

Figure 7:
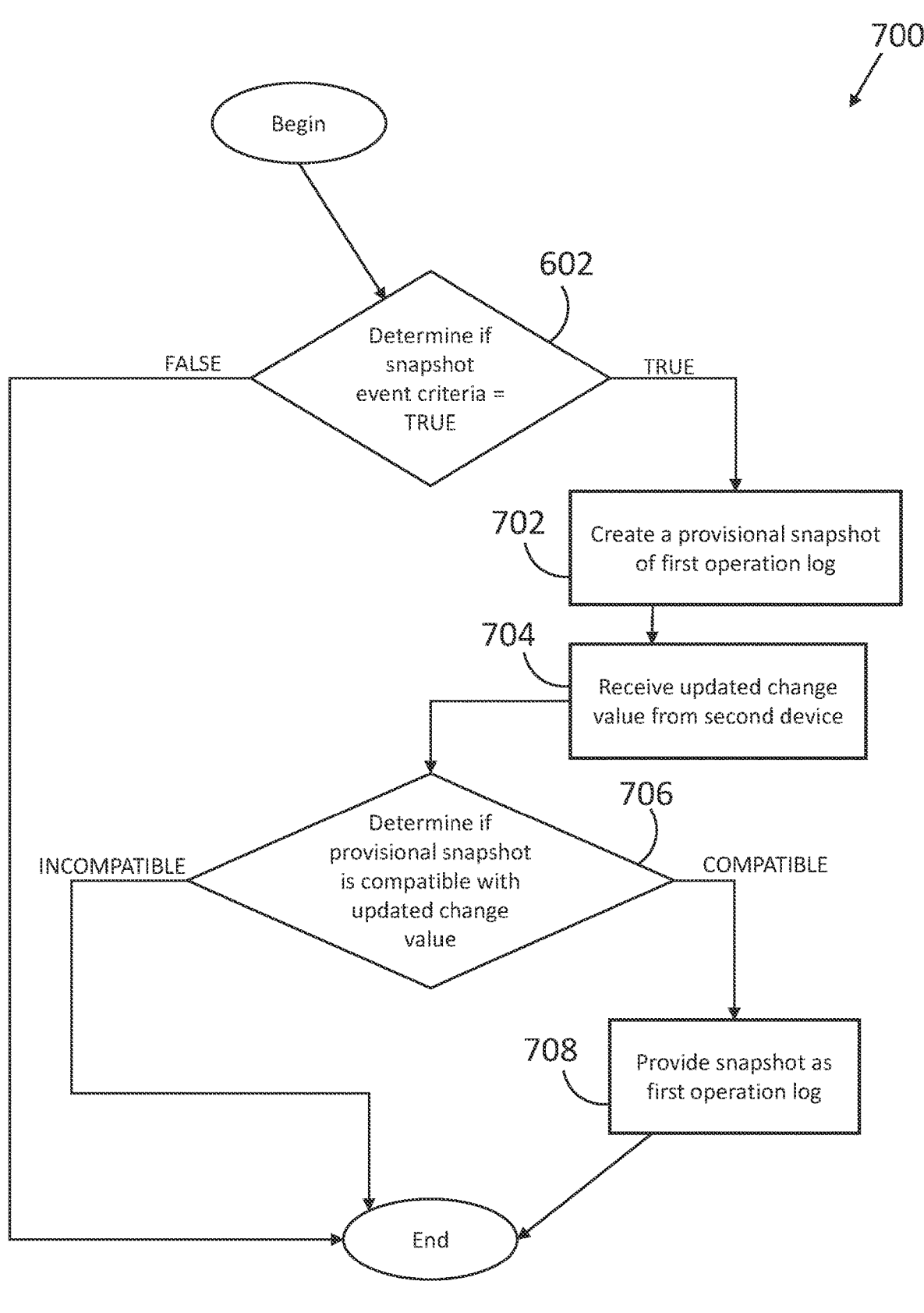
FIG. 7 is a schematic flow diagram of an alternate procedure for providing a snapshot.

Referencing FIG. 7, a schematically depicted example procedure 700 includes an operation 702 to determine a provisional snapshot, an operation 704 to receive an updated change value from the second computing device, and an operation 706 to determine if the provisional snapshot is compatible with the updated change value. In response to the operation 706 determining the provisional snapshot is compatible with the updated change value, the procedure 700 includes an operation 708 to provide the operation log as the provisional snapshot, for example to over-write the snapshot in response to the provisional snapshot, and/or to update the operation log in response to the provisional snapshot.

Figure 26:
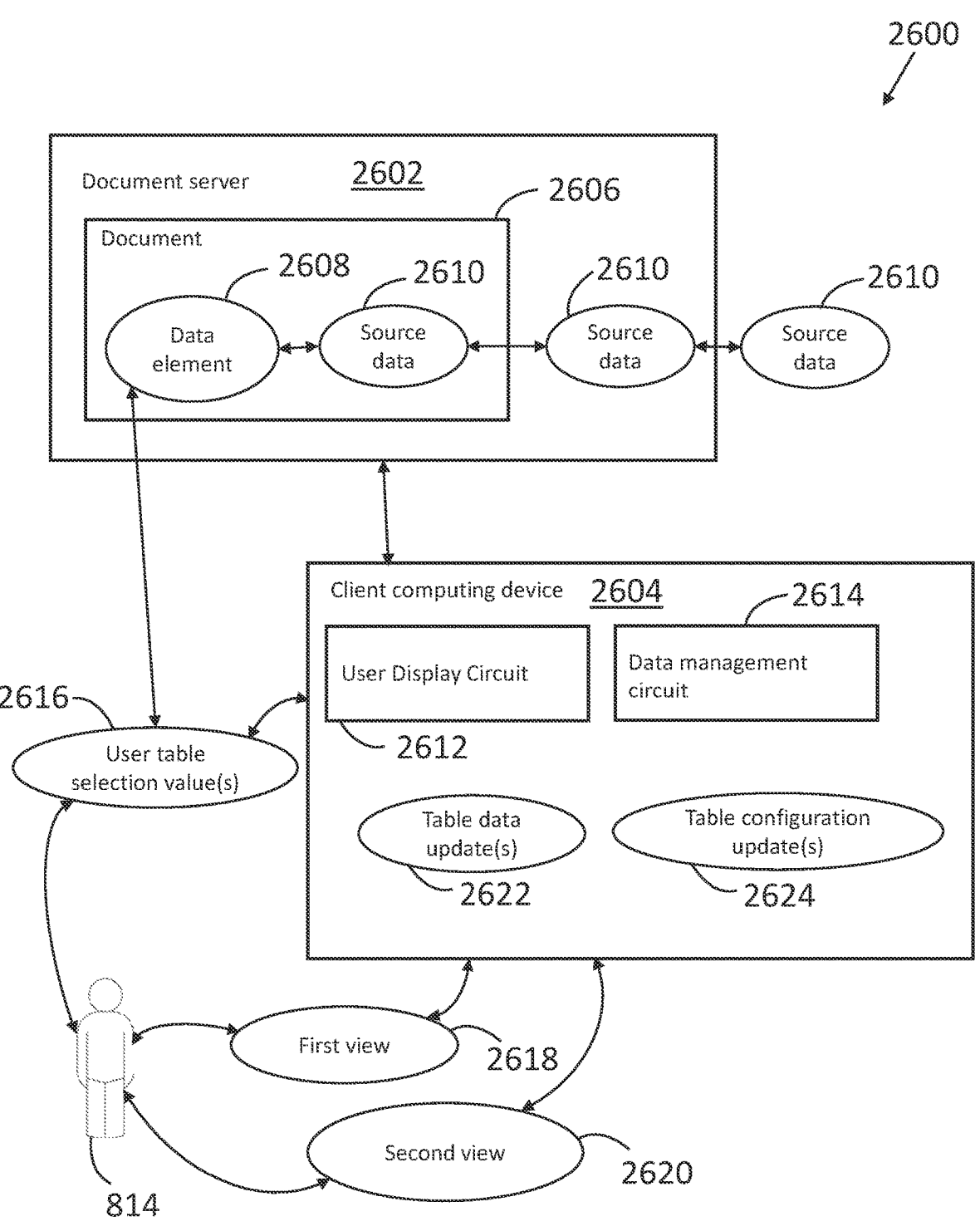
FIG. 26 is schematic depiction of a system for providing a view.

Referencing FIG. 26, a system 2600 includes a document server 2602 in communication with a client computing device 2604. The document server 2602 includes a document 2606, and communicates at least a portion of the document 2606 to the client computing device 2604 as a data element 2608. The example data element 2608 and/or the document 2606 additionally or alternatively include access to, and/or incorporation of, source data 2610. Incorporation of source data 2610 includes, without limitation, links to, references to, and/or calculated values dependent upon one or more aspects of the source data 2610.

The example client computing device 2604 further includes a user display circuit 2612 that interfaces with a user 814, for example providing a first view 2618 to the user 814 in response to the data element 2608, for example to display an accessed portion of the document 2606 to the user 814. An example data element 2608 includes a first table (e.g. reference 2702 on FIG. 27) and a second table (e.g. reference 2704 on FIG. 27). In certain embodiments, the second table 2704 is a linked table from the first table 2702, either present in the document 2606 initially or created by the user 814. The example client computing device 2604 includes a data management circuit 2614 that interprets a user table selection value 2616, and determines one or both of a table data update 2622 and/or a table configuration update 2624 in response to the user table selection value 2616. Example and non-limiting user selection values 2616 include rules for operating the first table 2702 and the second table 2704 in response to user inputs, calculated data updates, data changes on one or more tables 2702, 2704, and/or configuration changes to one or more tables 2702, 2704. Configuration changes include, without limitation, changes to the format of a table column, row, or data record (e.g. a cell within the table, including a header cell), filtering options for the table, and/or sorting options for the table. Example and non-limiting rules for operating the tables 2702, 2704 include rules to manage table data in response to a change in one or both tables 2702, 2704, and rules to manage configuration changes in one or both tables 2702, 2704. The example user display circuit 2612 updates a second view 2620 in response to the table data update 2622 and/or the table configuration update 2624, for example to display associated changes to the user 814, including a portion of the changes visible to the user 814 based upon the currently viewed area of the document 2606 by the user 814. The example data management circuit 2614 additionally or alternatively updates data in the data element 2608 and/or document 2606 in response to the changes implemented, subject, for example, to conflict resolution operations (see, e.g. the disclosure referencing FIGS. 1 to 8).

Referencing FIG. 27, an example data view 2618 includes a first table 2702 and a linked second table 2704. In the example, a link icon 2706 is provided for convenient reference to the user 814 that the second table 2704 is a linked table. The provision of a link notification to the user is a non-limiting example. In certain embodiments, for example where only certain data elements are linked, a link notification, if present, will be presented specifically near the linked data elements. In certain embodiments, activation of the link can return the user to the source information (e.g. the first table 2702), and/or moving the focus area to the link (e.g. hovering the mouse cursor over the link notification) can present a preview, "card", or other information about the source information. It will be understood that the second table 2704 may be linked to data from more than one other table (not shown), and the principles described with reference to the system 2600 apply to multiple table linkages, as well as other data linkage types, without limitation, such as a table to a graph, a table to a chart, a table to a prose description where the table represents a structured data view of one or more aspects of the prose description, and combinations of these. Additionally or alternatively, where link notifications are present in a multi-linked object, a link notification can be distinct for one or more of the multiple source information aspects. Similarly, the linked object may be any type of object, such as a "card", a graph, and/or a chart.

The configuration changes between linked objects, and the rules for change management between linked objects, may vary between objects and within an object. For example, a second table 2704 linked to a first table 2702 may have one set of rules for a first column and a second set of rules for a second column, and/or may have one set of rules for a first type of operation (e.g. a format change, a specific type of format change, a deletion, a sorting operation, a filtering operation, etc.). Additionally or alternatively, a table linked to two objects may have a first set of rules corresponding to the first object, and a second set of rules corresponding to the second object.

As an example, referencing FIG. 28, a second view 2620 (named a second view 2620 as the second view 2620 depicted in the example is after user operations, although the naming of a view as a first view 2618 or a second view 2620 is provided for clarity of presenting views sequentially, but a given view may be a first view 2618 or a second view 2620 without limitation, depending upon the user operation or other change the view 2618, 2620 is compared to). In the example of FIG. 28, a user 814 has removed Col3 and Col4 at location 2802. The removal of the columns may be any type of operation, including hiding the columns, adding columns, deleting the columns, and/or moving the columns. In the example of FIG. 28, removing columns in the second table 2704 does not remove the columns from the first table 2702. Additionally or alternatively, rules could allow removal of a column (or other element such as a line, data series, bar, pie slice, or other aspect of an object such as a graph or figure), and/or could allow removal of some columns or elements, but not of other columns or elements.

Referencing FIG. 29, an example second view 2620 is depicted in response to further operations from the user 814. In the example of FIG. 29, the user has amended a data value 2804 in Col5, changing it from "18" to "26" on the second table 2704. In the example, the rules between the first table 2702 and the second table 2704 propagate the changed value to the first table 2702, such that the data value 2806 is similarly updated. Accordingly, in contrast with previously known systems, a change in the linked data can be propagated to the sourced data. It can be seen that a user 814 can configure a link table (e.g. the second table 2704) for ease of review and editing, for example hiding extraneous columns, sorting and/or filtering the data, and editing the configured table thereby updating the source data. In the example of FIG. 29, the user 814 has additionally updated the formatting for Col2 2808 by making the text in that column boldface type. In the example of FIG. 29, the formatting change is not propagated to the first table 2702. In certain embodiments, filtering operations, sorting operations, removal of rows and/or columns, and combinations of these, are not propagated to the source data. In certain embodiments, one or more of filtering operations, sorting operations, removal of rows and/or columns, and combinations of these, are propagated to the source data. In certain embodiments, the data element 2608 includes source data 2610 external to the document 2606, for example where the data element 2608 includes source data 2610 on the document server 2602 but external to the document 2606 (e.g., on a database or other document on the document server 2602), and/or where the data element 2608 includes source data 2610 outside the document server 2602 (e.g., on a website, third-party server, and/or cloud location separate from the document server 2602). In certain embodiments, source information present on the first table 2702 is at least partially located externally to the document 2606. In certain embodiments, the first table 2702 and/or the second table 2704 include information (e.g. one or more columns and/or rows) external to the document 2606. Accordingly, a user 814 can read from, access, and/or write to information external to the document 2606.

Referencing FIG. 30, an example second view 2620 is depicted in response to further operations from the user 814. In the example of FIG. 30, the user has amended a data value 2902, for example changing the value from "M" to "Z." In the example of FIG. 30, the change in the data value 2902 in Col2 is not propagated to the first table 2702, and thus the data value 2904 remains at "M". The example of FIG. 30 is consistent with, for example, Col2 being a protected column where changes are not propagated to the source information, while Col5 is an editable column where changes are propagated to the source information. The data value 2902 in the example is depicted as "Z*", for example where a notification is provided to the user 814 that a data value is blocked from propagation to the source information. In certain embodiments, other types of notification can be utilized, such as a format change, a different character than "*", a prompt and/or warning to the user, and/or a confirmation check that a protected value is being adjusted, whereupon the data may be propagated to the source information if the user 814 is authorized and/or confirms the change. In certain embodiments, the change to the data value 2902 is refused, and the data value 2902 is returned to the original value (e.g. "M" in the example).

In embodiments of the present disclosure, an object in a document may allow a user to create multiple views of a common data source, with changes made to the data being applied across all views in real time, or as periodically updated. In addition to copying and pasting tables in documents, a user may have the option of "linking" a new table (or other object) to one or more existing table (or objects). On creation, a linked object may appear to be a copy of the source object. For an example table, the column and row layout of the linked table may appear the same as the source, and its data may appear the same. Next to the title of the table/object, or elsewhere, there may be an icon indicating the created table/object is a linked table/object. An example includes the user changing the appearance of a linked table, for example, by hiding or grouping columns, without impacting the view of the source table. In this way, linked objects and the source objects may offer unique, separate experiences for users. The data inside the linked table/object, however, may be something different than a cloned copy of the source, and may show a user the same underlying data from the source table/object. If a user changes the data in either the linked data or the source data, the data may be written through in real-time across both places. In this way, the data in a linked table/object does not become out-of-sync with the source table/object, and a user may create multiple linked tables/objects to a source table/object. In embodiments, this approach may be used to show multiple views of the same data without being limited to a copy or clone of the source data. Further, changes to data in one view may instantly take effect in all other views of the data in other, linked tables, and secondary views of linked objects may be laid out differently without impacting other views.

In certain embodiments, an update in accessed data (e.g. source data 2610) provides for a change in the document 2606 and/or data element 2608. For example, where a source data 2610 is an external data set such as a web page or database external to the document 2606, a periodic, selected, and/or continuous update operation by the document server 2602 pulls in the updated data and updates corresponding elements of the document 2606 that utilize the external data set. In certain embodiments, a document 2606 template includes external data to be utilized, and the data is brought in from the source data 2610 at the time of the document creation.

In embodiments of the present disclosure, views may be provided as a filter and/or as a form of report. Views used as a filter may depict the same layout of the source object (e.g. a table), but with a different subset of the data (e.g. a filter applied). Views that are used as an editable report may each have different layouts, conditional formatting, and so forth, in addition to viewing a different subset of the data. In embodiments, views may be placed into a drop-down menu. A default view may be presented that shows the source object to which each linked object refers. When a document is reloaded, the view selectors for tables may be populated by any method, including loading a default view, reloaded according to previous usage from the user, and/or according to updates saved in the document defining the view selectors. In embodiments, view definitions may be provided that are collaborative across individuals, for example, on a project team, but a currently selected view by any team member may differ from that of other team members. For example, two users could be looking at the same table in different views but any changes they made to the definition of that view would be shared with everyone depending on the rules associated with the views and/or authorizations of those users. In embodiments, a lock/unlock views functionality may be provided, so that if a given view was locked, a user would unlock it (if authorized) before changing the view settings (e.g., the grouping, filter, etc.). Additionally or alternatively, the user display circuit 2612 provides a user 814 with an alert in response to a change in a data value, and/or in response to another user unlocking a view. The user 814 can configure tables or other objects for alerts (e.g. adding an alert tag), and/or an alert may be automatically provided as a property of the object and/or document. The user 814 can additionally or alternatively configure the alert-such as providing for a tag in the document observable when the user 814 accesses the document, and/or by receiving an external message (e.g., an e-mail, text, or the like) outside of the document alerting the user 814 that data has been changed and/or unlocked. In certain embodiments, a change in the data may occur due to an update from the source data 2610, and the user display circuit 2612 provides the user 814 with an alert that the data has been updated.

Figure 62:
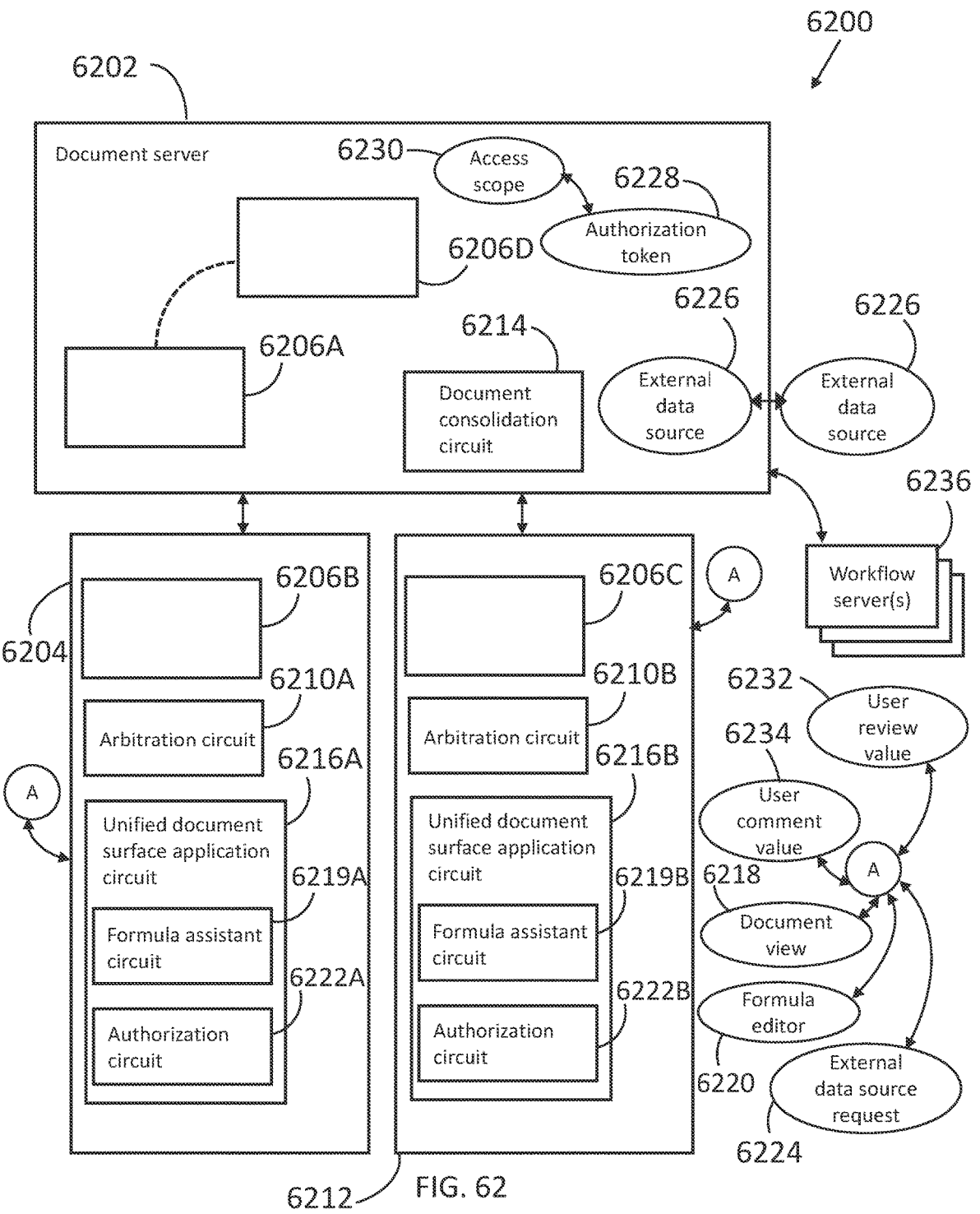
FIG. 62 is a schematic depiction of a system for updating an operation log.

Referencing FIG. 62, an example system 6200 includes a document server 6202 communicatively coupled to at least one client computing device 6204. The example system 6200 further includes a document 6206. The example document 6206 includes a document 6206A on the document server, a document 6206B on a first client computing device 6204, and a document 6206C on a second client computing device 6212. The documents 6206A, 6206B, 6206C may include portions of the document 6206, all of the document 6206, and/or may comprise a logical grouping of elements that collectively form the document 6206. In certain embodiments, the documents 6206A, 6206B, 6206C may be the same document 6206 and/or be consistent with each other, and/or may intermittently and/or continuously have variances, such as local and/or user-specific variables, views, and/or edits that have not yet been synchronized therebetween. Additionally or alternatively, an updated document 6206D is an example document 6206—for example where the updated document 6206D is created in response to synchronization and/or optimization operations.

An example system 6200 further includes one or more workflow servers 6236. Example and non-limiting workflow servers 6236 include one or more computing devices having processing resources, associated memory, and/or communications to the document server 6202. In certain embodiments, the document server 6202 allocates one or more operations of any systems and/or procedures herein to be performed at least partially on a workflow server 6236. In certain embodiments, the document server 6202 allocates supporting operations to a workflow server 6236—for example where operations requested according to multiple users and/or for multiple documents include certain common aspects (e.g., downloading bulk information from an external data source 6226, indexing and/or querying operations to a large data set at least partially shared between documents, etc)—where the specific operations performed by the workflow server 6236 are either direct operations and/or procedures as described in the present disclosure, and/or where specific operations performed by the workflow server 6236 are a superset of operations (e.g., shared between a number of documents and/or user operations), precursor operations, preparatory operations (e.g., to support utilization of an external data source 6226 added to the system 6200, which may or may not be specifically utilized by a document at the time preparatory operations are performed) such as downloading, indexing, sorting, and/or filtering data from an external data source 6226, and/or form a portion of one or more operations or procedures according to the present disclosure. In certain embodiments, the document server 6202 brings one or more additional workflow servers 6236 online to support operations currently being performed. In certain embodiments, the document server 6202 balances operations and/or procedures herein across the document server 6202, one or more workflow servers 6236, and/or client devices according to the current workload of the system 6200, desired responsiveness of client devices, current selections by a user (e.g., requesting that a processing, memory, or communication burden on a client device be reduced), a current type of client device in use (e.g., a powerful client device such as a workstation, a light client device such as a laptop, and/or a thin client device such as a mobile device, tablet, mobile phone, etc.), a nature of operations or procedures currently being performed (e.g., high utilization operations such as nested queries, indexing, etc.), and/or a connectivity of one or more devices in the system 6200. The described operations to balance workloads across devices of the system 6200 are non-limiting examples.

Figure 63:
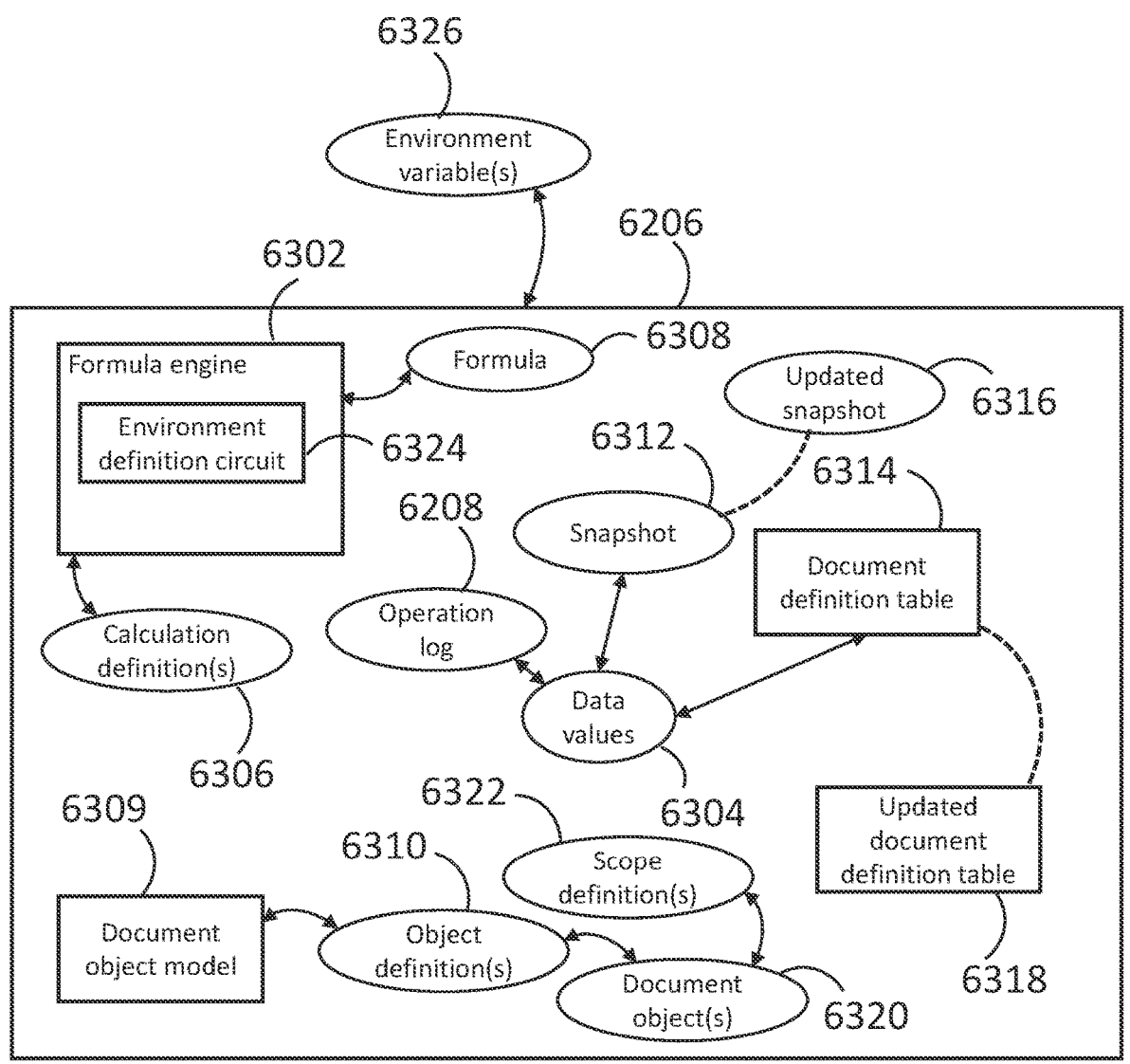
FIG. 63 is a schematic depiction of a system for accessing environmental variables.

Referencing FIG. 63, an example document 6206 includes an operation log 6208, where the operation log 6208 includes a record of sequential operations defining operations to create data values 6304 of the document 6206. For example, as a user edits a document, the operations to implement the edits are stored on the operation log 6208. Each computing device accessing the document 6206, for example the document server 6202 and one or more client computing devices 6204, 6212, may have a version of the operation log 6208, and/or a local copy of the operation log 6208. In certain embodiments, the client computing devices 6204, 6212 and/or the document server 6202 include arbitration circuits 6210A, 6210B that coordinate updates between the operation logs 6208 to ensure that applied edits are consistent. The data values 6304 of the document 6206 include, without limitation, text flows, data entries, and/or formula entries in the document 6206. In certain embodiments, data values 6304 of the document 6206 are stored, additionally or alternatively, in one or more tables (e.g., a document definition table 6314) representing the data values 6304 and/or layout of the document 6206. An example system 6200 includes a table representing data values 6304 in the document 6206, and an operation log 6208 including edits since the last version of the table. Additionally or alternatively, the table representing the data values 6304 may be updated, and appropriate elements of the operation log 6208 removed to ensure the application of the operation log 6208 to the current state of the table provides the document 6206 consistent with the current state of the document 6206. Additionally or alternatively, a system 6200 includes creating a snapshot 6312—for example a consolidated operation log 6208 and/or table representing data values 6304. Example operations to create a snapshot 6312 include providing operations that produce equivalent operations to the operation log 6208 prior to the creation of the snapshot 6312, and may further include consolidating operations, providing operations that utilize fewer system resources (e.g., processing cycles, memory utilization, and/or communication bandwidth between devices 6202, 6204, 6212). In certain embodiments, the snapshot 6312 is produced after synchronizing operation logs 6208. In certain embodiments, for example where a client computing device 6204, 6212 accesses the document 6206, the snapshot 6312 is provided as the operation log 6208, and/or in conjunction with the operation log 6208 (e.g., where the operation log 6208 includes additional operations occurring after the creation of the snapshot 6312).

The example system 6200 includes a formula engine 6302, which may be a part of the document 6206 and/or provided separately from the document 6206. In certain embodiments, the formula engine 6302 is provided as a part of a unified document surface application circuit 6216—for example a first instance of the unified document surface application circuit 6216A on the first client computing device 6204 and a second instance of the unified document surface application circuit 6216B on the second client computing device 6212. The example formula engine 6302 determines a calculation definition 6306 in response to at least one formula 6308 of the document 6206. A calculation definition 6306, as used herein, includes operations to determine formulas, look-up values, reference values, and the like within the document 6206. An example calculation definition 6306 includes pseudo-code, dependency descriptions, invalidation descriptions, operations to be performed to resolve queries, references, and/or formulas, and any other operations performed to implement the document and provide visible results of the document to a user. In certain embodiments, the calculation definition includes requirements for operations for an executable model. Additionally or alternatively, the calculation definition is implemented in code, scripts, and/or relationship information between data values within the document, and/or includes instructions implementable in code, scripts, or the like. In certain embodiments, any information that at least incrementally informs a formula, query, and/or reference set, or other aspects of the document, toward building executable code to perform the operations of the formulas, queries, and/or reference look-ups is contemplated within the meaning of a calculation definition as used herein.

In certain embodiments, the formula 6308 is provided as a part of the data values 6304 of the document 6206, and/or the formula 6308 is provided on the operation log 6208. The example system 6200 includes a document object model 6309, where the document object model 6309 includes an object definition 6310 corresponding to each of a number of objects 6320 in the document 6320. The example document object model 6309 is depicted on the document 6206, but may additionally or alternatively be provided as a part of a unified document surface application circuit 6216, and/or provided by the document server 6202—for example when a client computing device 6204, 6212 accesses the document 6206. In certain embodiments, the document object model 6309 is updated in real time, for example with the addition of applicable objects 6320 into a document 6206, and/or as a part of an update of the system 6200. An example document object model 6309 includes object definitions 6310 for utilized objects 6320 in the document 6206, for all possible objects that are utilizable in the document 6206, and/or for a predetermined set of possible objects, where additional object definitions 6310 are available upon utilization and/or request. Example object definitions 6310 include a hierarchy of objects in a document 6206, properties, methods, and/or events available to objects, modifications to objects for the particular system 6200 and/or implemented by a user, inheritance of properties between objects, new object classes created by a user, administrator, document template, or the like.

An example document 6206 is at least partially positioned on at least one of the document server 6202 and a first client computing device 6204. An example system 6200 includes a first version of the document 6206A positioned on the document server 6202, a second version of the document 6206B positioned on the first client computing device 6204, and where the first client computing device 6204 includes the arbitration circuit 6210A that synchronizes the first version of the document 6206A and the second version of the document 6206B, thereby creating an updated document 6206D. An example system 6200 further includes a second client computing device 6212, where a third version of the document 6206C is positioned on the second client computing device 6212, and where the arbitration circuit(s) 6210A, 6210B are further structured to synchronize the first version of the document 6206A, the second version of the document 6206B, and the third version of the document 6206C, thereby creating the updated document 6206D. In certain embodiments, the document 6206 includes the snapshot 6312 and/or a document definition table 6314, where the snapshot 6312 and/or the document definition table 6314, combined with the operations of the operation log 6208, provide a definition of data values 6304 of the document 6206.

An example system 6200 includes the document 6206 further including the snapshot 6312 and/or the document definition table 6314, where the document server 6202 further includes a document consolidation circuit 6214 that updates the snapshot 6312 and/or the document definition table 6314. Example and non-limiting operations of the document consolidation circuit 6214 include any operations of the systems and procedures of the portion of the disclosure referencing FIGS. 1 through 7 and FIG. 62. An example updated snapshot 6316 includes sequential operations defining at least one second sequential operation, wherein the at least one second sequential operation, if executed, results in a consolidated document 6206 equivalent to the document 6206 before updating the snapshot 6312. An example and non-limiting updated snapshot 6316 includes at least one of: the second sequential operation including fewer processor operations than the first sequential operation; the second sequential operation including fewer logical operations than the first sequential operation; the second sequential operation including a simplified description of operations than the first sequential operation; and/or the second sequential operation comprising lumped operations relative to the first sequential operation. An example document consolidation circuit 6214 further clears the operation log 6208 and/or reduces operations in the operation log 6208 in response to the updated snapshot 6316—for example moving certain operations from the operation log 6208 to the updated snapshot 6316, and leaving other operations in the operation log 6208. Example and non-limiting considerations for determining to leave operations in the operation log 6208 include leaving un-synchronized and/or conflicting operations (e.g., between a number of users and/or client computing devices) in the operation log 6208, moving only a portion of the operations to reduce a computation time of the updated snapshot 6316, and/or leaving certain types of operations in the operation log 6208 and moving other types of operations to the updated snapshot 6316.

An example system 6200 includes the document 6206 further including the document definition table 6314, and where the document server 6202 further includes the document consolidation circuit 6214 updating the document definition table 6314, where the updated document definition table 6318 includes the document definition table 6314 having at least a portion of the first sequential operation(s) applied thereto. For example, certain operations of the operation log 6208 may be applied to create the updated document definition table 6318, and certain other operations of the operation log 6208 may be left in the operation log 6208 and/or moved to an updated snapshot 6316. In certain embodiments, the snapshot 6312 and/or updated snapshot 6316 includes the document definition table 6314 and/or the updated document definition table 6318. In certain embodiments, multiple versions of the operation log 6208, snapshot 6312, and/or document definition table 6314 may be stored in the system 6200, for example allowing recovery of previous versions or states of the document 6206 and/or any document objects 6320 therein, allowing for queries to previous versions or states of the document 6206 and/or any document objects 6320 therein, and/or allowing for change tracking and/or version control of the document 6206. An example system 6200 further includes the document consolidation circuit 6214 performing at least one of clearing the operation log 6208 and reducing the operation log 6208 in response to the updated document definition table. Example and non-limiting considerations for determining to leave operations in the operation log 6208 include leaving un-synchronized and/or conflicting operations (e.g., between a number of users and/or client computing devices) in the operation log 6208, updating the document definition table 6314 to move only a portion of the operations to reduce a computation time of the updated document definition table 6318, and/or leaving certain types of operations in the operation log 6208 and applying other types of operations to the updated document definition table 6318.

In certain embodiments, the document object model 6309 includes a hierarchical object structure, and further includes objects 6320 of the document associated consistent with the document object model 6309. An example hierarchical object structure includes, in descending order, a document object (e.g., an object at the document 6206 level), a canvas object, a section object, and/or a table object. In certain embodiments, objects can be ordered in any parent-child relationship of objects. An example document object model 6309 further includes the names (e.g., reference names, display names, primary key, and/or reference identifying information), and/or further includes associations and relationships between document objects 6320. In certain embodiments, the document object model 6309 is included on, in whole or part, the operation log 6208, the snapshot 6312, and/or the document definition table 6314. In certain embodiments, instances of document objects 6320, consistent with the document object model 6309 and/or modified by a user, administrator, and/or rules such as in document template rules, are stored on, in whole or part, the operation log 6208, the snapshot 6312, and/or the document definition table 6314. Referencing FIG. 63, an example document object model 6309 is depicted illustrating example relationships between document objects 6320 in an example document 6206. An example hierarchical object structure further includes objects such as: a range object (e.g., allowing for referencing of grouped data values 6304 or objects 6320 such as portions of a text flow, cells within a table, and/or a group of tables), a text object, a line object (e.g., a sentence, line of text, formula or portion of a formula, etc.), a span object (e.g., a sentence, a paragraph, text in a table cell, etc.) and/or a tag object (e.g., allowing for automatic and/or selected labeling of features or objects 6320, providing the ability to reference them together—such as bold text, pivot table, and/or an arbitrary reference such as "Tag1").

An example system 6200 includes the hierarchical object structure further providing a scope definition 6322 corresponding to each of the objects 6320 of the document. An example scope definition 6322 includes a data scope value (e.g., providing for local variables, global variables, and/or selected scope variables such as "canvas", "sheet", "table", or the like); a referencing scope value (e.g., providing for reference name uniqueness scoping, such as table names, canvas names, sheet names, tag names, and/or any other object names; where names can be display names, reference names, primary keys, and/or another identifier for an object); a formula scope value (e.g., providing for selected scope of formula reach, reference ability, and/or uniqueness enforcement); a scope depiction value (e.g., defining how scope values are communicated, displayed, and/or provided to the user); and a scope configurability value (e.g., defining rules by which the user, administrator, and/or any system 6200 component can change, update, and/or vary any scope value or scope definition 6322 in the document 6206). In certain embodiments, the scope definitions 6322 are accessible to the user (e.g., in a system table) and/or may be constrained or amendable by the user, an administrator, any component of the system 6200, and/or may be amended in response to operations of the user (e.g., where a user enters a locally non-unique table name, an example system 6200 updates the scope definition 6322 to provide a unique identifier for the tables such as a primary key, and updates the scope definition 6322 to allow for the operations by the user). In another example, the scope definitions 6322 are enforced, operations to enforce the scope definitions 6322 include prompting a user in response to an invalid entry, applying a change to the user invalid entry (e.g., adding a character such as a sequential numeric character to a user entry that would otherwise not be compliant with the scope definition 6322).

An example formula engine 6302 further includes an environment definition circuit 6324 that interprets at least one environment variable 6326, and the first client computing device 6204 includes a unified document surface application circuit 6216A that, at least selectively, provides a document view 6218 including the at least one environment variable 6326. Example and non-limiting environment variables 6326 include a user location value, an offset user document access indicator (e.g., a notification to the user that another user is accessing the document; a display operation on the document when another user is editing the document at the display location or another location; and/or a list of at least some of the users currently accessing the document); a user focus value (e.g., an object identifier, document location, and/or current operation being performed by the user); and/or a system time value (e.g., a time of day, calendar date, etc.). In certain embodiments, the environment variable 6326 is accessible to the system 6200, for example to determine contextual information about the user for performing certain operations described throughout the present disclosure, and/or to provide the environment variable 6326 and/or information determined in response to the environment variable 6326 to the user-such as in completing formulas, suggesting reference values, and/or displaying options to the user in any context. An example unified document surface application circuit 6216A further includes a formula assistant circuit 6219A that exposes the environment variable(s) to a formula editor 6220. An example system 6200 includes a user interacting with a formula editor 6220—for example making an intentional selection to open the formula editor 6220 and/or performing an operation where the formula editor 6220 is contextually opened for the user—and wherein the formula assistant circuit 6219A exposes the environment variable(s) 6326 to the formula editor 6220 to make the environment variable(s) 6326 available for display—such as: options for completing an entry by the user; as all or a part of an available property, method, event, or the like for an object 6320; and/or as a reference value accessible to the user.

An example system 6200 further includes the unified document surface application circuit 6216A, 6216B further including an authorization circuit 6222A, 6222B that interprets an external data source request 6224, and provides an access to an external data source 6226 in response to the external data source request 6224. In certain embodiments, the authorization circuit 6222A, 6222B prompts a user for authorization information (e.g., a username, login ID, password, etc.) and/or accesses authorization information accessible to the document, system, a client computing device, the document server, or the like. Accordingly, the user can access external data sources 6226 according to available permissions specific to the user, entered into a document for use during a project, according to a subscription where the subscription information is entered into the document, document server, client computing device, or otherwise within or accessible to the system. An example authorization circuit 6222A, 6222B further stores an authorization token corresponding to the external data source 6226 in the document 6206, where the authorization token includes at least one access value such as: an access type (e.g., read operations, edit operations, write operations, and/or delete operations); an access scope (e.g., accessible portions of the external data source 6226, including differential access types according to the portion of the external data source 6226); an access duration (e.g., a session duration of access, applicable calendar time of access, allowed access times for operations to access the external data source 6226 and/or portions thereof, including differential times for certain access types and/or portions of the external data source 6226); and/or expiration values for the authorization token); and/or an access reauthorization time value (e.g., a time to prompt the user for reauthorization, an expiration time for a session, subscription, or the like, and/or expiration values for the authorization token). An example authorization circuit 6222A, 6222B provides access to a second user in response to the authorization token and the access scope. It can be seen that the operations of the authorization circuit 6222 provide for convenient authorization of access to external data sources 6226 for one or more users of the document, while providing for security and scheduled access to the external data source 6226. Additionally or alternatively, an administrator, document owner, and/or a user can extend access if permitted to other users of the document in a scheduled manner. Additionally or alternatively, a user does not need to know the details of accessing the external data source 6226, such as calling and engaging APIs for the external data source 6226. The example authorization circuit 6222 provides for a configurable front-end for the user to access external data sources 6226 having only limited information to provide authorization, such as login information to the external data source 6226, to the document 6206, and/or as determined according to information about the user (e.g., role, employee identification, user identification, associated project authorizations, etc.) accessible to the system 6200. Example and non-limiting external data sources 6226 include any external data source, external source data, and/or source data described throughout the present disclosure.

An example system 6200 further includes the unified document surface application circuit 6216 interpreting a user comment value 6234, and providing a document view 6218 including the user comment value 6234. An example unified document surface application circuit 6216 interprets a user review value 6232, and provides a table view of at least one user comment value 6234 in response to the user review value 6232. For example, one or more users collaborating on a document 6206 provide user comment values 6234 to the document 6206, and a user enters the user review value 6232 to provide a display of comments, to flag or highlight comments, and/or to provide a display of comments having a specific tag, from specific users, related to a particular project, and/or provided to selected document sections and/or objects. An example document object model 6309 further includes a comment object type, where the unified document surface application circuit 6216 is further structured to associate the user comment value 6234 with the comment object type. An example system 6200 allows for utilization of the comment object type to rapidly access comments, reference comments (e.g., in a formula 6308, report, compilation into a table, etc.), manipulate or amend comments, aggregate comments (e.g., by including user comments according to the comment object type in a pivot table), and/or to relate comments to objects within the document. Additionally or alternatively, an example system 6200 provides for notifications and/or alerts in response to the entry of a user comment value 6234, including notifications and/or alerts as described throughout the present disclosure, including without limitation to the disclosure referencing FIGS. 34 to 36.

Figure 64:
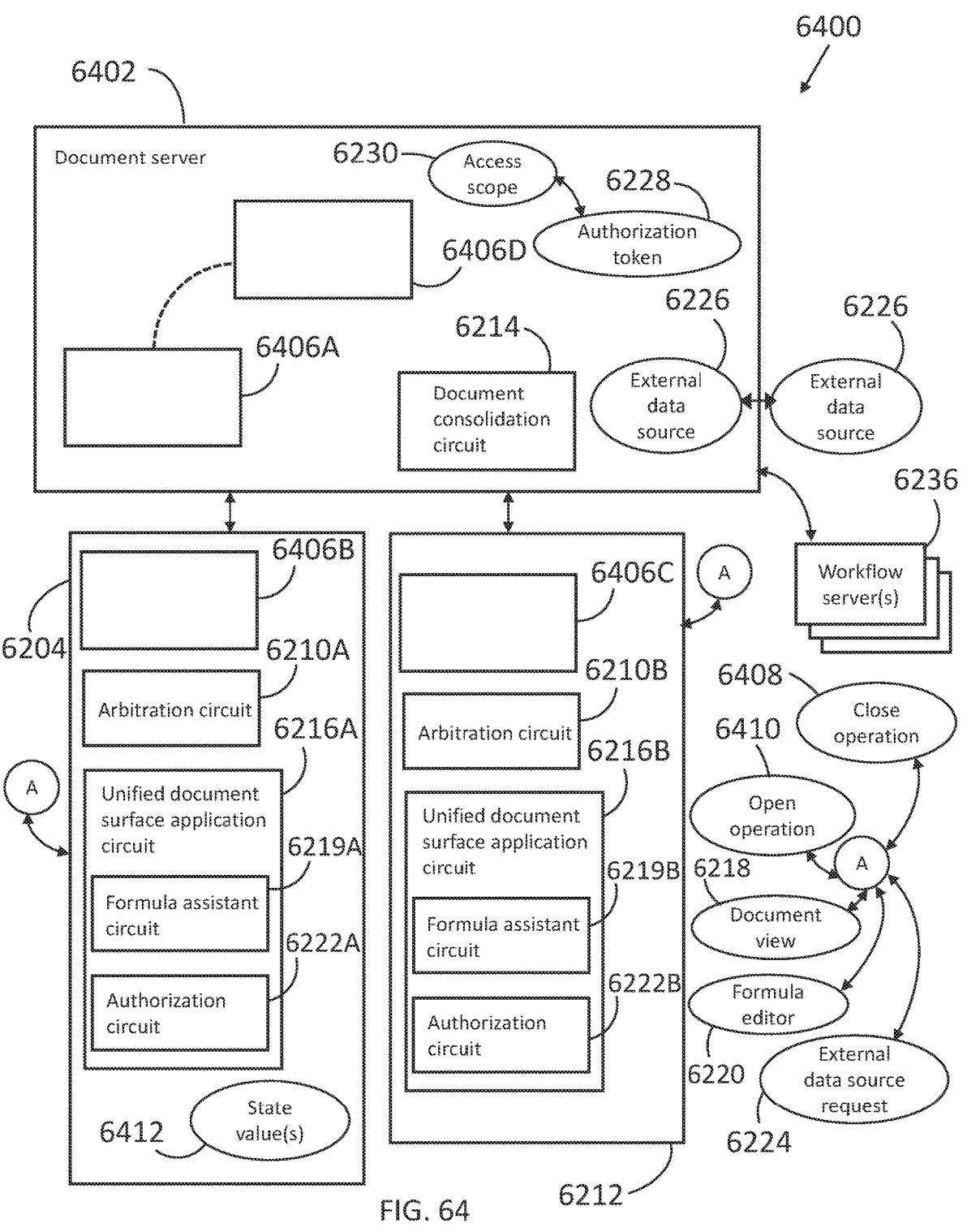
FIG. 64 is a schematic depiction of a system for updating an operation log.
Figure 65:
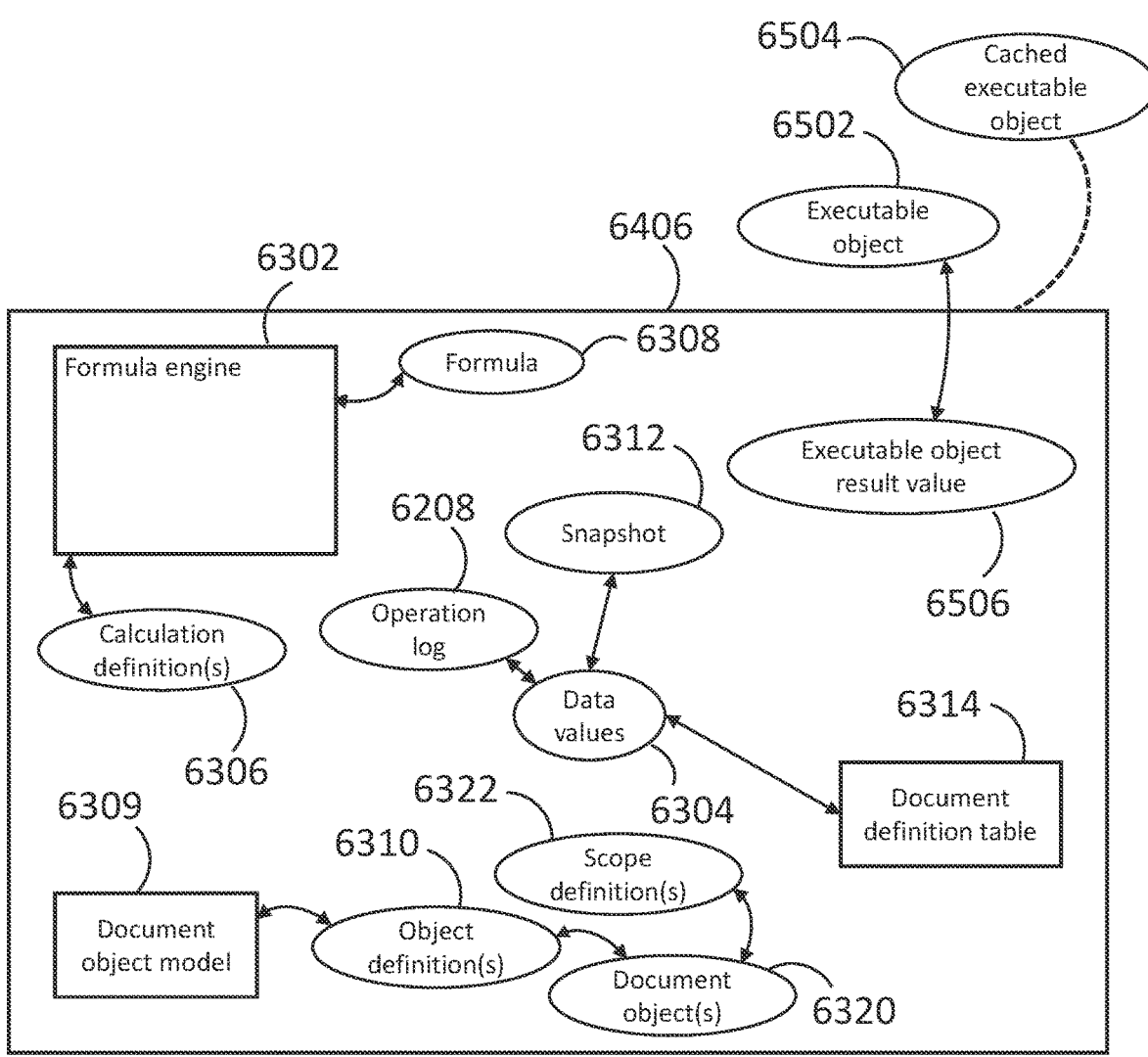
FIG. 65 is a schematic depiction of a system for operating a formula engine.

Referencing FIG. 64, an example system 6400 includes a document server 6402 communicatively coupled to at least one client computing device 6204, 6212, and a document 6406 including an operation log 6208, where the operation log 6208 includes at least one first sequential operation defining operations to create data values 6304 of the document. The example system 6400 further includes a formula engine 6302, where the formula engine 6302 determines a calculation definition 6306 in response to at least one formula 6308 of the document 6206, and where the formula engine 6302 generates an executable object 6502 (e.g. reference FIG. 65) in response to the calculation definition 6306. In certain embodiments, the document 6406 includes the executable object 6502, and/or the executable object 6502 is stored on the document server 6402 and/or a client device 6204, 6212 and accessible at run-time in relation to the document 6406. The example system 6400 includes the document 6406 at least partially positioned on the document server 6402 and/or a first client computing device 6204. In certain embodiments, the document 6406 includes the executable object 6502 during run-time operations of the document server 6402 and/or a client device 6204, 6212.

An example formula engine 6302 further deletes the executable object 6502 in response to a close operation of the document 6406 on the client computing device 6204—for example in a system 6400 where the executable object 6502 is created at run-time for the document 6406. An example formula engine 6302 further generates the executable object 6502 in response to an open operation of the document 6406 on the client computing device 6204—for example in a system 6400 where the executable object 6502 is created at run-time for the document 6406. In certain embodiments, the formula engine 6302 further caches the executable object 6502 in response to a close operation of the document 6406 on the first client computing device 6204—for example to save the executable object 6502 for potential re-use during a later run-time operation of the unified document surface application circuit 6216 on the document 6406. An example formula engine 6302 further accesses the cached executable object 6504 in response to an operation of the document 6406 on the client computing device 6204, and/or the formula engine 6302 verifies the cached executable object 6504 in response to the open operation of the document 6406 on the client computing device 6204. The verification of the cached executable object 6504 includes determining whether edits to the document have occurred since the cached executable object 6504 was created, and whether the edits made allow for the utilization of all or a portion of the cached executable object 6504.

In certain embodiments, the executable object 6502 is an execution instruction to implement operations of the document 6406, including queries, reference values, calculations, and the like. The executable object 6502 may be implemented as a script operating within an environment on the client computing device 6204, 6212, such as a JavaScript object operating in a browser or other executing environment, although any scripting language or element, any computing language, and/or any executing environment, are contemplated herein. In certain embodiments, the executable object 6502 is determined from the data values 6304 in the document 6406, such as described in the operation log 6208, snapshot 6312, and/or document definition table 6314. The inclusion of the executable object 6502 on a client device 6204, 6212 provides for a responsive document access experience for the user, as well as the full power of features available to the user even where the user may be working offline or with intermittent connectivity. However, it will be understood that the provision of the executable object 6502 on the client device may tax the resources of certain client devices, and/or provide for a longer open time of a document having a large number of formulas, queries, and other active elements implemented through the executable object 6502. Accordingly, in certain embodiments, certain aspects, or all aspects, of the executable object 6502 may be provided by the document server 6402 and/or stored on the document server 6402. Certain considerations for the generation, position in the system, and/or storage of the executable object 6502 include the type of client device, the resources of the client device, a preference expressed by the user, and/or observed response times of the client device accessing the document, editing the document, and/or opening the document.

In certain embodiments, the creation of the execution object 6502 is described as the hydration of one or more aspects of the document 6406. For example, a formula 6308 within the document that specifies a query, but where the executable object 6502 does not yet include operations to perform the query, may be an "unhydrated" formula 6308. After the executable object 6502 is updated to include operations to perform the query, the formula 6308 may be a "hydrated" formula 6308—for example even where the operations of the query have not yet been performed and the returned values have not yet been determined or updated. The utilization of terminology such as "hydrated" is a non-limiting illustration, and any terminology, and/or any systems, methods, or procedures implementing described operations herein, without reference to any particular terminology, are contemplated for example embodiments.

An example system 6400 includes a second client computing device 6212, where the document 6406 is further positioned on the document server 6402 (document 6406A), the first client computing device 6204 (document 6406B), and/or the second client computing device 6212 (document 6406C). The example system 6400 includes a first executable object 6502 stored on the first client computing device 6204, and a second executable object stored 6502 stored on the second client computing device 6212. It can be seen that the same document 6406 may have separate executable objects 6502 stored on separate devices accessing the document 6406—for example to reflect context variables within formulas, queries, etc. that differ between devices (e.g., current user, system time, user location, user focus location, predicted second user focus location, etc.), to reflect differential edits on the client devices 6204, 6212 that have not yet been synchronized or reconciled, and/or to reflect local settings of objects within a document (e.g., controls, run-time selections, and/or other volatile settings that are local to the client device 6204, 6212, the user, and/or are cleared upon a close operation of the document 6406).

An example executable object 6502 includes instructions which, upon execution, cause the document server 6402, a client computing device 6204, 6212, and/or a workflow server 6236 to perform operations in response to the calculation definition 6306 (e.g., operations to calculate formulas, look up reference values, and/or perform queries). Example executable objects 6502 include, without limitation: an executable instruction object; a script object; a javascript object; and/or a Perl object. An executable object 6502 may be operated within an application environment (e.g., as a script), and/or may include assembly code, compiled code, or other executable elements. The example system 6400 includes workflow server(s) in communication with the document server 6402, and where the executable object 6502 further includes instructions which, upon execution, cause at least one of the document server 6402, the client computing device 6204, 6212, and/or a workflow server 6236 to perform operations to provide a result value in response to the calculation definition. For example and without limitation, result values include filtered table values, sorted table values, query results, formula results, and/or objects created in response to a formula, control setting, and/or object configuration and/or selection values. An example client computing device 6204, 6212 includes a unified document surface application circuit 6216 that provides a document view 6218 in response to the data values 6304 of the document and the result value of the executable object 6502. An example unified document surface application circuit 6216 provides the document view 6218 in response to a current user location or focus within the document 6406, such as displaying the result values within the observable region of the document 6406 by the user. An example document 6406 further includes a document object model 6309, where the document object model 6309 includes an object definition 6310 corresponding to each of a number of objects 6320 in the document 6406, and where the executable object 6502 further references the document object model 6309.

Figure 66:
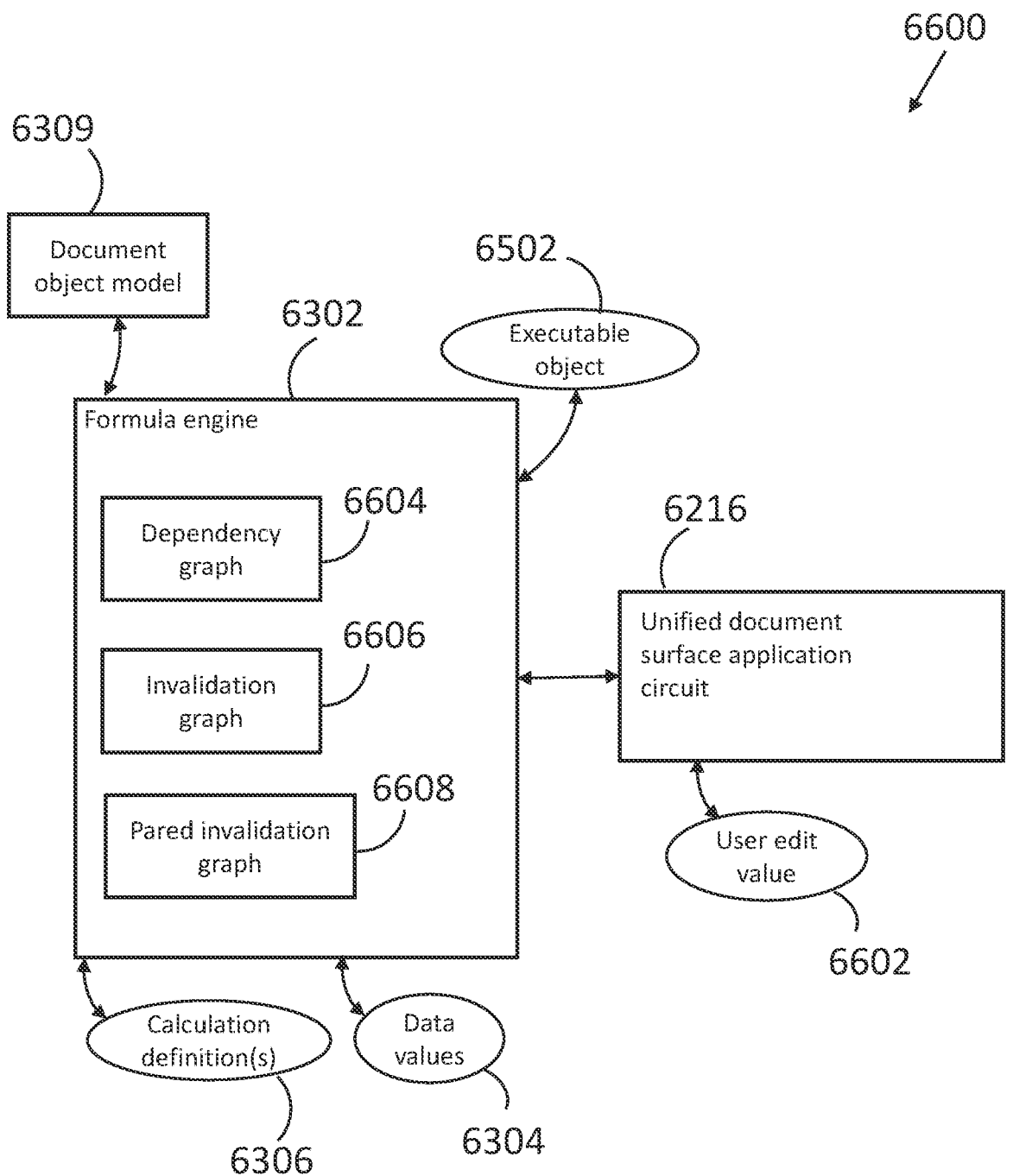
FIG. 66 is a schematic depiction of a system for operating a formula engine.

Referencing FIG. 66, an example formula engine 6302 further constructs a dependency graph 6604 of the document 6406 in response to the executable object 6502, the document model 6309, and/or the data values 6304 of the document. For example, the formula engine 6302 constructs the dependency graph 6604 to determine dependency relationships within objects, data values, and/or formulas within the document 6406. The utilization of the dependency graph 6604 provides for a determination of a change in an object, data value, and/or formula that may indicate that the executable object 6502 should be recalculated, and/or that the executable object 6502 should be operated again to determine updated result values. An example client computing device 6204, 6212 further includes the unified document surface application circuit 6216 further interpreting a user edit value 6602, and where the formula engine 6302 further updates the executable object 6502 in response to the user edit value 6602 and the dependency graph 6604. In certain embodiments, other changes distinct from a user edit value 6602, such as updates in referenced data, external data, and/or environment variables 6326, similarly include the formula engine 6302 updating the executable object 6502 and/or result values in response to those changes. An example dependency graph 6604 includes a virtual conceptualization of dependency relationships between: elements of the data values 6304 of the document; elements of the calculation definition 6306; elements of document objects 6320; and combinations thereof.

Figures 67, 68:
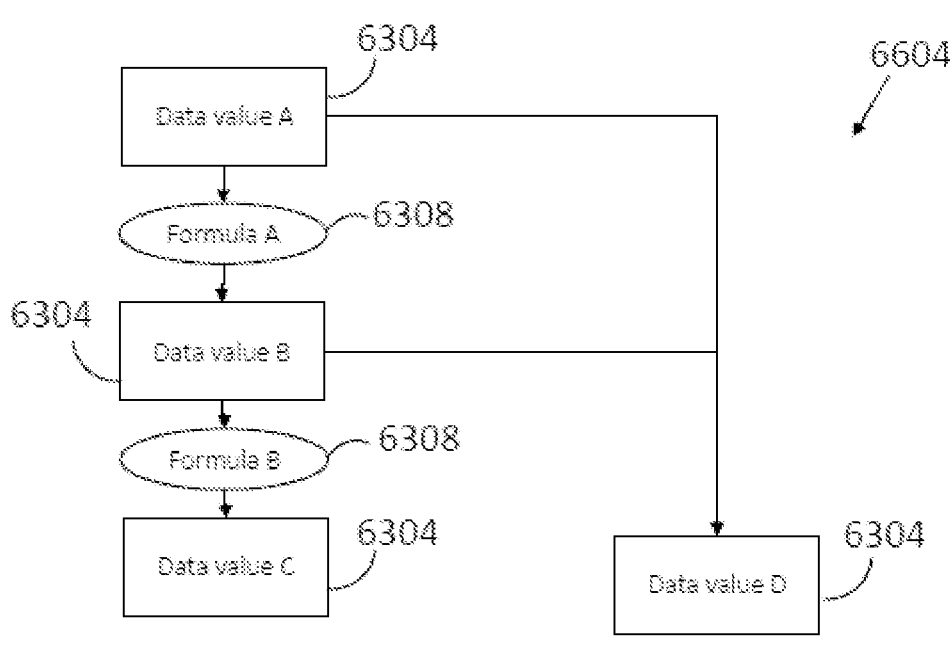
FIG. 67 is a schematic data illustration.
FIG. 68 is a schematic data illustration.

Referencing FIG. 67, an example dependency graph 6604 is depicted, showing dependency relationships between data values 6304 and formulas 6308. For example, data value D 6304 is dependent upon data value B 6304 and data value A 6304. In the example, the dependency graph 6604 allows for the determination of potentially affected elements in response to a change in an element on the dependency graph 6604. It will be understood that a dependency relationship does not mean that a dependent value will actually change—for example if the formula A 6308 returns a TRUE or FALSE value depending upon the value of data value A 6304, then a change in the data value A 6304 may result in a change in the data value B 6304, or no change in the data value B 6304.

An example formula engine 6302 further constructs an invalidation graph 6606 in response to the dependency graph 6604, the data values 6304 of the document 6406, and/or the calculation definition 6306. In certain embodiments, utilization of only the dependency graph 6604 to propagate changes, recalculation of result values, and/or regeneration of the executable object 6502 may result in more calculations than are needed, and/or redundant calculation operations. An example invalidation graph 6606 provides a virtual conceptualization of elements such as result values, data values, and/or objects, wherein calculations for those elements are no longer deemed valid based on changes in predecessor elements. An example unified document surface application circuit 6216 interprets a user edit value 6602, and the formula engine 6302 further updates the executable object 6502 in response to the user edit value 6602 and the invalidation graph 6606. In certain embodiments, other changes distinct from a user edit value 6602, such as updates in referenced data, external data, and/or environment variables 6326, similarly include the formula engine 6302 updating the executable object 6502 and/or result values in response to those changes.

Figure 107:
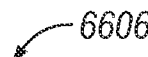
FIG. 107 is a schematic data illustration.
Figure 69:
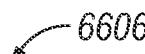
FIG. 69 is a schematic data illustration.

An example formula engine 6302 further pares a redundant aspect of the invalidation graph 6606 and/or a duplicative aspect of the invalidation graph 6606. For example, referencing FIG. 68, an invalidation graph 6606 consistent with the dependency graph 6604 is depicted. The invalidation graph 6606 is organized with a first value in the first column, and values in a second column within the document 6406 that are no longer valid after the change in the first value. It can be seen that the relationships within the invalidation graph 6606 do not require tracing through the entire dependency graph 6604 in response to a change in a value, and can therefore enable more efficient updating of result values and/or the executable object 6502 than the use of the dependency graph 6604 alone. The organization of the invalidation graph 6606 is non-limiting, and any virtual conceptualization of invalidation checks for the document 6406 are contemplated herein. Referencing FIG. 107, a pared invalidation graph 6606 removes certain redundant invalidation checks, yet still provides for sufficient invalidation checks according to the dependency graph 6604 of FIG. 68. For example, a check of data value B in response to a change in data value A is redundant, as data value A affects data value B through the operation of formula A. Therefore, a redundant check is eliminated in the pared invalidation graph 6606 depicted in FIG. 107. Referencing FIG. 69, yet another pared invalidation graph 6606 is depicted, removing certain duplicative checks still further relative to the pared invalidation graph 6606 of FIG. 107. For example, although data value A invalidates data value D, that check is duplicative as data value A also invalidates data value B, which also invalidates data value D. Accordingly, the relationship between data value A and data value D is a duplicative check, which can be removed to save processor and recalculation time. It can be seen additionally that the order of calculations can affect the invalidation order and the operations. For example, if data value A is changed, and data value D is changed in response, then data value D will need to be recalculated again after the data value B is updated. Accordingly, the invalidation graph 6606 and recalculation order is selected, in certain embodiments, to reduce the number of invalidation checks and recalculation operations, such as by completing the recalculation of data value B before recalculating data value D. An example unified document surface application circuit 6216 further interprets a user edit value 6602, and formula engine 6302 further updates the executable object 6502 and/or recalculates result values in response to the user edit value 6602 and the pared invalidation graph 6606.

Figure 70:
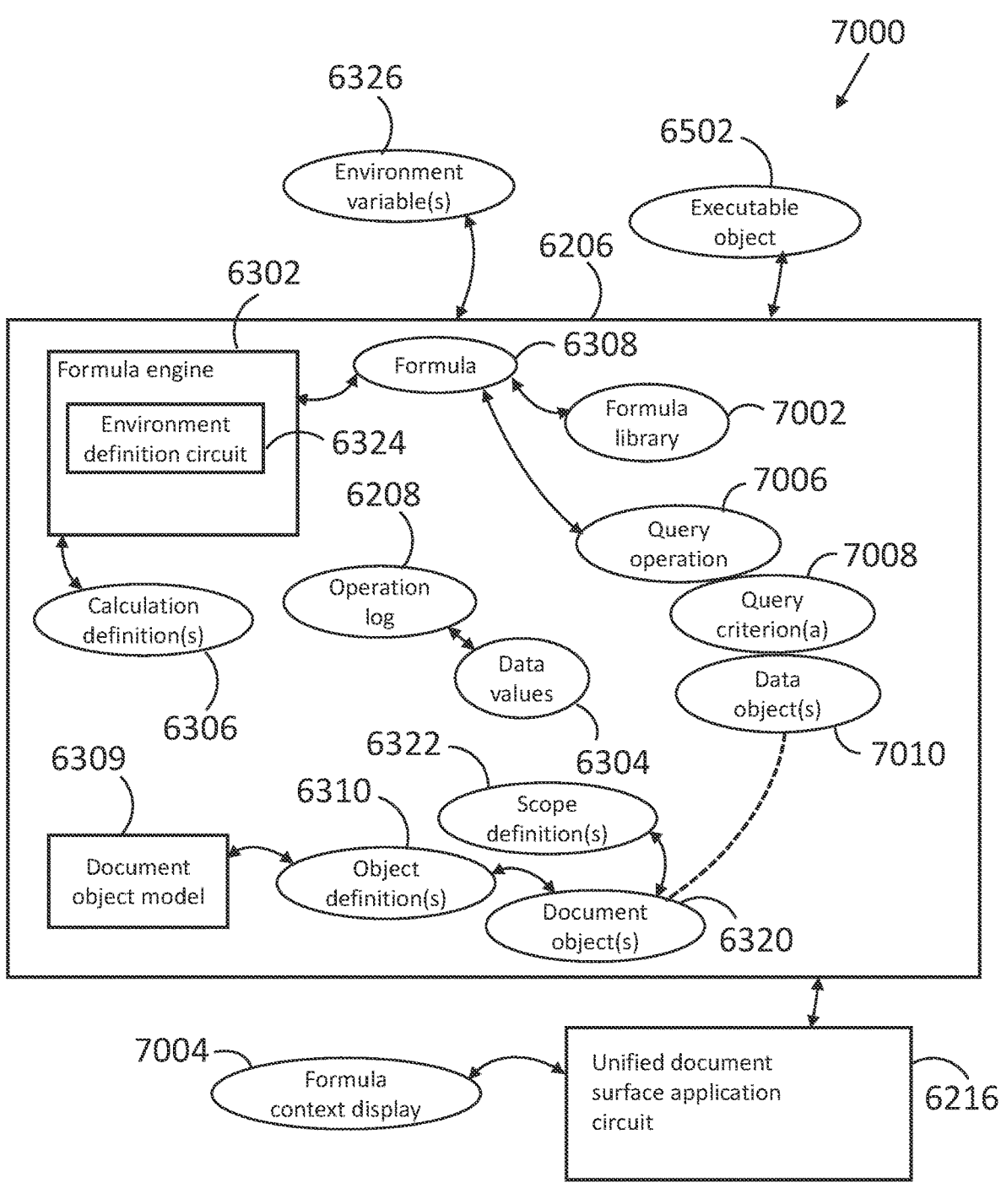
FIG. 70 is a schematic depiction of a system for accessing environmental variables.

Referencing FIG. 70, an example system 7000, for example utilizable in any of the systems described in the present disclosure, includes an executable object 6502 having a resource utilization value. Example and non-limiting resource utilization values include a number of calculations, a number of processor cycle executions, a memory utilization (e.g. maximum memory utilized, RAM utilized, page file or virtual memory utilization, and/or a trajectory of memory utilization over the execution cycle of the executable object 6502), and/or a communication bandwidth utilization (e.g., communications between a document server 6202 and a client computing device 6204, 6212, between the document server 6202 and a workflow server 6236, and/or communications between the document server 6202 and an external data source 6226).

An example formula engine 6302 analyzes instructions of the executable object 6502, and updates the executable object 6502 with a resource reduced executable object 6502. The resource reduced executable object 6502 includes instructions which, upon execution, cause the document server 6202, the client computing device 6204, 6212, and/or the workflow server 6236 to perform operations to provide the result value(s), and includes a reduced execution resource value that includes a lower resource utilization value than the resource utilization value. For example, the formula engine 6302 includes operations to reduce query calculation efforts, to reduce memory utilization, and/or to reduce a communication value such as an external communication value (e.g., communications to the document server 6202 and/or to an external data source 6226). Example and non-limiting reduced executable objects include an indexing operation (e.g., reducing calculations required to complete a query), a sort order operation (e.g., changing a sort order and/or applying a sort to a table object, one or more table columns, etc.), and/or a filter order operation (e.g., applying a more restrictive filter before a less restrictive filter, and/or applying a filter before a sort in a series of operations). In certain embodiments, an order of one or more operations, for example determined according to an invalidation graph 6606, is applied to provide the reduced executable object. In certain embodiments, the order of operations and/or adjustments to operations to result in reduced resources include consideration of the actual data values in the document 6206. For example, at a first point in time where the document 6206 includes a first state of the data values, application of "FilterA" then "FilterB" may result in a reduced resource utilization. In a continuing example, at a second point in time where the document 6206 includes a second state of the data values, application of "FilterB" then "FilterA" may result in a reduced resource utilization. Previously known database optimization routines utilize best practice techniques and estimates of which order of operations will result in an optimal resource utilization, but the optimization routine does not have visibility to the actual data, and accordingly cannot adjust the operations in real-time in response to the data. Additionally or alternatively, resource utilization priorities in a system 6200 may result in a resource utilization that is reduced according to the resource utilization priorities (e.g., to minimize processor usage of a client computing device 6204, 6212, communication bandwidth between devices in the system 6200, and/or memory utilization capped by a client computing device 6204, 6212) but that consumes more resources in another dimension that is not a priority (e.g., memory utilization of a document server 6202 and/or workflow server 6236, communication bandwidth between a document server 6202 and the workflow server 6236). Additionally, resource utilization priorities in the system 6200 may vary during run-time, for example where a user has a mobile device with a low battery, is currently presenting an aspect of a document 6206 to an audience, and/or is under a time constraint for editing and response time is paramount. Previously known database optimization routines cannot respond to the resource utilization priorities expressed in the system 6200 at run-time.

An example system 6200 includes the document server 6202 dividing operations of the executable object 6502 between at least two of the document server 6202, a client computing device 6204, 6212, and/or a workflow server 6236. For example, the document server 6202 can determine current workloads in the system to support document access, and/or predicted workloads in the system (e.g., based on a number of users logged in, operations of those users, and/or historical usage trajectories for users and/or based on time of day, etc.). The example document server 6202 further divides operations in response to a parameter such as: a client computing device resource parameter; contextual information; a current workload of the first client computing device; a current workload of the document server; and/or a current workload of the at least one workflow server. Contextual information includes any contextual information described throughout the present disclosure, including at least response values of the user (e.g., user operations indicating that the user desires a more responsive experience, including an explicit priority request, multiple and/or repeated entries for operations, and/or determined response times relative to a threshold response time for nominal acceptable system response to the user); operations currently being performed by the user; information about the user location; and/or detection of other resources operated on a client computing device 6204, 6212 that are competing for client computing device resources. An example divided operation of the executable object 6502 further includes a query execution operation. An example client device 6204, 6212 includes a unified document surface application circuit 6216 that provides a document view 6218 in response to the query execution operation. For example, the document server 6202 shifts all or portions of the query execution operation to a workflow server 6236, and the unified document surface application circuit 6216 displays relevant portions of results from the query execution operation (e.g., portions visible to the user based on the user location within the document 6206) in the document view 6218.

An example system 6200 includes at least one data value 6304 being a run-time object, for example an object having a data value 6304 that exists during run-time of the document 6206, but that is not stored in the operation log 6208, the snapshot 6312, and/or the document definition table 6314. In certain embodiments, a run-time object is termed a "volatile" object, however the terminology of run-time objects is not limiting to the present disclosure. In certain embodiments, the run-time object includes a state value—for example a value indicating a certain state of the run-time object. Example and non-limiting state values include: a default value; a contextually determined value; and/or a user selected value. An example unified document surface application circuit 6216 stores the state value separate from the document 6206 in response to a close operation of the document 6206. For example, a run-time object includes a state value that is created during run-time, and ordinarily deleted upon the closing of the document. In certain embodiments, example and non-limiting run-time objects include: a selection of a filter or view, a setting of a control, a current state of an open dialog box, a current location within the document, and/or a setting of a control in the document. In certain embodiments, the unified document surface application circuit 6216 stores a state value of the run-time object upon closure of the document 6206, and applies one or more of the stored state values upon an opening of the document

6206. In certain embodiments, the types of state values to be stored are determined according to user preferences, selections, prompts, and/or rules applied by a document owner, user, administrator, and/or a document template. In certain embodiments, a stored state value is specific to a user and/or to a particular client computing device 6204, 6212: for example a first user opens a document and a first value of a control (e.g., a slider tool) is applied for that first user, and a second user opens a document and a second value of the control is applied for that second user. Accordingly, users are able to maintain views, control settings, and other volatile parameters specific to their own access to the document. An example unified document surface application circuit 6216 does not apply one or more stored state values-including, for example, where a control having a stored state value is no longer present within the document 6206 or has been modified to accept different setting values.

The example unified document surface application circuit 6216 further updates the state value with the stored state value in response to an open operation of the document 6206. An example stored state value includes a user specific value. An example run-time object includes a control, such as: a switch control; a multi-state switch control; a multi-picker control; an option list picker control; a dropdown picker control; a numeric slider control; a date slider control; a time slider control; a map picker control; a text box control; a validated text box control; a structured text box control; a card layout control; a drawing shape control; a media visual control; a table renderer control; a chart control; and a shape set control. An example switch control accepts a binary state value for the control—for example a checkbox, button, or the like. An example multi-state switch control provides for a number of options and returns a single value from the control (e.g., a radio button, a virtual dial, etc.). An example multi-picker control provides a number of options, and returns a selected number of options (e.g., up to three) and/or up to all of the options. The number of options selectable on a multi-picker control may itself be selectable and/or configurable. An example numeric slider control provides for a convenient graphical interface such as a slider bar, with a continuous or discrete numeric return from the slider control. The limits of the numeric slider control (e.g. minimum and/or maximum) and/or the resolution of the numeric slider control may be selectable and/or configurable. An example data slider control and/or time slider control provides for a convenient graphical interface, with a time-based return value such as an hour, minute, and/or calendar date return. The range displayed, units, and/or resolution of the data slider control may be selectable and/or configurable. An example map picker control provides a convenient interface to a map region and returns a selection from the map region (e.g., a location, a feature, a bounded region, etc.) and can return the value by quantitative location (e.g., latitude and longitude), qualitative location (e.g., within one of a number of specified regions), and/or with a feature name and/or feature information (e.g., a card generated in response to the feature selected). Example text box controls includes a control that accepts a string of text, a control that includes validation (e.g., applied criteria for the text that must be met for a valid return), and/or a structured text box (e.g., formatted for phone number entry, addressing, etc.), and/or combinations of these. An example card layout control provides a card output having a number of controls positioned to provide a predetermined layout for the user. An example drawing shape control provides a default shape to the user (e.g., a line, rectangle, circle, etc.) and returns a value in response to the shape as adjusted by the user, such as a line length and position, position of vertices, a color value, an area of the shape, and the like. An example a media visual control includes an image and/or media display (e.g., YouTube, HTML, a URL result, etc.) configurable by the user. An example a table renderer control provides a linked table, a list, a card layout, and/or other configurably rendered object (e.g., to allow the user to rapidly prototype a table, lookup a value, etc.). An example chart control includes a selection of configured chart objects, and/or control entries to link aspects of the chart to referencable areas of the document 6206. An example shape set control includes a control allowing the user to construct a visualization element, for example utilizing preconfigured elements of other controls listed herein and/or visualization elements present in the document and/or available in a visualization element library, and can include combinations of any controls described throughout the present disclosure. In certain embodiments, properties and/or state values of a control are volatile elements. Additionally or alternatively, any property and/or state value of a control may be a formula and/or set by a formula, and/or may be stored in the operation log 6208, the snapshot 6312, and/or the document definition table 6314.

An example procedure includes an operation to provide a document including an operation log, where the operation log includes at least one first sequential operation, and an operation to construct the document in response to the operation log. The example procedure further includes an operation to determine a calculation definition in response to at least one formula of the document, to provide an object definition corresponding to each of a plurality of objects in the document, and to synchronize a first version of the document on a first client computing device with a second version of the document on a second computing device. An example operation to synchronize includes creating an updated document. An example procedure includes a third version of the document on a third second client computing device, and an operation to synchronize the first version of the document, the second version of the document, and the third version of the document. An example procedure includes an operation to provide at least one of a snapshot or a document definition table, where the at least one of the snapshot or the document definition table, combined with the at least one first sequential operation, provide a definition of data values of the document.

An example document includes the snapshot, and a procedure includes updating the snapshot, where the updating includes defining at least one second sequential operation, and where the at least one second sequential operation, if executed, results in a consolidated document equivalent to the document before the updating the snapshot. An example updated snapshot comprises at least one of: the second sequential operation comprising fewer processor operations than the first sequential operation; the second sequential operation comprising fewer logical operations than the first sequential operation; the second sequential operation comprising a simplified description of operations than the first sequential operation; and the second sequential operation comprising lumped operations relative to the first sequential operation.

An example procedure further includes an operation to perform one of clearing the operation log and reducing the operation log in response to the updated snapshot. An example document includes the document definition table, and a procedure includes updating the document definition table, where the updating includes defining an updated document definition table having at least a portion of the first sequential operation applied thereto. An example procedure includes performing at least one of clearing the operation log and reducing the operation log in response to the updated document definition table.

An example procedure includes an operation to interpret at least one environment variable, and to selectively provide a document view including the at least one environment variable. Example and non-limiting environment variable(s) include at least one value such as: a user location value; an offset user document access indicator; a user focus value; and a system time value. An example procedure includes an operation to expose the at least one environment variable to a formula editor.

An example procedure includes an operation to interpret an external data source request, and to provide an access to an external data source in response to the external data source request. An example procedure further includes an operation to store an authorization token corresponding to the external data source in the document, where the authorization token includes at least one access value selected from the access values such as: an access type; an access scope; an access duration; and an access reauthorization time value. An example procedure further includes an operation to provide an access to a second user in response to the authorization token and the access scope.

An example procedure includes an operation to interpret a user comment value, and to provide a document view comprising the user comment value. An example procedure further includes an operation to interpret a user review value, and to provide a table view of at least one user comment value in response to the user review value.

Figure 86:
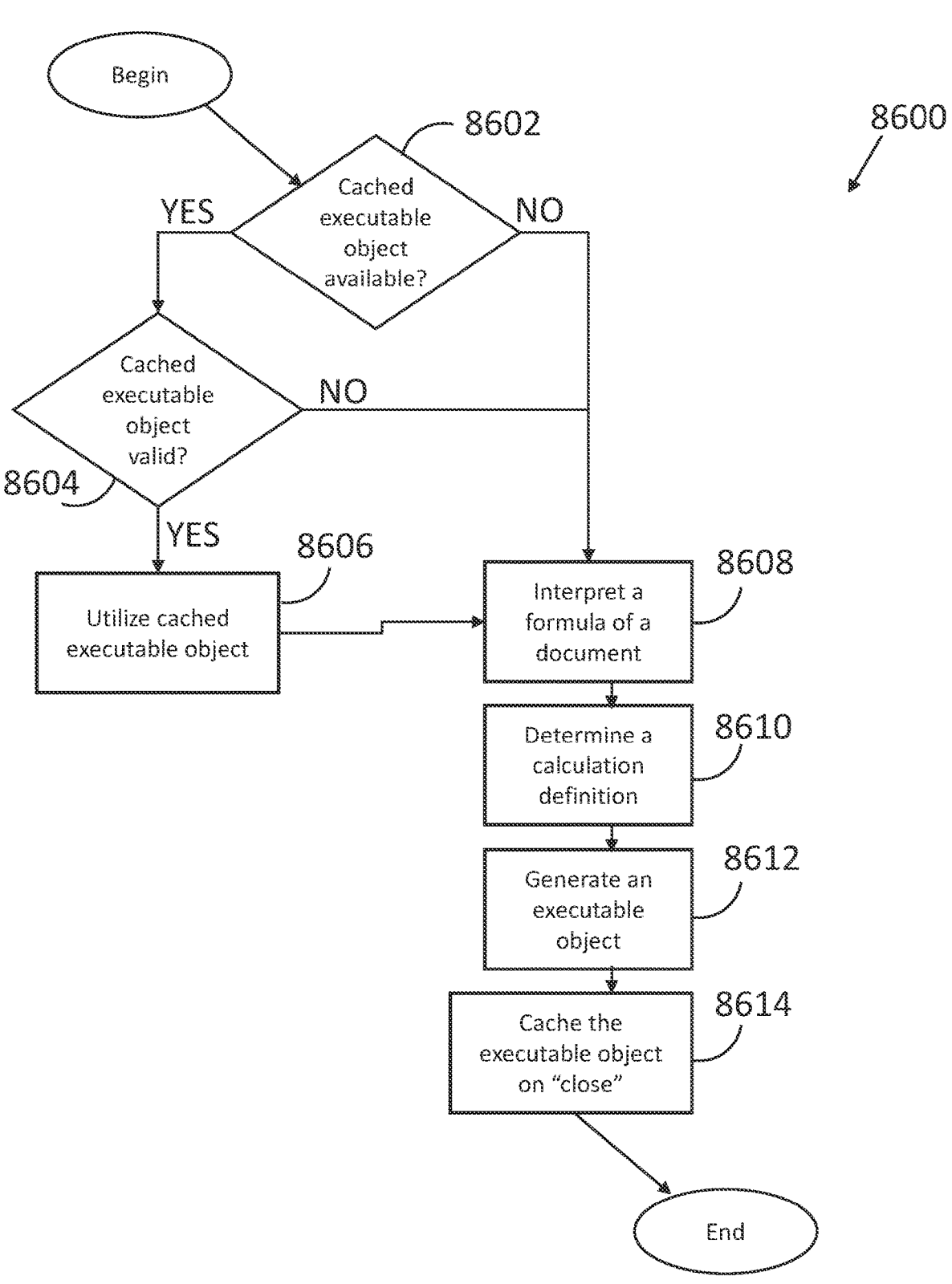
FIG. 86 is a schematic flow diagram of a procedure for working with data.

Referencing FIG. 86, an example procedure 8600 includes an operation 8608 to interpret a formula of a document, an operation 8610 to determine a calculation definition in response to the formula of the document, and an operation 8612 to generate an executable object in response to the calculation definition. An example procedure 8600 further includes an operation to delete the executable object in response to a close operation of the document on a first client computing device. An example procedure includes an operation 8602 to determine whether a cached executable object is available in response to an open operation of the document. Where the operation 8602 indicates "YES", the example procedure 8600 includes an operation 8604 to determine whether all or a portion of the cached executable object is valid. Where the operation 8604 indicates "YES", the procedure 8600 includes an operation 8606 to selectively utilize at least a portion of the cached executable object. An example procedure 8600 further includes an operation 8614 to cache the executable object on a close operation of the document.

Figure 87:
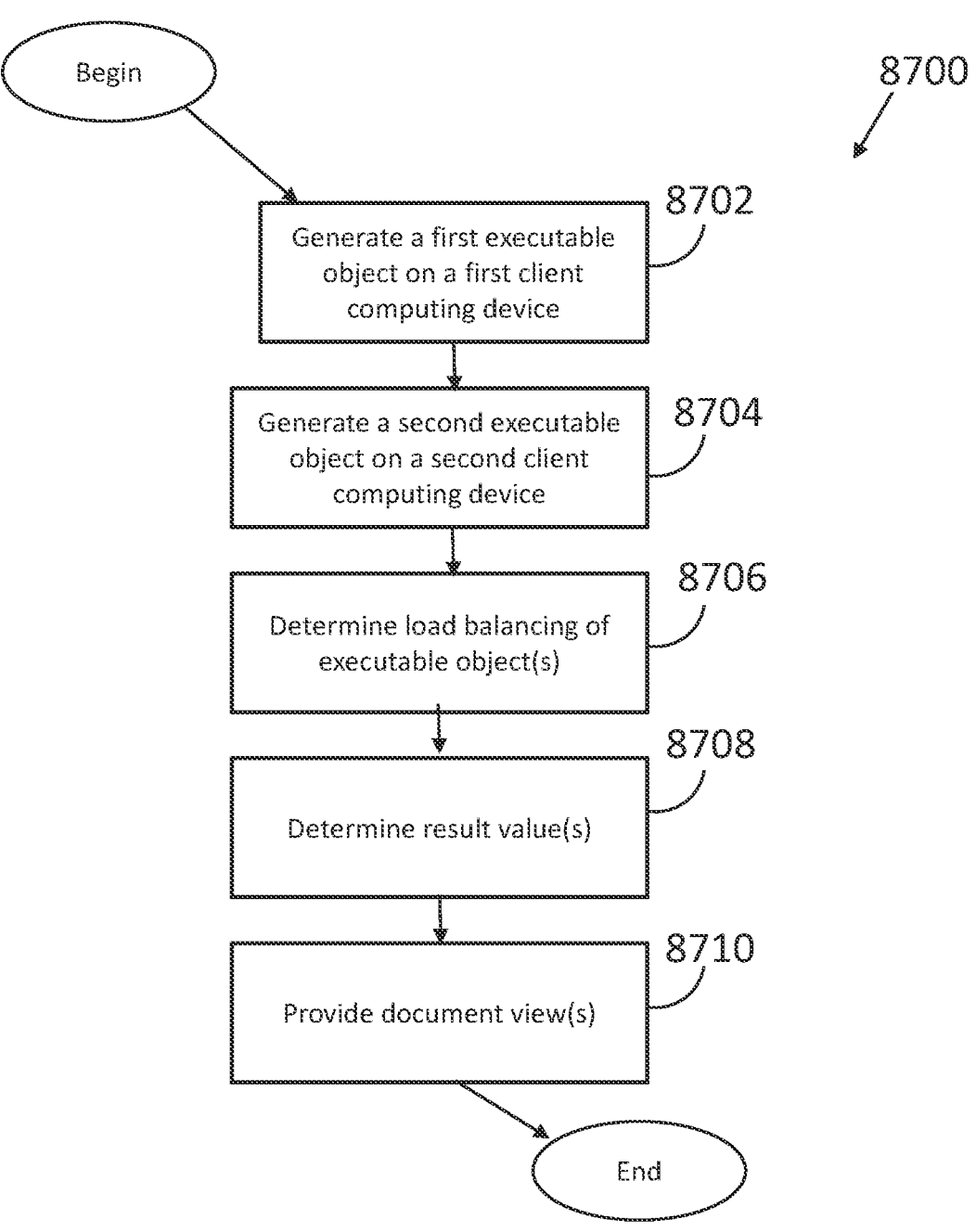
FIG. 87 is a schematic flow diagram of a procedure for working with data.

Referencing FIG. 87, an example procedure 8700 includes an operation 8702 to generate a first executable object on a first client computing device, and an operation 8704 to generate a second executable object on a second client computing device. The example procedure 8700 further includes an operation 8706 to determine a load balancing of executable objects between available computing resources (e.g., a document server, client computing devices, and/or workflow servers), and selectively divide operations of the first and second executable objects between the available computing resources. The example procedure 8700 further includes an operation 8708 to determine result values utilizing the first and second executable objects, and an operation 8710 to provide document views in response to the result values.

Figure 88:
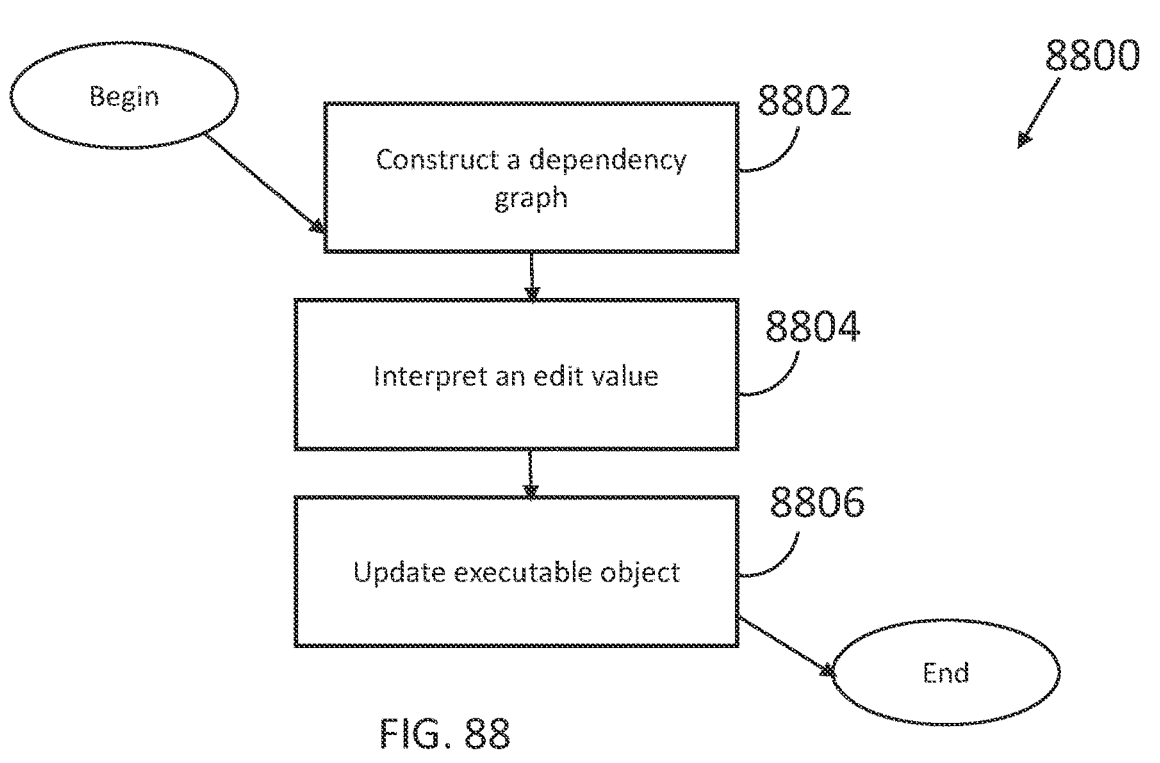
FIG. 88 is a schematic flow diagram of a procedure for working with data.

Referencing FIG. 88, an example procedure 8800 includes an operation 8802 to construct a dependency graph of a document in response to the executable object, a document model, and at least one data value of the document, and an operation 8804 to interpret an edit value (e.g., from a user update, reference update, contextual information change, and/or external data source change). An example procedure 8800 further includes an operation 8806 to update the executable object in response to the edit value and/or the dependency graph.

Figure 89:
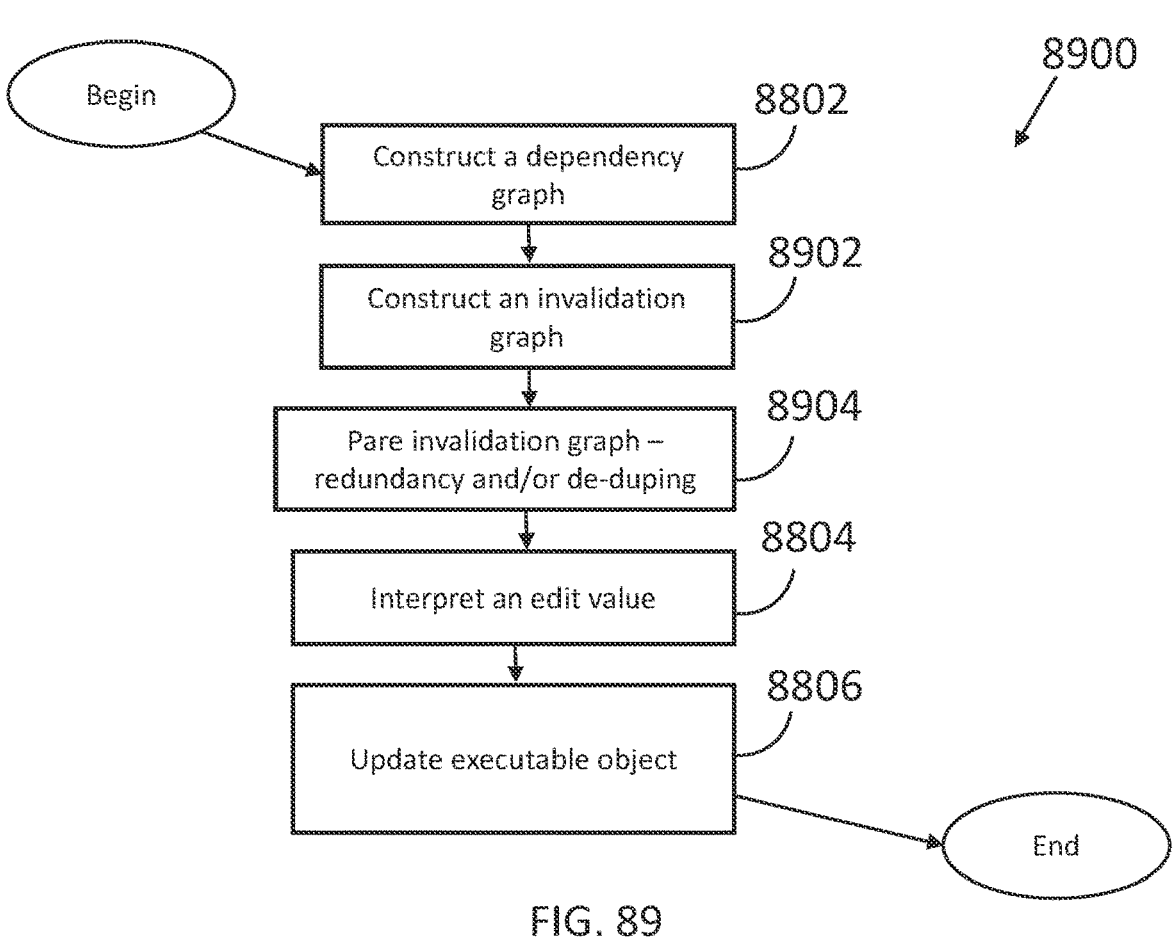
FIG. 89 is a schematic flow diagram of a procedure for working with data.

Referencing FIG. 89, an example procedure 8900 further includes an operation 8802 to construct a dependency graph, an operation 8902 to construct an invalidation graph in response to the dependency graph, the at least one data value of the document, and the calculation definition. The example procedure 8900 further includes an operation 8904 to pare the invalidation graph, wherein the paring operation includes removing redundancy and/or de-duplicating ("deduping") the invalidation graph. The example procedure 8900 further includes an operation 8804 to interpret an edit value (e.g., from a user update, reference update, contextual information change, and/or external data source change), and an operation 8806 to update the executable object in response to the edit value and/or the invalidation graph. Referencing FIG. 90, an example procedure further includes an operation 9002 to determine an order of operations for the executable object in response to the invalidation graph, and an operation 8806 to further update the executable object in response to the order of operations determined in response to the invalidation graph.

Figure 91:
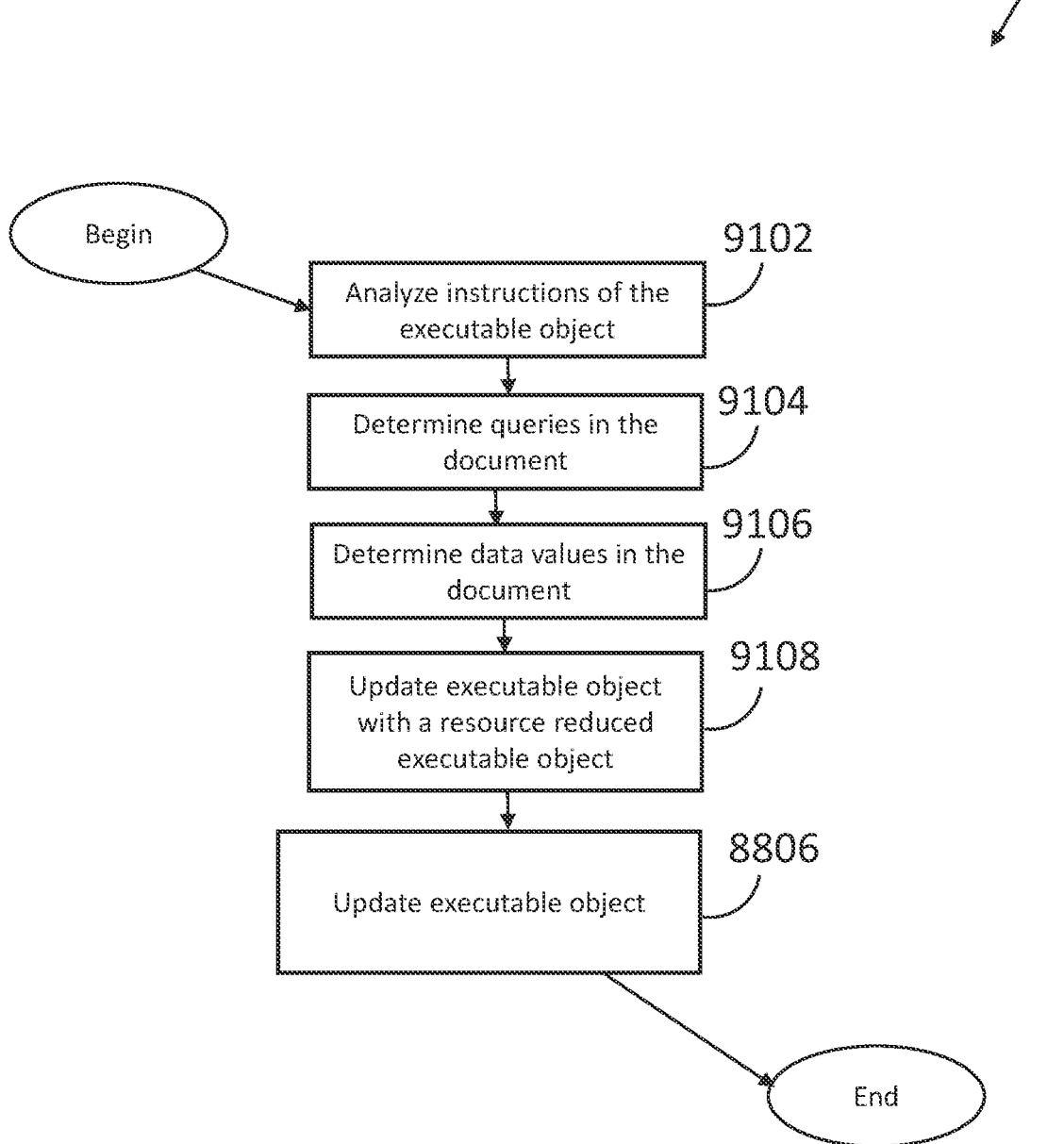
FIG. 91 is a schematic flow diagram of a procedure for working with data.

Referencing FIG. 91, an example procedure 9100 includes an operation 9102 to analyze instructions of the executable object, and an operation 9108 to update the executable object with a resource reduced executable object, where the resource reduced executable object includes instructions which, upon execution, cause at least one of the document server, the client computing device, and/or a workflow server to perform operations to provide the result value. An example procedure 9100 includes an operation 9104 to determine queries in the document, an operation 9106 to determine data values in the document, and wherein the operation 9108 is further in response to the queries and/or the data values.

Example operations 8706 to load balance and/or selectively divide operations of the first executable object include dividing operations in response to at least one of: a client computing device resource parameter; contextual information; a current workload of the client computing device; a current workload of the document server; and/or a current workload of the at least one workflow server. Example operations 8706 to divide operations of the executable object further include dividing and/or moving query execution operations of the executable object.

Figure 92:
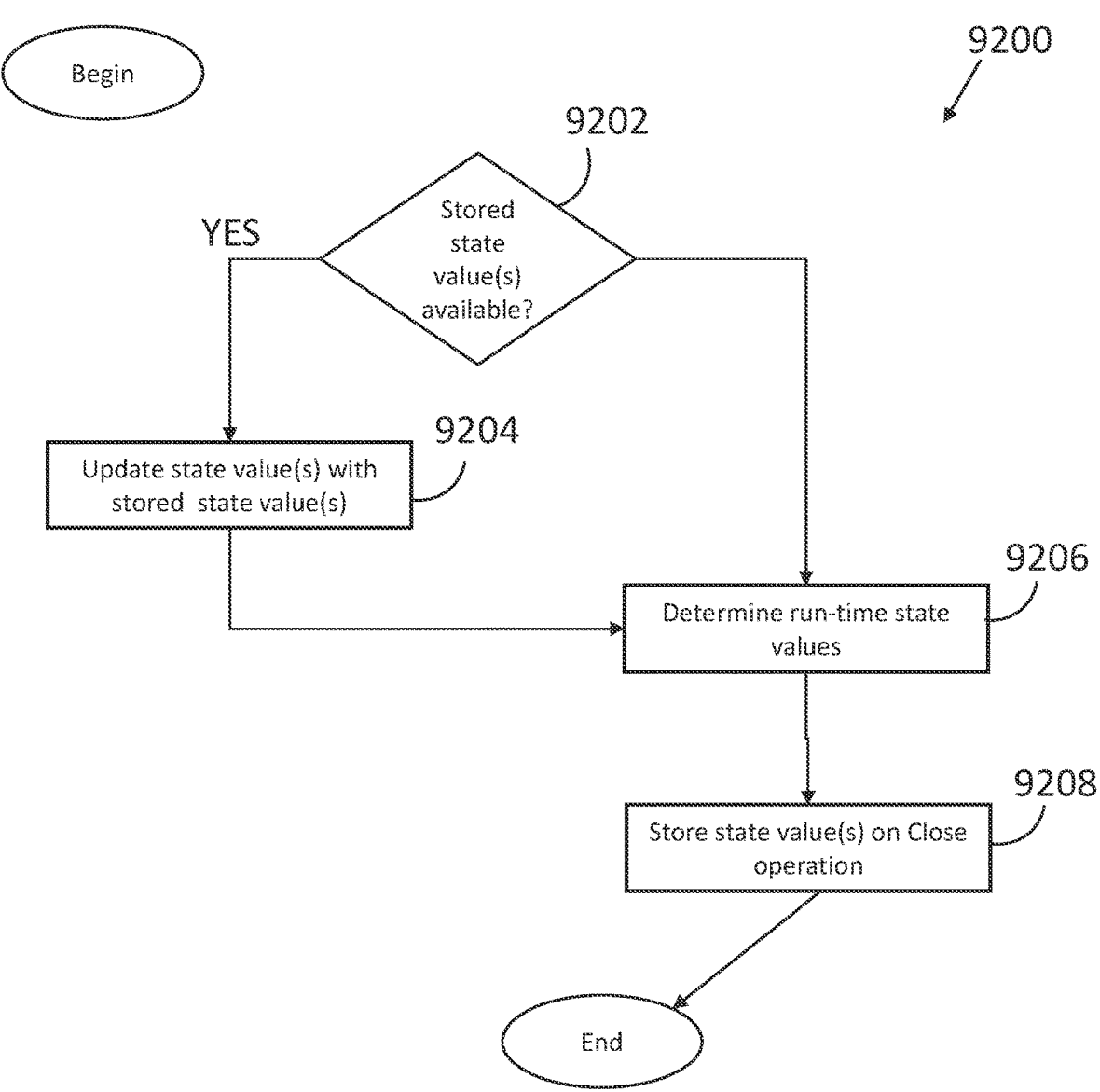
FIG. 92 is a schematic flow diagram of a procedure for working with data.

Referencing FIG. 92, an example procedure 9200 includes an operation 9206 to determine one or more state values for a run-time object. The example procedure 9200 further includes an operation 9202 to determine whether stored state values are available open operation of the document, and in response to operation 9202 indicating "YES", an operation 9204 to update one or more state values with the stored state values. The example procedure 9200 further includes an operation 9208 to store one or more state values in response to a close operation of the document. In certain embodiments, a state value includes any run-time parameter that is not ordinarily stored with the document, for example in an operation log. In certain embodiments, a state value includes a volatile parameter, for example any data value, reference, and/or formula where the resultant output value can change in response to an "environmental" factor and/or a factor not controlled by the user. For example, a time value such as a keyword linked to a specific time (e.g., "NOW ( )" or "TODAY ( )") is a state value or volatile parameter. In certain embodiments, environmental variables such as the current user (e.g., CURRENTUSER( )), a user location (e.g., CURRENTLOCATION( ) and/or a current user device (e.g., USERDEVICE( ) or USERDEVICE-TYPE( )) are state values, volatile parameters, and/or environmental variables.

Figure 43:
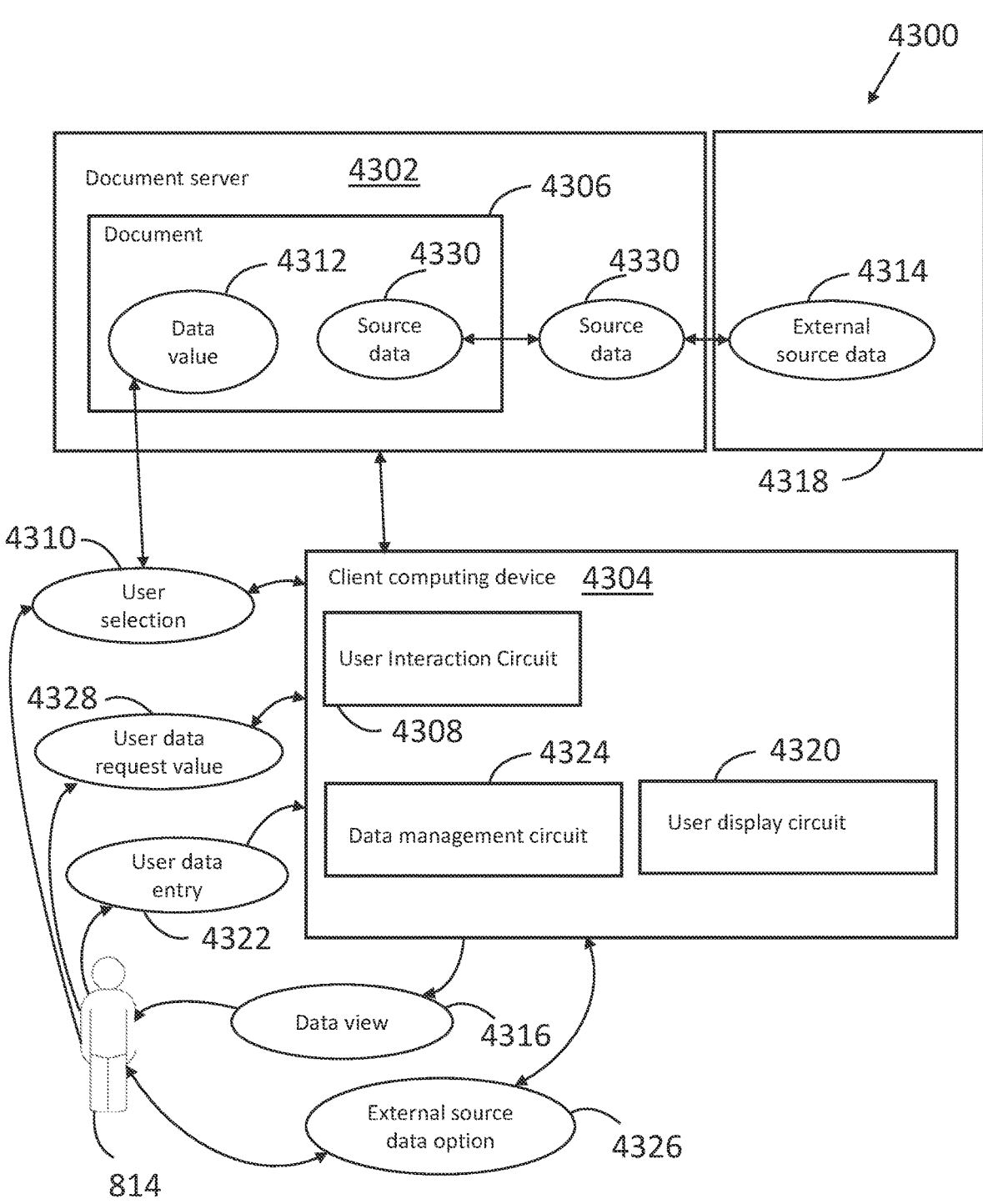
FIG. 43 is a schematic depiction of a system for accessing an external data source.

Referencing FIG. 43, an example system 4300 includes a document server 4302 that communicates at least a portion of a document 4306 to a client computing device 4304. The example client computing device 4304 includes a user interaction circuit 4308 that interprets a user selection 4310 including at least one data value 4312, where the document 4306 includes the data value 4312. The example data value 4312 includes at least a reference or a link to an external source data 4314. Example and non-limiting external data sources 4318 hosting the external source data 4314 include: a website, a third party database, a third party network (e.g. a hosting server and/or cloud server); and/or any other external data source 4318 positioned externally to the document server 4302 and client computing device 4304. In certain embodiments, an external source data 4314 is positioned outside the document 4306, but may be within either of the document server 4302 and/or the client computing device 4304. For example, a user 814 may be logged into the client computing device 4304 accessing the document 4306, and access an external source data 4314. From the perspective of the user 814, example external source data 4314 is any data accessed, referenced, and/or linked that is external to the document server 4302, external to the document 4306, and/or external to an application utilized by the user 814 to access the document 4306. In certain embodiments, the external data source 4318 is hosted external to the document server 4302 and/or client computing device 4304, but the external source data 4314 accessed at the time of entry of the user selection 4310 is stored on the document server 4302 and/or the client computing device 4304—for example where a local copy of one or more aspects of the external source data 4314 is created. An example embodiment includes the document server 4302 and/or client computing device 4304 copying one or more aspects of the external source data 4314, such as to improve responsiveness of the system 4300, to provide for a single (or reduced number) of downloads and/or accesses of the external source data 4314 for multiple uses of the external source data 4314 (e.g. by multiple users and/or multiple locations within the document 4306), and/or to provide robustness of the system 4300 to intermittent availability of communications with the external data source 4318.

The example client computing device 4304 includes a data management circuit 4324 that creates a data view 4316 in response to the user selection 4310. An example data view 4316 includes information generated in response to the user selection 4310 and the external source data 4314, and further in response to a portion of the document 4306 being accessed by the user 814. For example, a data management circuit 4324 references at least a portion of the external source data 4314 in response to the user selection 4310, and creates the data view 4316 to display a portion of the external source data 4314 and/or other information generated in response to the external source data 4314, such as: a portion of the external source data 4314 indicated in the user selection 4310; one or more aspects of the external source data 4314 provided to the user 814 for further selection; a card having external source data 4314 displayed thereon; and/or information about external source data 4314 choices for the user 814 (e.g., a listing of potential matches within the external source data 4314). In certain embodiments, the data management circuit 4324 additionally or alternatively provides information for the data view 4316 that includes source data 4330 that is not external source data 4314, data from within the document 4306, and/or data from within the data value 4312. Accordingly, in certain embodiments, the user 814 can access and visualize external source data 4314 seamlessly in the same manner that document 4306 information and other source data 4330 is accessed or visualized. In certain embodiments, the user 814 does not need to be aware that data utilized or depicted is external source data 4314. In certain embodiments, the user 814 is aware that data utilized or depicted is external source data 4314, and/or selects from available external data sources 4318.

The example client computing device 4304 includes a user display circuit that displays at least a portion of the data view 4316 to the user 814 in response to the user selection 4310, for example a portion of the data view 4316 related to the current location within the document 4306 being accessed by the user 814.

An example user interaction circuit 4308 further interprets a user data entry 4322, where the data management circuit 4324 further provides an external source data option 4326 in response to the user data entry 4322, and where the user display circuit 4320 further updates at least a portion of the data view 4316 in response to the external source data option 4326. Example and non-limiting external source data option (s) 4326 include a listing and/or menu of available external data sources 4318; a listing and/or menu of available formats and/or import displays of the external source data 4314; a listing and/or menu of available formats and/or import displays of the external source data 4314, including previews of one or more options; login information for one or more external data sources 4318; and/or information about one or more external data sources 4318 such as cost information, timeliness information, and/or relevancy information of the external source data 4314 based on the user selection 4310, the user data entry 4322, and/or information such as a data type, document section, offset data (e.g., a nearby row or column value from a table), and/or a heading within the document 4306. In certain embodiments, the external source data 4314 is read-only data.

An example user interaction circuit 4308 further interprets a user data entry 4322 including an edit of the data value(s) 4312, and the data management circuit 4324 further updates the external source data 4314 in response to the user data entry 4322. For example, a user 814 changes a value in a table that includes data pulled from the external source data 4314, and the data management circuit 4324 communicates the data change to the external data source 4318, where the external source data 4314 is updated in response to the changed value. In certain embodiments, the user 814 is thus enabled to work directly with external source data 4314 as if the data were provided directly within the document 4306, including viewing and/or editing the external source data 4314. In certain embodiments, the availability to view and/or edit the external source data 4314 depends upon an authorization of the user 814 and/or a subscription type of the user 814 with respect to the external source data 4314 and/or external data source 4318. In certain embodiments, the user display circuit 4320 prompts the user 814 where the external data source 4318 is going to be changed in response to user interactions, such as to confirm the user 814 intention to change the external source data 4314.

An example data management circuit 4324 further queries the external source data 4314 and provides an update of the data view 4316 in response to the query. The example user display circuit 4320 further updates the display of the data view 4316 in response to the updated data view from the data management circuit 4324. For example, the external source data 4314 may be accessed periodically, in response to an update event (e.g. a request from the user 814, the document server 4302, and/or the client computing device 4304), and/or in response to a notification from the external data source 4318 that one or more aspects of the external source data 4314 have been updated. The example data management circuit 4324 provides for updates of the external source data 4314 automatically into the document 4306, keeping the document 4306 and/or data view 4316 up to date with changes in the external source data 4314, with or without direct input from the user 814. Example and non-limiting operations of the data management circuit to perform the query operation of the external source data 4314 include: an update time expiration (e.g., update from the external source data 4314 daily, hourly, weekly, and/or at any other selected interval); a notification from an external data source 4318 hosting the external source data 4314; a change in a second data value (not shown) having a dependency on the external source data 4314 (e.g., the user 814 changes a formula, table, and/or object having a calculation utilizing the external source data 4314, and the data management circuit 4324 queries the external source data 4314 to ensure the results of the formula, table, and/or object are displaying current information); a change in an object having a dependency on the external source data; a creation of a second data value having a dependency on the external source data (e.g., the user 814 creates a formula, table, and/or object having a calculation utilizing the external source data 4314, and the data management circuit 4324 queries the external source data 4314 to ensure the results of the formula, table, and/or object are displaying current information); a creation of an object having a dependency on the external source data 4314; and/or a request to provide a continuous update of the at least one data value. For example, a setting in the document 4306 and/or an object accessing the external source data 4314 (e.g., set by the user, and administrator, rules from a document template, or the like) may indicate an update rate of the external source data 4314, which may be set to continuously update the external source data 4314 such that the data is always "live" to the user 814. Example and non-limiting embodiments of "continuous updating" include updating the external source data 4314 instantaneously (e.g., the data management circuit 4324 performing a query of the external source data 4314 in every execution loop of the document server 4302 and/or client computing device 4304); querying the external source data 4314 at a substantially fast rate (e.g., each 200 msec, each second, each minute, and/or other selected value); querying the external source data immediately in response to a notification from the external data source 4318 that the external source data 4314 has changed; and/or querying the external source data immediately in response to a notification from the external data source 4318 that a relevant portion of the external source data 4314 has changed. In certain embodiments, continuously updating the external source data 4314 includes portions of the operating time (e.g., the time during which the user 814 is accessing the document 4306 and/or data value 4312) where the data management circuit 4324 pauses or delays updating the external source data 4314—for example to conserve processing utilization and/or communication bandwidth. In certain embodiments, continuously updating the external source data 4314 includes pausing the updating when the user 814 is not accessing a portion of the document 4306 utilizing and/or having a dependency on the external source data 4314, and resuming the updating when the user 814 accesses the portion of the document 4306 utilizing and/or having a dependency on the external source data 4314, and/or resuming the updating when the user 814 is predicted to access the portion of the document 4306 utilizing and/or having a dependency on the external source data 4314 in the near future. Example and non-limiting operations to predict when the user 814 will access the portion of the document 4306 utilizing and/or having a dependency on the external source data 4314 in the near future include determining that the user 814 location within the document 4306 is proceeding toward any such portion (e.g., scrolling, moving through tabs, etc.), determining that the user 814 is accessing precursor data for any such portion (e.g., data having similar names, data types, and/or information type such as financial, personnel records, project tasks, etc.), and/or determining that the user 814 or another user has accessed any such portion after similar operations within the document 4306 to the operations being performed by the user 814 (e.g., such a portion is often accessed after printing, checking a task list, accessing a particular table within the document 4306, etc.).

In certain embodiments, the user selection 4310 includes a source identifier. Example and non-limiting source identifiers include: a uniform resource locator (URL); a network location; a file name; an external source application programming interface reference; and/or an external source access reference. An example user selection 4310 includes the user 814 entering a website name into the document 4306. The entry of the website name, and/or any other source identifier, includes entry as: in-line text, within a table, and/or utilizing an introductory referencing command before the website name such as a specific character sequence (e.g., "@"), a menu selection (e.g., from a drop-down menu, toolbar, etc.), and/or utility entry (e.g., a mouse "right-click", a hotkey command, etc.). Example and non-limiting source identifiers include website references (e.g., URLs for, and/or access to API interfaces to) GitHub, MailChimp, Stripe, Shopify, Google Calendar (and/or other Google applications), Slack, Dropbox, Jira, Intercom, Pingdom, Ops Genie, LinkedIn, and/or Facebook. In certain embodiments, operations to access an external source data 4314 and/or external data source 4318 include authentication (e.g. login to the external data source 4318) using an API interface, and/or authentication wherein authentication information such as a username and/or password are not stored on an operation log and/or in a snapshot.

In certain embodiments, the user interaction circuit 4308 further interprets a user data request value 4328, and the data management circuit 4324 further provides an external source data option 4326 in response to the user data request value 4328, where the external source data option 4326 comprises the data source identifier. For example, the user 814 may make a menu selection to request available external data sources 4318, and the data management circuit 4324 determines which external data sources 4318 are available and/or contextually indicated for the user 814. In certain embodiments, the external data source option 4326 further includes a listing and/or menu of one or more external data sources 4318 available to the user 814, and/or may further include a notification that additional external data sources 4318 beyond those depicted are available. Contextual determination of external data sources 4318 includes determining data sources according to a data type being access by the user 814, a document location accessed by the user 814, subscription options that are active and/or available to the user 814, and/or rules defined by the user, an administrator, and/or from a document template. An example user data request value 4328 includes a content based request (e.g., specific data values in a text flow and/or table at a location in the document 4306 accessed by the user 814) and/or a subject matter based requests (e.g., a request by the user 814 to find financial sources, scientific sources, personnel related sources, social media sources, etc.).

Figure 44:
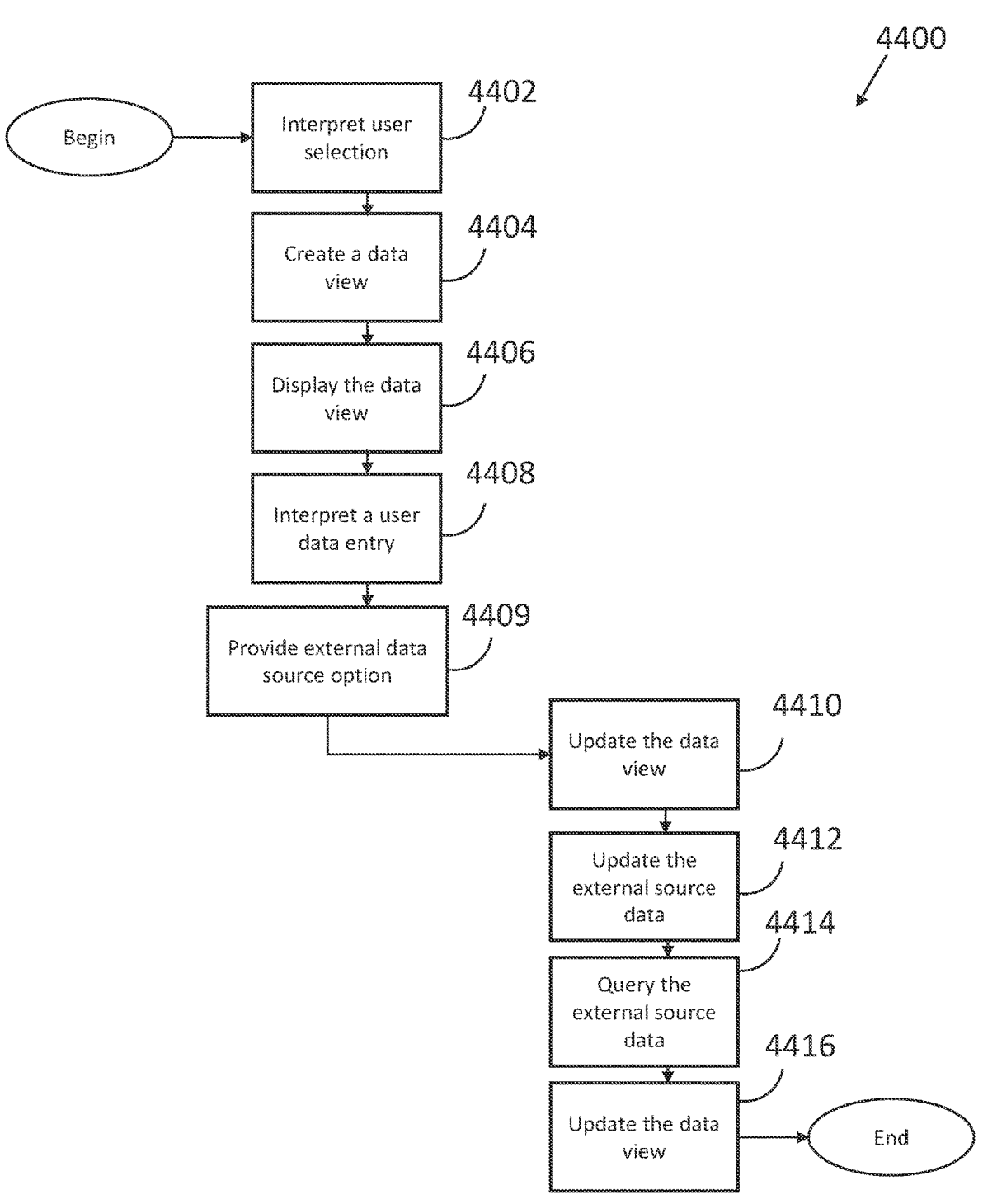
FIG. 44 is a schematic flow diagram of a procedure for updating a data view.

Referencing FIG. 44, an example procedure 4400 includes an operation 4402 to interpret a user selection including at least one data value, where the data value(s) include all or a portion of a document, and the data value(s) include at least one of a reference or a link to an external source data. The example procedure 4400 further includes an operation 4404 to create a data view in response to the user selection, and an operation 4406 to display at least a portion of the data view in response to the user selection. The example procedure 4400 includes an operation 4408 to interpret a user data entry, and/or an operation 4409 to provide an external source data option in response to the user data entry. The example procedure 4400 further includes an operation 4410 to update at least a portion of the data view in response to the external source data option. An example procedure includes the external source data including read-only data. An example procedure 4400 includes the operation 4408 interpreting a user data entry including an edit of the at least one data value, and an operation 4412 to update the external source data in response to the user data entry.

An example procedure 4400 includes an operation 4414 to query the external source data, and an operation 4416 to update the data view in response to the query. In certain embodiments, the procedure 4400 includes an operation (not shown) to update the display in response to the updated data view. In certain embodiments, the operation 4414 to query the external source data includes querying the external source data in response to at least one of: an update time expiration; a notification from an external device hosting the external source data; a change in a second data value or a creation of a second data value, the second data value having a dependency on the external source data; and/or a change in an object and/or a creation of an object, where the object has a dependency on the external source data. An example procedure further includes an operation (not shown) to break the at least one of the link or reference after the operation 4404 to create the data view. Example operations to break the link or reference to the external source data include operations to allow the user 814 to work with a document offline, operations to allow the user 814 to preserve a present state of the external source data without live updating, and/or operations to allow the user 814 to perform scenario checks or other data manipulations without affecting the external source data.

In certain embodiments, the user selection includes a data source identifier. Example and non-limiting data source identifiers include: a URL; a network location; a file name; an external source application programming interface reference; and/or an external source access reference.

Referencing FIG. 45, an example procedure 4500 includes an operation 4502 to interpret a user data request value, and the operation 4509 to provide external source data option(s) in response to the user data request value. In certain embodiments, the external source data option includes the data source identifier. Example and non-limiting user data request values include a content based request and/or a subject matter based request. In certain embodiments of the procedure 4500, the user data request values are limited to a content based request and/or a subject matter based request—for example where the operation 4502 is provided contextually for user entries, and the external source data option(s) are limited to options matching one of a content accessed by, focused by, and/or related to the current user operations (e.g., a word or data value at the user focus location when the user provides a user data request value such as a data lookup request) and/or a subject matter relating to content accessed by, focused by, and/or related to the current user operations (e.g.: subject matter categories related to a word or data value at the user focus location; a data type for such content; a relevant keyword such as a document section heading, table column heading, or the like; rules defined by a user, administrator, and/or a document template; and/or any other contextually determined subject matter as described throughout the present disclosure).

Referencing FIG. 70, an example system 7000 includes a document 6206 including an operation log 6208, where the operation log 6208 includes sequential operation(s) defining operations to create data values 6304 of the document 6206. The example system 7000 further includes a document object model 6309, where the document object model 6309 includes an object definition 6310 corresponding to each of a number of objects 6320 in the document 6206. The document 6206 is at least partially positioned on a document server and/or client computing device. For example, without limitation, the system 7000 is utilizable in any system described throughout the present disclosure having a document server and a client computing device, or a first computing device and a second computing device. An example client computing device includes a unified document surface application circuit 6216 that interprets a user formula value 6308, and updates the data values 6304 of the document in response to the user formula value 6308. The example system 7000 further includes a formula engine 6302, positioned within the document 6206 in the example, but additionally or alternatively positioned, without limitation, on a document server, client computing device, and/or unified document surface application circuit 6216. The example formula engine 6302 determines a calculation definition 6306 in response to the user formula value 6308 and the document object model 6309. An example unified document surface application circuit 6216 further validates the user formula value 6308 in response to a formula library 7002.

An example formula engine 6302 further generates an executable object 6502 in response to the calculation definition 6306, wherein the executable object 6502 includes instructions which, upon execution, cause at least one of the document server, a client computing device, and/or a workflow server to perform operations in response to the calculation definition 6306. An example system 7000 includes the instructions of the executable object 6502 performing a column-wise operation on a table object in response to the formula value 6308 including a table column reference.

An example user formula value 6308 includes a query operation 7006 having at least one query criterion 7008 and at least one data object 7010—for example one or more of the document objects 6320. In certain embodiments, the data object(s) 7010 include external data, volatile information, and/or other objects which may not be document objects 6320. An example query criterion 7008 includes a time value corresponding to the at least one data object 7010, and the formula engine 6302 further determines the calculation definition 6306 utilizing a state of the at least one data object 7010 determined in response to the time value. For example, a query operation 7006 can be constructed to query a table object against the state of the table object at some historical condition, such as "3 days ago," against a previous version of the document 6206, and the like.

An example system 7000 includes the unified document surface application circuit 6216 further validating the user formula value 6308 by performing at least one operation such as: correcting a user syntax; correcting a user formula name; correcting a user formula reference; and/or prompting a user for a correction of any of the foregoing. An example unified document surface application circuit 6216 further provides a formula context display 7004, where the formula context display 7004 includes at least one formula name, and further includes an argument representation and/or a description value corresponding to each of the at least one formula name. An example unified document surface application circuit 6216 further provides the formula context display 7004 as a table object, for example as a table displayed next to a current user entry location for reference by the user. An example unified document surface application circuit 6216 further determines the at least one formula name in response to at least one of: a character sequence entered by the user, or contextual information. Without limitation, any operations to preview, look-up, and/or auto-complete an entry for a user throughout the present disclosure are contemplated for inclusion in the determination and display of the formula context display, including at least the portions referencing FIG. 37 and FIG. 56. An example formula context display 7004 includes at least one reference value. Example and non-limiting reference values include: an object name for one of the objects 6320 in the document; an object reference for one of the objects 6320 in the document; a tag for an object 6320 in the document; a range reference for a range in the document; and/or an external data source 6226 reference.

Referencing FIGS. 71 through 73, a non-limiting example of a formula library 7002 is depicted schematically. The formula library 7002 includes a formula name 7102, a formula syntax and/or arguments definition 7104, and/or a formula description 7106. In certain embodiments, a formula library 7002 such as depicted is utilized by the unified document surface application circuit 6216 to verify a formula value 6308, correct syntax for the user, and/or to provide the formula context display 7004. The depicted formula options in the example formula library 7002 are non-limiting illustrations, and any formulas may be utilized in a system, including user-defined, administrator-defined, and/or document template provided rules.

Figure 75:
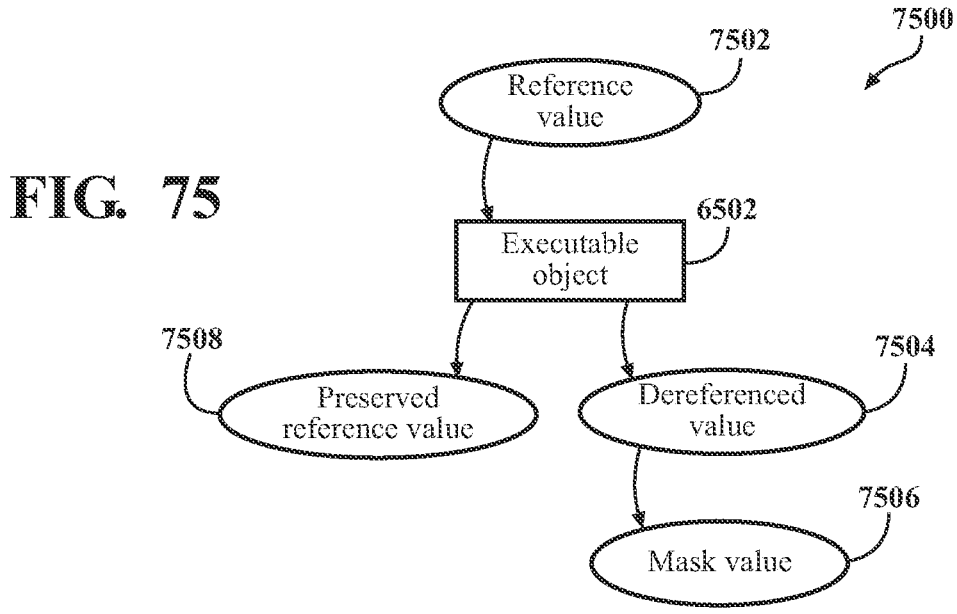
FIG. 75 is a schematic data illustration.
Figure 76:
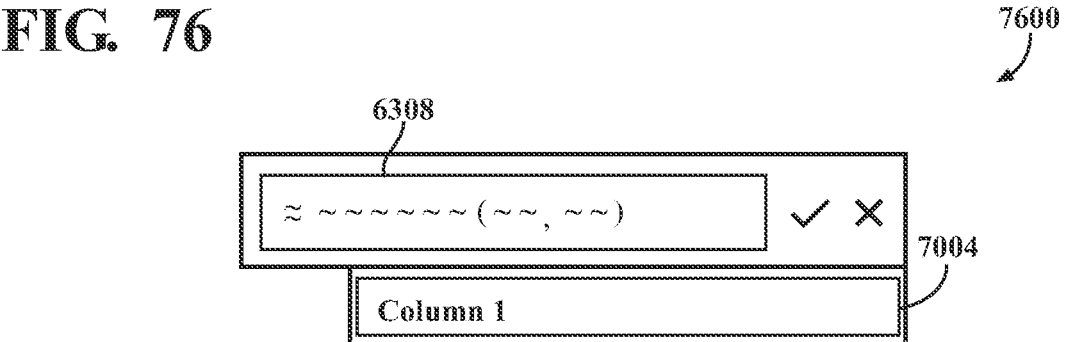
FIG. 76 is a schematic data illustration.
Figure 77:
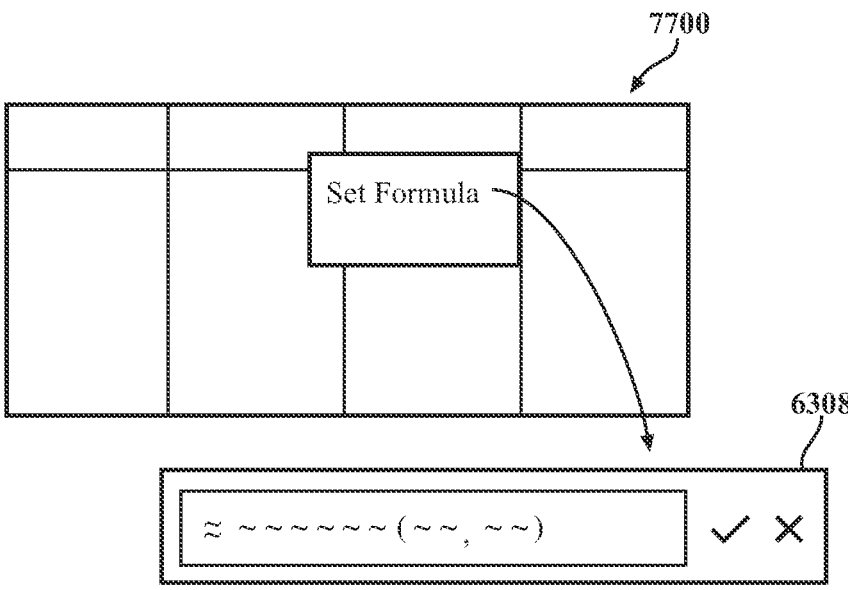
FIG. 77 is a schematic data illustration.
Figure 78:
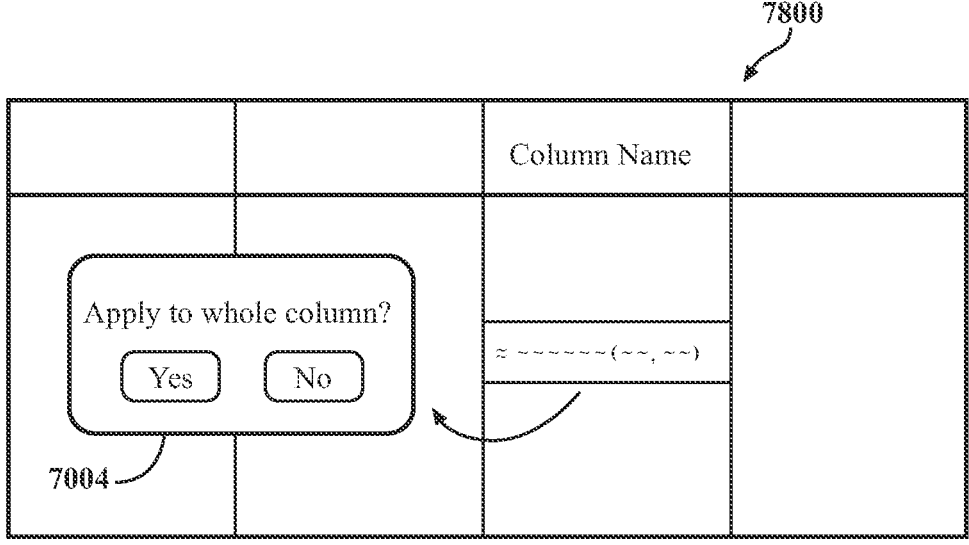
FIG. 78 is a schematic data illustration.
Figures 79, 80:
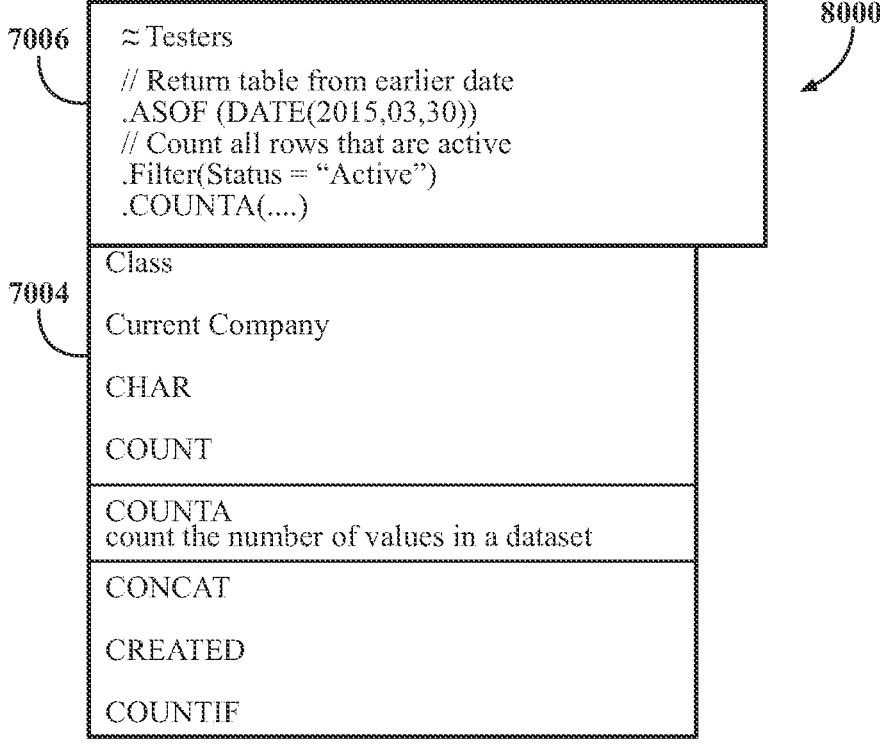
FIG. 79 is a schematic data illustration.
FIG. 80 is a schematic data illustration.

Referencing FIG. 75, an example illustration 7500 includes a reference value 7502 (e.g., from a user formula value), where the reference value includes a value such as: an object name for one of the objects in the document; an object reference for one of the objects in the document; a tag for an object in the document; a range reference for a range in the document; and an external data source reference. An example executable object 6502 includes instructions to perform an operation to dereference the reference value 7502 (e.g., to determine a value at the referenced location, a value that a pointer is pointing to, and/or a value from a formula referenced by the reference value 7502), thereby determining a dereferenced value 7504. An example unified document surface application circuit 6216 provides the dereferenced value 7504 as a mask value 7506. For example, a user enters a reference value 7502 as a formula in a table cell, the executable object 6502 determines the dereferenced value 7504 for the formula, and the unified document surface application circuit 6216 displays the dereferenced value 7504 for the table cell to the user. However, in certain embodiments, the actual value for the table cell may be the reference value 7502. Additionally or alternatively, the actual value for the table cell may be the dereferenced value 7504, and/or the unified document surface application circuit 6216 may preserve the reference value 7502. Example operations to preserve the reference value include, without limitation: saving the reference value 7502 in an offset table column from corresponding ones of the dereferenced values; saving the reference value 7502 in at least one hidden table cell; saving the reference value 7502 in a system table; saving the reference value 7502 in at least one selectively viewable table cell; saving the reference value 7502 in a formula entry location; and/or saving the reference value 7502 on a document object including the dereferenced value 7504.

Figure 118:
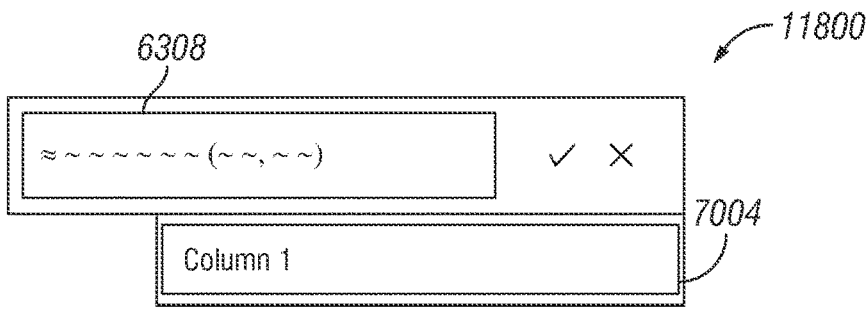
FIG. 118 is a schematic data illustration.
Figure 119:
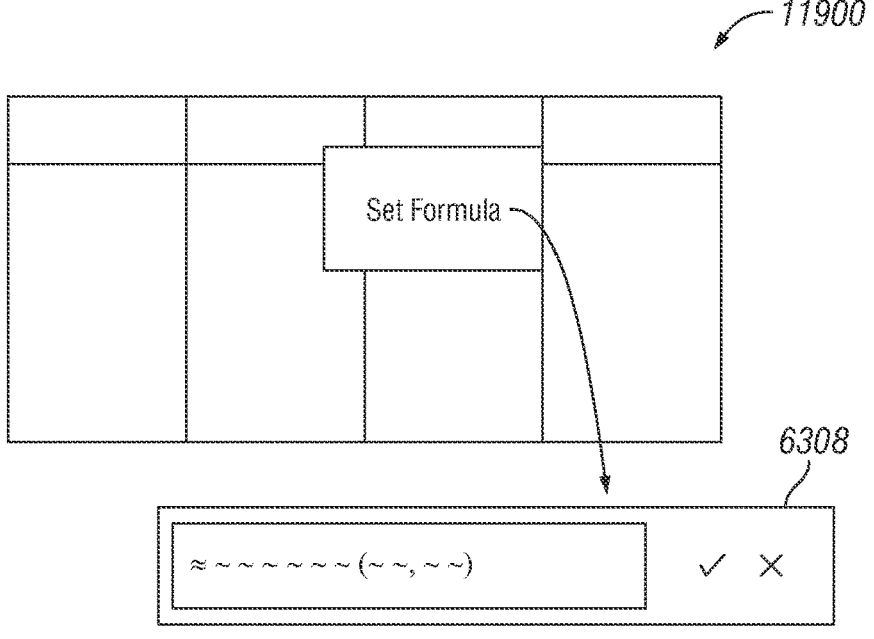
FIG. 119 is a schematic data illustration.
Figure 120:
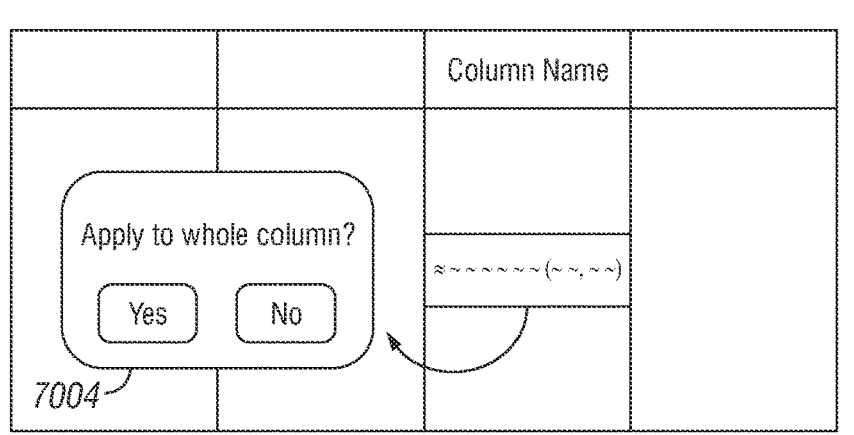

Referencing FIG. 118, an illustration 11800 includes user formula value 6308 entry graphical user interface. In the example, a formula context display 7004 is provided indicating a column name suggestion for the user for entry into the formula 6308. Accordingly, the user can rapidly apply a column-wise operation to an entire data column of a table with a single entry of a formula. Referencing FIG. 119, an illustration 11900 depicts a table column having a dropdown toolbar button associated with the table column to provide an easy integration of a formula for the column of the table. A non-limiting example table displays the dropdown toolbar button in response to a focus on the column or column heading, a selection of the column heading. Referencing FIG. 120, an illustration 12300 depicts a formula context display 7004 provided as a contextual display, wherein the user has entered a formula into a row of a table, and the unified document surface application circuit 6216 prompts the user to determine whether to apply the formula to the entire column of the table.

Figure 121:
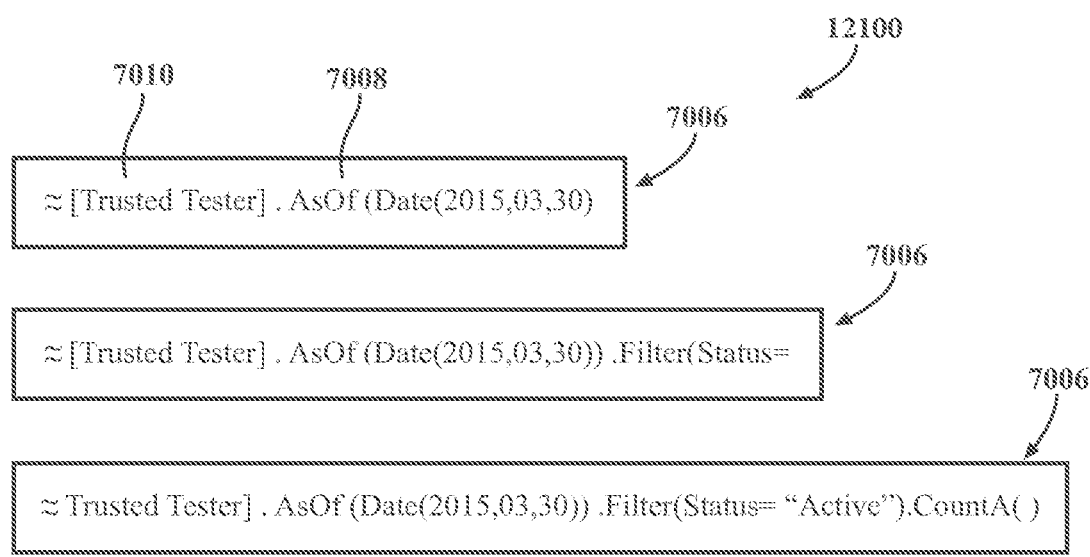

Referencing FIG. 121, an illustration 12100 depicts a query operation 7006 (e.g., as a formula 6308) having a query criterion 7008 and a data object 7010. The example query operation includes a first example (the top depiction) which returns the data object "Trusted Tester" (e.g., a table object) as it existed on the date 30 Mar. 2015; the second query operation returns the data object "Trusted Tester" (e.g., a table object) as it existed on the date 30 Mar. 2015 and further filtered by rows having an "Active" status value (e.g. based on a column "Status"), and the third query operation (the bottom depiction) returns the second query operation as a count of data values meeting the previous criteria. The query operations in the illustration 12100 may be sequential operations (e.g., as the user enters further information into a formula) and/or may be independent depictions of separate query operations 7006. The illustration 12100 provides an illustration of how embodiments of the present disclosure provide for complex query operations to be generated against variant data objects with ease by a modestly proficient user, including capabilities to operate on entire columns of data objects with a single command, to apply complex filters, and/or access previous states of data objects. The user has access to the entire formula library 7002, as well as other features including ease of data aggregation, access to external data, rapid creation of visualization elements, and/or reference access to data throughout the document within a single formula command.

Figure 122:
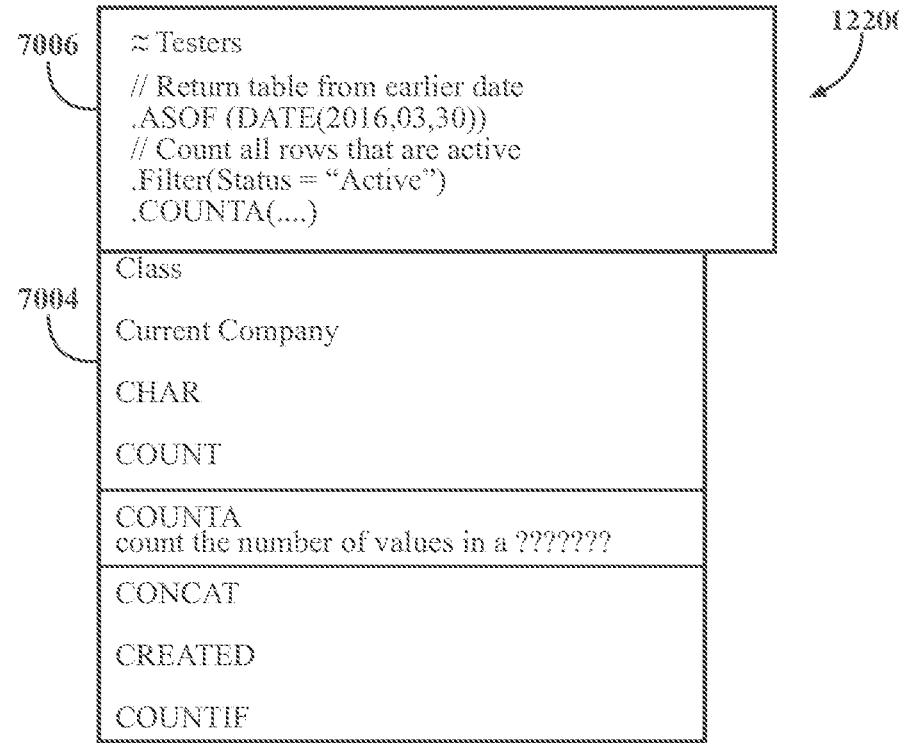

Referencing FIG. 122, an illustration 12200 depicts an example formula context display 7004. The query operation 7006 of illustration 12200 includes a formula having an equivalent to the third query operation of illustration 12100 for purposes of clarity of description. The query operation 7006 includes a display in a block format (e.g., where the line of the formula extends past a selected length and/or user display, and/or in response to a user operation to display in a block format), and further includes commenting lines within the formula (e.g., set off by "//" or any other character sequence). The illustration 12200 further depicts a formula context display 7004, for example includes suggested methods, references, and/or objects for entry into the formula, descriptions of objects present in the formula, and/or other selected information according to any descriptions in the present disclosure.

Referencing FIG. 123, an illustration 8100 includes a query operation 7006 and a formula context display 7004. The formula context display 7004 in the example is responsive to the actions of the user in the formula (e.g., query operation 7006), for example providing information about appropriate next entries into the formula, usage examples, syntax information, and/or selectable choices for the user to utilize. An illustration 11600, for example after an entry of "DATE" into the illustration 8100, the formula context display 7004 is updated to reflect information relevant to the current position in the query operation 7006.

Figure 93:
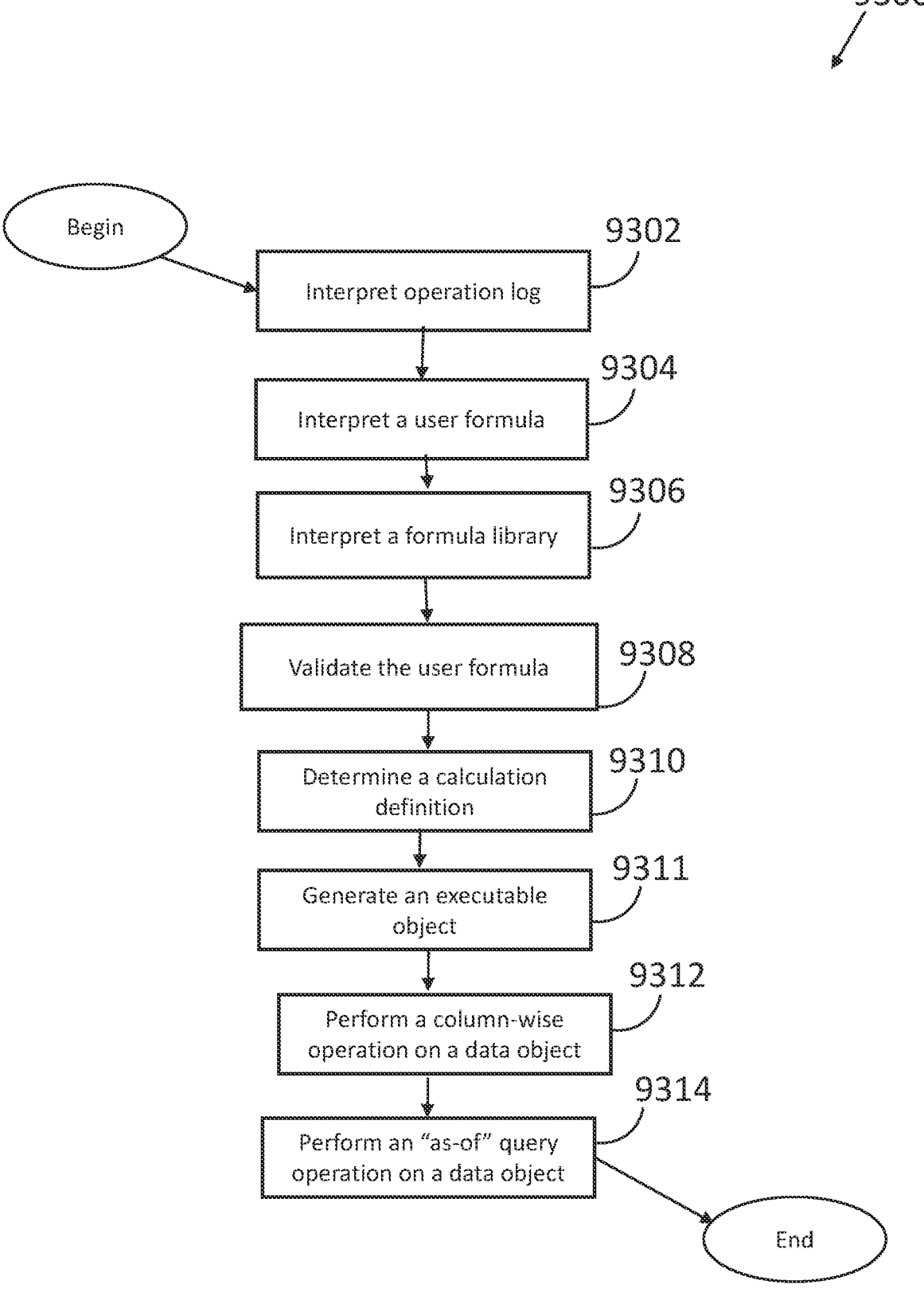
FIG. 93 is a schematic flow diagram of a procedure for working with data.

Referencing FIG. 93, an example procedure 9300 includes an operation 9302 to interpret an operation log, an operation 9304 to interpret a user formula value and to update the data values of the document in response to the user formula value, and an operation 9310 to determine a calculation definition in response to the user formula value and a document object model. An example procedure 9300 further includes an operation 9306 to interpret a formula library, and an operation 9308 to validate the user formula value in response to the formula library. The example procedure 9300 further includes an operation 9311 to generate an executable object in response to the calculation definition, wherein the executable object comprises instructions which, upon execution, cause at least one of a document server and a first client computing device to perform operations in response to the calculation definition, and an operation 9312 to perform a column-wise operation in response to the formula value including a table column reference. An example formula includes a query operation including at least one query criterion and at least one data object, and/or the query criterion including a time value corresponding to the at least one data object. The example procedure 9300 further includes an operation 9314 to perform an "as-of" query operation on the data object, where the "as-of" query operation includes updating the calculation definition utilizing a state of the at least one data object determined in response to the time value. For example, an operation includes a supplied time value, and updating the calculation definition utilizing the state of a data object determined according to the supplied time value (e.g., a specific date, a specific time, a date range, etc.).

Figure 94:
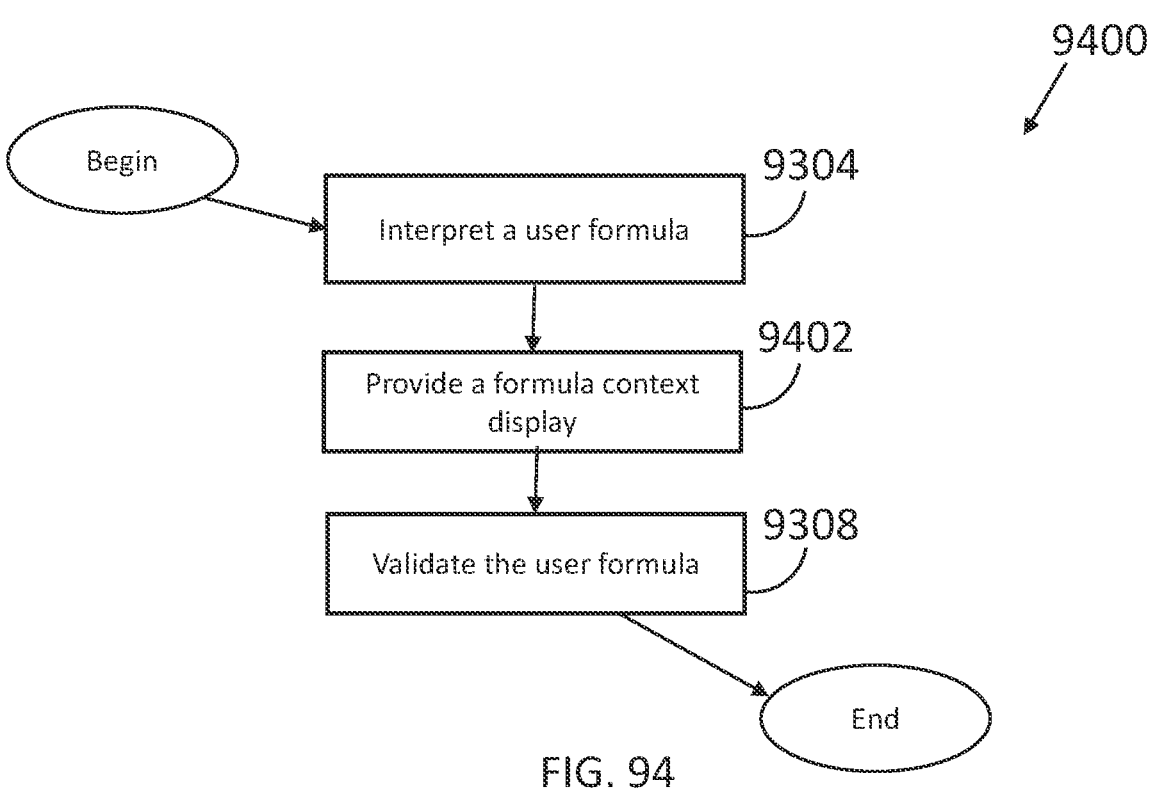
FIG. 94 is a schematic flow diagram of a procedure for working with data.

Referencing FIG. 94, an example procedure 9400 includes an operation 9308 to validate the user formula by performing an operation such as: correcting a user syntax; correcting a user formula name; correcting a user formula reference; and/or prompting a user for a correction of any of the foregoing. The example procedure 9400 includes an operation 9402 to provide the formula context display, where the formula context display includes at least one formula name, and further includes an argument representation and/or a description value corresponding to each of the at least one formula name.

Figure 95:
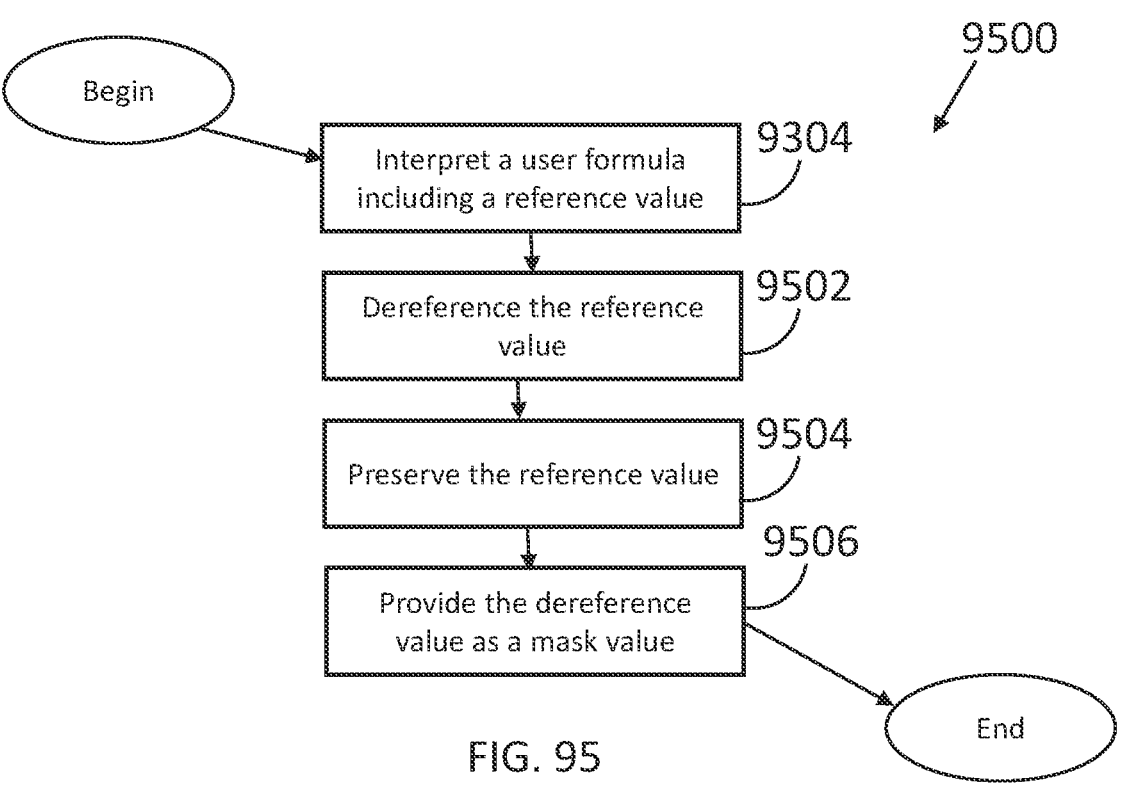
FIG. 95 is a schematic flow diagram of a procedure for working with data.

Referencing FIG. 95, an example procedure 9500 includes an operation 9304 to interpret a user formula including reference value, and an operation 9502 to dereference the reference value. The example procedure 9500 further includes an operation 9504 to preserve the reference value, and/or an operation 9506 to dereference the reference value by providing the dereference value as a mask value. Example operations 9504 to preserve the reference value include preserving the reference value in a location such as: in an offset table column from corresponding ones of the dereferenced values; in at least one hidden table cell; in a system table; in at least one selectively viewable table cell; in a formula entry location; and on a document object including the dereferenced value.

Figure 82:
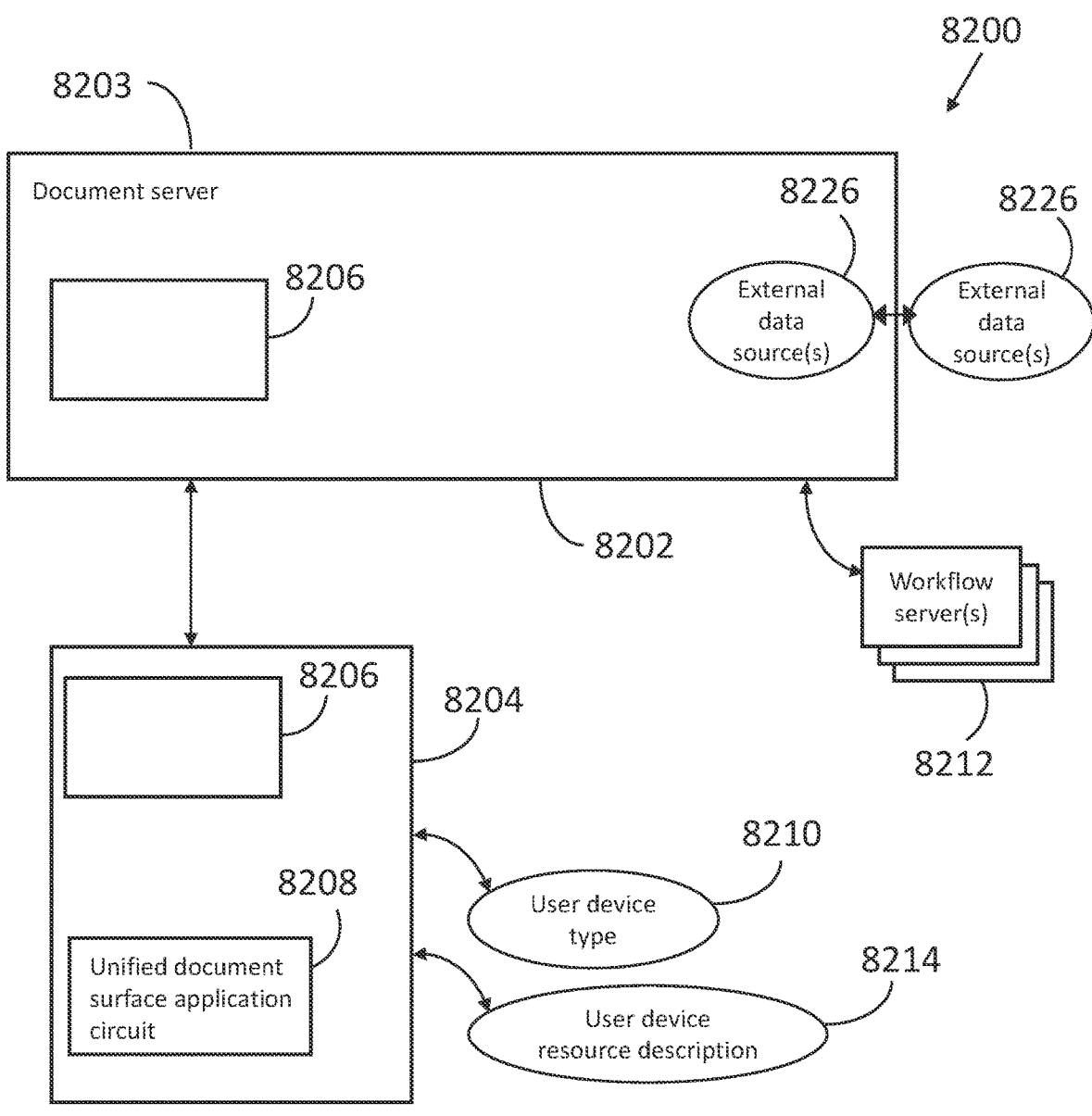
FIG. 82 is a schematic depiction of a system for responding to a user device.
Figure 83:
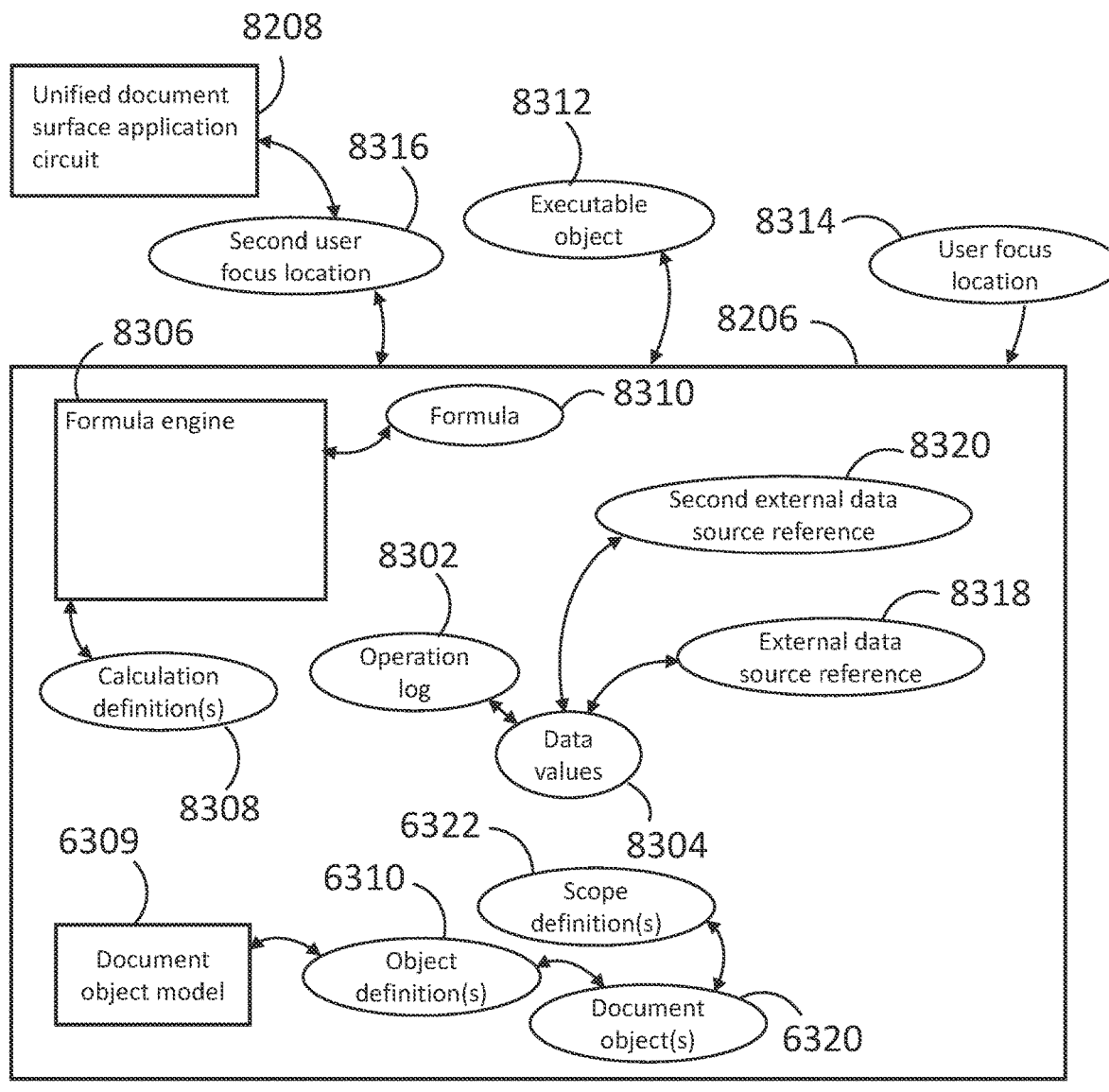
FIG. 83 is a schematic depiction of a system for operating a formula engine.

Referencing FIGS. 82 and 83, an example system 8200 includes a document server 8203 communicatively coupled to at least one client computing device 8204, and a document 8206 including an operation log 8302 (also reference FIG. 117), where the operation log 8302 includes sequential operation( ) defining operations to create data values 8304 of the document 8206. The example system 8200 further includes a formula engine 8306, where the formula engine 8306 determines a calculation definition 8308 in response to at least one formula 8310 of the document 8206. The formula engine 8306 an executable object 8312 in response to the calculation definition 8308, and where the executable object 8312 includes instructions which, upon execution, cause at least one of the document server 8203, client computing device 8204, and/or a workflow server 8212 to perform operations in response to the calculation definition 8308. An example document 8206 is positioned on at least one of the document server 8203 and/or the client computing device 8204, and where the formula engine 8306 further interprets a user focus location 8314, and directs execution of the executable object 8312 in response to the user focus location 8314. Example and non-limiting user focus locations 8314 include a location value such as: a document section currently focused by a user; a document object currently focused by a user; a document canvas currently focused by a user; and/or a portion of the document currently visible to a user. A focus by the user includes, without limitation, a user cursor location, a user visible object and/or portion of the document 8206, a mouse location of the user, any reference value in a formula, document section, and/or document object indicated by any of the foregoing, and/or a formula, document section, and/or document object indicated by the reference value (e.g., the formula, document section, and/or document object referenced by the reference value). An example document uniform surface application circuit 8208 further predicts a second user focus location 8316, and where the formula engine 8306 further directs execution of the executable object 8312 in response to the second user focus location 8316. Example operations to predict the second user focus location 8316 include predicting a location such as: a formula, document section, and/or document object indicated by a reference value within the user focus location 8314; a document section and/or object in a trajectory of document sections or objects (e.g., a next document section and/or object progressing from accessed document sections and/or objects recently accessed by the user); a location accessed by the user after accessing the user focus location 8314 in a previous operation by the user; a location accessed by another user after accessing the user focus location 8314 in a previous operation by the another user; and/or a document section and/or object having a high relevance to the user focus location 8314 (e.g., under any principles described throughout the present disclosure, including at least the portion referencing FIG. 24).

An example system 8200 further includes a document uniform surface application circuit 8208 further predicting the second user focus location 8316 in response to at least one of: a state value; a previous operation sequence of a user accessing the document; a previous operation sequence of a user; a relationship value between the user focus location 8314 and a data value 8304 within the document that is not within the user focus location 8314; and/or a processing time to hydrate a data value 8304 within the document 8206 that is not within the user focus location 8314 (e.g., a long processing time is utilized, in certain embodiments, to begin hydration of the second focus location 8316 earlier to provide for seamless interaction of the document 8206 with the user). An example document uniform surface application circuit 8208 further predicts the second user focus location 8316 in response to at least one of: a document type value; a data type value of a data value within the document that is within the user focus location 8314; and/or a data type value of a data value 8304 within the document that is not within the user focus location 8314.

An example system 8200 further includes the document uniform surface application circuit 8208 further predicting the second user focus location 8316 in response to a user device type and/or a user device resource description. In certain embodiments, a user device type and/or available resources indicate certain types of user access to the document 8206 are more likely (e.g., utilizing information about a mobile phone interface to the document 8206 and navigation capabilities using the device), and/or the resources of the device may indicate that certain types of access are more likely, and/or provide information about hydration times for data values 8304 and modulate prediction times for potential second user focus locations 8316 accordingly. An example system 8200 includes the workflow server(s) 8212 in communication with the document server 8203, and where the executable object 8312 further includes instructions which, upon execution, cause at least one of the document server and the first client computing device to perform operations to provide a result value in response to the calculation definition 8308. An example system 8200 further includes the document server 8203 further dividing operations of the executable object 8312 between at least two of the document server 8203, the client computing device 8204, and/or the workflow server(s) 8212.

Figure 84:
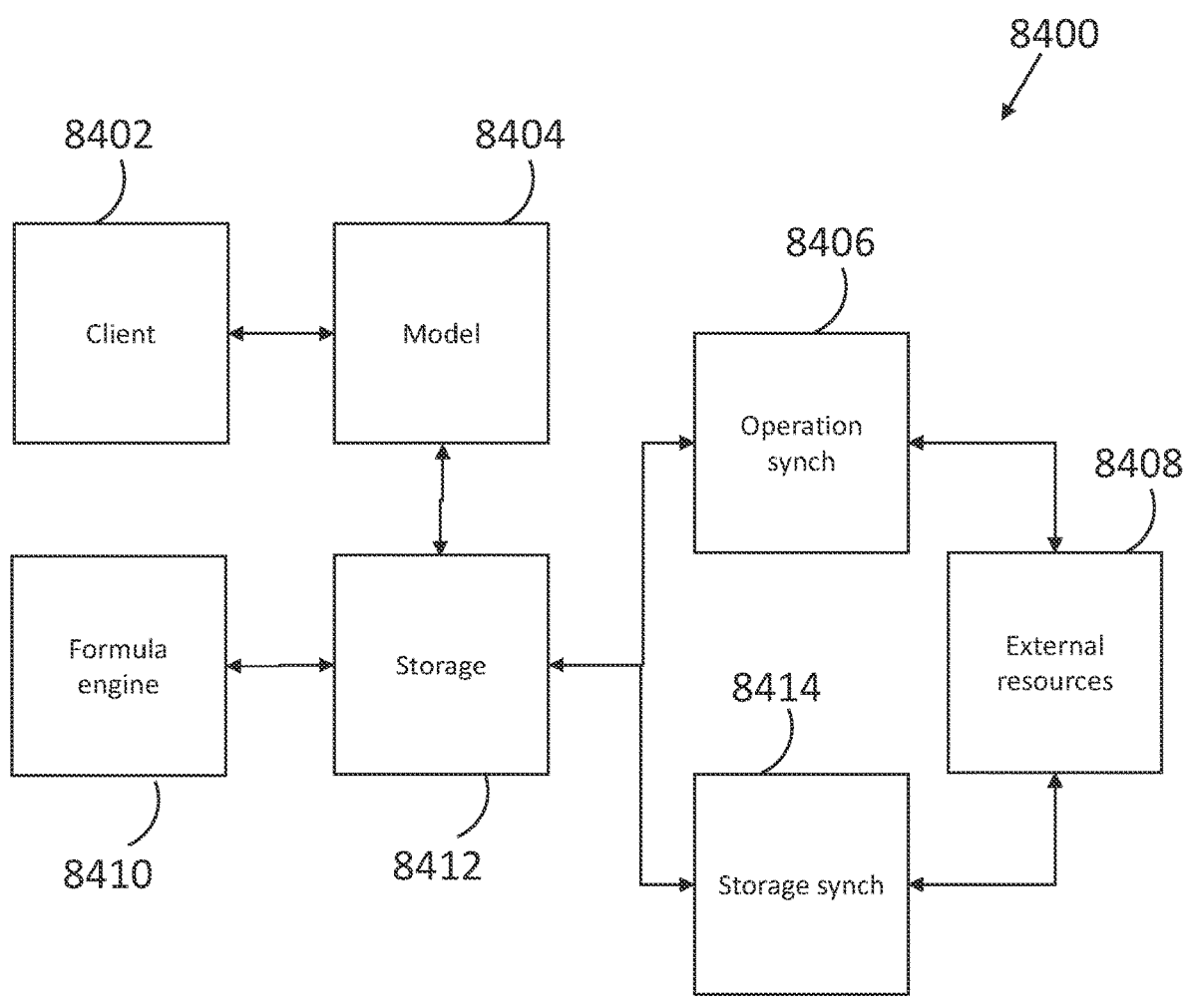
FIG. 84 is a schematic data illustration.

Referencing FIG. 84, an example system 8400 includes an architecture for the system 8400 to implement a unified document surface application, which may, for example, be utilized in any systems and/or procedures described throughout the present disclosure. The example system 8400 includes a client 8402, such as a client computing device and/or an application running on a client computing device, in communication with a model 8404, document storage 8412, a formula engine 8410, an operation synchronization 8406 module, a storage synchronization 8414 module, and/or external resources 8408 in communication with the system 8400. Elements of the system 8400 are depicted schematically to depict relationships therebetween, and elements of the system 8400 may be provided on any devices described herein, and/or distributed across several devices. In certain embodiments, an element, such as the formula engine 8410, may be present on more than one device—for example on a document server and/or a client computing device. Additionally or alternatively, instances of elements may be created on separate devices during run-time operations of the system 8400, where such instances may be temporary to support certain operations.

Figure 85:
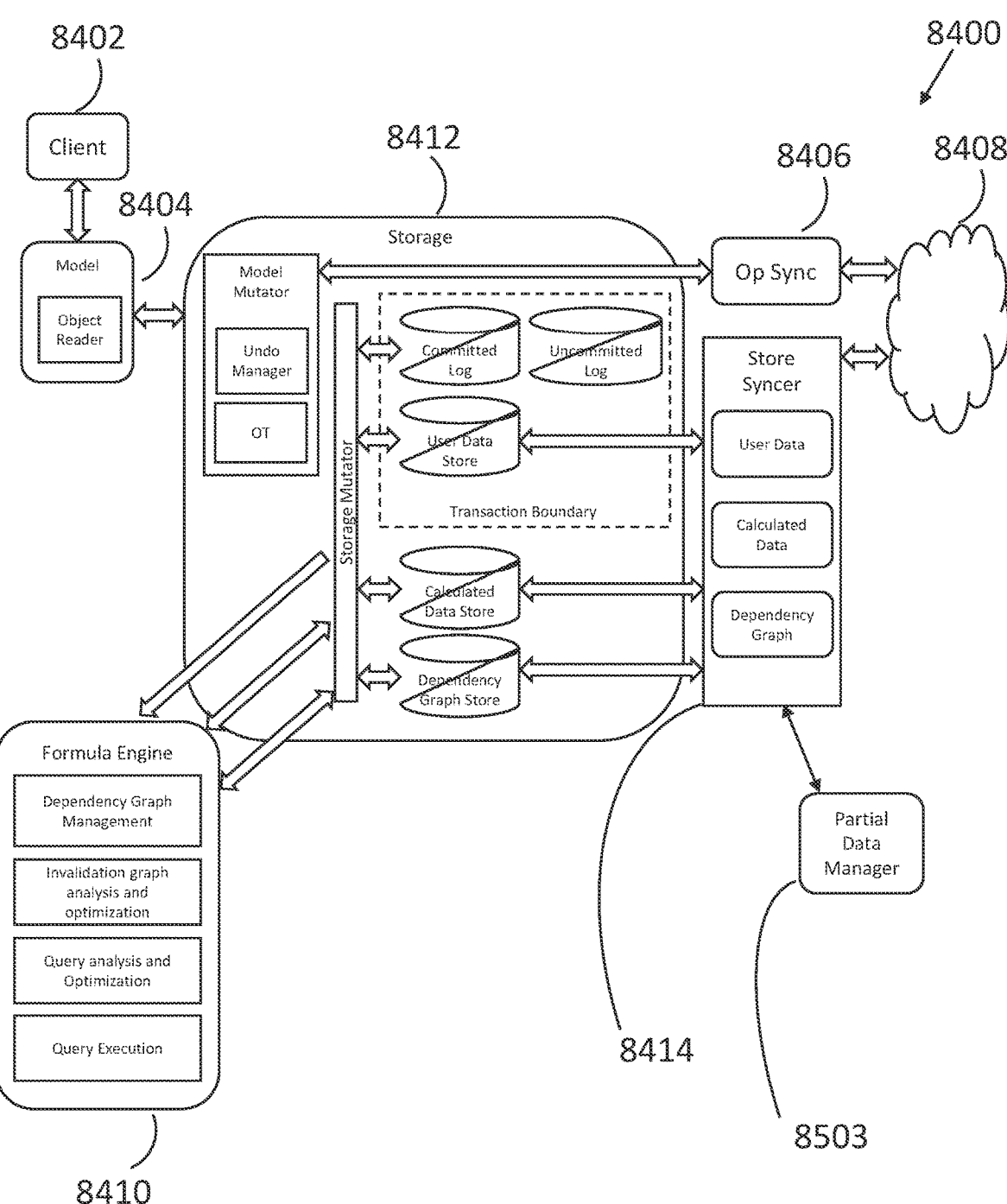
FIG. 85 is a schematic data illustration.

Referencing FIG. 85, a further example of the system 8400 includes additional example details of the system 8400. An example client 8402 includes a client computing device, and/or an application running on the client computing device. The example system 8400 further includes a model 8404 including an object reader, where the model 8404 may further include a document object model. In certain embodiments, the model 8404 is included on a client computing device, for example as a script included within a unified document surface application, and/or provided to the client 8402 by a document server upon opening the document. The example system 8400 further includes a formula engine 8410. In certain embodiments, the formula engine 8410 further includes circuits for dependency graph management, invalidation graph management and/or providing pared invalidation graphs (e.g., improved and/or optimized invalidation graphs), a query analysis and/or query optimization (or improvement), and/or query execution. In certain embodiments, the formula engine 8410 is included within the document, on the client 8402, and/or on a document server. The example system 8400 further includes a storage manager 8412, which may be stored on the document server and/or on a client computing device. In the example system 8400, the formula engine 8410 communicates aspects of the dependency graph, invalidation graph, and/or query operations, and/or may further communicate an execution object to the storage manager 8412.

The example storage manager 8412 includes operation log (and/or snapshot, and/or a document definition table) manager, tracking a committed log (e.g., operations already synchronized) and an uncommitted log (e.g., operations that have not been synchronized and/or are in conflict), and/or a user data store (e.g., environment variables, user specific information, volatile data, and/or other aspects created in the system 8400 that are part of one user's experience with the document but may not be present in another user's experience with the document). The example storage manager 8412 further includes a calculated data store (e.g., to re-use calculation information that is still valid and reduce resource consumption), and/or a dependency graph store. The storage manager further includes a model mutator that controls updates to the document model and/or execution object. An example model mutator includes an undo manager (e.g. storing pending operation log updates) and/or an object table (e.g. a system table providing information about instances of the document object that are present in the document). The model mutator in the example system 8400 is in communication with an operation synchronization 8406 module, such as an arbitration circuit, wherein the model mutator allows updates to the operation log (e.g., the committed log) in response to synchronization and/or conflict management operations of the operation synchronization 8406 module. The example system 8400 further includes the storage synchronization 8414 module, which coordinates updates from external resources 8408, such as any source data, external source data, and/or external data sources described throughout the present disclosure. In certain embodiments, external resources 8408 can be mirrored to the storage manager 8412, for example on a scheduled basis and/or with the same authorizations enforced relative to the external resources 8408, for example to provide for shared access and improved system performance for the external resources 8408. The example system 8400 further includes a partial data manager 8503, which may include storing calculation results, intermediate results, query results, data values, and other parameters which may be shared in the system 8400 to improve operations and reduce resource utilization. The example partial data manager checks data integrity for partial results, for example utilizing the invalidation graph and/or dependency graph, and is accessible to provide data in response to operations of the system 8400.

An example system 8200 further includes a data value 8304 further including an external data source reference 8318. An example system 8200 includes at least two external data source references 8318 (e.g., a second external data reference 8320), where the formula engine 8306 further directs execution of the executable object 8312 in response to a first priority corresponding to the first external data source reference 8318 and a second priority corresponding to the second external data reference 8320.

Figure 96:
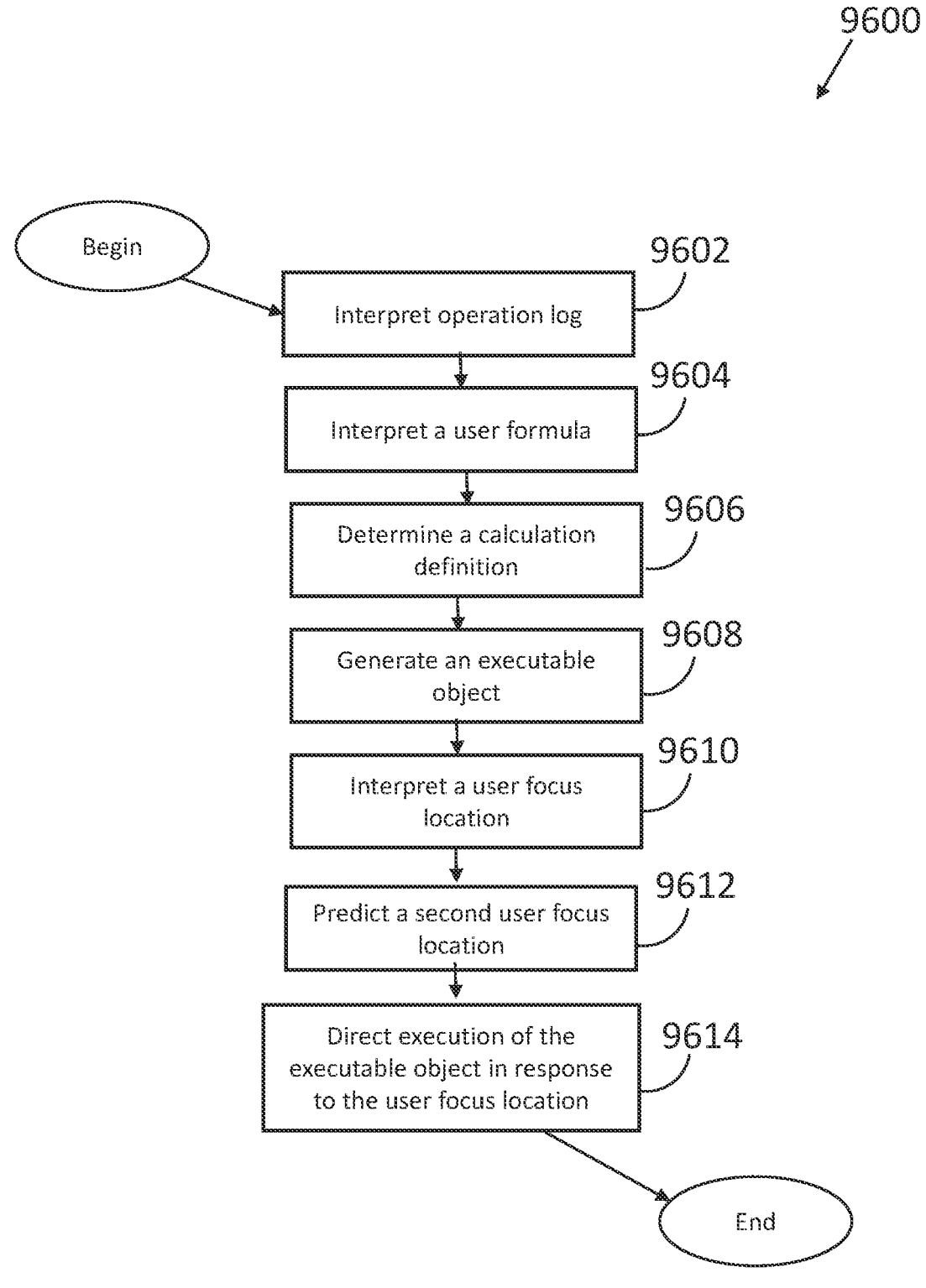
FIG. 96 is a schematic flow diagram of a procedure for working with data.

Referencing FIG. 96, an example procedure 9600 includes an operation 9602 to interpret an operation log, an operation 9604 to interpret a user formula, and an operation 9606 to determine a calculation definition in response to at least one formula of the document. The example procedure 9600 further includes an operation 9608 to generate an executable object in response to the calculation definition, an operation 9610 to interpret a user focus location, and an operation 9614 to direct execution of the executable object in response to the user focus location. An example procedure 9600 further includes an operation 9612 to predict a second user focus location, and where the operation 9614 to direct the execution of the executable object is further in response to the second user focus location.

An example procedure 9600 further includes the operation 9612 to predict the second user focus location in response to at least one of: a state value; a previous operation sequence of a user accessing the document; a previous operation sequence of a user; a relationship value between the user focus location and a data value within the document that is not within the user focus location; and a processing time to hydrate a data value within the document that is not within the user focus location. An example operation 9612 to predict the second user focus location is further in response to at least one of: a document type value; a data type value of a data value within the document that is within the user focus location; and a data type value of a data value within the document that is not within the user focus location.

An example operation 9612 to predict the second user focus location is further in response to at least one of a user device type and/or a user device resource description. An example procedure 9600 further includes the operation 9614 further including dividing operations of the executable object between at least two of: the document server, the client computing device, and at least one of workflow server.

Previously known data access, visualization, and presentation tools (collectively-visualization tools (VTs)) suffer from a number of drawbacks. Visualization access to the data in previously known VTs is static, where the configured view for the data is fixed, even where the data itself is dynamically updated. For example, a user creates a graph, chart, or other visualization element (collectively—VEs) linked to the respective data. During the process of creating the VE, the user specifies the formatting (e.g., units used, colors, line types, etc.) and the chart generates or updates to reflect the data. Changes to the underlying data can be updated in the chart if properly linked to the VE—for example if the referencing to the data contemplates that new rows of data may be added, and/or if the link to the data is live. Often, addition of new data will not result in an update to the VE, leaving undepicted data elements within the data set. The user may not recognize that not all data is presented without a detailed check of the underlying data. Additionally, view elements such as chart types, colors, lines, etc. are not readily update-able, and rely on user interaction that is both quantitatively high (e.g., a large number of operations from the user) and sophisticated (the user needs highly specific knowledge of the VT to make changes). For example, the VT may present the user with a large template selection (bar graph, scatter graph, columns, etc.) with little guidance as to which template may be relevant, and/or change operations require detailed knowledge of the VT (right-clicking elements and selecting appropriate properties to change, browsing through property tabs related to the VE, and/or working in a coded back-end environment such as C++, SQL, and/or Visual Basic to enact changes to the VE).

The creation of multiple VEs with a contextual similarity is difficult in previously known VTs, requiring the re-creation of a VE through repetitive operations, copying- and -pasting a VE and manually updating referenced data for each copied VE, or copying entire files and replacing copies of the prior data with updated data. Each of these presently known processes include multiple operations by the user that take time away from analyzing the actual data, present multiple opportunities for the user to make an error which may not be easily diagnosed, and/or require significant training and sophistication to enable even a basic data visualization capability.

Still further, presently known VTs maintain separation between the linked data and the VE. VEs provide for powerful tools to analyze data, and trends, errors, or other features of a data set may be more readily noticed in a VE than in a view of the raw data. The separation between the linked data and the VE in presently known VTs require several operations from a user to make adjustments to the data and see the result of the adjustments, such as accessing the raw data, editing it, and checking the VE for the effects of the edit.

Additionally, presently known VTs maintain a static and limited access view to the data itself. For example, to present aggregated data in a presently known VT, an aggregated data set must be explicitly created-whether as a tangible data table or virtually through code related to the VE being prepared. Further, data utilization, such as: action based on visualized data; operations between multiple data sets (whether multiple locations within a data set or multiple selections from more than one data set); multi-level access to data (e.g., accessing both parent and child data); and/or operating formulas on data; requires the user to specifically code in the behavior (whether through actual constructed code, selections utilizing a number of menus, and/or creation of artificial dedicated data sets to provide a view of the desired resultant data, which artificial dedicated data sets require updating or re-creation if they need to reflect updates to the source data).

Accordingly, tools and improvements are desired to provide for more convenient and powerful user access to data, VE, and analysis, and that is accessible and intuitive to an ordinary user without requiring specialized knowledge for operating an application and/or coding a solution.

Typical web applications are often made up of a database and a frontend for that database. The frontend for the database often contains a set of controls that users can use to control what the application does. In an example, Instagram is database of photos that get surfaced to users through a mobile and web interface. That interface gives users a few controls (e.g., a "like" button, a comment form field, a share button, and so forth) to enable users to conduct a set of actions.

In embodiments, according the methods and systems of the present disclosure, tables may function like lightweight databases that allow users to manipulate data using controls that are commonly found only in software applications and not within document surfaces, such as the unified document surface, as described herein. For example, reporting software commonly contains a control for users to toggle a "date" range of the data they are viewing. In embodiments, according the methods and systems of the present disclosure, a creator of a document may be provided with the ability to create this date range control and bind it to objects of interest to them (e.g., tabular data, other controls, formulas, and the like).

In embodiments, controls, as described herein, extend the functionality of a document surface by providing functionality that is not found in traditional document surfaces and may provide non-programmers (e.g., document users) the ability to provide their users control over all aspects of a document that is not possible in a traditional document. Often users of other document platforms piecemeal together these types of controls by making users enter a certain value in a cell of a spreadsheet, and then drive downstream actions from that single spreadsheet cell. But this is a less than optimal approach, and users often are more comfortable with the form factor of traditional controls (e.g., in other apps) and end up confused about where and how to enter data, or end up entering data incorrectly. In contrast, the controls of the methods and systems of the present disclosure may be accessible to users via formula language, as described herein, that allows a user to compose the individual parts of wanted controls together.

In embodiments, according the methods and systems of the present disclosure, each control may have a name, a value and other optional parameters. The name of a control may enable a user to access that control in the formula language, as described herein. The value of a control may enable a user to access and use that value in other places throughout a document.

In embodiments, users may add controls to a canvas (i.e., with a unified document surface) and to a table itself.

In embodiments, users may use values from a control to drive other actions in a document.

Figure 11:
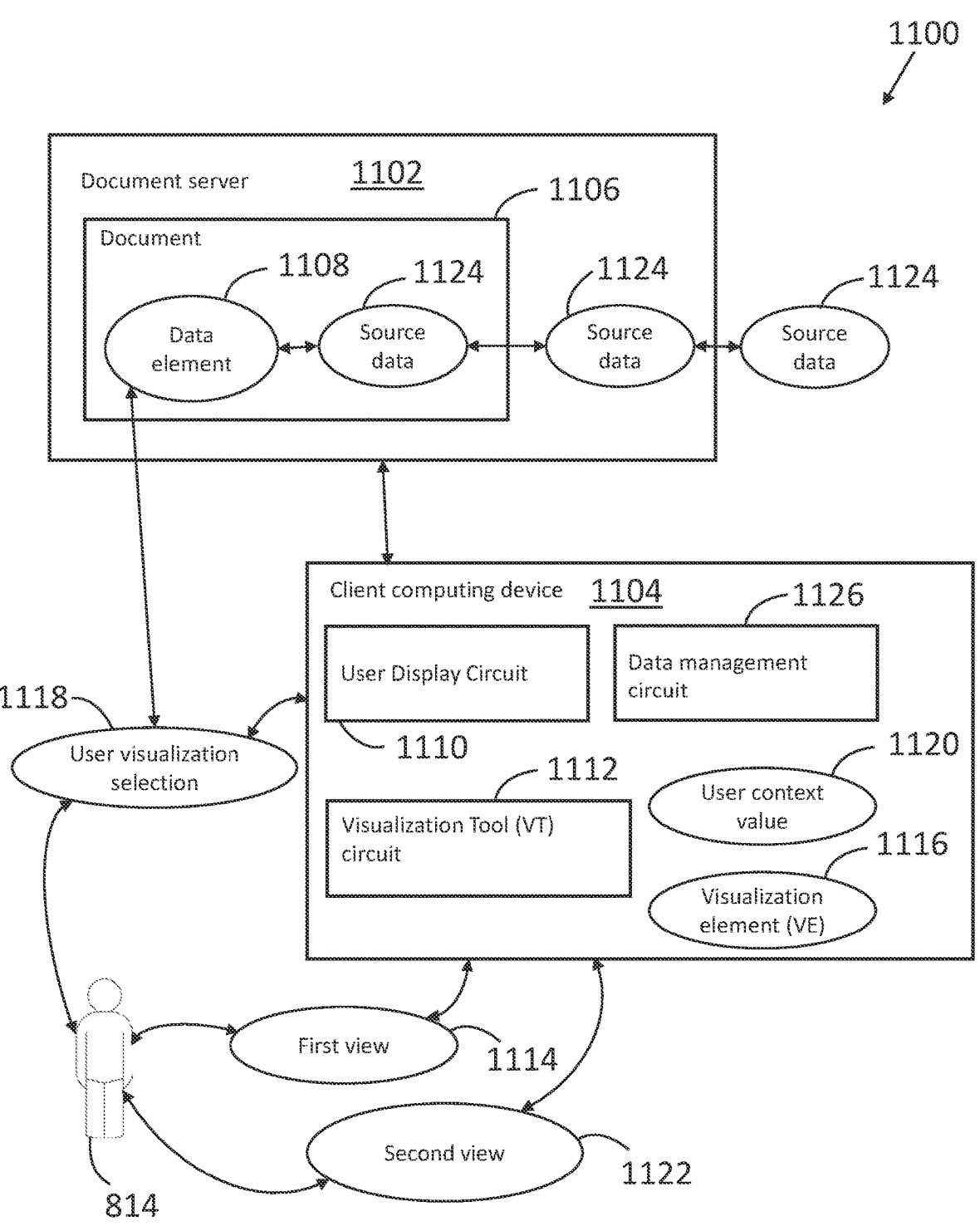
FIG. 11 is a schematic depiction of a system for providing a visualization.

Referencing FIG. 11, a system 1100 is schematically depicted including a document server 1102 that communicates at least a portion of a document 1106 to a client computing device 1104, the document 1106. The document 1106 includes a data element 1108, which may include at least a portion of the document 1106, source data 1124 (e.g., data linked or referenced in the document 1106), and/or information derived from the document 1106 or source data 1124. Source data 1124 may be in any location—the example system 1100 includes source data 1124 within the document 1106, on the document server 1102 in a location separate from the document 1106, and/or outside the document server 1102 (e.g., with a third party provider, on a database, and/or a website). In certain embodiments, the data element 1108 is included within the document 1106 and does not include source data 1124. In certain embodiments, the data element 1108 includes the entire document 1106. The example system 1100, and other depictions throughout the present disclosure, provide for non-limiting illustrative examples of data and data flows (e.g., with arrows depicting certain directional flow). The data and data flows depicted are provided for certain example embodiments, but data flow may be in any direction, and data may be present anywhere within the described systems and examples. Where a particular system element utilizes data, the data is accessible to the system element, but may be located on a same device (e.g., the client computing device 1104) and/or communicated to the system element utilizing the data.

The example system 1100 further includes a client computing device 1104 having a user display circuit 1110 that provides a first view 1114 in response to the data element 1108, where the first view 1114 includes at least a portion of the data element 1108. The description including a first view 1114 and second view 1122 herein is utilized to illustrate certain principles of the present disclosure. From the perspective of the user 814, the first view 1114 and the second view 1122 may be a depiction of a portion of the data element 1108 at separate points in time, and may be on the same display device. In certain embodiments, an update of underlying information in response to a user visualization selection 1118 or other information may result in a first view 1114 that is identical to the second view 1122, depending upon operations performed and the result of the updated sorting, filtering, linking, referencing, formatting, aggregating, or other operations. In certain embodiments, the view provided to the user 814 is directed to a portion of the data element 1108 (e.g., based on the current portion of the document 1106 the user 814 is viewing), and updates to operations herein may affect portions of the document 1106 not presently visible to the user 814, resulting in a first view 1114 and second view 1122 that are identical, at least until an affected portion of the document 1106 is accessed by the user 814.

Example and non-limiting user display circuits 1110 include input and/or output devices interacting with the user 814 (e.g., a monitor, screen, touch sensitive display, mouse, keyboard, a voice interacting device, a website or webserver accepting display input and/or publication of the views 1114, 1122, a printer, and/or a non-transient memory location having input and/or output data), devices communicating with such input and/or output devices (e.g., drivers, cards, a network, internet, or mobile communication device), executable instructions stored on a non-transient computer readable medium wherein the instructions when executed cause a computer to perform one or more operations of the user display circuit 1110 and/or communications with one or more of the preceding devices, and/or a computing device accessing such instructions. In certain embodiments, the first view 1114 and second view 1122 are depicted as interactive with the user 814, for example as a portion of the document 1106 currently viewed by the user 814 and editable by the user 814 according to an application accessing the document 1106 or portions thereof.

The example client computing device 1104 includes a visualization tool (VT) circuit 1112 that determines a visualization element (VE) 1116 in response to the data element 1108, and further in response a user visualization selection 1118 and/or a user context value 1120. A user visualization selection 1118 includes any operations by the user 814 that provide for an update to the VE 1116, which may provide for an update to the view 1114, 1122 depending upon whether the update to the VE 1116 results in a change that would be visible to the user 814. Example and non-limiting user visualization selections 1118 include a user entry of or change to a formula, a user entry of or change to a control (e.g., a radio button, check box, slider tool, and/or multiselect tool), a user drag-and-drop operation, a selection of data having a property to be inherited, a selection of an object having a property to be inherited and/or any other operation providing for a change to a format, a sorting parameter, a filtering parameter, and/or an aggregating parameter according to any descriptions herein. Example and non-limiting VT circuits 1112 include network communication devices capable of accessing the other portions of the client computing device 1104 and/or the document server 1102, executable instructions stored on a non-transient computer readable medium wherein the instructions when executed cause a computer to perform one or more operations of the VT circuit 1112, and/or a computing device accessing such instructions.

An example user display circuit 1110 further provides a second view 1122 in response to the VE 1116 and the data element 1108. For example, where a user visualization selection 1118 indicates that a change in the VE 1116 is present or potentially present, the VT circuit 1112 determines an updated VE 1116 based on the data element 1108, and provides a second view 1122, changed in response to the updated VE 1116, to the user 814. The example further includes a change for the second view 1122 such as a display of a portion of the data element 1108 currently accessed by the user 814, where the change includes a formatting operation, a sorting change (e.g., sorting on a different column or set of columns for a table), a filtering change (e.g., change filtering values for the displayed data set), and/or an aggregating operation (e.g., group, summarize, provide a summation, provide an average, create a pivot table, and/or create a representative data view such as a chart, graph, table, or structured data arrangement).

Figure 12:
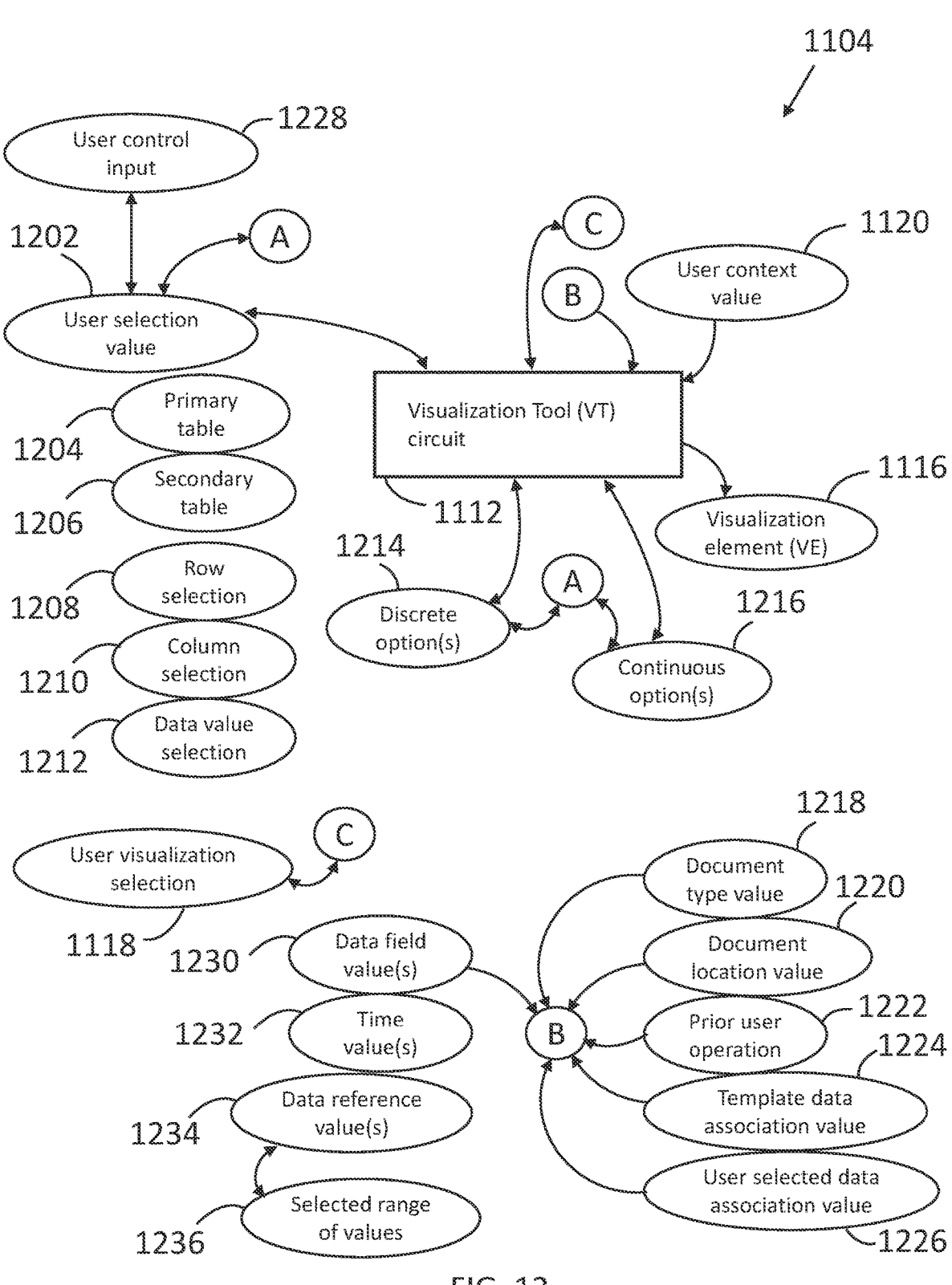
FIG. 12 is a schematic depiction of a visualization tool circuit.
Figure 13:
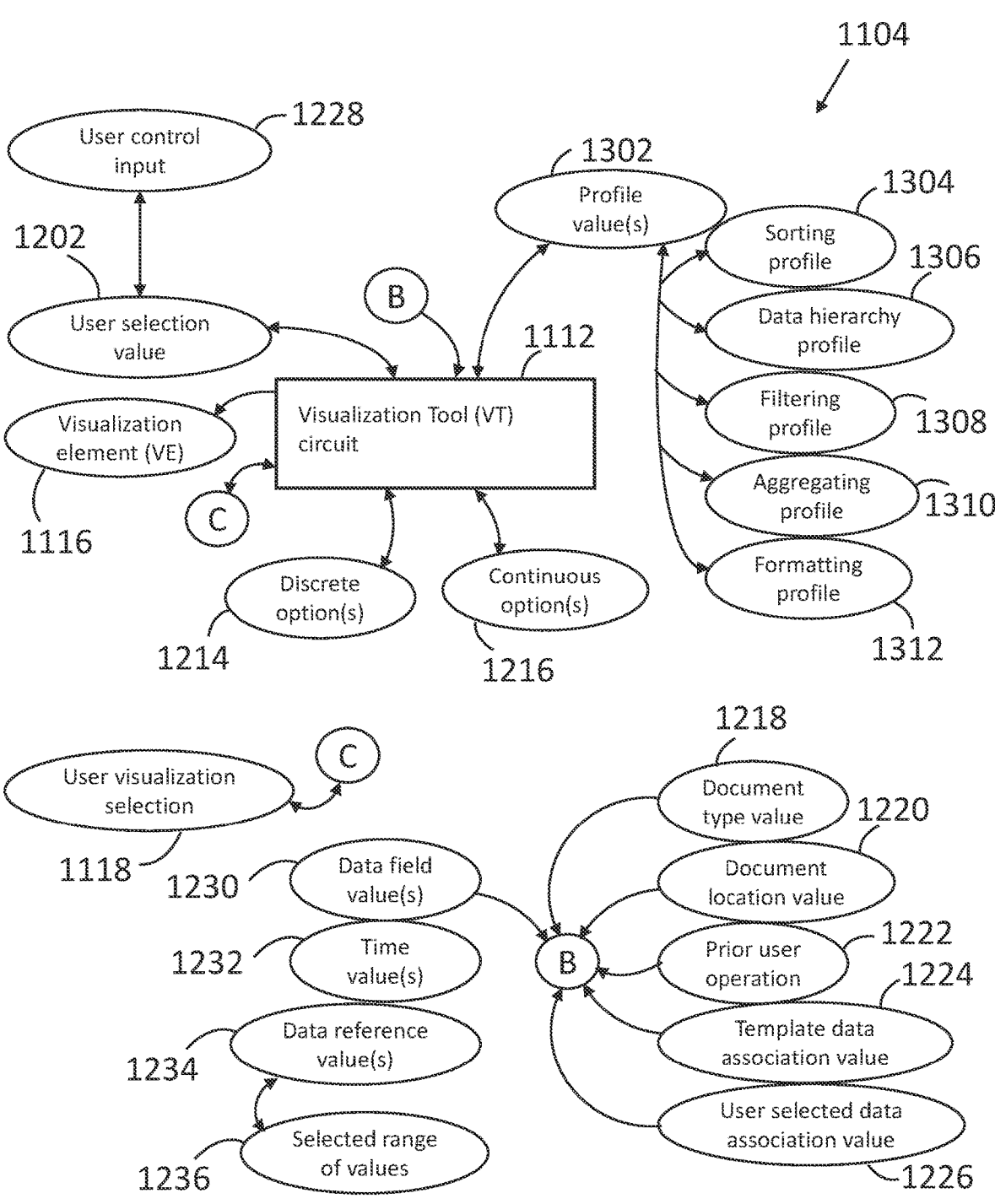
FIG. 13 is a schematic depiction of another embodiment of a visualization tool circuit.

Referencing FIG. 12, an example client computing device 1104 includes the VT circuit 1112 further interpreting a user selection value 1202, and determining the VE 1116 in response to the user selection value 1202.

An example user selection value 1202 includes a primary table 1204 and a secondary table 1206. An example VT circuit 1112 determines the VE 1116 in response to the primary table 1204 and the secondary table 1206 by performing an operation such as: applying a property (sorting, filtering, formatting, heading names, row and/or column ordering, and/or aggregating) from the primary table 1204 to the secondary table 1206; and/or applying a property to the secondary table 1206 in response to the primary table 1204 (e.g., the primary table 1204 includes a data field related to data on the secondary table 1206, and the VT circuit 1112 aggregates, sorts, filters, or formats the secondary table 1206 based on the related data field from the primary table 1204).

An example user selection value 1202 includes a row selection 1208, a column selection 1210, and/or a data value selection 1212. An example VT circuit 1112 determines the VE 1116 in response to the row selection 1208, the column selection 1210, and/or the data value selection 1212 ("selected element") by performing an operation such as: applying a formatting of the selected element, sorting in response to the selected element, filtering in response to the selected element, and/or aggregating information in response to the selected element.

An example user selection value 1202 includes a data type, tag, metadata, document section, and/or data value defining one or more of these. An example VT circuit 1112 applies the VE 1116 (e.g., a formatting option, a sorting option, a filtering option, heading name changes, an aggregating option, or the like) to data elements in the document 1106 and/or selected sections of the document in response to the user selection value 1202. For example, a table having a certain tag (e.g., "monthly sales") can be formatted conditionally according to the user visualization selection 1118, and tables with similar tags can readily inherit the VE 1116 according to the user visualization selection 1118. It can be seen that the VT circuit 1112 allows for rapid configuration of data visualization options throughout the document 1106 at a scope selectable by the user 814.

An example client computing device 1104 includes the VT circuit 1112 determining a number of discrete options 1214 in response to the user context value 1120 (the number of discrete options 1214 being at least one discrete option 1214), interpreting a user selection value 1202 including at least one of the discrete options 1214, and determining the VE 1116 further in response to the user selection value 1202. For example, the VT circuit 1112 may respond to a user input or user context (e.g., document type, document section, template information, and/or rule-based information) to prompt a user with one or more discrete options 1214, and/or the user may request one or more discrete options (e.g., through a menu, toolbar option, context-sensitive menu, and/or other request), such as a check box, radio button, and/or a selection from a group of selected data values. The VT circuit 1112 provides the discrete options 1214 to the user 814, and interprets a user selection value 1202 indicating which one or more of the discrete options 1214 is selected. In response to the selected discrete option(s) 1214, the VT circuit 1112 determines the VE 1116—for example applying a filtering, sorting, aggregating, and/or formatting operation to one or more aspects of the data element 1108, and updating the first view 1114 to the second view 1122 accordingly.

In certain embodiments, the VT circuit 1112 determines the discrete option(s) 1214 and/or continuous option(s) 1216 in response to a user context value 1120 such as a document type value 1218, a document location value 1220, a prior user operation 1222, a template data association value 1224, and/or a user selected data association value 1226. Data association values 1224, 1226 include linking or inheriting formatting or display options or elements from associated data (e.g., bringing in one or more formatting elements from a previously created table, graph, chart, and/or text; bringing in one or more formatting or display options or elements from an available table, graph, chart, and/or text; and/or simply bringing in or more formatting or display options or elements from an object having a desired option or element). An object as contemplated herein for linking or inheriting formatting or display options or elements include any type of object associated with a document 1106 and/or source data 1124, including at least: a table; a table row; a table column; a chart of any type; a figure of any type; a picture; an audio, visual, or audiovisual element; a document section reference; a data link or reference; a text value; a section of selected text; a tag (e.g., a user-provided explicit, tag, an arbitrary, non-user-generated tag, and/or implicit); metadata; portions or elements of any of these; and combinations of these. In certain embodiments, a formatting or display option or element is linked or inherited, and a change is made to the formatting or display option or element in the child object, and a data management circuit 1126 (reference FIG. 11) provides a change to the parent object in response to the change in the child object. For example, a text font color change in the child object from green text to red text may be propagated to the parent object to change text related to the inherited values from green text to red text. In certain embodiments, propagation to the parent object may be made in response to user preferences, user permissions, user authorizations, rules (e.g., explicitly defined, from an authorized administrator, and/or derived from a template repository of rules), and/or may further include prompts to the user 814 to authorize the propagation of the format or display option or element to the parent object.

Data association values 1224, 1226 may include associated data of a same type (e.g., a table associated with a table, where certain formatting options such as text fonts, sizes, and/or colors, and/or column widths, or other display options such as sorting or filtering, are to be inherited) or of distinct types (e.g., a table associated with a graph, where one or more formatting options that are mutually available are to be inherited-such as formatting of text, aggregation logic such as matching of a column in a chart to an aggregation logic of the table, and/or sorting order for the table responsive to a data sorting in the chart). Where a data management circuit 1126 propagates format or display options or element to the parent object, the propagated options may be of the same type or of distinct types. The example VT circuit 1112 further interprets a user selection value 1202 including one or more of the discrete options 1214, and/or one or more of the continuous options 1216, and determines the VE 1116 further in response to the user selection value 1202.

In certain embodiments, the VT circuit 1112 determines one or more discrete options 1214 and/or one or more continuous options 1216 in response to a time value 1232, a selected range of time values 1232, a data field value 1230, a selected range of data field values 1230, a data reference value 1234, and a selected range of values 1236 corresponding to the data reference value 1234. An example discrete option 1214 and/or continuous option 1216 includes a time display, where the user control input 1228 includes at least one time value 1232 or a selected range of time values 1232 from the time display. An example discrete option 1214 and/or continuous option 1216 includes a data field display, where the user control input 1228 includes at least one of a selected data field value 1230 corresponding to the data field display, or a selected range of data field values 1230 corresponding to the data field display. An example discrete option 1214 and/or continuous option 1216 includes a data reference value 1234, where the user control input 1228 includes a selected data reference value 1234 and/or a selected range of values 1236 corresponding to the selected data reference value 1234. For example, a user 814 may enter a reference data value for linking or inheriting formatting or display options or elements, and the VT circuit 1112 provides one or more potentially matching options based on data in the data element 1108, the document 1106, and/or the source data 1124 (e.g., in a suggested drop-down list, as a multi-select tool, as a slider tool, as a table, and/or as a structured data element), and the user control input 1228 includes an entry (e.g., a selection of a value, a selection of a range of values, and/or an interaction with a tool such as setting a slider value) from the user 814, where the VT circuit 1112 updates the VE 1116 in response to the user control input 1228. In certain embodiments, data related to and/or corresponding to the data reference value 1234 is utilized for updating the VE 1116 rather than the data reference value 1234. For example, the user 814 may be working with a data set such as a particular report (e.g., an annual report, a quarterly report, a sales report, and/or a recruiting report), and updates formats or display options for the data and/or output of the report by selecting a name of a previous report (e.g., user references "annual report", and the VT circuit 1112 displays discrete options 1214 and/or continuous options 1216 of available annual reports within the data element 1108, the document 1106, and/or the source data 1124 for selection by the user via a user selection value 1202 and/or user control input 1228), where the updating of the formats or display options for the data is performed by the VT circuit 1112 pulling the formatting, display options, or both, from one or more previous reports in response to the user selection value 1202 and/or user control input 1228, the VT circuit 1112 updating the VE 1116, and as appropriate updating the view 1114, 1122 when the user 814 accesses a portion of the data element 1108 having display options affected by the updated VE 1116.

Continuous, as used herein, should be understood broadly. Without limitation, a continuous option 1216 includes an option that is: continuous (e.g., lacking discrete divisions in available values); that is based on a floating point value (e.g., single precision, double precision, or otherwise); that includes a multiplicity of discrete options, where the discrete options are numerous enough that at least one of the following conditions is present: 1) the differences between values are not quantitatively apparent to the user, 2) the differences between values are much smaller than the available range of the data (e.g., less than 10%, less than 5%, and/or less than 1% of the available range of the data), and/or 3) there are more than a specified number of discrete options available (e.g., more than 10, more than 25, more than 128, more than 256, and/or more than 1024); that includes a division between options such that at least one of the following conditions is present: 1) the differences between values allow for a minimum graphical movement of the selection object (e.g., one pixel, two pixels, 5 pixels, a number of pixels visibly apparent to the user), 2) the differences between values allow for a selectable division of the underlying data (e.g., to the nearest dollar, nearest day, nearest hour, and/or per letter of the alphabet), and/or 3) the differences between values allow for a selectable precision on output response of the control (e.g., to the nearest dollar, nearest day, nearest hour, a discernable change in color, and/or per letter of the alphabet). In certain embodiments, the increment of the control (whether linked to a discrete option 1214 or a continuous option 1216) may be varied by the user 814, for example allowing the user to zoom in, zoom out, fix to a set step size, or otherwise change the increment of the control. A control may provide for a continuous option 1216 for one purpose, and provide for a discrete option 1214 for a different purpose. A control may provide for a continuous option 1216 in certain data ranges, and provide for a discrete option 1214 in other data ranges. A control may provide for a continuous option 1216, and provide for disallowed values, for example even within the range of continuous options 1216. One of skill in the art, having the benefit of the disclosure herein, can readily determine whether and under what conditions a control includes a discrete option 1214 or a continuous option 1216, and the increment values of the control. Certain considerations for determining the discrete or continuous nature and increment value of a control include the characteristics of the underlying data, the desired output parameters (e.g., filtering, aggregation, formatting, and sorting), the purpose of the output parameters, and/or the characteristics and performance (e.g., screen display, processing power, memory availability, and/or network speed) of the client computing device 1104 and/or communication between the client computing device 1104 and the document server 1102. In certain embodiments, the user 814 may be provided with options to adjust control parameters (e.g., minimum value, maximum value, step size, allowable ranges or values, disallowed ranges or values, data options, and/or formatting options). Example and non-limiting controls include: a switch control; a multi-state switch control; a multi-picker control; an option list picker control; a dropdown picker control; a numeric slider control; a date slider control; a time slider control; a map picker control; a text box control; a validated text box control; a structured text box control; a card layout control; a drawing shape control; a media visual control; a table renderer control; a chart control; a shape set control; a numeric range slider; and/or a date range picker control.

An example VT circuit 1112 further determines the user visualization selection 1118 in response to a user control input 1228. Example and non-limiting user control inputs 1228 to determine the user visualization selection 1118 include a user selection value 1202 such as one or more discrete options 1214 and/or one or more continuous options 1216. Referencing FIG. 13, an example VT circuit 1112 further determines at least one profile value 1302 in response to the user control input 1228. Example and non-limiting profile values 1302 include a sorting profile 1304, a data hierarchy profile 1306, a filtering profile 1308, an aggregating profile 1310, and/or a formatting profile 1312. For example, a selected object such as a table, structured data, a figure, and/or a chart, may have a sorting profile (e.g., sorting logic, column priority, high-to-low or low-to-high organization, etc.) and the VT circuit 1112 determines a sorting profile 1304 for a target data object (of the same or a distinct type from the selected object), and determines the VE 1116 in response to the sorting profile 1304.

Figure 14:
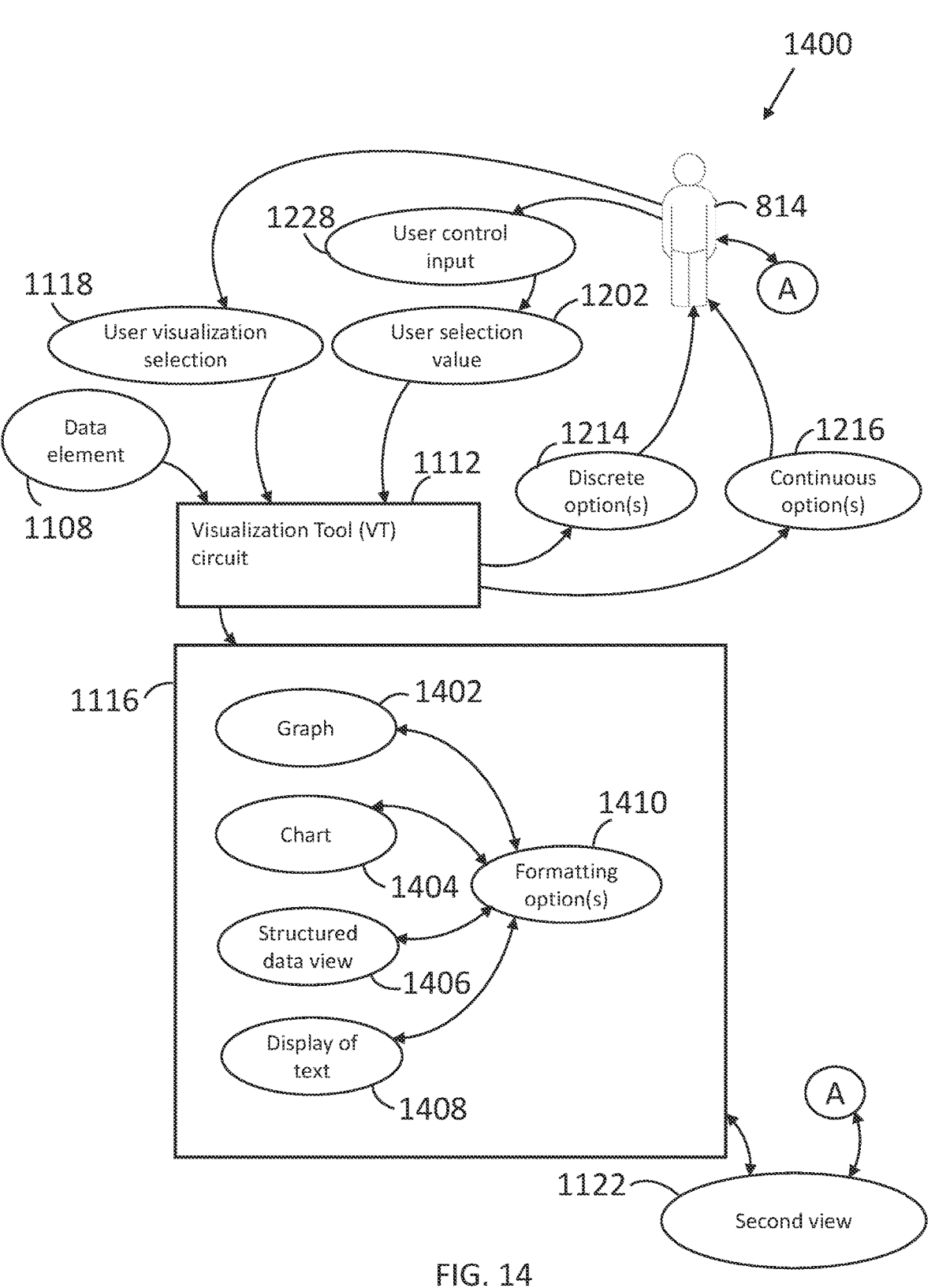
FIG. 14 is a schematic depiction of a system for providing a visualization.

Referencing FIG. 14, an apparatus 1400 having a VT circuit 1112 interacting with a user 814 is depicted schematically. An example apparatus 1400 may be included as a portion of a system 1100. The example apparatus includes a VE 1116 including a graph 1402, a chart 1404, a structured data view 1406, a display of text 1408, a format option 1410 for any of the preceding, and/or a format option 1410 for at least a portion of any of the preceding. The example apparatus 1400 includes the VE 1116 having a format option 1410 for at least a portion of a display of text 1408.

Figure 15:
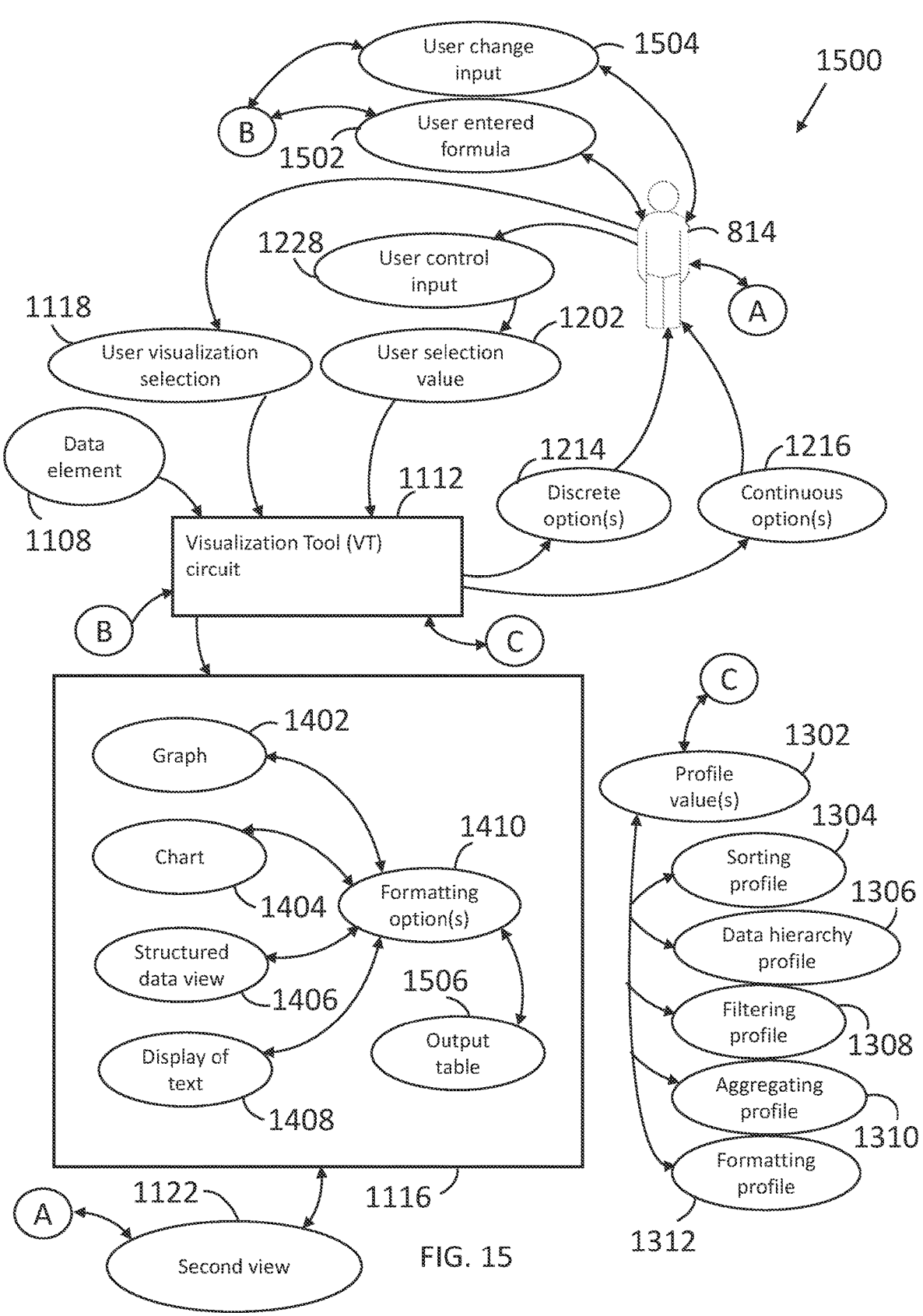
FIG. 15 is a schematic depiction of another embodiment of a system for providing a visualization.

Referencing FIG. 15, an example apparatus 1500 includes a VT circuit 1112 that determines the VE 1116 in response to a user entered formula 1502. In certain embodiments, the user entered formula 1502 may be any type of formula, and further may include references to any tags, identifiers, object names, or the like anywhere within the data element 1108, the document 1106, and/or the source data 1124. Additionally or alternatively, the user entered formula 1502 may be commenced with a menu selection, a toolbar selection, a button selection, and/or entry of specific characters or character sequences. A user entered formula 1502 may be displayed directly, an output or result of the formula may be displayed, and/or the user entered formula 1502 may be hidden completely. The display options for the user entered formula 1502 may vary with the operations of the user 814, for example and without limitation the user entered formula 1502 may be: displayed in a first manner when selected (e.g., allowing the user to edit the formula) and in a second manner when not selected (e.g., displaying an output of the formula and/or hiding the formula); and/or displayed in a first manner during editing of the data element 1108 and/or document 1106, and displayed in a second manner for printing, publishing, or other output operations of the data element 1108 and/or document 1106. In certain further embodiments, the VT circuit 1112 further determines at least one profile value 1302 in response to the user entered formula 1502. Example and non-limiting profile values 1302 include a sorting profile 1304, a data hierarchy profile 1306, a filtering profile 1308, an aggregating profile 1310, and a formatting profile 1312. The example VT circuit 1112 further determines the VE 1116 in response to the profile value 1302.

An example VT circuit 1112 further interpolates between a plurality of format options 1410 for a graph 1402, a chart 1404, a structured data view 1406, and/or a display of text 1408. For example, linking, referencing, and/or selection of multiple format or display options or elements may create more than one applicable format option 1410 for a given aspect of the VE 1116. The example VT circuit 1112 determines a format or display option or element in such a situation by any one or more of the following operations: interpolate between two applicable formatting options (e.g., —one linked display option indicates that a value of 10 is a color blue, a second linked display option indicates that a value of 20 is a color yellow, and the VT circuit 1112 determines the value 15 will be formatted green in response to the linked display options); select a closest one of the applicable formatting options based on data values; provide for a weighted average of formatting options (e.g., where more than two applicable formatting options are available); provide for a higher priority one of the options (e.g., look at the available options, and determine which has a higher priority according to the nature of the underlying data, a recency of the source of the formatting options, a user role or title that created the source of the formatting options, and/or a relevancy factor for the source of the formatting options to the current document, data, document section, or the like that the user is working with); and/or rules applicable to the formatting option selection such as a template or user-entered rule. The relevancy factor may be determined in response to, without limitation: the type of data the user is currently working with relative to the type of data associated with the format or display options or elements; a description of the data values indicating a level of match (e.g., current data values are closer to one data set than a second data set); a heading, tag, or title in one or more data sets having a match; a count of a matching number of columns, data series, or other data similarity indications (e.g., column titles, date ranges, etc.); and/or a prompt and user selection to determine which of the formats or display options is most relevant.

In certain embodiments, an example VT circuit 1112 applies a gradient formatting option 1410 to one or more aspects of the second view 1122. For example, the VT circuit 1112 determines boundary values each associated with a formatting option 1410 (e.g., a minimum and maximum value, each having an associated color), and applies gradations of the formatting option 1410 for values between the boundaries. The gradations may be applied according to the values between (e.g., a value close to one of the boundaries includes a formatting option 1410 having a value close to the boundary formatting option 1410), applied in order (e.g., selected steps between boundary options in data sorted order, regardless of the specific relationship of values to the boundary values, where the selected steps may be linear (e.g., equal size steps) or another relationship such as logarithmic, exponential, or the like). In certain embodiments, boundary values and formatting options 1410 may be selected automatically (e.g., from the highest and/or lowest values), selected by a user, updated in real time (e.g., boundaries change as data updates change the highest and/or lowest values), and/or fixed or updated periodically or in a user selected fashion. In certain embodiments, gradation formatting options 1410 may be extrapolated outside the boundary values, capped or limited at the boundary value formatting options 1410 for values that are outside the boundary values, and/or a distinct formatting option (e.g., a different color, a default color, etc.) may be applied for values that are outside the boundary values. In certain embodiments, where values are outside the boundary values, the user may be prompted for an action (e.g., treatment type such as extrapolation, capping, applying a distinct format, and/or moving the boundary out to a new limit), and/or automatic action may be taken (e.g., according to defaults, rules defined by a user, template, and/or administrator, according to a data type (e.g., font colors capped at the boundaries, while font sizes are extrapolated)) outside the boundary values. In certain embodiments, more than one gradation may be applied to a data element 1108, for example both a font size and a font color may have gradations. The described examples of a gradient formatting option 1410 and operations related thereto, are non-limiting examples for purposes of illustration. Without limitation, examples of gradation formatting options 1410 include font colors, font sizes, line thickness values, highlighting and/or background colors, line colors, chart colors, and/or data grouping values (e.g., a data set grouped by graduated time frames such as days near a first boundary and years near a second boundary). One of skill in the art, having the benefit of the disclosure herein and knowledge ordinarily available contemplating a particular system, can readily determine gradient formatting options 1410 and related operations thereto. Example and non-limiting considerations to determine gradient formatting options 1410 and related operations thereto include the type of data element 1108, the type of document 1106, characteristics of the user 814, purpose of the second view 1122, the type of formatting utilized for the gradient formatting option 1410, and/or the size and/or variability within a graduated data set (either by design or as observed based on real-time data).

An example VE 1116 includes a graph 1402 and/or a chart 1404, and the VT circuit 1112 further adjusts the second view 1122 in response to a user change input 1504. For example, a user 814 may adjust a graph 1402 or a chart 1404, such as by moving a data point, bar, column, line, etc. on the graph 1402 or chart 1404, changing a format of a point or data series on the graph 1402 or chart 1404, changes a linked inheritance to the graph 1402 and/or chart 1404 (e.g., change a reference "format like the 2009 annual report" to a reference "format like the 2011 annual report", where the reference herein is described schematically). The VT circuit 1112 further adjusts the second view 1122 in response to the user change input 1504—for example applying a formatting or display change to other elements of the graph 1402 or chart 1404 that were not directly changed by the user based on the user change input 1504; updating formatting options and the display of the graph 1402 and/or chart 1404 in response to the linked inheritance change; and/or updating a display of an output table 1506 (e.g., source data for the graph 1402 and/or chart 1404, and/or a report generated in response to the graph 1402 and/or chart 1404) based on the user change input 1504 (e.g., user drags a data point from a value of 1250 to a value of 1275 on the chart, and the corresponding value on the table is changed) where a portion of the table is displayed to the user and accordingly the second view 1122 is updated. In certain embodiments, the VT circuit 1112 may prompt the user to confirm the adjusting of the second view 1122 in response to the user change input 1504. An example user change input 1504 includes a user interaction with a graphical element of the one of the graph 1402 or the chart 1404.

An example VE 1116 includes an output table 1506 and/or a structured data view 1406, and the VT circuit 1112 further adjusts the second view 1122 in response to a user change input 1504. Example and non-limiting structured data views 1406 include: a table providing a view of one or more data elements; a pivot table providing aggregated views of one or more data elements; a summary generated to provide information of one or more data elements (the summary may include multiple summary aspects such as sums, averages, interpolations and/or extrapolations, trends, and/or may include prose, graphs, tables, charts, and combinations of these); a selected data display of any one or more of the preceding (e.g., a card with selected information, a generated document with selected information, and/or a section of the document 1106 with selected information).

An example system 1100 includes a data management circuit 1126 that updates the data element 1108 in response to the user change input 1504. In certain embodiments, a user change input 1504 to a graph 1402 or chart 1404, which may be a graphically entered user change input 1504 (e.g., dragging a data point, bar, column, etc. to a different location), is entered by the user 814 and the data management circuit 1126 propagates changes to the data element 1108, document 1106, and/or source data 1124 in response to the user change input 1504. In certain embodiments, propagation to the data element 1108, document 1106, and/or source data 1124 may be made in response to user preferences, user permissions, user authorizations, rules (e.g., explicitly defined, from an authorized administrator, and/or derived from a template repository of rules), and/or may further include prompts to the user 814 to authorize the propagation of the format or display option or element to the parent object.

Figure 16:
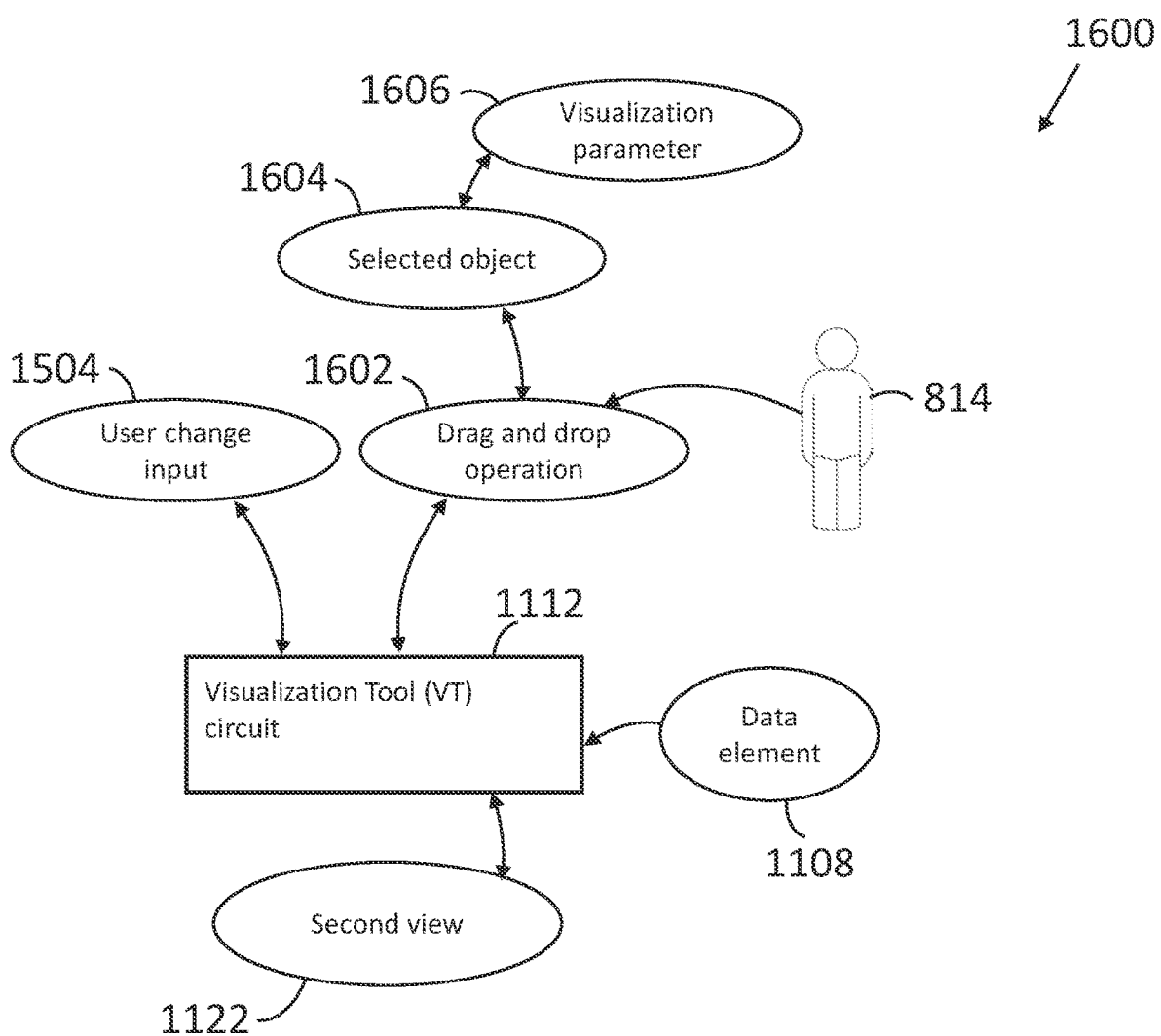
FIG. 16 is a schematic depiction of another embodiment of a visualization tool circuit.

Referencing FIG. 16, an example apparatus 1600 includes a VT circuit 1112 that determines the user change input 1504 in response to a drag-and-drop operation 1602. A drag-and-drop operation 1602 as used herein should be understood broadly. A drag-and-drop operation 1602 includes, without limitation: dragging an object, a data value, and/or portions thereof from a first location to a second location (e.g., utilizing a mouse, touch screen, or other user input device); referencing an object, a data value, and/or portions thereof at a first location, and referencing a second location; dragging an object, a data value, and/or portions thereof onto a second object, data value, and/or portions thereof; and/or referencing an object, a data value, and/or portions thereof, and referencing a second object, data value, and/or portions thereof, thereby completing the drag-and-drop operation 1602.

An example VT circuit 1112 is further adjusts the second view 1122 by re-sorting at least a portion of the second view 1122—for example sorting a table in response to a sorting of an associated table, where the associating is provided at least partially by the drag-and-drop operation 1602. An example VT circuit 1112 changes a hierarchy of at least a portion of the second view 1122—for example providing a first table created with a first hierarchy (e.g., a first primary table and a second secondary table, wherein the hierarchy indicates a primacy of the data organization, column headings, aggregation categories, etc.), and through a drag-and-drop operation 1602 switching to a second table created with a second hierarchy (e.g., switching the primary and secondary to the first table being secondary, and the second table being primary). An example VT circuit 1112 adjusts the second view 1122 by filtering at least a portion of the second view 1122—for example applying a filtering criteria from a first object to a target object in response to the drag-and-drop operation 1602. An example VT circuit 1112 adjusts the second view 1122 by aggregating data including at least a portion of the second view 1122—for example by creating a pivot table, selecting aggregating categories, and/or creating a related aggregation set (e.g., utilizing the same aggregation criteria, utilizing a parallel aggregation criteria) from a first object to a target object in response to the drag-and-drop operation 1602. An example VT circuit 1112 adjusts the second view 1122 by inheriting a format from a portion of the data element 1108 and applying the inherited format to at least a portion of the second view 1122—for example the user 814 drags a first object to a target object (or the target object to the first object), and the VT circuit 1112 applies one or more formatting aspects of the first object to the target object in response to the drag-and-drop operation 1602. The applied formatting aspects may be according to a selection, rule, or template setting (e.g., apply font settings), applicable formatting settings that are common between the first object and the target object. The first object and the target object may be of the same or distinct types. The updates of any sorting, formatting, aggregating, hierarchy changes, and the like, includes, in certain embodiments, applying aspects of the first object which are applicable to the target object, and/or analogizing aspects of the first object to target object (e.g., a chart dragged onto a table may allow for updating of certain aspects applicable to both, and other aspects that may be analogized such as table column headings changed to match category headings from the chart, etc.).

An example VT circuit 1112 adjusts the second view 1122 by inheriting a visualization parameter 1606 from an object 1604 selected in the drag-and-drop operation 1602, and applying the inherited visualization parameter 1606 to at least a portion of the second view 1122. A visualization parameter 1606 can include any aspect of an object that results in a potential change to the view 1114, 1122, such as a format option, a sorting option, a filtering option, an aggregating option, and/or an object type selection (e.g., table, structured data, chart, graph, text, etc.). Example and non-limiting objects 1604 include a data value, a graph, a chart, a table, a table row, and/or a table column. Example and non-limiting visualization parameters 1606 include a sorting description, a filtering description, a formatting description, an aggregation description, and/or a display value description.

A number of procedures for performing certain operations to change a view 1114, 1122 of a data element 1108 are described following. Operations are illustrative and non-limiting, and may be re-ordered, divided, and/or combined in any manner to perform similar functions, as will be understood to one of skill in the art having the benefit of the disclosures herein. In certain embodiments, one or more operations may be performed by components of a system such as the system 1100.

Figure 17:
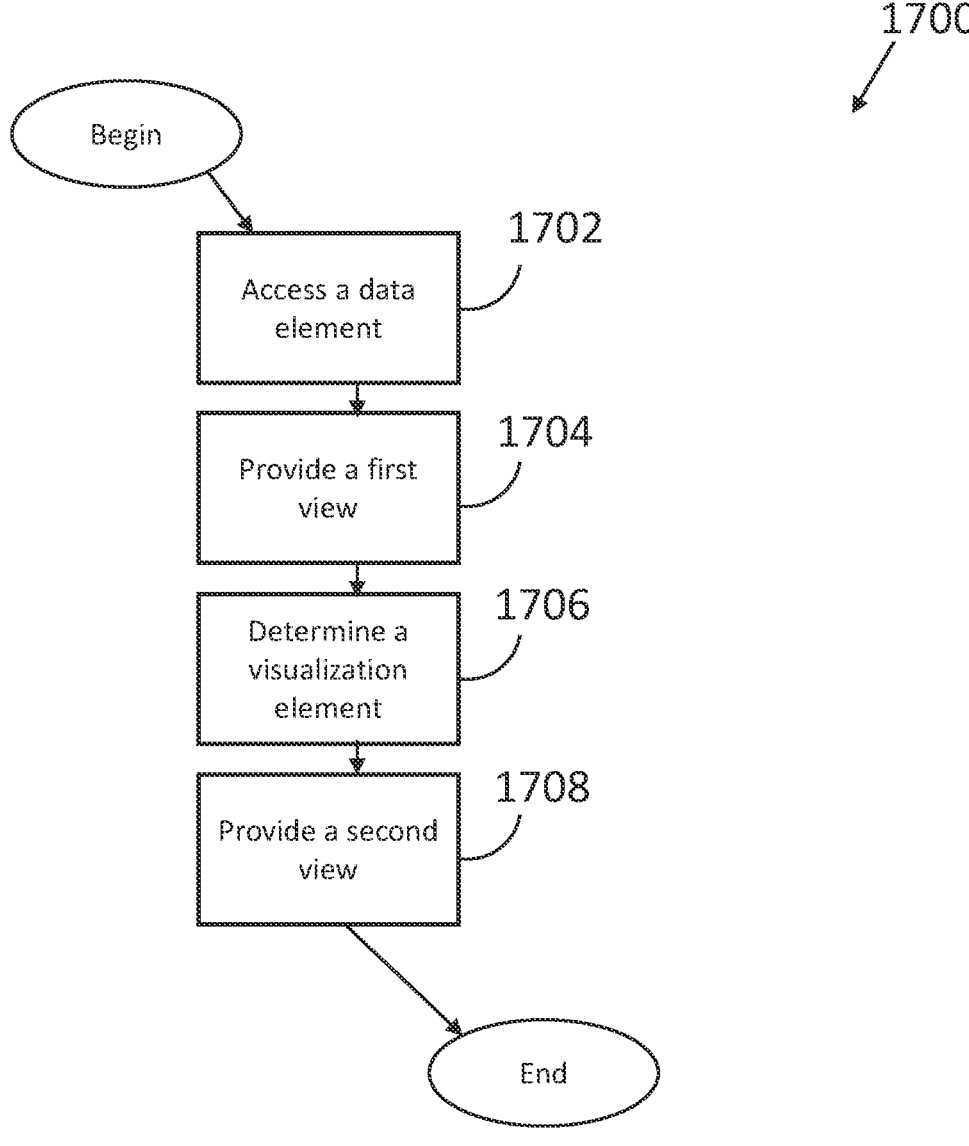
FIG. 17 is a schematic flow diagram of a procedure for providing a view.

Referencing FIG. 17, an example procedure 1700 includes an operation 1702 to access a data element, and an operation 1704 to provide a first view in response to the data element, where the first view comprising at least a portion of the data element. The example procedure 1700 further includes an operation 1706 to determine a visualization element (VE) in response to the data element, and further in response to a user visualization selection and/or a user context value. The example procedure 1700 further includes an operation 1708 to provide a second view in response to the VE and the data element. Example and non-limiting operations to determine the user visualization selection include: interpreting a user selection value including a primary table and a secondary table; interpreting a user selection value including a row selection, a column selection, and/or a data value selection; determining one or more discrete and/or continuous options in response to the user context value, and interpreting a user selection value including at least one of the discrete and/or continuous options; determining a number of discrete and/or continuous options in response to at least one parameter such as: a document type value, a document location value, a prior user operation, a template data association value, and/or a user selected data association value, and interpreting a user selection value including at least one of the discrete and/or continuous options; and/or determining a number of discrete and/or continuous options in response to at least one parameter such as: a time value, a selected range of time values, a data field value, a selected range of data field values, a data reference value, and a selected range of values corresponding to the data reference value.

Figure 18:
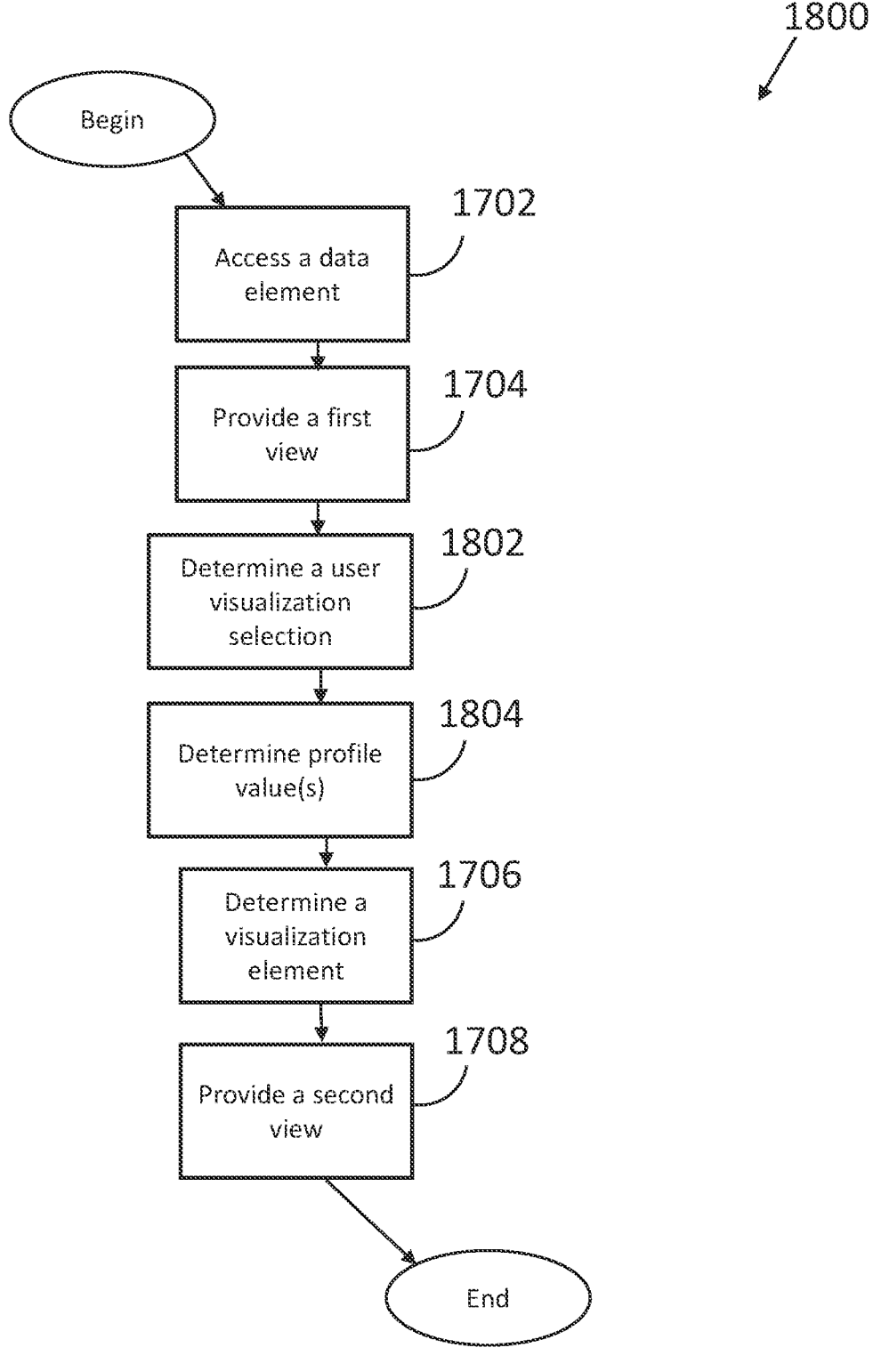
FIG. 18 is a schematic flow diagram of another embodiment of a procedure for providing a view.

Referencing FIG. 18, an example procedure 1800 further includes an operation 1802 to determine a user visualization selection in response to a user control input, and/or where the user control input includes a user selection value from a number of discrete options. The example procedure 1800 further includes an operation 1804 to determine at least one profile value in response to the user control input, where the profile value includes a profile value such as: a sorting profile, a data hierarchy profile, a filtering profile, an aggregating profile, and/or a formatting profile, and the procedure 1800 further includes the operation 1706 to determine the VE further in response to the profile value. An example operation 1804 further includes determining the at least one profile value in response to at least one discrete and/or continuous option. Example and non-limiting continuous options include a time display, a data field display, a data reference value, and/or a user control input. Example and non-limiting VEs include: a graph, a chart, a structured data view, a display of text, a table, a table row, a table column, a table heading, a format option for any of the preceding, and/or a format option for at least a portion of any of the preceding.

Figure 19:
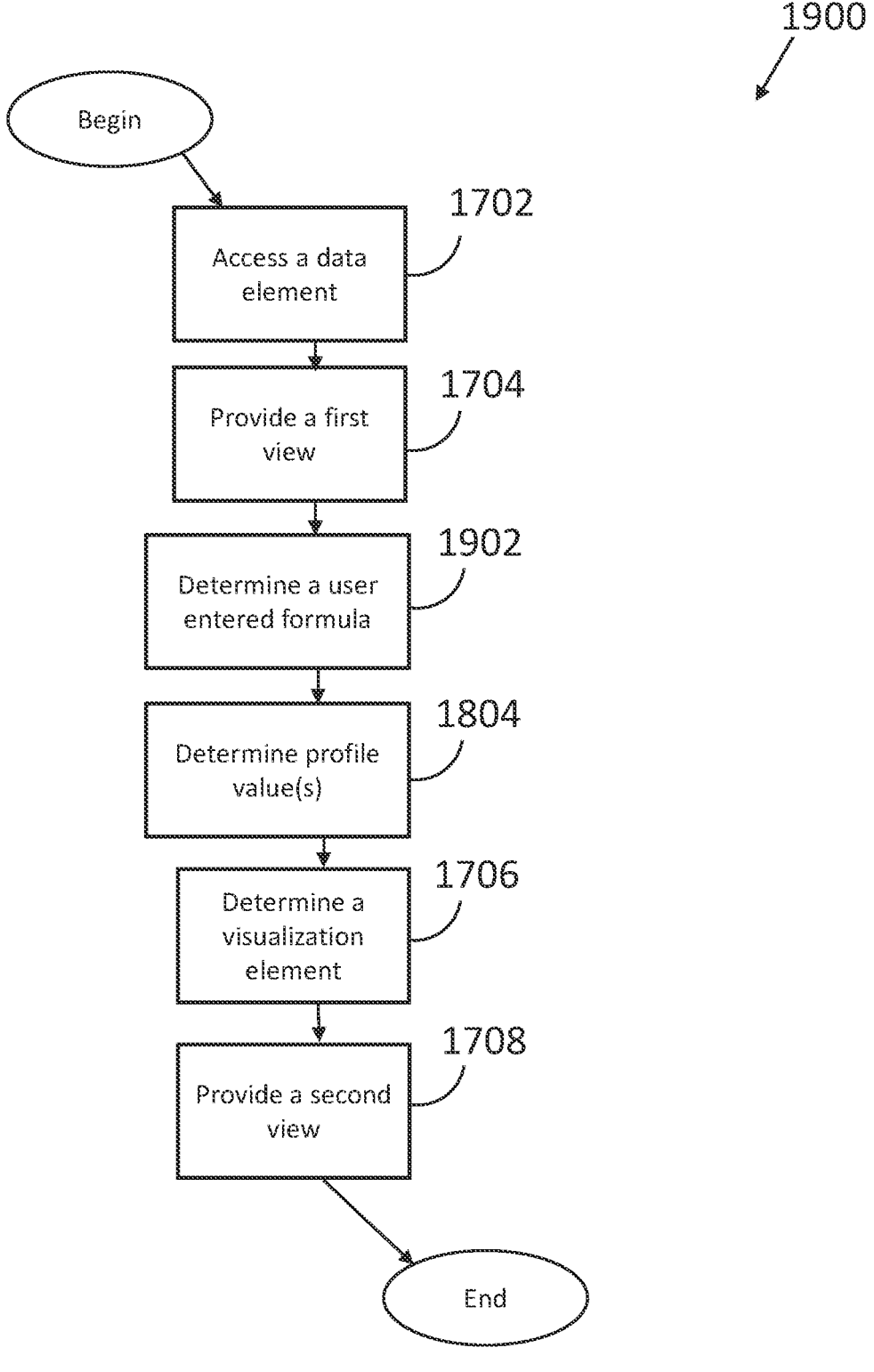
FIG. 19 is a schematic flow diagram of another embodiment of a procedure for providing a view.

Referencing FIG. 19, an example procedure 1900 includes an operation 1902 to determine a user entered formula, and where the operation 1706 includes determining the VE in response to the user entered formula. In certain embodiments, the operation 1804 includes determining the profile value(s) in response to the user entered formula.

Figure 20:
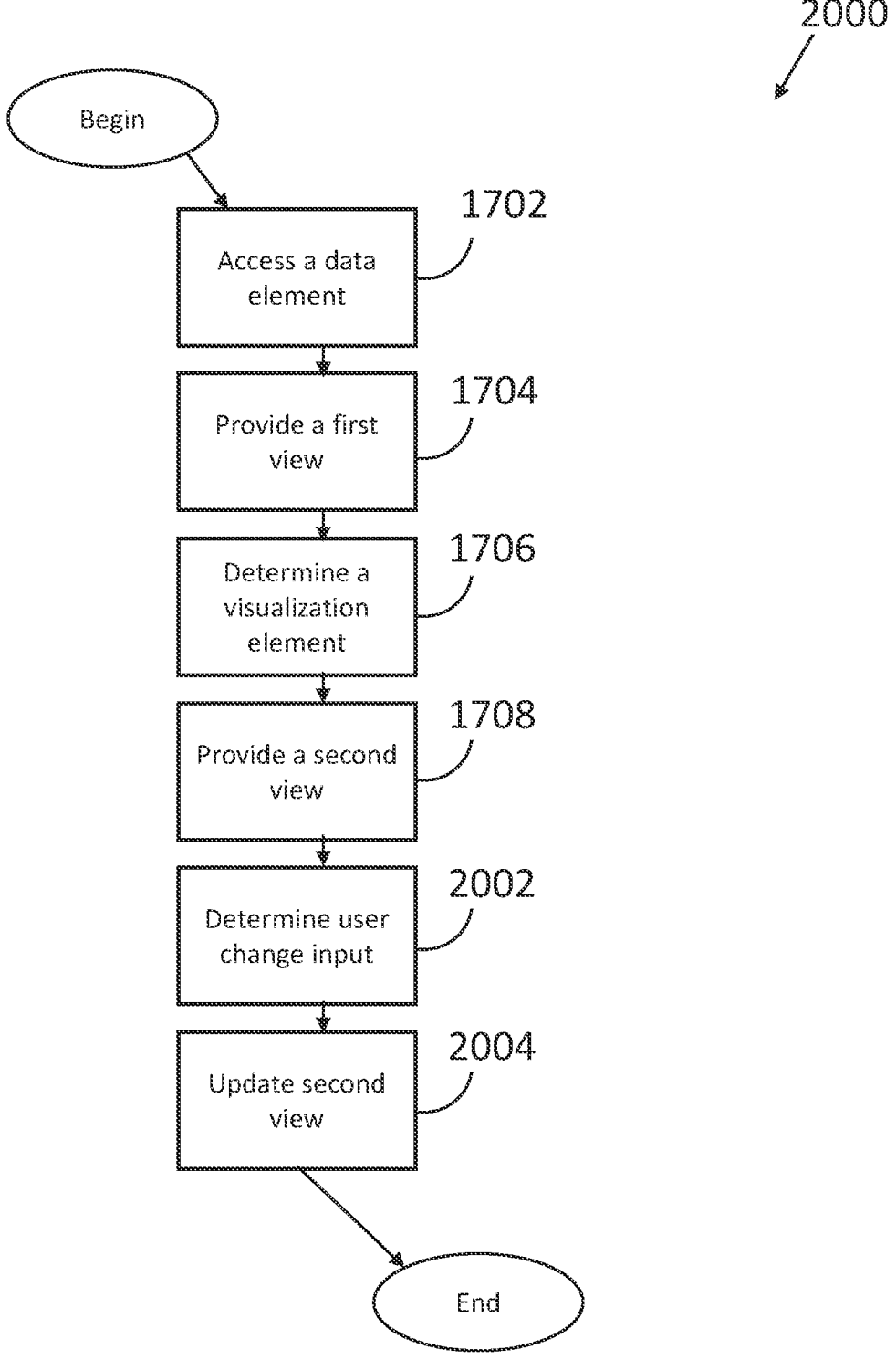
FIG. 20 is a schematic flow diagram of another embodiment of a procedure for providing a view.

Referencing FIG. 20, an example procedure 2000 includes an operation 2002 to interpret a user change input, and an operation 2004 to update one of the first view 1114, the second view 1122, and/or a data element 1108 in response to the user change input. An example procedure 2000 further includes the VE being one of a graph or a chart, and adjusting the second view in response to the user change input. An example procedure 2000 includes the user change input being a user interaction with a graphical element of the graph and/or chart. An example procedure 2000 includes the VE being an output table and/or a structured data view, and the operation 2004 to update or adjust the second view in response to the user change input. An example procedure 2000 includes the operation 2004 further including adjusting or updating the data element 1108 in response to the user change input. An example procedure 2000 further includes the user change input being a drag-and-drop operation.

An example procedure 2000 includes the operation 2004 to adjust the second view being an operation such as: re-sorting at least a portion of the second view; changing a hierarchy of at least a portion of the second view; filtering at least a portion of the second view; aggregating data comprising at least a portion of the second view; inheriting a format from a portion of the data element and applying the inherited format to at least a portion of the second view; and/or inheriting a format from an object selected in the drag-and-drop operation and applying the inherited format to at least a portion of the second view. An example operation 2004 to adjust the second view includes inheriting a visualization parameter from an object selected in a drag-and-drop operation and applying the inherited visualization parameter to at least a portion of the second view. Example and non-limiting objects selected in the drag-and-drop operation include: a data value, a graph, a chart, a table, a table row, and/or a table column. Example and non-limiting visualization parameters include: a sorting description, a filtering description, a formatting description, an aggregation description, and/or a display value description.

Figure 21:
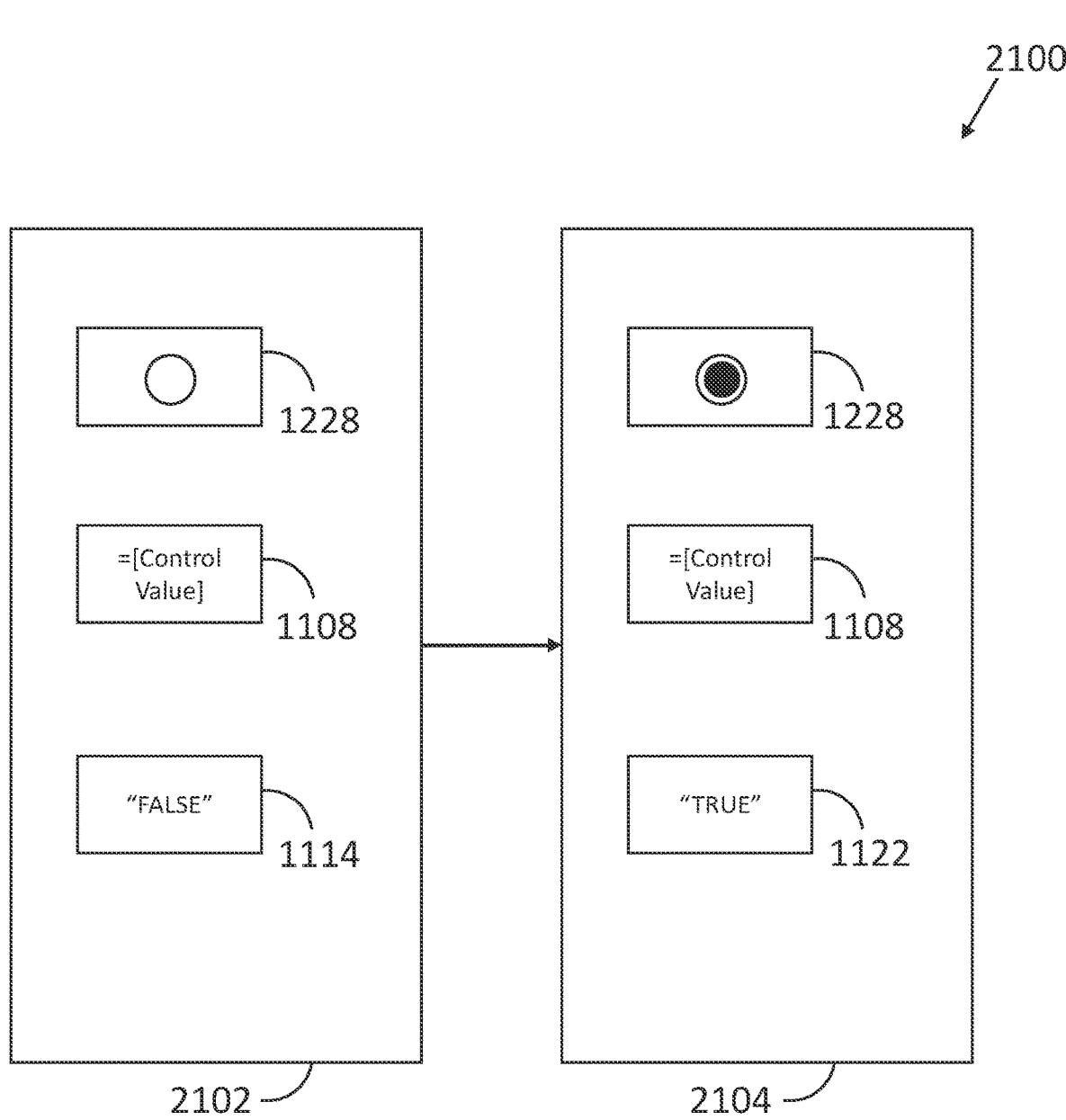
FIG. 21 is a schematic data illustration.

Referencing FIG. 21, an example operational sequence 2100 is depicted, illustrating certain operations for a procedure to provide a second view 1122 and/or adjust the second view 1122. In certain embodiments, any aspects of the present disclosure, including systems, apparatuses, devices, circuits, and/or procedures, may be utilized to perform the example operational sequence 2100. The sequence 2100 includes a first depiction 2102 of various system elements, including a user control input 1228, a data element 1108, and a first view 1114, and a second depiction 2104 includes various system elements, including the user control input 1228, the data element 1108, and a second view 1122. The depicted elements may be portions of a more complete element—for example the data element 1108 may include additional data including a document 1106, portions of a document 1106, and/or linked or referenced source data 1124. Relevant portions of the depicted elements are shown for purposes of illustration. In the example sequence 2100, the first depiction 2102 includes a state of the elements at a first time, and the second depiction 2104 includes the state of the elements at a second time. While the first view 1114 and second view 1122 are depicted, the views may additionally or alternatively be a second view in the first depiction 2102 and an adjusted second view in the second depiction 2104, although the naming convention and numbering of views is non-limiting, and naming conventions and numbering of views described herein are for purposes of clarifying aspects of the present disclosure. Any operations that depict elements to a user 814, and update the depiction of elements to the user 814, are contemplated herein.

The example user control input 1228 is depicted as a button selection having two discrete states—such as "ON" or "OFF", "TRUE" or "FALSE", or other binary state values. The user control input 1228 may be a check box, a radio button (e.g., a collection of mutually exclusive or partially exclusive controls), or any other type of control. The depiction in the example sequence 2100 is a non-limiting illustration. The underlying control may be inserted by a user 814 (e.g., through a menu option, hot-key, and/or context sensitive entry such as a mouse right-click, software-presented button, or responsive to an action such as inserting an element), presented to the user 814, and/or already present in the document (such as by a different user, previously inserted by the user, as part of a template, as part of a rule, and/or as a default element). The user control input 1228 is depicted as an implementation of the control, to illustrate user interaction with the control. The control reference within the data element 1108 as depicted may be a separate element from the control itself, and/or the data element 1108 may be the control itself, allowing aspects of the view (1114, 1122) to be responsive to the state of the control as determined by the user control input 1228.

The example data element 1108 includes a reference, for example as a user entered formula 1502, to the state value of the user control input 1228. An example data element 1108 includes the underlying control for the user control input 1228 (e.g., a reference or depiction of the button itself, and/or a value storing the current state of the button), and/or the underlying control may be positioned or stored outside the data element 1108 (e.g., elsewhere within the document 1106, in another document (not shown), and/or within a menu or other selection display provided to the user 814). An example control includes a name, tag, and/or identifier, for example as part of an object model, to be reference-able in formulas and/or coding. In certain embodiments, the name, tag, and/or identifier of the control is provided to the user 814 in a context sensitive manner—for example if the user right-clicks an item, begins to filter, sort, or otherwise manipulate data, begins the entry of a formula, and/or begins to browse an object model corresponding to the data element 1108 and/or document 1106, wherein the view (1114, 1122) or other user-visible display is updated to provide the user 814 with a depiction of the name, tag, and/or identifier of the control for convenient referencing. In certain embodiments, the view (1114, 1122) is updated to provide the user 814 with a list of options, including the name, tag, and/or identifier of the control, and/or additionally provides a name, tag, and/or identifier of other controls in the data element 1108 and/or document 1106, commonly used options, default options, previously used options, and/or one or more defined options (e.g., responsive to a template or rule). In certain embodiments, the name, tag, and/or identifier of a control is defined or set by the user 814, by a default (e.g., sequentially described and/or numbered), or both. A given control may additionally or alternatively have other properties defined or set by the user 814, inherited by another control, set by a default, or combinations of these. Example and non-limiting properties include output data type, display type, number of selections, number of selections allowed, one or more state values for the control, and a type of the control.

The example first view 1114 depicts a data element presentable to the user 814 as updated in response to the user control input 1228—for example in the sequence 2100 a display of "FALSE" or "TRUE" depending upon the value of the user control input 1228. It can be seen that any operations to adjust a view (1114, 1122) in response to the user control input 1228 may be performed, such as sorting a table or other structured data, formatting elements of a table, text, or other data display, filtering elements of a table or other data display, aggregating elements of a table or other data display, determining whether to show or keep hidden all or a portion of text, a table, structured data, a graph, and/or a chart. The described operations and sequence 2100 are non-limiting examples. The sequence 2100 provides, without limitation, and example of a user 814 interacting with a discrete option 1214 to adjust the view (1114, 1122).

Figure 22:
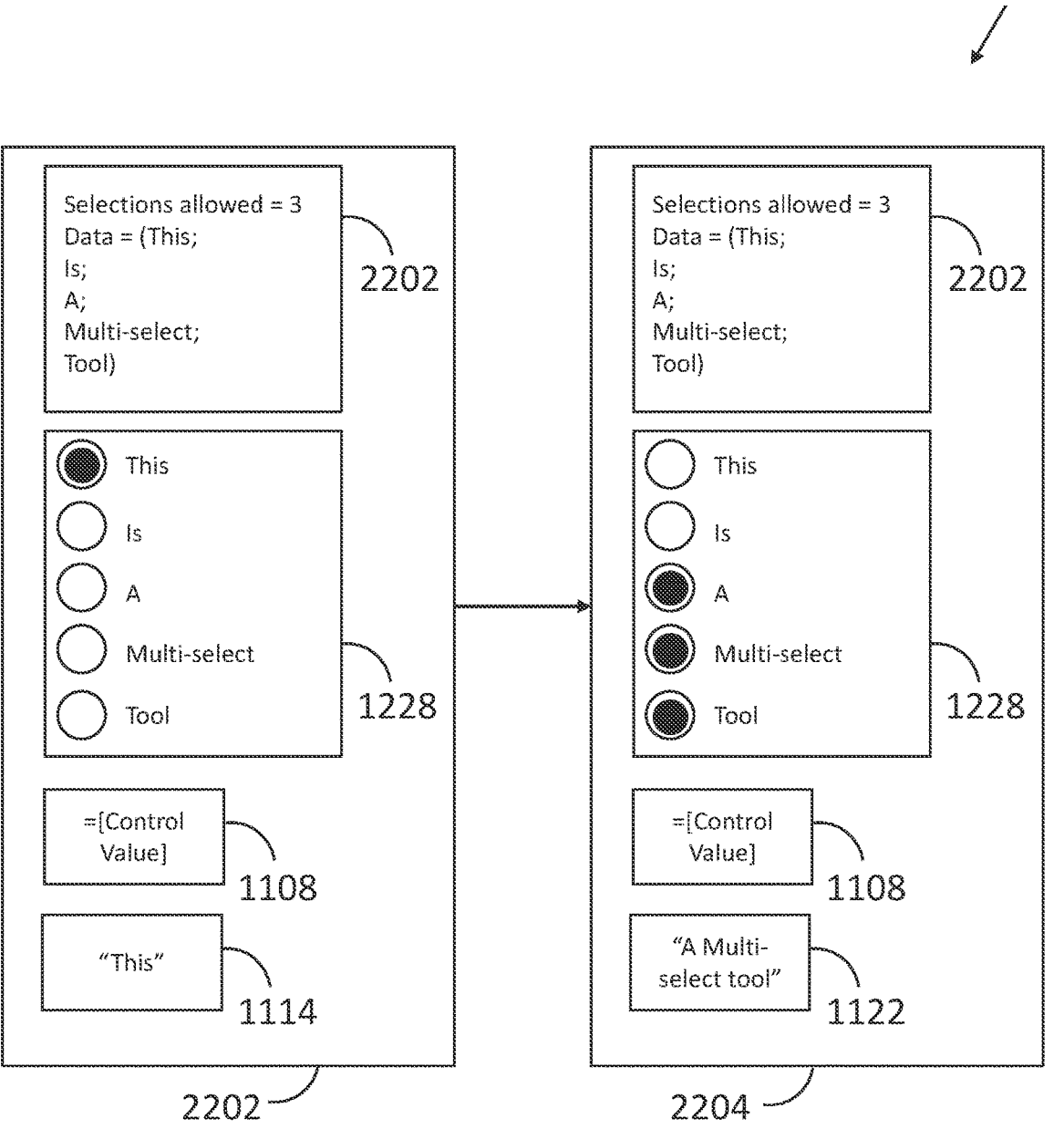
FIG. 22 is a schematic data illustration.

Referencing FIG. 22, an example operational sequence 2200 is depicted, illustrating certain operations for a procedure to provide a second view 1122 and/or adjust the second view 1122. In the example sequence 2200, a multi-selection tool 2202 is depicted. The multi-selection tool 2202 may be present in the data element 1108, the document 1106, or elsewhere, and all descriptions and properties of a control described in the disclosure referencing FIG. 21 are incorporated herein. The multi-selection tool 2202 includes properties of a data list (which may be data assigned to the control, and/or linked or referenced from elsewhere) and a property of a number of selections that may be made from the control. It can be seen that the multi-selection tool 2202 provides for a convenient creation of a radio button (e.g., where allowed number of selections is set to one) and/or for multiple selections limited to a selectable number. The number of allowed selections may be provided as a minimum, a maximum, an acceptable range, a defined number, or combinations of these. Additionally or alternatively, the user 814 may be prompted with selection rules for a multi-selection tool 2202, notified of errors, and/or notified of selection rules upon an invalid entry.

The response to the multi-selection tool 2202 is depicted as a text display of the data from the multi-selection tool 2202 for purposes of illustration. However, the response may be any selected response, including at least application of sorting options for a table or other structured data, application of formatting options to a table, text, or other data display, application of filtering elements for a table or other data display, application of aggregating elements for a table or other data display, application of display options (e.g., show or hide certain portions) for text, a table, structured data, a graph, and/or a chart. The described operations and sequence 2200 are non-limiting examples. The sequence 2200 provides the user 814 with a discrete option 1214 to adjust the view (1114, 1122).

Figure 23:
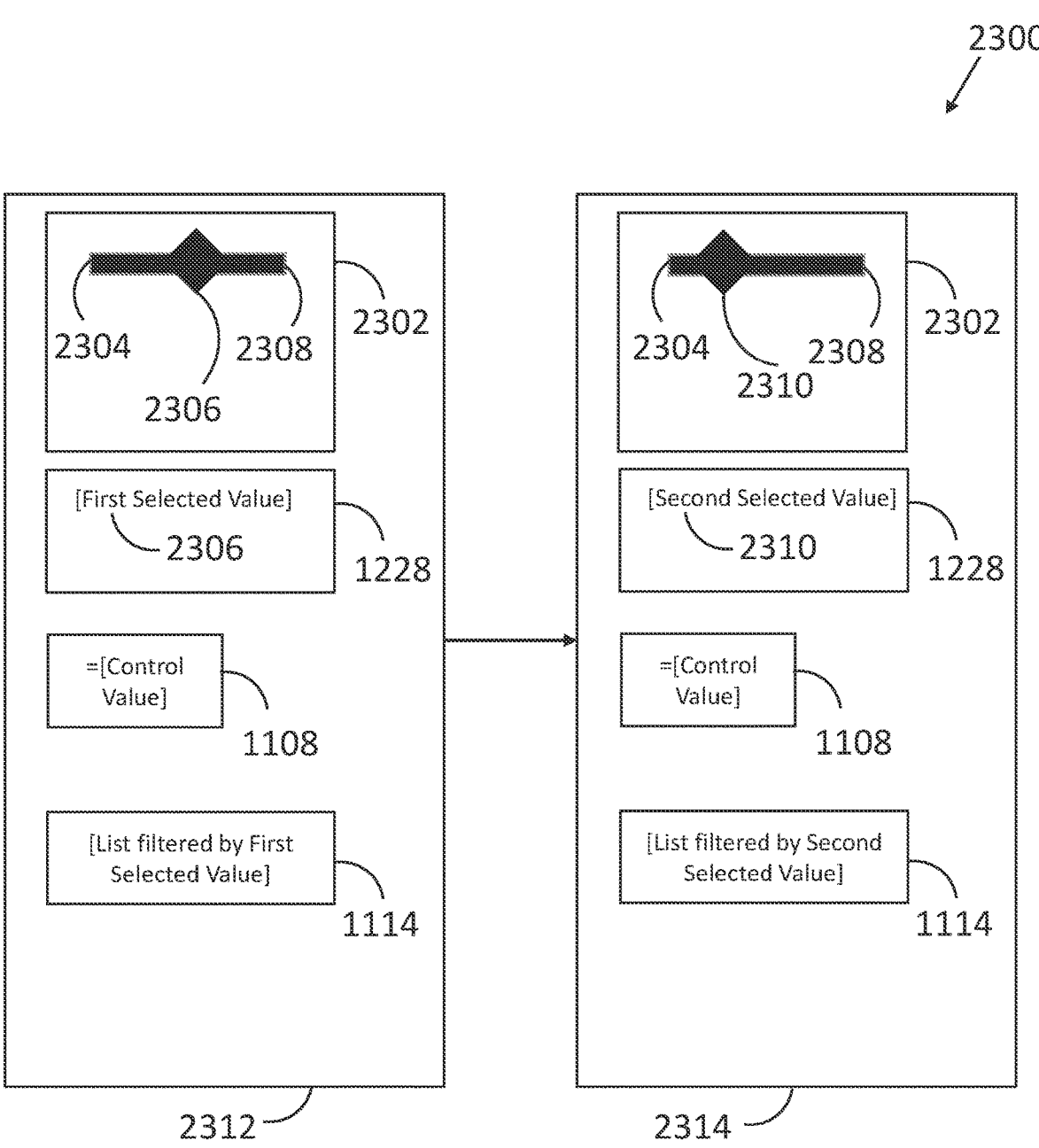
FIG. 23 is a schematic data illustration.

Referencing FIG. 23, an example operational sequence 2300 is depicted, illustrating certain operations for a procedure to provide a second view 1122 and/or adjust the second view 1122. In the example sequence 2300, a slider tool 2302 is depicted. The example slider tool 2302 may provide a continuous option 1216 accessible to the user 814 to adjust the view (1114, 1122). The slider tool 2302 is provided as an illustration of a continuous control, however any type of control to allow for a continuous option 1216 is contemplated herein, including without limitation allowing a user to move data points on a graph, adjust bars, lines, columns, or pie slices on a chart, allowing a user to set a number value, allowing a user to set a letter value, and/or allowing a user to set a time, date, or date/time value.

In the example sequence 2300, at the first depiction 2312 the slider tool 2302 includes a minimum value 2304, a maximum value 2308, and a current value 2306. The current value 2306 may be a value previously set by the user 814 or another user, a default value, a predetermined value, or the like. In certain embodiments, the current value 2306 may initially be set by underlying data—for example a minimum data value, a maximum data value, and/or an average data value (any type of average). The user control input 1228 is depicted in the example as set at the current value 2306, and in the example the data element 1108 is linked to the current value 2306. The sequence 2300 includes a first view 1114 responsive to the user control input 1228, for example providing an output for display that is filtered, sorted, aggregated, formatted, and/or has elements of data displayed or hidden in response to the user control input 1228. In the example sequence 2300, at the second depiction 2314, the slider tool 2302 includes a second current value 2310, for example as set by the user control input 1228. The sequence 2300 includes the second view 1122 responsive to the user control input 1228 utilizing the second current value 2310, for example providing an output for display that is filtered, sorted, aggregated, formatted, and/or has elements of data displayed or hidden. The usage of the current value 2306 and/or second current value 2310 in providing the view (1114, 1122) may be defined by the user, according to a document template, and/or according to a previous operation Without limitation, controls may be present on a document surface (e.g., in-line in a document 1106, in a section of a document, on a canvas or general portion of a document), may be present within a specific element of a document (e.g., as a feature of a graph or chart, within a column, row, or data element of a table, within a field of a structured data set), and/or may be linked or referenced information relative to the document (e.g., within source data 1124 accessible from the document 1106, within a portion of the document 1106 not necessarily intended for display and/or within metadata for the document). The described control settings are non-limiting examples. An example control includes a control element present in a first column of a table, and a second column of the table having information created at least partially in response to the first column of the table. For example, a first column may include a check box, radio button, multi-select tool, slider tool, or other control, and a second column includes information created at least partially in response to a value of the control in the first column of the table. In the example, certain views (1114, 1122) of the document may display the second column but not the first column—for example another user of the document, a printed form of the document, a published form of the document, an export of the document, or other display of the document may display the second column but hide the first column, provided for a convenient display, filtering, sorting, aggregation, and/or formatting of linked information formatted according to a preference of the user 814.

Another example control includes a first column having a date selection control (e.g., allowing a user 814 to define a data range in the first column, such as "previous 7 days", "previous 30 days", a beginning and ending date, or other date selection criteria) and a second column having a display value determined in response to the first column (e.g., aggregated data over the selected date period such as sales, hires made, incidents, and/or a display of the relevant dates). In the example, second column additionally or alternatively includes information outside the first column, such as linked data, a table, another column within the table, and/or source data 1124. The example provides for a convenient display, filtering, sorting, aggregation, and/or formatting of linked information formatted according to a preference of the user 814.

Figure 34:
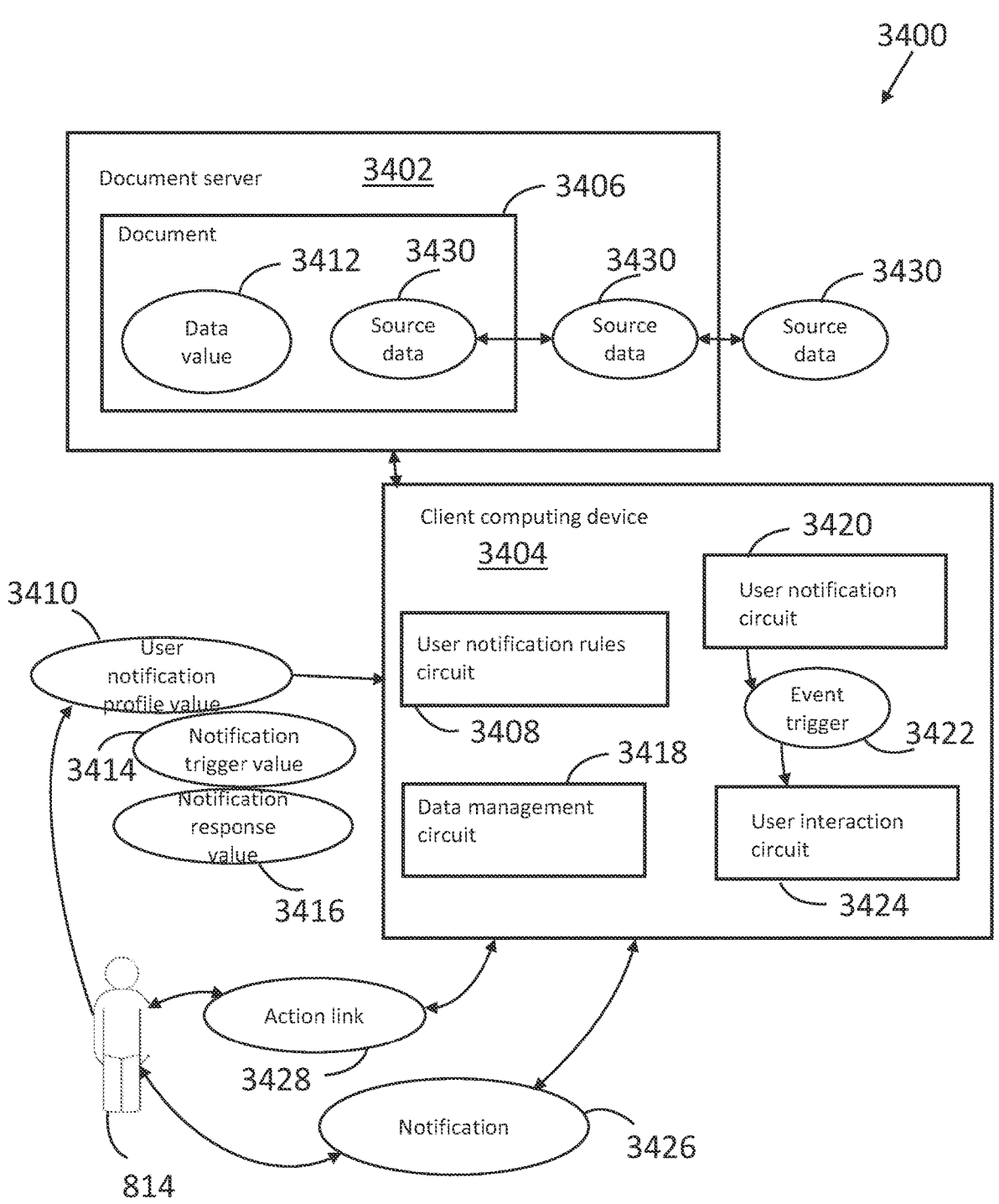
FIG. 34 is a schematic depiction of a system for providing a notification.
Figure 35:
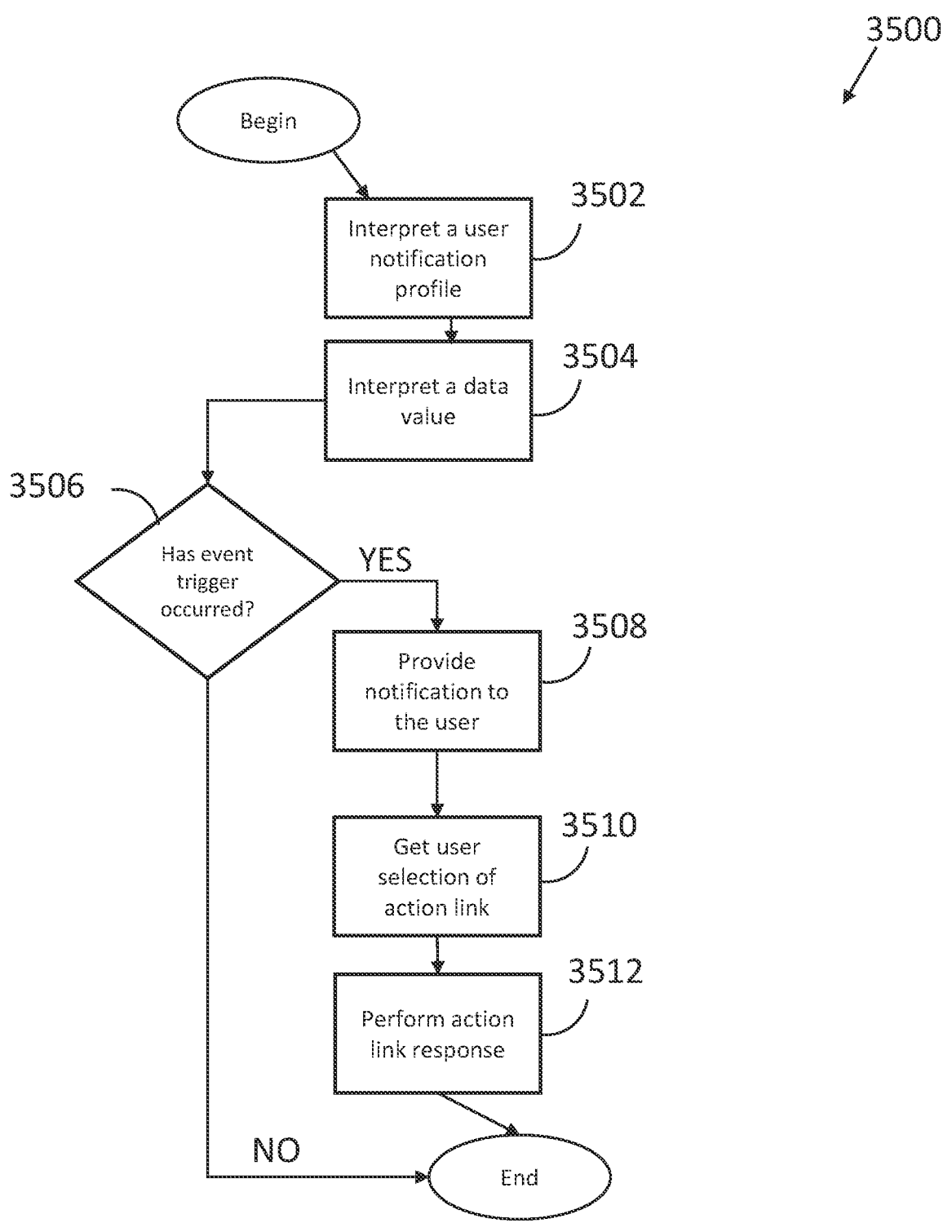
FIG. 35 is a schematic flow diagram of a procedure for providing an action link.

Referencing FIG. 34, an example system 3400 includes a first computing device 3402 communicatively coupled to a second computing device 3404, where the example first computing device 3402 includes a document server that communicates a data value 3412 to the second computing device 3404. An example data value 3412 includes at least a portion of the document 3406. An example system 3400 includes the document 3406 and/or the data value 3412 including, linking, and/or referencing source data 3430. Example and non-limiting source data 3430 may be within the document 3406, outside the document 3406 but within the document server 3402, and/or external to the document server 3402, such as on a website, database, network location, and/or cloud server.

The example second computing device 3404, which may be a client computing device, includes a user notification rules circuit 3408 that interprets a user notification profile value 3410. In certain embodiments, the user notification rules circuit 3408 is on the client computing device (e.g., where user sets up a first client computer to notify at a second client computer, such as a mobile device). In certain embodiments, the user notification rules circuit 3408 is additionally or alternatively on a document server, a client device of another user, or in another location. In certain embodiments, the second computing device 3404 (and/or any other computing device, server, and/or circuit disclosed herein) is a logical grouping of system components to support certain operations, with certain operational aspects performed on a client device, and other operational aspects performed on a server. The example user notification profile value 3410 includes a notification trigger value 3414 and/or a notification response value 3416. The example second computing device 3404 further includes a data management circuit 3418 that interprets the data value 3412, a user notification circuit 3420 that determines whether an event trigger 3422 has occurred in response to the notification trigger value 3414 and/or the data value 3412, and a user interaction circuit 3424 that provides a notification 3426 to a user 814 in response to the event trigger 3422 and the notification response value 3416.

The example system 3400 provides for a user 814 to configure a notification trigger value 3414, for example a change in the document 3406, the source data 3430, the data value 3412, and/or for any other selected event, and to configure a notification 3426 according to the notification response value 3416—for example a notification delivery method, notification type, or the like. In certain embodiments, the user notification profile 3410, notification trigger value 3414, and/or the notification response value 3416 may be set according to defaults (e.g. e-mail the user 814 when tagged data changes); according to rules such as in a template rules document; rules set by the user 814, and/or rules set by an administrator (not shown); and/or rules provided by another user in the system accessing the document 3406.

An example notification trigger value 3414 includes a keyword, where the user notification circuit 3420 further determines whether the event trigger 3422 has occurred by determining whether another user has entered, edited, and/or deleted the keyword in the document 3406. For example, the usage of a keyword allows the user 814 to be notified when a word of interest is entered into the document, edited in the document (e.g., to the keyword, from the keyword, or including the keyword as an intermediate edit), and/or deleted from the document. Example and non-limiting keywords include the name of a person (e.g., the user 814), a project name, a word of interest (e.g., a technology, country, company, etc.), and/or may further include numeric values such as a number of interest (e.g., a social security number, employee ID, phone number, project number, etc.) or a specific number such as an annual sales number.

An example notification trigger value 3414 includes an update value for at least one parameter in the data value 3412, in the document 3406, and/or in the source data 3430. In a further example, the user notification circuit 3420 further determines whether the event trigger 3422 has occurred by determining whether the update value indicates the at least one parameter has been updated. For example, the usage of an update value for a parameter allows a user 814 to tag a particular data value within the system 3400, and receive a notification upon an update of the parameter. An update can include an edit of the parameter, a user focus of the parameter (e.g. selection, mouse-over, and/or edit that does not result in a change to the value), and/or a deletion of the parameter.

Example and non-limiting notification trigger values 3414 include a status value for at least one parameter in the data value 3412, in the document 3406, and/or in the source data 3430. For example, determining the event trigger 3422 in response to the status value includes an operation such as: determining the status value has changed; determining the status value has updated; determining the status value is equal to a predetermined value; determining the status value has exceeded a predetermined threshold; and/or determining the status value has fallen below a predetermined threshold.

A status value as used herein should be understood broadly, and can include any status indicator such as: a specified value (e.g., TRUE, FALSE, 1,602, COMPLETED, PENDING, etc.); an indication of a status of the parameter (e.g., edited, saved, recalculated, etc.) and/or a change in the data described by the parameter (e.g., sales change, task status change, project milestone change, a process progress change, etc.); an indication of the status of the data described by the parameter (e.g., sales, task status, project milestone, process progress, etc.); and/or a formatting condition of the parameter. In certain embodiments, a status value for a parameter indicates an event trigger 3422 when the status does not change—for example if the parameter is selected, focused, or edited in a manner that does not result in a change in value, and/or if the parameter is not changed for a period of time the status may indicate an event trigger 3422 in response to the period of time expiring. The described examples for a status value and determining an event trigger 3422 in response to the status value are illustrative and non-limiting.

An example notification trigger value includes a value such as: a predetermined time period; a predetermined external event occurrence; a predetermined specific user accessing the document; a predetermined user role accessing the document; a predetermined document object edit value; and/or a predetermined document section edit value. Predetermined as utilized herein indicates that, at the time the user notification circuit 3420 determines whether the event trigger 3422 has occurred, a value for the predetermined value is available to the user notification circuit 3420. Predetermined values may be changed, for example by the user 814, and/or may be changed according to rules such as in a template rules document; rules set by the user 814, and/or rules set by an administrator (not shown); and/or rules provided by another user in the system accessing the document 3406. Additionally or alternatively, predetermined values may be changed while the user 814 is accessing the document 3406, such as through the client computing device 3404, and/or may be changed in response to user 814 interactions with the system 3400 such as through an application (e.g., see the section referencing FIG. 25), and/or in response to the notification 3426 and/or an action link 3428.

An example notification trigger value 3414 includes a process state value such as: a recruiting process state value; a project milestone value; a task occurrence value; a task progression value; an order occurrence value; an order validity value; a design change request value; and/or a problem report value. A process state value, as used herein, should be understood broadly, and includes a qualitative and/or quantitative description of the process state, progression, currently active task, and/or current operation. A given process may include multiple operations in parallel, and according a process state value may include multiple values. In certain embodiments, a process state value is inferred from other values in the system, and/or according to rules for the process (e.g. whether certain data values are entered and/or have values within specified ranges or specific values). An example process state value includes a recruiting process having defined steps, where the process state value indicates which one or more of the steps are due (e.g., contact candidate, schedule preliminary interviews, get specified information from the candidate, and/or schedule follow-up contacts). In certain embodiments, a process state value indicates and event trigger 3422 at specified operations in the process, after a time period elapses where specified operations in the process have not occurred, and/or after a time period when the process as a whole is not completed. In certain embodiments, the notification response value 3416 changes with the state of the process—for example an event trigger 3422 to contact a candidate may pull up a candidate "card" with contact information, a link to execute and e-mail or phone call, etc.; where an event trigger 3422 to get information from a candidate may pull up a communication to the candidate appropriately configured with a form letter and/or checklist for the candidate.

An example notification response value 3416 includes at least one of a notification type value or a notification location value. Example and non-limiting notification type values include a value such as an e-mail definition; a message definition; a document edit definition; and/or an application message definition. A definition, as utilized herein, should be understood broadly, and can include information such as: contact information (e.g., e-mail address, text message number and/or user name; an application message identification value identifying the target of the notification 3426); preferences for notification (e.g., follow-up communications, formatting for the notification, alternate addresses, etc.); and/or combinations of these including potentially multiple recipients of the notification 3426.

An example notification location value includes an e-mail address, a messaging address, a document edit location, a document object identifier, a document section identifier, an application username, an identifier associated with the user (e.g., a username for a system 3400, an employee ID number, a name of the user, etc.), and/or an identifier associated with a predetermined entity (e.g., a company name, a group name, a user role, a job title, a government agency, etc.). The example notification location value allows for notifications 3426 to be selectively positioned anywhere within reach of the system 3400. An example includes editing the document 3406 such that the user 814 is likely to notice the notification 3426 upon entering the document 3406 (e.g., highlighting changed portion or value of interest, providing a pop-up window notifying of the change and/or describing the change, and/or providing the notification 3426 in a defined location of the document 3406 where the user 814 can access the notification 3426 at a convenient time). An example includes accessing a third-party system such as a website, server, or the like to provide the notification 3426—for example messaging a Facebook account, a LinkedIn account, or other message enabled service, providing a post on a Facebook timeline, accessing a mobile device application (e.g., an application such as described in the portion referencing FIG. 25, and/or in any application accessible to a messaging function).

An example system 3400 includes the user interaction circuit 3424 further providing the notification 3426 as an alert that is sent to a mobile device of the user 814. An example system 3400 further includes the notification response value 3416 including a notification type value and/or a notification location value. An example notification value includes the alert to be sent to the mobile device, and an example notification location value includes a communication channel and/or device identifier (e.g., a MAC address, registered ID for the device, nickname in the system, etc.) to the mobile device of the user 814. Example and non-limiting communication channels include a user phone number, messaging system username or profile name, and/or a communication application username or profile name. An example alert activates a graphical user interface of the mobile device to cause the alert to display on the mobile device, and to enable connection with the graphical user interface in response to the mobile being activated. In certain embodiments, the alert is capable to wake the device from a sleep mode or deactivated mode. Additionally or alternatively, the alert is capable to provide the graphical user interface upon an operation of the user 814 or another application waking and/or activating the device. An example graphical user interface provides the user 814 with selected information from all or a portion of the notification 3426, and/or provides access to open an application to access the document 3406 or portions thereof.

An example notification type value 3416 includes an action link definition. An action link definition includes any description of an action link as described herein for provision to the user 814 as a notification 3426. An action link includes, without limitation, a configurable element selectable by the user 814, wherein an action within the reach of the system 3400 is executable in response to the selection by the user 814. An action within the reach of the system includes, without limitation, an action executable by the system to access and/or utilize any resource. Any such resource may be within the system and/or external to the system, such as a website, database, application, phone system, a ticketing system, and/or a messaging system. In certain embodiments, the action can relate to activity not reachable by the system—for example a link to an action the user can perform that is not in communication with the system. Example and non-limiting action links include a link to send an e-mail, a link to provide a notification 3426 according to any description herein to a selected person or entity, an action to send the document 3406, the data value 3412, and/or any portions thereof.

An example user interaction circuit 3424, in response to a user selection of the action link, further performs at least one operation such as: scheduling a calendar entry for the user; requesting a calendar entry for an entity other than the user; calling an entity determined in response to the action link definition; ordering a product and/or a service in response to the action link definition; and/or assigning a task to an entity in response to the action link definition. For example, a design change request and/or problem report entered into the document 3406 provides a notification 3426 to the user, and an action link with recommended assigned engineers for the design change request and/or problem report. A selection by the user 814, in the example, assigns the design change request and/or problem report to a selected engineer, and/or defers the assignment according to the user selection. Another example includes a notification 3426 whereupon the user 814 may need to travel in response to the notification 3426 (e.g., a meeting is approaching, a user 814 flight time is approaching, and/or another user has requested the user 814 to attend a meeting, function, or the like). The example includes the user interaction circuit 3424 providing an action link 3428, for example to order a taxi, an Uber, providing an appropriate bus schedule, identifying rental or sharing locations for a car and/or bicycle, and/or to perform any other action responsive to the user 814 location and projected location.

An example user interaction circuit 3424 further interprets a user action request value (for example, accessed on the action link 3428 or in a menu provided therewith), and in response to the user action request value, updates the action link definition. For example, the user 814 may request additional options for the action link 3428, indicate that an option has been missed, defer the action link 3428 to be provided again at another time without an event trigger 3422, and/or request a different type of action link 3428 in response to the notification 3426 and/or action link 3428. An example user interaction circuit 3424 further interprets a user location value (e.g., accessing the user 814 mobile device, although any locating mechanism is contemplated herein), and determining the action link definition in response to the user location value. Example and non-limiting operations of the user interaction circuit 3424 include: selection of stores applicable to a user requested or indicated purchase based on the event trigger 3422 and in view of the user location; selection of transportation types in response to the user location; and/or configuration of an e-mail accessed by the action link 3428 in response to the user location (e.g. providing an "out of office" option, an estimate response or return time, etc.).

An example procedure 3500 includes an operation 3502 to interpret a user notification profile value including a notification trigger value and/or a notification response value, an operation 3504 to interpret a data value including at least a portion of a document, and an operation 3506 to determine whether an event trigger has occurred in response to the notification trigger value and the data value. In response to the operation 3506 indicating that an event trigger has occurred, the procedure 3500 includes an operation 3508 to provide a notification to a user in response to the event trigger and the notification response value.

An example notification trigger value includes a keyword, and where the operation 3506 includes determining whether another user has performed one of: entering, editing, or deleting the keyword in the document. An example notification trigger value includes an update value for at least one parameter in the data value, and where the operation 3506 includes determining whether the update value indicates the at least one parameter has been updated. An example procedure 3500 includes the notification trigger value including a status value for at least one parameter in the data value, where the operation 3506 further includes an operation such as: determining the status value has changed; determining the status value has updated; determining the status value is equal to a predetermined value; determining the status value has exceeded a predetermined threshold; and/or determining the status value has fallen below a predetermined threshold. An example notification trigger value includes at least one value such as: a predetermined time period; a predetermined external event occurrence; a predetermined specific user accessing the document; a predetermined user role accessing the document; a predetermined document object edit value; and/or a predetermined document section edit value. An example notification trigger value includes a process state value. Example and non-limiting process state values include: a recruiting process state value; a project milestone value; a task occurrence value; a task progression value; an order occurrence value; an order validity value; a design change request value; and/or a problem report value. An example notification trigger value includes a status value for at least one parameter in a location such as: the data value, the document, and/or a source data.

Figure 36:
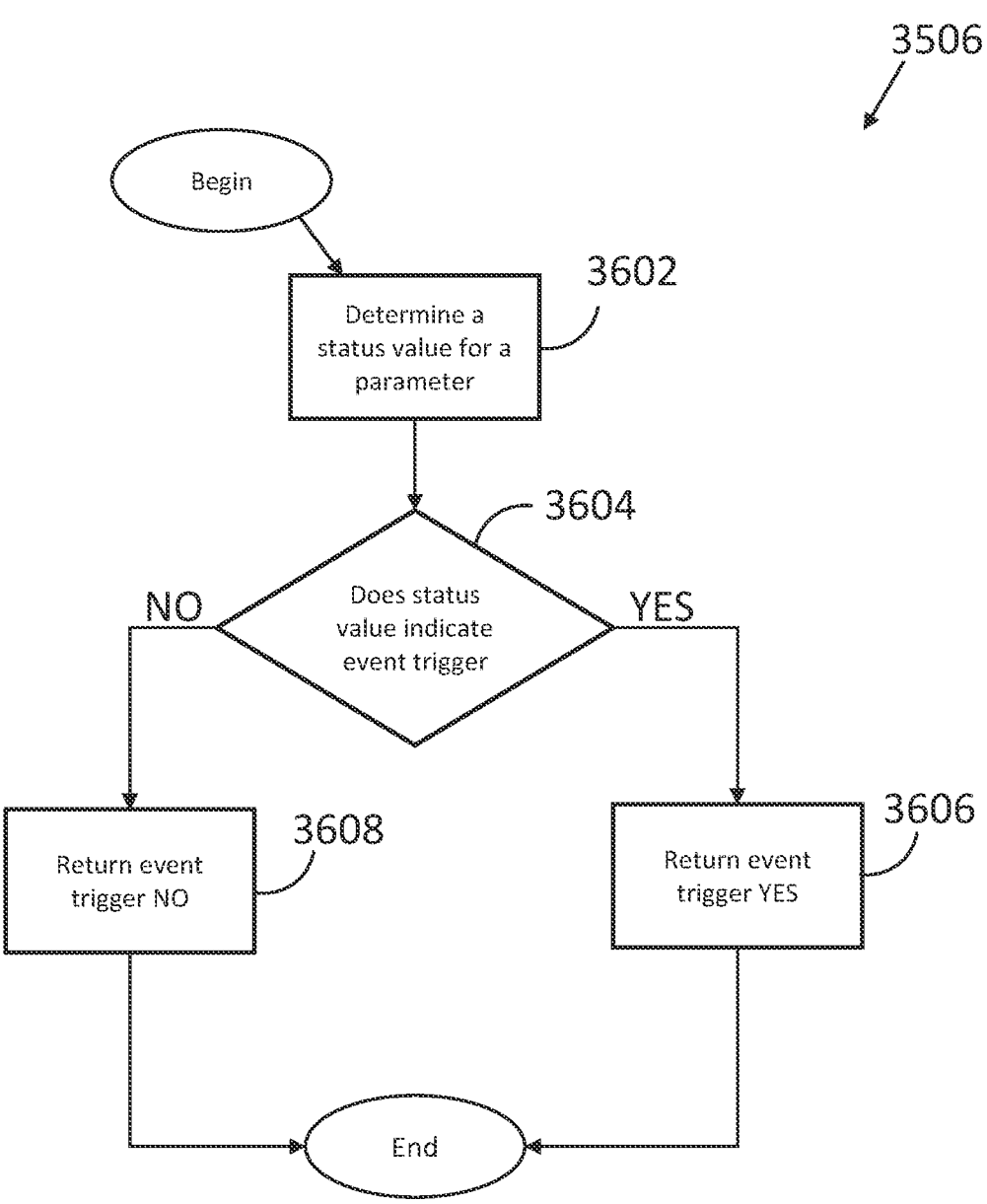
FIG. 36 is a schematic flow diagram of a procedure for providing an alert.

Referencing FIG. 36, an example procedure 3506 to determine whether the event trigger has occurred includes an operation 3602 to determine a status value for a parameter, and an operation 3604 to determine if the status value indicates an event trigger has occurred. Example operation 3604 to determine whether the status value indicates an event trigger has occurred includes one or more operations such as: determining the status value has changed; determining the status value has updated; determining the status value is equal to a predetermined value; determining the status value has exceeded a predetermined threshold; and/or determining the status value has fallen below a predetermined threshold. The example procedure 3506 includes, where the operation 3604 indicates YES, an operation 3606 to return an event trigger YES event (e.g. to procedure 3500), and where the operation 3604 indicates NO, an operation 3608 to return an event trigger NO event (e.g. to procedure 3500).

An example notification response value includes a notification type value and/or a notification location value. Example and non-limiting notification type values include: an e-mail definition; a message definition; a document edit definition; and/or an application message definition. Example and non-limiting notification location values include: an e-mail address; a messaging address; a document edit location; a document object identifier; a document section identifier; an application username; an identifier associated with the user; and/or an identifier associated with a predetermined entity.

An example procedure includes an operation to provide the notification response to the user by sending an alert that is sent to a mobile device of the user. An example notification response value includes a notification type value and/or a notification location value, where the notification type value includes the alert, and where the notification location value includes a communication channel to the mobile device of the user. An example alert activates a graphical user interface of the mobile device to cause the alert to display on the mobile device and to enable connection with the graphical user interface in response to the mobile being activated.

An example notification type value includes an action link definition. An example procedure 3500 further includes an operation 3510 to get a user selection of an action link, and an operation 3512 to perform an action in response to the action link. Example and non-limiting operations 3512 include performing at least one operation such as: scheduling a calendar entry for the user; requesting a calendar entry for an entity other than the user; calling an entity determined in response to the action link definition; ordering one of a product or a service in response to the action link definition; and/or assigning a task to an entity in response to the action link definition.

In certain embodiments, a procedure further includes interpreting a user action request value, and in response to the user action request value, updating the action link definition. An example procedure further includes interpreting a user location value, and determining the action link definition in response to the user location value. Example operations 3512 further include, in response to the user selection of the action link and/or updated action link, performing an operation such as: scheduling a calendar entry for the user, requesting a calendar entry for an entity other than the user, calling an entity determined in response to the action link definition; ordering one of a product or a service in response to the action link definition; and/or assigning a task to an entity in response to the action link definition.

Figure 37:
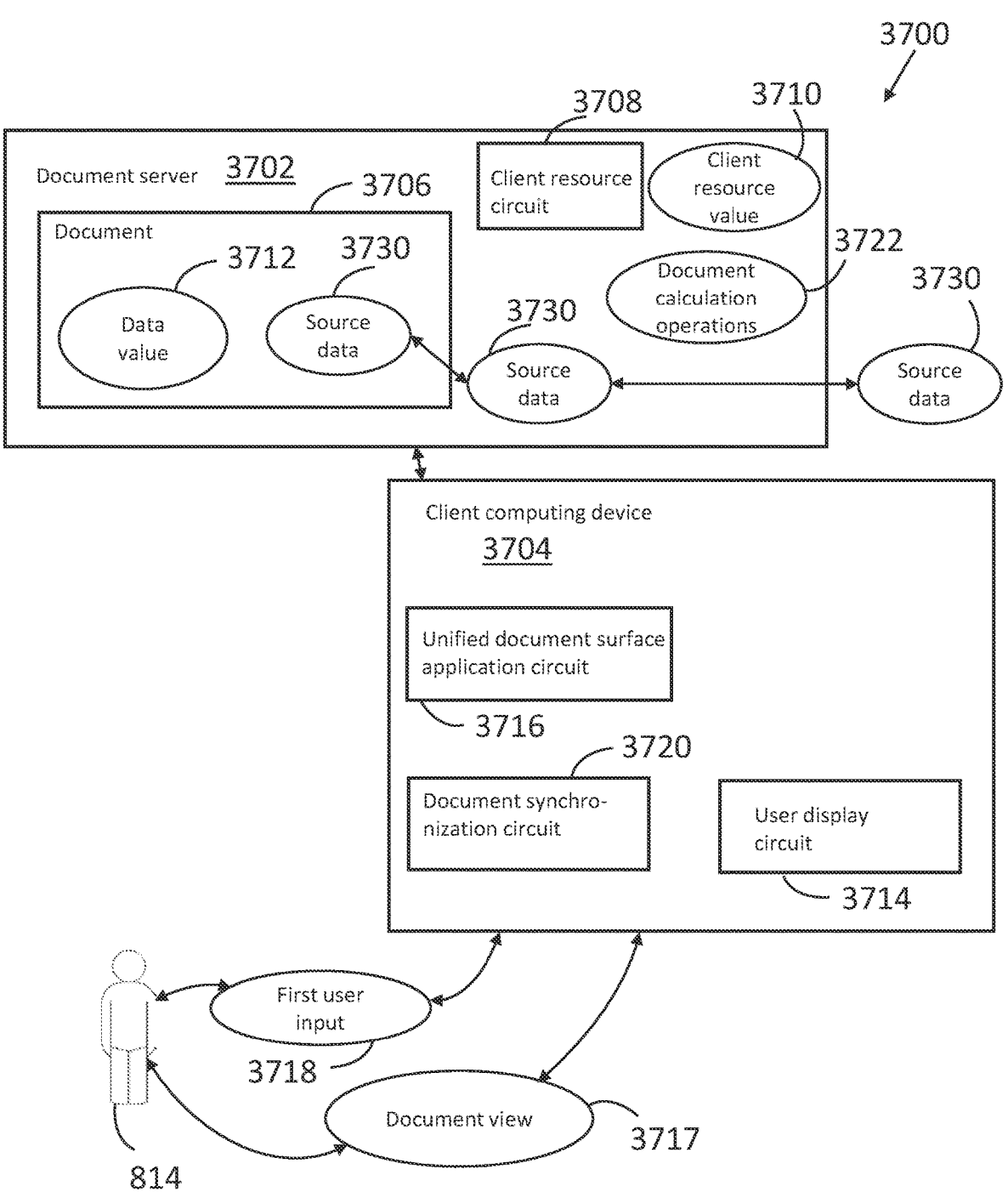
FIG. 37 is a schematic depiction of a system for providing a view.

Referencing FIG. 37, an example system 3700 includes a first computing device 3702 at least intermittently communicatively coupled to a second computing device 3704. The example first computing device 3702 includes a document server, where the document server further includes a client resource circuit 3708 that determines a client resource value 3710. Example and non-limiting client resource value(s) include a user device screen size, a user device input type, a user device resource parameter, and a user device communication value. An example user device communication value includes a qualitative (e.g., communication protocols, device connection types such as WiFi, cellular, etc.) and/or quantitative (e.g., communication speed, latency, bandwidth, data usage allowance, etc.) description of the communication capability of the device (e.g. the second computing device 3704, and/or a device used by the user 814 in communication with the second computing device 3704). In certain embodiments, a user device communication value includes a descriptive value of the communication capability of the device, such as "low battery," "minimize data usage," etc. A user device resource parameter includes, without limitation, a memory associated with the device (e.g., RAM, storage space, accessible cloud memory, etc.), and/or a processor capability of the device (e.g. processor speed, cores, and/or power consumption considerations). In certain embodiments, the client resource value 3710 includes an indication, or a value reflected in the reported information, of the amount of available resources desired or required to be consumed by an application accessing the data value 3712 (e.g. up to 2 GB memory usage, 30% of the processor utilization, etc.). An example client resource value 3710 changes over time, for example as the connectivity of the device changes, memory is freed up or consumed, and/or battery power runs low or is recharged. An example client resource value 3710 includes categorical information, such as an operating system, device make and model, and/or other information relevant to resources on the device and/or from which resources of the device are inferred.

The document server further communicates a data value 3712 to the second computing device 3704 in response to the client resource value 3710, where the data value 3712 includes at least a portion of a document 3706. The example system 3700 further includes a second computing device 3704, such as a client computing device, where the second computing device 3704 includes a user display circuit 3714 that determines a document view 3717 in response to the data value 3712, and provides the document view 3717 to a user 814. The example second computing device 3704 further includes a unified document surface application circuit 3716 that interprets a first user input 3718, for example an edit to the data value 3712, and a document synchronization circuit 3720 that communicates the first user input 3718 to the first computing device 3702.

An example system 3700 includes the client resource circuit 3708 further configuring document calculation operations 3722 to limit calculations performed on the second computing device 3704. In certain embodiments, a document 3706 and/or data value 3712 includes formulas, calculations, flexible display parameters, and/or other active elements that are selectively, periodically, and/or continuously updated. An example system 3700 is configured to perform certain operations selectively on the first computing device 3702, the second computing device 3704, and/or another computing device (not shown—e.g., a supporting server in communication with the document server 3702). The example client resource circuit 3708 configures the data value 3712 to pass information requiring more or fewer calculation operations to the second computing device 3704 to increase or decrease the calculation load on the second computing device 3704, for example according to the client resource value 3710. In certain embodiments, the client resource circuit further configures the document calculation operations 3722 to limit calculations performed on the second computing device 3704 in response to a target response time of the second client computing device 3704. A response time includes, without limitation, any determination of the object response time, such as: a time between a user input and a display response, a ping time to the user device, a processor acknowledgement time, a return time for a test calculation sent to the processor of the user device, heuristic determinations of response times (e.g., detection of repeated user inputs, non-sensical inputs following a screen lag event, and the like), a reported response time by the user device, a user selection indicating a request for increased response, and/or a response time observed for a calculation of the processor that is not a test calculation.

For example, where operations and calculations on the second client computing device 3704 are slowing the second client computing device 3704 (e.g., for an application accessing the document 3706 and/or data value 3712, and/or for other applications on the device), the client resource circuit 3708 configures the data value 3712 to reduce the calculation burden on the second client computing device 3704. In another example, where connectivity to the second client computing device 3704 is limiting responsiveness (e.g., the user 814 experiences lag in an application on the device), the client resource circuit 3708 configures the data value 3712 to move calculations onto the second client computing device 3704. In certain embodiments, for example where many users are accessing the document server, resource limitations on the document server (and/or supporting servers) may be accessed by the client resource circuit 3708 and/or document server to move calculations incrementally toward or away from one or more client devices.

An example client resource circuit 3708 further adjusts at least one document object in response to the user device screen size. For example and without limitation, an example client resource circuit 3708 adjusts a table view (e.g., see the portion referencing FIGS. 113 and 114) to change a dimensionality, width, viewing scheme, or other view of a table. Additionally or alternatively, an example client resource circuit 3708 adjusts a graph, chart, image (size and/or resolution), and/or overall view of the document 3706 (e.g., as expressed through the data value 3712) in light of the user device screen size. In certain embodiments, the client resource circuit 3708 provides for a tabbed view (e.g., reference FIG. 113) in response to the user device screen size.

An example user display circuit 3714 further determines the client resource value 3710, and adjusts the document view 3717 in response to the client resource value 3710. The client resource value 3710 determined by the user display circuit 3714 may be the same or a distinct value from the client resource value 3710 determined by the client resource circuit 3708. An example user display circuit 3714 further adjusts a menu display in response to the client resource value 3710. In certain embodiments, the user display circuit 3714 adjusts a menu display by performing an operation such as: moving a default menu display location (e.g. from a horizontal to a vertical position, or vice versa), by reducing a number of items depicted or defaulted in the display (e.g., a contextual display based on a user operation having a reduced number of suggested matching values), by nesting one or more menus to provide fewer elements in each display layer, and/or by reconfiguring a menu display or toolbar with reduced features, reorganized features, or the like.

An example second computing device 3704 includes a document synchronization circuit 3720 that allows for optimistic updates of the data value 3712 in response to a slow communication between the document server and the second computing device and/or a loss of communication between the document server and the second computing device. For example, where the unified document surface application circuit 3716 has accessed the document 3706 (e.g., via the data value 3712), an example document synchronization circuit 3720 allows updates to the data value 3712 when communications to the document server are slow or lost. The example document synchronization circuit 3720 performs a synchronization with the document server at a selected time when communications are restored and/or normalized. See the description referencing FIGS. 1 through 7, 37, or 62 for non-limiting examples of synchronization operations, for example performed by the document synchronization circuit 3720. In certain embodiments, the document synchronization circuit 3720 utilizes an operation log to perform operations to store edits to the data value 3712 and/or synchronize changes to the document 3706 with other users.

An example client resource circuit 3708 performs an operation to increase or decrease an amount of flat data in the data value 3712 in response to the client resource value 3710. In certain embodiments, the document 3706 includes or accesses referenced or linked data, such as source data 3730. The source data 3730 referenced, linked, and/or included in the document 3706 may be selectively, periodically, event responsive, and/or continuously updated. In certain embodiments, data may be incorporated directly into the document 3706 from source data 3730, where such data is "flat data" without referential links. In certain embodiments, such "flat data" may nevertheless be selectively or periodically updated, and/or updated in an event responsive manner. In certain embodiments, for example where the client resource value 3710 indicates available memory but low bandwidth data capacity or latency, the client resource circuit 3708 provides flat data for one or more elements of the data value 3712, even where analogous data elements in the document 3706 are not flat. An example includes the utilization of flat data that conserves high speed bandwidth (e.g., data is imported to the second computing device 3704 a single time, and/or at a slow update rate). In certain embodiments, only selected data and/or a percentage of the data is included in the data value 3712 as flat data. Additionally or alternatively, the flat data is updated to the second computing device 3704 periodically, selectively, and/or in an event responsive manner. Additionally or alternatively, flat data in the data value 3712 may be tagged, formatted, or otherwise marked such that the user 814 is aware that the depicted data may not be updated. Additionally or alternatively, the user 814 selectively requests updated data, wherein the client resource circuit 3708 performs one of restoring the linked, referenced, or included nature of the data, and/or the client resource circuit 3708 refreshes the flat data, leaving it as flat data.

Figure 38:
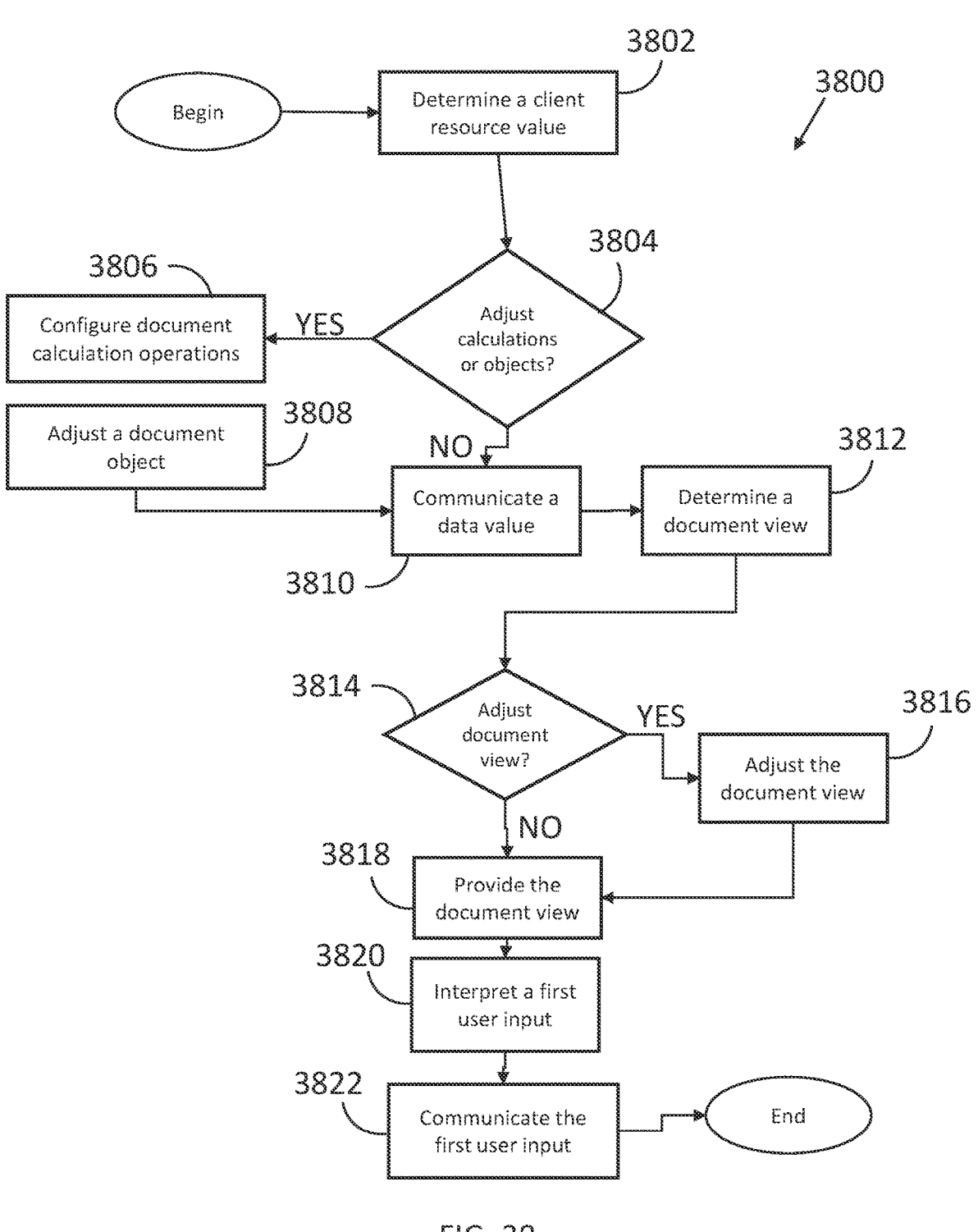
FIG. 38 is a schematic flow diagram of a procedure for updating an operation log.

Referencing FIG. 38, an example procedure 3800 includes an operation 3802 to determine a client resource value, and an operation 3810 to communicate a data value from a document server to a second computing device, where the data value includes at least a portion of a document, in response to the client resource value. The example procedure 3800 includes an operation 3812 to determine a document view in response to the data value, and an operation 3818 to provide the document view to a user. The example procedure 3800 further includes an operation 3820 to interpret a first user input including an edit to the data value, and an operation 3822 to communicate the first user input to the document server from the second computing device.

An example client resource value includes a value such as: a user device screen size, a user device input type, a user device resource parameter, and/or a user device communication value. An example procedure further includes an operation 3804 to determine whether to adjust calculations or objects of the document and/or data value in response to the client resource value. Where the operation 3804 indicates YES, the procedure 3800 includes an operation 3806 to configure document calculation operations to limit calculations performed on the second computing device. An example operation 3806 to limit calculations performed on the second computing device includes limiting calculations in response to a target response time of the second client computing device.

An example procedure 3800 includes an operation 3814 to determine whether to adjust a document view in response to the client resource value and/or a user device screen size. Where the operation 3814 returns a YES result, the procedure 3800 includes an operation 3816 to adjust at least one document object in response to the user device screen size. An example operation 3816 includes adjusting a menu display in response to the client resource value and/or user device screen size.

An example procedure further includes an operation to allow optimistic updates of the data value in response to a slow communication between the document server and the second computing device, and/or or a loss of communication between the document server and the second computing device. An example procedure further includes performing one of increasing or decreasing an amount of flat data in the data value in response to the client resource value.

Figure 58:
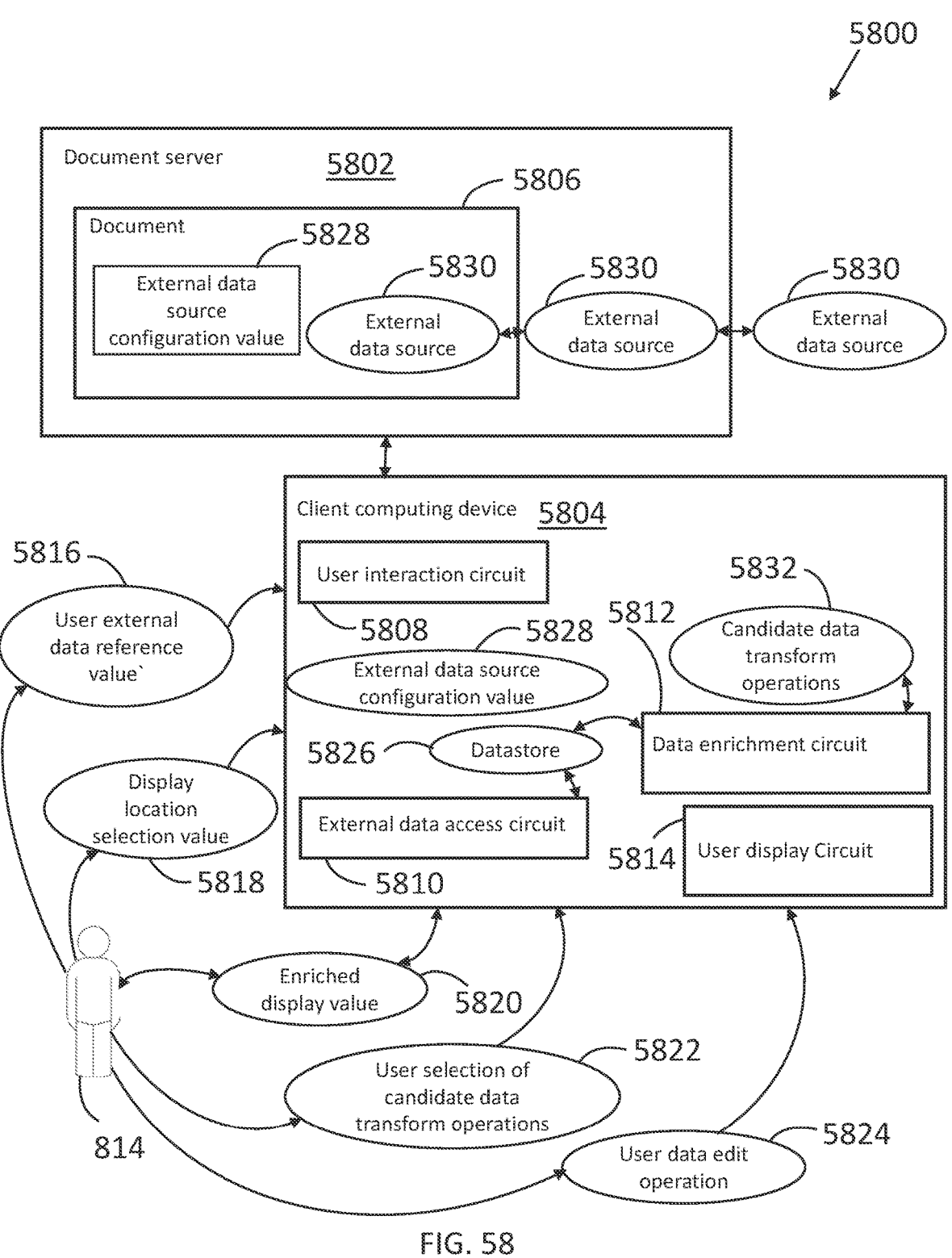
FIG. 58 is a schematic depiction of a system for providing an enriched display.

Referencing FIG. 58, a system 5800 includes a document server 5802 that communicates at least a portion of a document 5806 to a client computing device 5804. The example client computing device 5804 includes a user interaction circuit 5808 that interprets a user external data reference value 5816 and a display location selection value 5818. Example and non-limiting user external data reference values 5816 include a uniform resource locator; a website name; a database identifier; a document identifier; a data reference value; a data link value; and/or a user reference selection. Without limitation, an example user reference selection in an example system 5800 includes any user reference selection 2418 (see FIG. 24, and the portion of the description referencing FIG. 24). An identifier, such as a database identifier or document identifier, includes, without limitation: an object name; an object referencing identifier; a path name (e.g. a network, disk operation system, cloud location, and/or website address); and/or any parseable syntax sufficient to identify a database, document, and/or other object for the user external data reference value 5816.

An example client computing device 5804 further includes an external data access circuit 5810 that accesses an external data source 5830 in response to the user external data reference value 5816. Example and non-limiting external data source(s) 5830 include any source data, external source data, and/or external data source(s) described throughout the present disclosure. In certain embodiments, the external data source 5830 includes a website and/or URL, wherein the user external data reference value 5816 includes an in-line character sequence (e.g., in a text flow, table cell, data on an object, etc.) indicating the website and/or URL. The example client computing device 5804 includes a data enrichment circuit 5812 that performs a display enrichment operation in response to the external data source 5830 and the display location selection value 5818. Example and non-limiting display location selection value(s) 5818 include a table cell value; a table column value; an object identifier value; and/or a document location value. In certain embodiments, the display location selection value(s) 5818 is inferred—for example the user 814 enters the user external data reference value 5816 at a location in the document 5806, and the display location selection value

5818 is inferred to the be location where the user external data reference value 5816 is entered. For example, the user 814 enters a website address, website name, and/or URL in a cell of a table, and an enriched display value 5820 is inserted into the cell of the table where the user external data reference value 5816 is entered. Additionally or alternatively, the user 814 may indicate a display location selection value 5818 distinct from the location of the user external data reference value 5816, for example by referencing a location within a formula, in response to prompts from the user interaction circuit 5808 to indicate a location (e.g., from a suggested list of locations based on contextual information, rules, or the like).

An example client computing device 5804 includes a user display circuit 5814 that provides an enriched display value 5820 in response to the display location selection value 5818 and the display enrichment operation. Example and non-limiting enriched display value(s) 5820 include a picture, card, aggregated information, a selected set of data fields, and/or a visualization element of any type (e.g., see the portion of the present disclosure referencing FIGS. 11 to 23). An example enriched display value 5820 includes a URL to an image, wherein the image is provided as the enriched display value 5820 in a table cell rather than the URL entered by the user 814 (e.g. as the user external data reference value 5816). An example enriched display value 5820 includes a card having a specified configuration of financial data for a company, in response to the user 814 entering a user external data reference value 5816 referencing the company (e.g. a company website address; a financial data provider website address and/or indication of the desired company name; a financial data provider website address in a first table column, a company name in a second column, where the user external data reference value 5816 comprises the website address in the first table column and/or a combination of the first and second table columns, and wherein the display location selection value 5818 comprises a third column providing a card in each data row of the column corresponding to the company name in the second column). The described examples of the user external data reference value 5816, the display location selection value 5818, and the enriched display value 5820 are non-limiting illustrative examples. It can be seen that the operations of the system 5800 provide for a user 814 to rapidly access an external data source 5830 in a configurable manner, including providing entire table column operations, and can work with a variety of external data sources 5830 to provide a wide range of available data access and/or to simultaneously take information from a number of external data sources 5830 in a configurable manner.

An example data enrichment circuit 5812 further structured performs the display enrichment operation by performing a data transform operation on at least one data value from the external data source 5830. For example, the data transform operation can include generating a card, table, object of any type, visualization element of any type, and/or operating a formula on selected data from the external data source 5830. In certain embodiments, the transformed data is displayed, e.g. as a mask value, and the user external data reference value 5816 is stored (e.g., in an operation log; snapshot; system table; and/or in the same location as the enriched display value 5820 such as a table cell). In certain embodiments, the user external data reference value 5816 is hidden, selectively visible, and/or visible in certain views (e.g., a view from the user 814 displaying metadata for the document 5806).

An example data enrichment circuit 5812 further performs the display enrichment operation by determining a number of candidate data transform operations 5832 (e.g., a number of enriched display value 5820 options), providing the number of candidate data transform operations 5832 to the user 814, interpreting a user selection of the plurality of candidate data transform operations 5822, and further performing the display enrichment operation in response to the user selection of the plurality of candidate data transform operations 5822. For example, the data enrichment circuit 5812 determines that the user 814 may want to create a card, an embedded table within a row, a chart, and/or display an image in response to the user external data reference value 5816 and/or the display location selection value 5818, and the data enrichment circuit 5812 provides these options as candidate data transform operation 5832 to the user 814. The example data enrichment circuit 5812 may additionally or alternatively prioritize the candidate transform operations 5832, provide only a few of the available candidate transform operations 5832, and/or indicate to the user 814 that additional candidate transform operations 5832 are available beyond those displayed.

An example user display circuit 5814 further provides a preview of at least one of the candidate data transform operations 5832 to the user 814. In certain embodiments, the user display circuit 5814 provides a preview for only one or more of the candidate data transform operations 5832 (e.g., the highest priority and/or highest estimated relevance candidate data transform operations 5832), and provides a preview in response to a user 814 operation (e.g., as a tooltip dependent upon the user 814 focus of one or more candidate data transform operation 5832, in response to a user selection from a menu, etc.). Example and non-limiting previews of the candidate data transform operations 5832 include a thumbnail of the resulting enriched display value 5820, and/or a pop-up (e.g., in a new window and/or within the presently selected window) of the resulting enriched display value 5820. In certain embodiments, the provision of one or more previews is determined in response to a resource value of the client computing device 5804, a property of the client computing device 5804 (e.g., a screen size, device type, etc.), and/or a communication property to the external data source 5830 (e.g., communication bandwidth between the document server 5802 and the client computing device 5804; and/or a latency and/or availability of retrieving data from the external data source 5830); and/or computing resources available within the system 5800 and/or from computing resources available to the system (e.g. additional servers—not shown) to process the preview information.

An example data enrichment circuit 5812 further determines the number of candidate data transform operations 5832 in response to at least one of: the user external data reference value 5816; the display location selection value 5818; a previous user selection of the number of candidate data transform operations 5822 (e.g., from the specific user 814 and/or a previous user accessing the document 5806 and/or accessing the external data source 5830 in another document visible to the document server 5802); a predetermined list of candidate data transform operations (e.g., defined by rules from the user, an administrator, within a document template, and/or from the external data source 5830); a data type of accessed data from the external data source 5830; an external data transform operation provided by the external data source 5830 (e.g., where a developer or administrator related to the external data source 5830 has provided one or more candidate data transform operations 5832); and/or a context value (e.g., according to any contextual determinations described throughout the present disclosure).

An example external data access circuit 5810 further accesses the external data source 5830, stores data from the external data source 5830 in a datastore 5826 (in the example, on the client computing device 5804, but the datastore 5826 may be anywhere within the system 5800 including at least on the document server 5802 and/or within the document 5806), and where the data enrichment circuit 5812 further performs the display enrichment operation in response to the external data source 5830 by accessing the datastore 5826. It can be seen that the utilization of a datastore 5826 can improve operations of the document server 5802 and/or client computing device 5804, by reducing latency in retrieving data, reducing the number of data access events from the external data source 5830, and/or by making data from the external data source 5830 available to other users and/or other client computing devices (not shown), and/or making the external data source 5830 available to other documents (not shown) in the system 5800. In certain embodiments, certain operations such as providing a preview of candidate data transform operations 5832, and/or providing a more responsive interface to the user 814, are improved by the user of the datastore 5826. An example external data access circuit 5810 updates the datastore 5826 periodically (e.g. hourly, daily, and/or weekly), according to a notification from the external data source 5830 that updated information is available (including, in certain embodiments, determining whether data utilized in the system 5800, such as within the document 5806, a user external data reference value 5816, and/or within another document in the system 5800, is implicated by any change), according to a user 814 selection of data synchronization rate, and/or according to a rules-based data synchronization rate (e.g., user defined rules, administrator defined rules, document template rules, and/or rules from the external data source 5830).

Example and non-limiting operations of the external data access circuit 5810 to update the datastore 5826 include: an update time expiration (e.g., update from the external data source 5830 daily, hourly, weekly, and/or at any other selected interval); a notification from the external data source 5830; a change in a second data value (not shown) having a dependency on the external data source 5830 (e.g., the user 814 changes a formula, table, and/or object having a calculation utilizing the external data source 5830, and the external data access circuit 5810 queries the external data source 5830 to ensure the results of the formula, table, and/or object are displaying current information); a change in an object having a dependency on the external source data; a creation of a second data value having a dependency on the external source data (e.g., the user 814 creates a formula, table, and/or object having a calculation utilizing the external data source 5830, and the external data access circuit 5810 queries the external data source 5830 to ensure the results of the formula, table, and/or object are displaying current information); a creation of an object having a dependency on the external data source 5830; and/or a request to provide a continuous update of the at least one data value. In certain embodiments, the external data access circuit 5810 predicts that the user 814 will perform an operation dependent upon the external data source 5830, and queries the external data source 5830 to update the datastore 5826. Example operations to predict the user 814 will perform an operation dependent upon the external data source 5830 include: predicting based on a document section currently focused by the user 814; predicting based on a document object currently focused by the user 814; predicting based on a document canvas currently focused by the user; predicting based on a portion of the document currently visible to the user 814; predicting based on prior user 814 operations (e.g., the user 814 has accessed dependent data previously after accessing a particular document portion and/or performing certain operations); and/or predicting based on prior operations from one or more other users.

An example user display circuit 5814 further updates the enriched display value 5820 in response to a change in the external data source 5830 and/or changes in the datastore 5826. Accordingly, an example user display circuit 5814 provides a live or selectively updated view of the enriched display value 5820 to the user 814. In certain embodiments, an age of the datastore 5826 and/or an indication that updated data is available from the external data source 5830 is available to and/or accessible by the user 814.

An example external data access circuit 5810 further determine that an external data source 5830 is not presently available (e.g., the external data source 5830 and/or client computing device 5804 is "offline," and/or a communication interruption is present in the system 5800), and the data enrichment circuit 5812 further delays the performing the display enrichment operation until the external data source 5830 is available. In certain embodiments, the data enrichment circuit 5812 performs the display enrichment operation when the external data source 5830 is not presently available, and the user display circuit 5814 delays providing the enriched display value 5820 until the external data source 5830 is available and/or provides a placeholder external data source 5830 (e.g., using example data, a notification image or text value indicating the enriched display value 5820 is not depicting updated data, and/or utilizing a default depiction of the enriched display value 5820) until the external data source 5830 is available.

An example user interaction circuit 5808 further interprets a user data edit operation 5824 including an edit to the enriched display value 5820, and the external data access circuit 5810 updates the external data source 5830 in response to the user data edit operation 5824. For example, operations of the user interaction circuit 5808 and external data access circuit 5810 allow the user 814 to review and display external data in a convenient format (e.g., as selected by the enriched display value 5820) and to write changes back to the external source data 5830. In certain embodiments, access to the external source data 5830 is scheduled according to permissions, for example a first user may have permissions to edit the external data source 5830 and a second user may have only permissions for read access to the external data source 5830. In certain embodiments, a user 814 may have edit access to certain aspects of the external source data 5830 (e.g., the user's own profile on a LinkedIn source), read access only to certain aspects of the external data source 5830, and no access to other certain aspects of the external data source 5830. In certain embodiments, the external data access circuit 5810 stores access permissions (e.g., read and/or edit access) and/or selections to one or more external data sources 5830.

An example external data access circuit 5810 further stores an external data source configuration value 5828, where the external data source configuration value 5828 includes access information corresponding to the external data source 5830. For example, an external data source configuration value 5828 includes login information, defined access permissions, and/or referencing aliases for one or more external data sources 5830. In certain embodiments, aspects of the external data source configuration value 5828 may be automatically generated (e.g. from a user profile or other information accessible to the system 5800), and/or may be accessible to and/or selectable by the user 814. An example external data source configuration value 5828 includes the user 814 adjusting permissions—for example to reduce an edit access permission to a read-only access permission for one or more aspects of the external data source 5830, such as to prevent inadvertent edits of the external data source 5830. The example external data access circuit 5810 further accesses the external data source 5830 in an operation including accessing the external data source configuration value 5828. An example external data source configuration value 5828 includes a system table (e.g., the external data source configuration value 5828 depicted on the document 5806). In certain embodiments, the external data source configuration value 5828 is not provided on an operation log and/or snapshot (e.g., to prevent login information from being accessible in the operation log). In certain embodiments, an external data source configuration value 5828 includes one or more elements that are encrypted and/or hashed (e.g., allowing for confirmation of a user password or the like), and included in a system table and/or an operation log or snapshot. In certain embodiments, a system table is not visible to the user 814, is selectively visible to the user, and/or is visible to the user 814 when accessing specified views (e.g., a system view and/or metadata view).

In certain embodiments, operations to provide an enriched display value are described as "inflate" operations—wherein a user external data reference value 5816 is "inflated" to an enriched display value 5820. Example and non-limiting external data sources 5830 include, without limitation, GitHub, LinkedIn, Facebook, a URL, and/or an e-mail data source (e.g., for a user, group of users, system, etc.).

Example operations include transforming a cell of a table that has the user external data reference value 5816 positioned (e.g., pasted) therein, and transforming the cell and/or a masked appearance of the cell, into an enriched display value 5820. For example, an image URL positioned into a cell is transformed into an image. Another example includes a personnel based URL (e.g., a LinkedIn URL) transformed into data for a person and/or entity.

Accordingly, functions related to an external data source 5830, which may be configured for the specific external data source 5830, user 814, and/or any contextual information, can be suggested and/or implemented. An example includes suggesting functions that were last used for a particular URL, functions based on specific content and/or a data type, and/or functions recently used by a specific user or other users accessing the document, document section, external data source 5830, and/or object. In certain embodiments, external developers for an external data source 5830 provide suggested functions for their external data source 5830.

In certain embodiments, access to an external data source 5830 can be configured—for example in an external data source configuration value 5828, to provide for authorization checking and handling, definitions and/or suggestions of data fields to be utilized, synchronization frequency, time definitions for data (e.g., time frame of data to be pulled, future times of interest where data can be synchronized more or less frequently, or will no longer be utilized, etc.), whether external data sources 5830 should be registered, and/or which projects, fields, or other information from the external data source 5830 are of interest. Where the external data source 5830 is web-based and/or referenced by a URL, in certain embodiments operations of systems and procedures herein may be referenced as "webhooks." In certain embodiments, within systems disclosed herein, access to external data source(s) 5830 may be prioritized over access to other external data source(s) 5830, which prioritization may be based on the external data source 5830, the user 814, currently available system resources, and/or current availability and/or known or estimated future availability of external data source(s) 5830.

Figure 59:
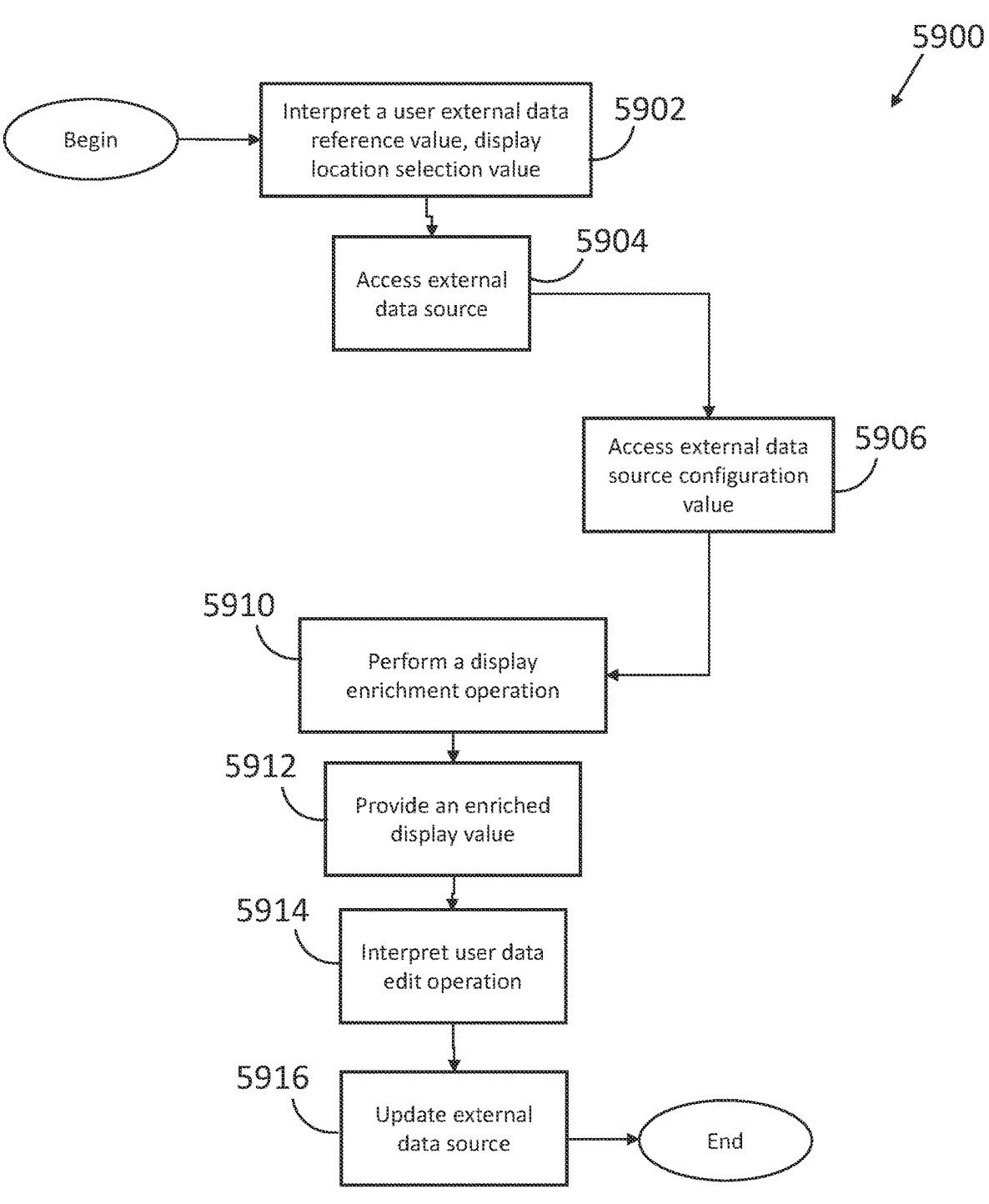
FIG. 59 is a schematic flow diagram of a procedure for accessing an external data source.

Referencing FIG. 59, an example procedure 5900 includes an operation 5902 to interpret a user external data reference value and/or a display location selection value, an operation 5904 to access an external data source in response to the user external data reference value, and an operation 5910 to perform a display enrichment operation in response to the external data source and the display location selection value. The example procedure 5900 further includes an operation 5912 to provide an enriched display value in response to the display location selection value and the display enrichment operation 5910. An example procedure 5900 includes the user external data reference value being a value such as: a uniform resource locator; a website name; a database identifier; a document identifier; a data reference value; a data link value; and/or a user reference selection. An example procedure 5900 includes the display location selection value being at least one location value such as: a table cell value; a table column value; an object identifier value; and/or a document location value.

Figure 60:
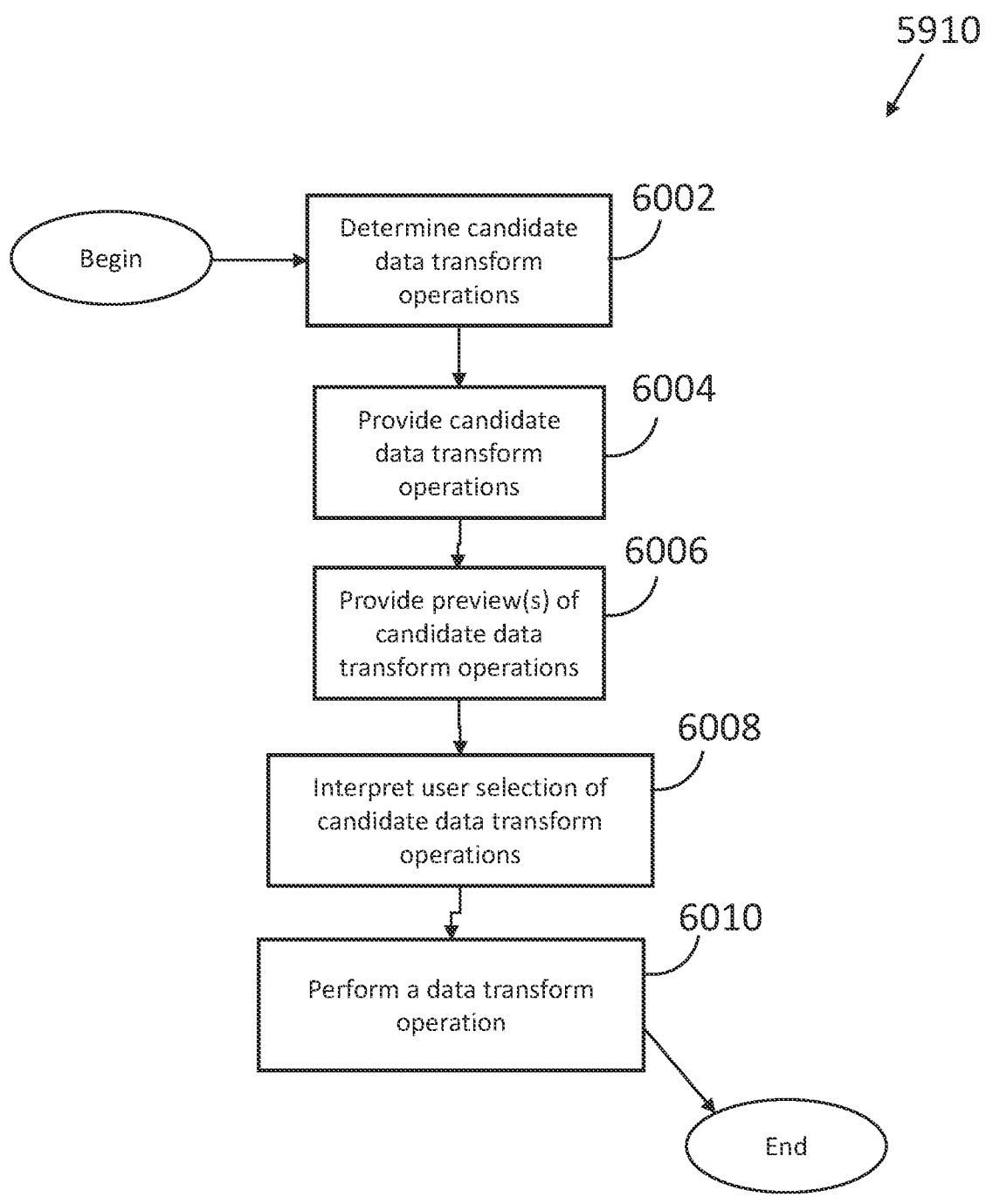
FIG. 60 is a schematic flow diagram of a procedure for performing a data transform.

Referencing FIG. 60, an example operation 5910 to perform a display enrichment operation includes an operation 6010 to perform a data transform operation on at least one data value from the external data source. In certain embodiments, the operation 5910 further includes an operation 6002 to determine a number of candidate data transform operations, an operation 6004 to provide the number of candidate data transform operations to a user, and an operation 6008 to interpret a user selection of the number of candidate data transform operations. In the example operation 5910, the operation to perform the display enrichment operation is in response to the user selection of the number of candidate data transform operations. An example operation 5910 further includes an operation 6006 to provide a preview of one or more of the number of candidate data transform operations to the user. Example operations 6002 to determine a number of candidate data transform include determining the number of candidate data transform operations in response to: the user external data reference value; the display location selection value; a previous user selection of the plurality of candidate data transform operations; a predetermined list of candidate data transform operations; a data type of accessed data from the external data source; an external data transform operation provided by the external data source; and/or a context value.

Referencing FIG. 61, an example procedure 6100 includes an operation 6102 to access the external data source, and an operation 6104 to store data from the external data source in a datastore. The example procedure 6100 further includes the operation 5910 to perform the display enrichment operation in response to the external data source by accessing the datastore.

Again referencing FIG. 59, an example procedure 5900 further includes the operation 5912 including updating the enriched display value in response to a change in the external data source. An example procedure 5900 includes an operation (not shown) to determine that an external data source is not presently available, and to delay the operation 5910 to perform the display enrichment operation until the external data source is available. An example procedure 5900 further includes an operation 5914 to interpret a user data edit operation including an edit to the enriched display value, and an operation 5916 to update the external data source in response to the user data edit operation. An example procedure 5900 further includes an operation (not shown) to store an external data source configuration value, where the external data source configuration value includes access information corresponding to the external data source, and where the operation 5904 to access the external data source further includes an operation 5906 to access the external data source configuration value. An example external data source configuration value includes a system table.

Figure 31:
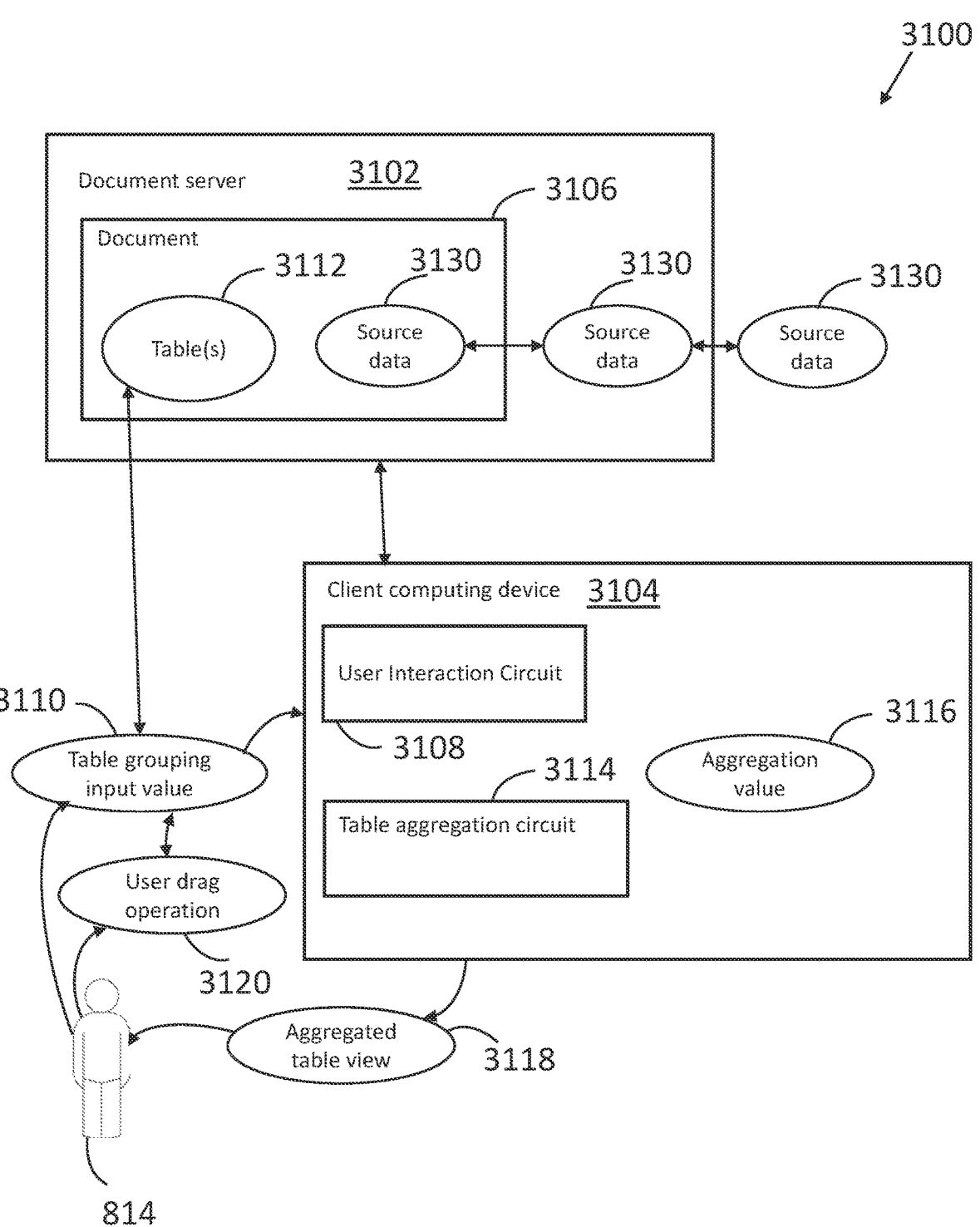
FIG. 31 is a schematic depiction of a system for providing an aggregated view.

Referencing FIG. 31, a system 3100 includes a client computing device 3104 in communication with a document server 3102. The document server 3102 communicates a data element 3112 (e.g., a table), including at least a portion of a document 3106, to the client communication device 3104. In certain embodiments, the document 3106 includes, links, and/or references source data 3130. Example source data 3130 is included within the document 3106, within the document server 3102, and/or accessed externally from the document 3106 or document server 3102—for example data on a website, third-party database, and/or cloud location.

The example system 3100 includes a user interaction circuit 3108 that interprets a table grouping input value 3110. An example table grouping input value 3110 includes a number of categories and a number of associated data sets corresponding to the categories. Example categories include, without limitation, a table column heading, a table name, a form name, a data sheet name, and/or any categorization of data values and/or data value groups. Example associated data sets include, without limitation, table rows, one or more data values present on a form, one or more data values present on a data sheet, and/or any other data value set associated with a category. An associated data set includes a number of data values, which may be related to each other, and/or a single data value associated with the category. For example, a category includes a table column heading, and associated data values include row information from an associated table, for example one or more data values from each row makes up an associated data set. In certain embodiments, an associated data set is pulled from multiple locations, for example from more than one table, chart, graph, data sheet, and/or form (for example utilized to enter and/or read data or information). The description herein using columns or rows is interchangeable pending upon the data organization and conventions used in an example system 3100.

The example system 3100 includes a table aggregation circuit 3114 that determines an aggregation value 3116 in response to the table grouping input value 3110. An example aggregation value 3116 corresponds to at least one of the categories, for example an aggregation value 3116 includes a grouping of a number of data rows, where each row shares an associated data value in a column corresponding to the category selected for aggregation. An associated data value, for the purposes of the present disclosure, includes data values having a characteristic selected for aggregation, for example data values having a same value for the selected category, data values grouped according to a data bin and/or bucketing operation, data values sharing a qualitative characteristic (for example, fruit, cars, and/or a data type), and/or data values sharing a quantitative characteristic (for example, a positive or negative magnitude, less than or greater than a selected value, and/or having any other quantitative relationship).

Example system 3100 includes the user interaction circuit 3108 that provides an aggregated table view 3118 in response to the aggregation value 3116. In certain embodiments, the aggregated table view 3118 includes aggregated data in accordance with the aggregation value 3116, including selected aspects of associated datasets, a table depicting the aggregated data (for example, a pivot table), and/or portions of the aggregated data currently visible to the user 814 based on the portion of the document 3106 being accessed by the user 814. While the example system 3100 is described in the context of a table and an aggregated table view 3118, aggregations of any type of object having or associated with a number of data sets are contemplated herein, including at least graphs, charts, and/or other objects having or displaying a number of data sets or data series. Additionally or alternatively, aggregated values may be provided at the right or left side of a table or object, at a top or bottom of an object, and/or at other locations (e.g., within a document), such as for convenient reference to the user without regard to the positioning of the aggregated value relative to the table or aggregated data.

An example user interaction circuit 3108 interprets the table grouping input value 3110 by performing at least one operation such as: providing an aggregation user interface element to user, interpreting a user selection value in response to the aggregation user interface element, and determining an aggregation profile in response to the user selection value. An example aggregation profile includes at least one of the categories for aggregation, and in certain embodiments further includes an aggregation scheme for the associated data sets. The use of an aggregation profile and/or aggregation scheme allows for a wide range of capability in aggregation, were aggregation is not limited to a single category, and/or line by line associated data sets to the single category. For example, the aggregation profile allows for aggregation of several categories, for example prioritized in a selected order, aggregation of a single category and/or related categories from multiple data sources (for example, from multiple tables, multiple objects, and/or across a table and another object), and allows for differential aggregation logic for each aggregated category, and/or within an aggregated category. For example, in aggregation profile may include a data count of associated data sets where a value within each associated data set corresponding to the aggregated category is below a threshold value, in a sum of associated datasets where a value within each associated data set corresponding to the aggregated category is above the threshold value. Additionally or alternatively, where two categories are aggregated, an aggregation profile can provide for aggregating the first one of the two categories according to first aggregation scheme, and aggregating the second one of the two categories according to a second aggregation scheme. Example and non-limiting aggregation schemes include qualitative aggregation of associated data sets according to at least one of the categories, quantitative aggregation of associated data sets according to at least one of the categories, and/or binned aggregation of associated data sets according to at least one of the categories.

An example aggregation scheme includes a nested aggregation of associated data sets according to at least two of the categories. A nested aggregation includes aggregations against more than one category, such as aggregating data sets against a first category, and then aggregating against a second category. In certain embodiments, the priority of a first category, and/or a second category for nested aggregation is the same for all data sets within the aggregated data set. Additionally or alternatively, prioritization between categories can vary within the aggregated data set, for example a value of the data sets in a third category can be utilized to determine prioritization order for a data set between the first category and the second category. In a further example, a first category includes weekly net sales data, a second category includes weekly gross sales data, and a third category includes a business unit reporting the sales data. In the continuing example, for example where certain business units report gross sales data in other business units report net sales data, the third category may be utilized in an aggregation profile to group sales reporting either with the first category having priority or the second category having priority based upon which business unit reported the sales information. The provided nonlimiting example is for purposes of illustration, in any aggregation profile, and/or aggregation scheme is contemplated herein.

In certain embodiments, the aggregation scheme and/or aggregation profile, including in some instances a nested aggregation scheme, is stored in the operation log (for example as the local operation log 116). Additionally or alternatively, precursor operations to implement the aggregation scheme and/or aggregation profile are stored in the operation log. For example, new data reflecting the aggregation information (e.g., a sum of certain values) can be calculated, an aggregation display cell, row, column, or other display feature, added to the column, and the resulting aggregation data (e.g., the aggregation result) and/or the aggregation formula (e.g., the aggregating calculations) may be explicitly created and stored in the operation log. Additionally or alternatively, precursor information for the aggregation, such as the aggregation profile, aggregation scheme, and/or formulas for aggregation, may be stored in the operation log, wherein upon opening a document again, or the user focus returning to the location of the document where aggregated information is displayed, the aggregation information and/or aggregation display can be populated from the precursor. Any information stored which can preserve the aggregation information, and/or from which the aggregation information can be re-created at selected times, is contemplated herein. Any storage location for the information to preserve and/or re-create the aggregation information, such as: an operation log, run-time data, and/or a user-related file that is associated with the document and accessible when the user accesses the document, is contemplated herein. The selection of storing pre-cursor information, aggregation results, and/or aggregation display, and further the selection of calculating aggregation results as needed or saving aggregation results for re-use (e.g., where it is determined that a prior calculation remains valid), can be configured for the particular system and any priorities of the user and/or an administrator. For example, selections of storage and calculations can be modulated to reduce processing utilization of a client computing device and/or document server, to reduce memory utilization of a client computing device and/or document server, to improve response time of an application accessing the document from the perspective of the user, to reduce the size and/or number of operations in the operation log, and/or to reduce communication bandwidth utilization between the client computing device and the document server.

Example and nonlimiting aggregation schemes include at least: an associated dataset count; a sum of associated datasets; an average of associated datasets; an applied function of associated datasets (such as a highest value within the data sets, a lowest value within the data sets, a sum of the squares of the values within the datasets, a correlation coefficient of the values, a mathematical description of the values, such as a frequency component, variability, and the like), an applied formatting of associated data sets (for example, font size, font color, line color, highlighting information, bold, and/or italics); and combinations of these. The described examples are nonlimiting illustrations of aggregation schemes.

An example aggregation user interface element includes any user interface component provided to allow the user 814 to invoke an aggregation operation. Example and nonlimiting aggregation user interface elements include: a dedicated aggregation input element; a table super cell; a table category heading; a toolbar interface element; a menu interface element; and/or a context triggered element. Example and non-limiting dedicated aggregation input elements include a specific icon and/or graphical element visible to the user 814. An example system includes the user 814 entering the table grouping input value 3110 according to prompts, as a part of initial selection of the dedicated aggregation input element, and/or in a drop-down menu. Example determinations of the aggregation value 3116, and/or population of drop-down menus, prompts, or the like, are performed according to a context of user operations, such as a type of object the user 814 is working with, available resources on a client computing device 3104, a document section or type, previous operations of the user 814 or a previous user working with the type of object or specific object the user 814 is working with, and/or rules-based operations such as template defined rules, user defined rules, and/or administrator defined rules. A table super cell may be a column heading, a row name, and/or a selected cell protected from editing and/or tagged to organize information in a table. Non-limiting examples of a "super cell" include a grouping value, for example a single cell that include multiple cells arranged therein. Additionally or alternatively, "ranges" (which may be visible or in metadata that is invisible or selectively visible) may be utilized to described grouped values and/or aggregated values. The terminology of describing aggregation elements and/or grouping elements is not limiting to the present disclosure.

Certain examples of a dedicated aggregation input element are described herein. Referencing FIGS. 117 and 126, a dedicated aggregation input element 8202 includes an aggregation drop down menu depicted above a table, whereupon the user 814 selects the drop-down menu and makes an aggregation selection for the table ("My Table" in the example of FIG. 116). In the example of FIG. 117, an aggregated table view 3118 includes two-dimensional table, grouped according to a first group of categories 8502 (e.g. column headings "Group 1," "Group 2," etc.) and a second group of categories 8504 (e.g. column headings "Group A," "Group B", etc.), which may be column headings from a source table, data values of interest from the associated data values, or the like. The example of FIG. 117 includes a number of associated data values of interest (e.g. data row 8506) positioned in each grouping. In addition to, or as an alternative to, grouping associated data values of interest, summary or other aggregation information for associated data values positioned in each grouping can be displayed. The example of FIG. 117 is a two-dimensional grouping, although any grouping dimensionality and display method for grouped data is contemplated herein. In certain embodiments, the user 814 can aggregate the data with a single operation, such as selecting an aggregation value from the dedicated aggregation input element 8202, dragging a row representing an associated data set onto a column representing a category, dragging a column header representing a category onto a row representing an associated data set, etc.

In certain embodiments, where the aggregation scheme requested by the user 814 is not immediately clear, the table aggregation circuit 3114 infers an aggregation scheme from the available context. For example, an aggregation circuit 3114 aggregates according to a first element of the associated data sets, according to a highest importance element of the associated data sets, according to a most interesting element of the associated data sets, such as one previously aggregated for the object or a related object, one associated with a highest variability within the associated data sets, one relating to a header within a document section of the related object. Additionally or alternatively, an aggregation circuit 3114 aggregates with a sum, associated row count, and/or an aggregation function, according to a default rule, specified rules such as from a template defined rule, user defined rule, and/or administrator defined rule, according to previous user operations and/or previous operations of another user. In certain embodiments, the aggregation circuit 3114 prompts a user 814 for a selected aggregation scheme, and/or provides the user 814 with a preview of one or more aggregation results according to one or more aggregation schemes.

Example and non-limiting operations for the user 814 to provide a table input grouping value include: a user selection of a dedicated aggregation input element; a user drag operation of one or more associated data sets to a table supercell; a user drag operation of a table supercell to associated data sets; a user drag operation including an element of a first table and an element of a second table (e.g. where the inferred aggregation scheme includes a primary table and a secondary table, where the secondary table is aggregated according to one or more columns of the primary table; the first table or the second table may be the primary table, and the example aggregation circuit 3114 may prompt the user 814 and/or provide a preview to ensure the desired aggregation scheme is applied); a user menu interface element selection; and/or a user selection of a context triggered element (e.g. a user operation is inferred to suggest an aggregation operation, and the example aggregation circuit 3114 prompts the user with one or more aggregation schemes and/or provides a preview to ensure the desired aggregation scheme is applied). In certain embodiments, the user interaction circuit 3108 is further structured to interpret a table grouping input value by interpreting a user drag operation including at least two data values, and wherein the table aggregation circuit 3114 further structured determines the aggregation value 3116 by preserving original values for the at least two data values.

An example system 3100 includes the user interaction circuit 3108 further interprets a user data edit value corresponding to one of the plurality of associated data sets viewable in the aggregated table view 3118, and updates at least one data value on the table 3112 in response to the user data edit value. For example, an aggregated table view 3118 displays one or more values of the associated data sets on the aggregated table. Previously known aggregation displays, such as pivot tables, charts, etc., are one-way data views, where the data is linked from the source data but not editable within the aggregation display. In certain embodiments, one or more data values from the aggregated table view 3118 may be write-through values, allowing the user 814 to edit the values right on the aggregated table view 3118, without breaking the linked nature of the aggregated table view 3118—for example, the source data for edited values remains in the table 3112, and an edit on the aggregated table view 3118 passes the edit back to the table 3112, but does not break the link.

Example operations to create the aggregated table view 3118 include calculating and storing the aggregated table view 3118 as operations in an operation log. It is understood that operations described throughout the present disclosure may occur in several steps, which combine to provide the functionality of the disclosed operations. For example, and aggregating operation may include several different and/or independent operations to support providing the information for a particular view. Example operations include inserting a table object representing the aggregated table view 3118, and storing aggregated values for display and/or calculations from which aggregated values can be determined and displayed as requested (e.g., by the user navigating to a portion of the document making the aggregated table view 3118 visible). Example operations to edit source data from the links without breaking the linked nature of the aggregated table view 3118 include accepting user operations in a linked cell to edit the value therein, where the true data value is a linked or referenced value, and upon the user completion of the editing information (e.g., the user changes focus from the cell, hits "ENTER", and/or hits "TAB"), storing the operation (e.g. in the operation log) as an edit to the source table rather than the linked location where the user edited the data. In certain embodiments, the data value in the linked location where the user edited the data is unchanged (e.g., a formula referencing the source table), and/or the data value in the linked location is a display value only (e.g. where the linked location is created by a column-wise calculation, where individual formulas are not present in individual cells). In certain embodiments, the user interaction circuit 3108 updates the source data value, and performs a refresh or recalculation operation such that the edited data value from the user 814 in the linked data location is visible to the user 814 (e.g., to provide the feel to the user that the edit in the linked data location was effective and/or seamlessly operates from the user perspective as if the user is directly editing the data).

Referencing FIG. 128, an aggregated table view 3118 is depicted on a tab of a document for ease of selection, publication, or other manipulation by a user 814. Referencing FIG. 127, an example aggregation input element 8202 is depicted. In certain embodiments, a graphical element positioned near the associated data values (e.g. rows of data) provides for a context menu location selectable by the user 814. In certain embodiments, the context menu location highlights upon selection and/or focus by the user 814, and includes row operations such as insertion or deletion of a row (e.g. as depicted in the example of FIG. 126). Additionally or alternatively the aggregation input element 8202 includes selectable and/or suggested aggregation schemes, which may be responsive to the manner in which the user 814 selects or focuses the aggregation input element 8202 and/or a context of the user 814 interaction with the table or object. In the example of FIG. 126, the user 814 has selected the aggregation input element 8202 in a manner such that aggregation schemes are not depicted thereon.

Referencing FIG. 129, example, non-limiting, aggregated table views 3118 are depicted thereon. Where an aggregated data result is a single value (e.g. a sum of a data set), the aggregated table view 3118 can be depicted as a single value (e.g., "Values"). Where the aggregated data result is a single list of values, the aggregated table view can be depicted as a list (or array) of values (e.g., "Values and aggregates"). Where the aggregated data result is a number of lists of values, the aggregated table view can be depicted as a table of N lists (e.g. "N lists" depicting columns A, B, C, etc.). Additionally or alternatively, where the aggregated data result is a number of lists, or other two-dimensional information, the aggregated data view can be depicted as a two-dimensional table of associated data sets grouped according to the at least two grouping criteria (e.g. depiction of aggregated data view 3118). Where two or more dimensions result from the aggregation, grouping can additionally or alternatively include additional data grouping depictions, such as nested lists, shapes, colors, or alternative formatting to depict additional grouping dimensions, and/or density or transparency adjustments to depict additional grouping dimensions. Additionally or alternatively, grouping order (e.g. priority of two separate grouping dimensions) can be readily adjusted by the user—for example dragging a horizontal grouping category to a member of the vertical grouping category, which in certain embodiments the table aggregation circuit 3114 interprets as an operation to switch the grouping priority of the horizontal and vertical grouping categories. In certain embodiments, operations to change grouping priorities and/or dimensions are stored in the operation log as operations to implement the grouping priorities and/or dimensions reflected in the document and the respective objects affected. For example, the referenced objects, relationships, and associations are stored as entries editing the aggregated table view 3118 to implement the grouping priorities and/or dimensions. Additionally or alternatively, change operations executed by the user are stored in the operation log (e.g., an original state of the operation log includes operations to implement the pre-change grouping priorities and/or dimensions, and an updated state of the operation log includes operations to change the grouping priorities and/or dimensions). In certain embodiments, change operations are stored at a first time (e.g., after initial edits to preserve undo functionality), and reduced to operations to implement the final state at a second time (e.g., upon generating a snapshot, saving the document, etc., to reduce memory utilization and/or document calculation time).

It can be seen that grouping results may be depicted as single data values, lists of data values, and/or associated rows of data within each grouping (e.g. a "table in a table" depiction, such as with regard to FIG. 129 and/or FIG. 126). Referencing FIG. 129, a nested view is depicted for grouping on a single dimension, for example depicting bug fix priorities for a number of software engineers. Category headings (e.g., "Amisha," "Carol," etc.) are depicted in-line before each relevant group of associated data sets. Additionally or alternatively, the category headings may be depicted on the side, spanning associated data sets, and/or having a graphical depiction that makes clear which associated data sets belong in each category (e.g., reference the depiction in FIG. 130). FIG. 130 provides a two-dimensional aggregated table view 3118 of the data depicted in FIG. 129, with the project milestone as an additional grouping category. In the example of FIG. 130, category headings (e.g., "M1," "Amisha," etc.) are depicted in graphical elements, such as supercells. In certain embodiments, a table cell includes data values (e.g. a number, text value, and/or string value). In certain embodiments, a table cell includes an image, a graph, a chart, and/or a rich content data feature (e.g. a map having locations marked, and/or selectable).

When multi-dimensional data groupings are depicted in a given data set, depending upon the variability in the underlying data and/or the grouping selections made, an aggregated data set can be sparse (e.g. reference FIG. 130 where "Carol" has no M1 deliverables, and "John" has no M2 or M3 deliverables). Accordingly, referencing FIG. 131, the aggregated data view 3118 can depict all aggregated data (e.g. a "grid" view 9602) including null return values, and/or an aggregated data view 3118 can depict only aggregated data having a value (e.g. a "wrap" view 9604). Additionally or alternatively, aggregated data views 3118 can be depicted separately (e.g. a separate tab of a document) for selection and review by the user 814, and/or previewed for the user 814 for selection of one or more aggregated view options.

Referencing FIGS. 132 and 133, a graphical user interface 9700 is depicted, provided to allow a user 814 to edit options for a table and/or for aggregated table views 3118 made utilizing a table. The example of FIG. 132 allows for convenient entry of the table name, column headings, formulas into the table and/or in metadata related to the table (e.g. to conditionally format the table). Additionally or alternatively, controls (e.g., see the portion of the description referencing FIGS. 14 and 21-23) may be added through a graphical user interface 9700, and/or manually on a document surface. Referencing FIG. 133, a partially completed graphical user interface 9700 is depicted. As elements are added to the table in the graphical user interface 9700, additional features for those elements are populated for reference and manipulation by the user 814. Additionally or alternatively, multiple views are selectable, with each having a configurable view of the table—for example differential sorting, filtering, formatting, and/or other features make up a view in certain embodiments. Accordingly, a user 814 can have multiple views of a table available, and/or a number of users can save distinct views.

Referencing FIG. 134, an example aggregated data view 3118 is depicted, having a number of associated data vales, with an average aggregation for the "Priority" column, and a sum aggregation for the "effort" column. Referencing FIG. 135, an example aggregated data view 3118 is depicted, having a grouping by the programmer name, sub-totals for each programmer's effort, a total for all programmer's efforts, sub-averages for each individual programmer's priority of tasks, and an average for all of the programmers' priority of tasks. Referencing FIG. 135, an alternate example aggregated data view 3118 is depicted, having sub-totals and sub-averages to the right side of the table, and totals and averages depicted in the right-side column at the bottom. Referencing FIG. 136, an aggregated data view 3118 includes aggregating by programmer and priority in a two-dimensional aggregation, and including the sub-totals and sub-averages to the right side of the table, and the totals and averages depicted in the right-side column at the bottom. Referencing FIG. 137, an aggregated data view 3118 includes aggregating by priority only, with programmers sorted within each priority grouping. Aggregations are depicted by total effort in each priority split, and totals and averages for all tasks at the right side of the final row.

Referencing FIG. 138, a three-dimensional grouping is depicted, having a horizontal grouping, a vertical grouping, and a shaded grouping depicted (e.g. where shaded members of a given color, shading type, or the like are related in a group). Accordingly, the user 814 can readily identify related members in a group by shading, and shaded aggregate values can be depicted that are relatable to the shaded members of the group. Referencing FIG. 139, an alternate view of a three-dimensional grouping is depicted, with shading marking the third grouping dimension, sub-totals for the third grouping dimension, and totals for the third grouping dimension.

Figure 32:
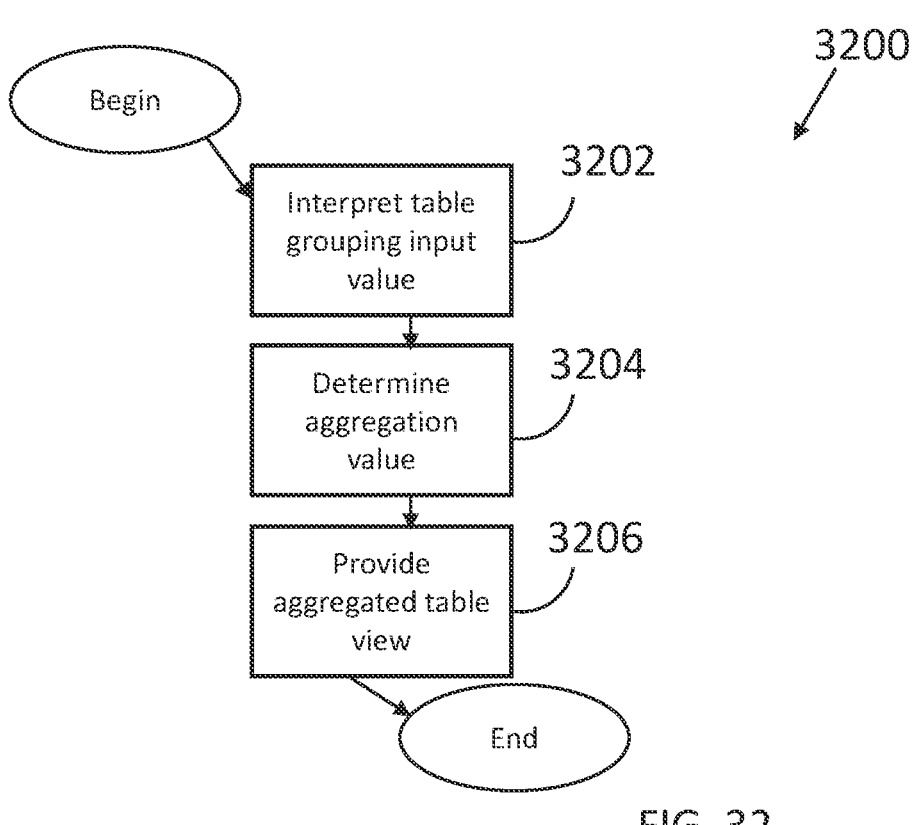
FIG. 32 is a schematic flow diagram of a procedure for providing an aggregated view.

Referencing FIG. 32, an example procedure 3200 for providing an aggregated table view is schematically depicted. The example procedure 3200 includes an operation 1002 to interpret a table grouping input value, where the table includes a number of categories and a number of associated data sets corresponding to the number of categories. The example procedure 3200 further includes an operation 3204 to determine an aggregation value in response to the table grouping input value, where the aggregation value corresponds to at least one of the number of categories, and an operation 3206 to provide an aggregated table view in response to the aggregation value.

Figure 33:
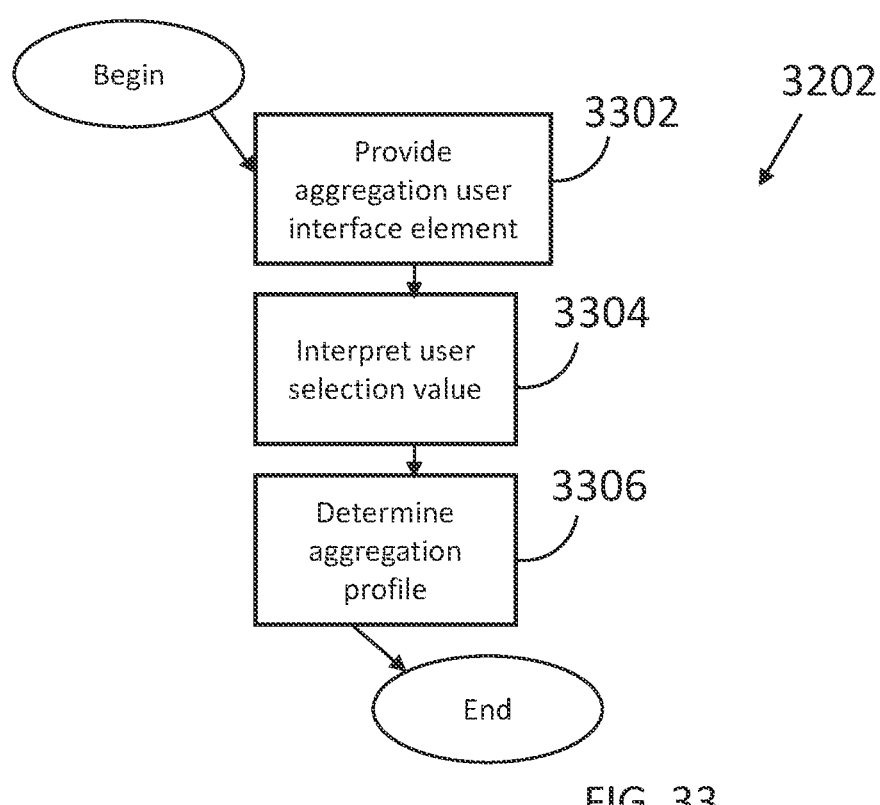
FIG. 33 is a schematic flow diagram of a procedure for providing an aggregation profile.

Referencing FIG. 33, an example procedure 3202 for determining an aggregation profile in response to the table grouping input value includes an operation 3302 to provide an aggregation user interface element to a user, an operation 3304 to interpret a user selection value in response to the aggregation user interface element, and an operation 3306 to determine the aggregation profile in response to the user selection value. An example procedure 3200 further includes the operation 3204 determining the aggregation value further in response to the aggregation profile.

An example aggregation profile includes at least one of the categories for aggregation, and/or an aggregation scheme for the number of associated data sets. Example and non-limiting aggregation schemes include: a qualitative aggregation of associated data sets according to at least one of the categories; a quantitative aggregation of associated data sets according to at least one of the categories; and/or binned aggregation of associated data sets according to at least one of the categories.

An example aggregation scheme includes a nested aggregation of associated data sets according to at least two of the categories. Example and non-limiting aggregation schemes include: an associated data set count according to at least one of the categories; a sum of associated data sets according to at least one of the categories; an average of associated data sets according to at least one of the categories; an applied function of associated data sets according to at least one of the categories; an applied formatting of associated data sets according to at least one of the categories; and/or combinations of any two or more of the foregoing.

Example and non-limiting aggregation user interface elements include: a dedicated aggregation input element; a table supercell; a table category heading; a toolbar interface element; a menu interface element; and/or a context triggered element. Example and non-limiting table input grouping values include: a user selection of a dedicated aggregation input element; a user drag operation to a table supercell; a user drag operation of a table supercell; a user drag operation including an element of a first table and an element of a second table; a user menu interface element selection; and/or a user selection of a context triggered element. An example operation 3202 to interpret a table grouping input value includes interpreting a user drag operation including at least two data values, where the operation 3206 to determine the aggregation value includes preserving original values for the at least two data values.

In certain embodiments, a procedure 3202 further includes an operation (not shown) to interpret a user data edit value corresponding to one of the plurality of associated data sets viewable in the aggregated table view, and updating at least one data value on the table in response to the user data edit value.

Figure 39:
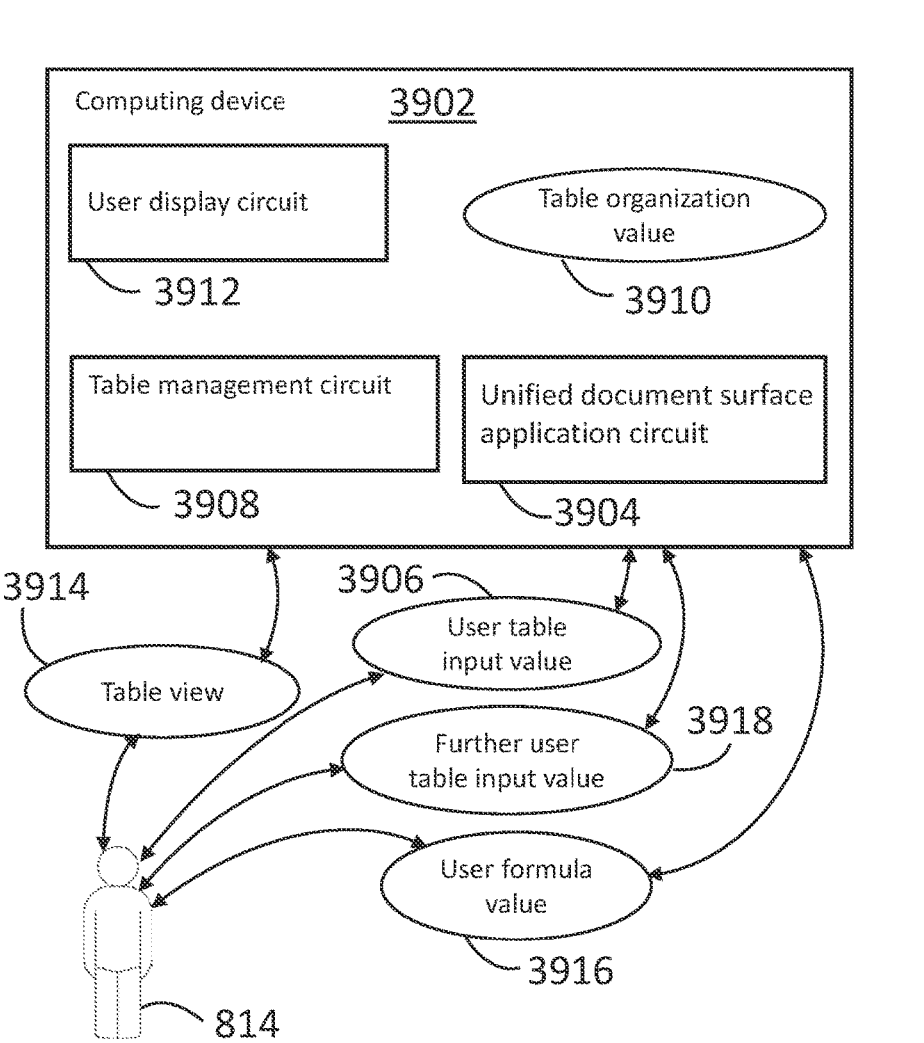
FIG. 39 is a schematic depiction of a system for organizing a table.

Referencing FIG. 39, an example system 3900 includes a computing device 3902 configured to manage tables, for example in a document for use in any system disclosed herein. An example computing device 3902 is a client computing device, for example in communication with a document server. The example computing device 3902 includes a unified document surface application circuit 3904 that interprets a user table input value 3906, where the user table input value 3906 includes a number of table data values. An example user table input value 3906 includes table data values placed on a unified document surface, whereby the user 814 creates a table in a document. The example computing device 3902 includes a table management circuit 3908 that determines a table organization value 3910 in response to the table data values. Example and non-limiting table organization values 3910 include: a column naming scheme; a sorting scheme; a filtering scheme; an aggregation scheme; and/or a formatting scheme. Accordingly, the table management circuit 3908 provides for an automatic table creation from user entry of data values, and provides for a powerful interface for the user 814 to manipulate the information on the table without excessive coding operations, organization, and/or manual entry. The example computing device 3902 further includes a user display circuit 3912 that provides a table view 3914 in response to the table organization value 3910. For example, the table management circuit 3908 arranges the data of the table within the document according to the table organization value 3910, and the user display circuit 3912 provides a table view 3914 of a portion of the table currently being accessed by the user 814, include all, a portion, or none of the table depending upon the specific user operations.

The example system 3900 further includes the unified document surface application circuit 3904 further interpreting a user formula value 3916, where the user formula value 3916 does not include a row reference. The provision of allowing a user formula value 3916 without a row reference allows the user to quickly and accurately provide formulaic output on the table, without manually creating references to specific cells, and/or breaking references when editing the table. An example the table management circuit 3908 further updates the table organization value 3910 in response to the user formula value 3916, and the user display circuit 3912 further updates the table view 3914 in response to the table organization value. An example table management circuit 3908 updates the table organization value 3910 by applying the user formula value 3916 to an entire column of the table—for example, a user 814 enters a formula of "^2", and the table management circuit 3908 provides for an entire column of data that is squared relative to the prior condition before the application of the user formula value 3916. In certain embodiments, the table organization value 3910 provides for the insertion, naming, and/or specific placement of a result column in response to the user formula value 3916 and the applied column of data. Additionally or alternatively, the table organization value 3910 applies the formula "in place", replacing the viewed or actual results of the column with the results of the formula (e.g. updating the values to the formula result values, and/or displaying the result values as visible results while the underlying column values remain the same). Previously known systems do not provide for updates of an entire column of data with a single operation such as entering a user formula value 3916, and/or require numerous manual steps to enable column-wise changing of table values. Further, previously known systems require a similar spatial relationship between the calculated values and the base values to which a formula is applied. Accordingly, previously known systems provide for additional manual steps to create and present the data, and allow for the breaking of the data where a column is moved, a member of the column is deleted, and the like.

An example table management circuit 3908 further selects the entire column of the table in response to an operation such as: a drag-and-drop operation of the user formula value to the column (and/or the column heading to the user formula value); a user formula entry tool selection, where the formula entry tool comprises a graphical user interface associated with the column; and/or a formula value referencing the column. Accordingly, the user 814 can create the formula in a convenient place on the document (e.g. on a canvas near the table, in clearly visible white space within the document, etc.), and simply drag the formula to the desired column, or the column header to the formula, and apply the formula to the entire column in a single operation. Additionally or alternatively, the table management circuit 3908 provides for the addition of a result column, rapidly providing desired output data in a format to be copied, linked, and/or extracted. Additionally or alternatively, operations of the system 3900, including the table management circuit 3908, are provided to an operation log (e.g., the local operation log 116—see the portion referencing FIG. 1). The operation log records operations performed in a non-ambiguous manner such that, if the operation of the operation log are performed, and/or added to a snapshot and/or original operation log existing when the user opens the document, and/or an updated operation log provided while the user had the document opened, a document consistent with the document as edited by the user would be created. Example operations captured on the operation log include the creation of objects (e.g., tables, graphs, charts, and/or text flows), changes to objects (e.g., insertion or deletion of text, columns, formulas, etc.), the deletion or movement of objects, and identification of objects for any of the foregoing. Identification of an object includes any identification method that provides for unique placement of the operations within the document, for example edits to a column can be captured by reference to a unique column name, by reference to a column name within a unique table name, by reference to a unique column/table name, or any other options to uniquely identify operations for the operation log.

An example system 3900 includes the table management circuit 3908 further selecting the entire column of the table in response to a formula value referencing the column—for example with the bracket inclusion of a column name within the formula. The inclusion of a column within a formula value referencing the column provides for a convenient operation to provide output data from a table, with a desired formula applied, in any selected position within the document. An example table is positioned on a canvas (see the portion referencing FIG. 97), and where the formula value is positioned on the canvas separate from the table.

An example table management circuit 3908 further disambiguates between two columns having an identical display name. For example, columns having a repeating monthly sequence, and named by month, may have two "January" columns separated by 12 columns. In certain embodiments, the table management circuit 3908 disambiguates column names by: providing a private key for each column, wherein the private key may be displayed to the user 814 or not; selecting a column that has the closest proximity to a current user position in the document; selecting a column that has the closest proximity in time to a last edit by the user 814 or a different user; and/or disambiguates the column according to a data type in the formula, and a most compatible column for the data type in the formula. Additionally or alternatively, the table management circuit 3908 provides the user 814 with options among matching column headings to allow the user to select the correct column. In certain embodiments, the computing device 3902 enforces unique column naming among tables in the document.

An example table organization value 3910 includes a sorting scheme, where the unified document surface application circuit 3904 further interprets a further user table input value 3918, and the table management circuit 3908 further updates the sorting scheme in response to the further user table input value 3918. Accordingly, in certain embodiments, a sorting scheme is applied to create live table data that sorts automatically as the user 814 enters data. In certain embodiments, the table view 3914 may be centered, fixed, or have a reduced movement rate on the document, such that re-sorting during user 814 entry operations does not confuse or disorient the user. An example table management circuit further updates the sorting scheme by performing an operation such as: continuously updating the sorting scheme as the user provides the further user table input value; updating the sorting scheme in response to the user selecting a different row of the table; and updating the sorting scheme in response to the user completing a data value entry on the table. Accordingly, sort operations may occur when the user exits a particular cell and/or changes focus from a particular cell, updates when the user exits a particular row (e.g., allowing the user to fully enter a row of data before sorting operations, and/or completes a data entry within a cell (e.g., upon hitting a "TAB", "ENTER", clicking another cell, or performing a similar operation).

An example table organization value 3910 includes a filtering scheme, where the unified document surface application circuit 3904 further interprets a further user table input value 3918, and the table management circuit 3908 further updates the filtering scheme in response to the further user table input value 3918. Accordingly, in certain embodiments, a filtering scheme is applied to create live table data that sorts automatically as the user 814 enters data. In certain embodiments, the table view 3914 may be centered, fixed, or have a reduced movement rate on the document, such that re-filtering during user 814 entry operations does not confuse or disorient the user. An example table management circuit further updates the filtering scheme by performing an operation such as: continuously updating the filtering scheme as the user provides the further user table input value; updating the filtering scheme in response to the user selecting a different row of the table; and updating the filtering scheme in response to the user completing a data value entry on the table. Accordingly, sort operations may occur when the user exits a particular cell and/or changes focus from a particular cell, updates when the user exits a particular row (e.g., allowing the user to fully enter a row of data before filtering operations), and/or updates when the user completes a data entry within a cell.

Figure 41:
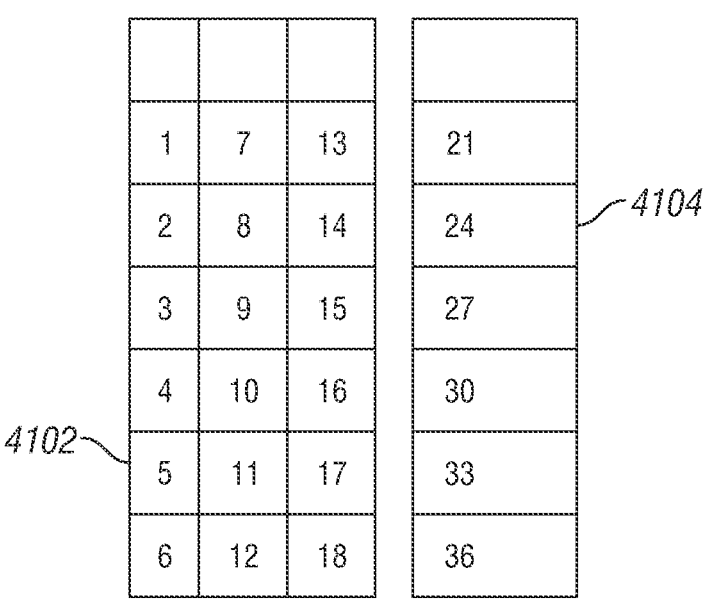
FIG. 41 is a schematic data illustration.
Figure 42:
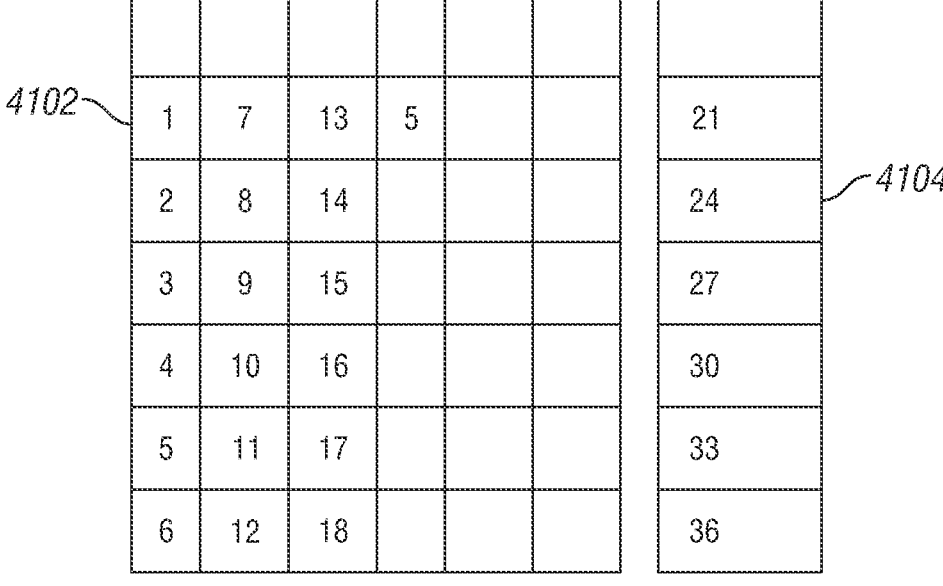
FIG. 42 is a schematic data illustration.

An example table organization value 3910 includes the aggregation scheme, where the unified document surface application circuit 3904 further interprets a further user table input value 3918 including a dragging operation to add columns (e.g., extending a table to the right, where the unified document surface application circuit 3904 adds columns in response to the dragging operation), and where the table management circuit 3908 further structured updates the aggregation scheme in response to the dragging operation. Referencing FIG. 41, a table 4102 and aggregation set 4104 (e.g. a sum of the rows for each column in the example) is depicted before a dragging operation, and referencing FIG. 42, the table 4102 and aggregation set 4104 is depicted after the dragging operation, with a user entered value depicted to illustrate that the aggregation set 4104 has included the added rows. The aggregation set 4104 is depicted slightly offset from the other columns in the table 4102, although the aggregation set 4104 may be positioned anywhere, and/or formatted the same or distinctly from the rest of the table 4102. The operations depicted in FIGS. 41 and 42 are consistent with operations to protect data values in response to drag-and-drop operations, and to relate data values and tables in a sensible manner in response to drag-and-drop operations, as described in systems throughout the present disclosure. Previously known systems overwrite data in response to a drag-and-drop of table columns over another table column, and/or disallow such operations. An example table management circuit 3908 further names the added columns—for example using a default naming scheme (e.g. Column4, Column5, etc.), utilizing a name determined according to semantic data in the column (e.g. a most frequent occurring value, a data type, a category represented in the data such as "football teams," "company", "engineer," "address", or the like).

Figure 40:
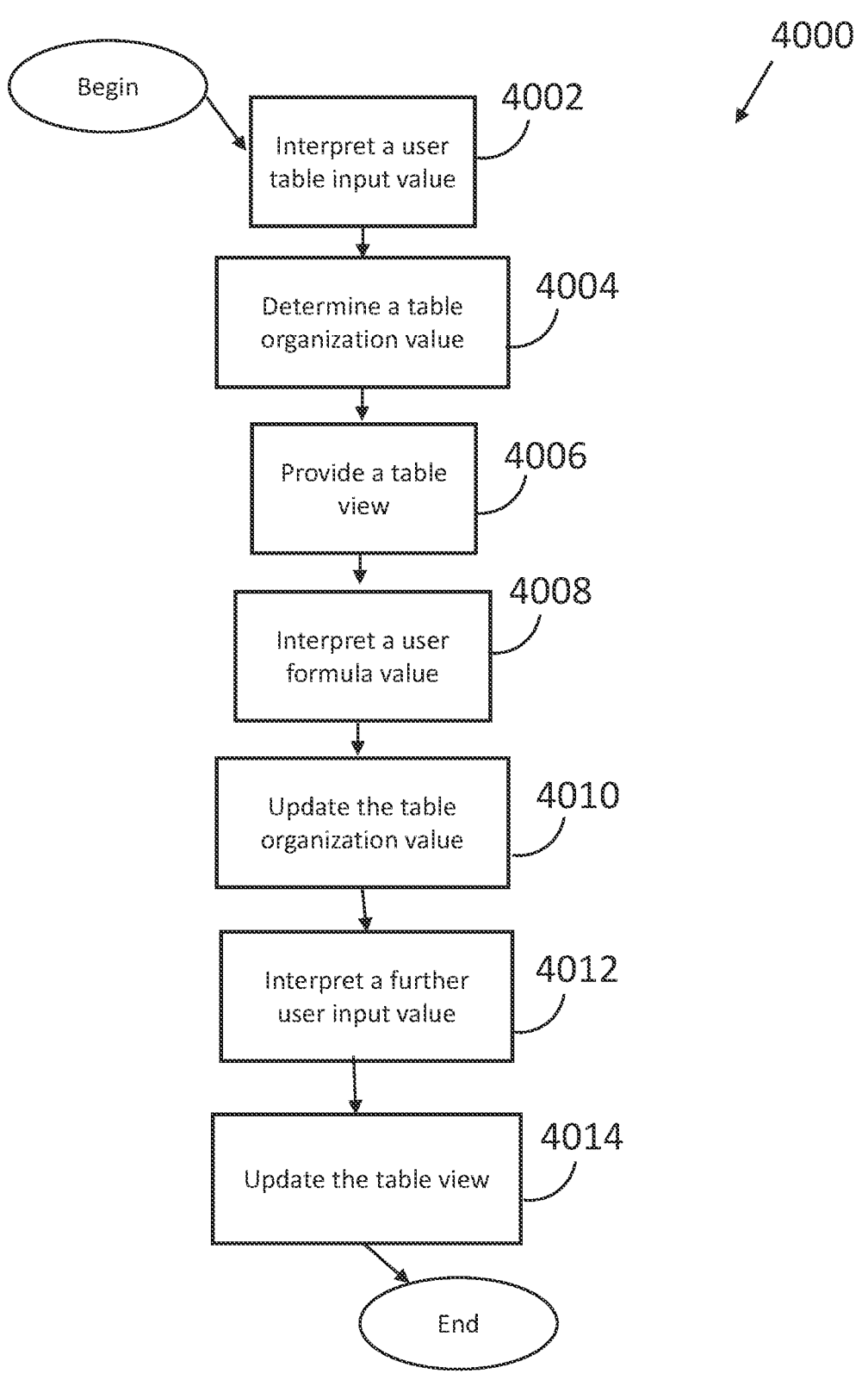
FIG. 40 is a schematic flow diagram of a procedure for updating a table.

Referencing FIG. 40, an example procedure 4000 includes an operation 4002 to interpret a user table input value, the user table input value including a number of table data values, and an operation 4004 to determine a table organization value in response to the table data values, where the table organization value includes at least one value such as: a column naming scheme; a sorting scheme; a filtering scheme; an aggregation scheme; and/or a formatting scheme. The example procedure 4000 further includes an operation 4006 to provide a table view in response to the table organization value. An example procedure, in certain embodiments, further includes an operation 4008 to interpret a user formula value, where the user formula value does not include a row reference, and an operation 4010 to update the table organization value in response to the user formula value, and an operation 4014 to update the table view in response to the table organization value. An example operation 4010 includes updating the table organization value by applying the user formula value to an entire column of the table. An example operation to select the entire column of the table includes an operation such as: a drag-and-drop operation of the user formula value to the column; a user formula entry tool selection, where the formula entry tool includes a graphical user interface associated with the column; and/or a formula value referencing the column. An example procedure includes an operation to select the entire column of the table in response to a formula value referencing the column, where the table is positioned on a canvas, and where the formula value is positioned on the canvas separate from the table. An example procedure further includes an operation to disambiguate between two columns having an identical display name.

An example table organization value includes the sorting scheme, where the procedure further includes an operation 4012 to interpret a further user table input value, and an operation 4014 to update the sorting scheme (e.g. update the table organization value) in response to the further user table input value. An example procedure 4000 includes the operation 4014 including at least one operation such as: continuously updating the sorting scheme as the user provides the further user table input value; updating the sorting scheme in response to the user selecting a different row of the table; and/or updating the sorting scheme in response to the user completing a data value entry on the table. For example, referencing FIG. 130, a sorted column of data is depicted, where sorting of the data is controllable by the user 814, for example utilizing a sorting tool interface 13002 to indicate desired sorting parameters. The sorting of the column of data can be implemented to be continuous, instant, periodic, upon user request, after entering data, and/or according to any other principles described herein.

An example table organization value includes the filtering scheme, where the procedure further includes an operation 4012 to interpret a further user table input value, and an operation 4014 to update the filtering scheme (e.g. update the table organization value) in response to the further user table input value. An example procedure 4000 includes the operation 4014 including at least one operation such as: continuously updating the filtering scheme as the user provides the further user table input value; updating the filtering scheme in response to the user selecting a different row of the table; and/or updating the filtering scheme in response to the user completing a data value entry on the table. An example table organization value includes the aggregation scheme, where the procedure 4000 further includes an operation 4012 to interpret a further user table input value including a dragging operation to add columns, and updating the aggregation scheme in response to the dragging operation. An example procedure further includes an operation to name the added columns.

Referencing FIGS. 129 and 101-104, example table layouts 12900 are schematically depicted. The example table layout 12900 includes a table title 12902 (e.g., "Table1"), which may be a display title, and a table may additionally or alternatively have a referencing title (e.g., used in formulas referencing the table). The example layout 12900 further includes a number of column headings (in certain embodiments-"categories") 12904, and a context tool user interface 12908. In the example of FIG. 129, the context tool user interface 12908 is illustrating, for example, a filtering operation. In certain embodiments, the context tool user interface 12908 provides for ease of accessing a menu, certain operations (e.g. filter, aggregate, format, etc.), and/or operations including the whole table or just portions of the table. A given set of data in a single column 12910 or category includes all row information. In this example, the table and each of its five columns have been given default names, "Column 1," "Column 2," and so forth. The rows are not named by the user at this stage, although rows may remain unnamed, or have a name. A user may change the table name, column name, row name, and may also add or delete any number of columns or rows to or from the table. The convention of "rows" and "columns" herein is for purposes of illustration. In certain embodiments, data categories may be organized in columns (e.g. as in the illustration of FIG. 129) or in rows (e.g. transposed from FIG. 129) without changing the principles of operation of the present disclosure, and any such embodiments are contemplated herein. For example, referencing FIG. 140, example data categories are depicted column-wise 14002, or row-wise 14004.

The example system provides for tables and related table functionality of the present disclosure such that users have the ability to organize data in a two-dimensional layout of rows and columns. An example includes each table and/or object in a document having a unique name, allowing users to reference the table and its data elsewhere in the document. Certain embodiments described throughout the present disclosure include the ability to reference tables, data, and/or other objects without unique names and/or with only locally unique names. In embodiments, tables are provided to allow users to name and refer to columns within the table, to filter rows based on custom formula rules, to sort rows based on column values, and construct formulas that apply to full columns of data, as described herein. The set of unique column names may form a schema for a table and its data. Each row in the table may then map to this schema. According the embodiments of the present disclosure, tables can be provided with a fixed naming scheme (e.g. A1, B1, C1 representing the first three elements of the first row) and/or provided without a fixed naming scheme. An example embodiment includes allowing a user to reference only a single value—such as a column heading, name, and/or key—and thereby perform: formulaic operations, sorting, filtering, and/or formatting, on every row element of the column. In certain embodiments, the naming scheme (e.g., absolute, fixed, referential, etc.) is selectable, and/or set according to rules (e.g., user defined rules, administrator defined rules, and/or rules defined in a template). In certain embodiments, a first naming scheme is utilized for a first table or type of table, and a second naming scheme is utilized for a second table or type of table. In certain embodiments, a distinct document section may have, or be allowed to have, distinct naming schemes for tables and/or objects therein. One of skill in the art, having the benefit of the disclosure herein, can readily determine a naming scheme for tables or objects, including whether multiple naming schemes are supported in a given system, and/or a level of user and/or administrator control provided over naming schemes. Certain considerations for selecting a naming scheme include: the desired ease of referencing columns versus directing operations to individual cells; formula language consequences to naming schemes; the desired level of handling (e.g., including at least design time capability for designing and implementing a highly capable versus lower capability table management circuit, processing power available, communication speed and bandwidth available, etc.); and the types of documents and operations that users are likely to be working with.

Referring to FIG. 105, in an example, a table may contain a row for each element in a category, such as each Major League Baseball team. Each row may include the team name, the team's league, the team's division, the number of wins and losses for each team in 2014, or some other type of data. In the Filter Bar in the top right of the table shown, the data may be filtered to only include those rows that satisfy a formula, such as, in the example of FIG. 131:

League="American" && Division="East"

As shown, this may cause all other rows to be hidden from view. If the formula is cleared from the Filter Bar, the rows for all teams may again become visible. If a row were added that did not meet the filtering criteria, it may be filtered from view according to the selected updating scheme for the table.

Figures 106, 108:
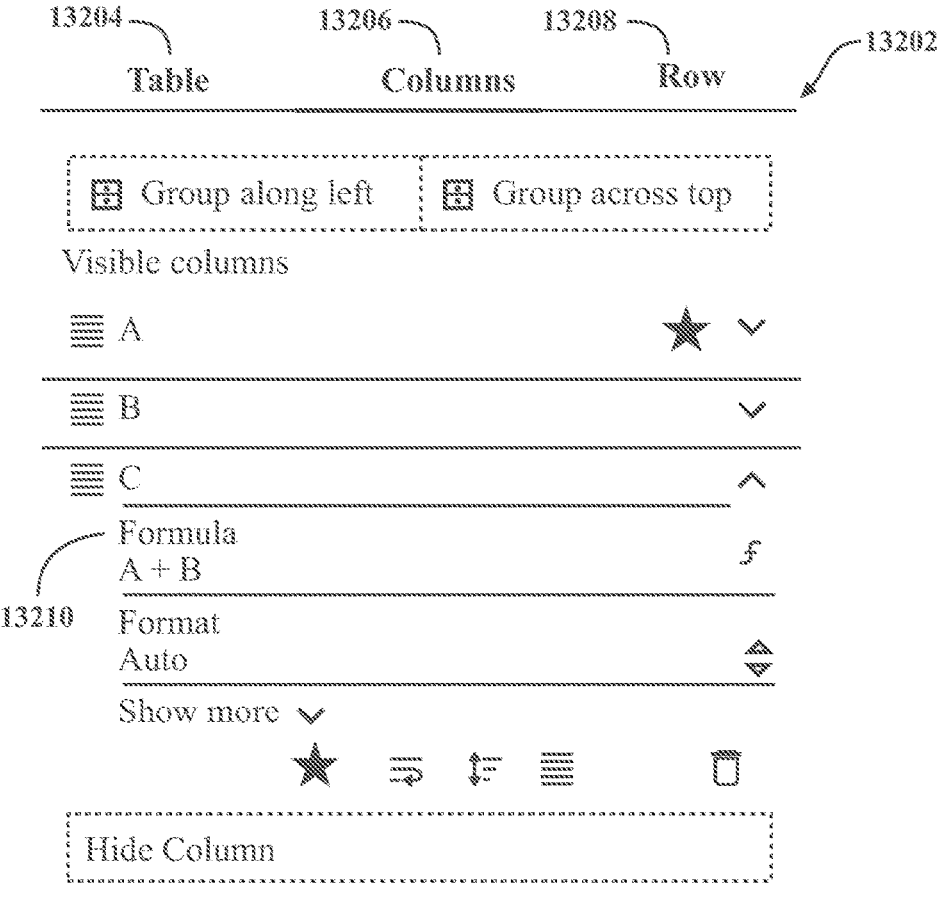
FIG. 106 is a schematic data illustration.
FIG. 108 is a schematic data illustration

Referring FIG. 106, column C of the table depicted is a calculated column. The formula for the calculation may be added using a selectable user interface 13202 functionality under the Column tab, for example by selecting a user interface icon associated with the column, such as a tab format where a first tab 13204 depicts the table, a second tab 13206 provides column control interface options, and a row tab 13208 provides row control interface options. The tabs 13204, 13206, 13208 may be termed an "Inspector" function, or have any other naming or referencing convention. For example, within the tab functionality, column calculations may allow users to reference data based on, for example, the column names. The calculation may apply across the entire column. In the example depicted in FIG. 132, the formula 13210 for output of column C is a simple [A+B], which means that for each row in the table, the value of column C will be equal to the sum of the values in column A and column B for that same row. Any other type of formula and/or reference values may be applied to a column output. Referring to FIG. 108, tables with a unique, column-focused structure, may be continuously or otherwise evaluated and/or updated using sorting and filtering, and a column-centric approach to table formulas may present the analytic results as depicted in FIG. 108.

In embodiments, referencing data in tables may be based on semantically meaningful field names (e.g., column names), as opposed to grid coordinates. In certain embodiments, sorting and filtering functionality, as described herein, may be continuously re-evaluated as new data is added, so that there is no need to, for example, push a button to initiate and re-apply a filter or sort after new content is added. Column-based formulas may allow users to use other column names as input to the formula, so that it doesn't matter or impact formula calculations if the columns are moved, as the formulae will not "break," but will rather retain their column, or other references that are needed to successfully apply the formulae.

An example system 3900 includes referencing data in tables utilizing a column indicator only without a row reference—for example where a formula applies a column calculation and individual row references are not needed by the user 814 to access each row. Example column indicators include a semantically meaningful name for the column, an arbitrary name for the column (e.g., "Column1"), and/or an identification number for the column (e.g., a primary key). An example system 3900 allows the user 814 to reference a column by utilizing the column name, such as [AnnualSales] in a formula, for example where column names are enforced to be unique either globally, locally, or at a selected scope (e.g., within a document section, page, canvas, tab, or other hierarchical element of the document). In certain embodiments, the user 814 references the column name with a name that is not unique, but is understood in context (e.g., selecting a closest one of the columns named "Column1" to the user location in the document). In certain embodiments, the user 814 utilizes only a column name in a formula, and the system 3900 utilizes the column name as a display mask for the user, but assigns a primary key in metadata which may be selectively visible to the user 814 or invisible to the user. In certain embodiments, the system 3900 assigns a primary key in response to a user interaction such as moving a column or table from a first location in the document to a second location in the document (e.g., creating an ambiguity where a second "Column1" may be present in the new location), and/or in response to a user interaction creating or moving another object into a location within the document that creates an ambiguity with the column name for the column or table that has not moved.

In certain embodiments, the system 3900 disambiguates a reference, such as a column name or table name, by presenting the user 814 with options when a potentially ambiguous reference is entered, and/or by presenting the user 814 with additional information for one or more options (e.g., displaying an otherwise hidden primary key, displaying offset data such as neighboring column names, a few rows of information, and/or a table name).

In certain embodiments, the column name and/or primary key for a column are stored in the operation log. In certain embodiments, display parameters for the user 814 are marked in the operation log, for example where the user is working with a column name, and the system 3900 is using the column name as a mask for user display but operating calculations from the primary key or other unique identifier. The utilization of masks for user convenience, and additional metadata for disambiguation or enforced uniqueness, may be applicable to any object in the document, including at least table names, column names, row names, graphs, charts, controls, and/or any elements or properties of any of the foregoing.

Additionally or alternatively, the utilization of masks and/or additional metadata may be applicable to formula entries, where the formula observed and edited by the user may be a mask of the formula, and metadata, primary keys, and/or hierarchical disambiguation names are used by an underlying calculation engine. For example, a user 814 may enter [EmployeeList] in a formula for the table named "EmployeeList", where the hierarchical disambiguation name [FullDocument]. [Canvas1]. [EmployeeList] is used by the underlying calculation engine. Any formulas, object references, and/or object names (e.g., for display to the user 814) may be stored in the operation log, and/or be associated in the operation log with corresponding disambiguation information, metadata, primary keys, and/or hierarchical disambiguation names.

In certain embodiments, a move or changing of a formulas, object references, and/or object name that results in a change of the mask information displayed to the user 814 may result in: no change; a corresponding change; and/or a distinct change separate from the mask information change; in the corresponding disambiguation information, metadata, primary keys, and/or hierarchical disambiguation names. An example operation log stores the mask information and the disambiguation information, including the changes to the mask information and the disambiguation information. A further example operation log stores only the updated mask information and/or disambiguation information—for example in response to a snapshot event.

Figures 102, 103:
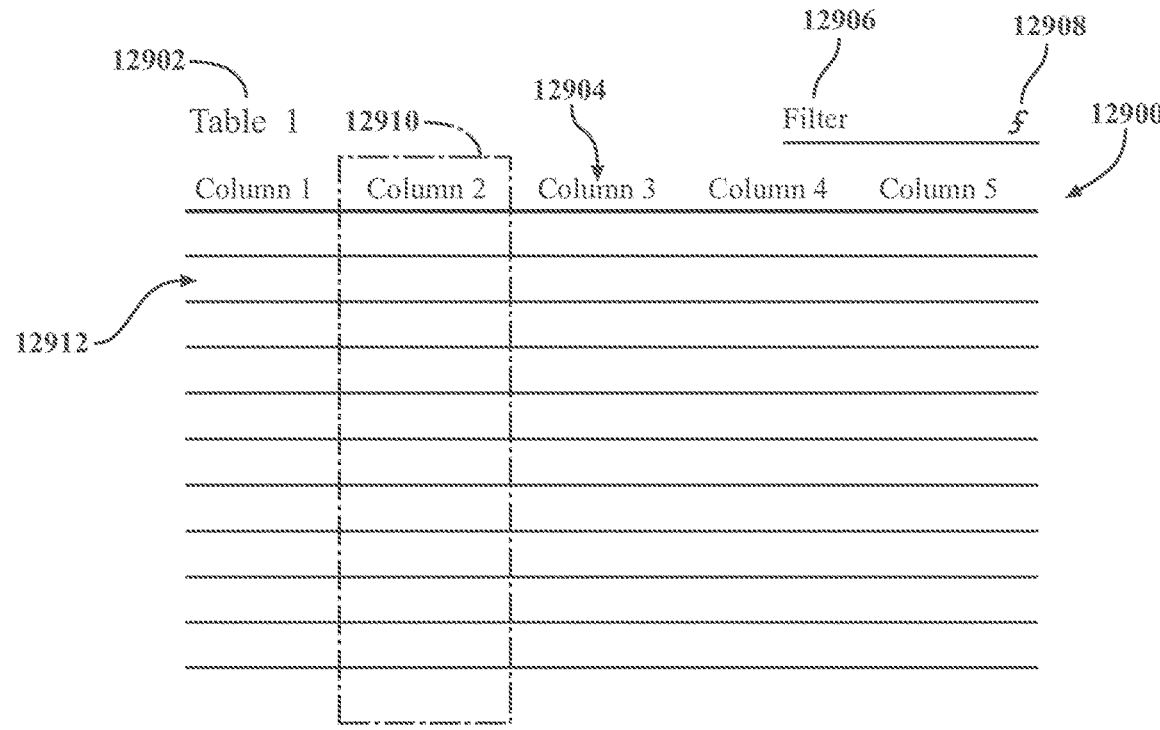
FIG. 102 is a schematic data illustration.
FIG. 103 is a schematic data illustration.

Referencing FIG. 100, example and non-limiting reference models for table elements are depicted. The reference model utilized in a particular embodiment may be applied as a default, selectable by a user or administrator, and/or applied according to rules such as user-defined rules, administrator-defined rules, and/or rules applied according to a template. Referring to the examples depicted in FIG. 100, a driver model may be constructed in each case. In the example of FIG. 100, a "mask" represents a value shown to the user, where the underlying ID for the reference may be another value. The example Notations in FIG. 100 are consistent with the example table depicted in FIG. 102. Referencing FIG. 102, a model may be created that calculates the number of shoes a company has based on how many people work there. It may utilize a driver variable table, rolling geometric references, and absolute and non-geometric references. FIGS. 102 and 124 further depict aggregation sets 4104, in the examples set off to the right of the table values.

Figure 101:
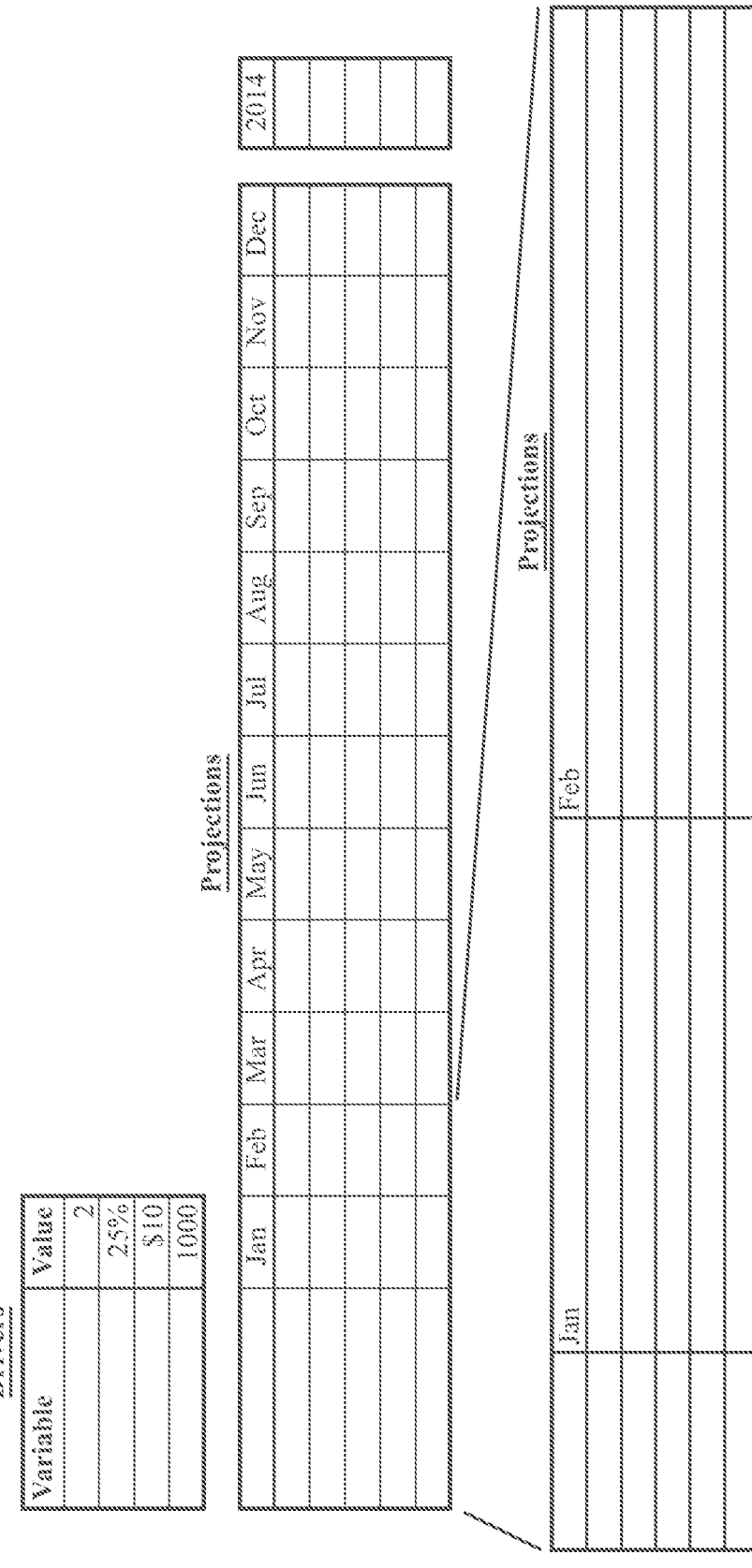
FIG. 101 is a schematic data illustration.

In embodiments, building a driver model spreadsheet with the limitations of formulas only possible in rows or columns and using absolute references only may be overly restrictive, partially due to the fact that a spreadsheet may fail when a user tries to extend the headcount growth formula to multiple columns or months. Independent tables or grids may have to be setup, for example as depicted in FIG. 125, for each month as a user would need cell-specific formulas. The user may build a similar model, but with separate grids for every column creating the effect of cell-specific formulas, as in FIG. 125. Accordingly, in certain embodiments, a non-absolute referencing scheme for a table may be selected and/or applied. Shifting the formulas to cells vs rows and columns may alleviate some of the problems found in the formulas-in-a-row example for a spreadsheet like this, having separate grids for heterogeneous row/column formula types is unnecessary. However, absolute references may also be used. If absolute references don't have the ability to simulate geo-shift during a user dragging table content (e.g., be able to lookup the next month in the sequence before absolutely resolving the formula for the cell), then creating this example spreadsheet would be manual, as shown in FIG. 101.

In embodiments, moving from a purely "absolute" reference model to one that allows for relative lookups (e.g., based on some a unique key) may run into similar problems described in the "drag example" above. In certain embodiments, unique keys are applied globally throughout a document (e.g. each table, row, and column has an enforced unique reference name or primary key). In certain embodiments, uniqueness is enforced locally-such as within a canvas, document section, and/or sheet. In certain embodiments, uniqueness is enforced when a competing reference name is created—for example a primary key is generated when duplicate names are created. The primary key may be depicted to the user 814, or masked and duplicates prompted to the user for selection when the user 814 enters a potentially ambiguous reference (e.g. the "duplicate" is the mask, not the primary key). An example depicting primary row keys to the user 814 is illustrated in FIG. 102, where the primary row key is the "ID" field of the "Employee" table.

Figure 46:
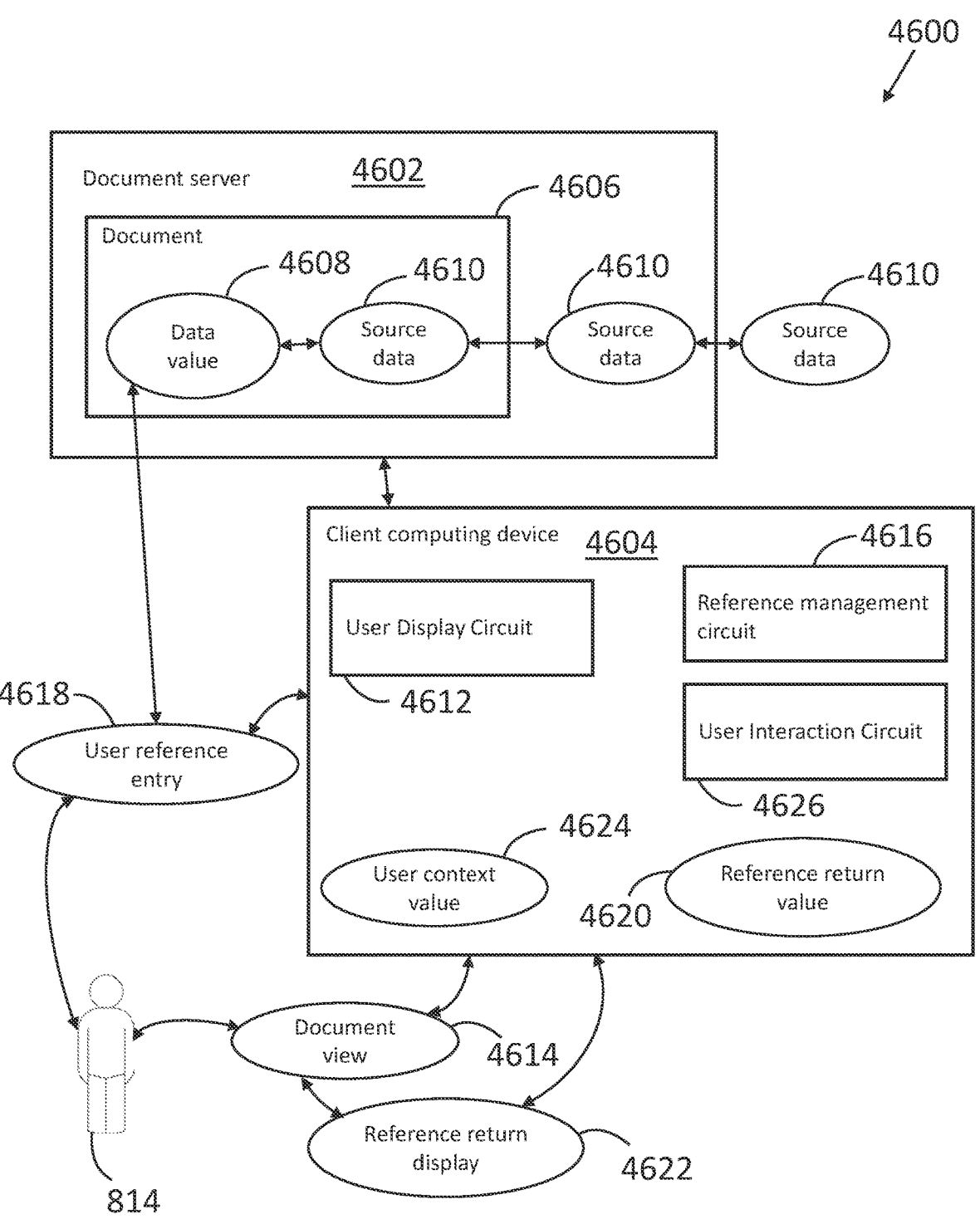
FIG. 46 is a schematic depiction of a system for providing a reference return.

Referencing FIG. 46, a system 4600 includes (e.g., a document server) communicatively coupled to a second computing device 4604 (e.g., a client computing device), where the first computing device 4602 includes a document server that communicates a data value 4608 to the second computing device 4604, where the data value 4608 includes at least a portion of a document 4606. The example second computing device 4604 includes a user interaction circuit 4626 that interprets a user reference entry 4618. A user reference entry 4618 may be any value indicating that a user 814 is entering a data or object reference, such as a table column name in a formula present in the document 4606 and/or data value 4608. The second computing device 4604 further includes a reference management circuit 4616 that determines a reference return value 4620 in response to the user reference entry 4618. For example, and without limitation, a reference return value 4620 includes an object name, an object property, an object method, a data value, a pointer to external data (e.g. source data 4610), and/or any other referenceable object within the document 4606 and/or source data 4610. External data, as utilized herein, includes without limitation: data positioned outside the first computing device 4602 and second computing device 4604, such as source data 4610; data positioned on the first computing device 4602 but outside the document 4606; data positioned within the document 4606 at a distinct location from the user accessed portion of the document 4606 (e.g., a different document section, canvas, page, table, etc.); and/or data positioned at a different location than a current user focus area (e.g., a column heading for a table, where the user 814 is providing a formula for the column table, and wherein the column heading data is outside the scope of the entry field and/or text for the formula, including in certain embodiments where the formula is entered directly onto the table). The description herein referencing data further includes, without limitation: data per se (e.g., text flow entries, values in a table, etc.); object names; object properties; object mask names (e.g., a display name that may differ from an object primary key or reference name); names or values for pointers, references, and/or links; references to API interfaces and/or source data 4610 sources (e.g., a URL, library call, etc.); and/or metadata (which may be hidden, displayed, and/or selectively displayed). A user reference entry 4618 may be a partial entry (e.g., a first character or characters of an object name, etc.), where the reference management circuit 4616 further determines the reference return value

4620 in response to the partial entry, and/or updates the reference return value 4620 in response to further additions to the user reference entry 4618 (e.g., providing a narrowing list of reference return values 4620 as a user 814 types in a user reference entry 4618).

The example second computing device 4604 further includes a user display circuit 4612 that determines a document view 4614 in response to the reference return value 4620, and provides the document view 4614 to the user 814. Example and non-limiting user reference entries 4618 include a formula entry value, a reference request value (e.g., the user 814 enters a character sequence, menu or toolbar selection, and/or utility selection indicating that a reference entry is being made), and/or a keyword request value (e.g. a formula entry by the user 814 interprets the user 814 entries as a reference, and the reference management circuit 4616 searches the document object model, document 4606, data value 4608, and/or source data 4610 for matching or relevant keywords to determine the reference return value 4620).

An example system 4600 includes the reference return value 4620 being a value such as: a table column name value; an object primary key value; an object name value; a mask value including an object name value for display and a primary key value; a scope selection value; and a list of any one or more of the foregoing. As utilized herein, a primary key value includes, without limitation, any value with enforced uniqueness within the document 4606 and/or a selected scope of the document 4606 (e.g., a section, sheet, canvas, etc.), and includes either a field enforced to be unique (e.g., a column name), a group of fields enforced to be unique according to a combination of the fields (e.g., a column name combined with a table name), and/or a reference identification value (e.g., auto-generated by the system 4600 and/or entered or edited by the user 814). A mask value as utilized herein includes, without limitation, any value configured for display to the user 814, wherein an additional value not ordinarily displayed to the user 814 forms a part of or all of the masked value for certain purposes and operations. For example, a mask value including an object name value for display and a primary key value includes, in certain embodiments, a display name for a data value and a primary key value that may include all or a part of the mask value, and/or may be separate entirely from the mask value. In certain embodiments, the user 814 may selectively display the mask value and/or primary key value, and/or the mask value and/or primary key value may be automatically displayed to the user contextually (e.g., in disambiguation operations, in certain views of the document 4606 activated by the user 814 such as a metadata view).

An example user reference entry 4618 includes a reference to a source data 4610 including an external source, where the reference management circuit 4616 further updates a reference parameter in response to a change in the external source. A reference parameter includes, without limitation, a referencing syntax (e.g. a table name, a column name, a pointer definition, etc.). Accordingly, in certain embodiments, where a pointer or reference location changes outside of the scope of the first computing device 4602, the document 4606, and/or the data value 4608, the reference, link, and/or pointer utilized by the user 814 is automatically updated and does not "break". An example reference management circuit 4616 updates a reference parameter by polling an external source, for example re-fetching reference data periodically and/or at selected times, and reconciling changes in the external source with locally stored data. An example reference management circuit 4616 updates a reference parameter by being responsive to a push data update from the external source—for example the external source calls in to the reference management circuit 4616 (e.g., utilizing an HTTP webhook request), and the reference management circuit 4616 reconciles changes in the external source received from the push with the locally stored data. In certain embodiments, a reference management circuit 4616 utilizes both a polling operation and a push notification.

An example system 4600 further includes the reference management circuit 4616 further determining a reference ambiguity condition, where the reference return value 4620 includes a disambiguation value. For example, a user reference entry 4618 may not uniquely define a desired reference, link, and/or pointer, either due to a lack of unique naming of available reference objects (e.g., a table column), because the user reference entry 4618 is presently a partial entry (e.g., a first character or characters of the entry), and/or because the reference management circuit 4616 determines the user 814 intended reference is not yet clear (e.g., a number of mask values match or are close to the user reference entry 4618, even where an underlying primary key value for each is unique, where the user 814 may have misspelled an entry and the intended reference is not clear, and/or where the user 814 is intending a semantic entry and relying on the reference management circuit 4616 to suggest possible matches for the entry). In a further example, the reference return value 4620 further includes a number of disambiguation values (e.g., a number of suggested reference entries, ancillary matches such as related websites, tables, and/or external data, etc.), and the example user display circuit 4612 further determines the document view 4614 further in response to the plurality of disambiguation values. An example user display circuit 4612 displays a first number (e.g., between 1 and 10, between 2 and 5, and/or between 3 and 15) of disambiguation values, for example as suggestions to the user, in a list or menu, within the document view 4614. Additionally or alternatively, the user display circuit 4612 orders the number of disambiguation values by a selected priority and/or relevance, provides a preview of one or more of the disambiguation values, and/or indicates that additional disambiguation values beyond those displayed are available. An example reference return value 4620 includes an object name, an object method, an object property, and/or a dereferencing option value (e.g., allowing the user 814 to return the data at the reference location rather than the reference value).

Figure 47:
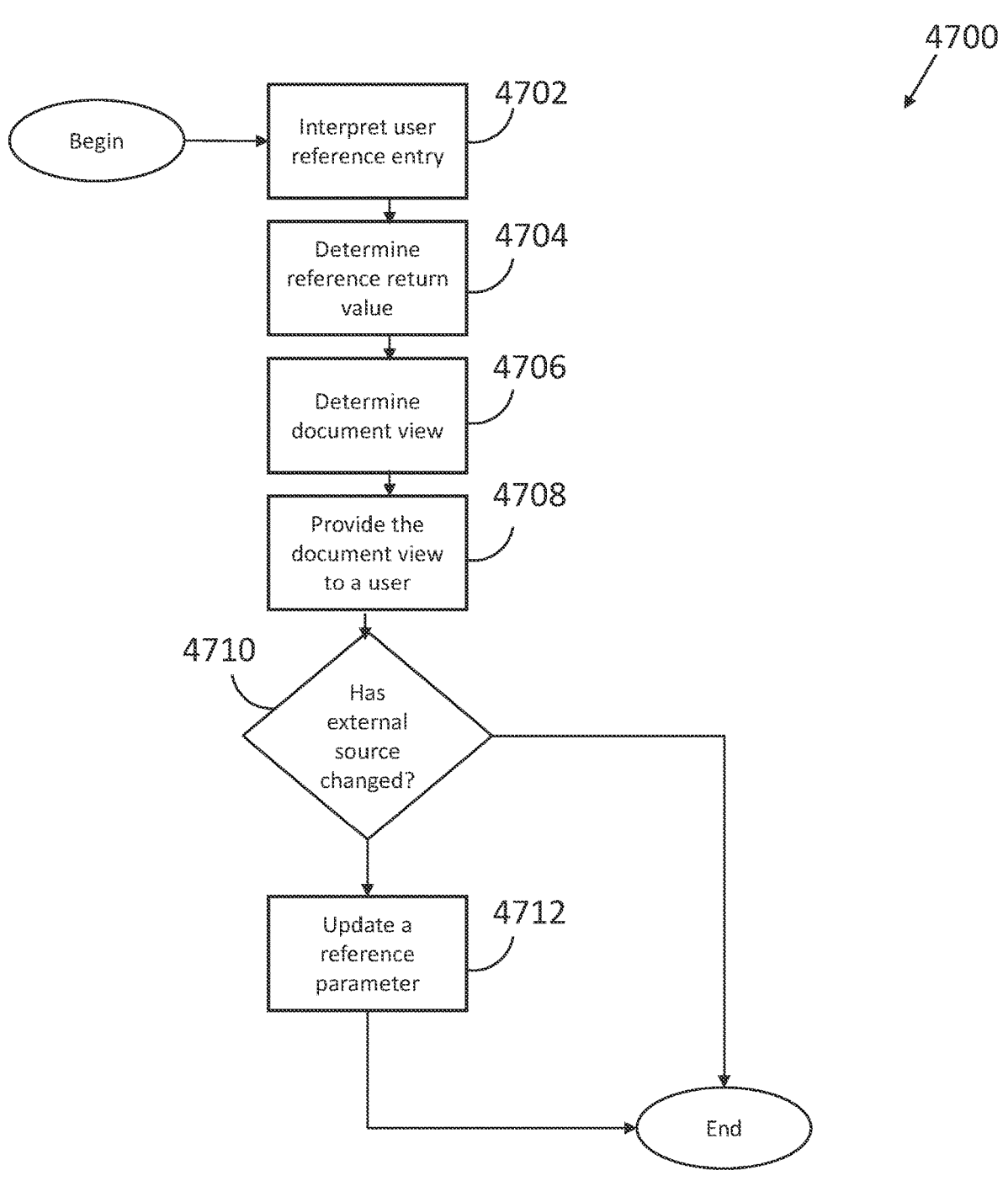
FIG. 47 is a schematic flow diagram of a procedure for updating a reference parameter.

Referencing FIG. 47, an example procedure 4700 includes an operation 4702 to interpret a user reference entry, an operation 4704 to determine a reference return value in response to the user reference entry, an operation 4706 to determine a document view in response to the reference return value, and an operation 4708 to provide the document view to a user. The example procedure 4700 includes the user reference entry as a value such as: a formula entry value, a reference request value, and/or a keyword request value.

An example procedure 4700 includes the reference return value including a value such as: a table column name value; an object primary key value; an object name value; a mask value comprising an object name value for display and a primary key value; a scope selection value; and/or a list of any one or more of the foregoing.

An example procedure 4700 further includes user reference entry including a reference to a source data that is an external source, an operation 4710 to determine if the external source has changed, and in response to the 4710 determining the external source has changed, an operation 4712 to update a reference parameter.

Figure 48:
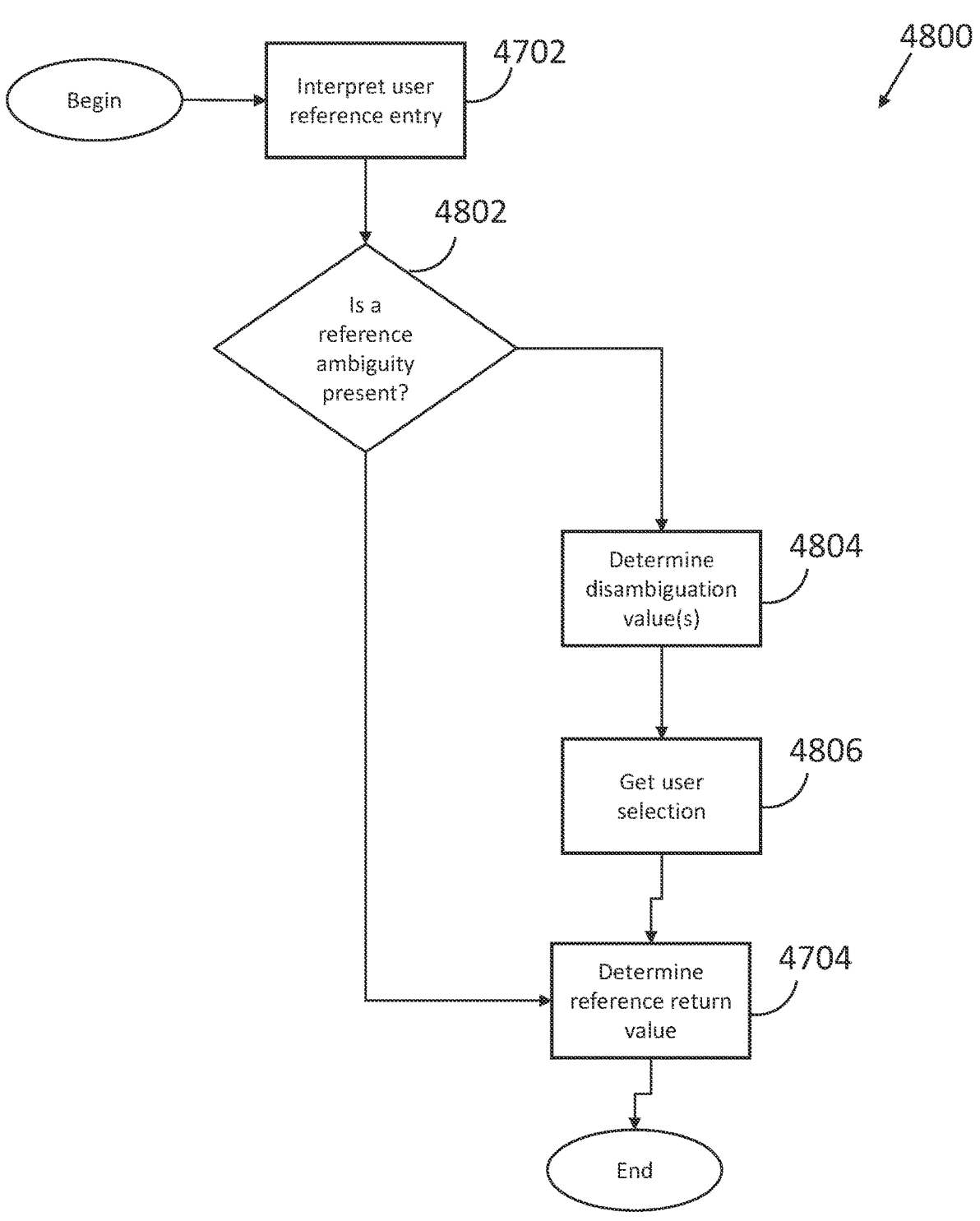
FIG. 48 is a schematic flow diagram of a procedure for determining a reference return value.

Referencing FIG. 48, an example procedure 4800 further includes an operation 4802 to determine whether a reference ambiguity is present, and in response to determining the reference ambiguity is present, an operation 4804 to determine disambiguation value(s), an operation 4806 to get a user selection from the disambiguation value(s), and the operation 4704 to determine the reference return value further in response to the disambiguation value(s) and/or the selection from the disambiguation value(s). An example procedure 4700 further includes the operation 4706 to update the data view in response to the disambiguation value(s) and/or the selection from the disambiguation value(s).

Figure 49:
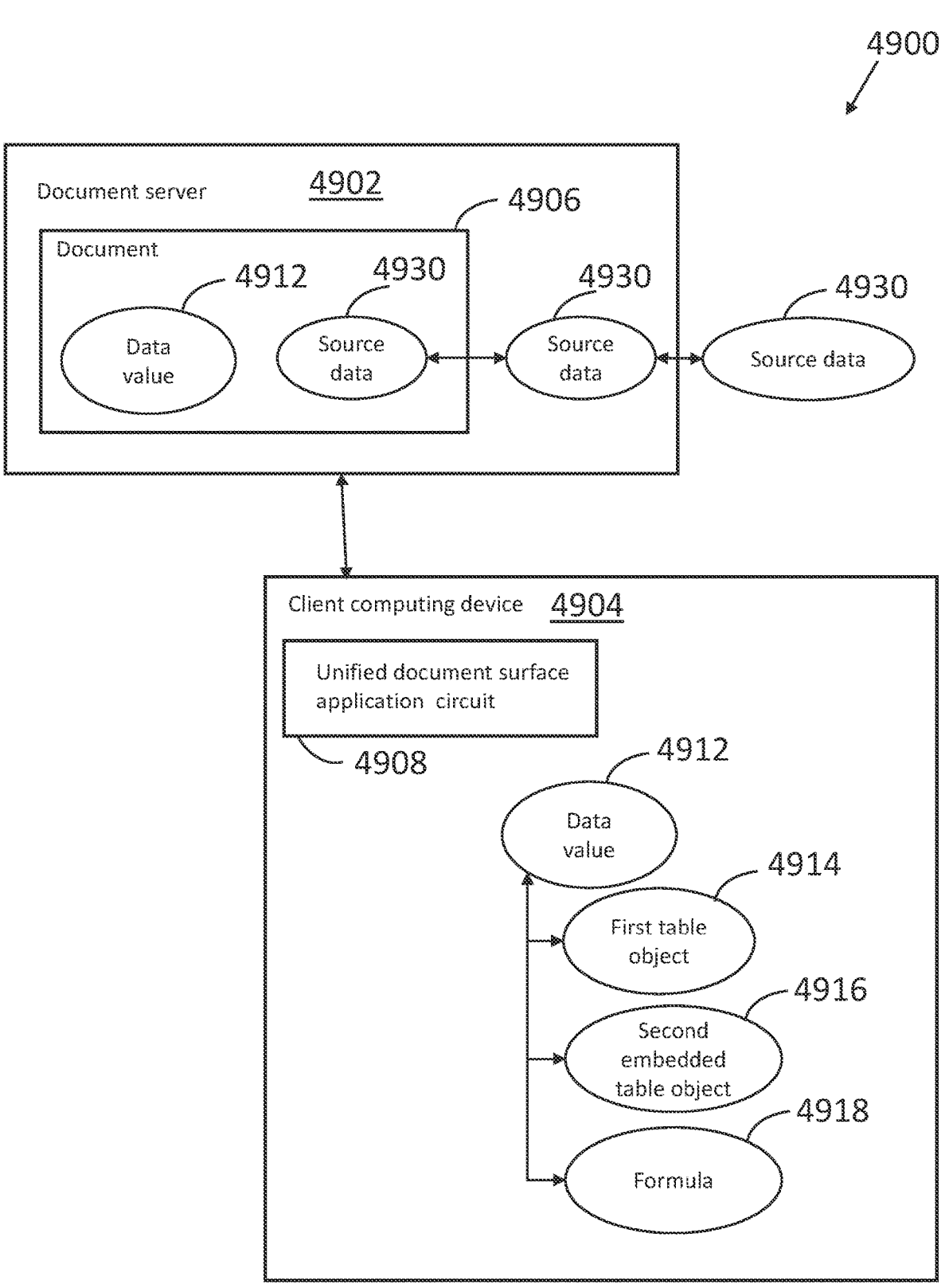
FIG. 49 is a schematic depiction of a system for operating a unified document surface application.

Referencing FIG. 49, an example system 4900 includes a first computing device 4902 (e.g., a document server) communicatively coupled to a second computing device 4904 (e.g., a client computing device). The example system 4900 further includes the first computing device communicating a data value 4912 to the second computing device 4904, where the data value 4912 includes at least a portion of a document 4906 and further includes a first table object 4914 and a second embedded table object 4916. The "embedded" description of the second embedded table object 4916 indicates the second table object is related to a parent object in a document model hierarchy, such as a sheet, canvas, tab, and/or document section. Additionally or alternatively, the first table object may be an embedded object, and/or the first table object may have the document 4906 as a parent object. The example system 4900 includes each of the first table object and the second embedded table object having a corresponding table specific name, such as a unique name within the document, a locally unique name (e.g., within a sheet, canvas, document section, etc.), and a corresponding parent object name. The parent object name, in certain embodiments, is the reference name within the document model for the parent object of the table object, such as a sheet name, document section name, canvas name, tab name, etc. An example system 4900 includes a first parent object name corresponding to the first table object 4914 having a different name than a second parent object name corresponding to the second embedded table object 4916.

An example system 4900 further includes the data value 4912 further including a table referencing value directed to the second embedded table object 4916, wherein the table referencing value includes a portion of a formula 4918 including a corresponding parent object name that is distinct from the first parent object name. An example formula 4918 includes the second parent object name (e.g., the parent object name of the second embedded table object 4916), and/or a referential name (e.g., "thisSheet", "thisTable", "thisCanvas", or the like) that is distinct from the first parent object name.

Figure 50:
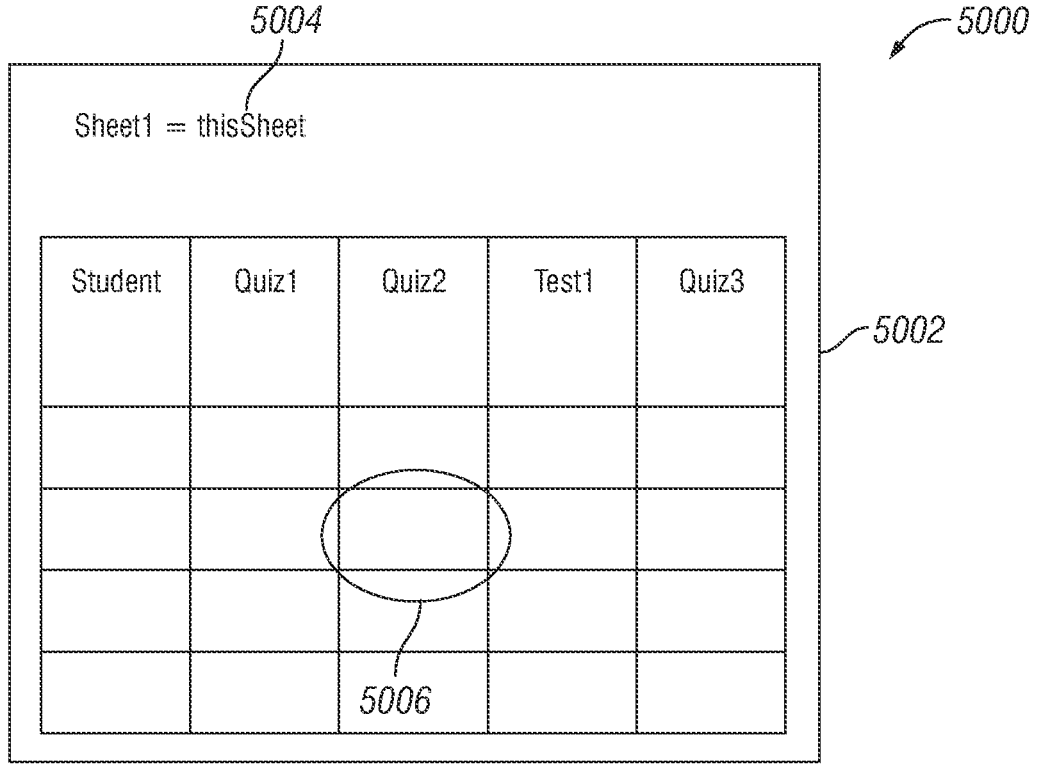
FIG. 50 is a schematic data illustration.
Figure 51:
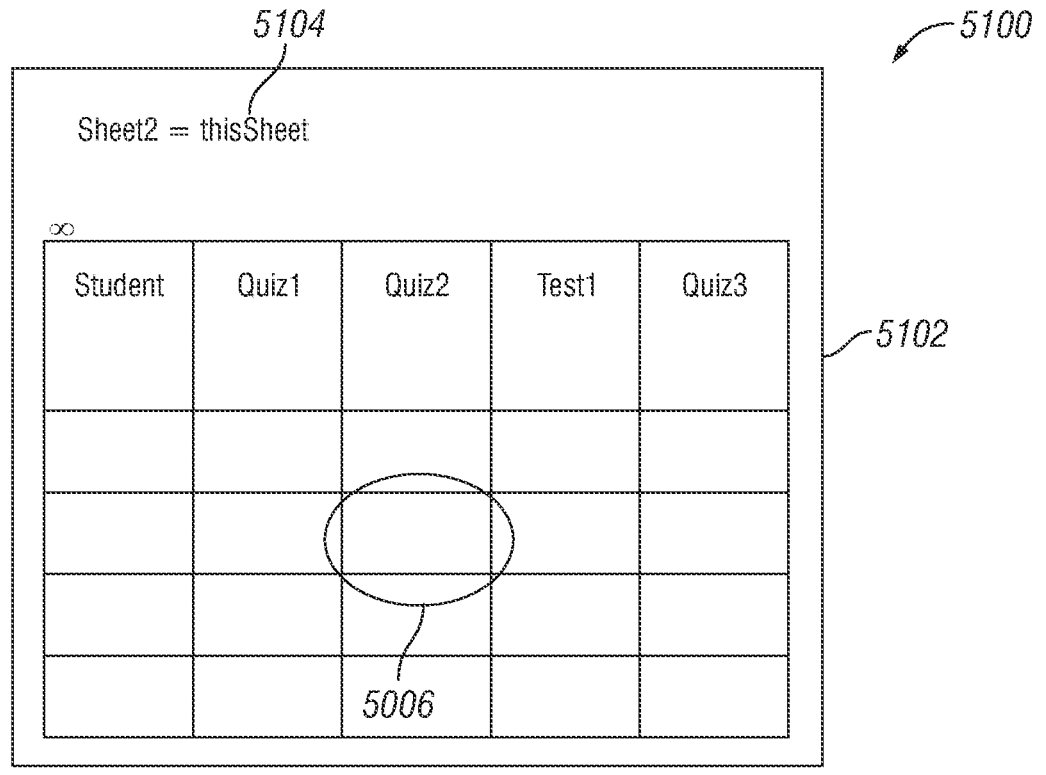
FIG. 51 is a schematic data illustration.

Referencing FIG. 50, an illustration 5000 depicts a first table object 5002 having a parent object name 5004 "Sheet1." In the example, a portion of an example formula 5008 references "thisRow.Quiz2+thisSheet.Previous-Grade." In the illustration 5000, the portion of the formula 5008 returns a value that is equal to the Quiz2 column value from the table 5002 added to a "PreviousGrade" value elsewhere in the document 4906. For example, the portion of the formula 5008 may be utilized to perform a column-wise operation on the table 5002 to update student grades. The portion of the formula 5008 may be positioned anywhere within the document 4906, in the illustration 5006 at a position in the document 4906 where "thisSheet" resolves to "Sheet1." Additionally or alternatively, the portion of the formula 5008 includes a reference to "Sheet1" rather than "thisSheet." Referencing FIG. 51, a continuing illustration 5100 is depicted, with a second embedded table object 5102 embedded within the parent object 5104 referenced as "Sheet2." In the illustration 5100, the second embedded table object 5102 is a linked table to the first table object 5002, for example with one or more columns deleted and/or hidden. The illustration 5100 includes a portion of a formula 5008, referencing "thisSheet.PreviousGrade." In the illustration 5100, the portion of the formula 5008 returns a value that is equal to the Quiz2 column value from the table 5002 (e.g., the first table object 5002) and the value "Previous-Grade" provided on "Sheet1" 5004. It will be noted that the "thisSheet" reference in the illustration 5100 resolves to "Sheet1" 5004 rather than "Sheet2" 5104, even where the portion of the formula 5008 is positioned on "Sheet2" 5104 or elsewhere in the document, rather than on "Sheet1" 5004. In certain embodiments, the reference "thisSheet" includes a mask value for display, for example to keep the display consistent with an entry by a user (e.g. user 814). Additionally or alternatively, the reference "thisSheet" is linked to "Sheet1" in another manner—for example a system table in an operation log and/or a dedicated metadata table, where the link between the particular instance of "thisSheet" and "Sheet1" is stored. In certain embodiments, it will be recognized that a second embedded table 5102 can be utilized, where referential values in a formula or other location (e.g., within a cell of a table) do not break when the formula, table, or other referring object is moved within the hierarchy of the document. Previously known systems map the referential value, e.g. "thisSheet", to the parent of the object, breaking the link to the source data when an object is moved or created under another parent object—for example in an embodiment similar to the illustration 5100 for a previously known system, "thisSheet. PreviousGrade" returns a value of "PreviousGrade" from "Sheet2" 5104, which may not exist and/or may be a different value than the original "PreviousGrade" from "Sheet1" 5004. In certain embodiments, the parent hierarchy for the table referencing value is the first parent object name—for example in the illustrations 5000, 5100, the reference "thisSheet. Previous-Grade" and/or the formula portion 5008 utilize "Sheet1" as the parent in the parent hierarchy of a document model. Additionally or alternatively, the table referencing value is mapped to "Sheet1" apart from the parent hierarchy, for example utilizing "Sheet1" for the described purposes (e.g., preserving intended information when a related object is referenced or moved) and utilizing "Sheet2" in the parent hierarchy for other purposes (e.g., contextual determinations for the table referencing value such as formatting, acceptable ranges, and/or implementation of document section specific rules).

An example system 4900 further includes the second embedded table object 4916 being a table linked to the first table object 4914 (e.g., as in the illustrations 5000, 5100). An example system 4900 further includes the formula 4918 further including a corresponding parent object name that is the second parent object name. For example, referencing the illustration 5100, if the portion of the formula 5008 in the illustration 5000 referenced "Sheet1.PreviousGrade," an example includes the portion of the formula 5008 in the illustration 5100 having "Sheet2.PreviousGrade" (the second parent object name), but the reference in the formula continuing to look at "Sheet1. PreviousGrade" to resolve the portion of the formula 5008. Additionally or alternatively, the unified document surface application circuit 4908 determines whether "Sheet2" includes a "PreviousGrade" value, marks the reference "Sheet2" for the user indicating that a different value is being utilized (e.g., a tooltip, selected character, and/or other notification highlighting to the user 814 that the formula 4918 includes a reference management operation for continuity, etc.).

Figure 52:
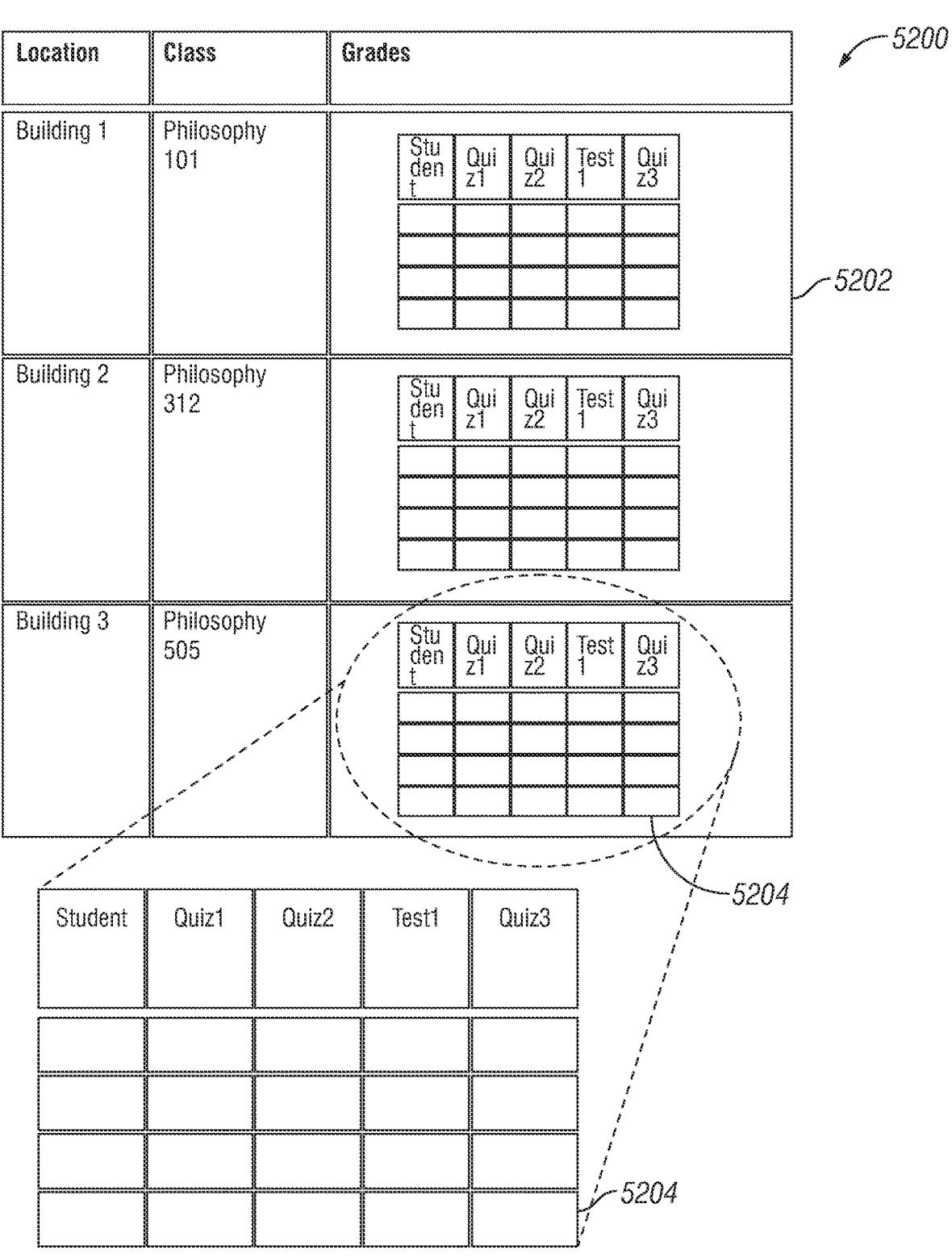
FIG. 52 is a schematic data illustration.

Referencing FIG. 49, an example system 4900 includes the first computing device 4902 communicatively coupled to the second computing device 4904, where an example first computing device 4902 includes a document server that communicates the data value 4912 to the second computing device 4904, and where the data value 4912 includes at least a portion of the document 4906 and further includes a first table object 4914. The example first table object 4914 includes at least one column and a number of row values corresponding to each of the column(s), and where at least one of the row values include a second table object 4916 embedded in the first table object 4914. An example system 4900 includes at least one of the plurality of row values each including one of the second table objects 4916 embedded in the first table object 4914 (e.g., the first table object 4914 includes a column of tables). Referencing FIG. 52, an illustration 5200 of a first table object 5202 includes a second table object 5204 in the column "Grades" (the third column in the example). The illustration 5200 provides for a convenient organization for the user 814 where a column can readily include richer embedded information than single data values within a cell of a table. The illustration 5200, which depicts, for example, class locations and names for a professor, and further includes a roster of each class with associated grade recordations, is a non-limiting example of a utilization of a second table object 5204 embedded in a first table object 5202.

An example system 4900 further includes the data value 4912 further including a formula 4918, where the formula 4918 includes a reference value to a column of each of the second table objects 4916. For example, a formula 4918 referencing "Table1.Grades.Quiz2. [Method]" (where the first table object 5202 reference is "Table1") performs the [Method] operation on each member of the "Quiz2" column of each of the second table objects 4916 within the first table object 5202. The described syntax is a non-limiting example, and any formula syntax may be utilized. Additionally or alternatively, the described [Method] may be any operation, including formula manipulations of the "Quiz2" column values that are not method operations of class objects. An example unified document surface application circuit 4908 performs a column-wise operation on each of the second table objects 4916 in response to the formula 4918. It can be seen that the example system 4900 provides a powerful interface for a user 814 to readily reference, manipulate, and/or create derivative information from columns of a table object, whether an embedded table object (e.g. the second table objects 4916) or a higher level table object (e.g. the first table object 4914). Previously known system do not provide for convenient column-wise operations from a single command (e.g. the formula 4918), embedded tables within table columns, and/or for convenient column-wise operations within embedded tables. The second table objects 4916 in the illustration 5200 have the same column values, although each of the embedded table objects may have distinct column values. An example unified document surface application circuit 4908 performs only applicable operations to the embedded tables, for example where a column value for the embedded tables is referenced in a formula 4918, only operations for embedded tables having that column value are performed. In certain embodiments, certain ones of the first table column (e.g., "Grades") may have embedded tables, and other ones of the first table column may have no values, objects other than a table (e.g., images, data values such as a number or string, graphs, charts, and/or cards).

Figure 53:
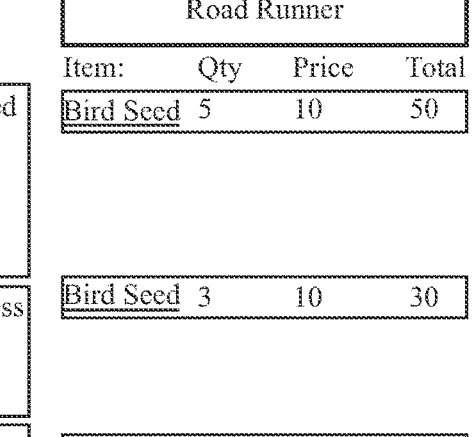
FIG. 53 is a schematic data illustration.

An example system 4900 includes at least one of the number of row values each including an aggregation value. For example, referencing FIG. 53, a first table object 5202 includes two columns-"Road Runner" and "Wile E. Coyote", wherein one or more rows of the first table object 5202 include an aggregation value 5204. In the example of FIG. 53, ordered items are aggregated, such as "In progress" 5302, where the aggregation value 5204 includes an embedded table of orders matching each category of aggregation. In the example, a formula 4918 can readily perform a column-wise operation on the aggregation value 5204, for example marking items by category for follow-up, reporting for taxes, inventory, etc. An example system includes each of the row values including an aggregation value 5204. In certain embodiments, only one or more row values include an aggregation value 5204.

Figure 54:
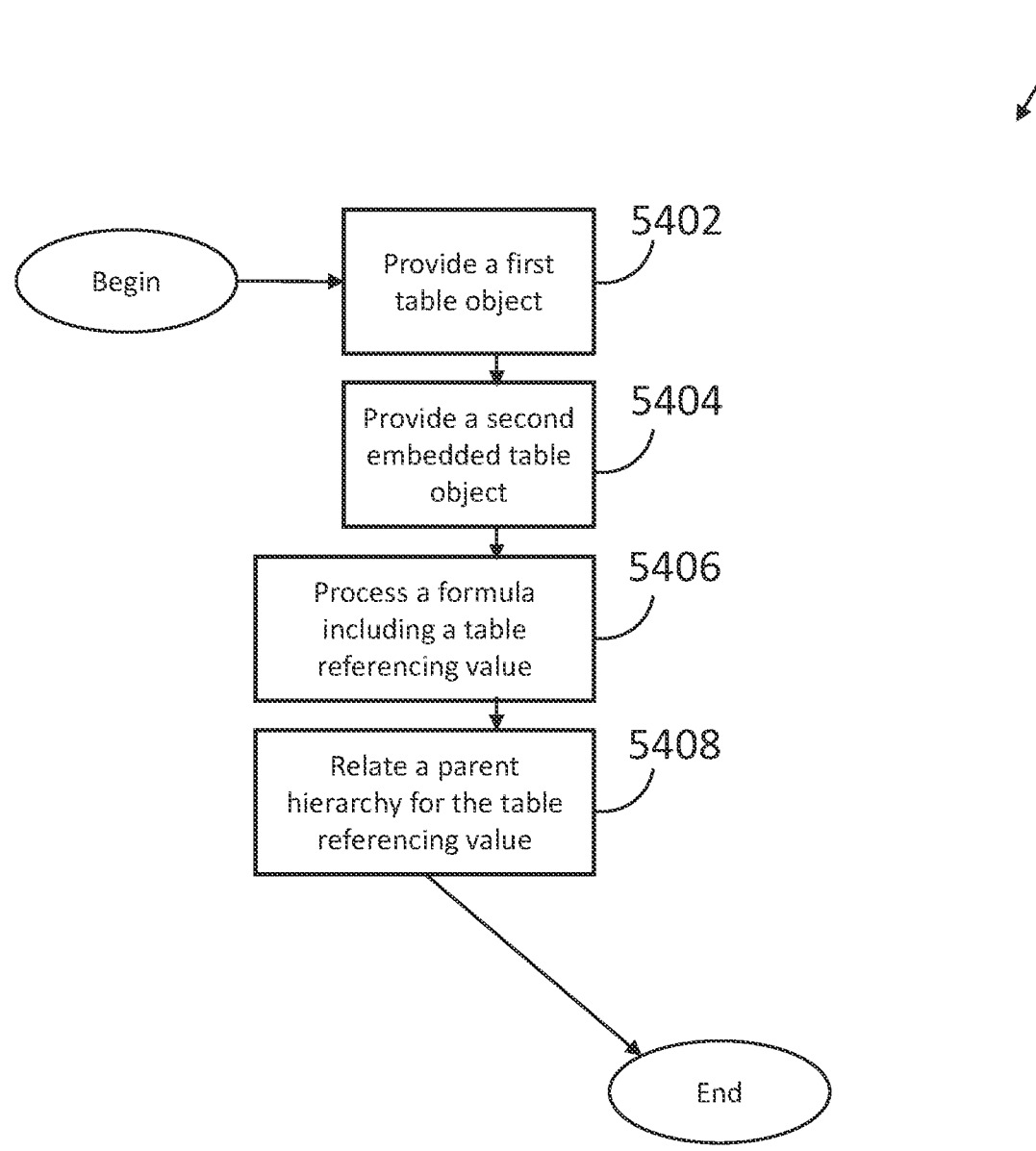
FIG. 54 is a schematic flow diagram of a procedure for relating linked tables.

Referencing FIG. 54, an example procedure 5400 includes an operation 5402 to provide a first table object including a table specific name corresponding to the first table object and a first parent object name corresponding to the first table object. The example procedure 5400 further includes an operation 5404 to provide a second embedded table object including a table specific name corresponding to the second table object and a second parent object name corresponding to the second table object. In certain embodiments, the first parent object name is distinct from the second parent object name. The procedure 5400 further includes an operation 5406 to process a formula including a table referencing value directed to the second embedded table object, where the table referencing value includes a corresponding parent object name that is distinct from the first parent object name, and an operation 5408 to relate a parent hierarchy for the table referencing value to the first parent object name. An example second embedded table object includes a table linked to the first table object. An example includes the corresponding parent object name as the second parent object name.

Figure 55:
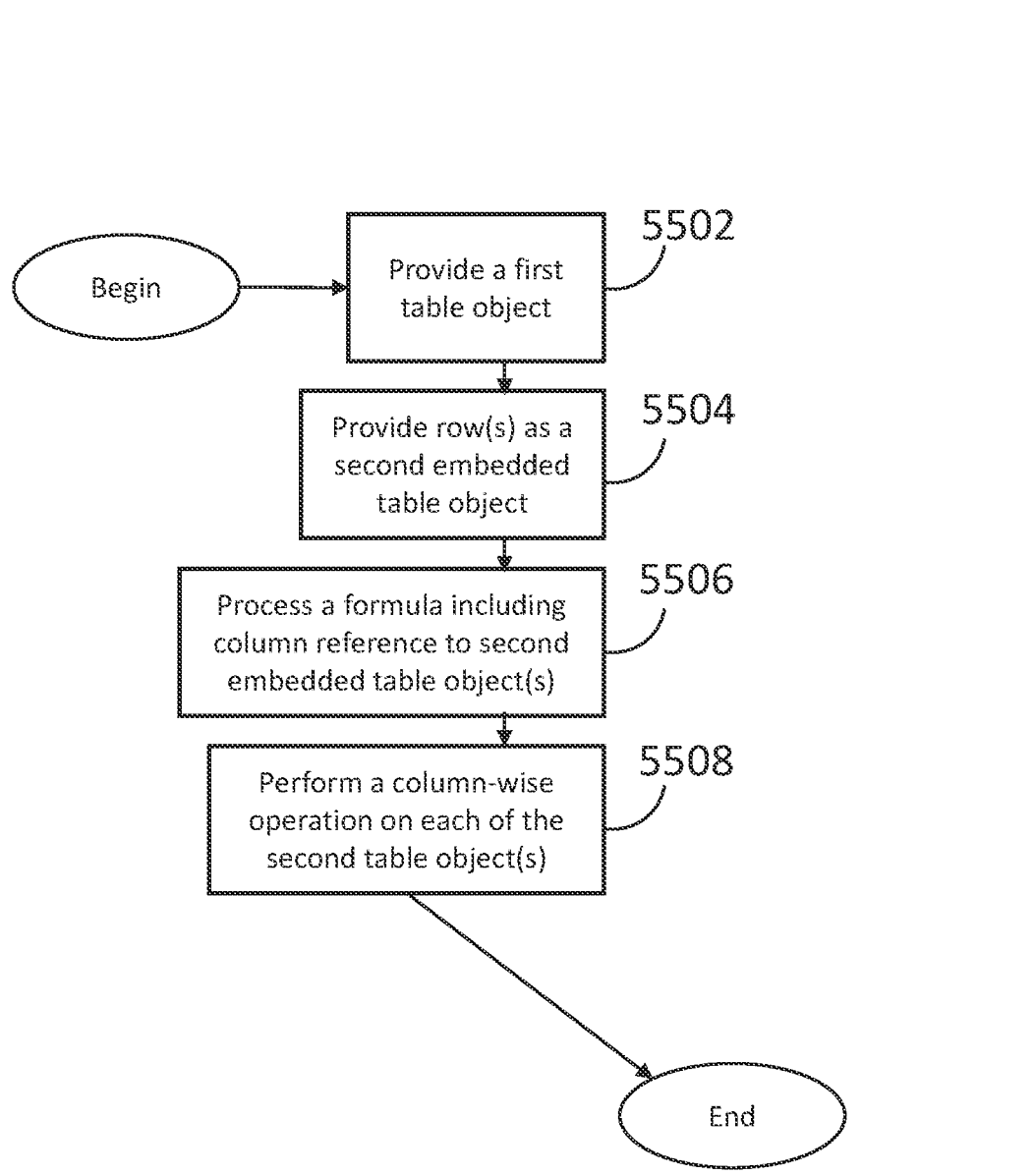
FIG. 55 is a schematic flow diagram of a procedure for performing a column-wise operation.

Referencing FIG. 55, an example procedure 5500 includes an operation 5502 to provide a first table object, where the first table object includes at least one column and a number of row values corresponding to the at least one column, and an operation 5504 to provide at least one of the number of row values as a second table object embedded in the first table object. The example procedure 5500 further includes the operation 5504 including each of the number of row values as a second table object embedded in the first table object. The example procedure 5500 further includes an operation 5506 to process a formula, where the formula includes a reference value to a column of each of the second table objects, and/or an operation 5508 to perform a column-wise operation on each of the second table objects in response to the formula. An example procedure 5500 includes each of the row values being an aggregation value.

Certain example embodiments are described following to implement one or more systems, system aspects, and/or operations of the present disclosure as an application programming interface (API). Without limitation, any aspects of any description throughout the present disclosure apply to certain embodiments of systems and operations to provide an API. The described examples are non-limiting, and it is contemplated that any system aspect, system functionality, and/or operations described throughout the present disclosure may be implemented as an API. Accordingly, the benefits of aspects of the disclosure are accessible to applications that do not otherwise incorporate systems and/or procedures of the present disclosure, to enhance capabilities for applications created by a user or administrator for a specified purpose, and/or to allow for implementation of features described herein with a pre-existing application.

Figure 57:
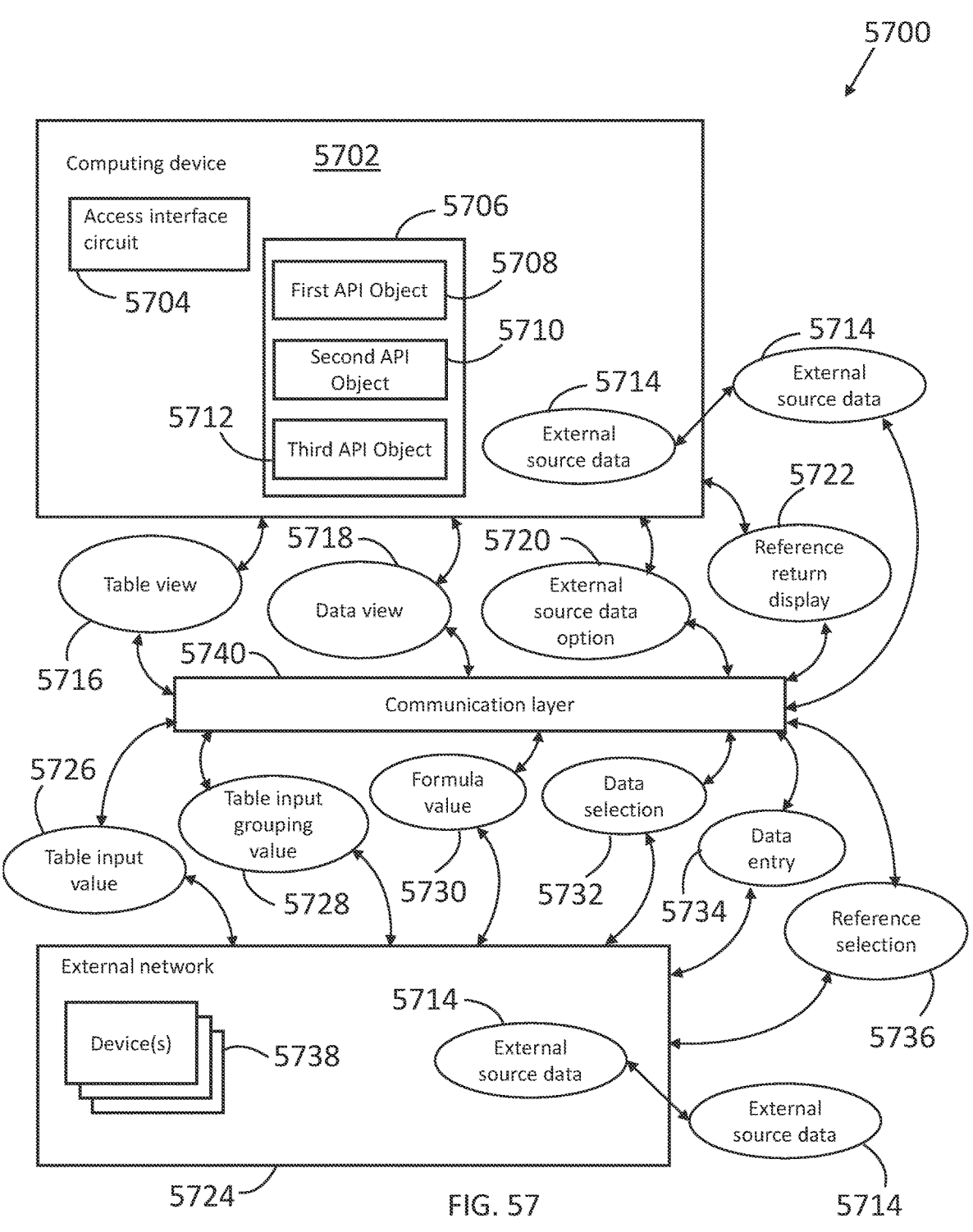
FIG. 57 is a schematic depiction of a system for operating an API.

Referencing FIG. 57, an example system 5700 includes a communication layer 5740 that provides access between a computing device 5702 and an external network 5724. The communication layer 5740 includes any communication devices, protocols, and/or components to provide for communications between the computing device 5702 and the external network 5724. An example system 5700 includes the computing device 5702 as a server providing access to one or more API objects 5706 to the external network 5724. For example, the computing device 5702 may be a web server, a cloud server, and/or a network server, and the communication layer 5740 may be an internet link, intranet, extranet, wide area network, and/or may further include wireless communication devices. In a further example, the external network 5724 includes one or more devices 5738 that access the computing device 5702 to interface with the API object(s) 5706 to perform certain operations implementing one or more aspects of systems and operations described in the present disclosure. Additionally or alternatively, a communication layer 5740 may be a communication layer between devices within a network, for example the computing device 5702 providing access to the API object(s) 5706 to other devices 5738 on the network. Additionally or alternatively, the computing device 5702 includes an application and/or virtual device operating within a same device 5738 operating the external application accessing the API object(s) 5706, for example a first application on a device 5738 accessing the API object(s) 5706 operating within a second application on the device 5738. In a further example, the communication layer 5740 includes an operating system, processor bus, and/or other communication layer within one or more of the devices 5738.

An example computing device 5702 includes the one or more API objects 5706, and an access interface circuit 5704 that exposes one or more of the API objects 5706 to the communication layer 5740. Additionally or alternatively, exposure of the API objects 5706 includes features to provide a subscription service, and login and/or authentication information. Subscription services may provide access to selected API objects 5706 and/or selected external source data 5714 features and/or data sources. For example, access to the computing device 5702 may include access to a selected menu of API objects 5706 and/or a menu of external source data 5714 options. Example and non-limiting external source data 5714 include any data sources such as websites, website databases, databases, cloud databases, data within a file and/or document, and/or data provided by a data service at any location and/or via any access method. In certain embodiments, "external" source data 5714 is external relative to an application running on a device 5738, relative to the computing device 5702, and/or relative to the system 5700. In certain embodiments, the external source data 5714 includes data on the external network 5724, on the computing device 5702, accessible to the computing device 5702, accessible to the external network 5724, and/or accessible to the communication layer 5740. Any descriptions of source data and/or external source data described throughout the present disclosure are additionally or alternatively contemplated as examples of external source data 5714.

An example first API object 5708 includes an API object configured to interpret a table input value 5726, where the table input value 5726 includes a number of table data values, to determine a table organization value in response to the table data values, where the table organization value includes at least one value such as: a column naming scheme; a sorting scheme; a filtering scheme; an aggregation scheme; and/or a formatting scheme. The example first API object 5708 is further configured to determine a table view 5716 in response to the table organization value, and to provide the table view 5716 to the communication layer. An example system further includes the access interface circuit 5704 further receiving the table input value 5726 over the communication layer 5740. In certain embodiments, the first API object 5708 is further configured to interpret a formula value 5730, where the formula value 5730 does not include a row reference, to update the table organization value in response to the formula value 5730, and to update the table view 5716 in response to the updated table organization value. An example first API object 5708 is further configured to update the table organization value by applying the formula value 5730 to an entire column of the table data values.

An example first API object 5708 is further configured to interpret a table grouping input value 5728 associated with the table data values, where the table data values include a number of categories and a number of associated data sets corresponding to the number of categories, and to determine an aggregation value in response to the table grouping input value, where the aggregation value corresponds to at least one of the number of categories. The example first API object 5708 is further configured to update the table view in response to the aggregation value. In certain embodiments, the system 5700 includes the access interface circuit further receiving the table grouping input value 5728 over the communication layer 5740.

An example first API object 5708 is further configured to determine an aggregation scheme, where the aggregation scheme includes at least one scheme such as: qualitative aggregation of associated data sets according to at least one of the categories; quantitative aggregation of associated data sets according to at least one of the categories; and/or binned aggregation of associated data sets according to at least one of the categories; and to determine the aggregation value in response to the aggregation scheme. Example and non-limiting table input grouping values include at least one value such as: a selection of a dedicated aggregation input element; a drag operation to a table supercell; a drag operation of a table supercell; a drag operation including an element of a first table and an element of a second table; a menu interface element selection; and/or a selection of a context triggered element.

Without limitation to the application of any other aspects of the present disclosure, an example first API object 5708 is configured to perform any operations including any functions of the system 3900 and/or the procedure 4000, and functions and operations described in the disclosure referencing FIGS. 39 and 40.

An example system 5700 includes a second API object 5710 configured to interpret a data selection 5732 including at least one data value, where the data selection 5732 includes at least one of a reference or a link to an external source data 5714. The example second API object 5710 is further configured to create a data view 5718 in response to the data selection 5732. An example system 5700 further includes the access interface circuit 5704 further receiving the data selection 5732 over the communication layer 5740, and providing the data view 5718 to the communication layer 5740. An example second API object 5710 is further configured to interpret a data entry 5734, to provide an external source data option 5720 in response to the data entry 5734, and to update at least a portion of the data view 5718 in response to the external source data option 5720. An example system 5700 further includes the access interface circuit 5704 further receiving the data entry 5734 over the communication layer 5740.

In certain embodiments, the second API object 5710 is further configured to interpret a data entry 5734 including an edit of the at least one data value, and to update the external source data 5714 to update the external source data 5714 in response to the data entry 5734. In certain embodiments, the second API object 5710 is further configured to query the external source data 5714 and to provide an update of the data view 5718 in response to the query. In certain embodiments, the second API object 5710 is further configured to perform the query operation in response to at least one of: an update time expiration; a notification from an external device hosting the external source data 5714; a change in a second data value having a dependency on the external source data 5714; a change in an object having a dependency on the external source data 5714; a creation of a second data value having a dependency on the external source data 5714 and/or a creation of an object having a dependency on the external source data 5714; and/or a request to provide a continuous update of the at least one data value.

Without limitation to the application of any other aspects of the present disclosure, an example second API object 5710 is configured to perform any operations including any functions of the system 4300 and/or the procedures 4400, 4500, and functions and operations described in the disclosure referencing FIGS. 43 through 45.

An example system 5700 further includes a third API object 5712 configured to interpret a reference selection 5736, to determine a reference return value in response to the reference selection 5736, and to determine a reference return display 5722 in response to the reference return value. An example access interface circuit 5704 is further configured to receive the reference selection 5736 over the communication layer 5740, and to provide the reference return display 5722 to the communication layer 5740. An example third API object 5712 is further configured to determine the reference return value in response to at least one of: responsive information within a document (e.g. a document accessed by an application operating on a device 5738), or responsive information within an external source data 5714. Example and non-limiting external source data 5714 includes a data source such as: a website, a database external to a document, a cloud storage location, a second identified document, and/or a network location.

Without limitation to the application of any other aspects of the present disclosure, an example third API object 5712 is configured to perform any operations including any functions of the system 2400, and functions and operations described in the disclosure referencing FIG. 24.

It can be seen that the described systems and API objects provide for a platform to receive commands from a distinct application, and return results utilizing capabilities described throughout the present disclosure.

In embodiments, according to the methods and systems of the present disclosure, an auto-completion functionality may be provided (referred to herein as "autocomplete"). Suggestions within autocomplete may be determined using a combination of a current formula in use, the cursor location within that formula, which, for example, may determine the text portion of the formula to be the subject of an autocomplete usage, and the parsing context (e.g., what type of formula column, canvas, filter, etc.) of that formula. When generating autocomplete suggestions a user may navigate down the tree, picking an appropriate "child" based on the current cursor location. Each node may have an option to return a set of autocomplete options if a sufficiently complete view of a formula is obtained, or the algorithm may continue to recurse down.

In embodiments, according to the methods and systems of the present disclosure, a number of custom data types may be created, utilized, and/or understandable to the system to determine suggested reference values, candidate entries, and/or autocomplete entries (e.g., for a reference and/or formula value) are described following, without limitation to any aspect described in the present disclosure. Further example operations to provide reference values, candidate for example, as a user enters data, the data entry may be classified (e.g., estimated, and/or provisionally assigned) as a particular type of data. Each formula (e.g. from a formula library) defined may have annotations to define the data type of its return type, as well as the expected data types of each of its parameters. As dynamic calculations complete, the calculation results may also be classified as a particular type of data. These classifications may be stored, for example, in histograms for each column, so that they may be used in the future to determine the type for an entire column (e.g., where a column accepts multiple data types, and/or is assigned a principle data type).

In embodiments, when a formula is converted to an abstract syntax tree (AST), according to the methods and systems of the present disclosure, each node (or part) of the formula with an expected return type may be decorated. This expectation may start at the root of a tree and be pushed down. Some formula types, including but not limited to, filters and conditional formats, may have an expected return type of a boolean expression. Functions within a formula may have a series of argument nodes, where each may be comprised of their own expression tree. The root of these trees may have an expected return type set based at least in part on the expected type for that particular formula parameter, and this may propagate down the tree. Operators may have similar behaviors and, by analogy, function like formulas with, for example, two parameters. In an example, the "%" (modulo) operator may expect that its parameters would be numeric.

In embodiments, formula suggestions may start with a global list of known formulas. This list may be first narrowed by removing formulas that do not have at least one alias that matches the given text that a user wants to complete. Further narrowing of the list may be attempted by identifying a set of best matches and, if the user is completing an empty string, only the best matches may be returned, otherwise the best matches may be ranked above other matches. To determine best match suggestions, the expected return type of the given node may be evaluated, and the type of any value being chained into the formula if one is present.

An example operation to consider a formula as a "best match" includes, without limitation: the formula is not marked as a low priority formula; there is a known expected return type, and the formula has a possible return value assignable to the known expected return type; a chain node associated with the formula includes a known type, where a) the formula expects a parameter, b) the best match expected type of the chained parameter is not excluded from a match (optional); c) the type of the chain node is assignable to the best match expected type of the chained parameter. A best match expected type of a chain node parameter may be expected to be an array of the parameter's defined type if the parameter is a variable argument, otherwise it may be the type defined by the parameter.

An example operation includes a user attempting to complete a block of text, where the user looks across the entire current context stack for references that can match the current search text. If a user is looking for only the best suggestions and an expected return type is known, these results may be filtered to only references that contain a data type that is assignable to the expected return type, such as according to selections by the user, rules in the document (e.g., by the user, and administrator, and/or document template).

When appropriate, values may be suggested (e.g., as candidate entries, auto-complete enabled entries, and/or suggested values) that are present within another object. Values may be dynamically looked up in that object and a histogram generated so the values can be ranked based on, for example, frequency from highest to lowest. When analyzing the AST, a number of scenarios may be evaluated to trigger a specific class of suggestions. The order in which the conditions of heuristics are checked may be important to generate a full experience, as conditions may not be mutually exclusive. Below are a few non-limiting examples:

Boolean Expression Extension

Condition: A boolean expression is expected, a complete boolean expression is present, and the cursor is one space after the boolean expression.

Suggestion: Logical operators.

Start of Grid Expression

Condition: A grid parser is the context and nothing has been typed.

Suggestion: Set of columns in the grid parser context.

Grid Expression Start of Extension

Condition: A grid parser is the context after a logical operator and nothing has been typed.

Suggestion: Set of columns in the grid parser context.

Local Grid Context Start of Boolean Expression

Condition: A local grid is the context and an empty parameter is the context with an expected type of boolean expression.

Suggestion: Set of columns in the local grid context.

Extend Table

Condition: An unchained table reference is present with an expected return type that is not a table or grid.

Suggestions: Show reference and formula suggestions.

Extend thisDocument

Condition: An unchained document reference is present with an expected return type that is not a document.

Suggestions: Show reference and formula suggestions.

Canvas Start

Condition: Nothing has been typed and a canvas parsing context is the present state.

Suggestions: Tables, controls, and views in the document with the ones in the current canvas are ranked first.

Reference Boolean Expression Extension

Condition: A column or variable reference is present when a boolean expression is expected.

Suggestions: Equality operators, also isBlank and isNotBlank if a trailing space is not present, and comparison operators if the reference contained data type is assignable to numeric or dateTime.

CurrentValue Boolean Expression

Condition: A missing parameter context is present and a boolean expression is expected, and there is a local context of a column or thisRow.

Suggestion: Suggest the CurrentValue keyword.

Right Hand Side Operator Comparison to Reference

Condition: A right-hand side of a comparison is present where the left-hand side has a resolved reference.

Suggestion: Aggregate the following suggestions:

If a current input is an empty string, and a local grid context is present, return RowColumnReferences for the local grid context. Else all reference options that match in the current context.

If the left-hand side data is of the type date time, suggest common date comparison suggestions.

Suggest value suggestions present in the left-hand side reference, but drop this suggestion if the only value match is an exact match.

If there is some text present, include any formula matches.

Unknown Literal

Condition: Fallback for node with unknown return type.

Suggestion: Return reference and formula matches.

In certain embodiments, autocomplete operations include autocompletion of any reference value, external data request, and/or formula entry value. Example and non-limiting autocomplete operations include: providing a list of candidate entries for a current user entry value that are consistent with the user entry value entered, which may be a partial or a complete value (hereinafter, "candidate entries"); providing previews for one or more candidate entries, where previews include one or more of contextual information related to the candidate entry (e.g., offset column data for a table, a related table column heading, a related table name, and/or a related object name, heading, or value) and/or a result set for one or more candidate entries if selected (e.g., a result of a formula resulting from the candidate entry; one or more rows of a sorting and/or filtering operation as a result of the candidate entry; and/or a depiction of a resulting object such as a graph, chart, and/or image as a result of the candidate entry); a card depicting relevant information to the candidate entry. Additionally or alternatively, candidate entries are prioritized according to contextual information. Additionally or alternatively, previews for one or more candidate entries are provided as a tooltip and/or at the request of the user to provide additional information for candidate entries. Additionally or alternatively, a listing of candidate entries is updated in response to the user adding to the current user entry value (e.g., the candidate entry list is updated in real time as the user types). Additionally or alternatively, a notification is provided to the user that additional candidate entries beyond those listed are available in the system. Additionally or alternatively, one or more candidate entries are determined according to a document model of objects, including object reference names stored in a document model, an operation log, a system table, and/or document metadata, and/or further in response to available events and/or methods available for objects related to the candidate entries and/or related to the user entry value. In certain embodiments, a formatting is applied to the user selection of the candidate entries. In certain embodiments, a single candidate entry is supplied to the user for autocomplete operations.

Referencing FIG. 37, an example system 3700 includes a first computing device 3702 at least intermittently communicatively coupled to a second computing device 3704, where an example first computing device 3702 includes a document server, and where the document server communicates a data value 3712 to the second computing device 3704, where the data value 3712 includes at least a portion of a document. The example second computing device 3704 includes a unified document surface application circuit 3716 that interprets a user entry value (e.g., as a first user input 3718) including at least one character, and a user display circuit 3714 that determines at least one candidate entry in response to the user entry value. The example user display circuit 3714 is further structured to provide an autocompleted entry (e.g., as a document view 3717) in response to a user selection of the at least one candidate entry. An example user display circuit 3714 is further structured to determine a list of candidate entries, and to provide a plurality of candidate entries to the user in response to the list of candidate entries. An example user display circuit 3714 further provides a preview of at least one of the plurality of candidate entries to the user.

Example and non-limiting previews include: contextual information related to the candidate entry; offset column data for a table related to the candidate entry; a related table column heading to the candidate entry; a related table name for the candidate entry; a related object name to the candidate entry; a related object heading to the candidate entry; and/or a related object value to the candidate entry. Certain further example and non-limiting previews include: a result set for at least one of the candidate entries if the at least one candidate entry is selected; a result of a formula resulting from the candidate entry if selected; at least one row resulting from a sorting operation if the candidate entry is selected; at least one row resulting from a filtering operation if the candidate entry is selected; and/or a depiction of a resulting object if the candidate entry is selected. Certain further example and non-limiting previews include: help text; an impact of the user entry value; an impact of a candidate entry; a result of the user entry value; a result of a candidate entry; write-through results of the user entry value; and/or write-through results of a candidate entry.

The described procedural examples for performing autocomplete functionality may be performed by any systems, apparatuses, and/or as a part of any procedures described in the present disclosure, without limitation.

Figure 56:
FIG. 56 is a schematic flow diagram of a procedure for providing an autocompleted entry.

Referencing FIG. 56, an example procedure 5600 includes an operation 5602 to interpret a user entry value including at least one character, and an operation 5604 to determine at least one candidate entry in response to the user entry value. The example procedure 5600 further includes an operation 5606 to provide an autocompleted entry in response to a user selection of the at least one candidate entry. The example procedure 5600 further includes the operation 5604 to determine a list of candidate entries, and an operation 5610 to provide a number of candidate entries to the user in response to the list of candidate entries. An example procedure 5600 further includes an operation 5612 to provide a preview at least one of the number of candidate entries to the user. Example and non-limiting previews to the user include providing: contextual information related to the candidate entry; offset column data for a table related to the candidate entry; a related table column heading to the candidate entry; a related table name for the candidate entry; a related object name to the candidate entry; a related object heading to the candidate entry; and/or a related object value to the candidate entry. Additionally or alternatively, example and non-limiting previews to the user include providing: a result set for at least one of the candidate entries if the at least one candidate entry is selected; a result of a formula resulting from the candidate entry if selected; at least one row resulting from a sorting operation if the candidate entry is selected; at least one row resulting from a filtering operation if the candidate entry is selected; and a depiction of a resulting object if the candidate entry is selected.

Customer relationship management (CRM) generally refers to the management of a business, organization, or other entity's customers, associates, third party partners and providers, or some other party with whom an entity has, or wishes to have, a relationship. The interests and concerns of CRM managers, and users of CRM systems, include but are not limited to: identifying potential customers, analyzing and tracking customer relationships, tracking sales, lost sales, sales trends, measuring product performance across different sales channels, personnel departments and the like. As such, CRM systems may need to ingest data from a plurality of sources, both internal and external to the entity running the CRM system, and share information in a collaborative environment, for example, among the entity's personnel, including personnel that may be geographically dispersed. In embodiments, the unified document surface application circuit, as described herein, may support and/or comprise a CRM system based at least in part by controlling which parties within an organization are authorized to access information, such as sensitive information regarding sales, facilitating the retrieval of data, including data that is external to an organization, such as point-of-sale retail data, and providing a document server and surface that may allocate and support the operations of a plurality of users, each of whom may be interacting with a plurality of data sources, data tables, documents, and the like.

An example system 6200 may include a unified document surface application circuit 6216A, 6216B further including an authorization circuit 6222A, 6222B that interprets an external data source request 6224, and provides an access to an external data source 6226 in response to the external data source request 6224. In an example, an employee may wish to perform a CRM function by obtaining regional sales data for Product X from each of a plurality of third party databases, such as retail stores, third party data warehouses and the like. An organization may place limits on which employees may access such data, and an authorization circuit may review permissions and perform authentication to ensure that a party wishing to view, for example, a particular type of data or data source is authorized to do so. The authorization circuit 6222A, 6222B may prompt a user for authorization information (e.g., a username, login ID, password, etc.) and/or accesses authorization information accessible to the document, system, a client computing device, the document server, or the like. Accordingly, the user may access external data sources 6226 according to available permissions specific to the user, entered into a document for use during a project, according to a subscription where the subscription information is entered into the document, document server, client computing device, or otherwise within or accessible to the system. An example authorization circuit 6222A, 6222B may further store an authorization token corresponding to the external data source 6226 in the document 6206, where the authorization token may include at least one access value such as: an access type (e.g., read operations, edit operations, write operations, and/or delete operations); an access scope (e.g., accessible portions of the external data source 6226, including differential access types according to the portion of the external data source 6226); an access duration (e.g., a session duration of access, applicable calendar time of access, allowed access times for operations to access the external data source 6226 and/or portions thereof, including differential times for certain access types and/or portions of the external data source 6226); and/or expiration values for the authorization token); and/or an access reauthorization time value (e.g., a time to prompt the user for reauthorization, an expiration time for a session, subscription, or the like, and/or expiration values for the authorization token). For example, a user may have a stored permission, such as a token, indicating that they may access External Data Source 1 and 2 but not 3. Upon an attempt to access External Source 1, the user may be able to import data, create an action link to the external data source, as described herein, and/or populate a table within the unified document surface with data from External Data Source 1. Continuing the example, if this user is in a work group with shared responsibilities and a shared workspace, a document server 6202 may allocate supporting operations to a workflow server 6236—for example where operations requested according to multiple users and/or for multiple documents include certain common aspects (e.g., downloading bulk information from External Data Source 1, indexing and/or querying operations to a large data set at least partially shared between documents, and so forth). In embodiments, the specific operations performed by the workflow server 6236 may be direct operations and/or procedures as described in the present disclosure, and/or where specific operations performed by the workflow server 6236 are a superset of operations (e.g., shared between a number of documents and/or user operations), precursor operations, and/or preparatory operations, for example to support utilization of an external data source 6226 that is added to the system 6200.

In embodiments, an administrator, document owner, and/or an authorized user, such as a manager, may extend access to a data source and/or the unified document surface, if permitted to other users of the document. For example, a user in need of using data from External Data Source 1 in order to analyze regional sales trends as part of an organization's CRM program does not necessarily need to know the details of accessing the external data source 6226, such as calling and engaging APIs for the external data source 6226. The authorization circuit 6222 may provide for a configurable front-end for the user to access external data sources 6226, including within linked tables within the unified document surface, as described herein, while having only limited information to provide authorization, such as login information to the external data source 6226, to the document 6206, and/or as determined according to information about the user. For example, a plurality of employees that are tasked with tracking regional sales may interact with a unified document surface in which there are tables that are linked to external data sources, including via active links. As the data changes (e.g., additional sales are recorded at a retail organization), the linked tables within the unified document surface may automatically update to indicate the new information. Alternatively, the data may be periodically updated in the linked tables, updated at the user's request, or according to some other schedule or rule. The authorization required to access this data may be unknown to the user, because it is implicit to that user's interaction and permissions with the unified document surface and the tables therein. Thus, external data sets, such as a web page or database external to the document surface, may be periodically and/or continuously updated by operation of the document server 2602 that pulls in the updated data and updates corresponding elements of the document 2606, such as linked tables, that utilize the external data set.

In another embodiment, a user may wish to track potential sales leads using the system 6200. As a starting point, the user may use a unified document surface to create a table or plurality of tables that may include action links to external data sources, such as websites (e.g., LinkedIn or Wikipedia), networks (American Purchasing Society), distributed databases (job banks), or some other data source. As described herein, linked tables may be updated within the document as changes are registered at the external data sources. Alternatively, the document may also contain tables containing data that are static or that only receive periodic data updates. For example, a CRM professional may be in the habit of updating, on a quarterly basis, a table listing purchasing executives' names and contact information. In a second table, or in a second region of the table in which the purchasing executives' data are recorded, the user may also update external data, such as SEC filings for the companies at which the purchasing executive are employed, for example indicating the quarterly loss or profit of the division with which the purchasing executives are associated. Continuing the example, a table, or tables, within the document may periodically update the parties that have contacted the user via an email account, recording data such as name, title, address, company of employment, time of email, and so forth. Once this data is within the document, or made available to the user through the linked tables of the document, the user may be able to create different views of the data, such as pivot tables, as described herein, to explore various relationships among the data. For example, a particular view of interest to the user might be a listing of 1) purchasing executives with a particular title (e.g., "Purchasing Director"), 2) from a company for which an SEC quarterly report within the last quarter indicated a company profit, increasing margins, notice of expansion, or some other type of positive financial information, and 3) at least one record of email contact with the user. This view/table may be titled ("Promising Leads"), stored (including stored as a template to be periodically run to refresh the data presented), and pushed to a client device for viewing.

In certain embodiments, a CRM document 2606 template may include external data structured within linked tables in a manner suited to a given user's CRM needs permissions and history with a document, for example as recorded in an operations log that is associated with the document surface in which the user is tracking data. Access, views of data, and the data presented within a linked table within the document surface may be based at least in part on a particular sales team and the individuals included on the team, or a certain set of products, retailers, or some other criterion of interest in a CRM system.

Real estate can be a fast-moving, competitive industry in which timely access to data is important. A typical home buying experience can be exasperating when one must go to multiple data sources, web search to web search, to research real estate that is on the market, in your preferred neighborhood, in your price range, within your acceptable commuting range, and so on. In addition to the data regarding the properties themselves, there is a significant number of realtors to choose from, data about realtors, historical data regarding their sales, the percentage of asking price they were able to bargain for, number of deals closed, etc. To be adequately informed, a participant in the real estate market needs real time access to data regarding the real estate market, inventory, sales, realtors, notification when events of interest occur (e.g., new home listed in preferred neighborhood), and comparison shopping to know what fair market value is of homes, but also realtor's commissions, given their sales records.

In embodiments, the system 6200, as described herein, may be used to create a unified document surface in which there are linked tables that have external data links to data sources outside of the system 6200. The data sources may include websites containing home listings, valuation databases, such as tax assessor's offices, third party valuation services, crime databases, education websites rating school districts, quality of life indices, or some other type of data. The conventional means of accessing such data is now often sequential web searching, government office visits, meetings with realtors, and so forth. Each may have their own manner of allowing access to data, and rules regarding which data may be retrieved.

In a preferred embodiment of the present disclosure, with linked tables within a unified document surface, a user may be able to extract external data, using the method and systems as described herein, and populate a table, series of tables, or embedded tables, with the types of data of most relevance to the user and in the format that is most actionable for that user's particular intended use of the data. For example, a real estate website may allow connectivity through API functionality. A real estate firm may regularly post its sales by neighborhood and price on its website, all data which may be scraped and populated with a table. And the user herself may have certain data criteria she wants to record and track, such as cost of property taxes, age of home that is acceptable and so on. Using the external data features of the system 6200 as described herein, the user may be able to construct a table or plurality of tables that retrieve and refresh such real estate data on a regular basis, rather than the user having to individually visit websites, construct traditional spreadsheet summaries of key metrics and the like.

Continuing the example, once the linked tables are functional within the unified document surface, the user may employ formulas and rules to sort, pivot, aggregate and perform other analyses. For example, using the @reference functionality, as described herein, the user may be able to query across these plurality of data sources and data types to pull all data that relates to a four bedroom house ("@four bedroom"), or financing status (@foreclosure), or location (@78705), and so forth. A pivot table may be able to produce a listing of all homes listed for sale in a given zip code that also appear in a publicly available crime statistics database indicating no burglary within the last 24 months.

In embodiments, a user may set notifications and alerts based on data within the table(s), or that is updated to a table(s). For example, a user may have tables within a document that are linked to external data sources that provide data related to location, price, schools, crime, lot size, and manually entered personal data regarding the approximate distance from places of interest, such as family and friend's houses, or a favorite park. Formulas, as described herein, may be used to construct a notification rule regarding the intersection or presence of meaningful data, such as "within 1 mile of Zilker Park, sidewalks in neighborhood, under price $X, no burglaries" and so on. This data may also be viewed in conjunction with other data, such as realtor data indicating realtors who have worked as a buyer's agent in the zip code of interest, and obtained a sale for their buyer at X % below the list price, and within the last 12 months.

In embodiments, once there is a match across all these factors, derived from a plurality of datasets, within a view of the data, such as a pivot table, as described herein, the system 6200 may generate a notification for the user. A notification may, in one embodiment, take the form of an alert that is sent to a client device, such as a mobile phone that is associated with the user, or that the user indicated within the unified document surface was the appropriate contact for an alert. An alert may be sent over the Internet, cellular network, WiFi, near-field communication, beacon, or some other means. Upon receipt of the alert, the client device, such as a smart phone may receive instructions to activate, such as out of a "sleep mode." The activation may be coupled with an audio, visual, tactile, or some other type of indication of activity occurring on the client device. Upon activation, the client device may act on instructions received from the system to connect with the document in which the table data is present, and that is the source of the notification/ alert. The document may present the user a view of the intersection of data that was the cause of the alert (e.g., good home, right neighborhood, quality realtor contact with proven sales record in the neighborhood). In another embodiment, the client device, such as a smart phone, may present the phone number of the realtor identified in the linked table view, and ask the user if they would like to place the call before the opportunity to buy the home passes.

In embodiments, the system 6200 may be used to track human resources functionalities, including but not limited to the tracking of prospects, the scheduling of job interviews, follow-up interviews, recruiting events, job fairs, contact information, history of employment, or some other type of data related to human resources and recruiting. Human resource representatives or others may use a unified document surface to create tables, linked tables, and other resources, as described herein, to track personnel data, to keep track of important documentation, including but not limited to resumes, or other documents.

Because the system 6200 is collaborative, and the documents created in the system may be utilized by multiple parties, and the unified document surface may allow multiple parties to comment, review, and evaluate potential recruits, without having to coordinate the passing of a review form or other standardized means of tracking recruiting activities. Functionalities such as the @reference function, as described herein, may allow human resources representatives or others to more efficiently search and find needed information regarding prospects or other information.

The external data capabilities of the system 6200 may also enable other data sources outside of an organization to contribute to the overall picture of a recruit. For example, background data, prior employment, data from websites such social network sites, like LinkedIn, or some other type of data may be incorporated into tables, including linked tables, as described herein and refreshed periodically or automatically when a given data source, such as a website is updated with new information. In this way, the system 6200 may be used not just to track current parties that are undergoing an interview process, but also used to search for and evaluate potential parties to contact for potential employment.

In certain embodiments, operations to determine a list of candidate entries and/or to provide an autocompleted entry can be applied to any text, formula, and/or data entry in a document. Example and non-limiting classes of information for candidate entries and/or autocompleted entries include: column names; column values; corrections to apparent error values in a math operation, a reference, a parsing value, syntax, and/or a formula; a value for a reference precedent and/or dependent; and/or tag parameters. Example and non-limiting previews include: help text; an impact of an entry (e.g., highlight cells that are changed by a current entry); results of a current entry; and/or write-through results for a current entry (e.g., where a source value is updated by a change in a referencing value).

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices.

The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

What is claimed:

1. A system, comprising:

a first computing device communicatively coupled to a second computing device;

the first computing device comprising a document server structured to communicate a data value to the second computing device, the data value comprising at least a portion of a document;

the second computing device comprising:

a unified document surface application circuit structured to interpret a user location value, to interpret a first user input comprising a text flow entry, and to interpret a second user input comprising an in-line data access entry;

a text flow processing circuit structured to position a text entry value on a unified document surface in response to the first user input and the user location value;

an enhanced data processing circuit structured to create at least one data structure in response to the in-line data access entry, and further in response to the user location value, and to position the at least one data structure on the unified document surface, wherein the enhanced data processing circuit is further structured to synchronize the at least one data structure positioned on the unified document surface with an external data source, wherein changes entered through the in-line data access entry trigger automatic updates to both the unified document surface and the external data source;

a user notification rules circuit structured to interpret a user notification profile value comprising a notification trigger value and a notification response value, wherein the notification response value comprises an action link definition;

a user notification circuit to determine whether an event trigger has occurred in response to the notification trigger value and the data value; and a user interaction circuit structured to provide a notification to the user in response to the event trigger and the notification response value, wherein providing the notification to the user is performed by providing the action link to the user in response to the action link definition, and wherein the action link definition comprises at least one of: an automated message to be sent in response to a user selection of the action link or assigning a task to an entity in response to a user selection of the action link.

2. The system of claim 1, wherein the enhanced data processing circuit is further structured to create the at least one data structure in response to a user device screen size comprising a screen size of the second computing device.

3. The system of claim 2, wherein the enhanced data processing circuit is further structured to create the at least one data structure by selecting at least one aspect of a table selected from a dimensionality, a width, or a viewing scheme of the table.

4. The system of claim 1, wherein the user notification circuit is further structured to determine whether the event trigger has occurred in response to the user location value.

5. The system of claim 1, wherein the user interaction circuit is further structured to provide the notification to the user in response to the user location value.

6. The system of claim 1, wherein the notification trigger value comprises a change criteria for an aspect of the document.

7. The system of claim 6, wherein the change criteria comprises one of a change to the document or a change to a selected data value of the document.

8. The system of claim 6, wherein the change criteria comprises one of a utilization of a keyword, a deletion of a keyword, or an edit to a keyword.

9. The system of claim 1, wherein the notification response value includes at least one parameter selected from the parameters consisting of: a notification delivery method, a notification type, or a notification location value.

10. The system of claim 1, wherein the user interaction circuit is further structured to provide the action link to the user in response to the user location value.

11. The system of claim 1, wherein the user interaction circuit is further structured to interpret a user action request value, and to update the action link definition in response to the user action request value.

12. The system of claim 1, wherein the user interaction circuit is further structured to provide the action link to the user in response to the user location value, and wherein the user location value represents a geographic location of a user.

13. A method, comprising:

communicating a data value from a first computing device to a second computing device, the data value comprising at least a portion of a document;

interpreting a user location value, a first user input comprising a text flow entry, and a second user input comprising an in-line data access entry;

positioning a text entry value on a unified document surface in response to the first user input and the user location value;

creating at least one data structure in response to the in-line data access entry and further in response to the user location value;

positioning the at least one data structure on the unified document surface;

synchronizing the at least one data structure positioned on the unified document surface with an external data source, wherein changes entered through the in-line data access entry trigger automatic updates to both the unified document surface and the external data source;

interpreting a user notification profile value comprising a notification trigger value and a notification response value, wherein the notification response value comprises an action link definition;

determining whether an event trigger has occurred in response to the notification trigger value and the data value; and providing a notification to the user in response to the event trigger and the notification response value, and wherein providing the notification to the user is performed by providing the action link to the user in response to the action link definition, and wherein the action link definition comprises at least one of: an automated message to be sent in response to a user selection of the action link or assigning a task to an entity in response to a user selection of the action link.

14. The method of claim 13, further comprising creating the at least one data structure in response to a user device screen size comprising a screen size of the second computing device.

15. The method of claim 14, the method further comprising creating the at least one data structure by selecting at least one aspect of a table selected from a dimensionality, a width, or a viewing scheme of the table.

16. The method of claim 13, wherein the determining whether an event trigger has occurred is further in response to the user location value.

17. The method of claim 13, wherein the providing the notification to user is further in response to the user location value.

18. The method of claim 13, further comprising providing the action link to the user further in response to the user location value.

19. The method of claim 13, wherein the action link is provided to the user further in response to the user location value, and wherein the user location value represents a geographic location of a user.

* * * * *